US011209961B2

(12) United States Patent
Pope et al.

(10) Patent No.: US 11,209,961 B2
(45) Date of Patent: Dec. 28, 2021

(54) DEVICE, METHOD, AND GRAPHICAL USER INTERFACE FOR MANIPULATING USER INTERFACES BASED ON FINGERPRINT SENSOR INPUTS

(71) Applicant: Apple Inc., Cupertino, CA (US)

(72) Inventors: Benjamin J. Pope, Sunnyvale, CA (US); Daniel W. Jarvis, Sunnyvale, CA (US); Nicholas G. Merz, San Francisco, CA (US); Scott A. Myers, Palo Alto, CA (US); Michael A. Cretella, San Francisco, CA (US); Michael Eng, San Jose, CA (US); James H. Foster, Palo Alto, CA (US); Terry L. Gilton, Boise, ID (US); Myra Haggerty, San Mateo, CA (US); Byron B. Han, Cupertino, CA (US); M. Evans Hankey, San Francisco, CA (US); Steven P. Hotelling, Los Gatos, CA (US); Brian R. Land, Woodside, CA (US); Stephen Brian Lynch, Portola Valley, CA (US); Paul Meade, San Mateo, CA (US); Mushtaq A. Sarwar, San Jose, CA (US); John P. Ternus, Los Altos Hills, CA (US); Paul M. Thompson, San Jose, CA (US); Marcel Van Os, San Francisco, CA (US); John A. Wright, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 222 days.

(21) Appl. No.: 14/402,087

(22) PCT Filed: May 20, 2013

(86) PCT No.: PCT/US2013/041868

§ 371 (c)(1),
(2) Date: Nov. 18, 2014

(87) PCT Pub. No.: WO2013/173838

PCT Pub. Date: Nov. 21, 2013

(65) Prior Publication Data

US 2015/0135108 A1 May 14, 2015

Related U.S. Application Data

(60) Provisional application No. 61/649,207, filed on May 18, 2012, provisional application No. 61/667,926,
(Continued)

(51) Int. Cl.
*G06F 3/048* (2013.01)
*G06F 3/0484* (2013.01)
(Continued)

(52) U.S. Cl.
CPC .......... *G06F 3/0484* (2013.01); *A63F 13/218* (2014.09); *A63F 13/2145* (2014.09);
(Continued)

(58) Field of Classification Search
CPC ......... G06F 3/0481–0489; G06F 21/32; G06F 3/04883; G06F 3/0488; G06F 3/0416;
(Continued)

(56) References Cited

U.S. PATENT DOCUMENTS

| | | | |
|---|---|---|---|
| 4,353,056 | A | 10/1982 | Tsikos |
| 4,993,068 | A | 2/1991 | Piosenka et al. |

(Continued)

FOREIGN PATENT DOCUMENTS

| | | | |
|---|---|---|---|
| CN | 1220433 | A | 6/1999 |
| CN | 1685357 | A | 10/2005 |

(Continued)

OTHER PUBLICATIONS

Office Action received for Australian Patent Application No. 2014204462, dated May 8, 2015, 4 pages.

(Continued)

*Primary Examiner* — Steven B Theriault
(74) *Attorney, Agent, or Firm* — Dentons US LLP

(57) ABSTRACT

Devices, methods and graphical user interfaces for manipulating user interfaces based on fingerprint sensor inputs are
(Continued)

provided. While a display of an electronic device with a fingerprint sensor displays a first user interface, the device may detect movement of a fingerprint on the fingerprint sensor. In accordance with a determination that the movement of the fingerprint is in a first direction, the device allows navigating through the first user interface, and in accordance with a determination that the movement of the fingerprint is in a second direction different from the first direction, the device allows displaying a second user interface different from the first user interface on the display.

51 Claims, 238 Drawing Sheets

Related U.S. Application Data filed on Jul. 3, 2012, provisional application No. 61/794,710, filed on Mar. 15, 2013.

(51) Int. Cl.

| | |
|---|---|
| ***G06K 9/00*** | (2006.01) |
| ***G06F 3/0488*** | (2013.01) |
| ***A63F 13/2145*** | (2014.01) |
| ***A63F 13/837*** | (2014.01) |
| ***A63F 13/42*** | (2014.01) |
| ***A63F 13/537*** | (2014.01) |
| ***A63F 13/218*** | (2014.01) |
| ***G06F 1/16*** | (2006.01) |
| ***G06F 3/0489*** | (2013.01) |
| ***G06F 3/0481*** | (2013.01) |
| *G06F 3/14* | (2006.01) |

(52) U.S. Cl.

CPC ............ *A63F 13/42* (2014.09); *A63F 13/537* (2014.09); *A63F 13/837* (2014.09); *G06F 1/169* (2013.01); *G06F 1/1626* (2013.01); *G06F 1/1671* (2013.01); *G06F 3/0481* (2013.01); *G06F 3/0488* (2013.01); *G06F 3/04883* (2013.01); *G06F 3/04897* (2013.01); *G06K 9/00006* (2013.01); *G06K 9/00013* (2013.01); *G06F 3/1431* (2013.01); *G06F 2200/1614* (2013.01)

(58) Field of Classification Search

CPC ....... G06F 3/04886; G06F 2203/04106; G06F 3/0414; G06F 21/31; G06F 3/04845; G06F 3/0487; G06K 9/00087; G06K 9/0002; G06K 9/00013; G06K 9/0008; G06K 9/001; G06K 19/07354; G06K 9/00006

See application file for complete search history.

(56) References Cited

U.S. PATENT DOCUMENTS 5,053,608 A 10/1991 Senanayake
5,131,038 A 7/1992 Puhl et al.
5,280,527 A 1/1994 Gullman et al.
5,325,442 A 6/1994 Knapp
5,420,936 A 5/1995 Fitzpatrick et al.
5,469,506 A 11/1995 Berson et al.
5,526,428 A 6/1996 Arnold
5,591,949 A 1/1997 Bernstein
5,613,012 A 3/1997 Hoffman et al.
5,615,277 A 3/1997 Hoffman
5,615,384 A 3/1997 Allard et al.
5,799,098 A 8/1998 Ort et al.
5,801,763 A 9/1998 Suzuki
5,805,719 A 9/1998 Pare, Jr. et al.
5,838,306 A 11/1998 O'Connor et al.
5,838,812 A 11/1998 Pare, Jr. et al.
5,852,670 A 12/1998 Setlak et al.
5,856,824 A 1/1999 Shieh
5,857,028 A 1/1999 Frieling
5,870,723 A 2/1999 Pare, Jr. et al.
5,920,640 A 7/1999 Salatino et al.
5,933,134 A 8/1999 Shieh
5,943,043 A 8/1999 Furuhata et al.
5,952,641 A 9/1999 Korshun
5,952,998 A 9/1999 Clancy et al.
5,963,679 A 10/1999 Setlak
5,974,150 A 10/1999 Kaish et al.
5,991,408 A 11/1999 Pearson et al.
6,028,950 A 2/2000 Merjanian
6,037,882 A 3/2000 Levy
6,038,666 A 3/2000 Hsu et al.
6,041,410 A 3/2000 Hsu et al.
6,084,968 A 7/2000 Kennedy et al.
6,111,517 A 8/2000 Atick et al.
6,141,436 A 10/2000 Srey et al.
6,151,593 A 11/2000 Cho et al.
6,154,879 A 11/2000 Pare, Jr. et al.
6,167,517 A 12/2000 Gilchrist et al.
6,181,328 B1 1/2001 Shieh et al.
6,181,803 B1 1/2001 Davis
6,182,221 B1 1/2001 Hsu et al.
6,185,316 B1 2/2001 Buffam
6,193,153 B1 2/2001 Lambert
6,219,793 B1 4/2001 Li et al.
6,256,022 B1 7/2001 Manaresi et al.
6,268,788 B1 7/2001 Gray
6,282,304 B1 8/2001 Novikov et al.
6,282,649 B1 8/2001 Lambert et al.
6,292,173 B1 9/2001 Rambaldi et al.
6,317,834 B1 11/2001 Gennaro et al.
6,317,835 B1 11/2001 Bilger et al.
6,327,376 B1 12/2001 Harkin
6,337,919 B1 1/2002 Dunton
6,353,889 B1 3/2002 Hollingshead
6,366,682 B1 4/2002 Hoffman et al.
6,367,017 B1 4/2002 Gray
6,421,453 B1 7/2002 Kanevsky et al.
6,459,424 B1 10/2002 Resman
6,466,781 B1 10/2002 Bromba et al.
6,484,260 B1 11/2002 Scott et al.
6,487,662 B1 11/2002 Kharon et al.
6,490,680 B1 12/2002 Scheldt et al.
6,498,861 B1 12/2002 Hamid et al.
6,501,846 B1 12/2002 Dickinson et al.
6,529,885 B1 3/2003 Johnson
6,532,298 B1 3/2003 Cambier et al.
6,560,612 B1 5/2003 Yamada et al.
6,573,883 B1 6/2003 Bartlett
6,581,161 B1 6/2003 Byford
6,603,462 B2 8/2003 Matusis
6,609,198 B1 8/2003 Wood et al.
6,615,264 B1 9/2003 Stoltz et al.
6,618,806 B1 9/2003 Brown et al.
6,636,973 B1 10/2003 Novoa et al.
6,639,584 B1 10/2003 Li
6,657,538 B1 12/2003 Ritter
6,662,166 B2 12/2003 Pare, Jr. et al.
6,668,332 B1 12/2003 McNeil
6,671,808 B1 12/2003 Abbott et al.
6,681,034 B1 1/2004 Russo
6,719,200 B1 4/2004 Wiebe
6,720,860 B1 4/2004 Narayanaswami
6,724,370 B2 4/2004 Dutta et al.
6,728,881 B1 4/2004 Karamchetty
6,735,287 B2 5/2004 Vishik et al.
6,735,695 B1 5/2004 Gopalakrishnan et al.
6,751,734 B1 6/2004 Uchida
6,757,411 B2 6/2004 Chau
6,765,470 B2 7/2004 Shinzaki
6,766,040 B1 7/2004 Catalano et al.
6,775,776 B1 8/2004 Vogt et al.
6,786,397 B2 9/2004 Silverbrook et al.
6,819,219 B1 11/2004 Bolle et al.

(56) References Cited

U.S. PATENT DOCUMENTS 6,832,317 B1 12/2004 Strongin et al.
6,836,843 B2 12/2004 Seroussi et al.
6,839,688 B2 1/2005 Drummond et al.
6,844,660 B2 1/2005 Scott
6,848,052 B2 1/2005 Hamid et al.
6,850,147 B2 2/2005 Prokoski et al.
6,850,252 B1 2/2005 Hoffberg
6,853,739 B2 2/2005 Kyle
6,857,073 B2 2/2005 French et al.
6,862,443 B2 3/2005 Witte
6,870,946 B1 3/2005 Teng et al.
6,870,966 B1 3/2005 Silverbrook et al.
6,871,193 B1 3/2005 Campbell et al.
6,871,287 B1 3/2005 Ellingson
6,871,784 B2 3/2005 Jayaratne
6,876,757 B2 4/2005 Yau et al.
6,877,097 B2 4/2005 Hamid et al.
6,879,243 B1 4/2005 Booth et al.
6,879,710 B1 4/2005 Hinoue et al.
6,879,966 B1 4/2005 Lapsley et al.
6,880,749 B1 4/2005 Green et al.
6,880,750 B2 4/2005 Pentel
6,883,709 B2 4/2005 Joseph
6,886,096 B2 4/2005 Appenzeller et al.
6,886,101 B2 4/2005 Glazer et al.
6,886,104 B1 4/2005 McClurg et al.
6,888,445 B2 5/2005 Gotfried et al.
6,898,577 B1 5/2005 Johnson
6,901,154 B2 5/2005 Dunn
6,901,155 B2 5/2005 Xia et al.
6,901,266 B2 5/2005 Henderson
6,901,382 B1 5/2005 Richards et al.
6,941,001 B1 9/2005 Bolle et al.
6,960,734 B1 11/2005 Park
6,961,738 B1 11/2005 Uchida
6,980,081 B2 12/2005 Anderson
6,985,502 B2 1/2006 Bunton
7,020,270 B1 3/2006 Ghassabian
7,027,619 B2 4/2006 Pavlidis et al.
7,030,860 B1 4/2006 Hsu et al.
7,030,861 B1 * 4/2006 Westerman ......... G06F 3/04883 345/173
7,039,221 B1 5/2006 Tumey et al.
7,057,607 B2 6/2006 Mayoraz et al.
7,086,085 B1 8/2006 Brown et al.
7,102,617 B2 9/2006 Gust
7,124,300 B1 10/2006 Lemke
7,137,553 B2 11/2006 Register, Jr. et al.
7,190,816 B2 3/2007 Mitsuyu et al.
7,203,347 B2 4/2007 Hamid
7,239,728 B1 7/2007 Choi et al.
7,346,778 B1 3/2008 Guiter et al.
7,346,779 B2 3/2008 Leeper
7,347,361 B2 3/2008 Lovett
7,420,546 B2 9/2008 Abdallah et al.
7,474,772 B2 * 1/2009 Russo ..................... G06F 3/033 345/157
7,486,810 B1 2/2009 Accapadi
7,525,537 B2 4/2009 Abdallah et al.
7,542,592 B2 6/2009 Singh et al.
7,590,269 B2 * 9/2009 Creasey .............. G06F 3/03547 340/5.53
7,626,598 B2 12/2009 Manchester
7,630,522 B2 12/2009 Popp et al.
7,633,076 B2 12/2009 Huppi et al.
7,676,748 B1 3/2010 Barrus et al.
7,688,314 B2 3/2010 Abdallah et al.
7,689,013 B2 3/2010 Shinzaki
7,705,737 B2 4/2010 Senga
7,725,511 B2 * 5/2010 Kadi ..................... G06F 3/0238 708/145
7,730,401 B2 6/2010 Gillespie et al.
7,734,930 B2 6/2010 Kirovski et al.
7,738,916 B2 6/2010 Fukuda
7,810,720 B2 10/2010 Lovett
7,847,787 B1 * 12/2010 Boillot .................... G06F 3/043 345/156
7,860,536 B2 12/2010 Jobs et al.
RE42,038 E 1/2011 Abdallah et al.
7,921,297 B2 4/2011 Ortiz et al.
8,018,440 B2 9/2011 Townsend et al.
8,023,700 B2 * 9/2011 Riionheimo ........ G06F 3/04883 340/5.53
8,095,634 B2 1/2012 Rao
8,145,912 B2 3/2012 Mclean
8,175,345 B2 * 5/2012 Gardner ............. G06K 9/00026 382/103
8,190,907 B2 5/2012 Tu
8,291,350 B1 * 10/2012 Park .................... G06F 3/04883 715/705
8,300,023 B2 10/2012 Forutanpour et al.
8,311,514 B2 11/2012 Bandyopadhyay et al.
8,336,086 B2 12/2012 Seo
8,352,745 B2 1/2013 McKeeth
8,358,200 B2 * 1/2013 Madhvanath ....... G06F 3/03547 340/5.52
8,395,658 B2 3/2013 Corson
8,438,400 B2 5/2013 Hoghaug et al.
8,443,199 B2 * 5/2013 Kim .................... G06F 3/03547 345/173
8,526,915 B2 9/2013 Kakiuchi et al.
8,702,513 B2 * 4/2014 Lim .................... G06F 3/03547 463/31
8,788,838 B1 7/2014 Fadell et al.
8,878,879 B2 * 11/2014 Lee ....................... G06F 3/0482 345/173
8,938,101 B2 * 1/2015 Uy ........................ G06F 3/0488 382/124
8,943,580 B2 * 1/2015 Fadell .................. G06F 21/316 726/19
9,035,891 B2 * 5/2015 Deluca .................... G06F 3/041 178/18.01
9,038,167 B2 5/2015 Fadell et al.
9,128,601 B2 9/2015 Fadell et al.
9,134,896 B2 9/2015 Fadell et al.
9,141,259 B2 * 9/2015 Bell ...................... G06F 3/0488
9,152,241 B2 * 10/2015 Zlotnicki ............. G06F 3/0237
9,179,298 B2 11/2015 Jung et al.
9,201,539 B2 * 12/2015 Hinckley .............. G06F 3/0416
9,201,585 B1 * 12/2015 Karakotsios .......... G06F 3/0488
9,218,124 B2 * 12/2015 Matsuda ............. G06F 3/04886
9,250,795 B2 2/2016 Fadell et al.
9,274,647 B2 3/2016 Fadell et al.
9,304,624 B2 4/2016 Fadell et al.
9,329,771 B2 5/2016 Fadell et al.
9,342,674 B2 5/2016 Abdallah et al.
9,348,987 B2 * 5/2016 Boshra .................... G06F 21/32
9,495,531 B2 11/2016 Fadell et al.
9,519,771 B2 12/2016 Fadell et al.
9,626,099 B2 * 4/2017 Michaelis ........... G06F 3/03547
9,648,279 B2 * 5/2017 Shen ................... G06F 3/04886
9,684,444 B2 * 6/2017 Lazaridis .............. G06F 3/0488
9,705,676 B2 * 7/2017 Quirk ................. G06K 9/00087
9,785,330 B1 * 10/2017 Yang ..................... G06F 3/0488
9,785,341 B2 * 10/2017 Stallings ............... G06F 3/0482
2001/0031072 A1 10/2001 Dobashi et al.
2001/0044906 A1 11/2001 Kanevsky et al.
2001/0047488 A1 11/2001 Verplaetse et al.
2002/0095588 A1 7/2002 Shigematsu et al.
2002/0097145 A1 7/2002 Tumey et al.
2002/0122026 A1 9/2002 Bergstrom
2002/0130841 A1 * 9/2002 Scott ..................... G06F 3/0213 345/166
2002/0136435 A1 9/2002 Prokoski
2002/0141586 A1 10/2002 Margalit et al.
2002/0146157 A1 10/2002 Goodman et al.
2002/0163506 A1 * 11/2002 Matusis ................ G06F 3/0219 345/173
2002/0190960 A1 * 12/2002 Kuo .................... G06F 3/03547 345/173
2002/0191029 A1 12/2002 Gillespie et al.
2002/0191817 A1 12/2002 Sato et al.
2003/0046557 A1 3/2003 Miller et al.

(56) References Cited

U.S. PATENT DOCUMENTS

2003/0048173 A1 3/2003 Shigematsu et al.
2003/0048260 A1* 3/2003 Matusis ................ G06F 3/0233 345/173
2003/0115490 A1 6/2003 Russo et al.
2003/0118217 A1 6/2003 Kondo et al.
2003/0120934 A1 6/2003 Ortiz
2003/0132974 A1 7/2003 Bodin
2003/0138136 A1 7/2003 Umezaki et al.
2003/0163710 A1 8/2003 Ortiz et al.
2003/0188183 A1 10/2003 Lee et al.
2003/0195935 A1 10/2003 Leeper
2003/0210127 A1 11/2003 Anderson
2004/0042542 A1 3/2004 Kawada et al.
2004/0076310 A1 4/2004 Hersch et al.
2004/0085300 A1* 5/2004 Matusis ................ G06F 3/0219 345/173
2004/0085351 A1 5/2004 Tokkonen
2004/0104268 A1 6/2004 Bailey
2004/0131237 A1 7/2004 Machida
2004/0135801 A1 7/2004 Thompson et al.
2004/0172562 A1 9/2004 Berger et al.
2004/0196400 A1 10/2004 Stavely et al.
2004/0208348 A1* 10/2004 Baharav ................ G06F 3/0421 382/124
2004/0210771 A1 10/2004 Wood et al.
2004/0229560 A1 11/2004 Maloney
2004/0230843 A1 11/2004 Jansen
2004/0239648 A1* 12/2004 Abdallah ........... G06K 9/00087 345/173
2004/0250138 A1 12/2004 Schneider
2005/0024341 A1 2/2005 Gillespie et al.
2005/0040962 A1 2/2005 Funkhouser et al.
2005/0041841 A1 2/2005 Yoo et al.
2005/0052427 A1* 3/2005 Wu ..................... G06F 3/04883 345/173
2005/0058438 A1 3/2005 Hayashi
2005/0060554 A1 3/2005 O'Donoghue
2005/0071635 A1 3/2005 Furuyama
2005/0078855 A1* 4/2005 Chandler ........... G07C 9/00158 382/116
2005/0093834 A1 5/2005 Abdallah et al.
2005/0097171 A1 5/2005 Hikichi
2005/0097608 A1 5/2005 Penke et al.
2005/0100198 A1 5/2005 Nakano et al.
2005/0105778 A1 5/2005 Sung et al.
2005/0111708 A1 5/2005 Chou
2005/0113071 A1 5/2005 Nagata
2005/0114686 A1 5/2005 Ball et al.
2005/0114796 A1* 5/2005 Bast ...................... G06F 3/0338 715/856
2005/0169503 A1 8/2005 Howell et al.
2005/0174325 A1 8/2005 Setlak
2005/0175226 A1 8/2005 Yamamoto
2005/0221798 A1 10/2005 Sengupta et al.
2005/0226472 A1 10/2005 Komura
2005/0254086 A1 11/2005 Shouno
2006/0021003 A1 1/2006 Fisher et al.
2006/0032908 A1 2/2006 Sines
2006/0056664 A1 3/2006 Iwasaki
2006/0075250 A1 4/2006 Liao
2006/0078176 A1 4/2006 Abiko et al.
2006/0080525 A1 4/2006 Ritter et al.
2006/0085115 A1* 4/2006 Ilan ..................... B60R 16/0373 701/49
2006/0093183 A1 5/2006 Hosoi
2006/0093192 A1 5/2006 Bechtel
2006/0095369 A1 5/2006 Hofi
2006/0097172 A1 5/2006 Park
2006/0101281 A1* 5/2006 Zhang ..................... H01P 5/107 713/186
2006/0102843 A1 5/2006 Bazakos et al.
2006/0104488 A1 5/2006 Bazakos et al.
2006/0115130 A1 6/2006 Kozlay
2006/0116555 A1 6/2006 Pavlidis et al.
2006/0136734 A1 6/2006 Telek et al.
2006/0156028 A1 7/2006 Aoyama et al.
2006/0214910 A1 9/2006 Mizuno et al.
2006/0219776 A1 10/2006 Finn
2006/0224645 A1 10/2006 Kadi
2006/0234764 A1 10/2006 Gamo et al.
2006/0239517 A1 10/2006 Creasey et al.
2006/0255153 A1 11/2006 Cheng et al.
2006/0274920 A1 12/2006 Tochikubo et al.
2006/0282671 A1 12/2006 Burton
2006/0284853 A1* 12/2006 Shapiro ............... G06F 3/04883 345/173
2006/0285663 A1 12/2006 Rathus et al.
2006/0288234 A1 12/2006 Azar et al.
2006/0289638 A1 12/2006 Schilling
2007/0008066 A1 1/2007 Fukuda
2007/0014439 A1 1/2007 Ando
2007/0016958 A1 1/2007 Bodepudi et al.
2007/0021194 A1 1/2007 Aida
2007/0061126 A1* 3/2007 Russo ................ G06F 3/03547 703/24
2007/0061889 A1 3/2007 Sainaney
2007/0067642 A1 3/2007 Singhal
2007/0089164 A1 4/2007 Gao et al.
2007/0106942 A1* 5/2007 Sanaka ............... G06F 3/04886 715/733
2007/0109274 A1 5/2007 Reynolds
2007/0110287 A1 5/2007 Kim et al.
2007/0150842 A1 6/2007 Chaudhri et al.
2007/0177803 A1* 8/2007 Elias .................. G06F 3/04883 382/188
2007/0177804 A1 8/2007 Elias et al.
2007/0189583 A1 8/2007 Shimada et al.
2007/0204037 A1 8/2007 Kunz et al.
2007/0208743 A1 9/2007 Sainaney
2007/0217662 A1* 9/2007 Matsunaga ......... G06F 3/03547 382/124
2007/0220273 A1 9/2007 Campisi
2007/0226778 A1 9/2007 Pietruszka
2007/0230773 A1 10/2007 Nagao et al.
2007/0236330 A1 10/2007 Cho et al.
2007/0236475 A1 10/2007 Wherry
2007/0236477 A1* 10/2007 Ryu ...................... G06F 3/0485 345/173
2007/0239921 A1 10/2007 Toorians et al.
2007/0250573 A1 10/2007 Rothschild
2007/0253604 A1 11/2007 Inoue et al.
2007/0259716 A1 11/2007 Mattice et al.
2007/0273658 A1 11/2007 Yli-Nokari et al.
2007/0273670 A1 11/2007 Nordahl
2007/0277224 A1 11/2007 Osborn et al.
2007/0280515 A1 12/2007 Goto
2007/0287423 A1 12/2007 Kakiuchi et al.
2007/0291018 A1* 12/2007 Park .................... G06F 3/03547 345/184
2008/0001703 A1 1/2008 Goto
2008/0032801 A1 2/2008 Brunet de Courssou
2008/0042979 A1 2/2008 Nikbin
2008/0042983 A1* 2/2008 Kim .................... G06F 3/03547 345/173
2008/0048878 A1 2/2008 Boillot
2008/0063245 A1* 3/2008 Benkley .................. G06F 3/041 382/124
2008/0069412 A1 3/2008 Champagne et al.
2008/0072045 A1 3/2008 Mizrah
2008/0084400 A1* 4/2008 Rosenberg ............ G06F 1/1626 345/173
2008/0089587 A1* 4/2008 Kim ........................ G06F 3/017 382/190
2008/0092245 A1 4/2008 Alward et al.
2008/0133931 A1 6/2008 Kosaka
2008/0163131 A1* 7/2008 Hirai ..................... G06F 3/0425 715/863
2008/0165255 A1 7/2008 Christie et al.
2008/0168403 A1* 7/2008 Westerman ......... G06F 3/04883 715/863
2008/0178126 A1* 7/2008 Beeck ..................... G06F 3/017 715/863

(56) References Cited

U.S. PATENT DOCUMENTS

2008/0178283 A1 7/2008 Pratt et al.
2008/0212849 A1 9/2008 Gao
2008/0240523 A1* 10/2008 Benkley ............ G06K 9/00026 382/126
2008/0246917 A1 10/2008 Phinney et al.
2008/0250481 A1 10/2008 Beck et al.
2008/0292144 A1 11/2008 Kim
2008/0309632 A1 12/2008 Westerman et al.
2008/0314971 A1 12/2008 Faith et al.
2008/0317292 A1 12/2008 Baker et al.
2009/0006292 A1 1/2009 Block
2009/0006846 A1 1/2009 Rosenblatt
2009/0006991 A1 1/2009 Lindberg et al.
2009/0007017 A1 1/2009 Anzures et al.
2009/0028395 A1* 1/2009 Riionheimo ........ G06F 3/04883 382/124
2009/0037742 A1 2/2009 Narayanaswami
2009/0043180 A1 2/2009 Tschautscher et al.
2009/0058595 A1 3/2009 Mainguet et al.
2009/0063352 A1 3/2009 Kaufman
2009/0067685 A1 3/2009 Boshra et al.
2009/0083847 A1* 3/2009 Fadell .................. G06F 21/316 726/16
2009/0083850 A1* 3/2009 Fadell ................ H04L 63/0861 726/19
2009/0102604 A1* 4/2009 Madhvanath ....... G06F 3/03547 340/5.83
2009/0141046 A1* 6/2009 Rathnam ............ G06F 3/03547 345/661
2009/0141951 A1 6/2009 Ogo et al.
2009/0158203 A1* 6/2009 Kerr ....................... G06F 3/017 715/784
2009/0169070 A1* 7/2009 Fadell .................... G06F 21/32 382/124
2009/0176565 A1 7/2009 Kelly
2009/0184921 A1* 7/2009 Scott .................... G06F 1/1626 345/156
2009/0195506 A1 8/2009 Geidl et al.
2009/0201257 A1 8/2009 Saitoh et al.
2009/0213087 A1 8/2009 Abdallah et al.
2009/0224874 A1* 9/2009 Dewar ................... G06F 21/36 340/5.53
2009/0244019 A1* 10/2009 Choi .................. G06F 3/04883 345/173
2009/0258667 A1 10/2009 Suzuki et al.
2009/0328162 A1 12/2009 Kokumai et al.
2010/0008545 A1 1/2010 Ueki et al.
2010/0027854 A1* 2/2010 Chatterjee ............ G06F 3/0414 382/124
2010/0034432 A1 2/2010 Ono et al.
2010/0053301 A1 3/2010 Ryu et al.
2010/0053661 A1 3/2010 Ushiku
2010/0058252 A1* 3/2010 Ko ..................... G06F 3/04883 715/863
2010/0076823 A1 3/2010 Feldman et al.
2010/0110025 A1* 5/2010 Lim .................... G06F 3/03547 345/173
2010/0125786 A1* 5/2010 Ozawa ................ G06F 3/04845 715/702
2010/0134248 A1 6/2010 Adams et al.
2010/0141574 A1* 6/2010 Jung .................... G06F 3/0346 345/156
2010/0164684 A1 7/2010 Sasa et al.
2010/0164864 A1* 7/2010 Chou ...................... G06F 3/038 345/156
2010/0180136 A1 7/2010 Thompson et al.
2010/0182125 A1 7/2010 Abdallah et al.
2010/0208953 A1 8/2010 Gardner et al.
2010/0220900 A1* 9/2010 Orsley ................. G06F 3/0421 382/124
2010/0225607 A1* 9/2010 Kim ....................... G06F 3/042 345/173
2010/0231356 A1* 9/2010 Kim ....................... G06F 3/048 340/5.83
2010/0237991 A1 9/2010 Prabhu et al.
2010/0240415 A1 9/2010 Kim et al.
2010/0245553 A1 9/2010 Schuler et al.
2010/0265204 A1* 10/2010 Tsuda .................... G06F 1/1626 345/174
2010/0295772 A1* 11/2010 Alameh ................ G06F 3/0304 345/156
2010/0302016 A1 12/2010 Zaborowski
2010/0313263 A1 12/2010 Uchida et al.
2010/0318905 A1* 12/2010 Rakesh ................ G06F 3/0482 715/702
2011/0013813 A1 1/2011 Yamamoto et al.
2011/0022307 A1* 1/2011 Lee .................... G01C 21/3664 701/533
2011/0039602 A1* 2/2011 McNamara ............ G06F 3/017 455/566
2011/0043472 A1* 2/2011 Hada .................. G06F 3/04883 345/173
2011/0057953 A1* 3/2011 Horodezky ............ G06F 9/451 345/647
2011/0080359 A1 4/2011 Jang et al.
2011/0096087 A1* 4/2011 Chun .................. G06F 3/04883 345/592
2011/0102567 A1* 5/2011 Erhart ................ G06K 9/00026 348/77
2011/0124376 A1* 5/2011 Kim ..................... G06F 1/1626 455/566
2011/0163969 A1 7/2011 Freddy et al.
2011/0169743 A1 7/2011 Oh et al.
2011/0170750 A1 7/2011 Kropp et al.
2011/0175807 A1 7/2011 Grover
2011/0179368 A1* 7/2011 King .................. G06F 3/04815 715/769
2011/0179387 A1 7/2011 Shaffer et al.
2011/0209088 A1* 8/2011 Hinckley ............. G06F 3/0488 715/810
2011/0209099 A1* 8/2011 Hinckley ............. G06F 3/0483 715/863
2011/0273267 A1* 11/2011 Bong ................... G06F 3/0233 340/5.53
2011/0285648 A1 11/2011 Simon
2011/0287741 A1* 11/2011 Prabhu .................... G06F 21/32 455/411
2011/0296351 A1* 12/2011 Ewing, Jr. ............ G06F 3/0483 715/841
2011/0300829 A1 12/2011 Nurmi et al.
2012/0007713 A1* 1/2012 Nasiri .................. G06F 1/3215 340/5.81
2012/0011437 A1* 1/2012 James .................. G06F 1/1643 715/702
2012/0019562 A1* 1/2012 Park ..................... G06F 3/0488 345/657
2012/0026117 A1* 2/2012 Schneider .............. G06F 3/041 345/173
2012/0044156 A1* 2/2012 Michaelis ........... G06F 3/03547 345/173
2012/0047574 A1 2/2012 Kim et al.
2012/0081363 A1 4/2012 Kang et al.
2012/0084737 A1 4/2012 Gimpl et al.
2012/0098766 A1* 4/2012 Dippel .................. G06F 3/0416 345/173
2012/0105081 A1 5/2012 Shaikh et al.
2012/0127179 A1* 5/2012 Aspelin .................. G06T 11/00 345/441
2012/0147052 A1* 6/2012 Homma .................. G06F 3/044 345/660
2012/0154303 A1* 6/2012 Lazaridis ............. G06F 1/3215 345/173
2012/0182253 A1* 7/2012 Brosnan ................ G06F 3/0416 345/174
2012/0182296 A1* 7/2012 Han .................... G06F 3/04883 345/419
2012/0206353 A1* 8/2012 Chang ................. G06F 3/03543 345/158

(56) References Cited

U.S. PATENT DOCUMENTS

| | | | | |
|---|---|---|---|---|
| 2012/0226979 | A1* | 9/2012 | Harberts | G06F 3/0482 715/702 |
| 2012/0280927 | A1* | 11/2012 | Ludwig | G06F 3/041 345/173 |
| 2013/0063362 | A1* | 3/2013 | Papakipos | G06F 1/1643 345/173 |
| 2013/0093685 | A1* | 4/2013 | Kalu | G06F 3/04886 345/173 |
| 2013/0093687 | A1* | 4/2013 | Papakipos | G06F 1/169 345/173 |
| 2013/0120279 | A1* | 5/2013 | Plichta | G06F 3/04883 345/173 |
| 2013/0127592 | A1* | 5/2013 | Fyke | G06F 21/32 340/5.53 |
| 2013/0129162 | A1* | 5/2013 | Cheng | G06F 21/32 382/124 |
| 2013/0173925 | A1* | 7/2013 | Yen | G06F 21/32 713/186 |
| 2013/0201155 | A1* | 8/2013 | Wu | G06F 3/03547 345/174 |
| 2013/0215040 | A1* | 8/2013 | Bose | G06F 3/04883 345/173 |
| 2013/0222274 | A1* | 8/2013 | Mori | B60K 37/06 345/173 |
| 2013/0257758 | A1* | 10/2013 | Huang | G06F 3/041 345/173 |
| 2013/0278383 | A1* | 10/2013 | Boshra | G06F 21/32 340/5.83 |
| 2013/0307788 | A1* | 11/2013 | Rao | G06F 3/0488 345/173 |
| 2013/0324089 | A1* | 12/2013 | Kim | G06F 21/32 455/411 |
| 2014/0003678 | A1* | 1/2014 | Vieta | G06K 9/00026 382/124 |
| 2014/0112555 | A1 | 4/2014 | Fadell et al. | |
| 2014/0115695 | A1 | 4/2014 | Fadell et al. | |
| 2014/0304809 | A1 | 10/2014 | Fadell et al. | |
| 2014/0380465 | A1 | 12/2014 | Fadell et al. | |
| 2015/0095174 | A1 | 4/2015 | Dua | |
| 2015/0178548 | A1 | 6/2015 | Abdallah et al. | |
| 2016/0154956 | A1 | 6/2016 | Fadell et al. | |
| 2017/0169204 | A1 | 6/2017 | Fadell et al. | |
| 2017/0199997 | A1 | 7/2017 | Fadell et al. | |

FOREIGN PATENT DOCUMENTS

| | | | |
|---|---|---|---|
| CN | 1742252 | A | 3/2006 |
| CN | 1766904 | A | 5/2006 |
| CN | 1801708 | A | 7/2006 |
| CN | 1836397 | A | 9/2006 |
| CN | 1918537 | A | 2/2007 |
| CN | 100999961 | A | 7/2007 |
| CN | 101035335 | A | 9/2007 |
| CN | 101039184 | A | 9/2007 |
| CN | 101410781 | A | 4/2009 |
| CN | 101448056 | A | 6/2009 |
| CN | 101853379 | A | 10/2010 |
| CN | 201765630 | U | 3/2011 |
| CN | 102754062 | A | 10/2012 |
| DE | 10153591 | A1 | 5/2003 |
| EP | 0593386 | A2 | 4/1994 |
| EP | 0923018 | A2 | 6/1999 |
| EP | 1043698 | A2 | 10/2000 |
| EP | 1257111 | A1 | 11/2002 |
| EP | 1422589 | A1 | 5/2004 |
| EP | 1626330 | A1 | 2/2006 |
| EP | 1736908 | A2 | 12/2006 |
| EP | 1835697 | A2 | 9/2007 |
| EP | 2076000 | A2 | 7/2009 |
| EP | 1835697 | A3 | 6/2010 |
| EP | 2388734 | A1 | 11/2011 |
| EP | 1626330 | A4 | 1/2012 |
| EP | 1835697 | B1 | 5/2018 |
| GB | 2184576 | A | 6/1987 |
| GB | 2312040 | A | 10/1997 |
| GB | 2360618 | A | 9/2001 |
| JP | 4-158434 | A | 6/1992 |
| JP | 7-234837 | A | 9/1995 |
| JP | 10-11216 | A | 1/1998 |
| JP | 10-63424 | A | 3/1998 |
| JP | 10-63427 | A | 3/1998 |
| JP | 10-232934 | A | 9/1998 |
| JP | 10-269358 | A | 10/1998 |
| JP | 11-185016 | A | 7/1999 |
| JP | 11-242745 | A | 9/1999 |
| JP | 2000-90052 | A | 3/2000 |
| JP | 2000-250862 | A | 9/2000 |
| JP | 2000-276245 | A | 10/2000 |
| JP | 2000-293253 | A | 10/2000 |
| JP | 2000315118 | A | 11/2000 |
| JP | 2000-339097 | A | 12/2000 |
| JP | 2001-14051 | A | 1/2001 |
| JP | 2001-092554 | A | 4/2001 |
| JP | 2001-155137 | A | 6/2001 |
| JP | 2001-510579 | A | 7/2001 |
| JP | 2002-159052 | A | 5/2002 |
| JP | 2002-207525 | A | 7/2002 |
| JP | 2002-525718 | A | 8/2002 |
| JP | 2002-269046 | A | 9/2002 |
| JP | 2002-352234 | A | 12/2002 |
| JP | 2002-358162 | A | 12/2002 |
| JP | 2003-067343 | A | 3/2003 |
| JP | 2003-085540 | A | 3/2003 |
| JP | 2003-509775 | A | 3/2003 |
| JP | 2003-143290 | A | 5/2003 |
| JP | 2003-298689 | A | 10/2003 |
| JP | 2004-151862 | A | 5/2004 |
| JP | 2004-157821 | A | 6/2004 |
| JP | 2004-172851 | A | 6/2004 |
| JP | 2004-265353 | A | 9/2004 |
| JP | 2004-297468 | A | 10/2004 |
| JP | 2004-532477 | A | 10/2004 |
| JP | 2004313459 | A | 11/2004 |
| JP | 2004334788 | A | 11/2004 |
| JP | 2005-004490 | A | 1/2005 |
| JP | 2005-056152 | A | 3/2005 |
| JP | 2005-071225 | A | 3/2005 |
| JP | 2005-84991 | A | 3/2005 |
| JP | 2005-122700 | A | 5/2005 |
| JP | 2005-175555 | A | 6/2005 |
| JP | 2005-202578 | A | 7/2005 |
| JP | 2005-275488 | A | 10/2005 |
| JP | 2005-327076 | A | 11/2005 |
| JP | 2005-339425 | A | 12/2005 |
| JP | 2006-18613 | A | 1/2006 |
| JP | 2006-72872 | A | 3/2006 |
| JP | 2006-85559 | A | 3/2006 |
| JP | 2006-092428 | A | 4/2006 |
| JP | 2006-107288 | A | 4/2006 |
| JP | 2006-114018 | A | 4/2006 |
| JP | 2006-115043 | A | 4/2006 |
| JP | 2006-119920 | A | 5/2006 |
| JP | 2006-121334 | A | 5/2006 |
| JP | 2006-146579 | A | 6/2006 |
| JP | 2006-157154 | A | 6/2006 |
| JP | 2006-191245 | A | 7/2006 |
| JP | 2006-202278 | A | 8/2006 |
| JP | 2006-215705 | A | 8/2006 |
| JP | 2006-259931 | A | 9/2006 |
| JP | 2006-301201 | A | 11/2006 |
| JP | 2006-301785 | A | 11/2006 |
| JP | 2006-303701 | A | 11/2006 |
| JP | 2006-308375 | A | 11/2006 |
| JP | 2007-11667 | A | 1/2007 |
| JP | 2007-26011 | A | 2/2007 |
| JP | 2007-52574 | A | 3/2007 |
| JP | 2007-58397 | A | 3/2007 |
| JP | 2007-97820 | A | 4/2007 |
| JP | 2007-135149 | A | 5/2007 |
| JP | 2007-148801 | A | 6/2007 |
| JP | 2007-179213 | A | 7/2007 |
| JP | 2007-293628 | A | 11/2007 |

(56) References Cited

FOREIGN PATENT DOCUMENTS

| | | | | |
|---|---|---|---|---|
| JP | 2008-186320 | A | 8/2008 | |
| JP | 2009-171234 | A | 7/2009 | |
| JP | 2010-146301 | A | 7/2010 | |
| JP | 2011-48523 | A | 3/2011 | |
| JP | 2011-59233 | A | 3/2011 | |
| JP | 2011-229141 | A | 11/2011 | |
| JP | 2012-68778 | A | 4/2012 | |
| KR | 10-2002-0022295 | A | 3/2002 | |
| KR | 10-2002-0087665 | A | 11/2002 | |
| KR | 10-2003-0005535 | A | 1/2003 | |
| KR | 10-2004-0025004 | A | 3/2004 | |
| KR | 10-2004-0076639 | A | 9/2004 | |
| KR | 10-2005-0061975 | A | 6/2005 | |
| KR | 10-2006-0003689 | A | 1/2006 | |
| KR | 10-0652624 | B1 | 12/2006 | |
| KR | 10-2007-0026808 | A | 3/2007 | |
| KR | 10-2010-0059698 | A | 6/2010 | |
| KR | 10-2010-0111121 | A | 10/2010 | |
| KR | 10-2011-0058525 | A | 6/2011 | |
| KR | 10-2011-0103598 | A | 9/2011 | |
| KR | 10-2012-0042684 | A | 5/2012 | |
| TW | 200529636 | A | 9/2005 | |
| TW | 200601176 | A | 1/2006 | |
| TW | 200642408 | A | 12/2006 | |
| TW | M317045 | U | 8/2007 | |
| WO | 1998/058346 | A1 | 12/1998 | |
| WO | 2000/016244 | A1 | 3/2000 | |
| WO | 2001/041032 | A1 | 6/2001 | |
| WO | 2001/059558 | A1 | 8/2001 | |
| WO | 2001/063386 | A1 | 8/2001 | |
| WO | 2001/080017 | A1 | 10/2001 | |
| WO | 2004/029862 | A1 | 4/2004 | |
| WO | 2004/104813 | A1 | 12/2004 | |
| WO | 2004/109454 | A2 | 12/2004 | |
| WO | 2005008568 | A1 | 1/2005 | |
| WO | 2005/020036 | A2 | 3/2005 | |
| WO | 2005/064447 | A2 | 7/2005 | |
| WO | 2005/106774 | A2 | 11/2005 | |
| WO | 2006/051462 | A1 | 5/2006 | |
| WO | 2007/029710 | A1 | 3/2007 | |
| WO | 2007/060102 | A1 | 5/2007 | |
| WO | 2007/070014 | A1 | 6/2007 | |
| WO | 2007/072447 | A2 | 6/2007 | |
| WO | 2007076210 | A1 | 7/2007 | |
| WO | 2007/089766 | A2 | 8/2007 | |
| WO | 2008/008101 | A2 | 1/2008 | |
| WO | WO 2009085338 | * | 9/2009 | ............... G06K 9/00 |
| WO | 2011/084856 | A1 | 7/2011 | |
| WO | 2011/099803 | A2 | 8/2011 | |
| WO | 2011/103218 | A2 | 8/2011 | |
| WO | 2011/126502 | A1 | 10/2011 | |
| WO | 2012/054350 | A1 | 4/2012 | |
| WO | 2012/068551 | A1 | 5/2012 | |
| WO | 2012/117652 | A1 | 9/2012 | |

OTHER PUBLICATIONS

Office Action received for Canadian Patent Applicatioin No. 2,527,829, dated Apr. 29, 2015, 6 pages.
Notice of Allowance received for Japanese Patent Application No. 2006-533547, dated May 15, 2015, 2 pages (Official Copy only). (See Communication under CFR § 1.98(a) (3)).
Non Final Office Action received for U.S. Appl. No. 14/311,214, dated Apr. 10, 2015, 12 pages.
Non-Final Office Action received for U.S. Appl. No. 14/640,020, dated Apr. 29, 2015, 18 pages.
Final Office Action received for U.S. Appl. No. 14/142,669, dated Jun. 12, 2015, 14 pages.
Office Action received from Japanese Patent Application No. 2013-098406, dated May 8, 2015, 14 pages (9 pages of English Translation and 5 pages of Official Copy).
Office Action received from Japanese Patent Application No. 2013-145795, dated May 8, 2015, 12 pages (7 pages of English Translation and 5 pages of Official copy).
Office Action received for Korean Patent Application No. 10-2010-7008899, dated Jun. 12, 2015, 4 pages (2 pages of English Translation and 2 pages of Official Copy).
Notice of Final Rejection received for Korean Patent Application No. 10-2014-7004771, dated Jun. 12, 2015, 6 pages (3 pages English Translation and 3 pages of Official Copy only).
Notice of Final Rejection received for Korean Patent Application 10-2014-7004773, dated Jun. 12, 2015, 6 pages (3 pages English Translation and 3 pages of Official Copy).
Notice of Preliminary Rejection received for Korean Patent Application No. 10- 2014-7025441, dated Jun. 12, 2015, 9 pages (4 pages of English Transalation and 5 pages of Official Copy).
Notice of Preliminary Rejection received for Korean Patent Application No. 10-2015-7004548, dated Jun. 12, 2015, 8 pages (4 pages of English Translation and 4 pages of Official Copy).
Notice of Preliminary Rejection received from Korean Patent Application No. 10-2015-7010262, dated Jun. 12, 2015, 5 pages (2 pages of English Translation and 3 pages of Official Copy).
Notice of Allowance received for U.S. Appl. No. 14/142,657, dated Jun. 29, 2015, 7 pages.
Non-Final Office Action received for U.S. Appl. No. 14/479,088, dated Jul. 6, 2015, 19 pages.
Notice of Allowance received for U.S. Appl. No. 14/661,796, dated Jul. 7, 2015, 10 pages.
Decision to Grant received for the European Patent Application No. 12181538.5, dated Jul. 2, 2015, 1 page.
Final Office Action received for U.S. Appl. No. 14/640,020, dated Jul. 16, 2015, 26 pages.
Notice of Allowance received for U.S. Appl. No. 14/142,657, dated Jul. 23, 2015, 2 pages.
Notice of Allowance received for U.S. Appl. No. 14/661,796, dated Jul. 23, 2015, 2 pages.
Decision to Grant received for European Patent Application No. 04753978.8, dated Apr. 16, 2015, 2 pages.
Intention to Grant received for European Patent Application No. 04753978.8, dated Dec. 4, 2014, 5 pages.
Decision to Refuse received for European Patent Application No. 08834386.8, dated Apr. 8, 2013, 8 pages.
Summons to Attend Oral Proceedings received for European Patent Application No. 08834386.8, mailed on Aug. 24, 2012, 4 pages.
Notice of Allowance received for U.S. Appl. No. 14/142,661, dated Aug. 3, 2015, 10 pages.
Notice of Allowance received for U.S. Appl. No. 14/142,661, dated Sep. 28, 2015, 9 pages.
Final Office Action received for U.S. Appl. No. 14/311,214, dated Sep. 24, 2015, 15 pages.
Office Action received for Japanese Patent Application No. 2014-242264, dated Jul. 17, 2015, 6 pages (3 pages English Translation and 3 pages of Official Copy).
Non-Final Office Action received for U.S. Appl. No. 14/142,669, dated Oct. 28, 2015, 14 pages.
Notice of Allowance received for Korean Patent Application No. 10-2014-7004771, dated Oct. 29, 2015, 3 pages (1 page of English Translation and 2 pages of Official Copy).
Office Action received for Taiwan Patent Application No. 103136545, dated Nov. 2, 2015, 24 pages (Official Copy only). (See Communication under 37 CFR § 1.98(a) (3)).
Notice of Allowance received for U.S. Appl. No. 14/479,088, dated Nov. 12, 2015, 7 pages.
Extended European Search Report (includes Partial European Search Report and European Search Opinion) received for European Patent Application No. 15168475.0, dated Oct. 21, 2015, 6 pages.
Examiner's Pre-Review Report received for Japanese Patent Application No. 2013-098406, dated Oct. 8, 2015, 7 pages (4 pages of English Translation and 3 pages of Official Copy).
Notice of Allowance received for U.S. Appl. No. 14/479,088, dated Dec. 23, 2015, 5 pages.
Notice of Allowance received for U.S. Appl. No. 14/640,020, dated Dec. 15, 2015, 7 pages.
Notice of Allowance received for U.S. Appl. No. 14/873,023, dated Dec. 23, 2015, 10 pages.

(56) References Cited

OTHER PUBLICATIONS

Notice of Allowance received for Korean Patent Application No. 10-2014-7025441, dated Feb. 26, 2016, 3 pages (1 page English Translation and 2 pages of Official Copy).
Notice of Allowance received for Korean Patent Application No. 10-2015-7004548, dated Feb. 26, 2016, 3 pages (1 page English Translation and 2 pages of Official Copy).
Examination Report received for Australian Patent Application No. 2015202397, dated Feb. 29, 2016, 4 pages.
Office Action received for Japanese Patent Application No. 2013-145795, dated Mar. 4, 2016, 8 pages (4 pages of English Translation and 4 pages of Official Copy).
Notice of Allowance received for U.S. Appl. No. 14/479,088, dated Mar. 9, 2016, 2 pages.
Office Action received for Australian Patent Application No. 2014204462, dated Apr. 29, 2016, 3 pages.
Office Action Received for European Patent Application No. 13171145.9, dated Apr. 28, 2016, 5 pages.
Notice of Allowance received for U.S. Appl. No. 14/142,669, dated Jun. 14, 2016, 5 pages.
Notice of allowance received for U.S. Appl. No. 15/017,436, dated May 27, 2016, 17 pages.
Office Action received for Japanese Patent Application No. 2015-083696, dated Jun. 17, 2016, 12 pages (7 pages of English Translation and 5 pages of Official Copy).
Office Action received for Korean Patent Application No. 10-2015-7010262, dated May 24, 2016, 10 pages (3 pages of English Translation and 7 pages of Official Copy).
Office Action received for Taiwan Patent Application No. 103136545, dated May 25, 2016, 7 pages (3 pages of English Translation and 4 pages of Official Copy).
Office Action received for Japanese Patent Application No. 2014-242264, dated May 9, 2016, 10 pages (5 pages of English Translation and 5 pages of Official Copy).
Office Action received for Australian Patent Application No. 2012200716, dated Nov. 15, 2013, 3 pages.
Office Action received for Australian Patent Application No. 2013262488, dated Aug. 28, 2015, 5 pages.
Office Action received for Japanese Patent Application No. 2015-512913, dated Feb. 26, 2016, 8 pages (5 pages of English Translation and 3 pages of Official Copy).
Office Action received for Korean Patent Application No. 10-2014-7035557, dated Feb. 16, 2016, 10 pages (4 pages of English Translation and 6 pages of Official Copy).
Third Party Observations received for European Patent Application No. 15168475.0, dated Jul. 19, 2016, 4 pages.
Office Action received for Japanese Patent Application No. 2013-098406, dated Jul. 19, 2016, 10 pages (5 pages of English Translation and 5 pages of Official Copy).
Corrected Notice of Allowance received for U.S. Appl. No. 15/017,436, dated Sep. 2, 2016, 5 pages.
Notice of Allowance received for Japanese Patent Application No. 2015-512913, dated Sep. 9, 2016, 3 pages (Official Copy only). {See Certification under 37 CFR § 1.98(a) (3)}.
Notice of Allowance received for U.S. Appl. No. 14/142,669, dated Aug. 25, 2016, 2 pages.
Notice of Allowance received for U.S. Appl. No. 14/142,669, dated Sep. 21, 2016, 2 pages.
Notice of Allowance received for Korean Patent Application No. 10-2014-7035557, dated Dec. 21, 2016, 6 pages (2 pages of English Translation and 4 pages of Official Copy).
Office Action received for Chinese Patent Application No. 201410407626.4, dated Oct. 31, 2016, 10 pages (4 pages of English Translation and 6 pages of Official Copy).
Office Action received for European Patent Application No. 15168475.0, dated Dec. 19, 2016, 5 pages.
Notice of Allowance received for Japanese Patent Application dated Jan. 23, 2017, 18 Pages (Official Copy only). {See Communication under 37 CFR § 1.98(a) (3)}.
Notice of Allowance received for Japanese Patent Application No. 2015-083696, dated Jan. 6, 2017, 3 pages (Official Copy only). {See Communication under 37 CFR § 1.98(a) (3)}.
Office Action received for Australian Patent Application No. 2016203898, dated Feb. 17, 2017, 3 Pages.
Office Action received for Australian Patent Application No. 2016203896, dated Mar. 6, 2017, 3 pages.
Notice of Allowance received for Australian Patent Application No. 2015202397, dated Feb. 15, 2017, 3 pages.
Office Action received for Japanese Patent Application No. 2014-242264, dated Feb. 24, 2017, 14 pages (7 pages of English Translation and 7 pages of Official Copy).
Office Action received for Korean Patent Application No. 10-2015-7010262, dated Mar. 8, 2017, 6 pages (3 pages of English Translation and 3 pages of Official Copy).
Notice of Allowance received for Japanese Patent Application No. 2017-013383, dated Mar. 31, 2017, 3 Pages (Official Copy only). {See Communication under 37 CFR § 1.98(a) (3)}.
Office Action received for Japanese Patent Application No 2013-145795, dated Apr. 14, 2017, 18 pages (3 pages of English Transtation and 15 pages of Official Copy).
Office Action received for Japanese Patent Application No. 2006-533547, dated Mar. 5, 2012, 13 pages (Official Copy only)(See Communication under 37 CFR § 1.98(a) (3)).
Notice of Acceptance received for Australian Patent Application No. 2008305338, dated Oct. 27, 2011, 1 page.
Office Action received for Australian Patent Application No. 2008305338, dated Mar. 21, 2011, 3 pages.
Office Action received for Australian Patent Application No. 2008305338, dated Oct. 19, 2010, 3 pages.
Notice of Allowance received for Chinese Patent Application No. 200880108306.1, dated Oct. 28, 2014, 2 pages (Official Copy only)(See Communication under 37 CFR § 1.98(a) (3)).
Office Action received for Chinese Patent Application No. 200880108306.1 , dated Aug. 24, 2011, 10 pages (English Translation only).
Office Action received for Chinese Patent Application No. 200880108306.1 , dated Mar. 20, 2012, 8 pages (English Translation only).
Office Action received for Chinese Patent Application No. 200880108306.1, dated Aug. 9, 2012, 13 pages (English Translation only).
Office Action received for Chinese Patent Application No. 200880108306.1, dated Jan. 15, 2013, 14 pages (English Translation only).
Office Action received for Chinese Patent Application No. 200880108306.1, dated Mar. 27, 2014, 6 pages (3 pages of English Translation and 3 pages of Office Action).
Office Action received for Japanese Patent Application No. 2010-525891, dated Jan. 8, 2013, 4 pages (English Translation only).
Office Action received for Japanese Patent Application No. 2010-525891, dated Jun. 12, 2012, 11 pages (5 pages of English Translation and 6 pages of Official Copy).
Office Action received for Australian Patent Application No. 2012200716, dated Jul. 16, 2014, 4 pages.
Office Action received for Australian Patent Application No. 2012200716, dated Oct. 16, 2012, 4 pages.
Office Action received for Japanese Patent Application No. 2013-098406, dated Dec. 9, 2013, 12 pages (6 pages of English Translation and 6 pages of Official Copy).
Office Action received for Japanese Patent Application No. 2013-098406, dated Dec. 15, 2014, 12 pages (7 pages of English Translation and 5 pages of Official Copy).
Neonode Inc., "Welcome to the N1 Guide", available at <http://www.ebookspdf.com/gadget/2818/neonode-n1m-manual/>, Jul. 2004, pp. 1-42.
neonode.com, "N1 Quick Start Guide", Version 0.5, Apr. 5, 2005, pp. 1-24.
Plaisant et al., "Touchscreen Toggle Switches: Push or slide? Design Issues and Usability Study", Technical Report CAR-TR-521, CS-TR-2557, Nov. 1990, pp. 1-10.

(56) References Cited

OTHER PUBLICATIONS

Tanaka et al., "Innovative Mobile Device of Apple Finally Appeared, Mobile Phone + iPod + Internet Terminal, iPhone", Mac Fan, vol. 15, No. 9, Japan, Mainichi Communications Inc., Sep. 1, 2007, pp. 4-13 (Official Language only).
Decision from Intellectual Property Tribunal received for Korean Patent Application No. 10-2011-7023152, mailed on Feb. 17, 2015, 22 pages (7 pages of English Translation and 15 pages of Official Copy).
Intention to Grant received for European Patent Application No. 12181538.5, dated Feb. 20, 2015, 8 pages.
Russell et al., U.S. Appl. No. 60/474,750, filed May 30, 2003, titled "Secure Biometric Identification Devices and Systems for Various Applications", 87 pages (Copy Not Attached).
International Preliminary Report on Patentability received for PCT Patent Application No. PCT/US2008/075738, completed on Jan. 28, 2010, 15 pages.
International Search Report and Written Opinion received for PCT Patent Application No. PCT/US2008/075738, dated Jul. 2, 2009, 14 pages.
International Preliminary Report on Patentability received for PCT Patent Application No. PCT/US2013/041868, dated Nov. 27, 2014, Nov. 27, 2014, 6 pages.
Office Action received for European Patent Application No. 08834386.8, dated Aug. 23, 2010, 4 pages.
Notice of Allowance received for Taiwan Patent Application No. 097134592, dated Aug. 12, 2014, 3 pages (Official Copy only)(See Communication under 37 CFR § 1.98(a) (3)).
Office Action received for Taiwanese Patent Application No. 097134592, dated Apr. 12, 2013, 8 pages (English Translation only).
Notice of Allowance received for Taiwan Patent Application No. 101107082, dated Oct. 22, 2014, 2 pages (Official Copy only)(See Communication under 37 CFR § 1.98(a) (3)).
Office Action received for Taiwan Patent Application No. 101107082, dated Jul. 7, 2014, 21 pages (7 pages of English Translation and 14 pages of Official Copy).
Office Action received for Korean Patent Application No. 10-2010-7008899, dated Aug. 17, 2014, 7 pages (3 pages of English Translation and 4 pages of Official copy).
Office Action received for Korean Patent Application No. 10-2010-7008899, dated Feb. 3, 2015, 7 pages (3 pages of English Translation and 4 pages of Official Copy).
Office Action received for Korean Patent Application No. 10-2010-7008899, dated Jan. 28, 2013, 5 pages (2 pages of English Translation and 3 pages of Official Copy).
Office Action received for Korean Patent Application No. 10-2010-7008899, dated Mar. 29, 2012, 6 pages (2 pages of English Translation and 4 pages of Official Copy).
Office Action received for Korean Patent Application No. 10-2010-7008899, dated May 30, 2011, 4 pages (2 pages of English Translation and 2 pages of Official copy).
Office Action received for Korean Patent Application No. 10-2011-7023152, dated Apr. 22, 2014, 6 pages (3 pages of English Translation and 3 pages of Official copy).
Office Action received for Korean Patent Application No. 10-2011-7023152, dated Sep. 23, 2013, Sep. 23, 2013, 4 pages (English Translation only).
Office Action received for Korean Patent Application No. 10-2014-7004771, dated Apr. 22, 2014, 5 pages (2 pages of English Translation and 3 pages of Official copy).
Office Action received for Korean Patent Application No. 10-2014-7004771, dated Oct. 21, 2014, 7 pages (3 pages of English Translation and 4 pages of Official copy).
Final Office Action received for Korean Patent Application No. 10-2014-7004772, dated Oct. 21, 2014, 5 pages (2 pages of English Translation and 3 pages of official copy).
Office Action received for Korean Patent Application No. 10-2014-7004772, dated Apr. 22, 2014, 8 pages (3 pages of English translation and 5 pages of Official Copy).
Office Action received for Korean Patent Application No. 10-2014-7004773, dated Apr. 22, 2014, 9 pages (4 pages of English Translation and 5 pages of Office Action).
Office Action received for Korean Patent Application No. 10-2014-7004773, dated Oct. 21, 2014, 9 pages (4 pages of English Translation and 5 pages of Official Copy).
Office Action received for Korean Patent Application No. 10-2014-7025441, dated Oct. 21, 2014, 5 pages (2 pages of English Translation and 3 pages of official copy).
Advisory Action received for U.S. Appl. No. 12/207,374, dated Feb. 25, 2013, 3 pages.
Advisory Action received for U.S. Appl. No. 12/207,374, dated May 15, 2014, 3 pages.
Final Office Action received for U.S. Appl. No. 12/207,374, dated Jan. 31, 2014, 12 pages.
Final Office Action received for U.S. Appl. No. 12/207,374, dated Nov. 6, 2012, 25 pages.
Final Office Action received for U.S. Appl. No. 12/207,374, dated Oct. 21, 2011, 16 pages.
Non Final Office Action received for U.S. Appl. No. 12/207,374, dated Apr. 15, 2011, 13 pages.
Non Final Office Action received for U.S. Appl. No. 12/207,374, dated May 24, 2012, 20 pages.
Notice of Allowance received for U.S. Appl. No. 12/207,374, dated Aug. 29, 2014, 8 pages.
Notice of Allowance received for U.S. Appl. No. 12/207,374, dated Dec. 4, 2014, 8 pages.
Extended European Search Report received for European Patent Application No. 12181538.5, dated Oct. 23, 2012, 6 pages.
Office Action received for European Patent Application No. 12181538.5, dated Dec. 16, 2013, 4 pages.
Extended European Search Report (includes Partial European Search Report and European Search Opinion) received for European Patent Application No. 13171145.9, dated Feb. 5, 2014, 6 pages.
Notice of Allowance received for U.S. Appl. No. 14/142,657, dated Jan. 8, 2015, 5 pages.
Notice of Allowance received for U.S. Appl. No. 14/142,657, dated Sep. 10, 2014, 9 pages.
Non-Final Office Action received for U.S. Appl. No. 14/142,669, dated Sep. 12, 2014, 11 pages.
Notice of Allowance received for U.S. Appl. No. 14/142,674, dated Feb. 18, 2015, 7 pages.
Notice of Allowance received for U.S. Appl. No. 14/142,674, dated Jan. 23, 2015, 7 pages.
Notice of Allowance received for U.S. Appl. No. 14/142,674, dated Sep. 26, 2014, 18 pages.
Notice of Allowance received for U.S. Appl. No. 14/255,765, dated Jun. 12, 2014, 10 pages.
Advisory Action received for U.S. Appl. No. 14/311,214, dated Feb. 10, 2015, 4 pages.
Final Office Action received for U.S. Appl. No. 14/311,214, dated Jan. 8, 2015, 12 pages.
Non-Final Office Action received for U.S. Appl. No. 14/311,214, dated Sep. 18, 2014, 10 pages.
Final Office Action received for U.S. Appl. No. 14/479,088, dated Mar. 11, 2015, 10 pages.
Non-Final Office Action received for U.S. Appl. No. 14/479,088, dated Nov. 18, 2014, 8 pages.
Office Action received for Canadian Patent Application No. 2,527,829, dated Apr. 29, 2013, 3 pages.
Office Action received for Canadian Patent Application No. 2,527,829, dated Jun. 1, 2011, 3 pages.
Office Action received for Canadian Patent Application No. 2,527,829, dated May 7, 2012, 4 pages.
Office Action received for Japanese Patent Application No. 2006-533547, dated Mar. 22, 2011, 2 pages (English Translation Only).
"Windows Mobile Protege G500/G900", 2007, 4 pages.
Office Action received for Canadian Patent Application No. 2,527,829, dated Apr. 1, 2010, 4 pages.
Office Action received for Canadian Patent Application No. 2,527,829, dated Apr. 16, 2014, 3 pages.
Office Action received for Chinese Patent Application No. 200880108306.1, dated Sep. 5, 2013, 31 pages.

(56) References Cited

OTHER PUBLICATIONS

European Search Report received for European Patent Application No. 04753978.8, dated Feb. 22, 2010, 3 pages.
Office Action received for European Patent Application No. 04753978.8, dated Jan. 31, 2013, 6 pages.
Office Action received for European Patent Application No. 04753978.8, dated Mar. 27, 2012, 7 pages.
Summons to Attend Oral Proceedings received for European Patent Application No. 04753978.8, dated Jul. 3, 2014, 8 pages.
Office Action received for Japanese Patent Application No. 2006-533547, dated Aug. 14, 2008, 1 page (English Translation only).
Office Action received for Japanese Patent Application No. 2006-533547, dated Nov. 25, 2009, 3 pages (English Translation only).
Office Action received for Japanese Patent Application No. 2013-145795, dated Jun. 13, 2014, 6 pages (3 pages of English Translation and 3 pages of Official Copy).
International Search Report and Written Opinion received for PCT Patent Application No. PCT/US2004/017270, dated Dec. 1, 2004, 6 pages.
International Preliminary Report on Patentability received for PCT Patent Application No. PCT/US2004/017270, dated Jul. 23, 2013, 3 pages.
Non-Final Office Action received for U.S. Appl. No. 10/858,290, dated Nov. 24, 2004, 10 pages.
Final Office Action received for U.S. Appl. No. 10/997,291, dated Jan. 2, 2008, 5 pages.
Non-Final Office Action received for U.S. Appl. No. 10/997,291, dated Jul. 28, 2005, 6 pages.
Notice of Allowance received for U.S. Appl. No. 10/997,291, dated Jun. 27, 2008, 16 pages.
Non-Final Office Action received for U.S. Appl. No. 12/201,568, dated Oct. 2, 2008, 6 pages.
Notice of Allowance received for U.S. Appl. No. 12/201,568, dated Dec. 17, 2008, 6 pages.
Non Final Office Action received for U.S. Appl. No. 12/207,374, dated Jun. 7, 2013, 26 pages.
Non-Final Office Action received for U.S. Appl. No. 12/430,702, dated Jun. 24, 2009, 6 pages.
Notice of Allowance received for U.S. Appl. No. 12/430,702, dated Nov. 16, 2009, 6 pages.
Notice of Allowance received for U.S. Appl. No. 12/604,814, dated Apr. 26, 2010, 4 pages.
Notice of Allowance received for U.S. Appl. No. 12/604,814, dated Aug. 5, 2010, 4 pages.
Notice of Allowance received for U.S. Appl. No. 12/604,814, dated Nov. 12, 2010, 4 pages.
Final Office Action received for U.S. Appl. No. 12/732,946, dated Oct. 9, 2014, 34 pages.
Non-Final Office Action received for U.S. Appl. No. 12/732,946, dated Oct. 17, 2013, 25 pages.
Chang et al., "Fingerprint Spoof Detection Using Near Infrared Optical Analysis", State of the Art in Biometrics, Department of Biomedical Engineering, University of Houston, 2011, 29 pages.
Chen, YL, "Unlock Smartphone with a Quick Palm Scan", available at <http://www.psfk.com/2012/10/unlock-smartphone-palm-scan.html#!Nlyhq>, Oct. 4, 2012, 10 pages.
Idapps, "BioPhotos and BioSecrets", available at <http://www.idapps.com/index>, retrieved on Jan. 2011, 6 pages.
Redfly, "ScreenSlider", available at <https://play.google.com/store/apps/details?id=com.avatron.airdisplay&feature-nay_result#?t-W10>, updated on Jan. 10, 2012, 2 pages.
Sepasian et al., "Vitality Detection in Fingerprint Identification", Journal of WSEAS Transactions on Information Science and Applications, vol. 7, No. 4, Apr. 2010, pp. 498-507.
Avatron Software "Air Display", available at <https://play.google.com/store/apps/details?id=com.avatron.airdisplay&feature-nay_result>, updated on Dec. 26, 2013, 2 pages.
Shape, "iDisplay", available at <https://play.google.com/store/apps/details?id=com.idisplay.virtualscreen&feature=relatedapps>, updated on Dec. 27, 2012, 2 pages.
Sugiura et al., "A User Interface Using Fingerprint Recognition: Holding Commands and Data Objects on Fingers", UIST'98 Proceedings of the 11th Annual ACM Symposium on User Interface Software and Technology, Nov. 1998, pp. 71-79.
Tokyo University, "Pinch: An Interface to Connect Displays Dynamically", Tokyo University of Technology School of Media, available at <http://www2.teu.ac.jp/media/~takashi/cmdeng/CmdEng/Pinch.html>, retrieved on Jan. 2013, 1 page.
Uchida, K., "Fingerprint-Based Personal Identification Technology and its Application", NEC, vol. 55, No. 3, 2002, 7 pages.
Uchida, K., "Fingerprint-Based User Identification Using a Handy Mobile Terminal for Authentication and Enhanced User Interface", Technical Report of IEICE, PRMU, vol. 99, No. 118, Aug. 1999, 7 pages.
Uchida, K., "Fingerprint-Based User-Friendly Interface and Pocket-PID for Mobile Authentication", Proceedings of 15th International Conference on Pattern Recognition, Sep. 2000, pp. 205-209.
Examiner Interview Summary received for U.S. Appl. No. 12/732,946, dated Jan. 26, 2015, 4 pages.
Notice of Allowance received for Korean Patent Application No. 10-2010-7008899, dated Feb. 12, 2016, 3 pages (1 page of English Translation and 2 pages of official copy).
Notice of Allowance received for Korean Patent Application No. 10-2014-7004772, dated Feb. 12, 2016, 4 pages (1 page of English Translation and 3 pages of Official Copy).
Notice of Allowance received for Korean Patent Application No. 10-2014-7004773, dated Jan. 7, 2016, 3 pages (1 page of English Translation and 2 pages of Official Copy).
Notice of Allowance received for U.S. Appl. No. 14/142,661, dated Dec. 3, 2015, 2 pages.
Notice of Allowance received for U.S. Appl. No. 14/311,214, dated Jan. 21, 2016, 7 pages.
Notice of Allowance received for U.S. Appl. No. 14/479,088, dated Jan. 11, 2016, 2 pages.
Notice of Allowance received for U.S. Appl. No. 14/873,023, dated Jan. 14, 2016, 2 pages.
Notice of Allowance received for Canadian Patent Application No. 2,527,829, dated Feb. 1, 2016, 1 page.
Non-Final Office Action received for U.S. Appl. No. 15/470,752, dated Jul. 28, 2017, 11 pages.
Office Action received for Australian Patent Application No. 2016219716, dated Jun. 9, 2017, 3 Pages.
Office Action received for Korean Patent Application No. 10-2017-7015582, dated Jun. 12, 2017, 9 pages (4 pages of English Translation and 5 pages of Official copy).
Notice of Allowance received for U.S. Appl. No. 15/357,873, dated Aug. 23, 2017, 10 pages.
Office Action received for Japanese Patent Application No. 2016-199379, dated Aug. 25, 2017, 9 pages (4 pages of English Translation and 5 pages of Official Copy).
Corrected Notice of Allowance received for U.S. Appl. No. 15/357,873, dated Jan. 19, 2018, 2 pages.
Notice of Allowance received for U.S. Appl. No. 15/357,873, dated Jan. 8, 2018, 9 pages.
Office Action received for Australian Patent Application No. 2016203896, dated Jan. 19, 2018, 4 pages.
Office Action received for Chinese Patent Application No. 201410407626.4, dated Sep. 11, 2017, 11 pages (3 pages of English Translation and 8 pages of Official Copy).
Notice of Allowance received for Taiwanese Patent Application No. 103136545, dated Nov. 27, 2017, 4 pages (1 page of English Translation of Search Report and 3 pages of Official Copy).
Office Action received for Australian Patent Application No. 2016203898, dated Dec. 19, 2017, 4 pages.
Office Action received for Australian Patent Application No. 2016219716, dated May 10, 2018, 4 pages.
Non-Final Office Action received for U.S. Appl. No. 15/470,752, dated Aug. 28, 2018, 12 pages.
Notice of Allowance received for Japanese Patent Application No. 2016-199379, dated May 25, 2018, 4 pages (1 page of English Translation and 3 pages of Official copy).
Office Action received for Australian Patent Application No. 2016219716, dated Jun. 7, 2018, 3 pages.

(56) References Cited

OTHER PUBLICATIONS

Corrected Notice of Allowance received for U.S. Appl. No. 15/357,873, dated Mar. 16, 2018, 2 pages.
Final Office Action received for U.S. Appl. No. 15/470,752, dated Mar. 13, 2018, 14 pages.
Notice of Acceptance received for Australian Patent Application No. 2016203896, dated Mar. 2, 2018, 3 Pages.
Notice of Acceptance received for Australian Patent Application No. 2016203898 dated Feb. 21, 2018, 3 pages.
Office Action received for Australian Patent Application No. 2018203732, dated Jun. 21, 2018, 3 pages.
Office Action received for Chinese Patent Application No. 201410407626.4, dated May 21, 2018, 13 pages (4 Page of English Translation and 9 pages of Official Copy).
Office Action Received for European Patent Application No. 13171145.9, dated May 3, 2018, 4 pages.
Office Action received for Japanese Patent Application No. 2017-085582, dated Jul. 2, 2018, 11 pages (6 pages of English Translation and 5 pages of Official Copy).
Office Action received for Korean Patent Application No. 10-2017-7015582, dated Apr. 5, 2018, 8 pages (4 pages of English Translation and 4 pages of Official Copy).
Office Action received for European Patent Application No. 15168475.0, dated Oct. 5, 2018, 4 pages.
Office Action received for Australian Patent Application No. 2018203732, dated Feb. 26, 2019, 5 pages.
Office Action received for Australian Patent Application No. 2018204174, dated Feb. 27, 2019, 8 pages.
Office Action received for Chinese Patent Application No. 201410407626.4, dated Feb. 12, 2019, 13 pages (3 Pages of English Translation and 10 pages of Official Copy).
Intention to Grant received for European Patent Application No. 131711459, dated Feb. 21, 2019, 8 pages.
Notice of Allowance received for U.S. Appl. No. 15/470,752, dated Feb. 7, 2019, 11 pages.
Office Action received for European Patent Application No. 13726969.2, dated Sep. 6, 2018, 6 pages.
Decision on Appeal received for Korean Patent Application No. 10-2015-7010262, dated Dec. 21, 2018, 16 pages (3 pages of English Translation and 13 pages of Official Copy).
Notice of Allowance received for Korean Patent Application No. 10-2017-7015582, dated Dec. 27, 2018, 5 pages (2 pages of English Translation and 3 pages of Official copy).
Office Action received for Chinese Patent Application No. 201380037829.2, dated Dec. 5, 2018, 14 pages (5 pages of English Translation and 9 pages of Official Copy).
Notice of Allowance received for Japanese Patent Application No. 2017-085582, dated Nov. 30, 2018, 4 pages (1 page of English Translation and 3 pages of Official copy).
Office Action received for Australian Patent Application No. 2018203732, dated Nov. 30, 2018, 3 Pages.
Office Action received for Korean Patent Application No. 10-2018-7028845, dated Dec. 10, 2018, 8 pages (4 pages of English Translation and 4 pages of Official copy).
Office Action received for Chinese Patent Application No. 201380037829.2, dated Jul. 3, 2019, 6 pages (3 pages of English Translation and 3 pages of Official copy).
Office Action received for Japanese Patent Application No. 2018-120019, dated May 17, 2019, 8 pages (4 pages of English Translation and 4 pages of Official Copy).
Office Action received for Japanese Patent Application No. 2019-194603, dated Jan. 4, 2021, 8 pages (4 pages of English Translation and 4 pages of Official Copy).
Notice of Acceptance received for Australian Patent Application No. 2019204387, dated Dec. 4, 2020, 3 pages.
Written Opinion received for PCT Patent Application No. PCT/US2013/041868, dated Nov. 27, 2014, 4 pages.
Decision to Refuse received for European Patent Application No. 13726969.2, dated Feb. 22, 2021, 14 pages.
Notice of Acceptance received for Australian Patent Application No. 2020200397, dated Mar. 1, 2021, 3 pages.
Board Decision received for Chinese Patent Application No. 201410407626.4, mailed on Jun. 8, 2020, 17 pages (1 page of English Translation and 16 pages of Official Copy).
Decision to Grant received for European Patent Application No. 13171145.9, dated Jul. 11, 2019, 2 pages.
Intention to Grant received for European Patent Application No. 15168475.0, dated Feb. 4, 2020, 9 pages.
Notice of Acceptance received for Australian Patent Application No. 2018204174, dated Oct. 24, 2019, 3 pages.
Notice of Allowance received for Chinese Patent Application No. 201380037829.2, dated Dec. 3, 2019, 2 pages (1 page of English Translation and 1 page of Official Copy).
Notice of Allowance received for Chinese Patent Application No. 201410407626.4, dated Aug. 27, 2020, 2 pages (1 page of English Translation and 1 page of Official Copy).
Notice of Allowance received for Japanese Patent Application No. 2018-241505, dated Oct. 4, 2019, 4 pages (1 page of English Translation and 3 pages of Official Copy).
Notice of Allowance received for Korean Patent Application No. 10-2018-7028845, dated Apr. 16, 2020, 5 pages (2 pages of English Translation and 3 pages of Official Copy).
Office Action received for Australian Patent Application No. 2018203732, dated Jun. 6, 2019, 4 pages.
Office Action received for Australian Patent Application No. 2019204387, dated Jun. 17, 2020, 7 pages.
Office Action received for Australian Patent Application No. 2020200397, dated Aug. 28, 2020, 10 pages.
Office Action received for Brazilian Patent Application No. BR112014028774-0, dated Jan. 3, 2020, 6 pages (1 page of English Translation and 5 pages of Official Copy).
Office Action received for Chinese Patent Application No. 201710198190.6, dated Oct. 12, 2020, 18 pages (6 pages of English Translation and 12 pages of Official Copy).
Office Action received for Chinese Patent Application No. 201710198190.6, dated Sep. 25, 2019, 27 pages (12 pages of English Translation and 15 pages of Official Copy).
Office Action received for European Patent Application No. 15168475.0, dated May 6, 2020, 5 pages.
Office Action received for Japanese Patent Application No. 2018-120019, dated Apr. 6, 2020, 8 pages (4 pages of English Translation and 4 pages of Official Copy).
Office Action received for Korean Patent Application No. 10-2018-7028845, dated Jun. 19, 2019, 7 pages (3 pages of English Translation and 4 pages of Official Copy).
Office Action received for Korean Patent Application No. 10-2020-7020782, dated Aug. 19, 2020, 8 pages (4 pages of English Translation and 4 pages of Official Copy).
Summons to Attend Oral Proceedings received for European Patent Application No. 137269692, mailed on Jul. 14, 2020, 8 pages.
Brief Communication Regarding Oral Proceedings received for European Patent Application No. 13726969.2, dated Nov. 23, 2020, 8 pages.
Intention to Grant received for European Patent Application No. 15168475.0, dated Jan. 22, 2021, 8 pages.
Office Action received for Chinese Patent Application No. 202010079275.4, dated Dec. 3, 2020, 12 pages (6 pages of English Translation and 6 pages of Official Copy).
Notice of Allowance received for Chinese Patent Application No. 202010079275.4, dated Mar. 30, 2021, 2 pages (1 page of English Translation and 1 page of Official Copy).
Office Action received for Japanese Patent Application No. 2020-128391, dated Jul. 26, 2021, 6 pages (3 pages of English Translation and 3 pages of Official Copy).

* cited by examiner

Figure 9B:
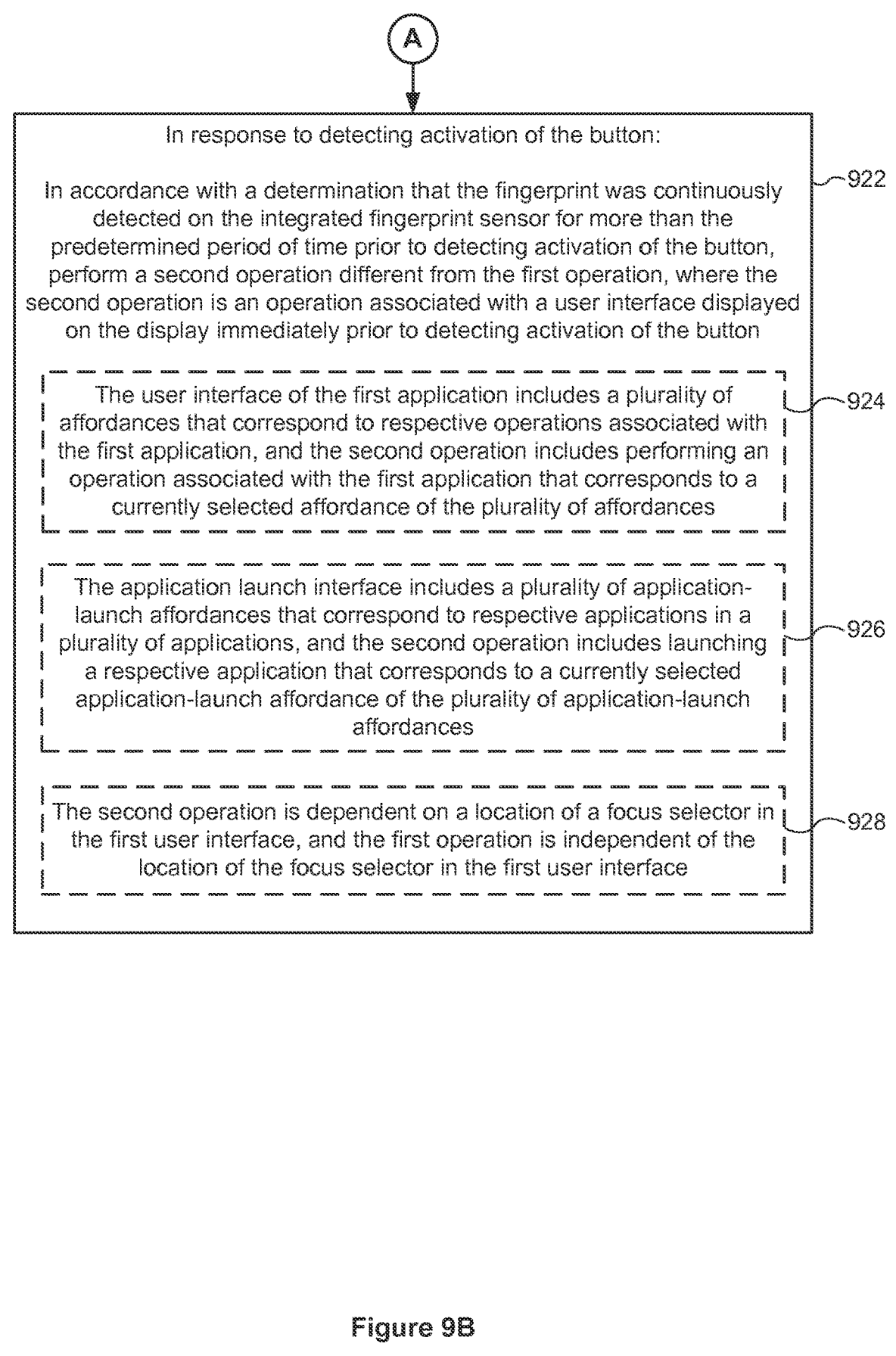

A

In response to detecting activation of the button:

In accordance with a determination that the fingerprint was continuously detected on the integrated fingerprint sensor for more than the predetermined period of time prior to detecting activation of the button, perform a second operation different from the first operation, where the second operation is an operation associated with a user interface displayed on the display immediately prior to detecting activation of the button 922

The user interface of the first application includes a plurality of affordances that correspond to respective operations associated with the first application, and the second operation includes performing an operation associated with the first application that corresponds to a currently selected affordance of the plurality of affordances 924

The application launch interface includes a plurality of application-launch affordances that correspond to respective applications in a plurality of applications, and the second operation includes launching a respective application that corresponds to a currently selected application-launch affordance of the plurality of application-launch affordances 926

The second operation is dependent on a location of a focus selector in the first user interface, and the first operation is independent of the location of the focus selector in the first user interface 928

Figure 20E
Portable Multifunction Device
100
206
208
208
Speaker 111
Optical Sensor 164
Proximity Sensor 166
Current Time
Tuesday
30
Messages
424
Calendar
426
Photos
428
Camera
430
Online Video
432
Stocks
434
280
Maps
436
73°
Weather
438
Welcome, Guest User!
App Store
iTunes
Voice Memos
Utilities
2010
Phone
Mail
Browser
iPod
Touch Screen 112
Microphone 113
169
Accelerometer(s) 168
204

Figure 21B:
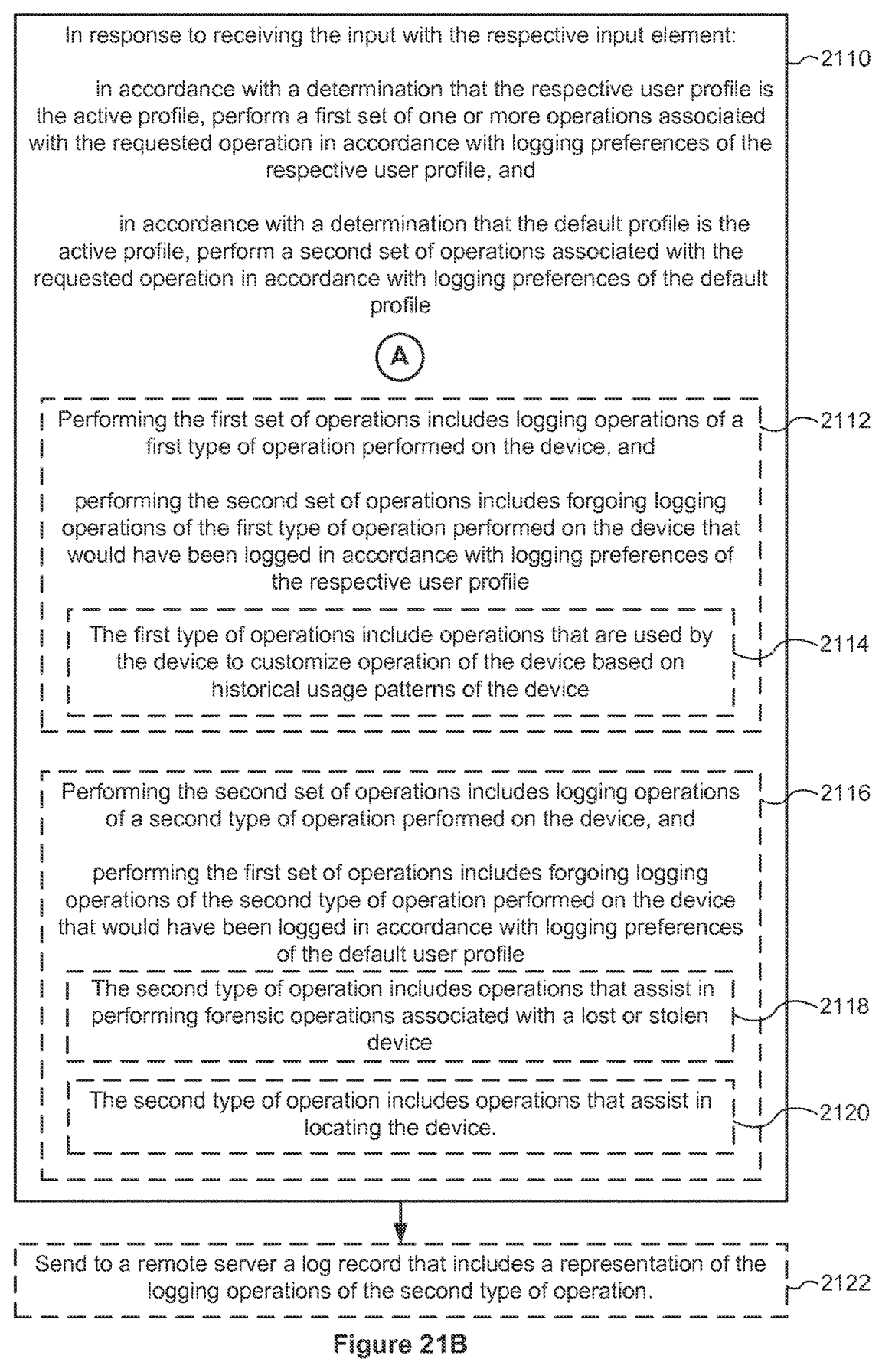

In response to receiving the input with the respective input element:

in accordance with a determination that the respective user profile is the active profile, perform a first set of one or more operations associated with the requested operation in accordance with logging preferences of the respective user profile, and in accordance with a determination that the default profile is the active profile, perform a second set of operations associated with the requested operation in accordance with logging preferences of the default profile

2110

(A)

Performing the first set of operations includes logging operations of a first type of operation performed on the device, and performing the second set of operations includes forgoing logging operations of the first type of operation performed on the device that would have been logged in accordance with logging preferences of the respective user profile

2112

The first type of operations include operations that are used by the device to customize operation of the device based on historical usage patterns of the device

2114

Performing the second set of operations includes logging operations of a second type of operation performed on the device, and performing the first set of operations includes forgoing logging operations of the second type of operation performed on the device that would have been logged in accordance with logging preferences of the default user profile

2116

The second type of operation includes operations that assist in performing forensic operations associated with a lost or stolen device

2118

The second type of operation includes operations that assist in locating the device.

2120

Send to a remote server a log record that includes a representation of the logging operations of the second type of operation.

Figure 23B
Portable Multifunction Device
100
Speaker 111
Optical Sensor 164
Proximity Sensor 166
400
402
Current Time 404
406
Tuesday
30
Messages
424
Calendar
426
Photos
428
Camera
430
Dungeon Crawl
RI
Big Bank
Settings
446
Gaming
2310
Banking
2312
2302
73°
Weather
438
N
W
S
Phone 416
Mail 418
Browser 420
iPod 422
408
Touch Screen 112
Microphone
113
169
Accelerometer(s)
168
204

Figure 39B:
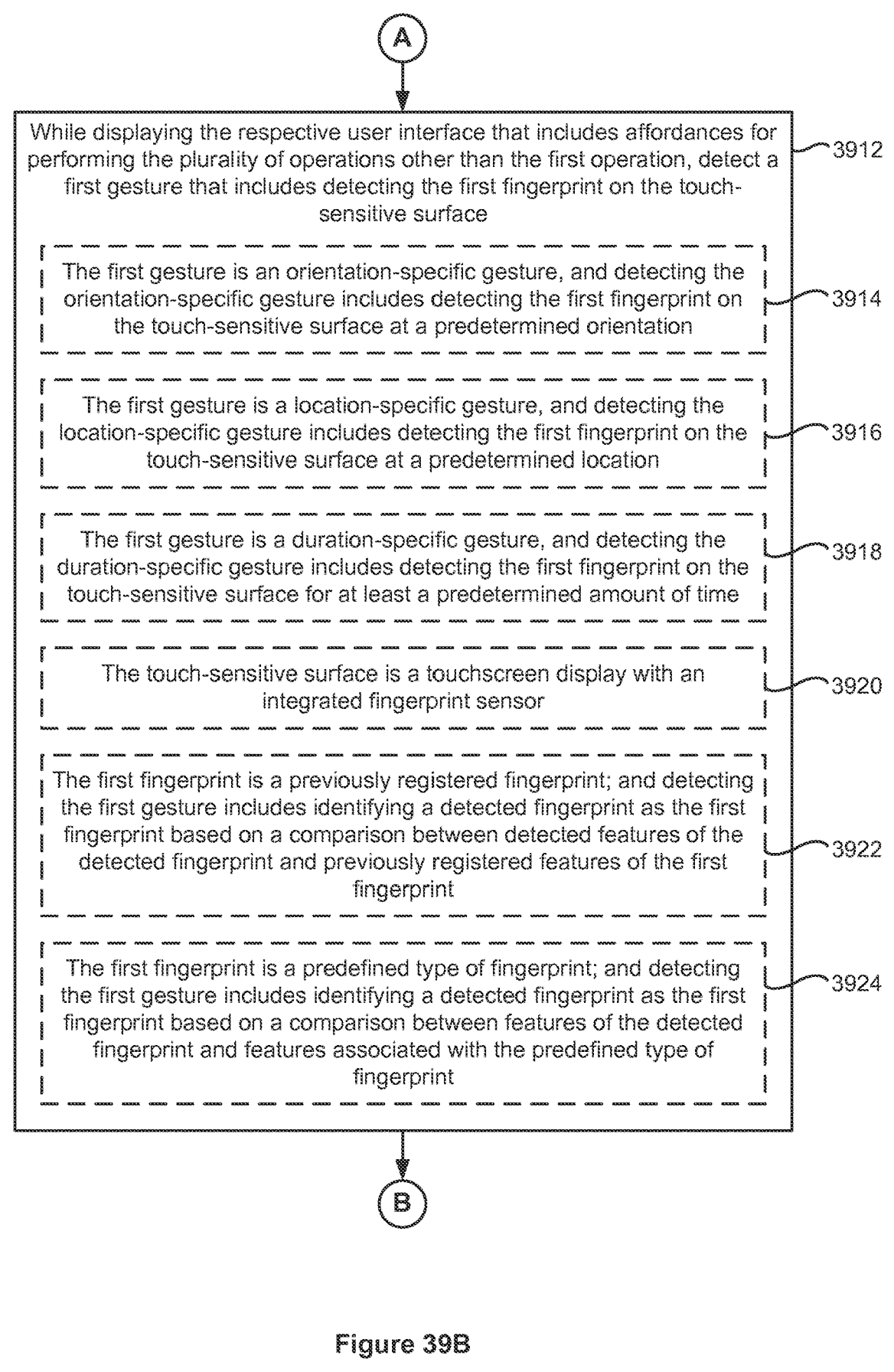

While displaying the respective user interface that includes affordances for performing the plurality of operations other than the first operation, detect a first gesture that includes detecting the first fingerprint on the touch-sensitive surface 3912

The first gesture is an orientation-specific gesture, and detecting the orientation-specific gesture includes detecting the first fingerprint on the touch-sensitive surface at a predetermined orientation 3914

The first gesture is a location-specific gesture, and detecting the location-specific gesture includes detecting the first fingerprint on the touch-sensitive surface at a predetermined location 3916

The first gesture is a duration-specific gesture, and detecting the duration-specific gesture includes detecting the first fingerprint on the touch-sensitive surface for at least a predetermined amount of time 3918

The touch-sensitive surface is a touchscreen display with an integrated fingerprint sensor 3920

The first fingerprint is a previously registered fingerprint; and detecting the first gesture includes identifying a detected fingerprint as the first fingerprint based on a comparison between detected features of the detected fingerprint and previously registered features of the first fingerprint 3922

The first fingerprint is a predefined type of fingerprint; and detecting the first gesture includes identifying a detected fingerprint as the first fingerprint based on a comparison between features of the detected fingerprint and features associated with the predefined type of fingerprint 3924

DEVICE, METHOD, AND GRAPHICAL USER INTERFACE FOR MANIPULATING USER INTERFACES BASED ON FINGERPRINT SENSOR INPUTS

RELATED APPLICATIONS

This application is a national phase application under 35 U.S.C. § 371 of International Application No. PCT/US2013/041868, "Device, Method, and Graphical User Interface for Manipulating User Interfaces Based on Fingerprint Sensor Inputs," filed May 20, 2013, which claims priority to U.S. Provisional Patent Application Ser. No. 61/794,710, filed on Mar. 15, 2013, entitled "Device, Method, and Graphical User Interface for Manipulating User Interfaces Based on Fingerprint Sensor Inputs;" U.S. Provisional Patent Application No. 61/667,926, filed Jul. 3, 2012, entitled "Device, Method, and Graphical User Interface for Manipulating User Interfaces Based on Fingerprint Sensor Inputs;" and U.S. Provisional Patent Application No. 61/649,207, filed May 18, 2012, entitled "Device, Method, and Graphical User Interface for Manipulating User Interfaces Based on Fingerprint Sensor Inputs," which applications are incorporated by reference herein in their entirety.

TECHNICAL FIELD

This relates generally to electronic devices with fingerprint sensors, including but not limited to electronic devices with fingerprint sensors that detect inputs for manipulating user interfaces.

BACKGROUND

The use of touch-sensitive surfaces as input devices for computers and other electronic computing devices has increased significantly in recent years. Exemplary touch-sensitive surfaces include touch pads and touch screen displays. Such surfaces are widely used to manipulate user interface objects on a display. Additionally, some electronic devices include fingerprint sensors for authenticating users.

Exemplary manipulations include adjusting the position and/or size of one or more user interface objects or activating buttons or opening files/applications represented by user interface objects, as well as associating metadata with one or more user interface objects or otherwise manipulating user interfaces. Exemplary user interface objects include digital images, video, text, icons, control elements such as buttons and other graphics. A user will, in some circumstances, need to perform such manipulations on user interface objects in a file management program (e.g., Finder from Apple Inc. of Cupertino, Calif.), an image management application (e.g., Aperture or iPhoto from Apple Inc. of Cupertino, Calif.), a digital content (e.g., videos and music) management application (e.g., iTunes from Apple Inc. of Cupertino, Calif.), a drawing application, a presentation application (e.g., Keynote from Apple Inc. of Cupertino, Calif.), a word processing application (e.g., Pages from Apple Inc. of Cupertino, Calif.), a website creation application (e.g., iWeb from Apple Inc. of Cupertino, Calif.), a disk authoring application (e.g., iDVD from Apple Inc. of Cupertino, Calif.), or a spreadsheet application (e.g., Numbers from Apple Inc. of Cupertino, Calif.).

But methods for performing these manipulations are cumbersome and inefficient. In addition, these methods take longer than necessary, thereby wasting energy. This latter consideration is particularly important in battery-operated devices.

SUMMARY

Accordingly, there is a need for electronic devices with faster, more efficient methods and interfaces for manipulating user interfaces. Such methods and interfaces optionally complement or replace conventional methods for manipulating user interfaces. Such methods and interfaces reduce the cognitive burden on a user and produce a more efficient human-machine interface. For battery-operated devices, such methods and interfaces conserve power and increase the time between battery charges.

The above deficiencies and other problems associated with user interfaces for electronic devices with touch-sensitive surfaces are reduced or eliminated by the disclosed devices. In some embodiments, the device is a desktop computer. In some embodiments, the device is portable (e.g., a notebook computer, tablet computer, or handheld device). In some embodiments, the device has a touchpad. In some embodiments, the device has a touch-sensitive display (also known as a "touch screen" or "touch screen display"). In some embodiments, the device has a fingerprint sensor. In some embodiments, the device has a graphical user interface (GUI), one or more processors, memory and one or more modules, programs or sets of instructions stored in the memory for performing multiple functions. In some embodiments, the user interacts with the GUI primarily through finger contacts and gestures on the touch-sensitive surface and/or the fingerprint sensor. In some embodiments, the functions optionally include image editing, drawing, presenting, word processing, website creating, disk authoring, spreadsheet making, game playing, telephoning, video conferencing, e-mailing, instant messaging, workout support, digital photographing, digital videoing, web browsing, digital music playing, and/or digital video playing. Executable instructions for performing these functions are, optionally, included in a non-transitory computer readable storage medium or other computer program product configured for execution by one or more processors.

In accordance with some embodiments, an electronic device includes a fingerprint sensor, a display, and/or a touch-sensitive surface, one or more processors, memory, and one or more programs; the one or more programs are stored in the memory and configured to be executed by the one or more processors and the one or more programs include instructions for performing the operations of any of the methods described above. In accordance with some embodiments, a graphical user interface on an electronic device with a fingerprint sensor, a display, optionally a touch-sensitive surface, a memory, and one or more processors to execute one or more programs stored in the memory includes one or more of the elements displayed in any of the methods described above, which are updated in response to inputs, as described in any of the methods described above. In accordance with some embodiments, a computer readable storage medium has stored therein instructions which when executed by an electronic device with a fingerprint sensor and optionally a display and/or, a touch-sensitive surface, cause the device to perform the operations of any of the methods described above. In accordance with some embodiments, an electronic device includes: a fingerprint sensor and optionally, a display and/one or a touch-sensitive surface; and means for performing the operations of any of the methods described above. In accordance with some embodiments, an information processing apparatus, for use in an electronic device with a fingerprint sensor and optionally a display and/or a touch-sensitive surface, includes means for performing the operations of any of the methods described above.

There is a need for electronic devices with faster, more efficient methods and interfaces for conveniently interacting with user interfaces (e.g., for navigating through an application, for switching from one application interface to another or for displaying a multi-tasking user interface) on a portable multi-function device. Such methods and interfaces may complement or replace conventional methods for interacting with user interfaces (e.g., for navigating through an application user interface, switching between application user interfaces or for displaying a multi-tasking user interface). Such methods and interfaces reduce the cognitive burden on a user and produce a more efficient human-machine interface. For battery-operated devices, such methods and interfaces conserve power and increase the time between battery charges.

In accordance with some embodiments, a method is performed at an electronic device with a display and a fingerprint sensor. The method includes: displaying, on the display, a first user interface. The method further includes, while displaying the first user interface on the display, detecting movement of a fingerprint on the fingerprint sensor. The method also includes in response to detecting movement of the fingerprint on the fingerprint sensor: in accordance with a determination that the movement of the fingerprint is in a first direction, navigating through the first user interface; and in accordance with a determination that the movement of the fingerprint is in a second direction different from the first direction, displaying a second user interface different from the first user interface on the display.

In accordance with some embodiments, an electronic device includes a display unit configured to display a first user interface, a fingerprint sensor unit; and a processing unit coupled to the display unit and the fingerprint sensor unit. In some embodiments, the processing unit includes a detecting unit, a navigating unit, a display enabling unit, and a replacing unit. The processing unit is configured to: while displaying the first user interface on the display, detect movement of a fingerprint on the fingerprint sensor; and in response to detecting movement of the fingerprint on the fingerprint sensor: in accordance with a determination that the movement of the fingerprint is in a first direction, navigate through the first user interface; and in accordance with a determination that the movement of the fingerprint is in a second direction different from the first direction, enable display of a second user interface different from the first user interface on the display unit.

Thus, electronic devices with displays, and fingerprint sensors are provided with faster, more efficient methods and interfaces for switching between user interfaces, thereby increasing the effectiveness, efficiency, and user satisfaction with such devices. Such methods and interfaces may complement or replace conventional methods for switching between user interfaces.

There is a need for electronic devices with faster, more efficient methods and interfaces having buttons that serve multiple purposes (e.g., allowing the button, upon activation, to cause the device to perform a first operation or, alternatively, a second operation different from the first, depending on certain criteria). Such methods and interfaces may complement or replace conventional methods for allowing buttons to serve multiple purposes. Such methods and interfaces reduce the cognitive burden on a user and produce a more efficient human-machine interface. For battery-operated devices, such methods and interfaces conserve power and increase the time between battery charges. For portable multifunction devices, such methods and interfaces also conserve valuable physical space on housing of the device, allowing for a larger screen and better user experience.

In accordance with some embodiments, a method is performed at an electronic device with a button including an integrated fingerprint sensor. The method includes: detecting a fingerprint on the integrated fingerprint sensor. The method further includes, while continuing to detect the fingerprint on the integrated fingerprint sensor, detecting activation of the button. The method further includes, in response to detecting activation of the button and in accordance with a determination that the fingerprint was not continuously detected on the integrated fingerprint sensor for more than a predetermined period of time prior to detecting activation of the button, performing a first operation, where the first operation is a predefined operation associated with activation of the button. The method further includes, in response to detecting activation of the button and in accordance with a determination that the fingerprint was continuously detected on the integrated fingerprint sensor for more than the predetermined period of time prior to detecting activation of the button, performing a second operation different from the first operation, where the second operation is an operation associated with a user interface displayed on the display immediately prior to detecting activation of the button.

In accordance with some embodiments, an electronic device includes a button unit with an integrated fingerprint sensor unit; and a processing unit coupled to the button unit. The processing unit is configured to: detect a fingerprint on the integrated fingerprint sensor unit. The processing unit is further configured to: while continuing to detect the fingerprint on the integrated fingerprint sensor unit, detect activation of the button unit. The processing unit is further configured to: in response to detecting activation of the button unit and in accordance with a determination that the fingerprint was not continuously detected on the integrated fingerprint sensor unit for more than a predetermined period of time prior to detecting activation of the button unit, perform a first operation, wherein the first operation is a predefined operation associated with activation of the button unit. The processing unit is further configured to: in response to detecting activation of the button unit and in accordance with a determination that the fingerprint was continuously detected on the integrated fingerprint sensor unit for more than the predetermined period of time prior to detecting activation of the button unit, perform a second operation different from the first operation, wherein the second operation is an operation associated with a user interface displayed on the display unit immediately prior to detecting activation of the button unit.

Thus, electronic devices with buttons with integrated fingerprint sensors are provided with faster, more efficient methods and interfaces for allowing said buttons to serve multiple purposes, thereby increasing the effectiveness, efficiency, and user satisfaction with such devices. Such methods and interfaces may complement or replace conventional methods for allowing buttons to serve multiple purposes.

There is a need for electronic devices with faster, more efficient methods and interfaces for locking an orientation of a user interface. Such methods and interfaces may complement or replace conventional methods for locking an orientation of a user interface. Such methods and interfaces reduce the cognitive burden on a user and produce a more efficient human-machine interface. For battery-operated devices, such methods and interfaces conserve power and increase the time between battery charges.

In accordance with some embodiments, a method is performed at an electronic device with a display and a fingerprint sensor. The method includes: displaying a user interface on the display, where the user interface has a first orientation-specific mode of operation associated with a first orientation of the device and a second orientation-specific mode of operation that is associated with a second orientation of the device that is different from the first orientation of the device; while the orientation of the user interface is not locked, displaying the user interface in the first orientation-specific mode of operation when the device is in the first orientation, and displaying the user interface in the second orientation-specific mode of operation when the device is in the second orientation; detecting a fingerprint on the fingerprint sensor; while the user interface is in the first orientation-specific mode of operation, detecting rotation of the fingerprint on the fingerprint sensor in a first direction; in response to detecting rotation of the fingerprint on the fingerprint sensor in the first direction, locking the user interface in the first orientation-specific mode of operation; and while the user interface is locked in the first orientation-specific mode of operation, detecting that the device is in the second orientation and maintaining the user interface in the first orientation-specific mode of operation.

In accordance with some embodiments, an electronic device includes a display unit configured to display a user interface, where the user interface has a first orientation-specific mode of operation associated with a first orientation of the device and a second orientation-specific mode of operation that is associated with a second orientation of the device that is different from the first orientation of the device, a fingerprint sensor unit; and a processing unit coupled to the display unit and the fingerprint sensor unit. The processing unit is configured to: while the orientation of the user interface is not locked: enable display of the user interface in the first orientation-specific mode of operation when the device is in the first orientation, and enable display of the user interface in the second orientation-specific mode of operation when the device is in the second orientation; detect a fingerprint on the fingerprint sensor unit; while the user interface is in the first orientation-specific mode of operation, detect rotation of the fingerprint on the fingerprint sensor unit in a first direction; in response to detecting rotation of the fingerprint on the fingerprint sensor unit in the first direction, lock the user interface in the first orientation-specific mode of operation; and while the user interface is locked in the first orientation-specific mode of operation, detect that the device is in the second orientation and maintain the user interface in the first orientation-specific mode of operation.

Thus, electronic devices with displays and fingerprint sensors are provided with faster, more efficient methods and interfaces for locking an orientation of user interface, thereby increasing the effectiveness, efficiency, and user satisfaction with such devices. Such methods and interfaces may complement or replace conventional methods for locking an orientation of user interface.

There is a need for electronic devices with faster, more efficient methods and interfaces for controlling noise reduction in recorded audio with a fingerprint sensor. Such methods and interfaces may complement or replace conventional methods for controlling noise reduction in recorded audio with a fingerprint sensor. Such methods and interfaces reduce the cognitive burden on a user and produce a more efficient human-machine interface. For battery-operated devices, such methods and interfaces conserve power and increase the time between battery charges.

In accordance with some embodiments, a method is performed at an electronic device with a fingerprint sensor. The method includes recording media with the device, where recording the media includes recording audio. The method further includes, while recording the media, reducing, in the recorded audio, noise occurring on a first side of the device, detecting a fingerprint on the fingerprint sensor and, in response to detecting the fingerprint on the fingerprint sensor, ceasing to reduce noise occurring on the first side of the device.

In accordance with some embodiments, an electronic device includes a fingerprint sensor unit configured to detect fingerprints and a processing unit coupled to the fingerprint sensor unit. The processing unit is configured to record media with the device, where recording the media includes recording audio. The processing unit is further configured to, while recording the media, reduce, in the recorded audio, noise occurring on a first side of the device, detect a fingerprint on the fingerprint sensor unit, and, in response to detecting the fingerprint on the fingerprint sensor unit, cease to reduce noise occurring on the first side of the device.

Thus, electronic devices with fingerprint sensors are provided with faster, more efficient methods and interfaces for controlling noise reduction in recorded audio with a fingerprint sensor, thereby increasing the effectiveness, efficiency, and user satisfaction with such devices. Such methods and interfaces may complement or replace conventional methods for controlling noise reduction in recorded audio with a fingerprint sensor.

There is a need for electronic devices with faster, more efficient methods and interfaces for performing operations that are adapted for a current user of the device. Such methods and interfaces may complement or replace conventional methods that are adapted for a current user of the device. Such methods and interfaces reduce the cognitive burden on a user and produce a more efficient human-machine interface. For battery-operated devices, such methods and interfaces conserve power and increase the time between battery charges.

In accordance with some embodiments, a method is performed at an electronic device with a display, a respective input element, and a fingerprint sensor. The method includes: obtaining a plurality of profiles, where the plurality of profiles includes one or more user-specific profiles and one or more class-based profiles, distinct from the user-specific profiles, that each correspond to a respective class of users; detecting a first fingerprint on the fingerprint sensor; selecting one or more class-based profiles associated with the device as active profiles that correspond to the first fingerprint without regard to authentication of the first fingerprint as a previously registered fingerprint, including, in accordance with a determination that the first fingerprint corresponds to a fingerprint of a user in a first class of users that are associated with a first class-based profile, selecting the first class-based profile as an active profile; receiving an input with the respective input element, wherein the input corresponds to a request to perform one or more operations at the device; and in response to receiving the input with the respective input element while the first class-based profile is selected as an active profile, performing a respective operation based on the request and the first class-based profile.

In accordance with some embodiments, an electronic device includes a display unit, a respective input element unit, a fingerprint sensor unit, and a processing unit coupled to the display unit, the respective input element unit, and the fingerprint sensor unit. In some embodiments, the processing unit includes an obtaining unit, a detecting unit, a selecting unit, a performing unit, a determining unit, and an identifying unit. The processing unit is configured to: obtain a plurality of profiles, where the plurality of profiles includes one or more user-specific profiles and one or more class-based profiles, distinct from the user-specific profiles, that each correspond to a respective class of users; detect a first fingerprint on the fingerprint sensor unit; select one or more class-based profiles associated with the device as active profiles that correspond to the first fingerprint without regard to authentication of the first fingerprint as a previously registered fingerprint, including, in accordance with a determination that the first fingerprint corresponds to a fingerprint of a user in a first class of users that are associated with a first class-based profile, select the first class-based profile as an active profile; receive an input with the respective input element unit, where the input corresponds to a request to perform one or more operations at the device; and in response to receiving the input with the respective input element unit while the first class-based profile is selected as an active profile, perform a respective operation based on the request and the first class-based profile.

Thus, electronic devices with displays, respective input elements, and fingerprint sensors are provided with faster, more efficient methods and interfaces for performing operations that are adapted for a current user of the device, thereby increasing the effectiveness, efficiency, and user satisfaction with such devices. Such methods and interfaces may complement or replace conventional methods for performing operations based on a class-based profile.

There is a need for electronic devices with faster, more efficient methods and interfaces for changing logging preferences based on fingerprints. Such methods and interfaces may complement or replace conventional methods for changing logging preferences. Such methods and interfaces reduce the cognitive burden on a user and produce a more efficient human-machine interface. For battery-operated devices, such methods and interfaces conserve power and increase the time between battery charges. For portable multifunction devices, such methods and interfaces allow lost or stolen devices to be more easily recovered.

In accordance with some embodiments, a method is performed at an electronic device with a display, a respective input element and a fingerprint sensor. The method includes: detecting a first fingerprint on the fingerprint sensor and determining whether the first fingerprint is associated with a user profile associated with the device. The method further includes, after determining whether the first fingerprint is associated with a user profile associated with the device and in accordance with a determination that the first fingerprint is associated with a respective user profile associated with the device, setting the respective user profile as an active profile. The method further includes, after determining whether the first fingerprint is associated with a user profile associated with the device and in accordance with a determination that the first fingerprint is not associated with any user profile associated with the device, setting a default profile as an active profile. The method further includes, receiving an input with the respective input element, where the input corresponds to a request to perform a requested operation. The method further includes, in response to receiving the input with the respective input element and in accordance with a determination that the respective user profile is the active profile, performing a first set of one or more operations associated with the requested operation in accordance with logging preferences of the respective user profile. The method further includes, in response to receiving the input with the respective input element and in accordance with a determination that the respective user profile is the active profile, in accordance with a determination that the default profile is the active profile, performing a second set of operations associated with the requested operation in accordance with logging preferences of the default profile.

In accordance with some embodiments, an electronic device includes a respective input unit configured to receive an input, wherein the input corresponds to a request to perform a requested operation; a fingerprint sensor unit; and a processing unit coupled to the fingerprint sensor unit and the respective input unit, the processing unit configured to: detect a first fingerprint on the fingerprint sensor unit and determine whether the first fingerprint is associated with a user profile associated with the device. The processing unit is further configured to, after determining whether the first fingerprint is associated with a user profile associated with the device: in accordance with a determination that the first fingerprint is associated with a respective user profile associated with the device, set the respective user profile as an active profile; and in accordance with a determination that the first fingerprint is not associated with any user profile associated with the device, set a default profile as an active profile. The processing unit is further configured to, in response to receiving the input with the respective input unit: in accordance with a determination that the respective user profile is the active profile, perform a first set of one or more operations associated with the requested operation in accordance with logging preferences of the respective user profile; and in accordance with a determination that the default profile is the active profile, perform a second set of operations associated with the requested operation in accordance with logging preferences of the default profile.

Thus, electronic devices with input elements and fingerprint sensors are provided with faster, more efficient methods and interfaces for changing logging preferences based on fingerprints, thereby increasing the effectiveness, efficiency, and user satisfaction with such devices. Such methods and interfaces may complement or replace conventional methods for changing logging preferences.

There is a need for electronic devices with faster, more efficient methods and interfaces for performing a respective restricted operation based on fingerprint-verification information (e.g., when the fingerprint-verification information meets respective authorization criteria for the respective restricted operation). Such methods and interfaces may complement or replace conventional methods for performing a respective restricted operation based. Such methods and interfaces reduce the cognitive burden on a user and produce a more efficient human-machine interface. For battery-operated devices, such methods and interfaces conserve power and increase the time between battery charges.

In accordance with some embodiments, a method includes obtaining fingerprint-verification criteria for controlling verification of fingerprints. For each of a plurality of respective inputs that correspond to respective restricted operations, the method further includes identifying fingerprint features of the respective input and determining fingerprint-verification information for the respective input based at least in part on: a comparison between the fingerprint features of the respective input and fingerprint features of one or more previously registered fingerprints; and the fingerprint-verification criteria. Finally, in response to detecting the respective input, the method includes: in accordance with a determination that the fingerprint-verification information meets respective authorization criteria for the respective restricted operation, performing the respective restricted operation; and in accordance with a determination that the fingerprint-verification information does not meet the respective authorization criteria for the restricted operation, forgoing performing the respective restricted operation.

In accordance with some embodiments, an electronic device includes a display unit configured to display information; a fingerprint sensor unit; and a processing unit coupled to the display unit and the fingerprint sensor unit. The processing unit is configured to obtain fingerprint-verification criteria for controlling verification of fingerprints. For each of a plurality of respective inputs that correspond to respective restricted operations, the processing unit is further configured to identify fingerprint features of the respective input and determine fingerprint-verification information for the respective input based at least in part on: a comparison between the fingerprint features of the respective input and fingerprint features of one or more previously registered fingerprints; and the fingerprint-verification criteria. Finally, in response to detecting the respective input, the processing unit is configured to: in accordance with a determination that the fingerprint-verification information meets respective authorization criteria for the respective restricted operation, perform the respective restricted operation; and in accordance with a determination that the fingerprint-verification information does not meet the respective authorization criteria for the restricted operation, forgo performance of the respective restricted operation.

Thus, electronic devices with displays and fingerprint sensors are provided with faster, more efficient methods and interfaces for performing a respective restricted operation based on fingerprint-verification information, thereby increasing the effectiveness, efficiency, and user satisfaction with such devices. Such methods and interfaces may complement or replace conventional methods for performing a respective restricted operation.

There is a need for electronic devices with faster, more efficient methods and interfaces for associating identity and location information. Such methods and interfaces may complement or replace conventional methods for associating identity and location information. Such methods and interfaces reduce the cognitive burden on a user and produce a more efficient human-machine interface. For battery-operated devices, such methods and interfaces conserve power and increase the time between battery charges.

In accordance with some embodiments, a method is performed at an electronic device with a display and a fingerprint sensor. The method includes displaying a map on the display and detecting an activation input. The activation input is associated with a displayed location on the map that corresponds to a respective geographic location, and a fingerprint detected on the fingerprint sensor. The method further includes, in response to detecting the activation input, identifying a user that corresponds to the fingerprint, and performing an operation associated with the respective geographic location and the user.

In accordance with some embodiments, an electronic device includes a display unit configured display a map; a fingerprint sensor unit configured to detect a fingerprint and a processing unit coupled to the display unit and the fingerprint sensor unit. In some embodiments, the display unit is a touch-sensitive display unit and the fingerprint sensor unit detects fingerprints on the touch-sensitive display unit. The processing unit is configured to: detect an activation input, the activation input being associated with: a displayed location on the map that corresponds to a respective geographic location and a fingerprint detected on the fingerprint sensor unit; and, in response to detecting the activation input: identify a user that corresponds to the fingerprint, and perform an operation associated with the respective geographic location and the user.

Thus, electronic devices with displays and fingerprint sensors are provided with faster, more efficient methods and interfaces for associating identity and location information, thereby increasing the effectiveness, efficiency, and user satisfaction with such devices. Such methods and interfaces may complement or replace conventional methods for associating identity and location information.

There is a need for electronic devices with faster, more efficient methods and interfaces for enabling one or more users to create and define their own personal workspace or work area. Accordingly, the disclosed embodiments provide methods for assigning respective workspaces to one or more users based on a detection of the users' fingerprints in the contacts that the user places on the touch-sensitive surface to define the bounds of a respective workspace within a bigger shared workspace on a multifunction device, and to associate their respective workspace with their respective custom user-settings based on their individual preferences. Such methods and interfaces may complement or replace conventional methods for assigning workspaces to one or more users. Such methods and interfaces reduce the cognitive burden on a user and produce a more efficient human-machine interface. For battery-operated devices, such methods and interfaces conserve power and increase the time between battery charges.

In accordance with some embodiments, a method is performed at an electronic device with a display, a touch-sensitive surface, and a fingerprint sensor. The method includes: detecting a first set of one or more inputs on the touch-sensitive surface that define a first area of the touch-sensitive surface. The method further includes, after detecting the first set of one or more inputs: determining that the first set of one or more inputs includes a first contact that includes a first fingerprint associated with a first user; and associating the first area of the touch-sensitive surface with the first user based at least in part on the determination that the first set of one or more inputs includes the first contact that includes the first fingerprint associated with the first user.

In accordance with some embodiments, an electronic device includes a display unit configured to display one or more user interface objects, a touch-sensitive surface unit configured to receive a contact on the touch-sensitive surface unit, a fingerprint sensor unit; and a processing unit coupled to the display unit, the touch-sensitive surface unit, and the fingerprint sensor unit. The processing unit is configured to: detect a first set of one or more inputs on the touch-sensitive surface unit that define a first area of the touch-sensitive surface unit; and after detecting the first set of one or more inputs: determine that the first set of one or more inputs includes a first contact that includes a first fingerprint associated with a first user; and associate the first area of the touch-sensitive surface unit with the first user based at least in part on the determination that the first set of one or more inputs includes the first contact that includes the first fingerprint associated with the first user.

Thus, electronic devices with displays, touch-sensitive surfaces, and fingerprint sensors are provided with faster, more efficient methods and interfaces for associating areas of a touch-sensitive surface with one or more users, thereby increasing the effectiveness, efficiency, and user satisfaction with such devices. Such methods and interfaces may complement or replace conventional methods for assigning workspaces to one or more users.

There is a need for electronic devices with faster, more efficient methods and interfaces for training a user on proper fingering techniques used, for example, when typing on a computer keyboard or depressing a key on a musical keyboard (e.g., playing a piano). Such methods and interfaces may complement or replace conventional methods for training a user on proper fingering techniques. Such methods and interfaces reduce the cognitive burden on a user and produce a more efficient human-machine interface. For battery-operated devices, such methods and interfaces conserve power and increase the time between battery charges.

In accordance with some embodiments, a method is performed at an electronic device with a display and a touch-sensitive surface. The method includes: displaying a user interface including a respective activatable user interface object and detecting a fingerprint pattern of a contact on the touch-sensitive surface that corresponds to a focus selector that is over the respective activatable user interface object on the display. The method also includes, in response to detecting the fingerprint pattern of the contact on the touch-sensitive surface that corresponds to the focus selector that is over the respective activatable user interface object on the display: analyzing the fingerprint pattern of the contact on the touch-sensitive surface to determine one or more fingering characteristics of the contact and determining whether the contact meets predefined preferred fingering criteria based on the one or more fingering characteristics. The method further includes, in accordance with a determination that the contact does not meet the preferred fingering criteria, providing feedback indicating that the preferred fingering criteria have not been met and, in accordance with a determination that the contact meets the preferred fingering criteria, performing an operation associated with the activatable user interface object.

In accordance with some embodiments, an electronic device includes a display unit configured to display a user interface, a touch-sensitive surface unit configured to receive user contacts, and a processing unit coupled to the display unit and the touch-sensitive surface unit. The processing unit configured to enable display of a user interface including a respective activatable user interface object and to detect a fingerprint pattern of a contact on the touch-sensitive surface unit that corresponds to a focus selector that is over the respective activatable user interface object on the display unit. The processing unit is also configured to, in response to detecting the fingerprint pattern of the contact on the touch-sensitive surface unit that corresponds to the focus selector that is over the respective activatable user interface object on the display unit, analyze the fingerprint pattern of the contact on the touch-sensitive surface unit to determine one or more fingering characteristics of the contact and determine whether the contact meets predefined preferred fingering criteria based on the one or more fingering characteristics. The processing unit is further configured to, in accordance with a determination that the contact does not meet the preferred fingering criteria, provide feedback indicating that the preferred fingering criteria have not been met and, in accordance with a determination that the contact meets the preferred fingering criteria, perform an operation associated with the activatable user interface object.

There is a need for electronic devices with faster, more efficient methods and interfaces for operating a portion of a touch-sensitive surface in an enhanced-sensitivity mode of operation. Such methods and interfaces may complement or replace conventional methods for operating a touch-sensitive surface. Such methods and interfaces reduce the cognitive burden on a user and produce a more efficient human-machine interface. For battery-operated devices, such methods and interfaces conserve power and increase the time between battery charges.

In accordance with some embodiments, a method is performed at an electronic device with a display and a touch-sensitive surface. The method includes: detecting a contact in a first region of the touch-sensitive surface, where the first region of the touch-sensitive surface is in a reduced-sensitivity mode of operation; in response to detecting the contact: determining whether the contact meets one or more fingerprint-sensor activation criteria; in accordance with a determination that the contact meets the fingerprint-sensor activation criteria, operating the first region of the touch-sensitive surface in an enhanced-sensitivity mode of operation; and in accordance with a determination that the contact does not meet the fingerprint-sensor activation criteria, continuing to operate the first region of the touch-sensitive surface in the reduced-sensitivity mode of operation.

In accordance with some embodiments, an electronic device includes a display unit, a touch-sensitive surface unit configured to receive contacts, and a processing unit coupled to the display unit and the touch-sensitive surface unit. The processing unit is configured to: detect a contact in a first region of the touch-sensitive surface unit, where the first region of the touch-sensitive surface unit is in a reduced-sensitivity mode of operation; in response to detecting the contact: determine whether the contact meets fingerprint-sensor activation criteria; in accordance with a determination that the contact meets the fingerprint-sensor activation criteria, operate the first region of the touch-sensitive surface unit in an enhanced-sensitivity mode of operation; and in accordance with a determination that the contact does not meet the fingerprint-sensor activation criteria, continue to operate the first region of the touch-sensitive surface unit in the reduced-sensitivity mode of operation Thus, electronic devices with displays and touch-sensitive surfaces are provided with faster, more efficient methods and interfaces for operating a touch-sensitive surface by operating a portion of a touch-sensitive surface in an enhanced-sensitivity mode of operation, thereby increasing the effectiveness, efficiency, and user satisfaction with such devices. Such methods and interfaces may complement or replace conventional methods for operating a touch-sensitive surface.

There is a need for electronic devices with faster, more efficient methods and interfaces for performing specific operations on devices. Such methods and interfaces may complement or replace conventional methods for performing specific operations on devices. Such methods and interfaces reduce the cognitive burden on a user and produce a more efficient human-machine interface. For battery-operated devices, such methods and interfaces conserve power and increase the time between battery charges.

In accordance with some embodiments, a method is performed at an electronic device with a display and a touch-sensitive surface. The method includes: associating a first fingerprint with a first operation; displaying, on the display, a respective user interface that includes affordances for performing a plurality of operations other than the first operation; while displaying the respective user interface that includes affordances for performing the plurality of operations other than the first operation, detecting a first gesture that includes detecting the first fingerprint on the touch-sensitive surface; and in response to detecting the first gesture, performing the first operation.

In accordance with some embodiments, an electronic device includes a display unit configured to display a respective user interface that includes affordances for performing a plurality of operations other than a first operation, a touch-sensitive surface unit configured to receive gestures, and a processing unit coupled to the display unit and the touch-sensitive surface unit. The processing unit is configured to: associate a first fingerprint with the first operation; while enabling display of the respective user interface that includes affordances for performing the plurality of operations other than the first operation, detect a first gesture that includes detecting the first fingerprint on the touch-sensitive surface unit; and in response to detecting the first gesture, perform the first operation Thus, electronic devices with displays touch-sensitive surfaces and fingerprint sensors are provided with faster, more efficient methods and interfaces for performing operations associated with fingerprint gestures, thereby increasing the effectiveness, efficiency, and user satisfaction with such devices. Such methods and interfaces may complement or replace conventional methods for performing operations associated with fingerprint gestures.

There is a need for electronic devices with faster, more efficient methods and interfaces for displaying a respective control for a user interface based on detection of a first fingerprint associated with moving the respective control. Such methods and interfaces may complement or replace conventional methods for displaying a respective control for a user interface. Such methods and interfaces reduce the cognitive burden on a user and produce a more efficient human-machine interface. For battery-operated devices, such methods and interfaces conserve power and increase the time between battery charges.

In accordance with some embodiments, a method is performed at an electronic device with a display, a touch-sensitive surface and a fingerprint sensor. The method includes displaying a user interface on the display. The method further includes detecting a first fingerprint associated with moving a respective control for the user interface on the touch-sensitive surface, where the first fingerprint corresponds to a focus selector at a first location on the display that does not include the respective control. In response to detecting the first fingerprint, the method includes displaying the respective control at the first location on the display.

In accordance with some embodiments, an electronic device includes a display unit configured to display a user interface; a touch-sensitive surface unit configured to receive one or more contacts; a fingerprint sensor unit; and a processing unit coupled to the display unit, the touch-sensitive surface unit and the fingerprint sensor unit. The processing unit is configured to: detect a first fingerprint associated with moving a respective control for the user interface on the touch-sensitive surface unit, where the first fingerprint corresponds to a focus selector at a first location on the display unit that does not include the respective control; and in response to detecting the first fingerprint, enable display of the respective control at the first location on the display unit.

Thus, electronic devices with displays, touch-sensitive surfaces and fingerprint sensors are provided with faster, more efficient methods and interfaces for displaying a respective control for a user interface based on detection of a first fingerprint associated with moving the respective control, thereby increasing the effectiveness, efficiency, and user satisfaction with such devices. Such methods and interfaces may complement or replace conventional methods for displaying a respective control for a user interface.

There is a need for electronic devices with faster, more efficient methods and interfaces for configuring a second electronic device as an auxiliary display of a first electronic device. Such methods and interfaces may complement or replace conventional methods for configuring a second electronic device as an auxiliary display. Such methods and interfaces reduce the cognitive burden on a user and produce a more efficient human-machine interface. For battery-operated devices, such methods and interfaces conserve power and increase the time between battery charges.

In accordance with some embodiments, a method is performed at an electronic device with a display and a fingerprint sensor. The method includes: detecting a first fingerprint on the fingerprint sensor of the first electronic device at a first time, where the first fingerprint is registered to a respective user. The method also includes receiving a communication from a second electronic device, distinct from the first electronic device, that includes information indicating that a second fingerprint was detected on a fingerprint sensor of the second device at a second time. The method further includes, in response to detecting the first fingerprint and receiving the communication from the second electronic device: determining whether predefined auxiliary-display criteria have been met, where the auxiliary-display criteria include a criterion that is met when the second fingerprint is registered to the respective user. The method further includes, in accordance with a determination that the auxiliary-display criteria are met, sending a response to the second electronic device that enables the second electronic device to be configured as an auxiliary display for the first electronic device; and in accordance with a determination that the auxiliary display criteria are not met, foregoing sending the response to the second electronic device that enables the second electronic device to be configured as the auxiliary display for the first electronic device.

In accordance with some embodiments, an electronic device includes a display unit configured to display a user interface, a fingerprint sensor unit, and a processing unit coupled to the display unit and the fingerprint sensor unit. The processing unit is configured to detect a first fingerprint on the fingerprint sensor unit of the first electronic device at a first time, where the first fingerprint is registered to a respective user. The processing unit is also configured to receive a communication from a second electronic device, distinct from the first electronic device, that includes information indicating that a second fingerprint was detected on a fingerprint sensor unit of the second device at a second time. The processing unit is further configured, in response to detecting the first fingerprint and receiving the communication from the second electronic device, to determine whether predefined auxiliary-display criteria have been met, where the auxiliary-display criteria include a criterion that is met when the second fingerprint is registered to the respective user. The processing unit is further configured to, in accordance with a determination that the auxiliary-display criteria are met, send a response to the second electronic device that enables the second electronic device to be configured as an auxiliary display for the first electronic device; and in accordance with a determination that the auxiliary-display criteria are not met, forego sending the response to the second electronic device that enables the second electronic device to be configured as the auxiliary display for the first electronic device.

Thus, electronic devices with displays, and fingerprint sensors are provided with faster, more efficient methods and interfaces for configuring a second electronic device as an auxiliary display of a first electronic device, thereby increasing the effectiveness, efficiency, and user satisfaction with such devices. Such methods and interfaces may complement or replace conventional methods for configuring a second electronic device as an auxiliary display.

There is a need for electronic devices with faster, more efficient methods and interfaces for changing beamforming parameters based on fingerprint orientation. Such methods and interfaces may complement or replace conventional methods for changing beamforming parameters. Such methods and interfaces reduce the cognitive burden on a user and produce a more efficient human-machine interface. For battery-operated devices, such methods and interfaces conserve power and increase the time between battery charges.

In accordance with some embodiments, a method is performed at an electronic device with a display and a fingerprint sensor. While a first fingerprint is detected in a first orientation on the fingerprint sensor, the method includes operating a set of one or more audio elements in accordance with a first set of beamforming parameters. The method further includes: detecting a subsequent fingerprint having a second orientation different from the first orientation on the fingerprint sensor, where the subsequent fingerprint is selected from a set consisting of the first fingerprint with a changed orientation and a second fingerprint distinct from the first fingerprint; and in response to detecting the subsequent fingerprint having the second orientation on the fingerprint sensor, operating the set of one or more audio elements in accordance with a second set of beamforming parameters different from the first set of beamforming parameters.

In accordance with some embodiments, an electronic device includes a display unit configured to display information; a fingerprint sensor; a set of one or more audio units configured to generate and/or capture audio signals; and a processing unit coupled to the display unit, the fingerprint sensor unit and the set of one or more audio units. While a first fingerprint is detected in a first orientation on the fingerprint sensor unit, the processing unit is configured to operate the set of one or more audio units in accordance with a first set of beamforming parameters. The processing unit is further configured to: detect a subsequent fingerprint having a second orientation different from the first orientation on the fingerprint sensor unit, where the subsequent fingerprint is selected from a set consisting of the first fingerprint with a changed orientation and a second fingerprint distinct from the first fingerprint; and in response to detecting the subsequent fingerprint having the second orientation on the fingerprint sensor unit, operate the set of one or more audio units in accordance with a second set of beamforming parameters different from the first set of beamforming parameters.

Thus, electronic devices with displays and fingerprint sensors are provided with faster, more efficient methods and interfaces for changing beamforming parameters based on fingerprint orientation, thereby increasing the effectiveness, efficiency, and user satisfaction with such devices. Such methods and interfaces may complement or replace conventional methods for changing beamforming parameters.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

FIGS. 9A-9C are flow diagrams illustrating a method of allowing a button to serve multiple purposes in accordance with some embodiments.

FIGS. 21A-21B are flow diagrams illustrating a method of changing logging preferences based on fingerprints, in accordance with some embodiments.

FIGS. 39A-39E are flow diagrams illustrating a method of performing operations associated with fingerprint gestures in accordance with some embodiments.

DESCRIPTION OF EMBODIMENTS

Figure 1A:
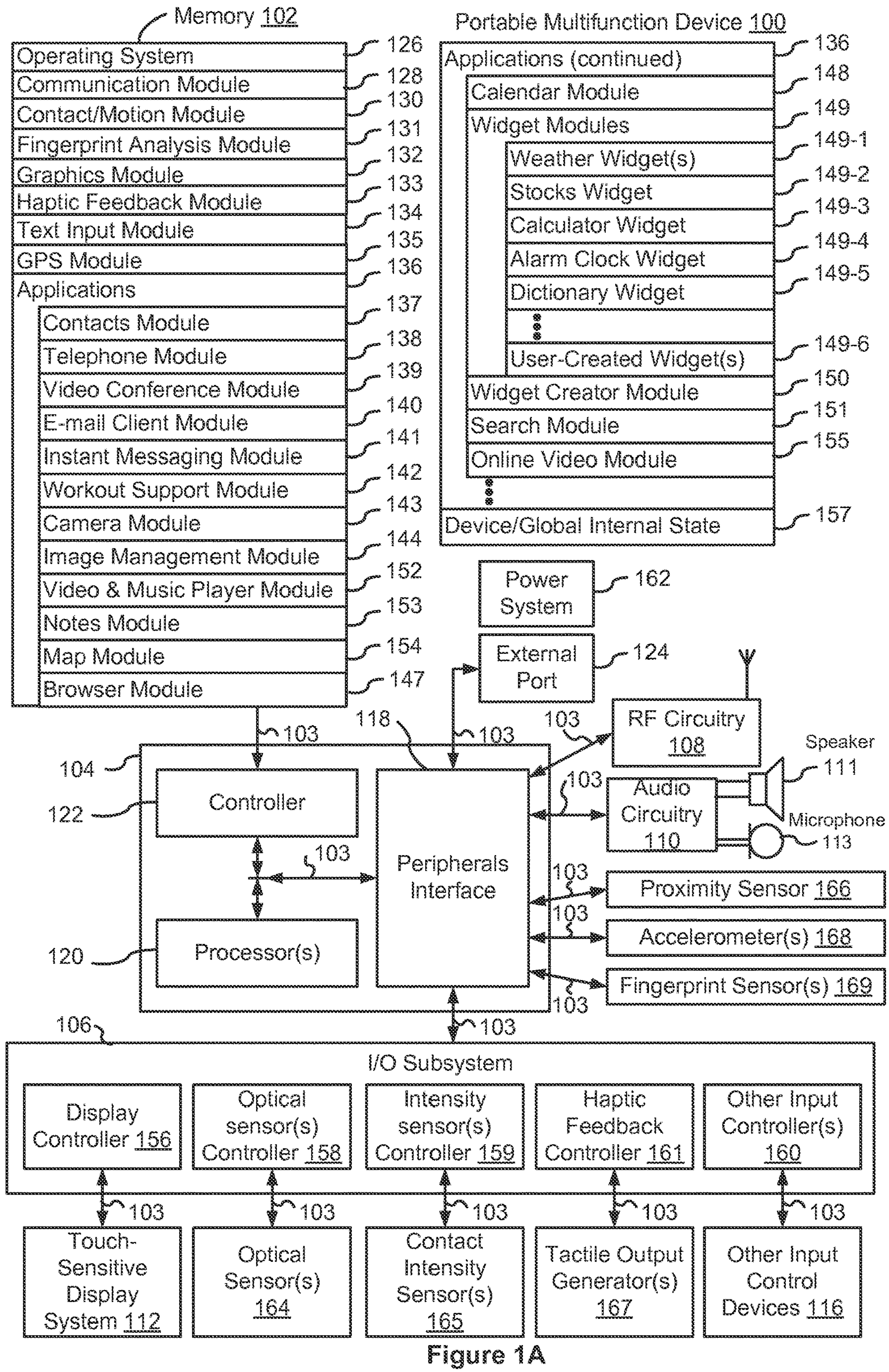
FIG. 1A is a block diagram illustrating a portable multifunction device with a touch-sensitive display and a fingerprint sensor in accordance with some embodiments.

The methods, devices and GUIs described herein respond to inputs on a fingerprint sensor instead of, or in addition to, inputs on a touch-sensitive surface or other input device. In some implementations, a touch-sensitive surface with a spatial resolution that is high enough to detect fingerprint features formed by individual fingerprint ridges is used as a fingerprint sensor. When a fingerprint sensor is used without a separate touch-sensitive surface, the fingerprint sensor can serve as a substitute for many of the functions of the touch-sensitive surface with a much smaller form factor, as the fingerprint sensor can detect movement of a contact over the fingerprint sensor even when the fingerprint has an area that is as large as or larger than the area of the fingerprint sensor. When a fingerprint sensor is used in addition to a separate touch-sensitive surface, the fingerprint sensor can augment the touch-sensitive surface by providing accurate detection of twisting motions of a contact, identifying different fingerprints of fingers that are used to perform gestures on the fingerprint sensor, and identifying a current user of the device. Additionally, when a fingerprint sensor is used in addition to a separate touchscreen display, the fingerprint sensor can detect touch inputs in situations where it is advantageous to avoid having fingers obscuring portions of the display (e.g., while viewing a map, a video or a game). When the touch-sensitive surface is used as a fingerprint sensor, the touch-sensitive surface optionally has spatial resolution settings that can be defined so as to switch the touch-sensitive surface (or regions of the touch-sensitive surface) between a low-resolution mode and a high-resolution mode automatically, without user intervention. In many situations the low-resolution mode consumes less power than the high-resolution mode. An advantage of operating the touch-sensitive surface in a low-resolution mode when fingerprint detection is not needed and switching the touch-sensitive surface, or a region of the touch-sensitive surface, to high-resolution mode on an as-needed basis is that such an approach conserves power while still providing high-resolution fingerprint feature sensing as-needed to improve the user experience of using the device. In implementations where the touch-sensitive surface is used as a fingerprint sensor, the term "fingerprint sensor" is used to refer to the touch-sensitive surface, or a region of the touch-sensitive surface, that is currently in high-resolution mode.

Figure 5A:
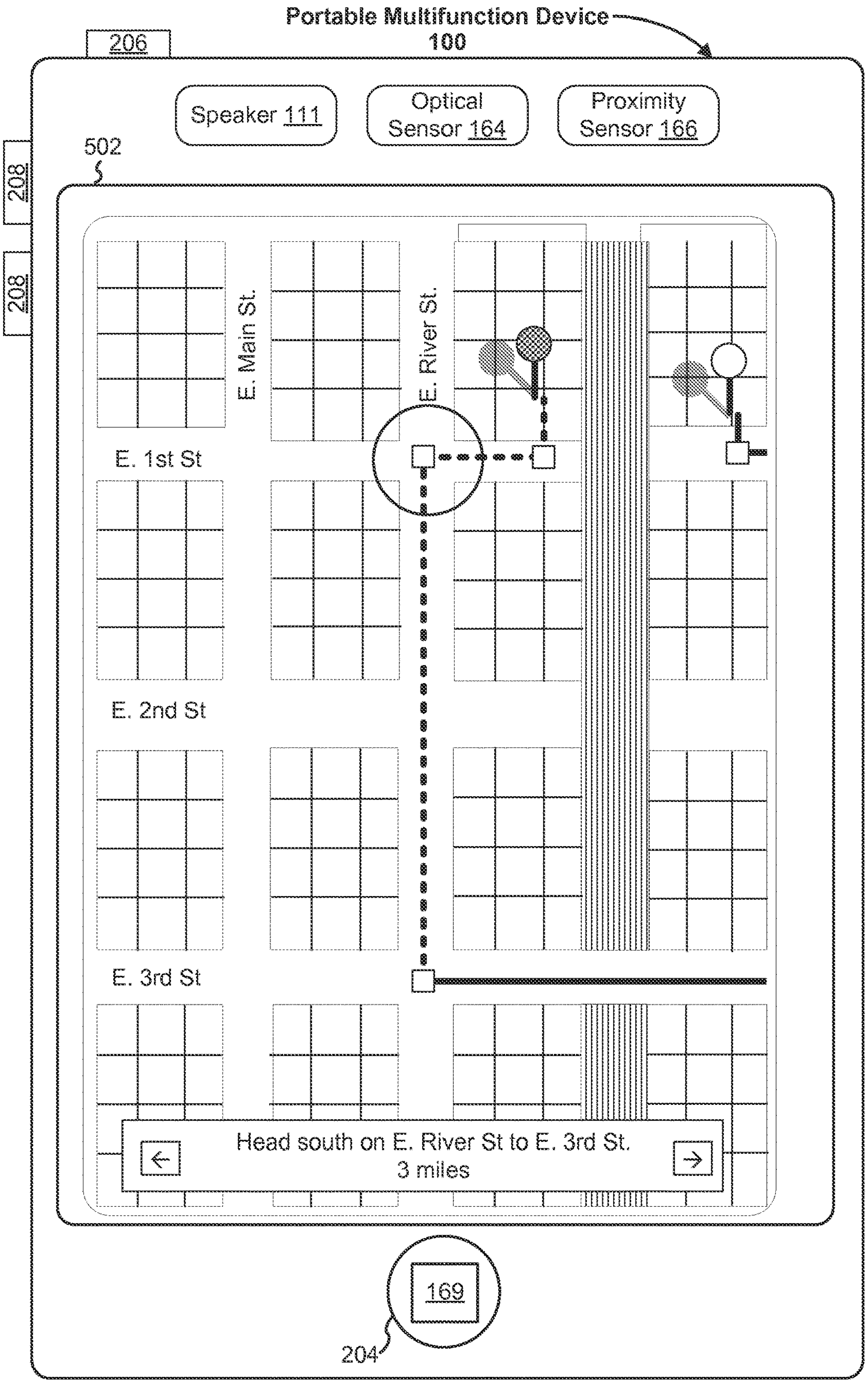
FIGS. 5A-5N illustrate exemplary user interfaces for interacting with user interfaces in accordance with movement of a finger on a fingerprint sensor in accordance with some embodiments.
Figure 5B:
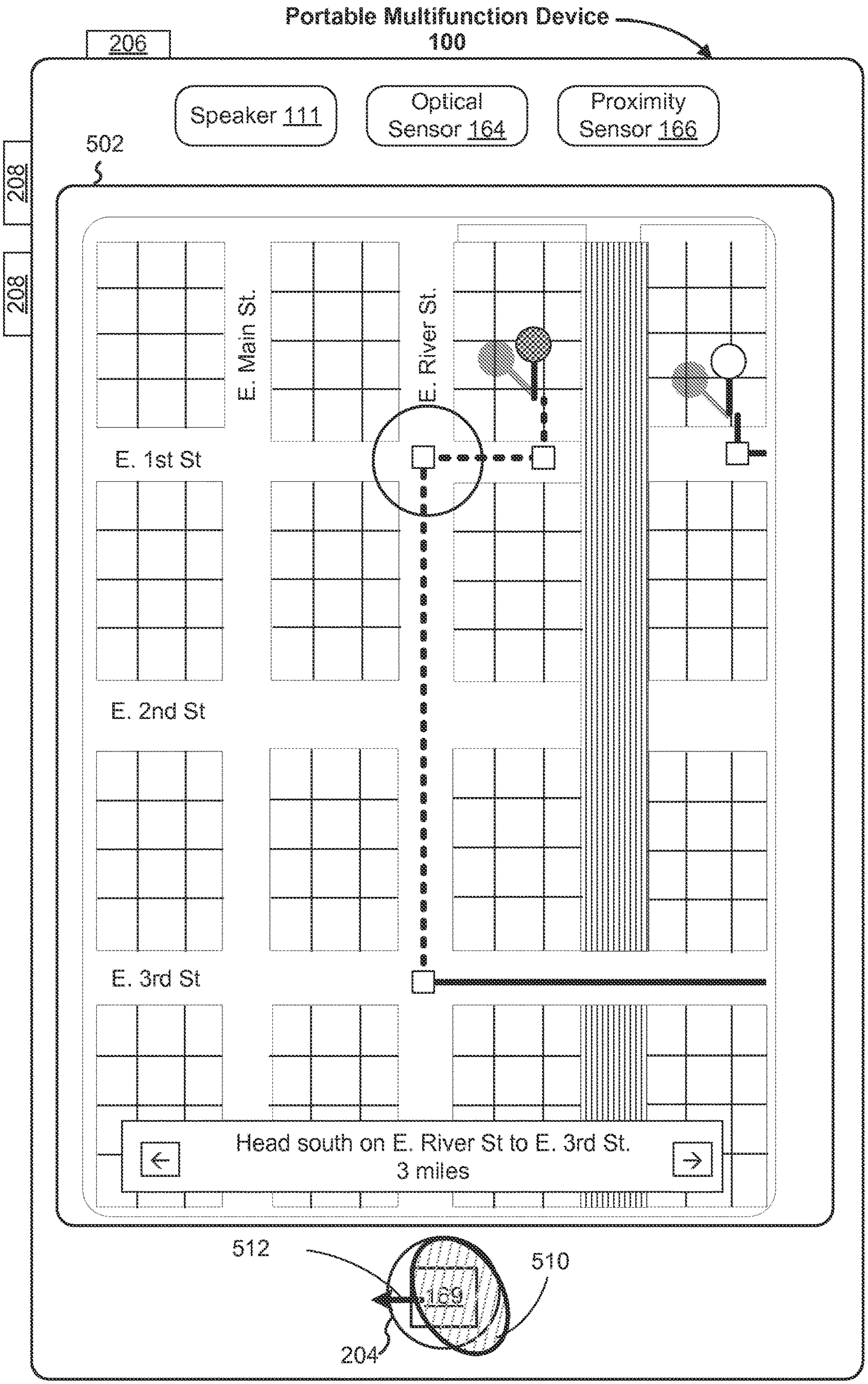
Figure 5C:
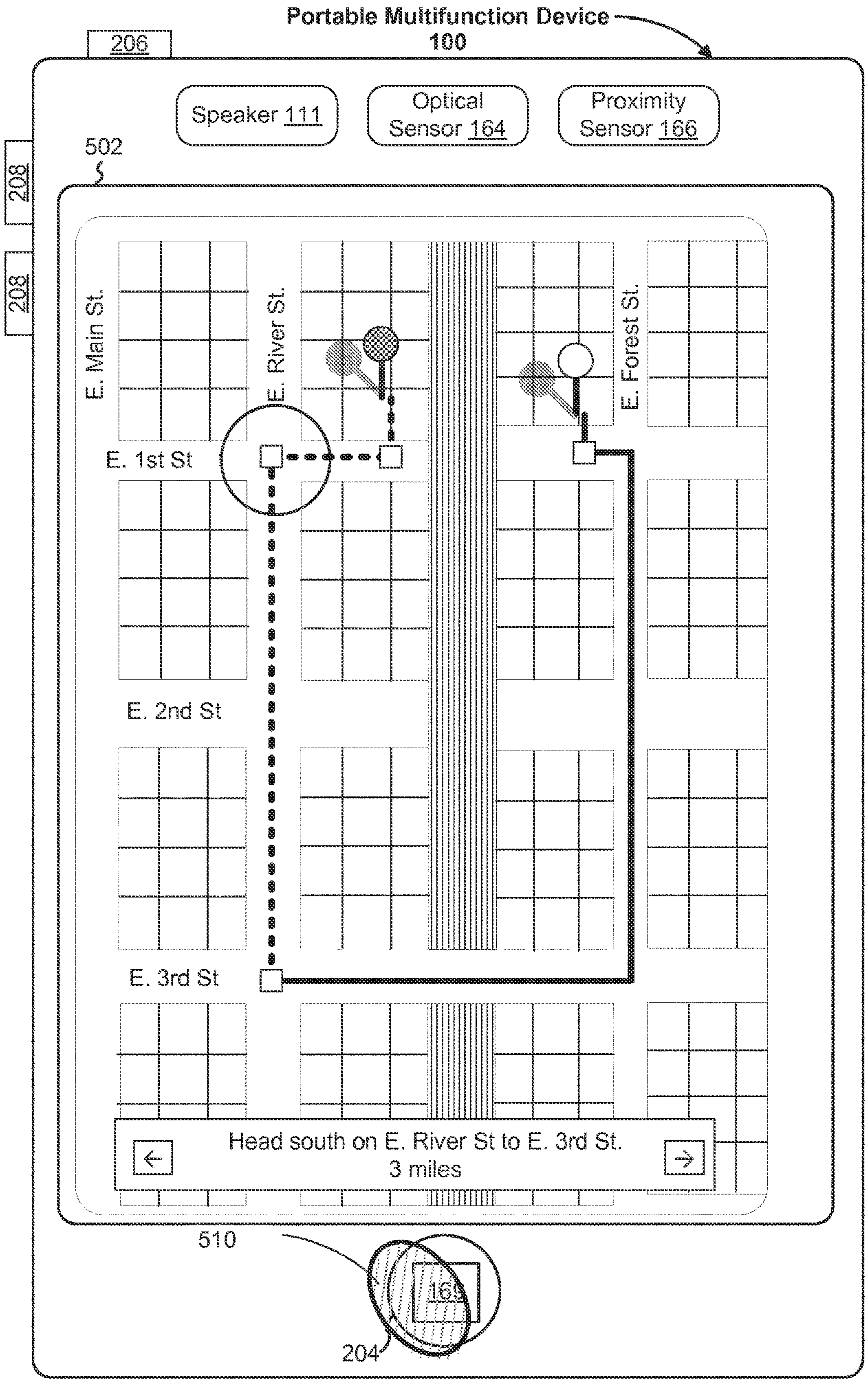
Figure 5D:
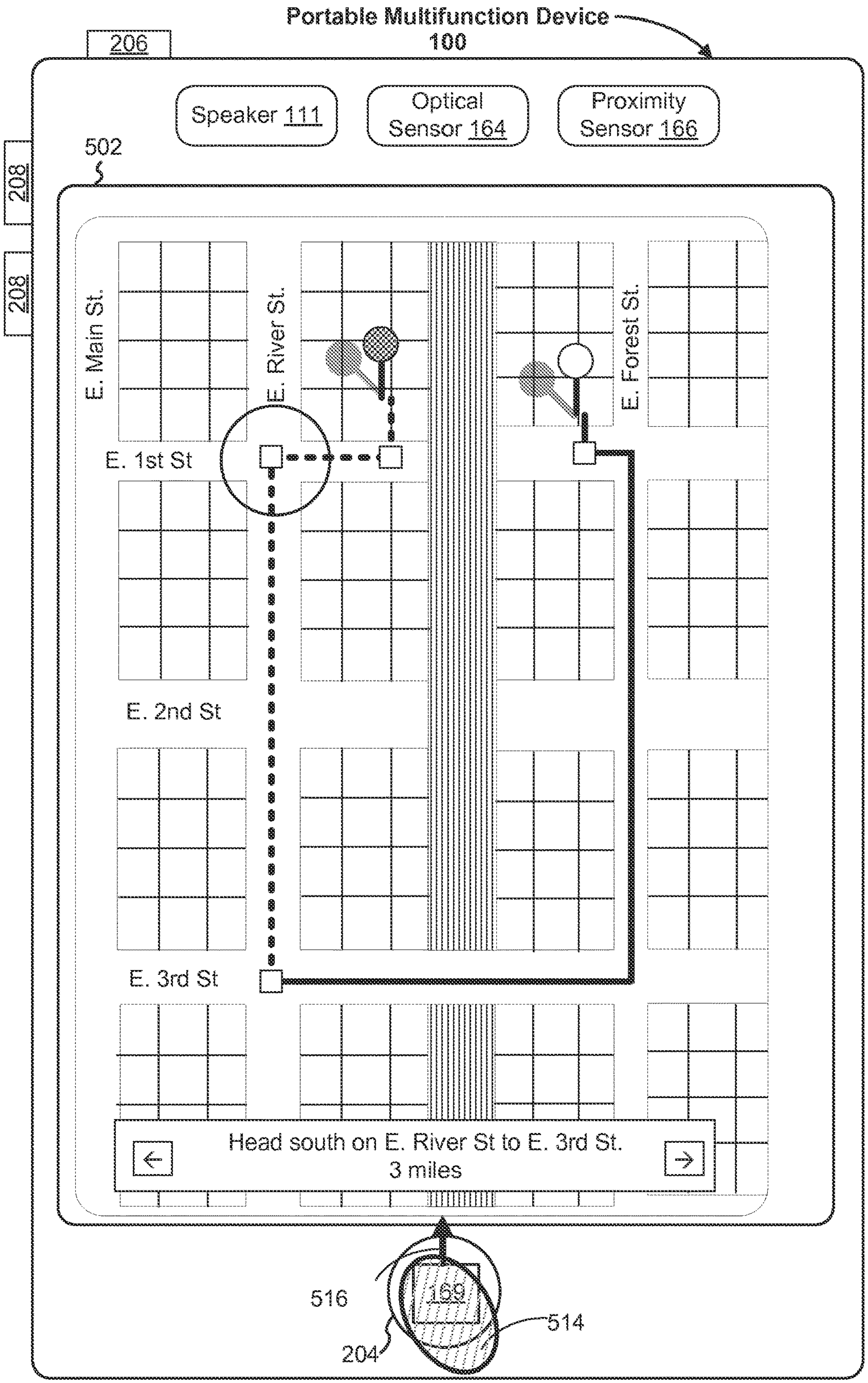
Figure 5E:
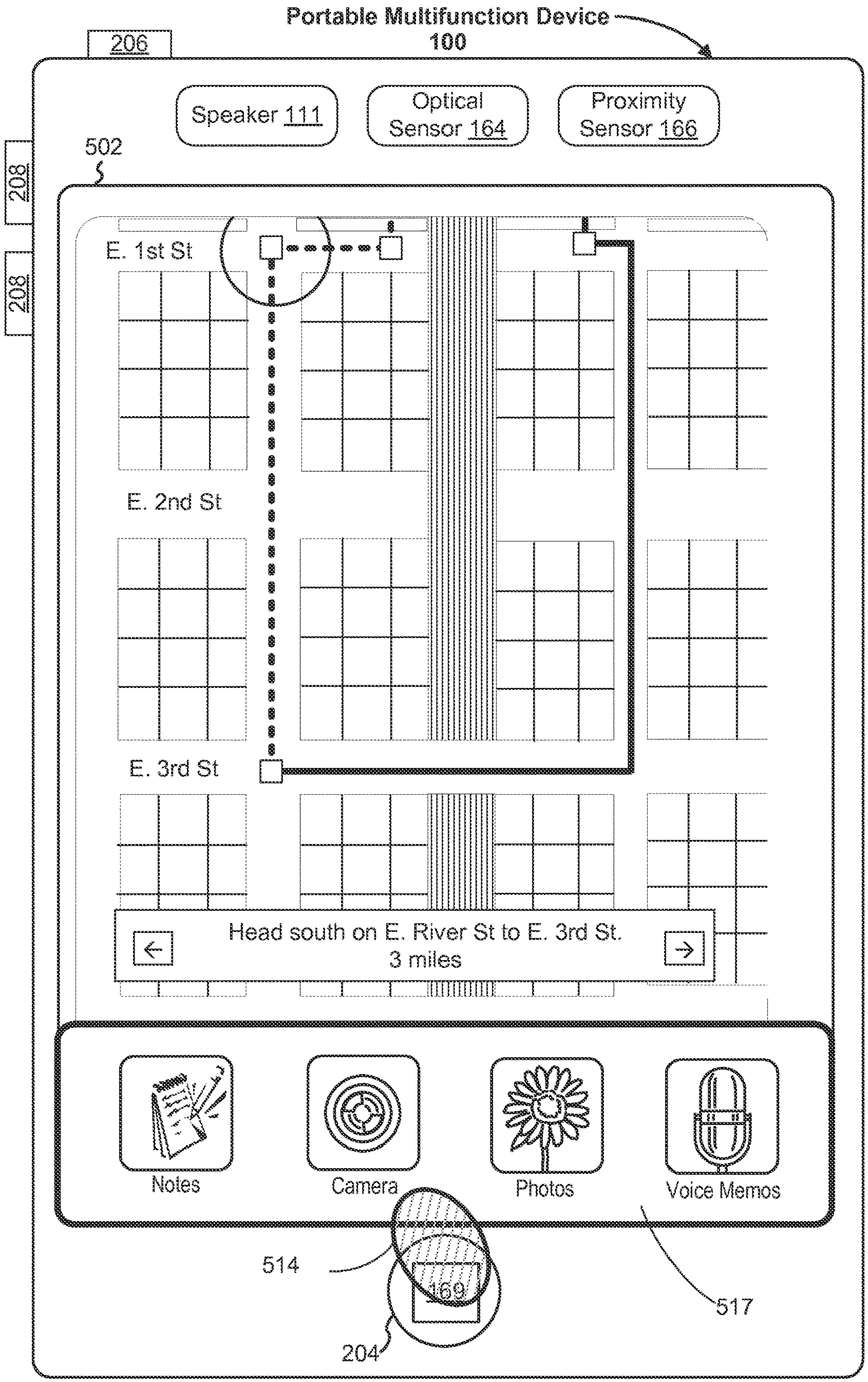
Figure 5F:
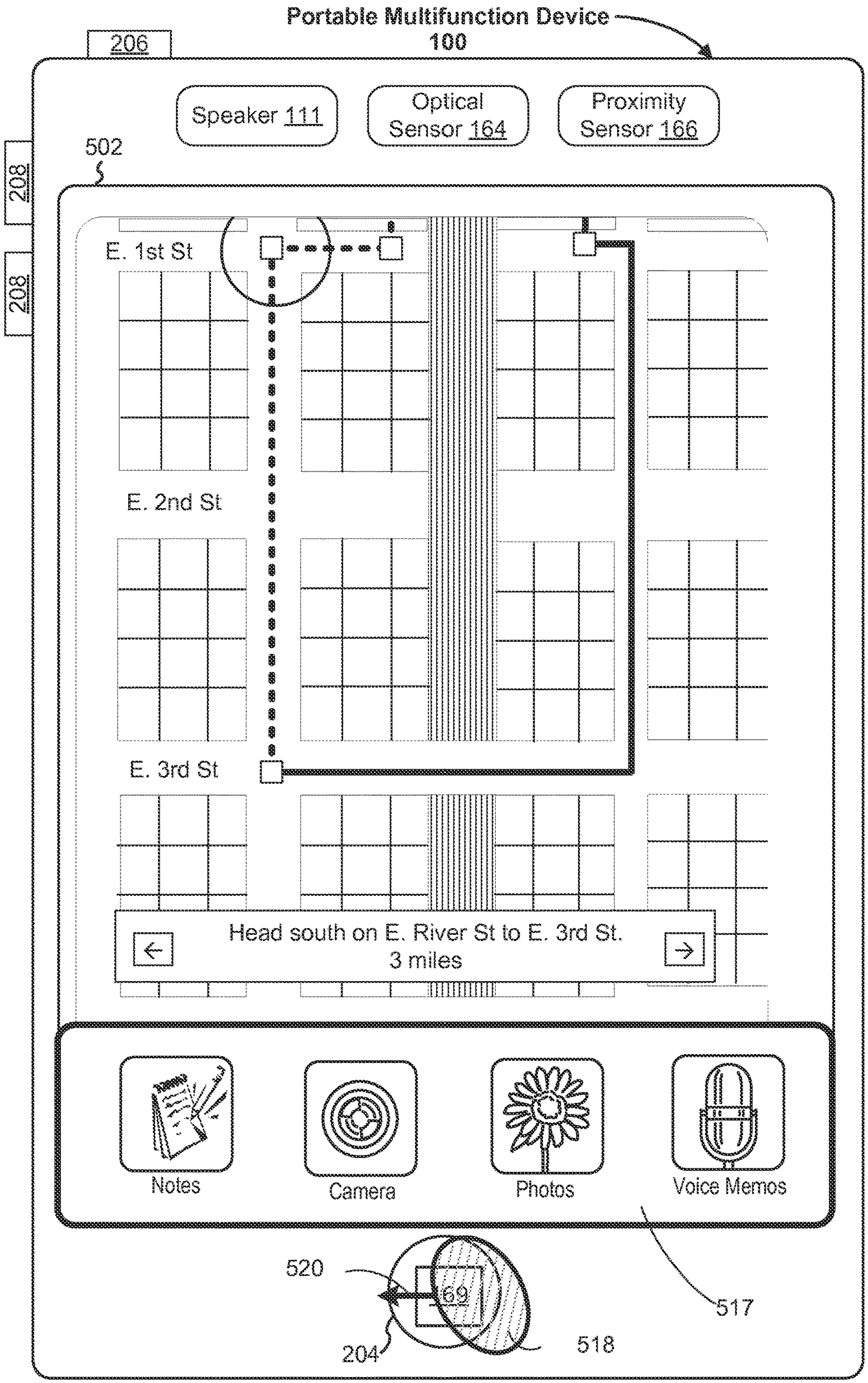
Figure 5G:
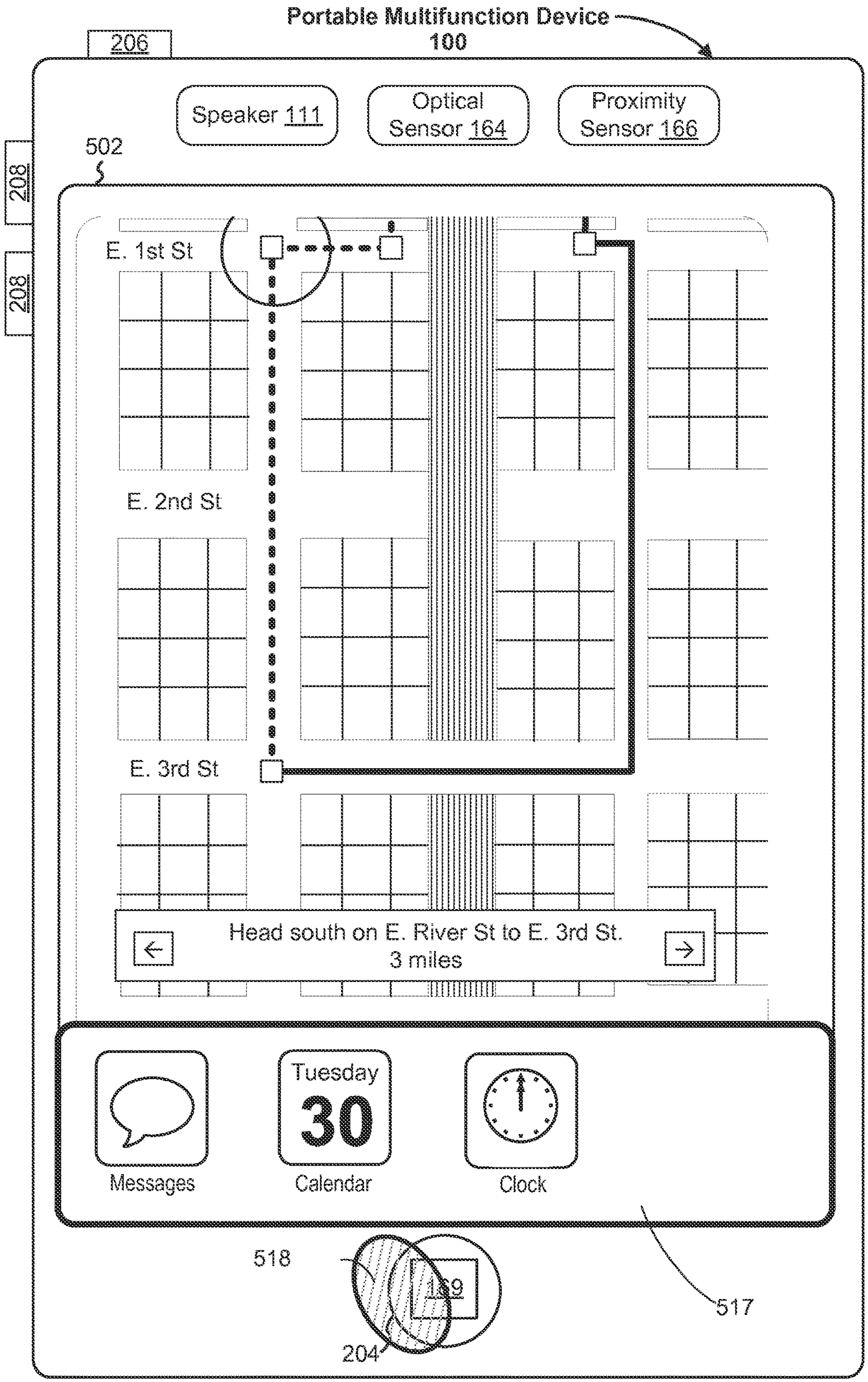
Figure 5H:
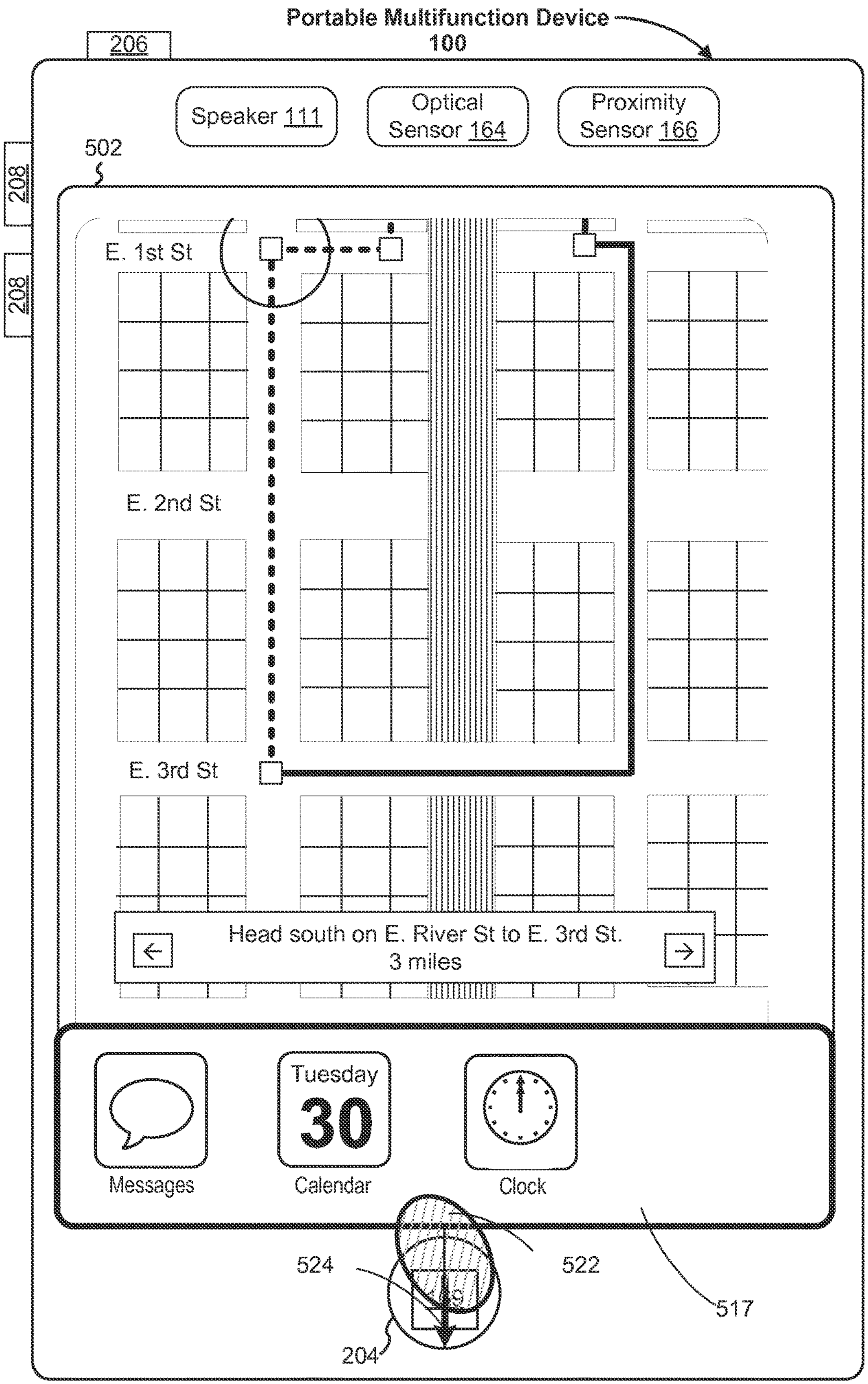
Figure 5I:
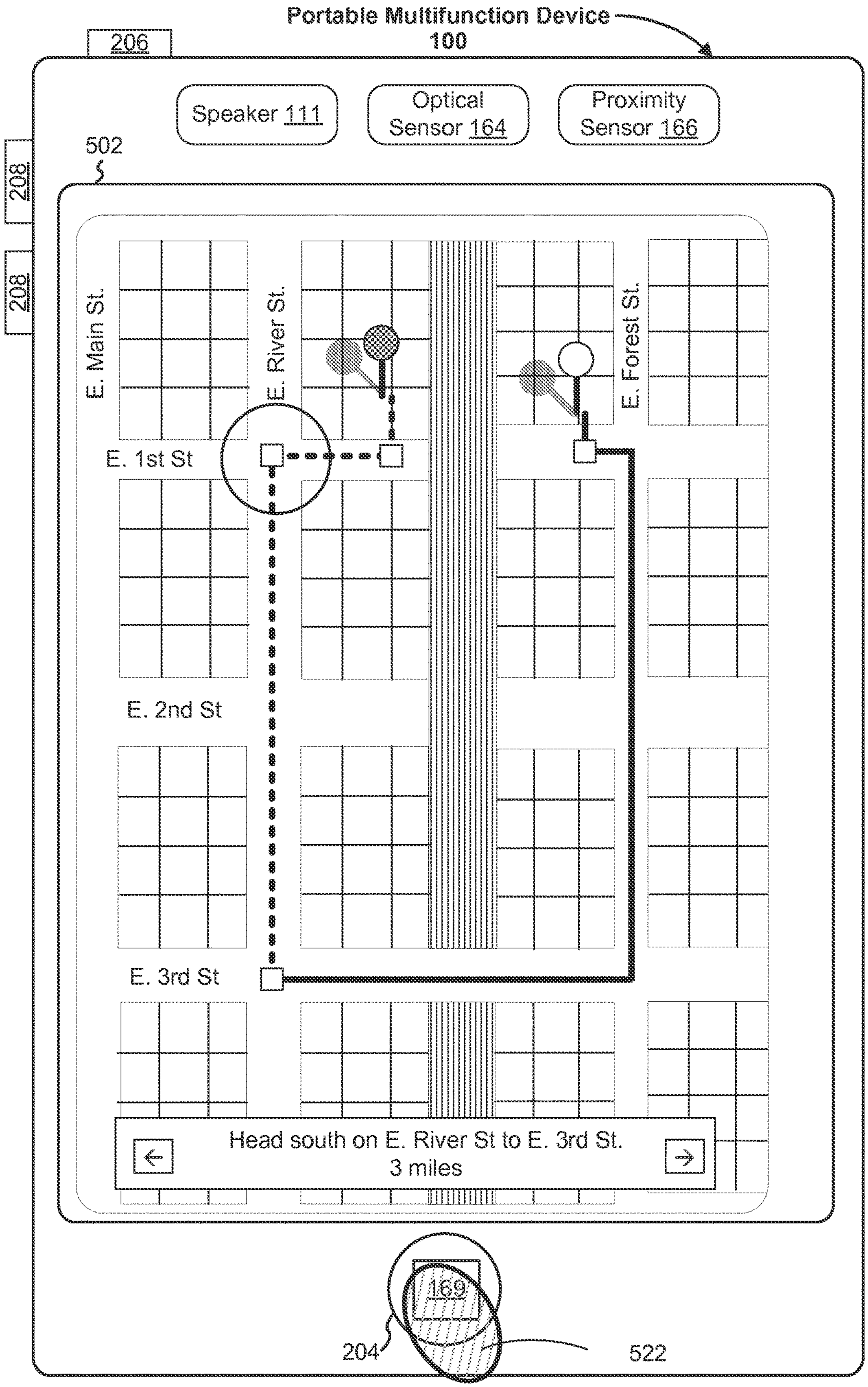
Figure 5J:
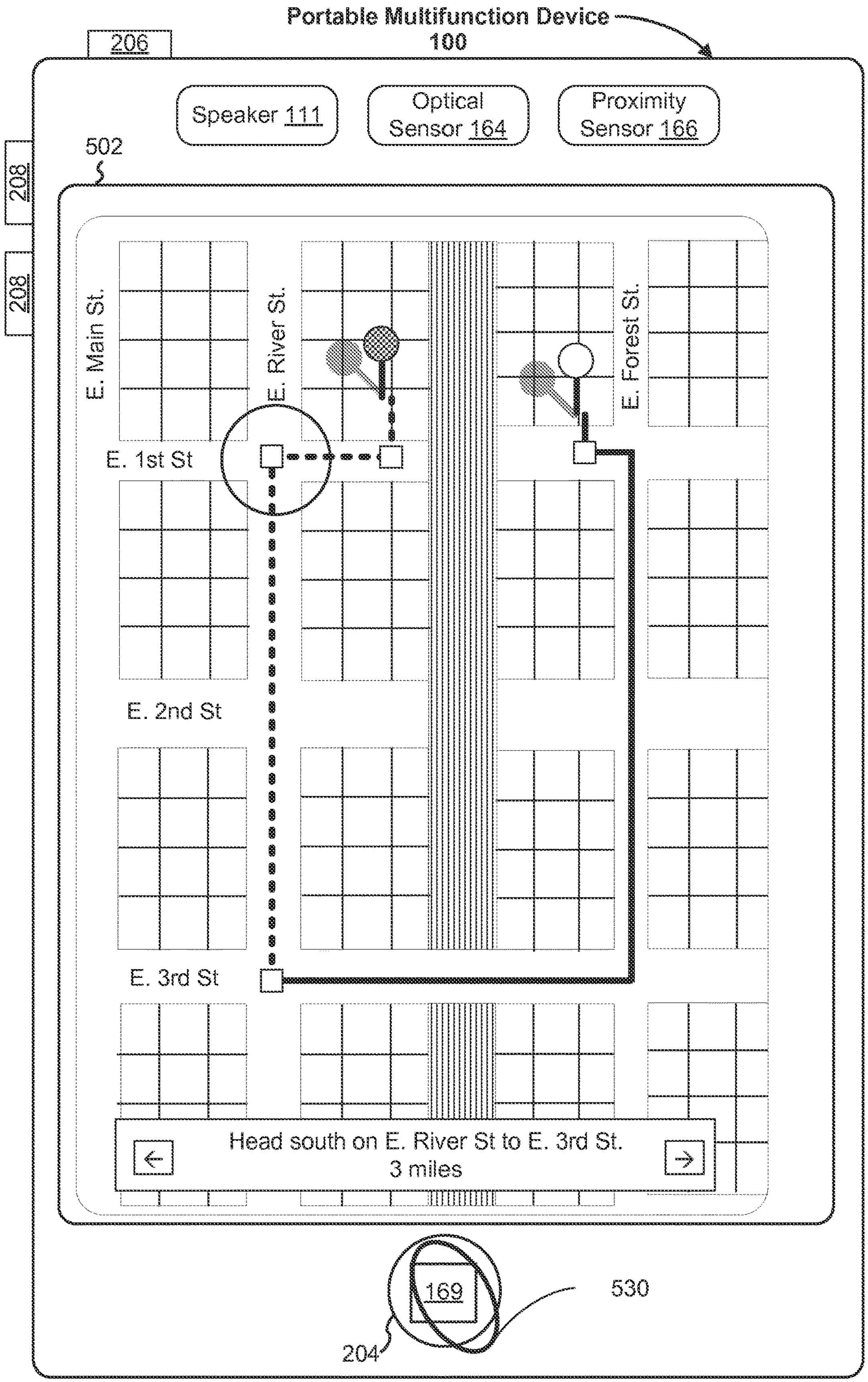
Figure 5K:
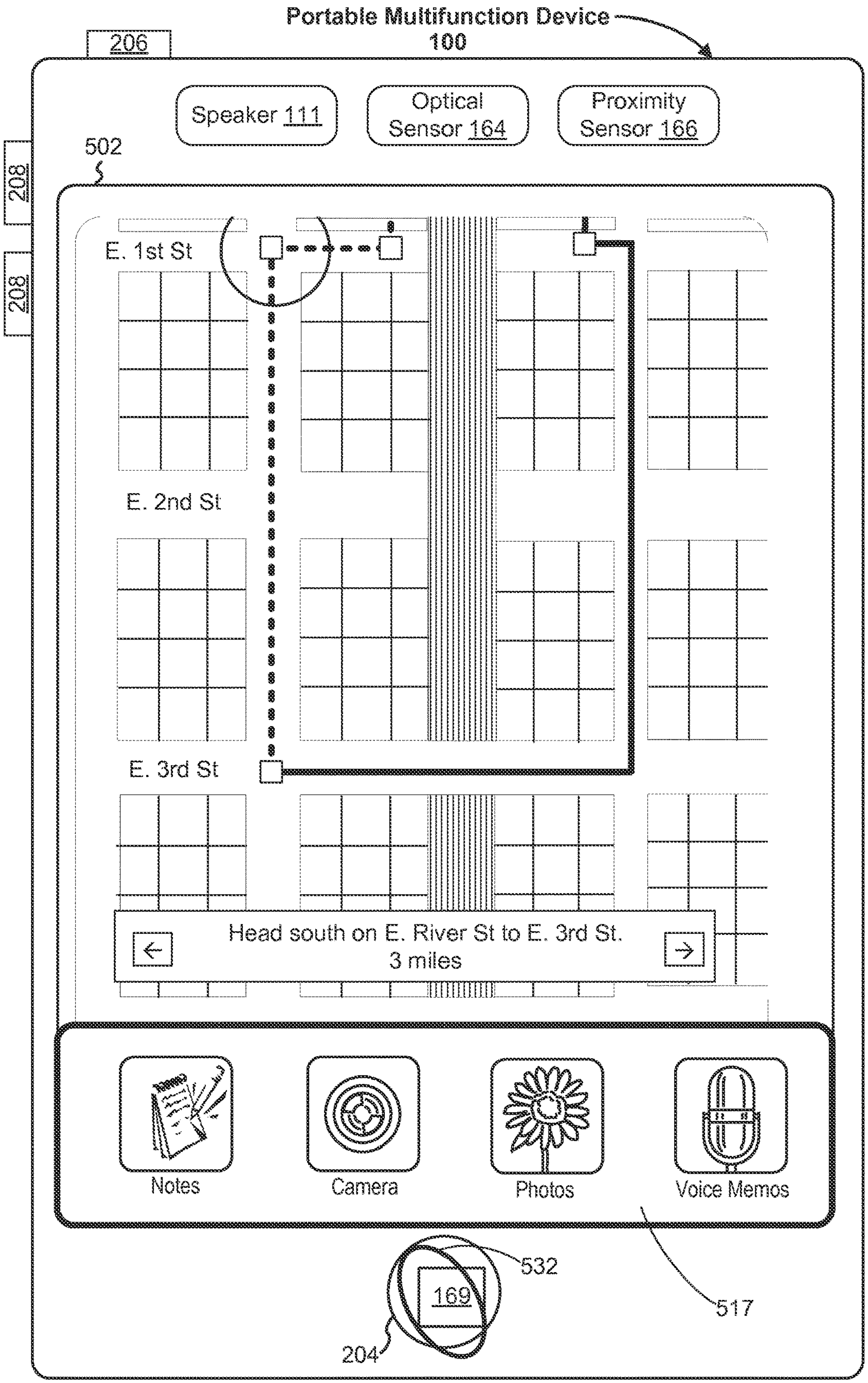
Figure 5L:
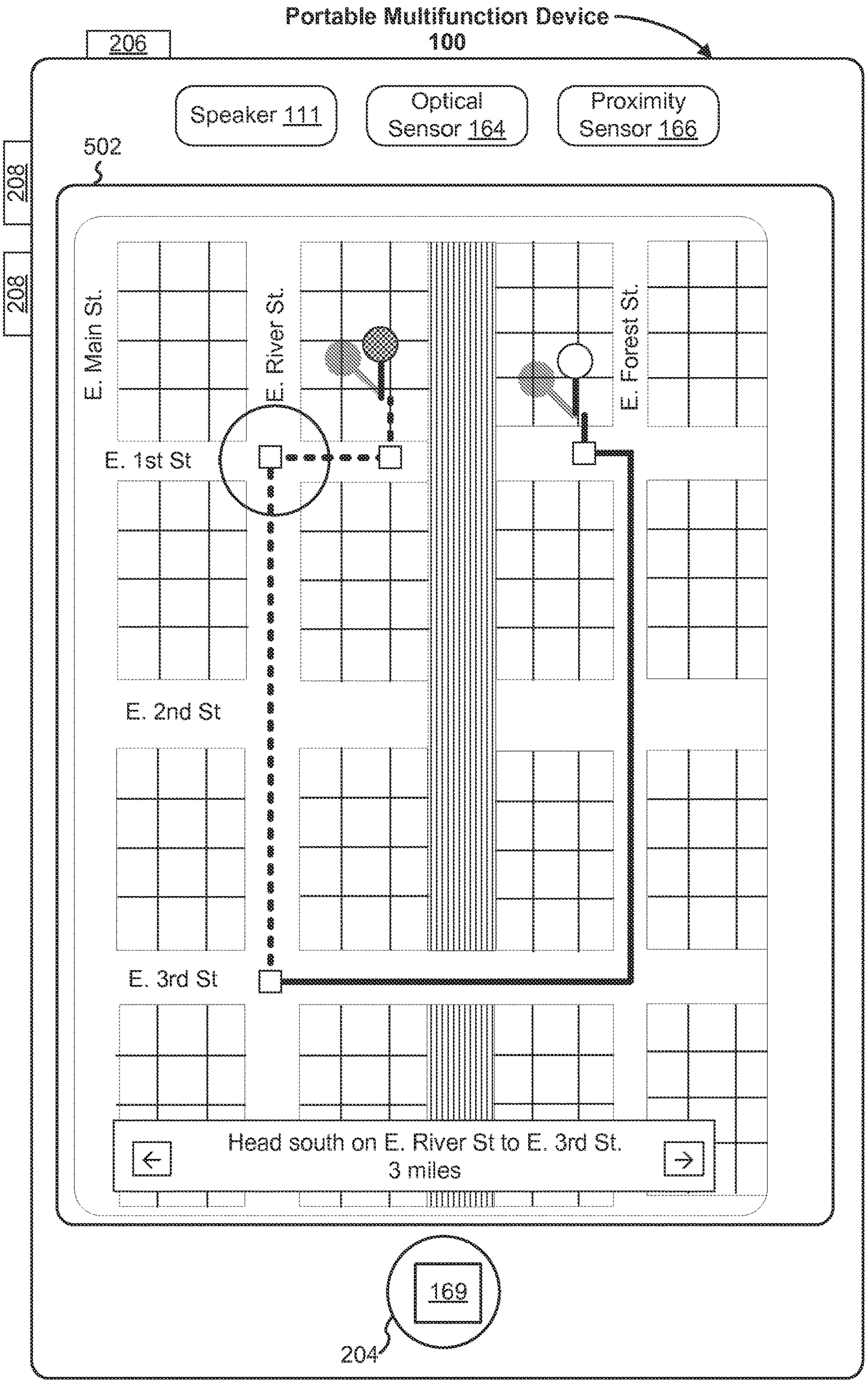
Figure 5M:
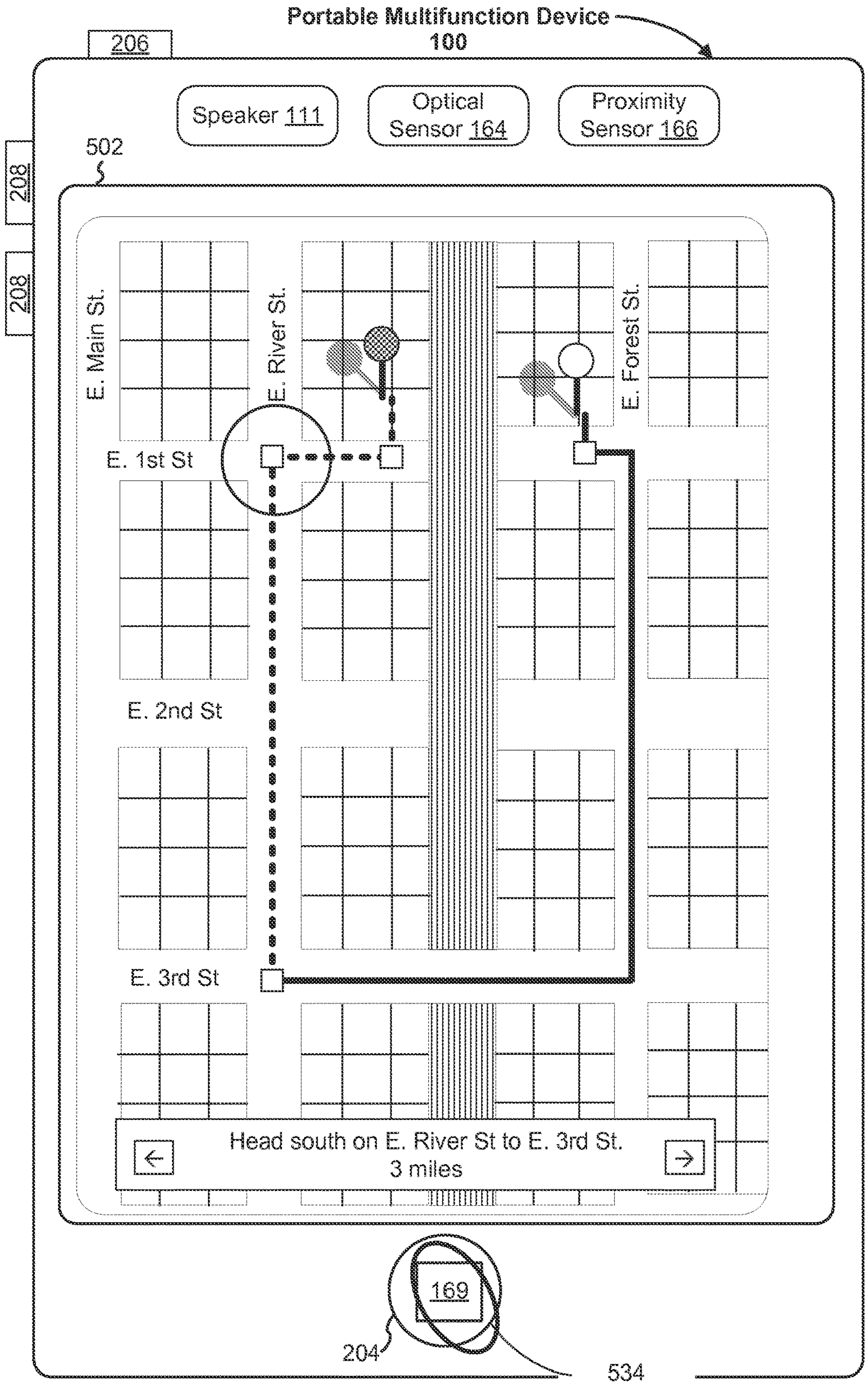
Figure 5N:
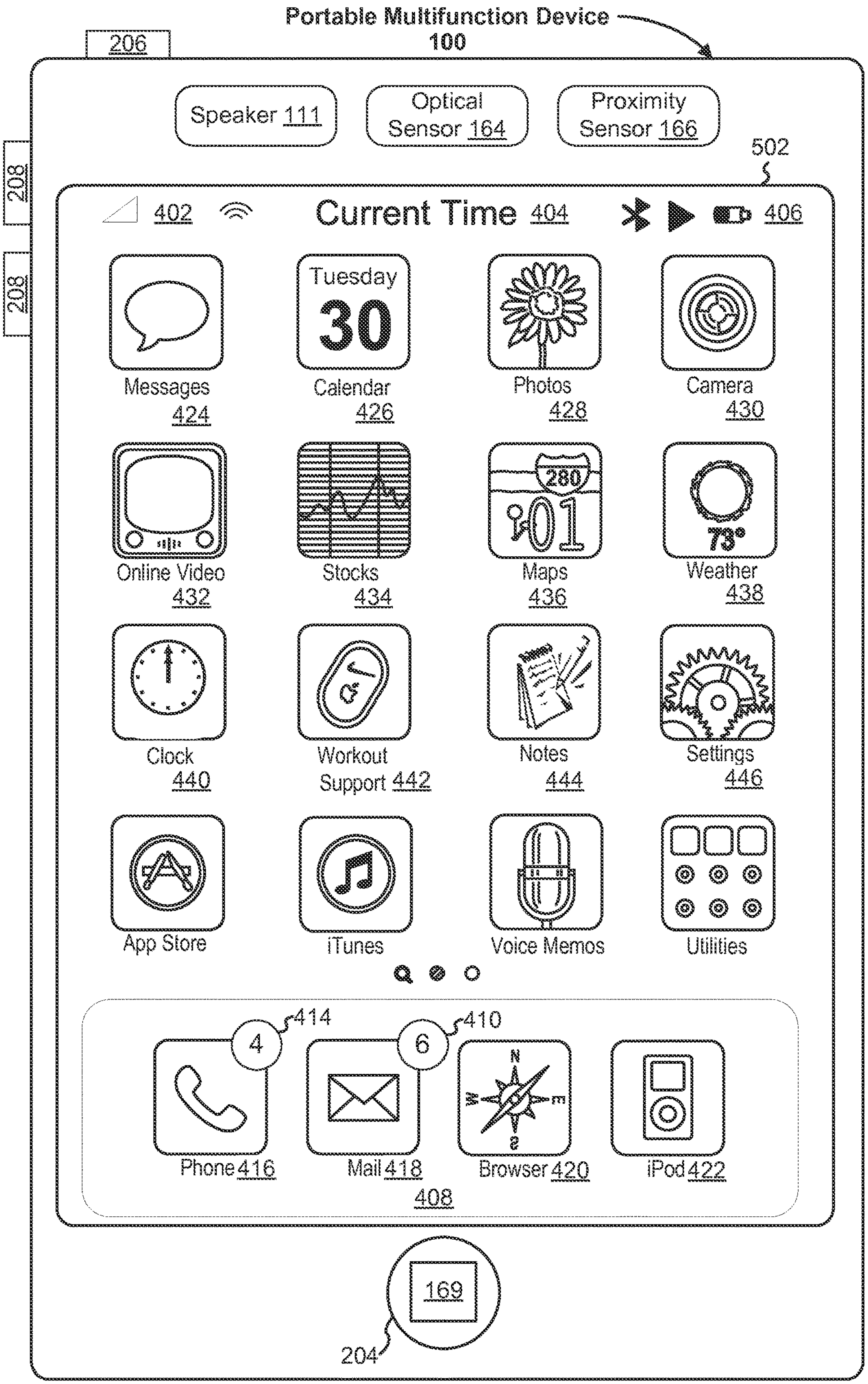
Figure 6A:
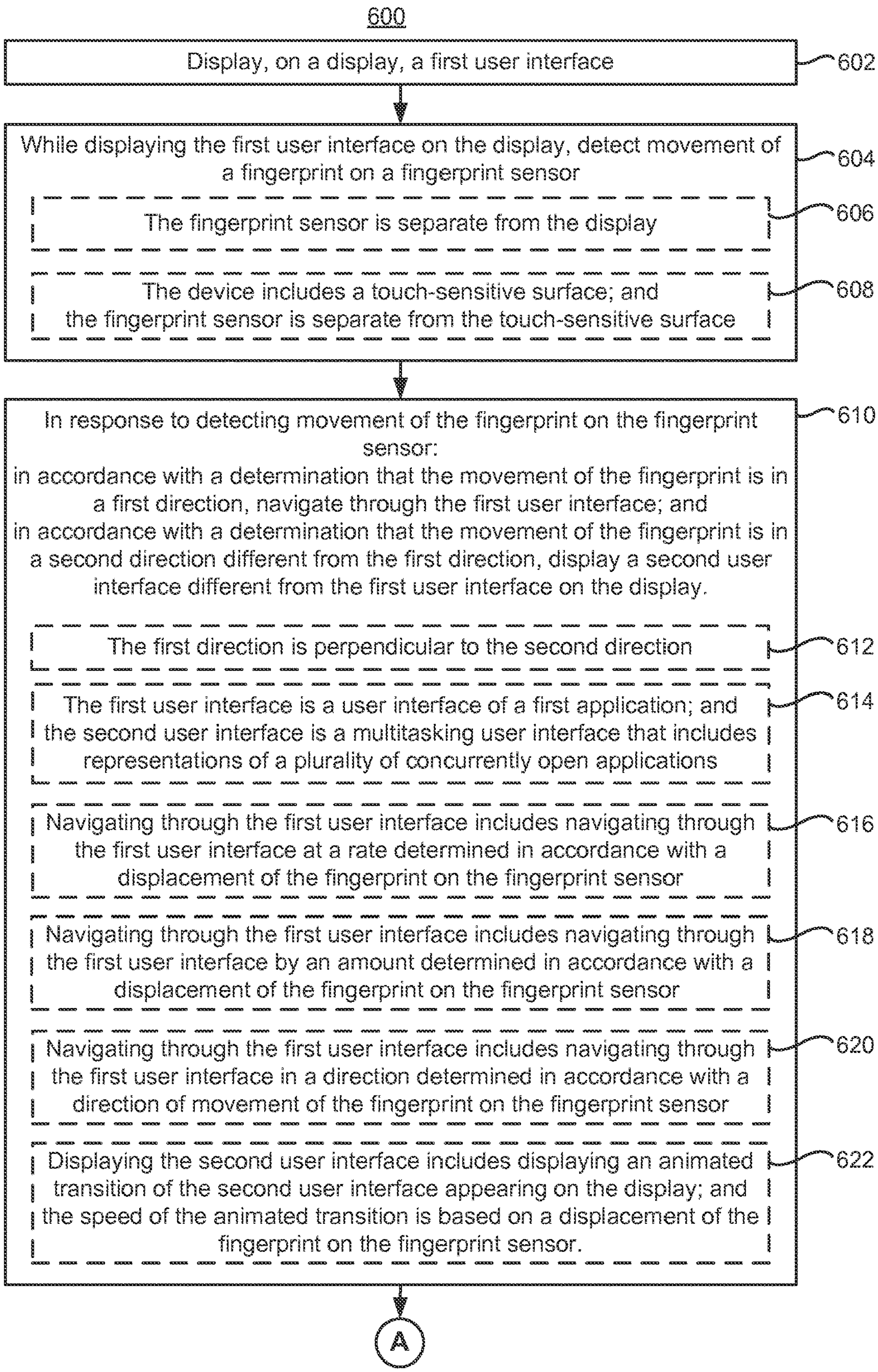
FIGS. 6A-6C are flow diagrams illustrating a method of interacting with user interfaces in accordance with movement of a finger on a fingerprint sensor in accordance with some embodiments.
Figure 6B:
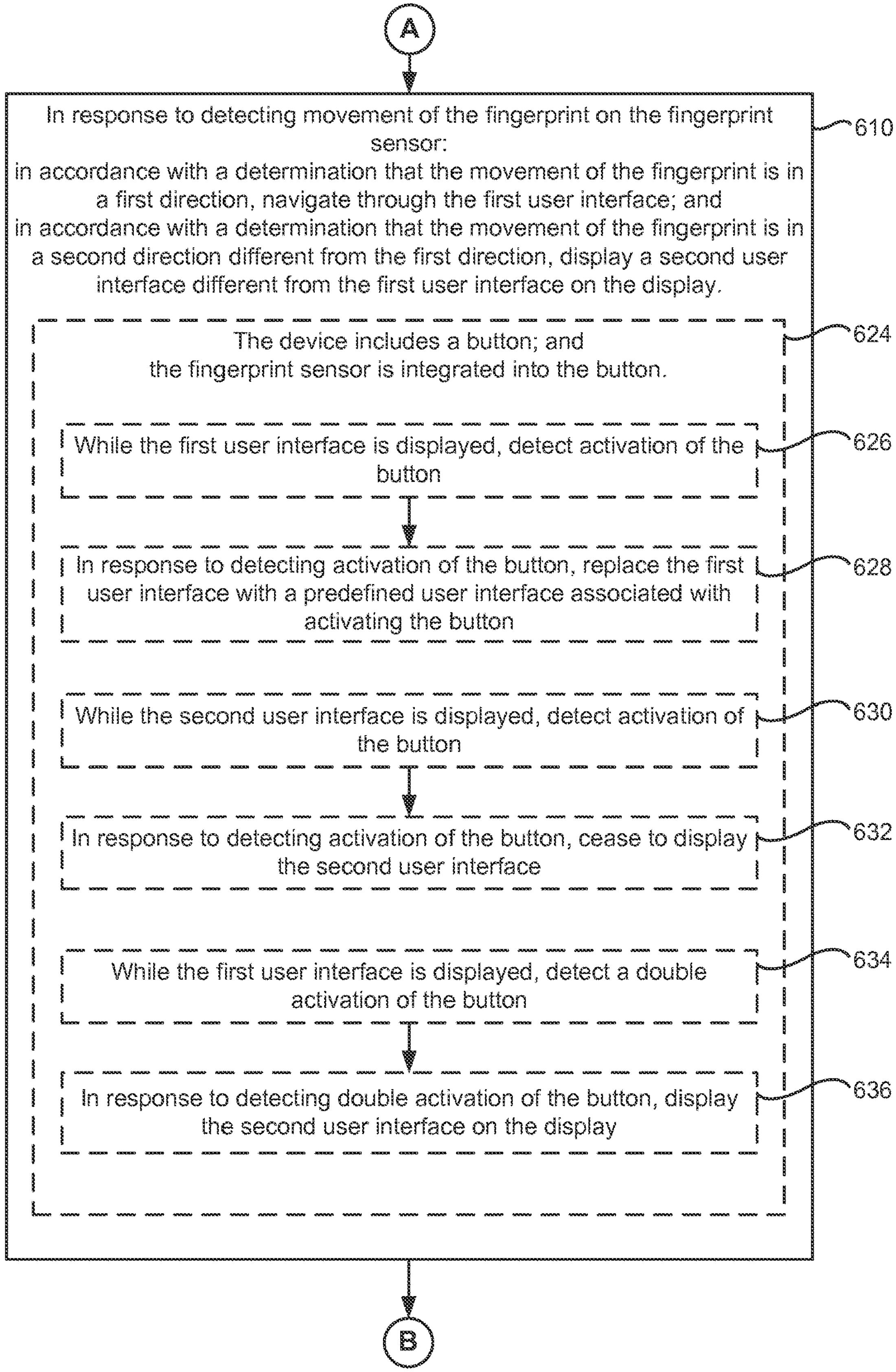
Figure 6C:
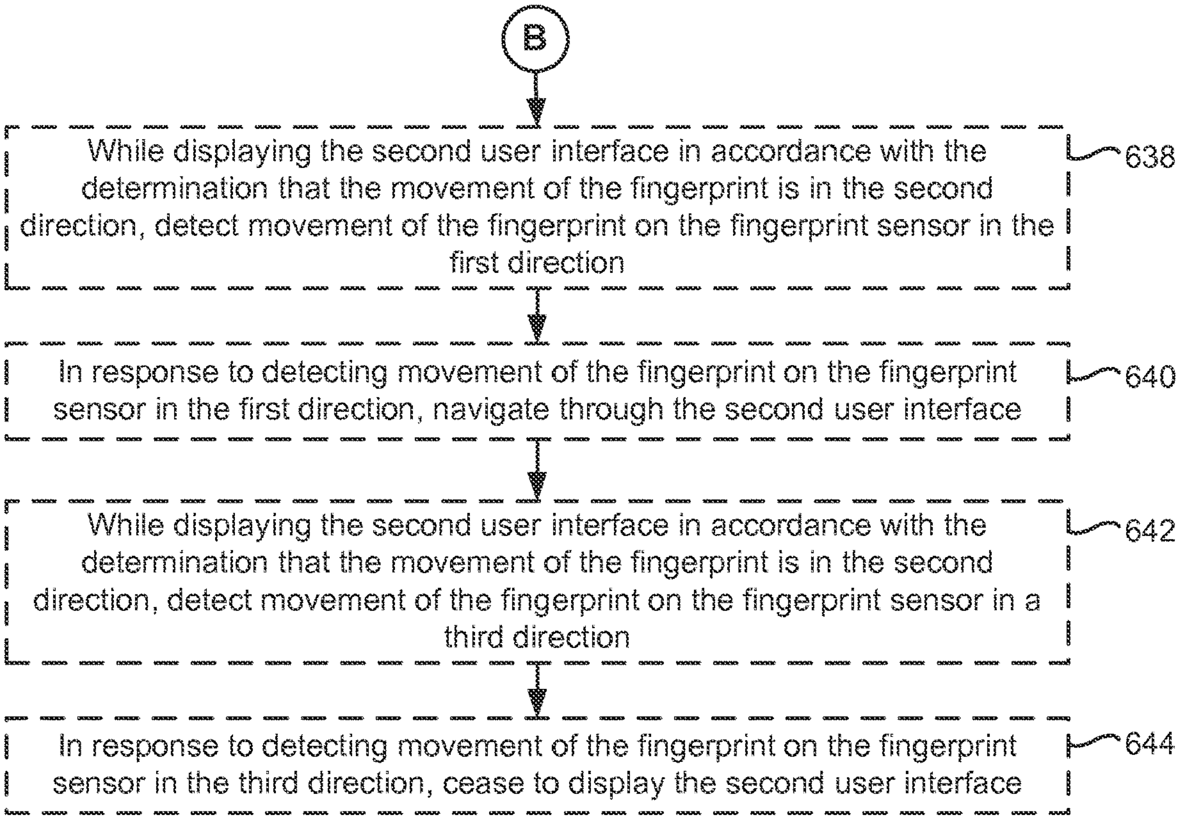
Figure 8A:
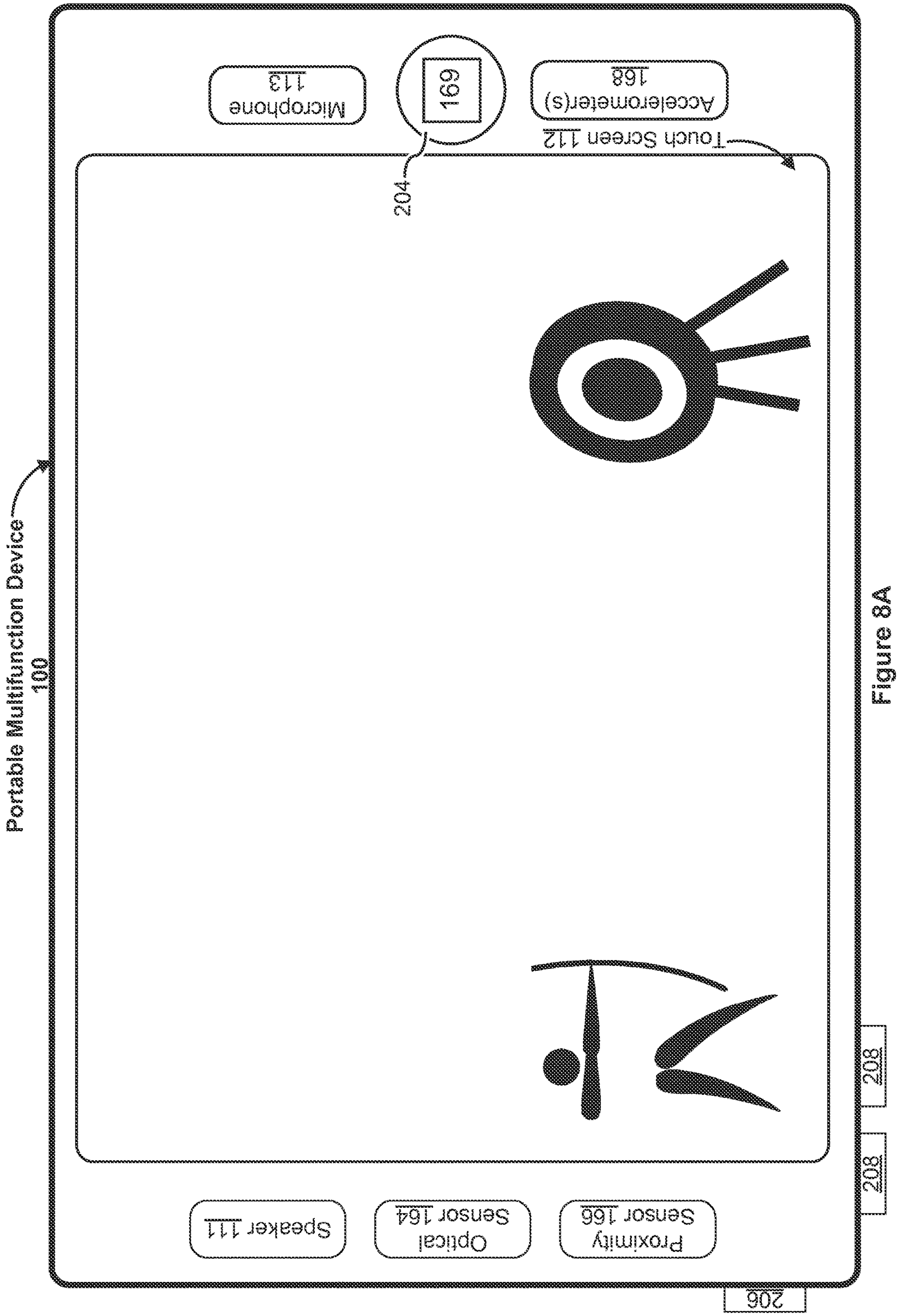
FIGS. 8A-8O illustrate exemplary user interfaces to be used in conjunction with multi-purpose buttons in accordance with some embodiments.
Figure 29A:
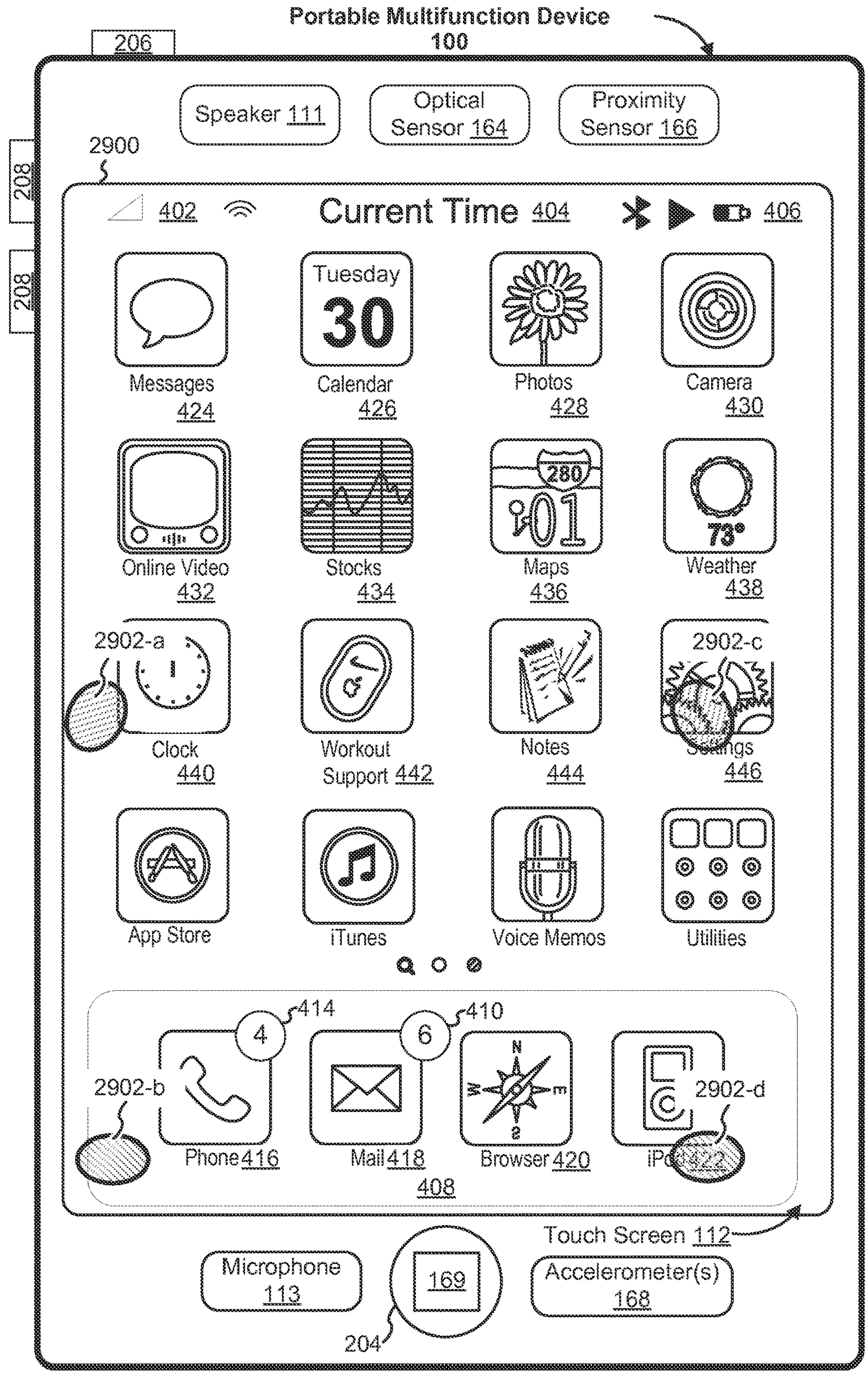
FIGS. 29A-29S illustrate exemplary user interfaces for assigning workspaces to one or more users in accordance with some embodiments.
Figure 32A:
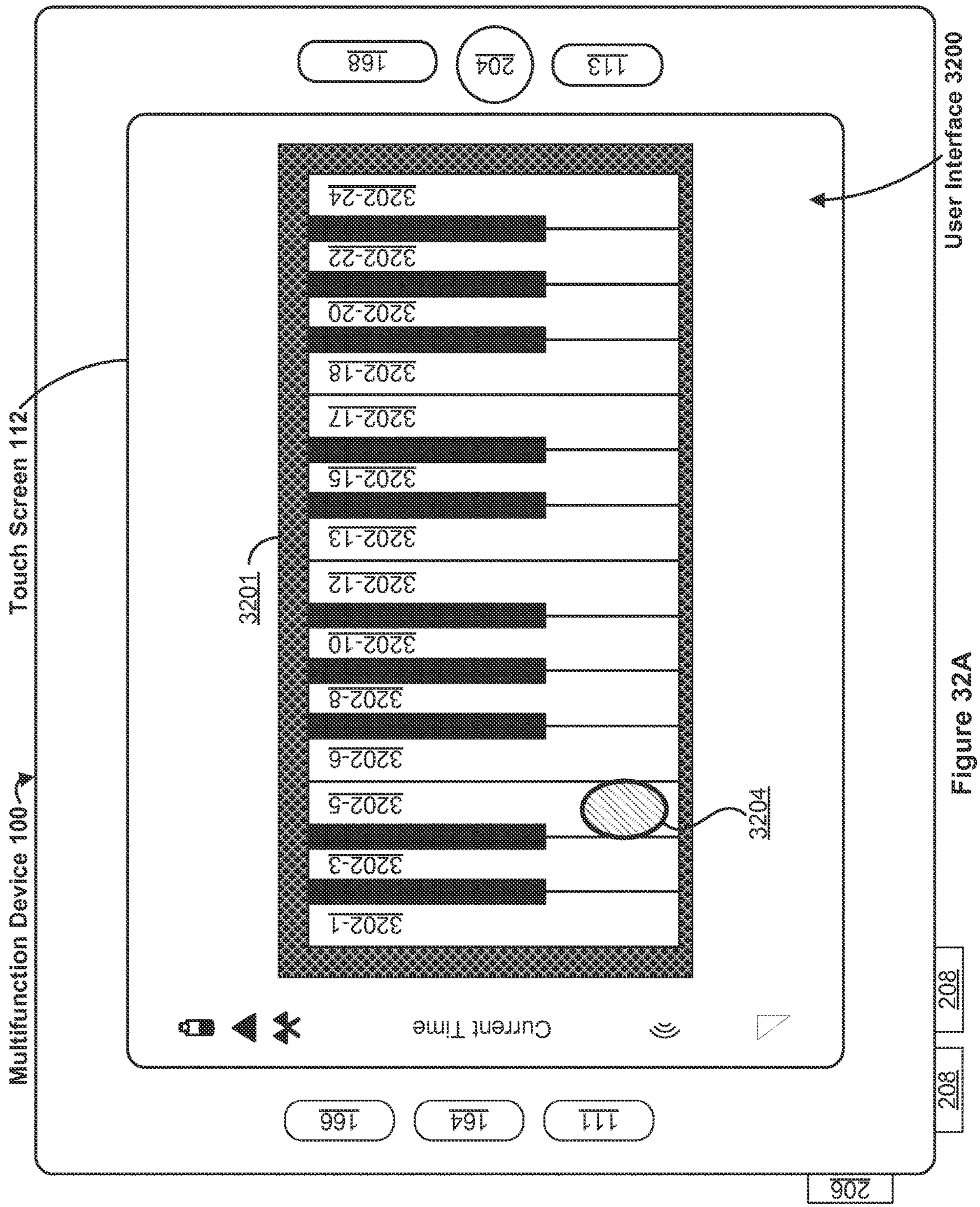
FIGS. 32A-32S illustrate exemplary user interfaces for training a user on proper fingering techniques in accordance with some embodiments.
Figure 32B:
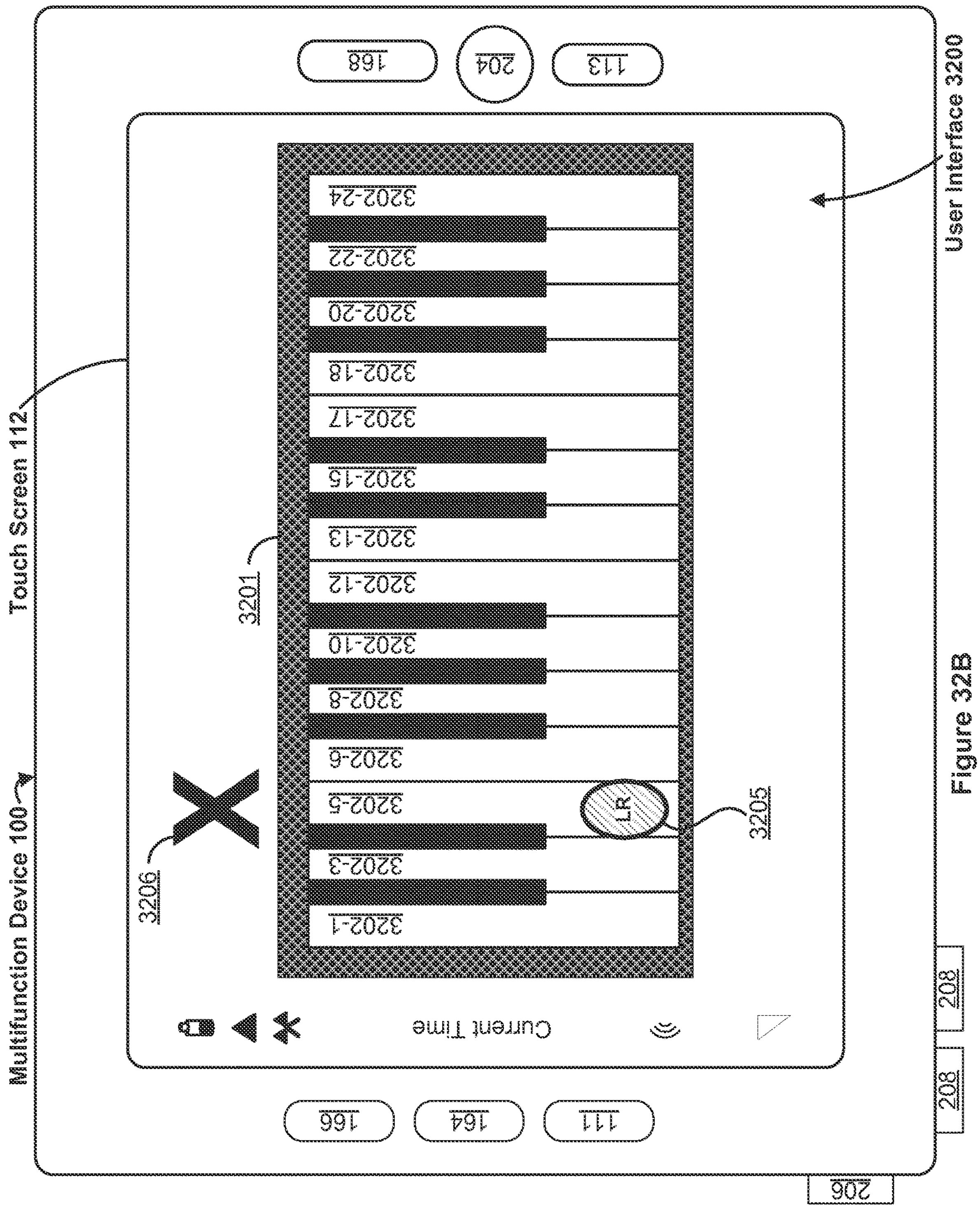
Figure 32S:
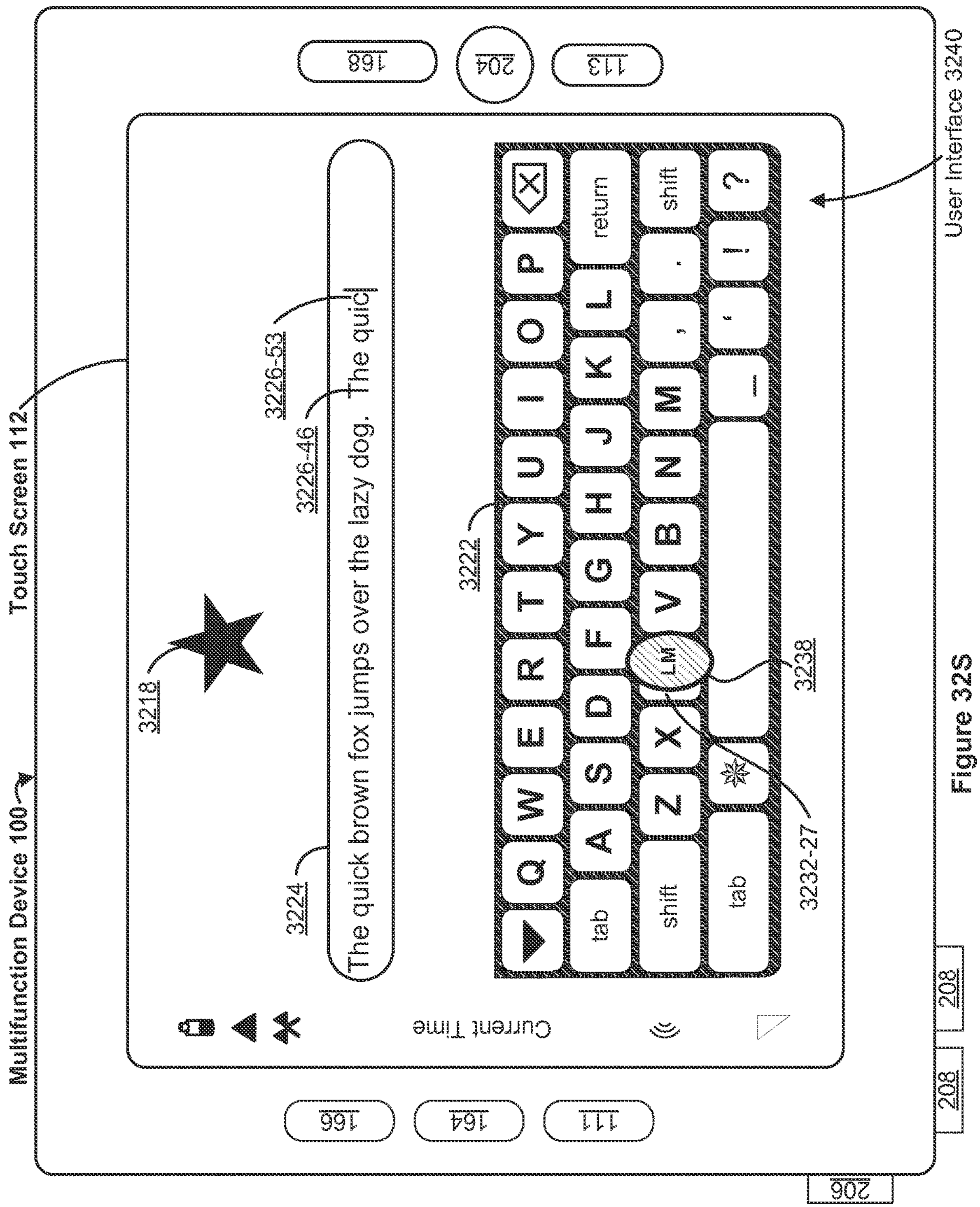
Figure 33A:
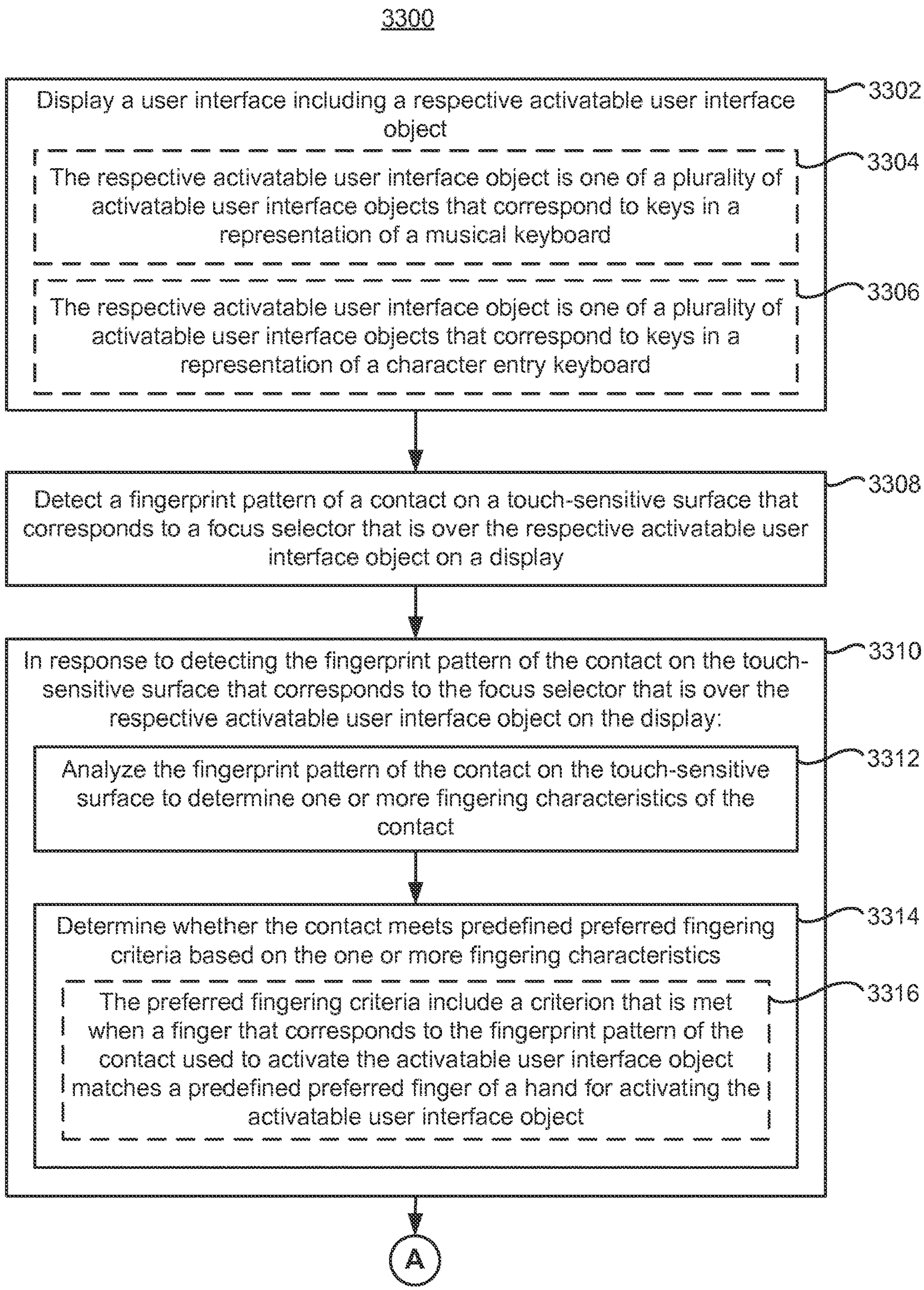
FIGS. 33A-33C are flow diagrams illustrating a method of training a user on proper fingering techniques in accordance with some embodiments.
Figure 33B:
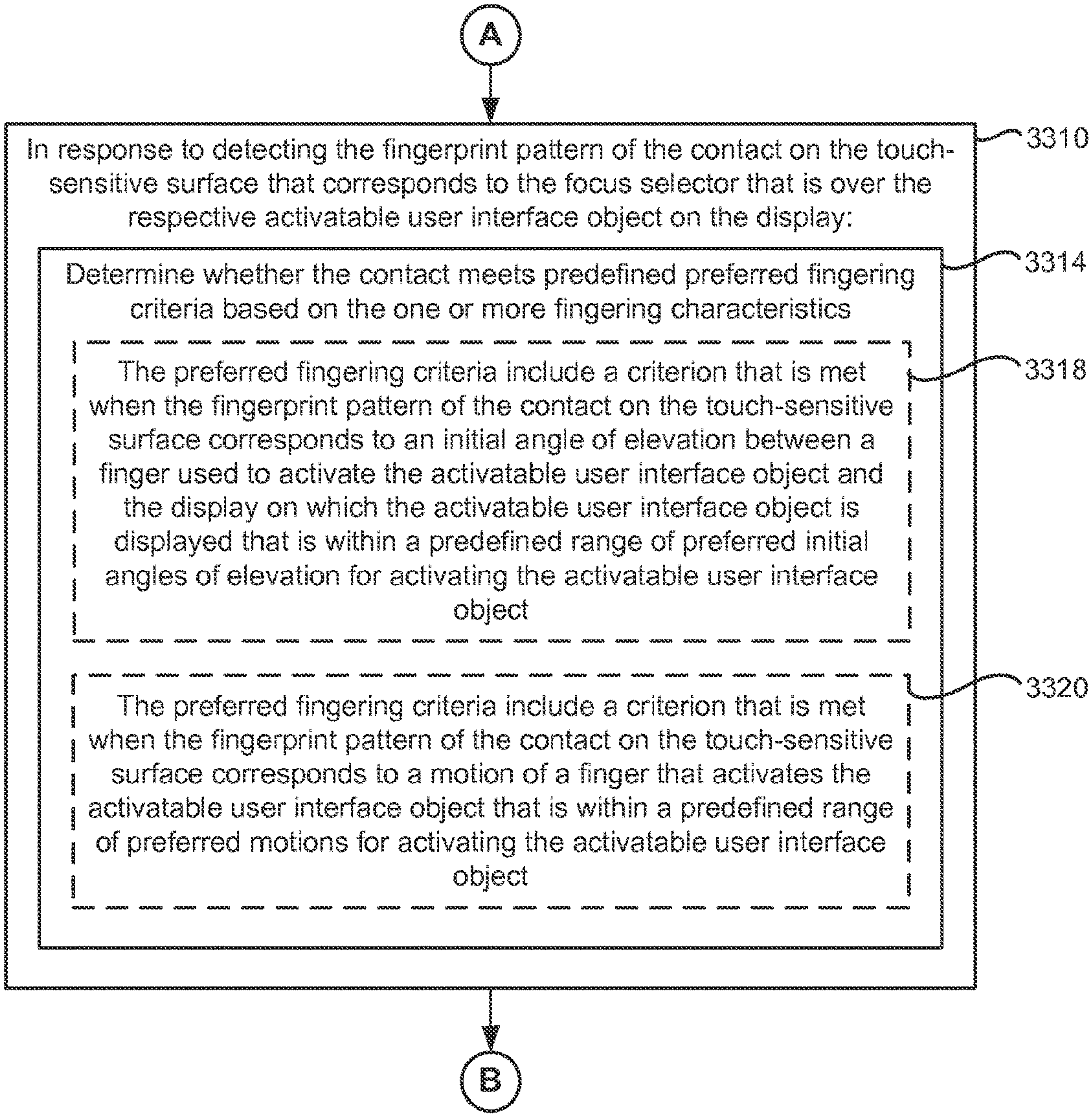
Figure 33C:
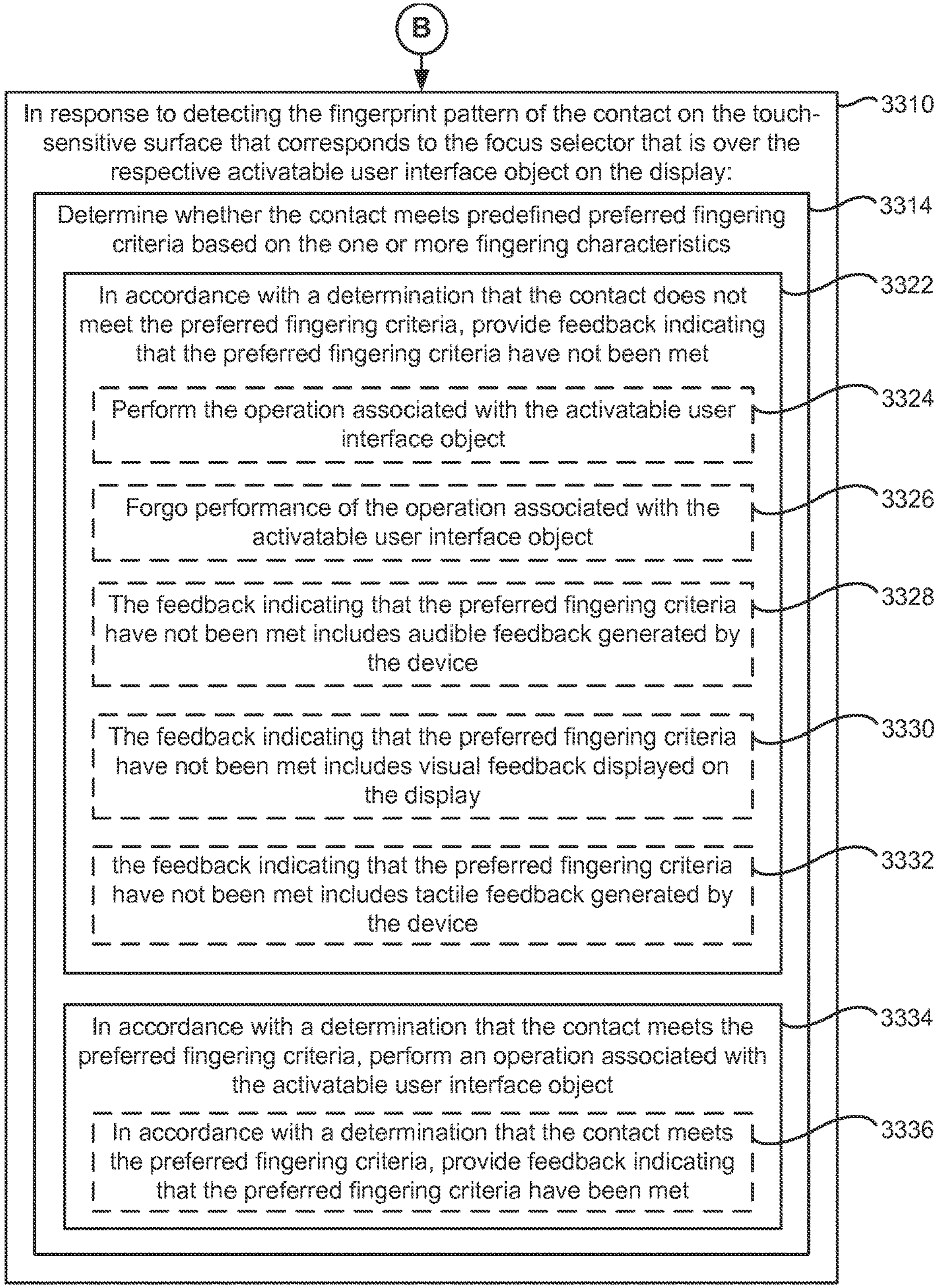
Figure 38A:
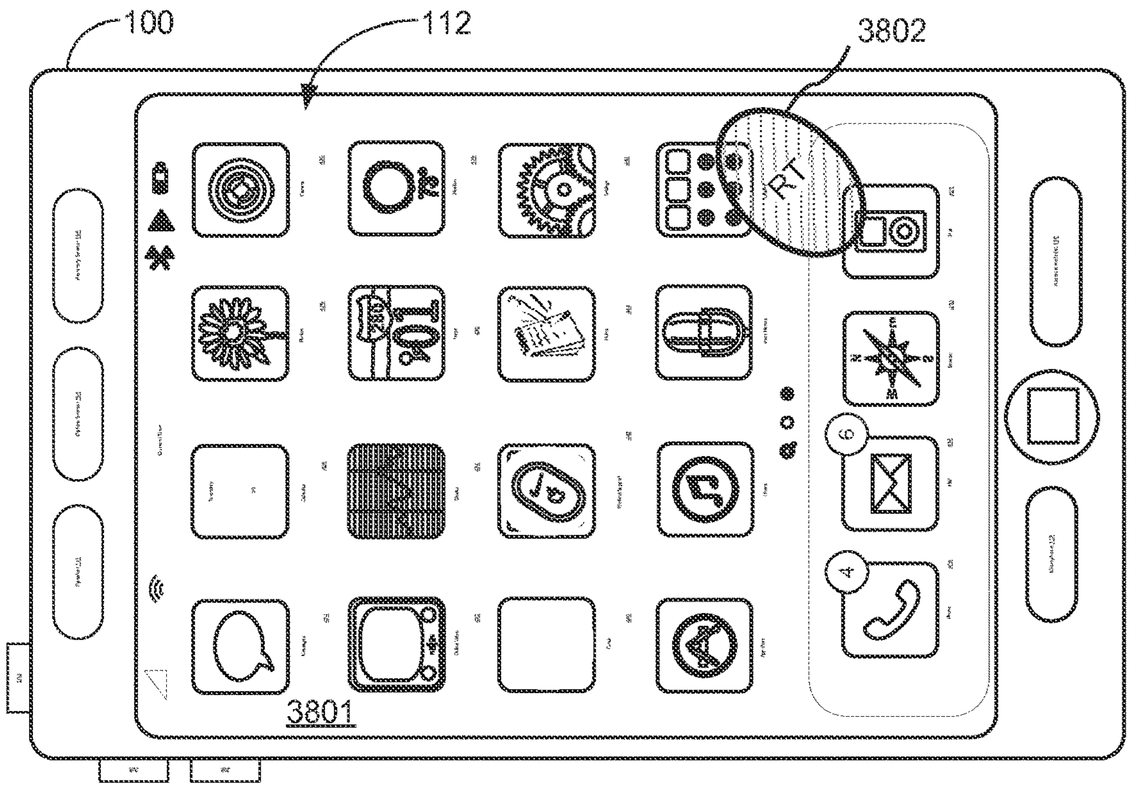
FIGS. 38A-38P illustrate exemplary user interfaces for performing operations associated with fingerprint gestures in accordance with some embodiments.
Figure 38B:
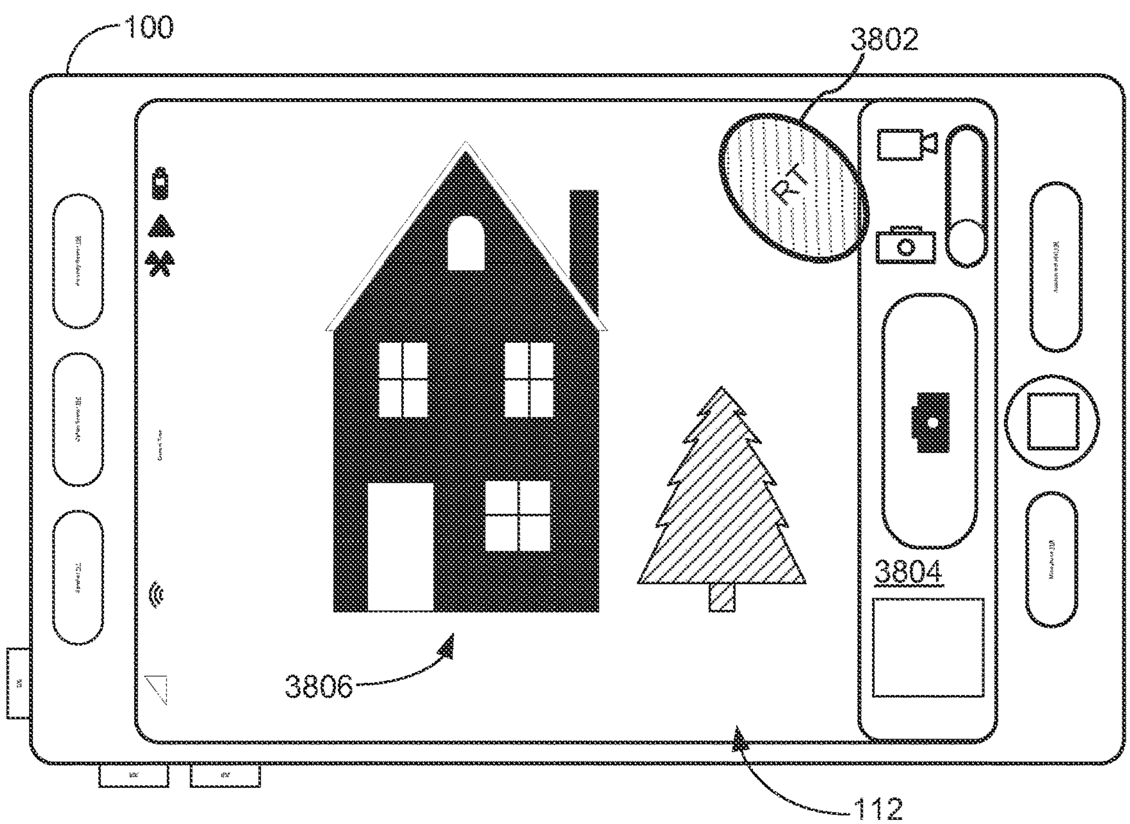

A number of different approaches to providing an intuitive user interface where inputs from one or more fingerprint sensors are used to manipulate a user interface of an electronic device are described below. Using one or more of these approaches (optionally in conjunction with each other) helps to provide a user interface that intuitively provides users with additional information and functionality, thereby reducing the user's cognitive burden and improving the human-machine interface. Such improvements in the human-machine interface enable users to use the device faster and more efficiently. For battery-operated devices, these improvements conserve power and increase the time between battery charges. For ease of explanation, systems, methods and user interfaces for including illustrative examples of some of these approaches are described below, as follows:

- Below, FIGS. 5A-5N illustrate exemplary user interfaces for interacting with user interfaces in accordance with movement of a finger on a fingerprint sensor. FIGS. 6A-6C are flow diagrams illustrating a method of interacting with user interfaces in accordance with movement of a finger on a fingerprint sensor. The user interfaces in FIGS. 5A-5N are used to illustrate the processes in FIGS. 6A-6C.
- Below, FIGS. 8A-8O illustrate exemplary user interfaces for allowing buttons to serve multiple purposes. FIGS. 9A-9C are flow diagrams illustrating a method of allowing buttons to serve multiple purposes. The user interfaces in FIGS. 8A-8O are used to illustrate the processes in FIGS. 9A-9C.
- Below, FIGS. 11A-11F illustrate exemplary user interfaces for locking an orientation of user interface. FIGS. 12A-12B are flow diagrams illustrating a method of locking an orientation of user interface. The user interfaces in FIGS. 11A-11F are used to illustrate the processes in FIGS. 12A-12B.
- Below, FIGS. 14A-14D illustrate exemplary user interfaces for controlling noise reduction in recorded audio with a fingerprint sensor. FIG. 15 is a flow diagram illustrating a method of controlling noise reduction in recorded audio with a fingerprint sensor. The user interfaces in FIGS. 14A-14D are used to illustrate the processes in FIG. 15.
- Below, FIGS. 17A-17K illustrate exemplary user interfaces for performing operations based on a class-based profile. FIGS. 18A-18B are flow diagrams illustrating a method of performing operations based on a class-based profile. The user interfaces in FIGS. 17A-17K are used to illustrate the processes in FIGS. 18A-18B.
- Below, FIGS. 20A-20F illustrate exemplary user interfaces implemented on devices that change logging preferences based on fingerprints. FIGS. 21A-21B are flow diagrams illustrating a method of changing logging preferences based on fingerprints. The user interfaces in FIGS. 20A-20F are used to illustrate the processes in FIGS. 21A-21B.
- Below, FIGS. 23A-23G illustrate exemplary user interfaces for performing a respective restricted operation based on fingerprint-verification information. FIGS. 24A-24D are flow diagrams illustrating a method of performing a respective restricted operation based on fingerprint-verification information. The user interfaces in FIGS. 23A-23G are used to illustrate the processes in FIGS. 24A-24D.
- Below, FIGS. 26A-26G illustrate exemplary user interfaces for associating identity and location information. FIG. 27 is a flow diagram illustrating a method of associating identity and location information. The user interfaces in FIGS. 26A-26G are used to illustrate the processes in FIG. 27.
- Below, FIGS. 29A-29S illustrate exemplary user interfaces for associating areas of a touch-sensitive surface with one or more users. FIGS. 30A-30B are flow diagrams illustrating a method of associating areas of a touch-sensitive surface with one or more users. The user interfaces in FIGS. 29A-29S are used to illustrate the processes in FIGS. 30A-30B.
- Below, FIGS. 32A-32S illustrate exemplary user interfaces for training a user on proper fingering techniques. FIGS. 33A-33C are flow diagrams illustrating a method of training a user on proper fingering techniques. The user interfaces in FIGS. 32A-32S are used to illustrate the processes in FIGS. 33A-33C.
- Below, FIGS. 35A-35J illustrate exemplary user interfaces for operating a portion of a touch-sensitive surface in an enhanced-sensitivity mode of operation. FIGS. 36A-36B are flow diagrams illustrating a method of operating a portion of a touch-sensitive surface in an enhanced-sensitivity mode of operation. The user interfaces in FIGS. 35A-35J are used to illustrate the processes in FIGS. 36A-36B.
- Below, FIGS. 38A-38P illustrate exemplary user interfaces for performing operations associated with fingerprint gestures. FIGS. 39A-39E are flow diagrams illustrating a method of performing operations associated with fingerprint gestures. The user interfaces in FIGS. 38A-38P are used to illustrate the processes in FIGS. 39A-39E.
- Below, FIGS. 41A-41K illustrate exemplary user interfaces for displaying a respective control for a user interface based on detection of a first fingerprint associated with moving the respective control. FIGS. 42A-42C are flow diagrams illustrating a method of displaying a respective control for a user interface based on detection of a first fingerprint associated with moving the respective control. The user interfaces in FIGS. 41A-41K are used to illustrate the processes in FIGS. 42A-42C.
- Below, FIGS. 44A-44EE illustrate exemplary user interfaces for configuring a second electronic device as an auxiliary display of a first electronic device. FIGS. 45A-45D are flow diagrams illustrating a method of configuring a second electronic device as an auxiliary display of a first electronic device. The user interfaces in FIGS. 44A-44EE are used to illustrate the processes in FIGS. 45A-45D.
- Below, FIGS. 47A-47L illustrate exemplary user interfaces for changing beamforming parameters based on fingerprint orientation. FIGS. 48A-48B are flow diagrams illustrating a method of changing beamforming parameters based on fingerprint orientation. The user interfaces in FIGS. 47A-47L are used to illustrate the processes in FIGS. 48A-48B.

Exemplary Devices

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing particular embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch screen displays and/or touch pads), are, optionally, used. It should also be understood that, in some embodiments, the device is not a portable communications device, but is a desktop computer with a touch-sensitive surface (e.g., a touch screen display and/or a touch pad).

In the discussion that follows, an electronic device that includes a display and a touch-sensitive surface is described. It should be understood, however, that the electronic device optionally includes one or more other physical user-interface devices, such as a physical keyboard, a mouse and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Attention is now directed toward embodiments of portable devices with touch-sensitive displays. FIG. 1A is a block diagram illustrating portable multifunction device 100 with touch-sensitive displays 112 in accordance with some embodiments. Touch-sensitive display 112 is sometimes called a "touch screen" for convenience, and is sometimes known as or called a touch-sensitive display system. Device 100 includes memory 102 (which optionally includes one or more computer readable storage mediums), memory controller 122, one or more processing units (CPU's) 120, peripherals interface 118, RF circuitry 108, audio circuitry 110, speaker 111, microphone 113, input/output (I/O) subsystem 106, other input or control devices 116, and external port 124. Device 100 optionally includes one or more optical sensors 164. Device 100 optionally includes one or more intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch sensitive surface, or to a substitute (proxy) for the force or pressure of a contact on the touch sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure and the estimated force or pressure is used to determine whether an intensity threshold has been exceeded (e.g., the intensity threshold is a pressure threshold measured in units of pressure).

As used in the specification and claims, the term “tactile output” refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user’s sense of touch. For example, in situations where the device or the component of the device is in contact with a surface of a user that is sensitive to touch (e.g., a finger, palm, or other part of a user’s hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a “down click” or “up click” of a physical actuator button. In some cases, a user will feel a tactile sensation such as an “down click” or “up click” even when there is no movement of a physical actuator button associated with the touch-sensitive surface that is physically pressed (e.g., displaced) by the user’s movements. As another example, movement of the touch-sensitive surface is, optionally, interpreted or sensed by the user as “roughness” of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an “up click,” a “down click,” “roughness”), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application specific integrated circuits.

Memory 102 optionally includes high-speed random access memory and optionally also includes non-volatile memory, such as one or more magnetic disk storage devices, flash memory devices, or other non-volatile solid-state memory devices. Access to memory 102 by other components of device 100, such as CPU 120 and the peripherals interface 118, is, optionally, controlled by memory controller 122.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data.

In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication optionally uses any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, intensity sensor controller 159, haptic feedback controller 161 and one or more input controllers 160 for other input or control devices. The one or more input controllers 160 receive/send electrical signals from/to other input or control devices 116. The other input control devices 116 optionally include physical buttons (e.g., push buttons, rocker buttons, etc.), dials, slider switches, joysticks, click wheels, and so forth. In some alternate embodiments, input controller(s) 160 are, optionally, coupled to any (or none) of the following: a keyboard, infrared port, USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

Touch-sensitive display 112 provides an input interface and an output interface between the device and a user. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output corresponds to user-interface objects.

Touch screen 112 has a touch-sensitive surface, sensor or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and converts the detected contact into interaction with user-interface objects (e.g., one or more soft keys, icons, web pages or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone®, iPod Touch®, and iPad® from Apple Inc. of Cupertino, Calif.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad (not shown) for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lens, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device, so that the touch screen display is enabled for use as a viewfinder for still and/or video image acquisition. In some embodiments, another optical sensor is located on the front of the device so that the user's image is, optionally, obtained for videoconferencing while the user views the other video conference participants on the touch screen display.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112 which is located on the front of device 100.

Device 100 optionally also includes one or more proximity sensors 166. FIG. 1A shows proximity sensor 166 coupled to peripherals interface 118. Alternately, proximity sensor 166 is coupled to input controller 160 in I/O subsystem 106. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112 which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. In some embodiments, information is displayed on the touch screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

In some embodiments, device 100 also includes (or is in communication with) one or more fingerprint sensors 169. FIG. 1A shows fingerprint sensor 169 coupled to peripherals interface 118. Alternately, fingerprint sensors 169 are, optionally, coupled to an input controller 160 in I/O subsystem 106. However, in one common embodiment, fingerprint identification operations are performed using secured dedicated computing hardware (e.g., one or more processors, memory and/or communications busses) that has additional security features so as to enhance security of the fingerprint information determined by the fingerprint sensors. As used herein, a fingerprint sensor is a sensor that is capable of distinguishing fingerprint features (sometimes called "minutia features") of the ridges and valleys of skin such as those found on the fingers and toes of humans. A fingerprint sensor can use any of a variety of techniques to distinguish the fingerprint features, including but not limited to: optical fingerprint imaging, ultrasonic fingerprint imaging, active capacitance fingerprint imaging and passive capacitance fingerprint imaging. In addition to distinguishing fingerprint features in fingerprints, in some embodiments, fingerprint sensor 169 is capable of tracking movement of fingerprint features over time and thereby determining/characterizing movement of the fingerprint over time on the fingerprint sensor. While the fingerprint sensor (e.g., Fingerprint Sensor 169) in FIG. 1A is shown as being separate from the touch-sensitive surface (e.g., Touch-Sensitive Display System 112), it should be understood that in some implementations, the touch-sensitive surface (e.g., Touch-Sensitive Display System 112) has a spatial resolution that is high enough to detect fingerprint features formed by individual fingerprint ridges and is used as a fingerprint sensor instead of, or in addition to, a separate fingerprint sensor (e.g., Fingerprint Sensor 169). In some embodiments, device 100 includes a set of one or more orientation sensors that are used to determine an orientation of a finger or hand on or proximate to the device (e.g., an orientation of a finger that is over fingerprint sensor 169). Additionally, in some embodiments, the set of one or more orientation sensors are used in addition to or instead of a fingerprint sensor to detect rotation of a contact that is interacting with the device (e.g., in one or more of the methods described below, instead of using a fingerprint sensor to detect rotation of a fingerprint/contact, the set of one or more orientation sensors is used to detect rotation of the contact that includes the fingerprint, with or without detecting features of the fingerprint).

In some embodiments, features of fingerprints and comparisons between features of detected fingerprints and features of stored fingerprints are performed by secured dedicated computing hardware (e.g., one or more processors, memory and/or communications busses) that are separate from processors 120, so as to improve security of the fingerprint data generated, stored and processed by fingerprint sensor 169. In some embodiments, features of fingerprints and comparisons between features of detected fingerprints and features of stored fingerprints are performed by processors 120 using fingerprint analysis module 131.

Figure 3:
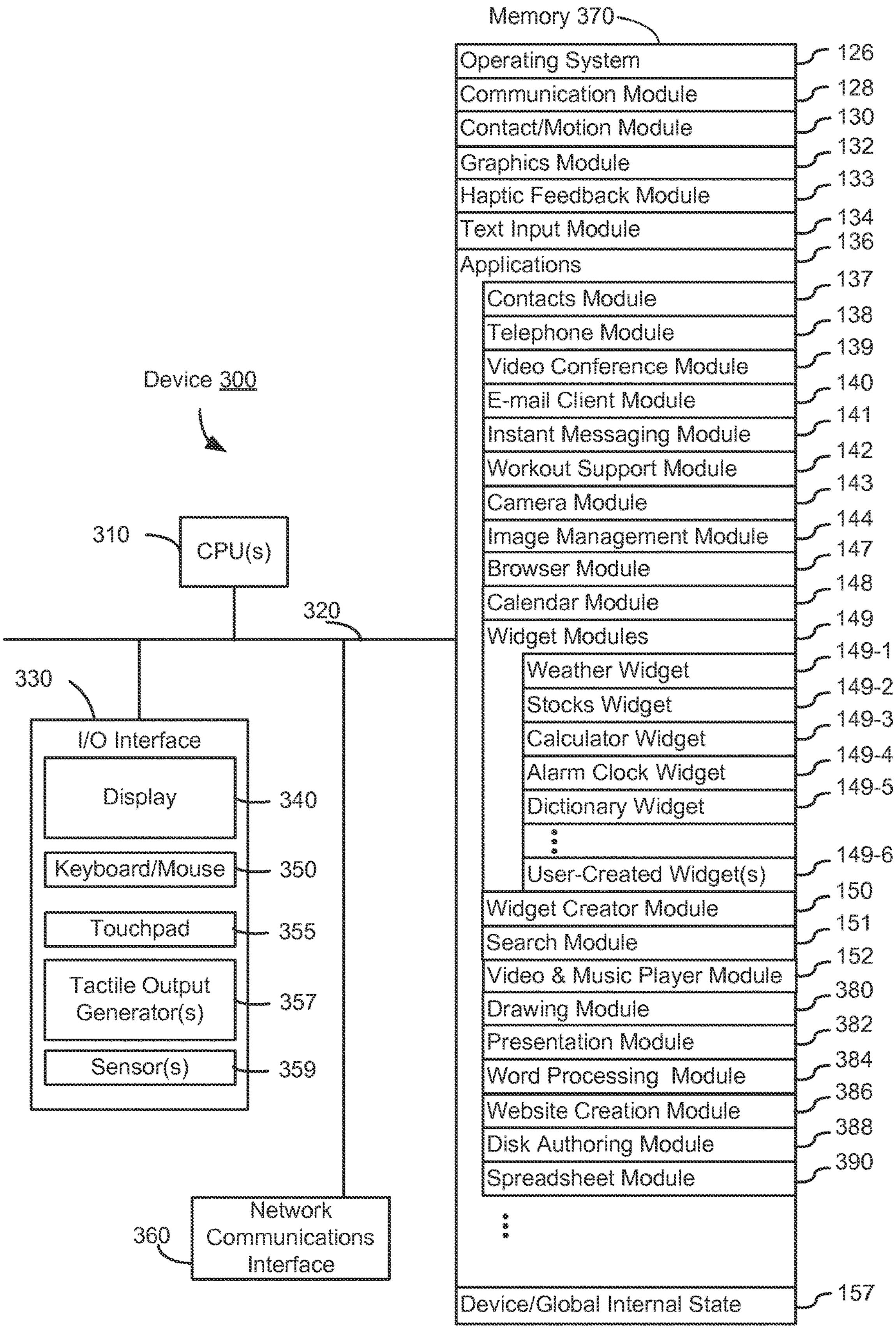
FIG. 3 is a block diagram of an exemplary multifunction device with a display and a plurality of sensors including a fingerprint sensor and, optionally a touch-sensitive surface in accordance with some embodiments.

In some embodiments, the software components stored in memory 102 include operating system 126, communication module (or set of instructions) 128, contact/motion module (or set of instructions) 130, fingerprint analysis module 131, graphics module (or set of instructions) 132, text input module (or set of instructions) 134, Global Positioning System (GPS) module (or set of instructions) 135, and applications (or sets of instructions) 136. Furthermore, in some embodiments memory 102 stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used on iPod (trademark of Apple Inc.) devices.

Contact/motion module 130 optionally detects contact with touch screen 112 (in conjunction with display controller 156) and other touch sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined thresholds values without changing the trackpad or touch screen display hardware. Additionally, in some implementations a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event.

Graphics module 132 includes various known software components for rendering and displaying graphics on touch screen 112 or other display, including components for changing the visual impact (e.g., brightness, transparency, saturation, contrast or other visual property) of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing, to camera 143 as picture/video metadata, and to applications that provide location-based services such as weather widgets, local yellow page widgets, and map/navigation widgets).

Applications 136 optionally include the following modules (or sets of instructions), or a subset or superset thereof:

- contacts module 137 (sometimes called an address book or contact list);
- telephone module 138;
- video conferencing module 139;
- e-mail client module 140;
- instant messaging (IM) module 141;
- workout support module 142;
- camera module 143 for still and/or video images;
- image management module 144;
- browser module 147;
- calendar module 148;
- widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
- widget creator module 150 for making user-created widgets 149-6;
- search module 151;
- video and music player module 152, which is, optionally, made up of a video player module and a music player module;
- notes module 153;
- map module 154; and/or
- online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference 139, e-mail 140, or IM 141; and so forth.

In conjunction with RF circuitry 108, audio circuitry 110, speaker 111, microphone 113, touch screen 112, display controller 156, contact module 130, graphics module 132, and text input module 134, telephone module 138 are, optionally, used to enter a sequence of characters corresponding to a telephone number, access one or more telephone numbers in address book 137, modify a telephone number that has been entered, dial a respective telephone number, conduct a conversation and disconnect or hang up when the conversation is completed. As noted above, the wireless communication optionally uses any of a plurality of communications standards, protocols and technologies.

In conjunction with RF circuitry 108, audio circuitry 110, speaker 111, microphone 113, touch screen 112, display controller 156, optical sensor 164, optical sensor controller 158, contact module 130, graphics module 132, text input module 134, contact list 137, and telephone module 138, videoconferencing module 139 includes executable instructions to initiate, conduct, and terminate a video conference between a user and one or more other participants in accordance with user instructions.

In conjunction with RF circuitry 108, touch screen 112, display controller 156, contact module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages and to view received instant messages. In some embodiments, transmitted and/or received instant messages optionally include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact module 130, graphics module 132, text input module 134, GPS module 135, map module 154, and music player module 146, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store and transmit workout data.

In conjunction with touch screen 112, display controller 156, optical sensor(s) 164, optical sensor controller 158, contact module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display system controller 156, contact module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display system controller 156, contact module 130, graphics module 132, text input module 134, e-mail client module 140, and browser module 147, calendar module 148 includes executable instructions to create, display, modify, and store calendars and data associated with calendars (e.g., calendar entries, to do lists, etc.) in accordance with user instructions.

In conjunction with RF circuitry 108, touch screen 112, display system controller 156, contact module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display system controller 156, contact module 130, graphics module 132, text input module 134, and browser module 147, the widget creator module 150 are, optionally, used by a user to create widgets (e.g., turning a user-specified portion of a web page into a widget).

In conjunction with touch screen 112, display system controller 156, contact module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display system controller 156, contact module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact module 130, graphics module 132, and text input module 134, notes module 153 includes executable instructions to create and manage notes, to do lists, and the like in accordance with user instructions.

In conjunction with RF circuitry 108, touch screen 112, display system controller 156, contact module 130, graphics module 132, text input module 134, GPS module 135, and browser module 147, map module 154 are, optionally, used to receive, display, modify, and store maps and data associated with maps (e.g., driving directions; data on stores and other points of interest at or near a particular location; and other location-based data) in accordance with user instructions.

In conjunction with touch screen 112, display system controller 156, contact module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules are, optionally, combined or otherwise re-arranged in various embodiments. In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a “menu button” is implemented using a touchpad. In some other embodiments, the menu button is a physical push button or other physical input control device instead of a touchpad.

Figure 1B:
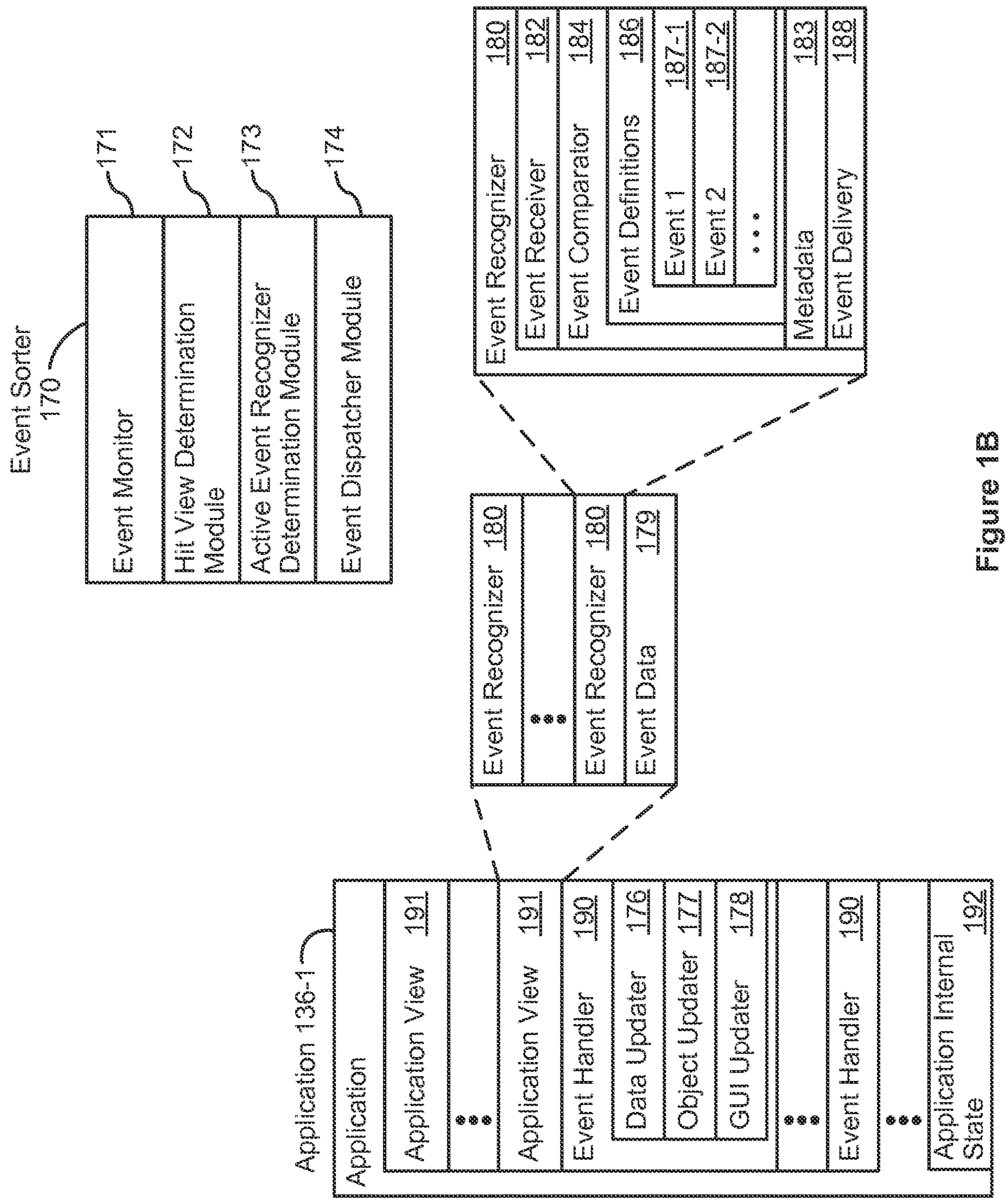
FIG. 1B is a block diagram illustrating exemplary components for event handling in accordance with some embodiments.

FIG. 1B is a block diagram illustrating exemplary components for event handling in accordance with some embodiments. In some embodiments, memory 102 (in FIG. 1A) or 370 (FIG. 3) includes event sorter 170 (e.g., in operating system 126) and a respective application 136-1 (e.g., any of the aforementioned applications 137-13, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripheral interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views, when touch sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (i.e., the first sub-event in the sequence of sub-events that form an event or potential event). Once the hit view is identified by the hit view determination module, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver module 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177 or GUI updater 178 to update the application internal state 192. Alternatively, one or more of the application views 191 includes one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170, and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event 187 include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first lift-off (touch end) for a predetermined phase, a second touch (touch begin) on the displayed object for a predetermined phase, and a second lift-off (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and lift-off of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event 187 also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module 145. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input-devices, not all of which are initiated on touch screens. For example, mouse movement and mouse button presses, optionally coordinated with single or multiple keyboard presses or holds; contact movements such as taps, drags, scrolls, etc., on touch-pads; pen stylus inputs; movement of the device; oral instructions; detected eye movements; biometric inputs; and/or any combination thereof are optionally utilized as inputs corresponding to sub-events which define an event to be recognized.

Figure 2:
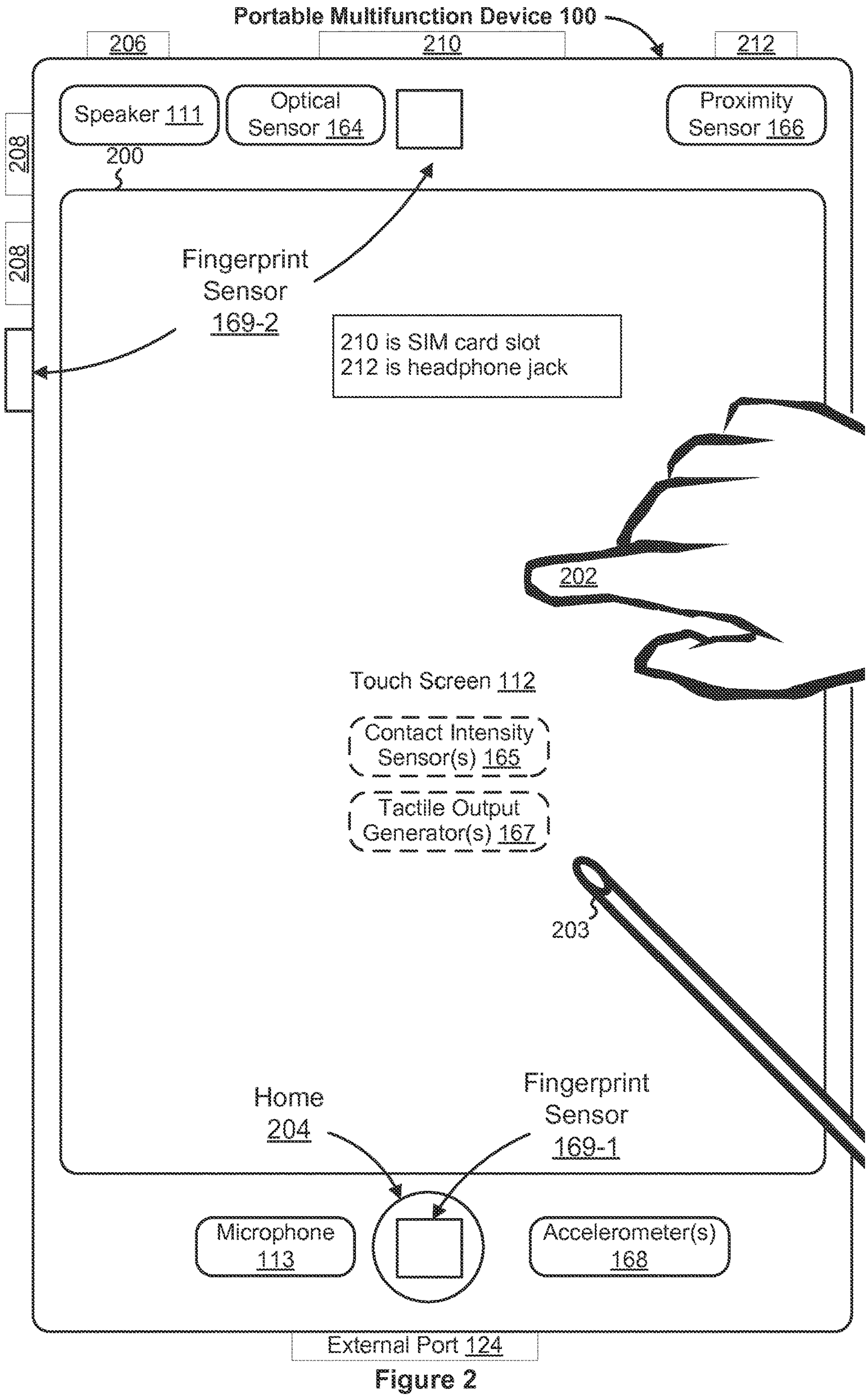
FIG. 2 illustrates a portable multifunction device having a touch screen and a fingerprint sensor in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward) and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also includes one or more physical buttons, such as "home" or menu button 204. As described previously, menu button 204 is, optionally, used to navigate to any application 136 in a set of applications that are, optionally executed on device 100. Alternatively, in some embodiments, the menu button is implemented as a soft key in a GUI displayed on touch screen 112. In some embodiments button 204 includes an integrated fingerprint sensor 169-1 for identifying a fingerprint that is interacting with button 204 and/or detecting movement of the fingerprint on button 204. Device also, optionally, includes one or more other fingerprint sensors 169-2 that are separate from button 204 and are used instead of or in conjunction with a fingerprint sensor 169-1 integrated into button 204 to identify a user interacting with the device and/or detect motion of the fingerprint. Additionally, one or more of the other fingerprint sensors 169-2 are optionally associated with a button (e.g., a pressure sensitive region that is activated by detecting an input with an intensity above an activation intensity threshold or a physical actuator that moves in response force applied by a user). In implementations where the touch-sensitive surface (e.g., Touch Screen 112) has a spatial resolution that is high enough to detect fingerprint features formed by individual fingerprint ridges, the touch-sensitive surface (e.g., Touch Screen 112) is optionally used as a fingerprint sensor instead of, or in addition to, a separate fingerprint sensor (e.g., Fingerprint Sensors 169-1 or 169-2). In some embodiments, device 100 includes a set of one or more orientation sensors that are used to determine an orientation of a hand on device 100.

In one embodiment, device 100 includes touch screen 112, menu button 204, push button 206 for powering the device on/off and locking the device, volume adjustment button(s) 208, Subscriber Identity Module (SIM) card slot 210, head set jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPU's) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A, and/or fingerprint sensors similar to fingerprint sensor(s) 169 described above with reference to FIG. 1A). Additionally, in implementations where the touch-sensitive surface (e.g., Touchpad 355) has a spatial resolution that is high enough to detect fingerprint features formed by individual fingerprint ridges, the touch-sensitive surface (e.g., Touchpad 355) is optionally used as a fingerprint sensor instead of, or in addition to, a separate fingerprint sensor (e.g., one of sensors 359). In some embodiments, device 300 includes a set of one or more orientation sensors that are used to determine an orientation of a finger or hand on or proximate to the device (e.g., an orientation of a finger that is over fingerprint sensor 169). Additionally, in some embodiments, the set of one or more orientation sensors are used in addition to or instead of a fingerprint sensor to detect rotation of a contact that is interacting with the device. For example, in one or more of the methods described below, instead of using a fingerprint sensor to detect rotation of a fingerprint/contact, the set of one or more orientation sensors is used to detect rotation of the contact that includes the fingerprint, with or without detecting features of the fingerprint.

Memory 370 includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above identified elements in FIG. 3 are, optionally, stored in one or more of the previously mentioned memory devices. Each of the above identified modules corresponds to a set of instructions for performing a function described above. The above identified modules or programs (i.e., sets of instructions) need not be implemented as separate software programs, procedures or modules, and thus various subsets of these modules are, optionally, combined or otherwise re-arranged in various embodiments. In some embodiments, memory 370 optionally stores a subset of the modules and data structures identified above. Furthermore, memory 370 optionally stores additional modules and data structures not described above.

Attention is now directed towards embodiments of user interfaces ("UI") that is, optionally, implemented on portable multifunction device 100.

Figure 4A:
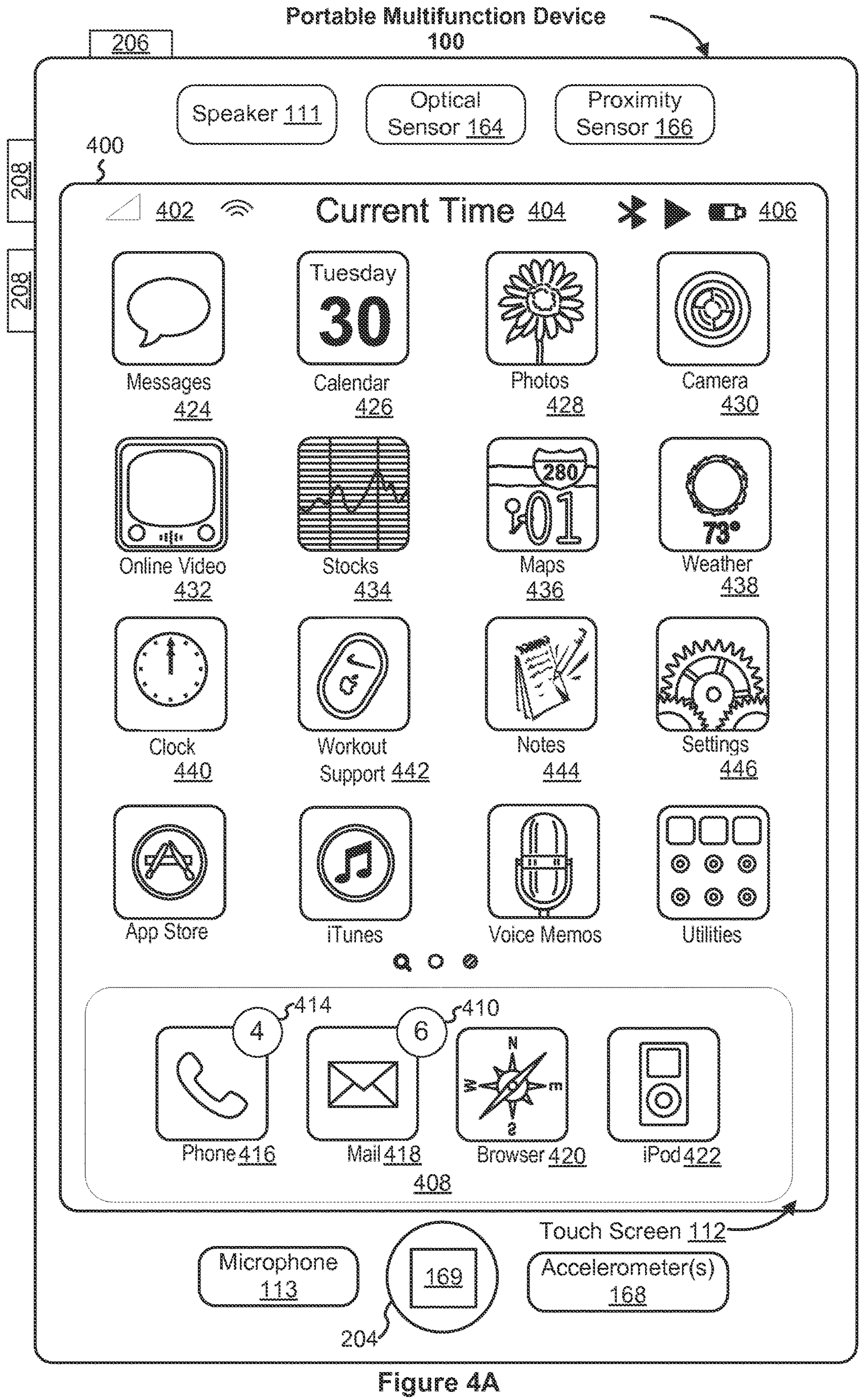
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

- Signal strength indicator(s) 402 for wireless communication(s), such as cellular and Wi-Fi signals;
- Time 404;
- Bluetooth indicator 405;
- Battery status indicator 406;
- Tray 408 with icons for frequently used applications, such as:
  - Icon 416 for telephone module 138, labeled "Phone," which optionally includes an indicator 414 of the number of missed calls or voicemail messages;
  - Icon 418 for e-mail client module 140, labeled "Mail," which optionally includes an indicator 410 of the number of unread e-mails;
  - Icon 420 for browser module 147, labeled "Browser;" and
  - Icon 422 for video and music player module 152, also referred to as iPod (trademark of Apple Inc.) module 152, labeled "iPod;" and
- Icons for other applications, such as:
  - Icon 424 for IM module 141, labeled "Text;"
  - Icon 426 for calendar module 148, labeled "Calendar;"
  - Icon 428 for image management module 144, labeled "Photos;"
  - Icon 430 for camera module 143, labeled "Camera;"
  - Icon 432 for online video module 155, labeled "Online Video"
  - Icon 434 for stocks widget 149-2, labeled "Stocks;"
  - Icon 436 for map module 154, labeled "Map;"
  - Icon 438 for weather widget 149-1, labeled "Weather;"
  - Icon 440 for alarm clock widget 149-4, labeled "Clock;"
  - Icon 442 for workout support module 142, labeled "Workout Support;"
  - Icon 444 for notes module 153, labeled "Notes;" and
  - Icon 446 for a settings application or module, which provides access to settings for device 100 and its various applications 136.

It should be noted that the icon labels illustrated in FIG. 4A are merely exemplary. For example, icon 422 for video and music player module 152 are labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 4B:
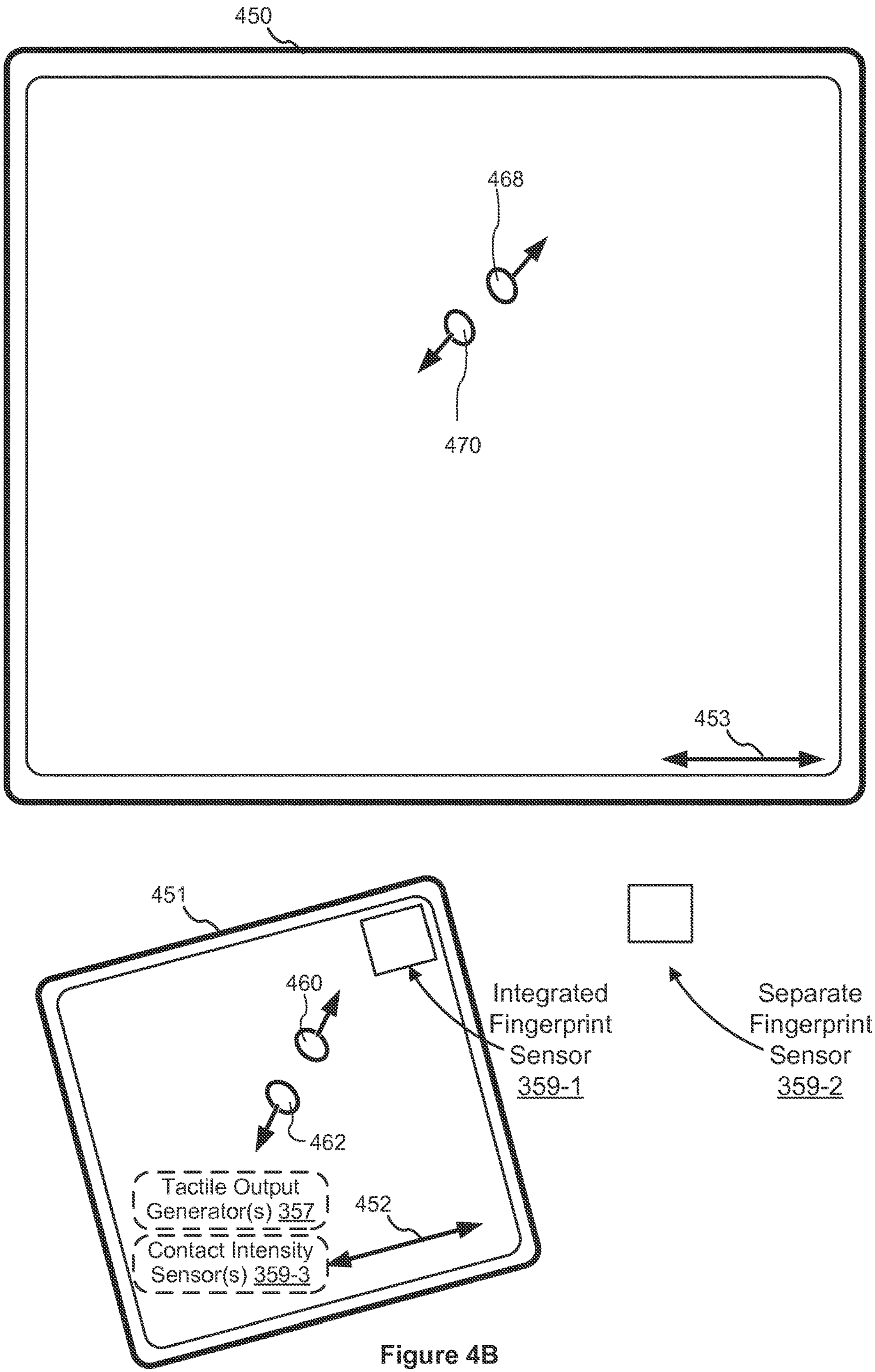
FIG. 4B illustrates an exemplary user interface for a multifunction device with a fingerprint sensor and a touch-sensitive surface that is separate from the display in accordance with some embodiments.

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112) with an integrated 359-1 (or separate 359-2) fingerprint sensor (e.g., one or more of sensors 359 that operates in an analogous manner to fingerprint sensor 169 in FIG. 1A). Additionally, in implementations where the touch-sensitive surface 451 has a spatial resolution that is high enough to detect fingerprint features formed by individual fingerprint ridges, the touch-sensitive surface 451 is optionally used as a fingerprint sensor instead of, or in addition to, a distinct fingerprint sensor (e.g., integrated fingerprint sensor 359-1 or separate fingerprint sensor 359-2). Device 300 also, optionally, includes one or more contact intensity sensors (e.g., one or more of sensors 359-3) for detecting intensity of contacts on touch-sensitive surface 451 and/or one or more tactile output generators 357 for generating tactile outputs for a user of device 300.

Although some of the examples which follow will be given with reference to inputs on touch screen display 112 (where the touch sensitive surface and the display are combined), in some embodiments, the device detects inputs on a touch-sensitive surface that is separate from the display, as shown in FIG. 4B. In some embodiments the touch sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

As used herein, the term "focus selector" refers to an input element that indicates a current part of a user interface with which a user is interacting. In some implementations that include a cursor or other location marker, the cursor acts as a "focus selector," so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider or other user interface element), the particular user interface element is adjusted in accordance with the detected input. In some implementations that include a touch-screen display (e.g., touch-sensitive display system 112 in FIG. 1A or touch screen 112 in FIG. 4A) that enables direct interaction with user interface elements on the touch-screen display, a detected contact on the touch-screen acts as a "focus selector," so that when an input (e.g., a press input by the contact) is detected on the touch-screen display at a location of a particular user interface element (e.g., a button, window, slider or other user interface element), the particular user interface element is adjusted in accordance with the detected input. In some implementations focus is moved from one region of a user interface to another region of the user interface without corresponding movement of a cursor or movement of a contact on a touch-screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch-screen display) that is controlled by the user so as to communicate the user's intended interaction with the user interface (e.g., by indicating, to the device, the element of the user interface with which the user is intending to interact). For example, the location of a focus selector (e.g., a cursor, a contact or a selection box) over a respective button while a press input is detected on the touch-sensitive surface (e.g., a touchpad or touch screen) will indicate that the user is intending to activate the respective button (as opposed to other user interface elements shown on a display of the device).

Figure 4C:
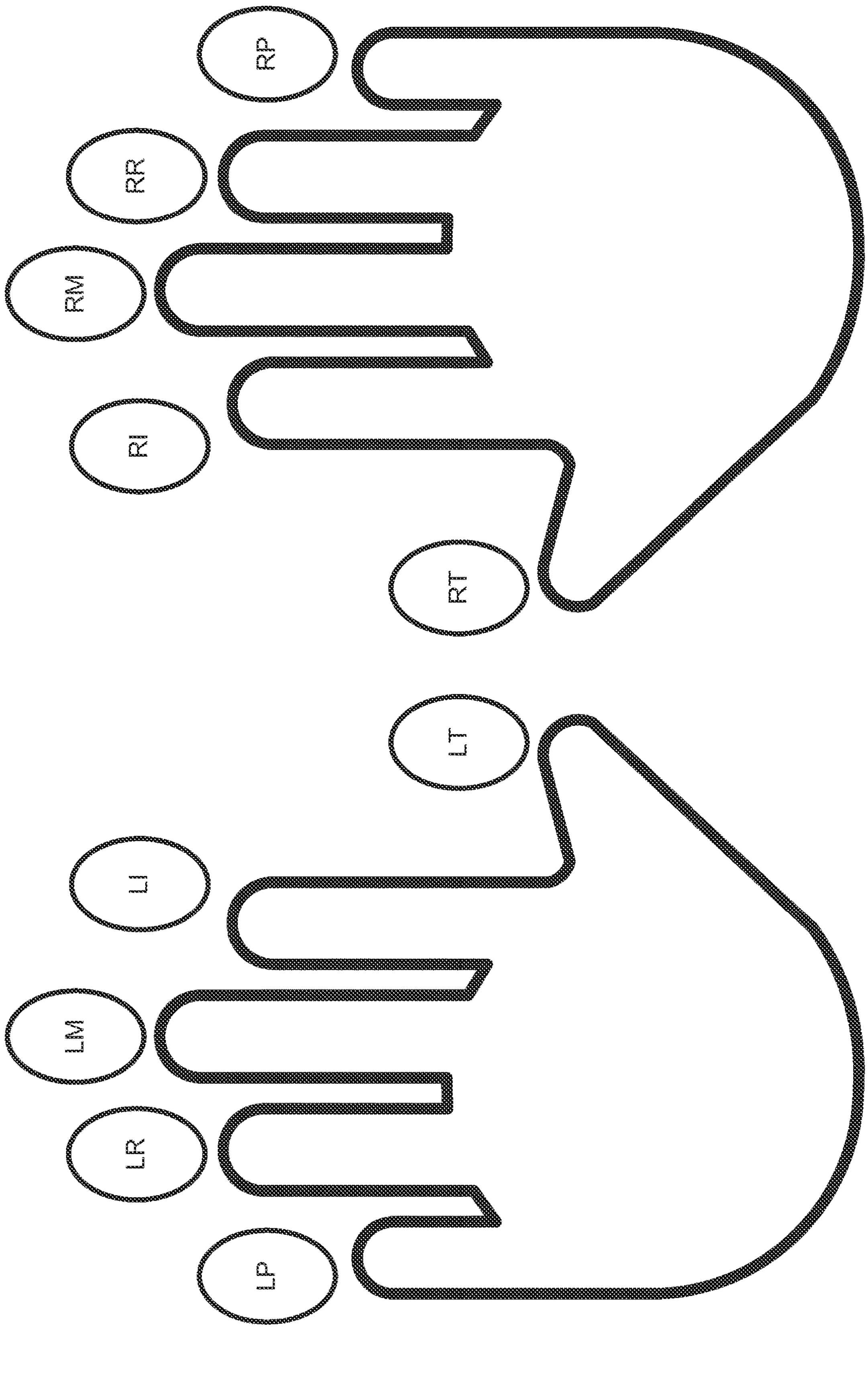
FIG. 4C illustrates a schematic representation of a two hands with associated fingerprints in accordance with some embodiments.

FIG. 4C shows a schematic representation of a two hands with associated fingerprints LP ("left pinky" fingerprint), LR ("left ring" fingerprint), LM ("left middle" fingerprint), LI ("left index" fingerprint), LT ("left thumb" fingerprint), RT ("right thumb" fingerprint), RI ("right index" fingerprint), RM ("right middle" fingerprint), RR ("right ring" fingerprint), RP ("right pinky" fingerprint). These abbreviations will be used with reference to other figures showing examples of interactions with a fingerprint sensor. For some of the methods described herein, one or more fingerprints of a user are registered by collecting information about the fingerprint that would enable the fingerprint to be identified. These registered fingerprints or pre-registered fingerprints are also sometimes referred to as enrolled fingerprints. In many situations described below, fingerprints detected on a fingerprint sensor are compared against previously registered fingerprints (e.g., enrolled fingerprints).

Figure 4D:
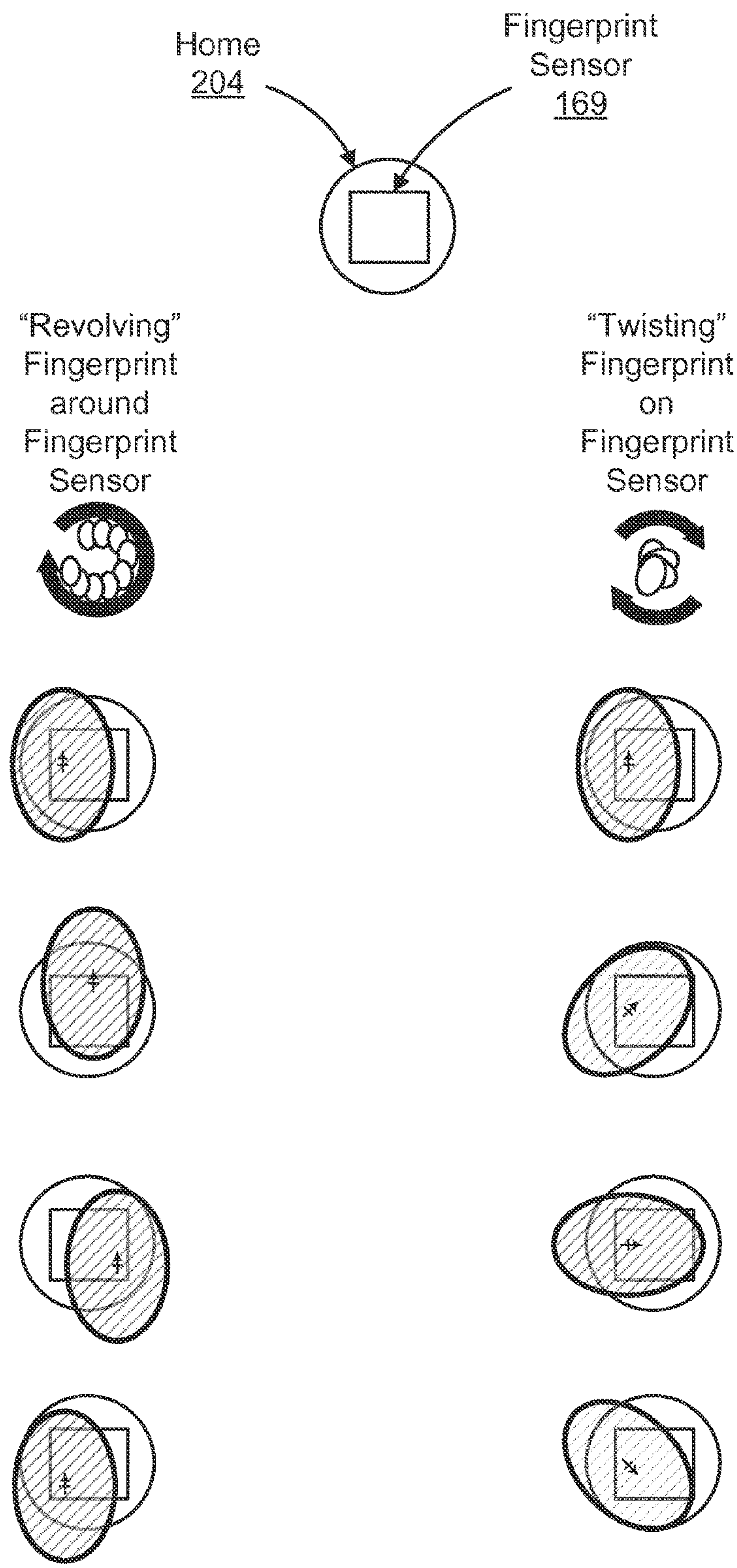
FIG. 4D illustrates different types of rotation of a fingerprint on a fingerprint sensor in accordance with some embodiments.

FIG. 4D shows two different types of rotation of a fingerprint on a fingerprint sensor (e.g., fingerprint sensor 169 that is integrated into button 204). On the left side of FIG. 4D, is an example of a fingerprint "revolving" around a fingerprint sensor, where a centroid of the fingerprint moves in a looping motion (e.g., a circular-type motion) around a center of the fingerprint sensor. On the right side of FIG. 4D, is an example of a fingerprint "twisting" on a fingerprint sensor, where a primary axis of the fingerprint changes orientation relative to the fingerprint sensor. These terms (e.g., "revolving" and "twisting") will be used to described different types of rotation of a fingerprint on a fingerprint sensor with reference to other figures showing examples of interactions with a fingerprint sensor.

As shown in FIG. 4D, in some embodiments, the fingerprint sensor is smaller than, or approximately the same size as, an average fingerprint. Thus, in some embodiments, the fingerprint sensor detects movement of the fingerprint (e.g., fingerprint gestures) by detecting movement of fingerprint features of the fingerprint instead of or in addition to detecting movement of edges of the fingerprint. In other words, in some implementations, the fingerprint sensor detects movement of the fingerprint not by determining movement of an outline of the fingerprint (e.g., a "contact") but by detecting movement of ridges (or specific minutia points in the ridges) of the fingerprint over the fingerprint sensor. Without regard to whether the fingerprint sensor is larger or smaller than the fingerprint, detecting movement of a fingerprint (e.g., fingerprint gestures) based on movement of fingerprint features instead of, or in addition to, detecting movement of the fingerprint based on movement of an edge or outline of the fingerprint enables movement of the fingerprint to be tracked in much greater detail and provides the ability to track fingerprint movement even when a fingerprint is covering all or a large portion of the fingerprint sensor.

User Interfaces and Associated Processes

Interacting with User Interfaces

Many electronic devices have graphical user interfaces that allow users to perform a variety of functions and operations associated with the respective user interfaces (e.g., home screen or application launch interfaces with user-selectable icons for selecting applications to be launched; application interfaces associated with applications such as maps for performing navigation operations, calculators for performing computation, photo viewers for viewing digital photographs, search applications, camera applications and the like; system user interfaces associated with various system level functions). While interacting with such interfaces, the user frequently desires to navigate through a given user interface; or to switch from one user interface to another (e.g., from a calculator application interface to a photo viewing application interface; or from a home screen interface to a camera application interface; and the like) or to switch from an application user interface to a system user interface (e.g., to a multi-tasking user interface). Some approaches to navigating through a user interface involve making long sustained swiping gestures across a substantial portion of a touch-sensitive surface (such a touch screen display). Some approaches for switching between application user interfaces (e.g., switching between applications) involve returning to a home screen and then toggling through pages of the home screen to view an icon corresponding to a desired application, and then selecting the icon corresponding to the desired application to launch the desired application. Similarly, some approaches to switching to a multi-tasking user interface involve making multiple concurrent contacts with the home or menu button in order to display a system user interface. These approaches are cumbersome and require the user to either make sustained movements of one or more finger contacts with a touch-sensitive surface or to make multiple sequential contacts with the device, which can take a long time or be difficult for a user to remember.

The disclosed embodiments provide a convenient and efficient method of interacting with user interfaces (e.g., either navigating through a current user interface or displaying a different user interface) through the use of a single short movement of a fingerprint (e.g., detected on a fingerprint sensor located on the device) in one of two directions. While displaying a first user interface (such as an application user interface), in response to detecting a fingerprint movement on the fingerprint sensor in a first direction (e.g., horizontally, from right to left, or left to right), the device navigates through the first user interface (e.g., translates or scrolls at least a portion of the content in the first user interface) and in response to detecting a fingerprint movement on the fingerprint sensor in a second direction (e.g., a vertical direction, upward), the device displays a second user interface (e.g., a multi-tasking user interface or the user interface corresponding to a most recently used application). As a result, the user has the improved convenience of interacting with one or more user interfaces in two different ways—e.g., either navigating through a first (or current) user interface or displaying a second user interface—simply by performing a gesture that involves the movement of a fingerprint in one of two directions on a fingerprint sensor.

In some embodiments, the device is an electronic device with a separate display (e.g., display 450) and a separate touch-sensitive surface (e.g., touch-sensitive surface 451). In some embodiments, the device is portable multifunction device 100, the display is touch screen 112, and the touch-sensitive surface includes tactile output generators 167 on the display (FIG. 1A). The device described below with reference to 5A-5N and 6A-6C includes one or more fingerprint sensors 169. In some embodiments, the one or more fingerprint sensors include one or more integrated fingerprint sensors 359-1 (FIG. 4B) that are integrated in to the touch-sensitive surface (e.g., separate touch-sensitive surface 451 or touch sensitive display system 112). In some embodiments, the one or more fingerprint sensors include separate fingerprint sensors 359-2 (FIG. 4B) that are separate from the touch-sensitive surface (e.g., separate touch-sensitive surface 451 or touch sensitive display system 112). Unless specified otherwise, a fingerprint sensor 169 described below is, optionally, either an integrated fingerprint sensor 359-1 or a separate fingerprint sensor 359-2, depending on the configuration of the hardware and software of the device that includes the fingerprint sensor 169. For convenience of explanation, the embodiments described with reference to FIGS. 5A-5N and 6A-6C will be discussed with reference to display 450, a separate touch-sensitive surface 451 and a separate fingerprint sensor 359-2, however analogous operations are, optionally, performed on a device with an integrated fingerprint sensor 359-1 in response to detecting the inputs described in FIGS. 5A-5N on the integrated fingerprint sensor 359-1 while displaying the user interfaces shown in FIGS. 5A-5N on the display 450. Additionally, analogous operations are, optionally, performed on a device with a touch screen 112 in response to detecting the contacts described in FIGS. 5A-5N on a fingerprint sensor 169 (e.g., an integrated fingerprint sensor 359-1 or a separate fingerprint sensor 359-2) while displaying the user interfaces shown in FIGS. 5A-5N on the touch screen 112; in such embodiments, the focus selector is, optionally: a respective contact, a representative point corresponding to a contact (e.g., a centroid of a respective contact or a point associated with a respective contact), or a centroid of two or more contacts detected on the touch screen 112, in place of cursor 5N.

FIG. 5A illustrates a first user interface (e.g., an application user interface, such as a map application user interface) with content (e.g., a map and navigation instructions) that is displayed on a display 502 of a portable multi-function device 100. In some embodiments, display 502 is a touch-sensitive display with an array of touch sensors that are responsive to touch. As shown in FIG. 5A, device 100 includes a fingerprint sensor 169. In some embodiments, fingerprint sensor 169 is separate from display 502. Further, as shown in FIG. 5A, in some embodiments, fingerprint sensor 169 is integrated into a physical button (e.g., home button or menu button 204). In some embodiments, the device includes a touch-sensitive surface (e.g., a touch sensitive surface collocated with the display in the form of a touch sensitive display, such as touch sensitive display 502; and/or a touch sensitive surface separate from the display on the device), and the fingerprint sensor is separate from the touch-sensitive surface. In such embodiments, while the fingerprint sensor is responsive to the location, proximity and/or touch of a finger contact (e.g., in the form of a fingerprint), and is optionally responsive to the movement of the finger contact (e.g., in the form of a movement of the fingerprint), the spatial resolution of the fingerprint sensor (e.g., to detect the spatial location and/or movement of the finger) is greater than (e.g., more sensitive than) the resolution of conventional touch-sensitive surfaces; thereby making the fingerprint sensor more sensitive to small-magnitude spatial motion of the finger than conventional touch-sensitive surfaces.

FIGS. 5B-5C illustrate, while displaying a first user interface, detecting a movement of a fingerprint on fingerprint sensor 169 in a first direction (e.g., in a lateral or horizontal direction or along a short-axis of the multi-purpose device; from right to left); and in response, navigating through the first user interface. In some embodiments, as shown in FIG. 5B, while the first user interface (e.g., the map user interface) is displayed on display 502, a movement of a fingerprint (e.g., fingerprint 510 and associated movement 512), is detected on fingerprint sensor 169. In response to detecting movement 512 of fingerprint 510 on fingerprint sensor 169 (e.g., from a location of fingerprint 510 shown in FIG. 5B to a location of fingerprint 510 shown in FIG. 5C), the device navigates through the first user interface For example, the device translates at least a portion of the first user interface in the direction of movement of fingerprint 510 (e.g., from right to left) to display additional portions of the first user interface, as shown in FIG. 5C, that were not previously displayed in FIG. 5B. Thus, in some embodiments, while displaying a first user interface (e.g., corresponding to a first application or to an application launch user interface), in response to detecting a movement of a fingerprint in a first direction (e.g., in a lateral or horizontal direction or along the short-axis of the multi-purpose device; from right to left) on a fingerprint sensor, the device navigates through the first user interface (e.g., translates at least a portion of the content displayed on the first user interface).

FIGS. 5D-5E illustrate, while displaying a first user interface, detecting a movement of a fingerprint on fingerprint sensor 169 in a second direction (e.g., in a vertical direction or along the long-axis of the multi-purpose device; upward); and in response, displaying a second user interface different from the first user interface. As shown in FIG. 5D, in some embodiments, while displaying the first user interface (e.g., map application), the movement of a fingerprint (e.g., fingerprint 514 and associated movement 516) is detected on fingerprint sensor 169 of device 100, the corresponding movement 516 being in a second direction (e.g., in a vertical direction or along the long-axis of the multi-purpose device; upward, with reference to the orientation of device 100 shown in FIG. 5D). In accordance with a determination that movement 516 of fingerprint 514 is in the second direction (e.g., in a vertical upward direction, from the location of fingerprint 514 shown in FIG. 5D to the location of fingerprint 514 shown in FIG. 5E), a second user interface (e.g., multi-tasking user interface 517 including user selectable icons corresponding to a set of most-recently used applications, such as a notes application, a camera application, a photo viewer application, and a voice memo recording application; where selection of one of the icons in the multi-tasking user interface 517 will cause the device to run an application corresponding to the selected icon as a currently active application, sometimes called a foreground application) is displayed, as shown in FIG. 5E. For example, selection of the "notes" icon will cause the device to run the notes application as a currently active application and selection of the "camera" icon will cause the device to run the camera application as a currently active application.

Accordingly, in some embodiments, the application user interface (e.g., the map application user interface shown in FIGS. 5D-5E) is at least partially replaced by the second user interface (e.g., the map application is partially displaced upward and/or at least partially concealed by multi-tasking user interface 517 shown in FIG. 5E). In some embodiments, upon displaying the second user interface (e.g., multi-tasking user interface 517, FIG. 5E) one or more interactive elements in the application user interface are disabled from user-interaction (e.g., while multi-tasking user interface 517 is displayed, the map application would be disabled from user-interaction and the user would not be able to scroll, navigate through, or otherwise interact with the map application). Thus, in some embodiments, while displaying a first user interface (e.g., corresponding to a first application), in response to detecting a movement of a fingerprint in a second direction (e.g., a vertical direction or along the long-axis of the multi-purpose device; upward), the device displays a second system user interface (e.g., a multi-tasking user interface).

FIGS. 5F-5G illustrate, while displaying the second user interface, detecting a movement of a fingerprint on fingerprint sensor 169 in a first direction (e.g., in a lateral or horizontal direction or along the short-axis of the multi-purpose device; from right to left); and in response, navigating through the second user interface. In some embodiments, while displaying the second user interface (e.g., multi-tasking user interface 517, FIG. 5F), the movement of a fingerprint (e.g., fingerprint 518 and associated movement 520) is detected on fingerprint sensor 169 of device 100, the corresponding movement being in the first direction (e.g., in a lateral or horizontal direction or along the short-axis of the multi-purpose device; from right to left with reference to the orientation of device 100 shown in FIG. 5F). In response to detecting movement 520 of fingerprint 518, the device navigates through the second user interface (e.g., multi-tasking user interface 517, FIGS. 5F-5G). For example, the device translates at least a portion of the second user interface in the direction of movement 520 of fingerprint 518 to display additional portions of the second user interface (e.g., additional icons for a message application, calendar application, and clock application as shown in FIG. 5G, that were not previously displayed in FIG. 5F, and the icons for the notes application, the camera application, the photos application and the voice memo recording application that were previously displayed in FIG. 5F cease to be displayed in FIG. 5G). In some embodiments, in response to detecting movement of the fingerprint from left to right on the fingerprint sensor, the navigation through the second user interface would be reversed, so that the icons for the notes application, the camera application, the photos application and the voice memo recording application that were previously displayed in FIG. 5F would be redisplayed.

Further, FIGS. 5H-5I illustrate, while displaying the second user interface, detecting a movement of a fingerprint on fingerprint sensor 169 in a third direction (e.g., a vertical direction or along the long-axis of the multi-purpose device; downward; substantially opposite to the second direction); and in response, ceasing to display the second user interface. In some embodiments, as illustrated in FIGS. 5H-5I, while displaying the second user interface, movement of a fingerprint (e.g., fingerprint 522 and associated movement 524) is detected on fingerprint sensor 169 of device 100, movement 524 being in a third direction (e.g., in a vertical direction downward along the long-axis of the multi-purpose device with reference to the orientation of device 100 shown in FIG. 5H; a direction substantially opposite to the second direction described with reference to FIGS. 5D-5E). In response to detecting movement 524 of fingerprint 522 in the third direction, the device ceases to display the second user interface (e.g., the multi-tasking user interface 517 previously shown in FIG. 5H) and redisplays the first user interface or the map application interface (e.g., in its entirety), as shown in Figure SI.

FIGS. 5J-5K illustrate, while displaying the first user interface, detecting a double activation of the physical home button or menu button 204 (e.g., into which fingerprint sensor 169 is, optionally, integrated); and in response, displaying the second user interface. In some embodiments, as illustrated in FIGS. 5J-5K, upon detecting a double activation 530 of the physical home button or menu button 204 (e.g., via two successive taps or press inputs occurring in quick succession with less than a predefined interval of time lapse between the two successive taps, for example with an interval of time less than 500 milliseconds, 300 milliseconds, 150 milliseconds, 50 milliseconds or some other reasonable time interval; with or without a finger lift-off between the two successive taps), the second interface (e.g., the multi-tasking user interface shown previously in FIG. 5E with user-selectable icons corresponding to recently used or active applications such as the notepad application, the camera application, the photo viewer application, and the voice memo recording application) is displayed on display 502, as shown in FIG. 5K and the first user interface (e.g., the map application user interface) is at least partially concealed or slid off the display 502 and optionally deactivated from user-interaction.

FIGS. 5K-5L illustrate, while displaying the second user interface, detecting an activation of the physical home button or menu button 204 (e.g., into which fingerprint sensor 169 is integrated); and in response, ceasing to display the second user interface (e.g., and redisplaying and reactivating the first user interface). In some embodiments, as illustrated in FIGS. 5K-5L, upon detecting activation 532 of the physical home button or menu button 204 (e.g., via a tap or press input on the physical button 204), the second user interface (e.g., the multi-tasking user interface shown in FIG. 5K with user-selectable icons corresponding to recently used or active applications such as the notepad application, the camera application, the photo viewer application, and the voice memo recording application) is no longer displayed on display 502, as shown in FIG. 5L. In some embodiments, the first user interface (e.g., the map application user interface) is redisplayed (e.g., in its entirety) and reactivated for user input (e.g., from its previously deactivated state).

FIGS. 5M-5N illustrate, while displaying the first user interface, detecting an activation of the physical home button or menu button 204 (e.g., into which fingerprint sensor 169 is integrated); and in response, replacing the first user interface (e.g., ceasing to display the first user interface) with a predefined user interface (e.g., a home screen or application launch interface associated with the physical home button or menu button 204). In some embodiments, as illustrated in FIGS. 5M-5N, upon detecting activation 534 of the physical home button or menu button 204 (e.g., via a tap or press input on the physical button 204), the first user interface (e.g., the multi-tasking user interface shown in FIG. 5M) is no longer displayed on display 502, as shown in FIG. 5N. In some embodiments, the first user interface (e.g., the map application user interface) is replaced (e.g., in its entirety) with a predefined user interface (e.g., a home screen or application launch user interface, as shown in FIG. 5N). In some embodiments, activation of button 204 while the home screen is displayed would cause the device to display a predefined search user interface.

FIGS. 6A-6C are flow diagrams illustrating a method 600 of interacting with user interfaces in accordance with movement of a finger on a fingerprint sensor in accordance with some embodiments. The method 600 is performed at an electronic device (e.g., device 300, FIG. 3, or portable multifunction device 100, FIG. 1A) with a display and a touch-sensitive surface. In some embodiments, the display is a touch screen display and the touch-sensitive surface is on the display. In some embodiments, the display is separate from the touch-sensitive surface. Some operations in method 600 are, optionally, combined and/or the order of some operations is, optionally, changed.

As described below, the method 600 provides an intuitive way to interact with user interfaces. The method reduces the cognitive burden on a user when interacting with user interfaces, thereby creating a more efficient human-machine interface. For battery-operated electronic devices, enabling a user to interact with user interfaces faster and more efficiently conserves power and increases the time between battery charges.

The device displays (602), on the display, a first user interface (e.g., an application user interface, such as a map application or navigation application user interface as shown in FIG. 5A). While displaying the first user interface on the display, the device detects (604) movement of a fingerprint on the fingerprint sensor (e.g., movement 512 of fingerprint 510, FIG. 5B; movement 516 of fingerprint 514, FIG. 5D).

In some embodiments, the fingerprint sensor is (606) separate from (e.g., not co-incident with) the display (e.g., fingerprint sensor 169 is separate from display 502, FIG. 5A). The device includes (608) a touch-sensitive surface; and the fingerprint sensor is separate from (e.g., not co-incident with) the touch-sensitive surface.

In response to detecting (610) movement of the fingerprint on the fingerprint sensor: in accordance with a determination that the movement of the fingerprint is in a first direction (e.g., a primary component of movement of the fingerprint is horizontally rightward, or horizontally leftward as described above with reference to movement 512 of fingerprint 510, FIG. 5B), the device navigates through the first user interface (e.g., as described above with reference to navigation through the map interface shown in FIGS. 5B-5C). In some embodiments, the device navigates back to a previous state, or previous page, or previous webpage, or previous photo (e.g., in response to detecting a rightward movement of the fingerprint) or forward to a next state, or next page, or next webpage, or next photo (e.g., in response to detecting a leftward movement of the fingerprint). In some embodiments the device scrolls the first user interface horizontally in accordance with the direction of movement of the fingerprint on the fingerprint sensor (e.g., the device translates at least a portion of the content on the first user interface, such as the map application user interface, in accordance with a direction of movement of the fingerprint horizontally from right to left, as described above with reference to the movement of fingerprint 510 in FIGS. 5B-5C).

In accordance with a determination that the movement of the fingerprint is in a second direction (e.g., a primary component of movement of the fingerprint vertically downward or vertically upward as described above with reference to movement 516 of fingerprint 514, FIG. 5D) different from the first direction, the device displays a second user interface different from the first user interface on the display (e.g., as described above with reference to multitasking user interface 517 in FIGS. 5D-5E). In some embodiments, the device displays a multitasking user interface (e.g., multi-tasking user interface 517, FIG. 5E; or a most recently used application). In some embodiments, displaying the second user interface includes replacing the first user interface with the second user interface. In some embodiments, displaying the second user interface includes ceasing to display at least a portion of the first user interface (e.g., the first user interface is at least partially covered with the second user interface or the first user interface slides at least partially off of the display so as to display the second user interface; as shown in FIG. 5E, the map application interface is partially displaced off display 502 in order to display multi-tasking user interface 517).

In some embodiments, the first direction is (612) perpendicular (or substantially perpendicular) to the second direction. For example, as described above with reference to movement 512 of fingerprint 510 in FIGS. 5B-5C, the first direction is a lateral or horizontal direction or along the short-axis of the multi-purpose device, from right to left; as described above with reference to movement 516 of fingerprint 514 in FIGS. 5D-5E, the second direction is a vertical direction or along the long-axis of the multi-purpose device; upward (e.g., perpendicular or substantially perpendicular to the first direction).

In some embodiments, the first user interface is (614) a user interface of a first application (e.g., map application user interface, FIGS. 5A-5D); and the second user interface is a multitasking user interface (e.g., multi-tasking user interface 517, FIG. 5E) that includes representations (e.g., selectable icons) of a plurality of concurrently open applications (e.g., a "notes" icon corresponding to a notepad application, a "camera" icon corresponding to a camera application, a "photos" icon corresponding to a photo viewer application, and a "voice memos" icon corresponding to a voice memo recording application, as shown in FIG. 5E). In some embodiments, in response to detecting selection of a respective representation of one of the concurrently open applications, the device displays an open application that corresponds to the respective representation. In some embodiments, the multitasking user interface includes representations (e.g., selectable icons) of one or more recently used applications (e.g., applications which were recently open on the device but for which no retained state information is currently stored). As used in the specification and claims, the term "open application" refers to a software application with retained state information (e.g., as part of device/global internal state 157 and/or application internal state 192). An open application is any one of the following types of applications:

- an active application, which is currently displayed on display 112 (or a corresponding application view is currently displayed on the display);
- a background application (or background process), which is not currently displayed on display 112, but one or more application processes (e.g., instructions) for the corresponding application are being processed by one or more processors 120 (i.e., running);
- a suspended application, which is not currently running, and the application is stored in a volatile memory (e.g., DRAM, SRAM, DDR RAM, or other volatile random access solid state memory device of memory 102); and
- a hibernated application, which is not running, and the application is stored in a non-volatile memory (e.g., one or more magnetic disk storage devices, optical disk storage devices, flash memory devices, or other non-volatile solid state storage devices of memory 102).

As used herein, the term "closed application" refers to software applications without retained state information (e.g., state information for closed applications is not stored in a memory of the device). Accordingly, closing an application includes stopping and/or removing application processes for the application and removing state information for the application from the memory of the device. Generally, opening a second application while in a first application (e.g., switching from the first application to the second application) does not close the first application. When the second application is displayed and the first application ceases to be displayed, the first application, which was an active application when displayed, may become a background application, suspended application, or hibernated application, but the first application remains an open application while its state information is retained by the device.

In some embodiments, navigating through the first user interface includes (616) navigating through the first user interface at a rate determined in accordance with a displacement of the fingerprint on the fingerprint sensor. For example, the device scrolls through or translates at least a portion of content displayed in the first user interface at a rate of 5 millimeters/second for each 1 millimeter of movement by the fingerprint on the fingerprint sensor from a starting position of the fingerprint on the fingerprint sensor. In some embodiments, navigating through the first user interface includes (618) navigating through the first user interface by an amount determined in accordance with a displacement of the fingerprint on the fingerprint sensor. For example, the device scrolls through or translates at least a portion of the content displayed in the first user interface by 5 millimeters for each 1 millimeter of movement by the fingerprint on the fingerprint sensor. In some embodiments, navigating through the first user interface includes (620) navigating through the first user interface in a direction determined in accordance with a direction of movement of the fingerprint on the fingerprint sensor. For example, the device scrolls through or translates at least a portion of the content displayed in the first user interface to the right when the fingerprint moves to the right on the fingerprint sensor and scrolls through or translates at least a portion of the content displayed in the first user interface to the left when the fingerprint moves to the left on the fingerprint sensor (e.g., as described above with reference to FIGS. 5B-5C).

In some embodiments, displaying the second user interface includes (622) displaying an animated transition of the second user interface appearing on the display; and the speed of the animated transition is based on a displacement of the fingerprint on the fingerprint sensor. For example, the device displays the first user interface sliding upward on the display to make room for the second user interface that slides onto the display from a bottom of the display.

In some embodiments, the device includes (624) a button (e.g., a physical button, such as home button or menu button 204, FIG. 5A); and the fingerprint sensor is integrated into the button (e.g., fingerprint sensor 169 is integrated into the physical home button 204, FIG. 5A). In some embodiments, the physical button is an intensity-sensitive region of the housing of the device that is determined to have been activated by the device when the intensity detected on the button is increased over an activation intensity threshold. In some embodiments, the physical button is coupled to an electronic switch where movement of the physical button along a first axis (e.g., up and down or left to right) closes the switch and activates the physical button (sometimes resulting in an audible or tactile "click").

In some embodiments, while the first user interface (e.g., the map application user interface, FIG. 5M) is displayed, the device detects (626) activation of the button (e.g., activation 534 of the physical home button or menu button 204 such as a tap input or a press input on the physical button 204, FIG. 5M). For example, the device detects a user clicking the button or pressing an intensity-sensitive region corresponding to the button with an intensity above an activation intensity threshold. In response to detecting activation of the button, the device replaces (628) the first user interface (e.g., the map application user interface, FIG. 5M) with a predefined user interface (e.g., a home screen or application launch interface as shown in FIG. 5N; or a search application user interface) associated with activating the button.

In some embodiments, while the second user interface (e.g., multi-tasking user interface 517, FIG. 5K) is displayed, the device detects (630) activation of the button (e.g., activation 532 of the physical home button or menu button 204 such as, via a tap or press input on the physical button 204, FIG. 5K). For example, the device detects a user clicking the button or pressing an intensity-sensitive region corresponding to the button with an intensity above an activation intensity threshold. In response to detecting activation of the button, the device ceases (632) to display the second user interface (e.g., and redisplays or reactivates the first user interface, such as the map application user interface, as described above with reference to FIGS. 5K-5L).

In some embodiments, while the first user interface (e.g., the map application user interface, FIG. 5J) is displayed, the device detects (634) a double activation of the button (e.g., double activation 530 of the physical home button or menu button 204 such as, via two successive taps or press inputs occurring in quick succession with less than a predefined interval of time lapse between the two successive taps, for example with an interval of time less than 500 milliseconds, 300 milliseconds, 150 milliseconds, 50 milliseconds or some other reasonable time interval; with or without a finger lift-off between the two successive taps, as described above with reference to FIG. 5J). For example, the device detects a user double clicking a button or pressing the intensity-sensitive region corresponding to the button with an intensity above an activation intensity threshold, reducing the intensity below the activation intensity threshold and then pressing the intensity-sensitive region with an intensity above the activation threshold. In response to detecting double activation of the button, the device displays (636) the second user interface on the display (e.g., displays multi-tasking user interface 517, as described above with reference to FIGS. 5J-5K; or a most recently used application).

In some embodiments, while displaying the second user interface (e.g., multi-tasking user interface 517, FIG. 5F) in accordance with the determination that the movement of the fingerprint is in the second direction, the device detects (638) movement of the fingerprint on the fingerprint sensor in the first direction (e.g., fingerprint 518 and associated movement 520 in a lateral or horizontal direction or along the short-axis of the multi-purpose device; from right to left, FIG. 5F). In response to detecting movement of the fingerprint on the fingerprint sensor in the first direction, the device navigates (640) through the second user interface (e.g., the device scrolls through representations of a plurality of recently used or currently open applications in accordance with movement of the fingerprint on the fingerprint sensor). For example, as shown in FIGS. 5F-5G, the device translates at least a portion of the second user interface (e.g., multi-tasking user interface 517) in the direction of movement 520 of fingerprint 518 to display additional portions of the second user interface (e.g., additional icons including a "messages" icon corresponding to a message application, a "calendar" icon corresponding to a calendar application, and a "clock" icon corresponding to clock application, as shown in FIG. 5G, that were not previously displayed in FIG. 5F).

In some embodiments, navigating through the second user interface includes navigating through the second user interface at a rate determined in accordance with a displacement of the fingerprint on the fingerprint sensor. For example, the device scrolls through icons corresponding to the plurality of recently used or currently open applications at a rate of five icons/second for each 1 millimeter of movement by the fingerprint on the fingerprint sensor from a starting position of the fingerprint on the fingerprint sensor. In some embodiments, navigating through the second user interface includes navigating through the second user interface by an amount determined in accordance with a displacement of the fingerprint on the fingerprint sensor. For example, the device scrolls through icons corresponding to the plurality of recently used or currently open applications by one icon for each 1 millimeter of movement by the fingerprint on the fingerprint sensor. In some embodiments, navigating through the second user interface includes navigating through the second user interface in a direction determined in accordance with a direction of movement of the fingerprint on the fingerprint sensor. For example, the device scrolls the representations of the plurality of recently used or currently open applications to the right when the fingerprint moves to the right on the fingerprint sensor and scrolls the representations of the plurality of recently used applications to the left when the fingerprint moves to the left on the fingerprint sensor.

In some embodiments, while displaying the second user interface (e.g., multi-tasking user interface 517, FIG. 5H) in accordance with the determination that the movement of the fingerprint is in the second direction, the device detects (642) movement of the fingerprint on the fingerprint sensor in a third direction (e.g., a direction that is substantially opposite to the second direction; such as a vertical direction or along the long-axis of the multi-purpose device; downward). For example, movement 516 of fingerprint 514 in FIGS. 5D-5E (e.g., movement in the first direction) is upward movement in a vertical direction along the long-axis of the multi-purpose device; while movement 524 of fingerprint 522 in FIGS. 5H-5I (e.g., movement in the third direction) is downward movement in a vertical direction along the long-axis of the multi-purpose device (e.g., substantially opposite to the second direction). In response to detecting movement of the fingerprint on the fingerprint sensor in the third direction, the device ceases (644) to display the second user interface. For example, as shown in FIG. 5I, the device ceases to display multi-tasking user interface 517 that was previously displayed in FIG. 5H and redisplays the first user interface (e.g., the map application user interface), including portions of the first user interface that ceased to be displayed when the second user interface was displayed.

It should be understood that the particular order in which the operations in FIGS. 6A-6C have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., those methods described above) are also applicable in an analogous manner to method 600 described above with respect to FIGS. 6A-6C. For example, the fingerprints, user interfaces, animated transitions described above with reference to method 600 optionally have one or more of the characteristics of the fingerprints, user interfaces, animated transitions described herein with reference to other methods described herein (e.g., those methods described above). For brevity, these details are not repeated here.

Figure 7:
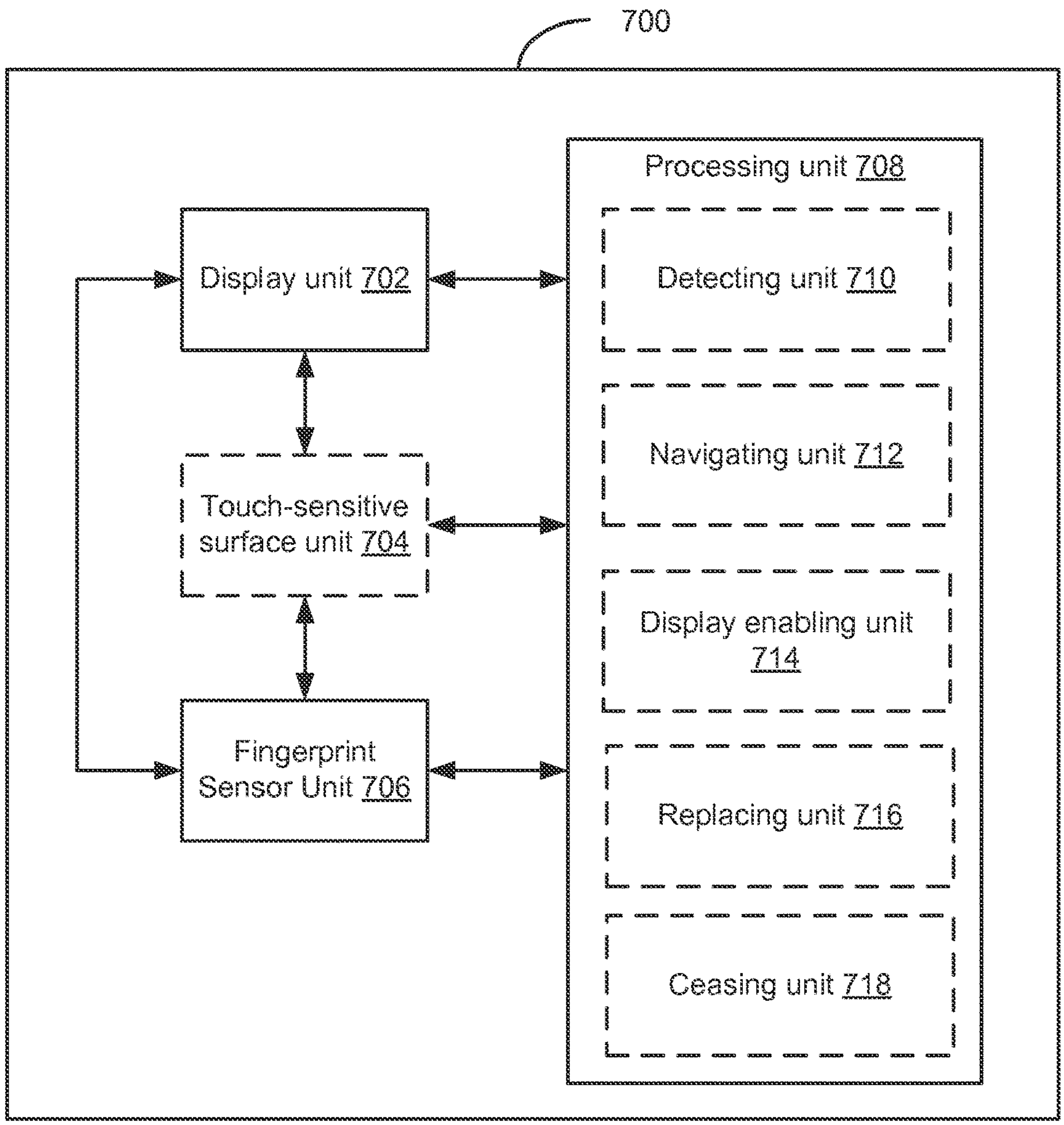
FIG. 7 is a functional block diagram of an electronic device in accordance with some embodiments.

In accordance with some embodiments, FIG. 7 shows a functional block diagram of an electronic device 700 configured in accordance with the principles of the various described embodiments. The functional blocks of the device are, optionally, implemented by hardware, software, or a combination of hardware and software to carry out the principles of the various described embodiments. It is understood by persons of skill in the art that the functional blocks described in FIG. 7 are, optionally, combined or separated into sub-blocks to implement the principles of the various described embodiments. Therefore, the description herein optionally supports any possible combination or separation or further definition of the functional blocks described herein.

As shown in FIG. 7, an electronic device 700 includes a display unit 702 configured to display a first user interface, optionally a touch-sensitive surface unit 704, a fingerprint sensor unit 706; and a processing unit 708 coupled to the display unit 702 and the fingerprint sensor unit 706. In some embodiments, the processing unit 708 includes a detecting unit 710, a navigating unit 712, a display enabling unit 714, a replacing unit 716, and a ceasing unit 718.

The processing unit 708 is configured to: while displaying the first user interface on the display, detect (e.g., with the detecting unit 710) movement of a fingerprint on the fingerprint sensor 706; and in response to detecting movement of the fingerprint on the fingerprint sensor: in accordance with a determination that the movement of the fingerprint is in a first direction, navigate through the first user interface (e.g., with the navigating unit 712); and in accordance with a determination that the movement of the fingerprint is in a second direction different from the first direction, enable display of a second user interface different from the first user interface on the display unit 702 (e.g., with the display enabling unit 714).

In some embodiments, the first direction is perpendicular to the second direction.

In some embodiments, the first user interface is a user interface of a first application; and the second user interface is a multitasking user interface that includes representations of a plurality of concurrently open applications.

In some embodiments, the processing unit 708 is further configured to: while enabling display of the second user interface in accordance with the determination that the movement of the fingerprint is in the second direction, detect movement of the fingerprint on the fingerprint sensor 706 in the first direction (e.g., with the detecting unit 710); and in response to detecting movement of the fingerprint on the fingerprint sensor 706 in the first direction, navigate through the second user interface (e.g., with the navigating unit 712).

In some embodiments, the processing unit is further configured to: while enabling display of the second user interface in accordance with the determination that the movement of the fingerprint is in the second direction, detect movement of the fingerprint on the fingerprint sensor 706 in a third direction (e.g., with the detecting unit 710); and in response to detecting movement of the fingerprint on the fingerprint sensor 706 in the third direction, cease to enable display of the second user interface (e.g., with the ceasing enabling unit 718).

In some embodiments, navigating through the first user interface includes navigating through the first user interface at a rate determined in accordance with a displacement of the fingerprint on the fingerprint sensor 706.

In some embodiments, navigating through the first user interface includes navigating through the first user interface by an amount determined in accordance with a displacement of the fingerprint on the fingerprint sensor 706.

In some embodiments, navigating through the first user interface includes navigating through the first user interface in a direction determined in accordance with a direction of movement of the fingerprint on the fingerprint sensor 706.

In some embodiments, enabling display of the second user interface includes enabling display of an animated transition of the second user interface appearing on the display unit 702 (e.g., with the display enabling unit 714); and the speed of the animated transition is based on a displacement of the fingerprint on the fingerprint sensor 706.

In some embodiments, the fingerprint sensor 706 is separate from the display unit 702.

In some embodiments, the device includes a touch-sensitive surface unit 704 and the fingerprint sensor 706 is separate from the touch-sensitive surface unit 704.

In some embodiments, the device includes a button and the fingerprint sensor 706 is integrated into the button.

In some embodiments, the processing unit 708 is further configured to: while the first user interface is displayed, detect activation of the button (e.g., with the detecting unit 710); and in response to detecting activation of the button, replace the first user interface with a predefined user interface associated with activating the button (e.g., with the replacing unit 716).

In some embodiments, the processing unit 708 is further configured to: while the second user interface is displayed, detect activation of the button (e.g., with the detecting unit 710); and in response to detecting activation of the button, cease to display the second user interface (e.g., with the ceasing unit 718).

In some embodiments, the processing unit 708 is further configured to: while the first user interface is displayed, detect a double activation of the button (e.g., with the detecting unit 710); and in response to detecting double activation of the button, enable display of the second user interface on the display unit 702 (e.g., with the display enabling unit 714).

The operations in the information processing methods described above are, optionally implemented by running one or more functional modules in information processing apparatus such as general purpose processors (e.g., as described above with respect to FIGS. 1A and 3) or application specific chips.

The operations described above with reference to FIGS. 6A-6C are, optionally, implemented by components depicted in FIGS. 1A-1B or FIG. 7. For example, display operation 602, detection operation 604, navigating or displaying operation 610 and replacing operation 628 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub-event, such as selection of an object on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Allowing Buttons to Serve Multiple Purposes

Many electronic devices are configured to display a variety of user interfaces. These user interfaces can include, for example, a home screen, a search screen, and/or user interfaces associated with applications ("apps") stored on the device. Because the home screen is often the most used user interface, it is desirable for such devices to provide the user with a convenient way to quickly navigate to the home screen. For example, with existing methods and devices, a dedicated "home" button is often provided. However, because of the limitations on the size of some devices (e.g., a portable multifunction device such as a smart phone), providing a dedicated home button requires an undesirable amount of space on the housing of such devices. It is therefore desirable to allow buttons on such devices to serve multiple purposes (e.g., a homing purpose and an application dependent purpose) by providing a convenient method to distinguish between which of the two purposes a user desired to activate.

In the embodiments described below, an improved method for allowing buttons to serve multiple purposes is provided. The buttons in the embodiments described below include integrated fingerprint sensors. When such a button is activated (e.g., pressed) after continuously detecting a fingerprint on an integrated fingerprint sensor for less than a predetermined amount of time (e.g., a quick press of the button), the button performs a first operation (e.g., a home operation). On the other hand, when the button is activated after continuously detecting a fingerprint for more than a predetermined amount of time (e.g., after hovering on the fingerprint sensor), the device performs a second operation (e.g., an application specific operation).

In some embodiments, the device is an electronic device with a separate display (e.g., display 450) and a separate touch-sensitive surface (e.g., touch-sensitive surface 451). In some embodiments, the device is portable multifunction device 100, the display is touch screen 112, and the touch-sensitive surface includes tactile output generators 167 on the display (FIG. 1A). The device described below with reference to 8A-8O and 9A-9C includes one or more fingerprint sensors 169. In some embodiments, the one or more fingerprint sensors include one or more integrated fingerprint sensors 359-1 (FIG. 4B) that are integrated in to the touch-sensitive surface (e.g., separate touch-sensitive surface 451 or touch sensitive display system 112). In some embodiments, the one or more fingerprint sensors include separate fingerprint sensors 359-2 (FIG. 4B) that are separate from the touch-sensitive surface (e.g., separate touch-sensitive surface 451 or touch sensitive display system 112). Unless specified otherwise, a fingerprint sensor 169 described below is, optionally, either an integrated fingerprint sensor 359-1 or a separate fingerprint sensor 359-2, depending on the configuration of the hardware and software of the device that includes the fingerprint sensor 169. For convenience of explanation, embodiments described with reference to FIGS. 8A-8O and 9A-9C will be discussed with reference to device operations that are performed in response to detecting inputs described in FIGS. 8A-8O on a fingerprint sensor 169 (e.g., an integrated fingerprint sensor 359-1 or a separate fingerprint sensor 359-2) while displaying the user interfaces shown in FIGS. 8A-8O on touch screen 112. However, analogous operations are, optionally, performed on a device with a display 450, a separate touch-sensitive surface 451 and a separate fingerprint sensor 359-2 with an integrated fingerprint sensor 359-1 in response to detecting the inputs described in FIGS. 8A-8O on the integrated fingerprint sensor 359-1 while displaying the user interfaces shown in FIGS. 8A-8O on display 450. In some embodiments, the focus selector is, optionally: a respective contact, a representative point corresponding to a contact (e.g., a centroid of a respective contact or a point associated with a respective contact), or a centroid of two or more contacts detected on the touch screen 112, in place of a cursor. In some embodiments, the focus selector is a user-controlled pointer that can be used to point to a respective user interface object in a plurality of user interface objects (e.g., an object selected by a "scroll-wheel," as described with reference to FIGS. 8K-8O). In some embodiments, a visual representation of the focus selector is displayed (e.g., a user interface object to which the focus selector is pointing is visually distinguished from the other user interface objects).

FIGS. 8A-8D illustrate exemplary user interfaces to be used in conjunction with multi-purpose buttons in accordance with some embodiments. In particular, FIGS. 8A-8D illustrate an example in which, under certain conditions described herein, activation of a "home button" (e.g., button 204) causes the device to perform a "home" operation (e.g., a first operation), whereupon the device returns to a home screen (e.g., displays an application-launch interface that includes a plurality of icons representing applications that a user may choose from). In this example, button 204 includes an integrated fingerprint sensor 169. Under other conditions, as described with reference to FIGS. 8G-8H, activation of the home button causes the device to perform a second, different operation.

FIG. 8A illustrates an example of the device running an archery video game application on portable multifunction device 100.

Figure 8B:
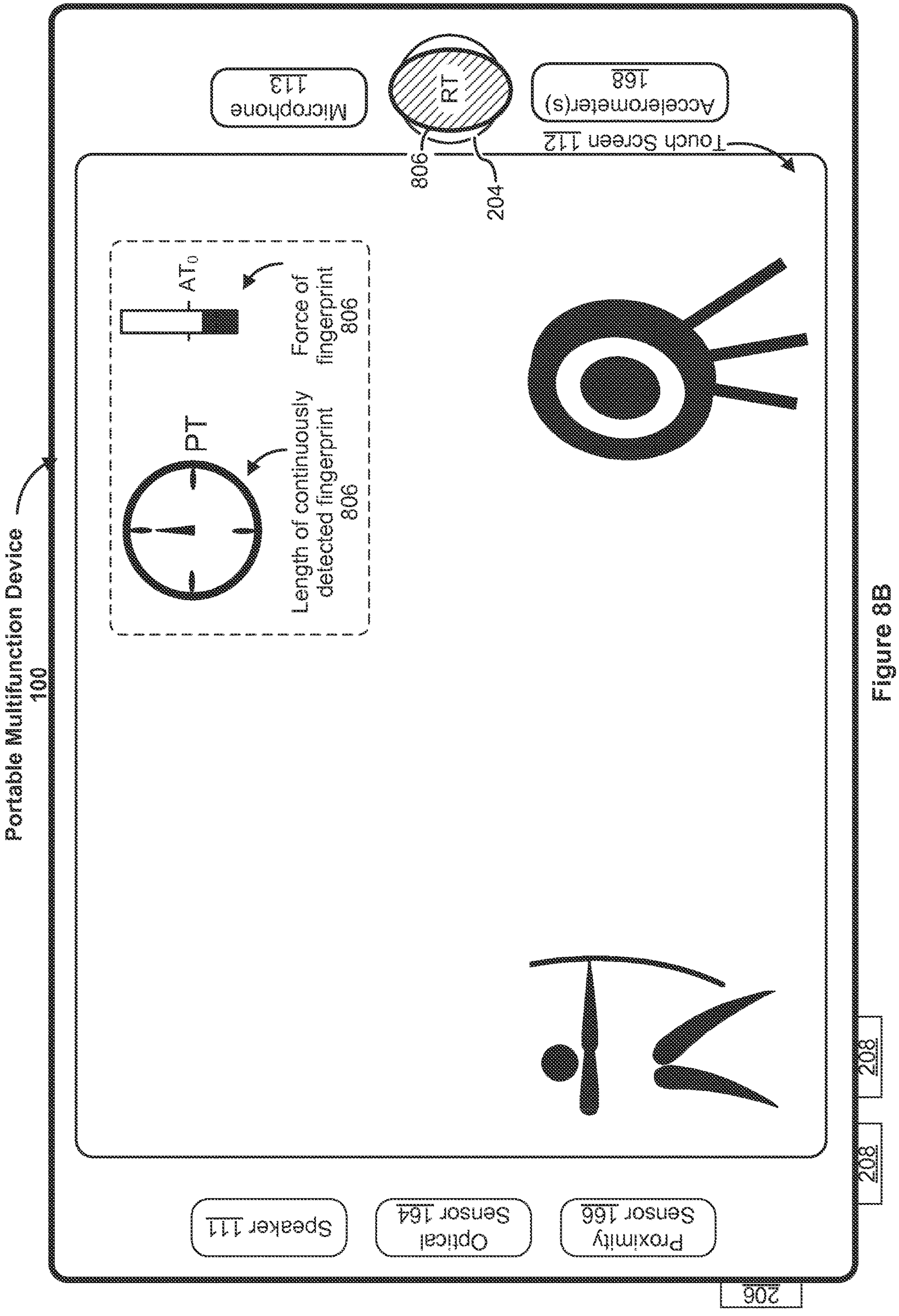

FIG. 8B illustrates detection of a fingerprint 806 (in this example, corresponding to a user's right thumb) on integrated fingerprint sensor 169. FIG. 8B also illustrates, respectively, indications of the length of time that fingerprint 806 is continuously detected on fingerprint sensor as well as the force of fingerprint 806 on the button. The respective indications of length of time and force of fingerprint 806 on the button are not typically shown on the device, but instead are illustrated herein for convenience of explanation. In this example, button 204 is activated when the force of fingerprint 806 exceeds an activation threshold ($AT_0$). In some embodiments, for example when button 204 is a physical or mechanical button, the activation threshold $AT_0$ is a function of spring properties of certain mechanical features of button 204 and/or friction between the mechanical features of button 204. That is to say, in some embodiments, there is a minimum force on the button which causes the button to activate. In some embodiments, activation of button 204 occurs on a "down-stroke" (e.g., when the force of fingerprint 806 is continuously detected from below $AT_0$ to above $AT_0$). In some embodiments, activation of button 204 occurs on an "up-stroke" (e.g., when the force of fingerprint 806 is continuously detected from above $AT_0$ to below $AT_0$). In some other embodiments, for example when button 204 is a virtual button, a specific gesture detected by fingerprint sensor 169 causes activation of the button.

Figure 8C:
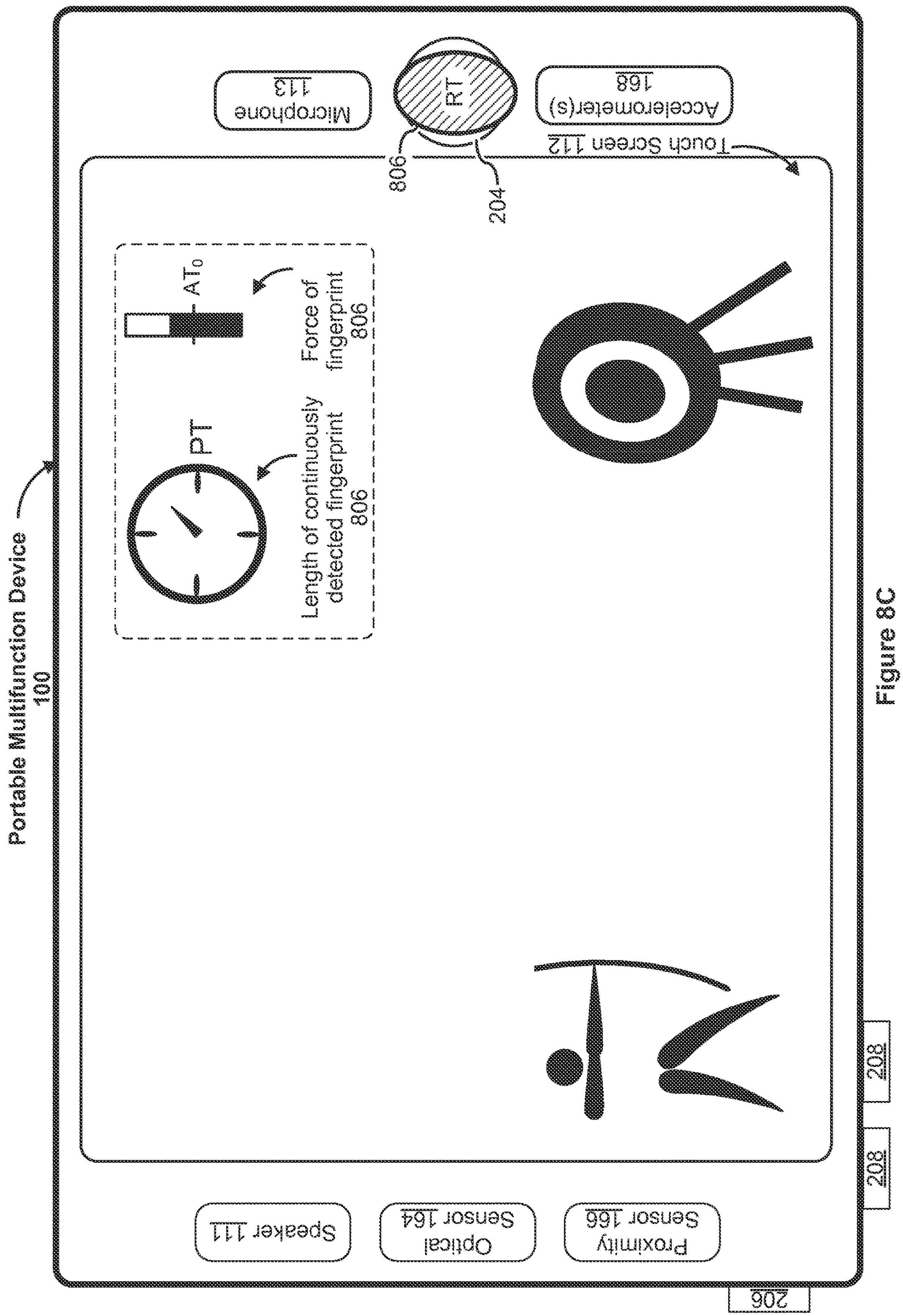
Figure 8D:
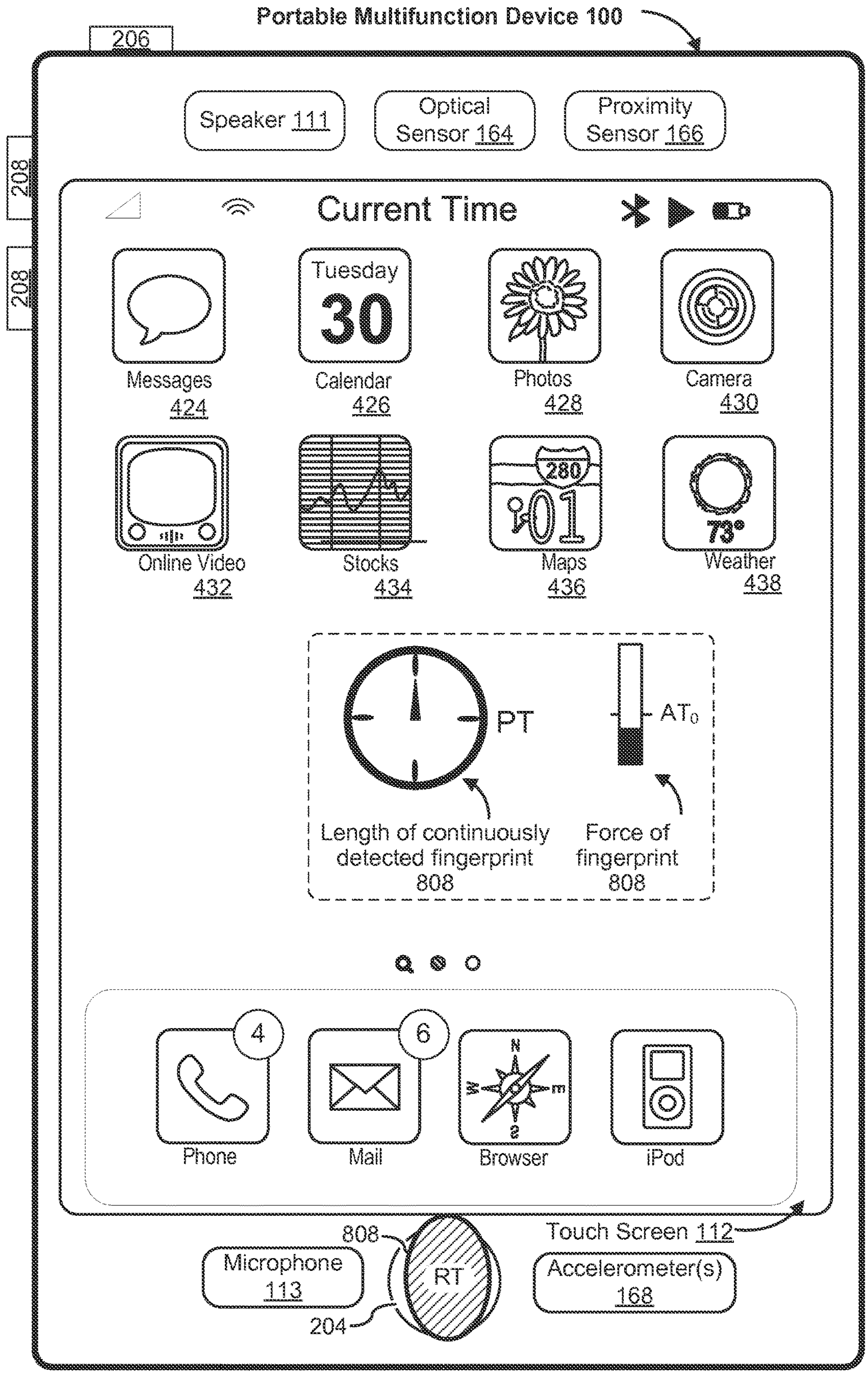

As shown in FIG. 8C-8D, when the device detects activation of button 204 (shown in FIG. 8C) prior to continuous detection of fingerprint 806 for an amount of time greater than a predetermined time period PT, the device performs a first operation. In this example, the first operation is a "home operation" (shown in FIG. 8D). In some embodiments, the device performs the first operation when the device detects activation of button 204 prior to continuous detection of fingerprint 806 for an amount of time equal or greater than a predetermined time period PT.

Figure 8E:
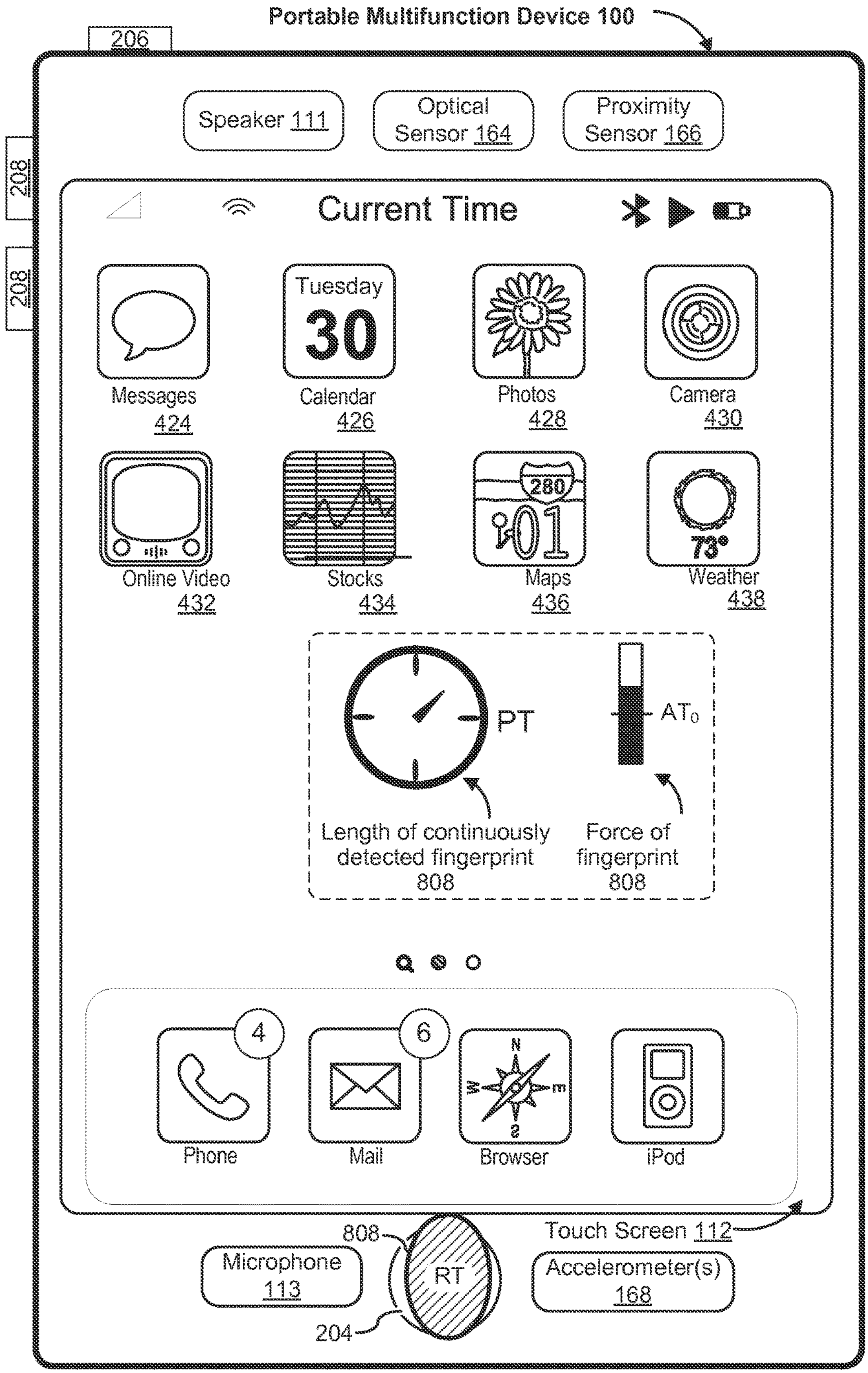
Figure 8F:
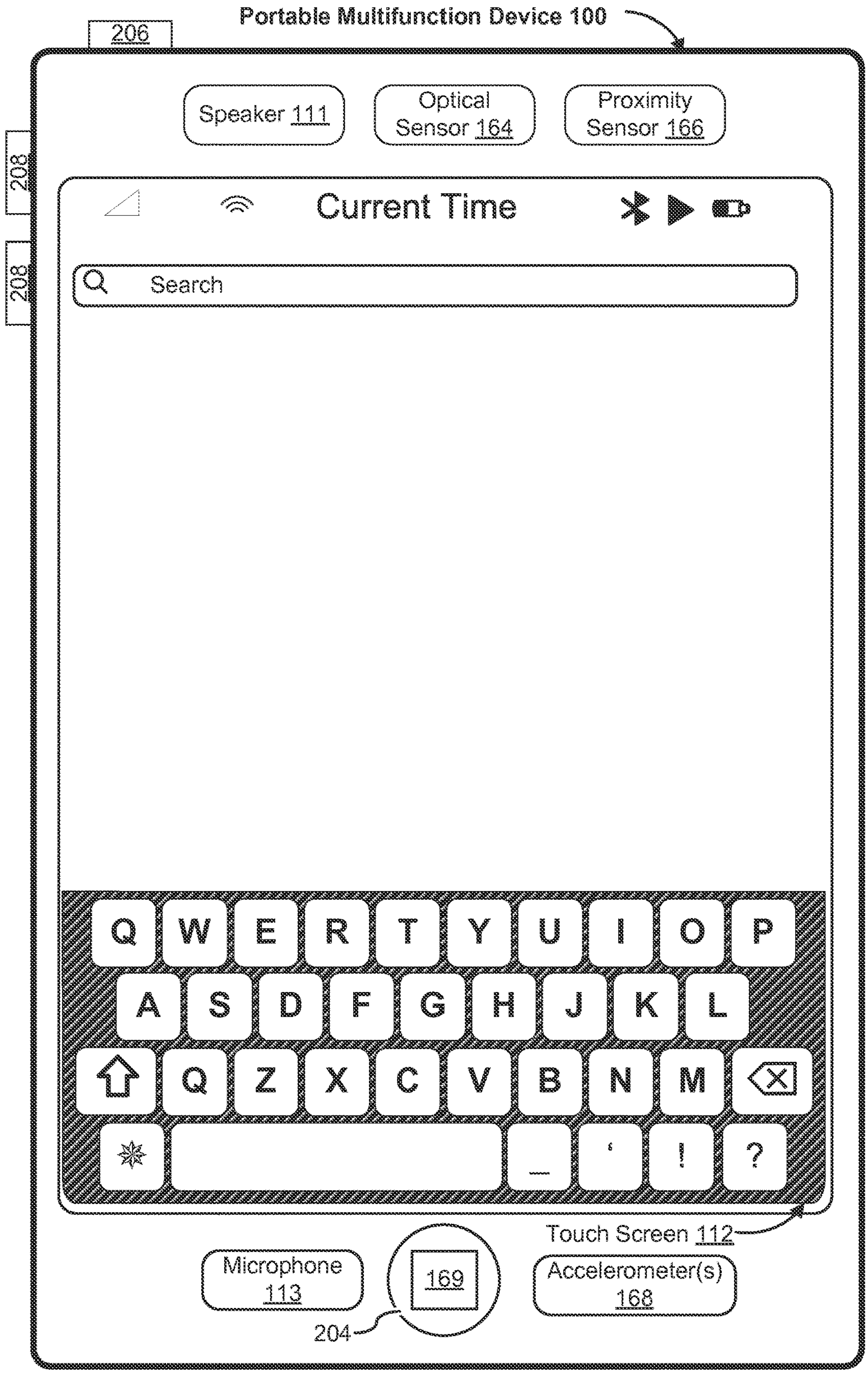

In some embodiments, as explained below with reference to FIGS. 8D-8F, the first operation is context dependent. For example, in some embodiments, the first operation depends on (e.g., is associated with) a currently displayed user interface. In the previous example in which the currently displayed user interface included a displayed archery video game, the first operation associated with the archery video game returns the device to a home screen. FIGS. 8D-8F illustrate an example of the first operation when the home screen is the currently displayed user interface.

In addition to illustrating an example of a home screen, FIG. 8D also illustrates an example of detection of a second fingerprint 808. Detection of fingerprint 808 is analogous to detection of fingerprint 806 described with reference to FIG. 8B. In some embodiments, fingerprint 808 is a continuation of fingerprint 806 (e.g., in some embodiments, after navigating to the home screen shown FIG. 8D, the user need not discontinue and reapply contact with fingerprint sensor 169 in order to make use of the functionality described in the example).

FIG. 8E illustrates activation of button 204 prior to a predetermined time period PT elapsing, as previously described with reference to FIGS. 8C-8D. In this example, because predetermined time period PT has not elapsed, the device performs a first operation associated with a home screen (e.g., a application-launch interface). In this example, the first operation navigates the device to a search screen, as shown in FIG. 8F. In some embodiments, the first operation associated the home screen takes the user to an alternate home screen (e.g., the device navigates through a plurality of home screen pages, the plurality of home screens being required because of a large number of applications on the device).

Figure 8G:
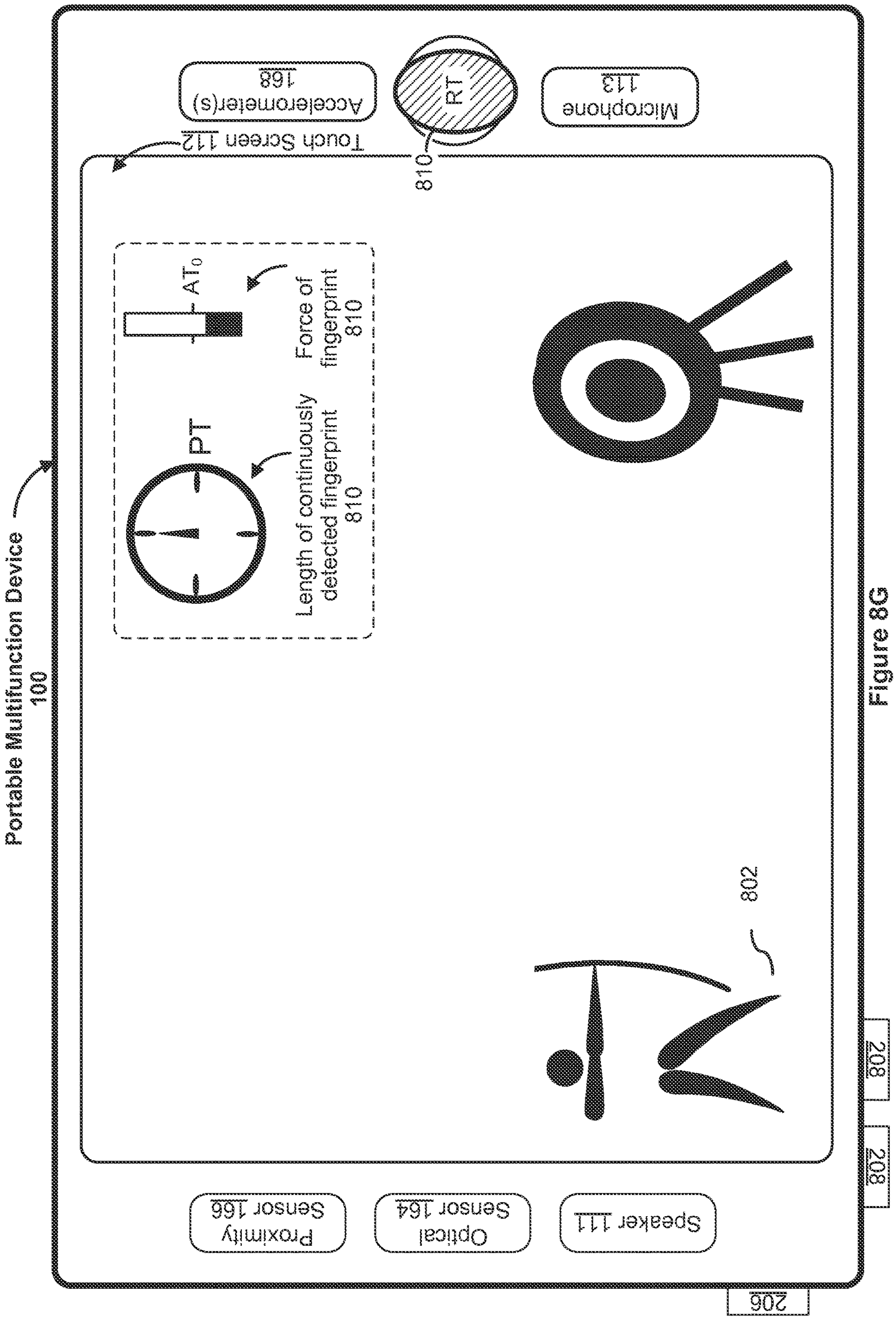
Figure 8H:
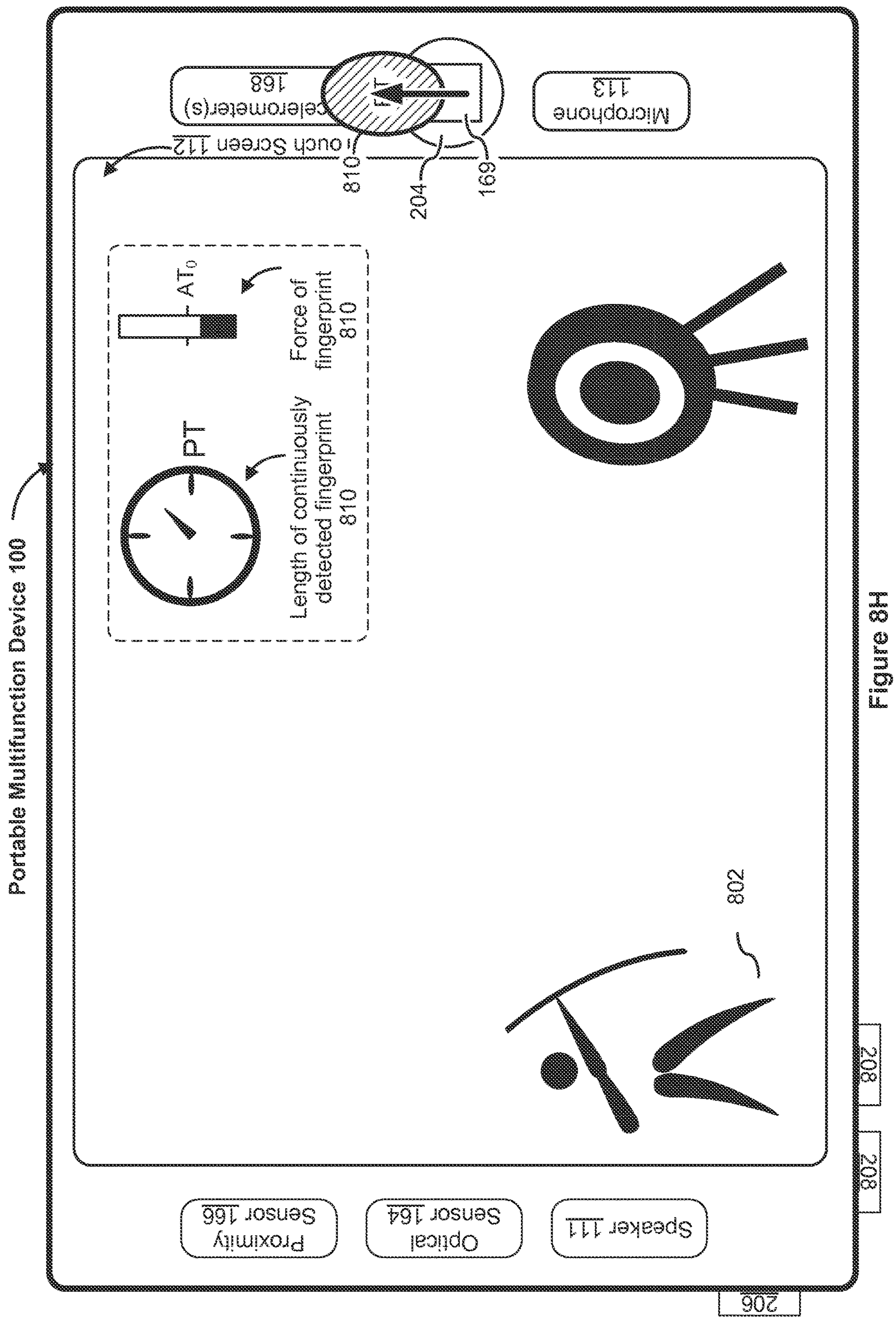
Figure 8I:
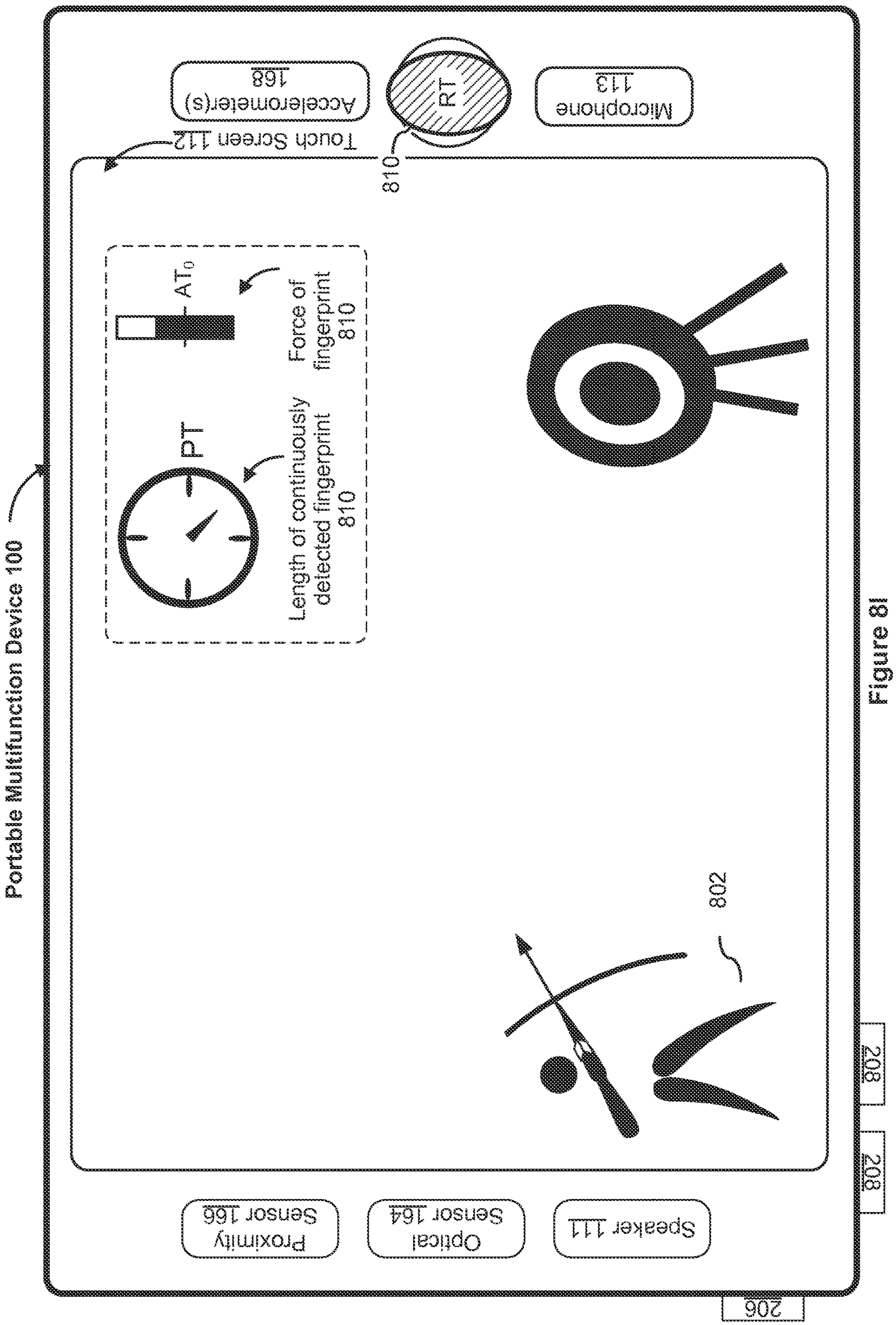
Figure 8J:
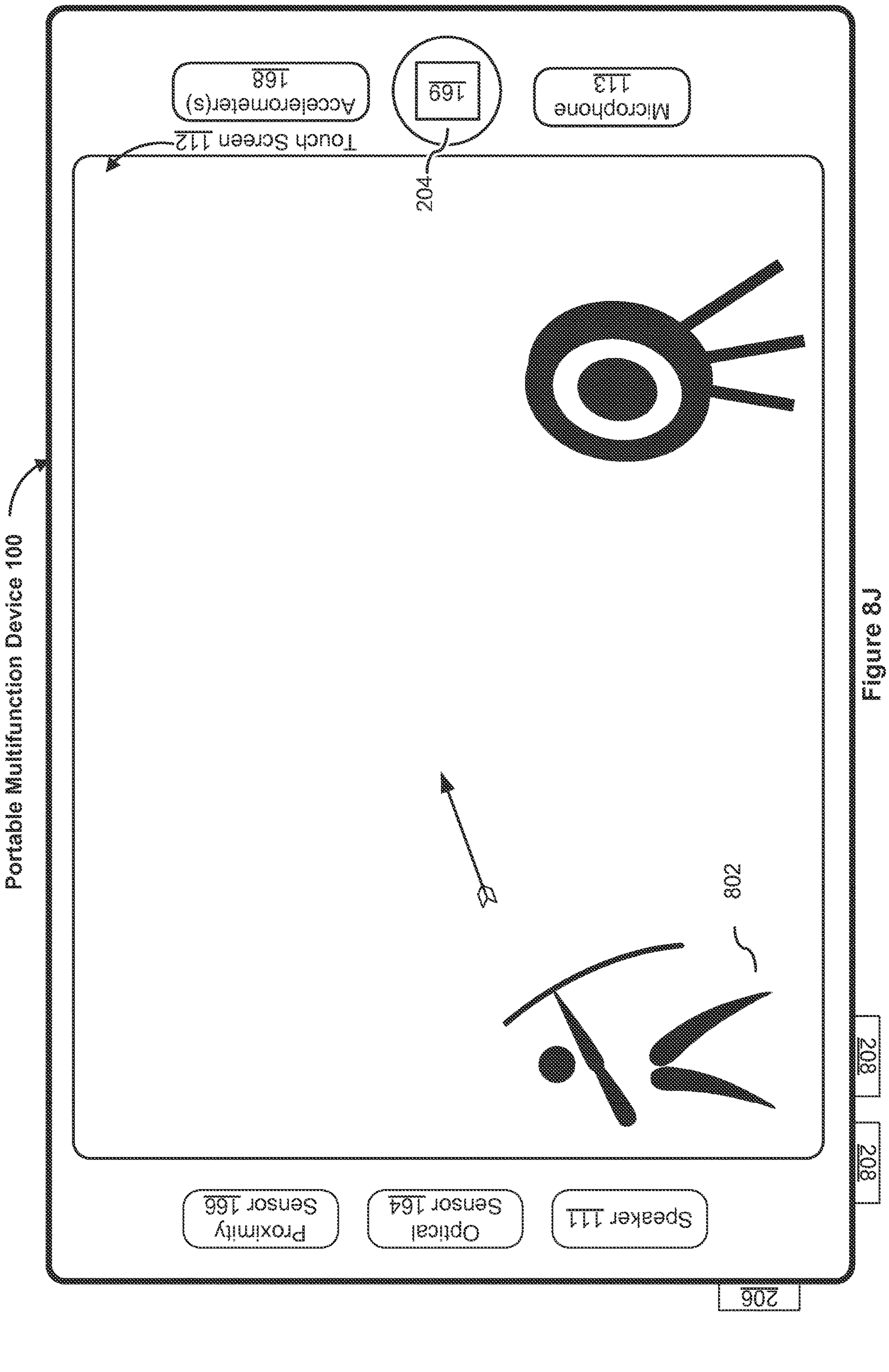

FIGS. 8G-8J illustrate exemplary user interfaces to be used in conjunction with multi-purpose buttons in accordance with some embodiments. In particular, FIGS. 8G-8J illustrate an example of the device performing a second, different operation upon activation of button 204 subsequent to continuous detection of a fingerprint 810 for greater than the predetermined time. In FIG. 8G, a fingerprint 810 is initially detected. Thus, the indicator showing the length of the continuously detected finger print 810 illustrates that, initially, no time has passed. FIG. 8H illustrates movement of fingerprint 810 over fingerprint sensor 169 and corresponding movement of archer 802 (e.g., in the application in this example, fingerprint sensor 169 acts a "joy-stick" controlling the position, or alternatively the change in position, of archer 802 prior to activation of button 204). In some embodiments, such functionality (e.g., the joystick functionality) becomes operable subsequent to an elapse of the predetermined time, and remains operable until activation of button 204. In some embodiments, such functionality is operable in the application whenever a fingerprint is detected on fingerprint sensor 169 despite repeated activations of button 204 (e.g., a first-person shooter video game in which fingerprint sensor 169 acts as a joy-stick redirecting a player and activation of the button allows the player to fire his or her weapon). FIGS. 8I-8J illustrate activation of button 204 (shown in FIG. 8I) and the resulting performance of a second operation (e.g., firing an arrow, as shown in FIGS. 8I and 8J), which is different from the first operation (e.g., a home operation).

Figure 8K:
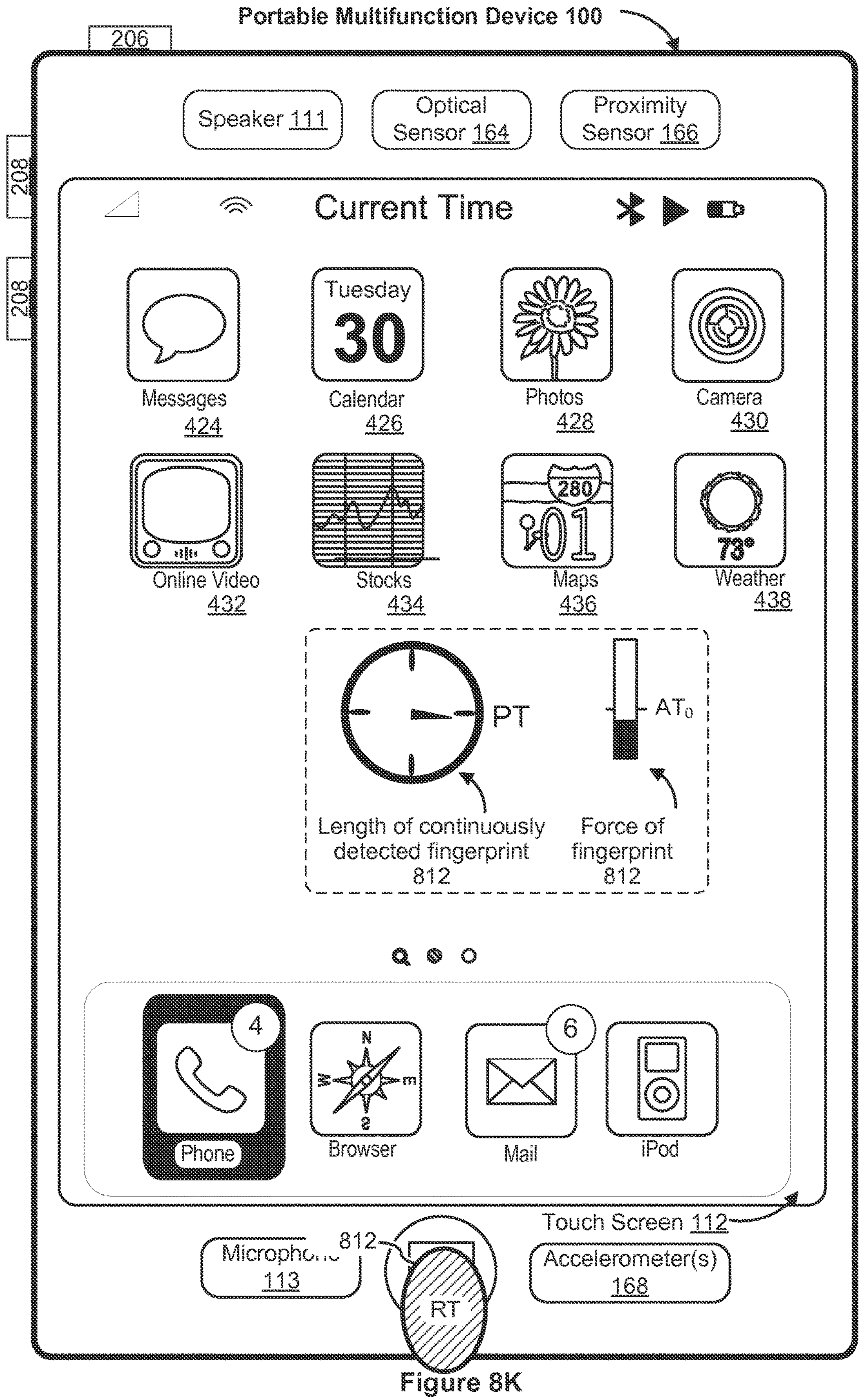
Figure 8L:
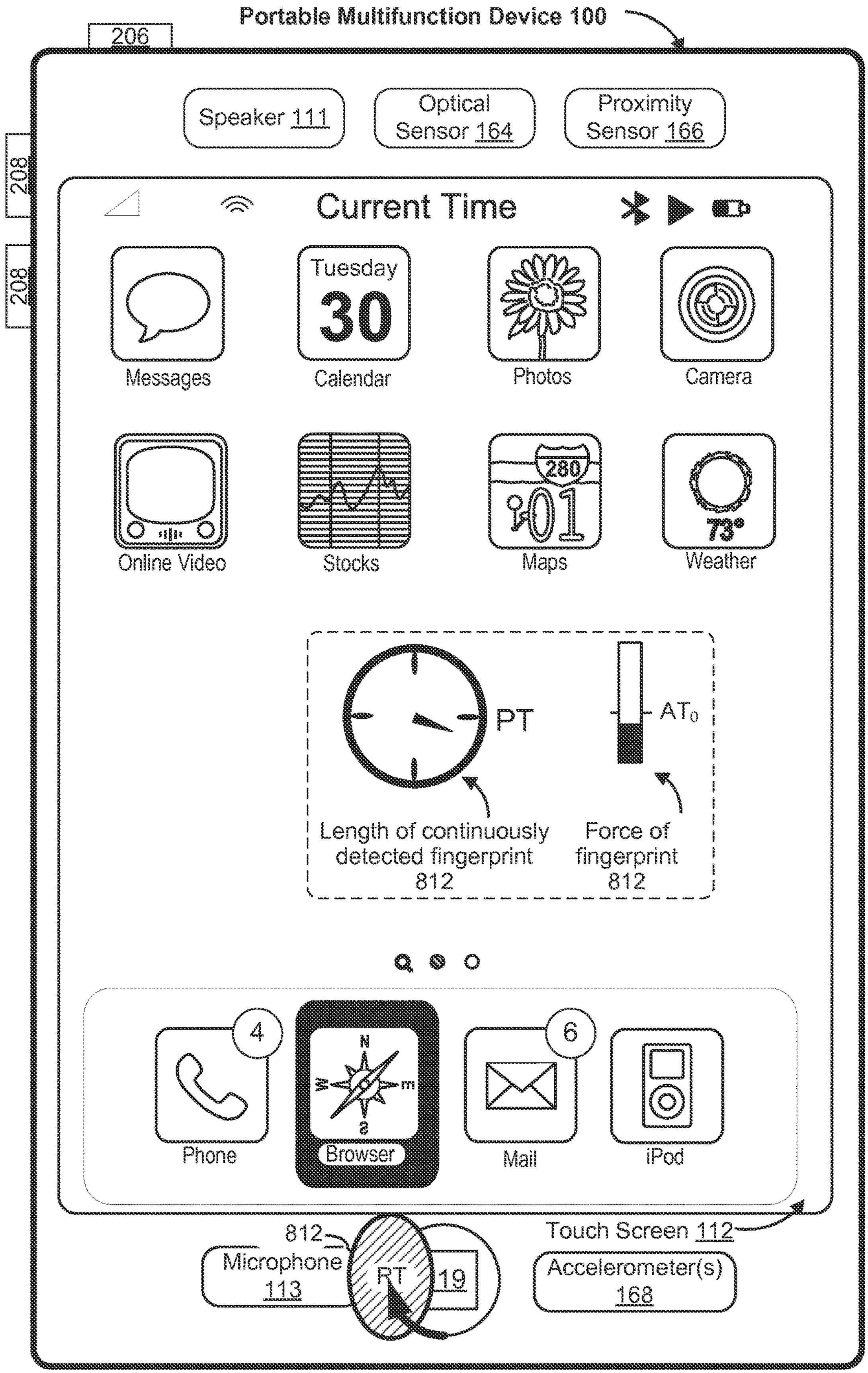
Figure 8M:
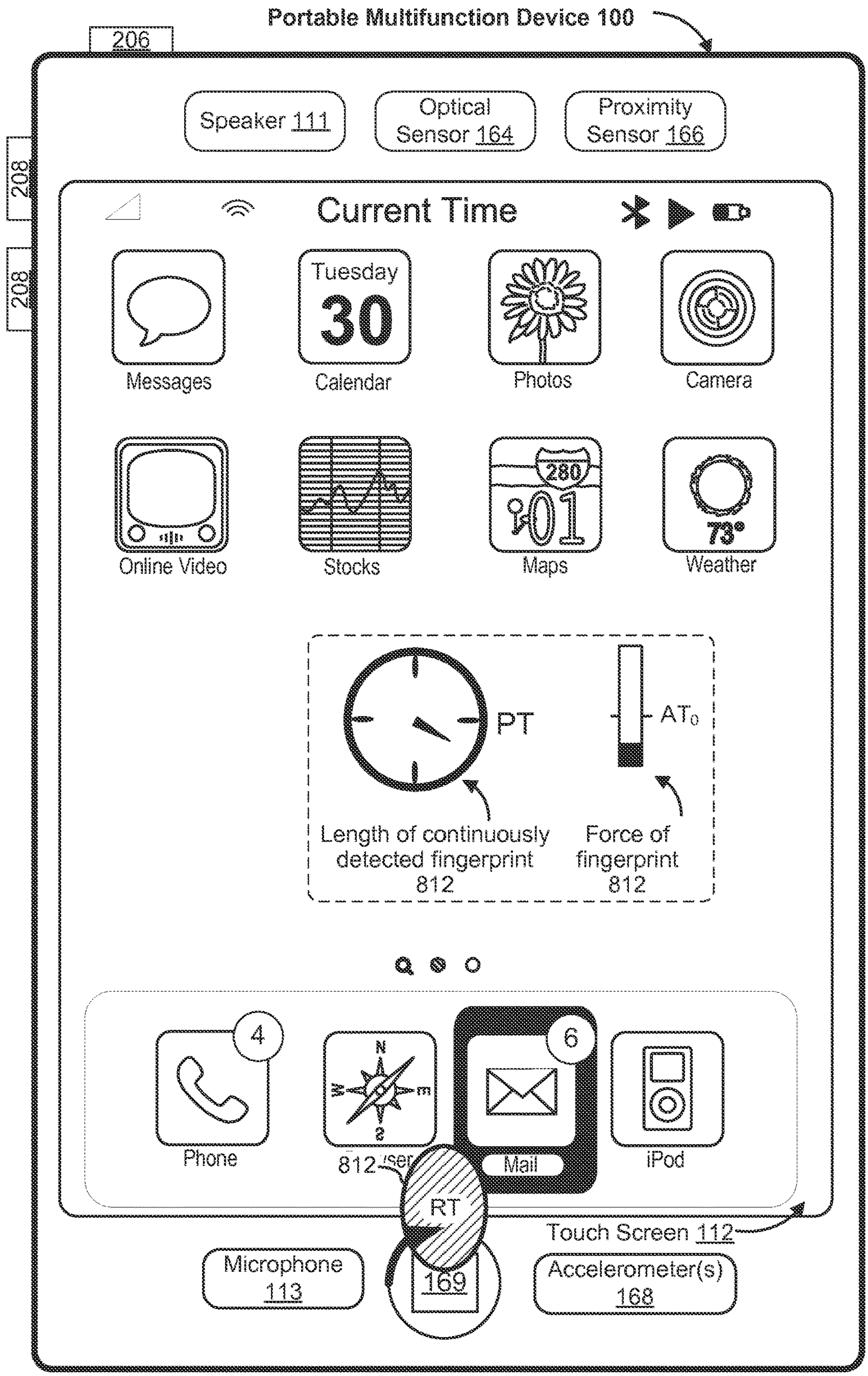
Figure 8N:
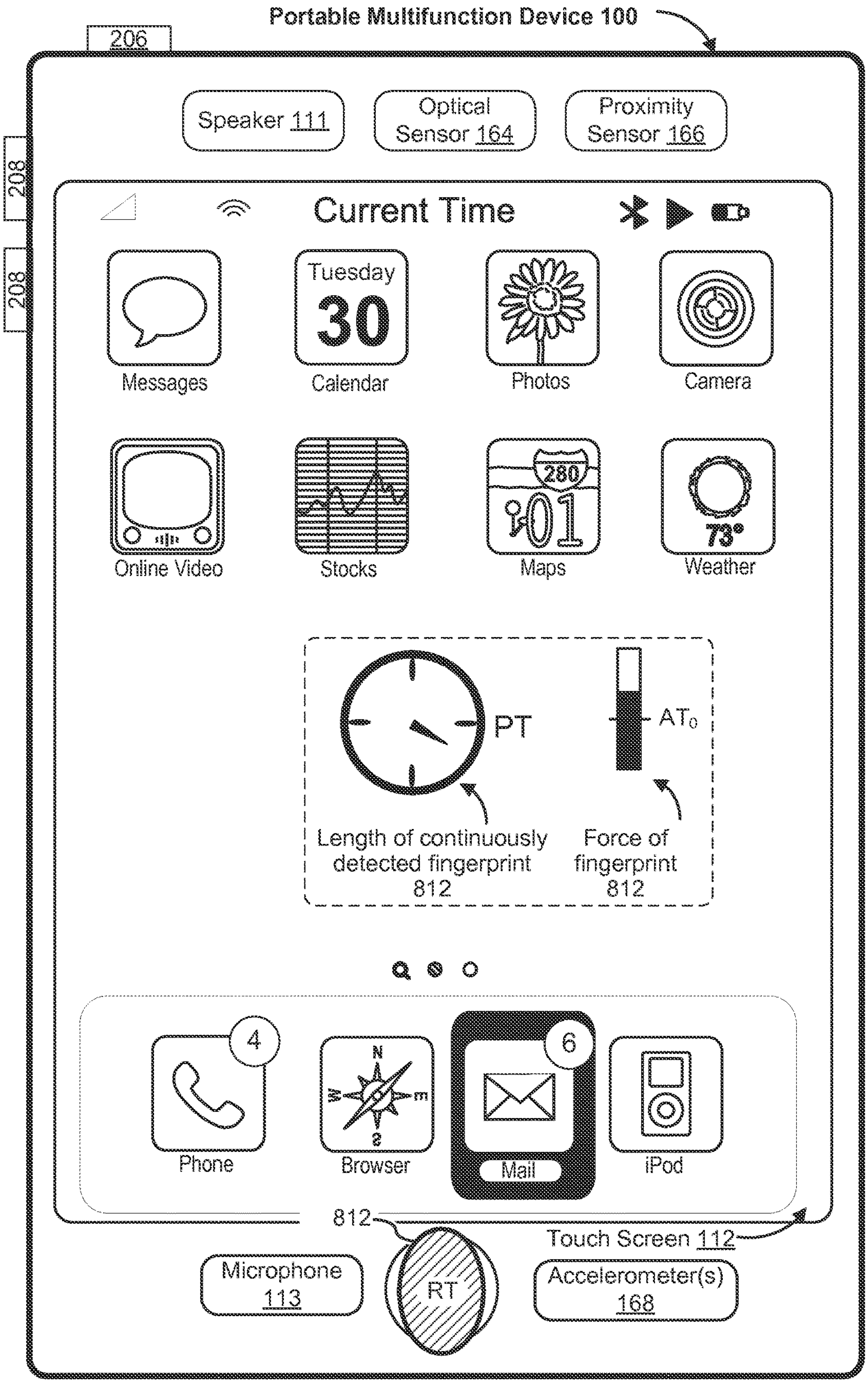
Figure 8O:
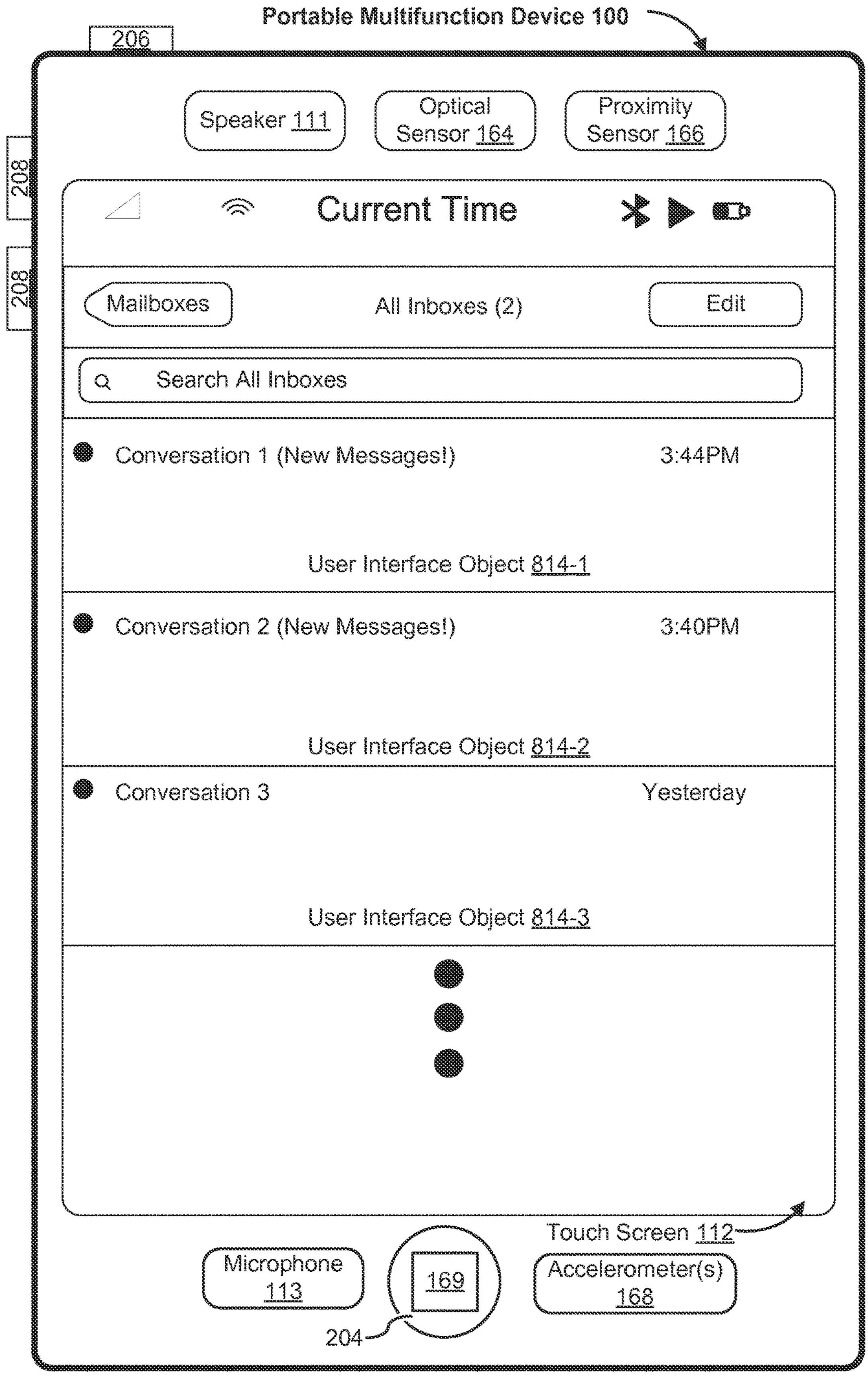
Figure 9A:
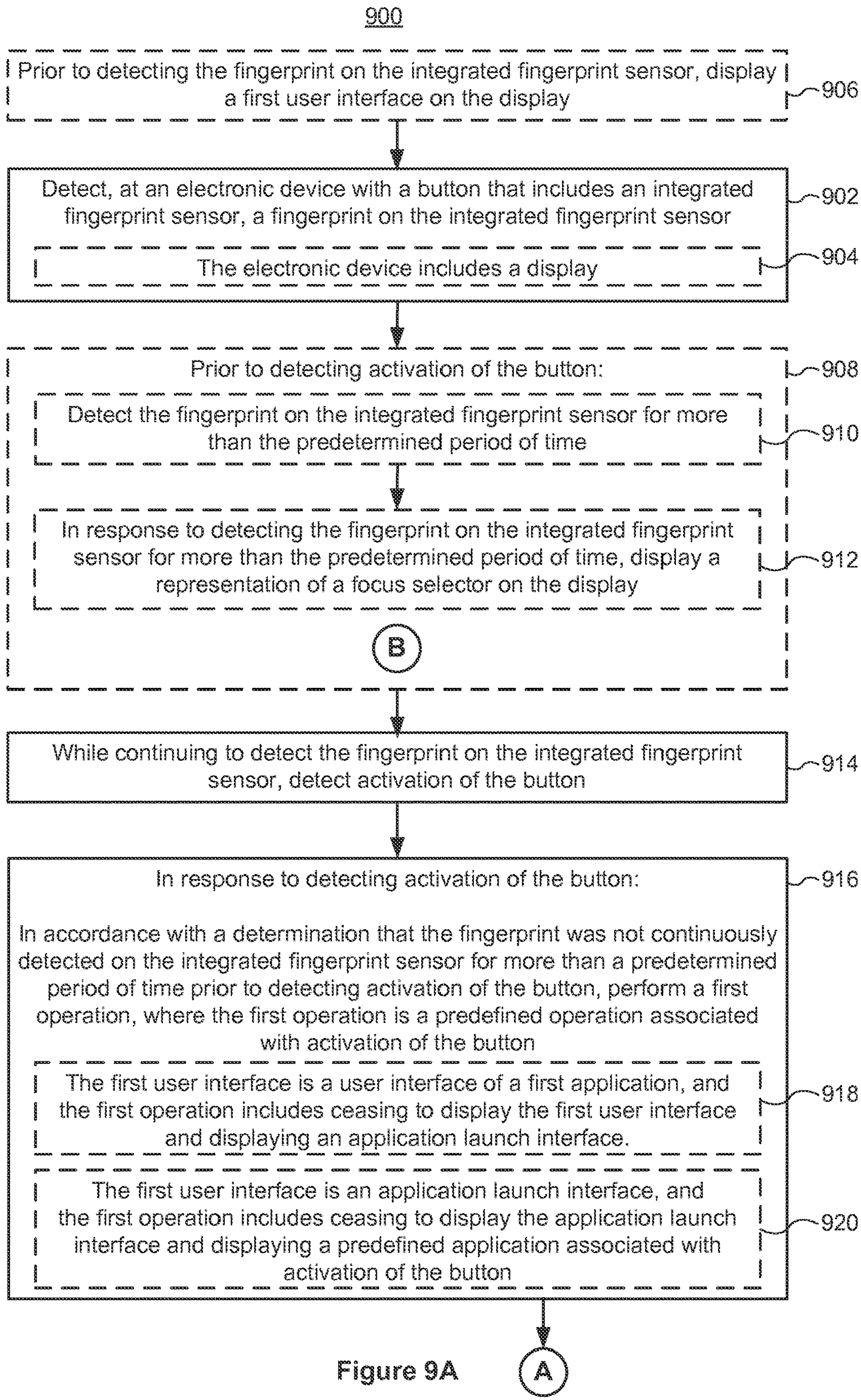
Figure 9C:
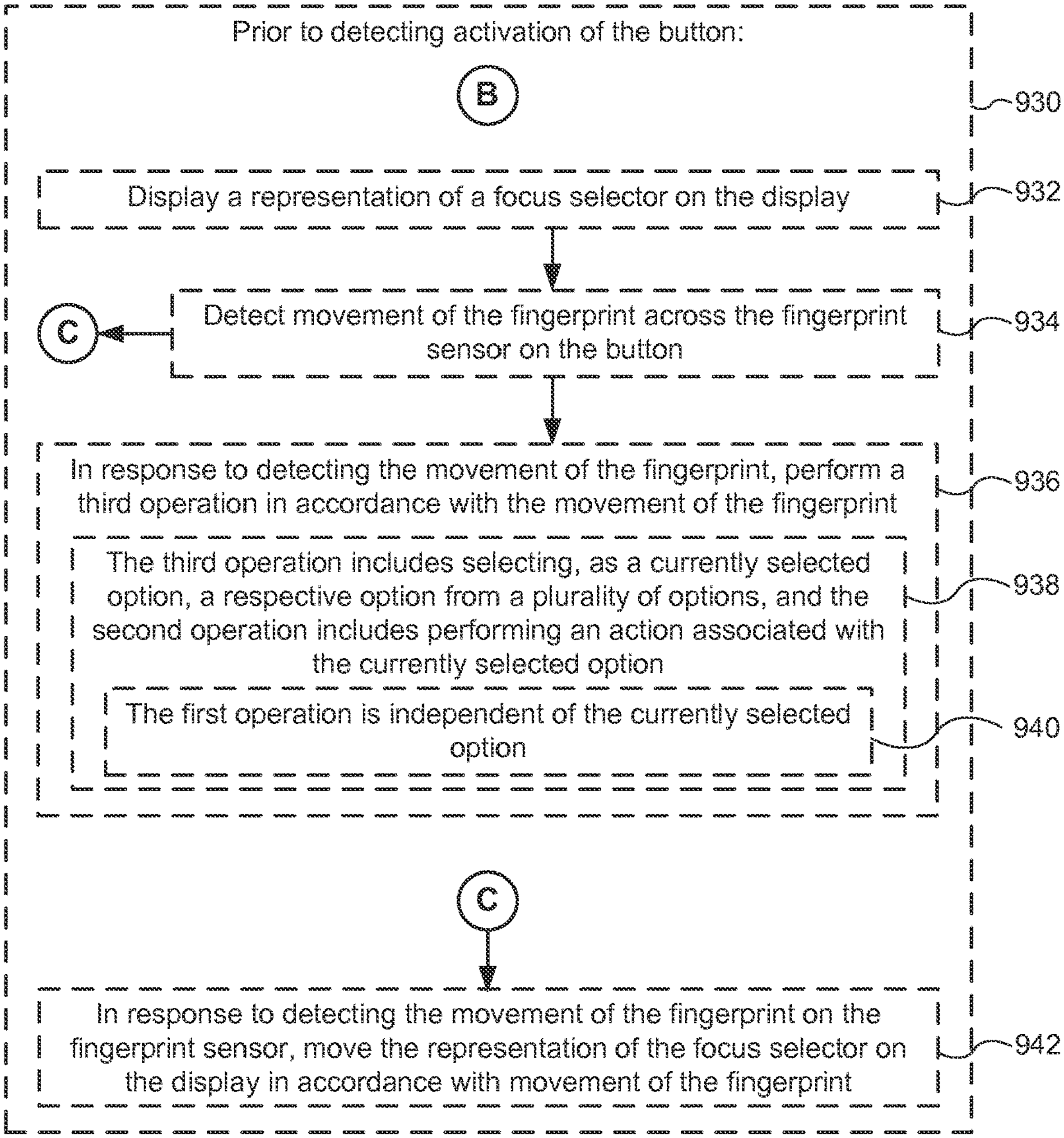

FIGS. 8K-8O illustrate exemplary user interfaces to be used in conjunction with multi-purpose buttons in accordance with some embodiments. In particular, FIGS. 8K-8O illustrate an example in which the user interface includes a plurality of affordances, for example user selectable icons corresponding applications on the home screen (e.g., phone app, browser app, etc.). FIGS. 8K-8O also illustrate a focus selector corresponding to a currently selected affordance (e.g., the icon representing the phone application in FIG. 8K is highlighted, providing a visual cue that the focus selector is "over" the phone application and that the phone application is currently selected, although the device has not yet received a command to run the phone application). Furthermore, FIGS. 8K-8O illustrate an example of embodiments in which the second operation includes performing an operation associated with application that corresponds to a currently selected affordance of the plurality of affordances.

FIG. 8K illustrates an example in which the focus selector's position is controlled by circumferential movement around fingerprint sensor 169 (e.g., the fingerprint sensor acts as a "scroll-wheel" with exemplary properties illustrated below). In this example, clockwise circumferential movement, as shown, moves the focus selector to the right as shown in FIG. 8L (movement of the focus selector over the browser app) and FIG. 8M (movement of the focus selector over the mail app). Likewise, although not shown, counter-clockwise circumferential movement around fingerprint sensor 169 moves the focus selector in an opposite direction (e.g., to the left). In some embodiments, the plurality of affordances are ordered and circumferential movement of fingerprint 812 increments the focus selector up or down in the order (e.g., movement of the fingerprint circumscribing an arc of a pre-defined angle, such as 90 degrees, increments the focus selector). In some embodiments, when the focus selector reaches the last affordance in the order, further incrementing the focus selector in the same direction returns the focus selector to the first affordance in the order. In some embodiments, the scroll-wheel functionality is available in an accessibility mode of the device different from a normal mode of the device.

FIG. 8N illustrates an example of activation of button 204 when the force of fingerprint 812 exceeds an activation threshold, as described previously. In this example, because fingerprint 812 has been continuously detected for predetermined period of time PT, the device performs the second operation. In this example, the second operation depends on the currently selected affordance. For example, FIG. 8O shows that the second operation has launched the mail app, as the device is now displaying an email interface including user interface objects 814-1 through 814-3 corresponding to email messages.

FIGS. 9A-9C are flow diagrams illustrating a method 900 of allowing a button to serve multiple purposes, in accordance with some embodiments. The method 900 is performed at an electronic device (e.g., device 300, FIG. 3, or portable multifunction device 100, FIG. 1A) with a display and a touch-sensitive surface. In some embodiments, the display is a touch screen display and the touch-sensitive surface is on the display. In some embodiments, the display is separate from the touch-sensitive surface. Some operations in method 900 are, optionally, combined and/or the order of some operations is, optionally, changed.

As described below, the method 900 provides an intuitive way to allow a button to serve multiple purposes. The method reduces the cognitive burden on a user when using buttons, thereby creating a more efficient human-machine interface. For battery-operated electronic devices, enabling a user to perform various device operations faster and more efficiently conserves power and increases the time between battery charges.

The device detects (902), at an electronic device with a button that includes an integrated fingerprint sensor, a fingerprint on the integrated fingerprint sensor. In some embodiments, the electronic device includes (904) a display. In some embodiments, prior to detecting the fingerprint on the integrated fingerprint sensor, the device displays (906) a first user interface on the display (e.g., the user interface shown in FIG. 8A).

In some embodiments, prior to detecting activation (908) of the button the device detects (910) the fingerprint on the integrated fingerprint sensor for more than the predetermined period of time. In response to detecting the fingerprint on the integrated fingerprint sensor for more than the predetermined period of time, the device displays (912) a representation of a focus selector on the display (e.g., a focus selector representation that was not displayed just prior to detecting the fingerprint, such as the highlighting of the phone app in FIG. 8K).

While continuing to detect the fingerprint on the integrated fingerprint sensor, the device detects (914) activation of the button (e.g., as shown in FIG. 8C). In some embodiments, the physical button is an intensity-sensitive region of the housing of the device that is determined to have been activated by the device when the intensity detected on the button is increased over an activation intensity threshold. In some embodiments, the physical button is coupled to an electronic switch where movement of the physical button along a first axis (e.g., up and down or left to right) closes the switch and activates the physical button (sometimes resulting in an audible or tactile "click"). In response to detecting activation of the button and in accordance with a determination that the fingerprint was not continuously detected on the integrated fingerprint sensor for more than a predetermined period of time prior to detecting activation of the button (e.g., the fingerprint was not continuously detected on the fingerprint sensor for at least 0.3, 0.5, 1, or 2 seconds immediately prior to detecting activation of the button), the device perform (916) a first operation, where the first operation is a predefined operation associated with activation of the button (e.g., the homing operation described with reference to FIGS. 8B-8D, or, alternatively, the search screen operation performed with reference to FIGS. 8D-8F).

In some embodiments, the first user interface is a user interface of a first application, and the first operation includes (918) ceasing to display the first user interface and displaying an application launch interface (e.g., ceasing to display the archery video game, FIGS. 8B-8D). In some embodiments, the first user interface is an application launch interface, and the first operation includes (920) ceasing to display the application launch interface (FIG. 8E) and displaying a predefined application associated with activation of the button (e.g., the search user interface, FIG. 8F).

In response to detecting activation of the button and in accordance with a determination that the fingerprint was continuously detected on the integrated fingerprint sensor for more than the predetermined period of time prior to detecting activation of the button (e.g., the fingerprint was continuously detected on the fingerprint sensor for at least 0.3, 0.5, 1, or 2 seconds immediately prior to detecting activation of the button), the device performs (922) a second operation different from the first operation, where the second operation is an operation associated with a user interface displayed on the display immediately prior to detecting activation of the button (e.g., the archery fires his or her bow, as shown in FIGS. 8G-8J).

In some embodiments, the user interface of the first application includes (924) a plurality of affordances (e.g., menus, controls, hyperlinks and the like) that correspond to respective operations associated with the first application, and the second operation includes performing an operation associated with the first application that corresponds to a currently selected affordance of the plurality of affordances (e.g., the device performs an operation corresponding to an affordance displayed within the application that is currently proximate to or collocated with a focus selector).

In some embodiments, the first user interface is an application launch interface (see 920), the application launch interface includes (926) a plurality of application-launch affordances (e.g., application icons, FIG. 8K) that correspond to respective applications in a plurality of applications, and the second operation includes launching a respective application that corresponds to a currently selected application-launch affordance of the plurality of application-launch affordances (e.g., the device launches an application corresponding to an application icon that is currently proximate to or collocated with a focus selector).

In some embodiments, the second operation is dependent (928) on a location of a focus selector in the first user interface (e.g., the second operation is an operation that corresponds to activation of a particular user interface object in the first user interface, such as activation of a hyperlink in a webpage or launching an application corresponding to an application icon in an application launch interface), and the first operation is independent of the location of the focus selector in the first user interface. For example, the first operation includes displaying a home screen or application launch screen, displaying a predefined application, and/or ceasing to display a user interface corresponding to a currently displayed application. In some embodiments, a representation of the focus selector is displayed in the first user interface and is ignored when performing the first operation. In some embodiments, a representation of the focus selector is not displayed in the first user interface.

In some embodiments, prior to detecting (930) activation of the button, the device displays (932) a representation of a focus selector on the display. The device detects (934) movement of the fingerprint across the fingerprint sensor on the button. In some embodiments, throughout the movement of the fingerprint across the fingerprint sensor, the fingerprint is continuously detected on the fingerprint sensor. In some embodiments, in response to detecting (942) the movement of the fingerprint on the fingerprint sensor, the device moves the representation of the focus selector on the display in accordance with movement of the fingerprint (e.g., the device scrolls the focus selector through selectable user interface objects in accordance with a swipe or circular gesture performed with the fingerprint without activating the button). On the other hand, in some embodiments, in response to detecting (936) the movement of the fingerprint, the device performs (936) a third operation (e.g., an option switching operation) in accordance with the movement of the fingerprint. In some embodiments, the third operation includes (938) selecting, as a currently selected option, a respective option from a plurality of options (e.g., selecting an option from a drop down menu or a item from a set of items, and the second operation includes performing an action associated with the currently selected option. In some embodiments, the first operation is independent (940) of the currently selected option (e.g., committing the currently selected option as a choice for a content field, or using/activating the item). As one example, the option switching switches between items or weapons in a game, and the second operation includes using the item or firing the weapon in the game. In this example, the first operation is, optionally, exiting the game and returning to a home screen or application launch screen of the device.

It should be understood that the particular order in which the operations in FIGS. 9A-9C have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., those methods described above) are also applicable in an analogous manner to method 900 described above with respect to FIGS. 9A-9C. For example, the fingerprints, gestures, user interface objects, focus selectors, described above with reference to method 900 optionally have one or more of the characteristics of the fingerprints, contacts, user interface objects, focus selectors, described herein with reference to other methods described herein (e.g., those methods described above). For brevity, these details are not repeated here.

Figure 10:
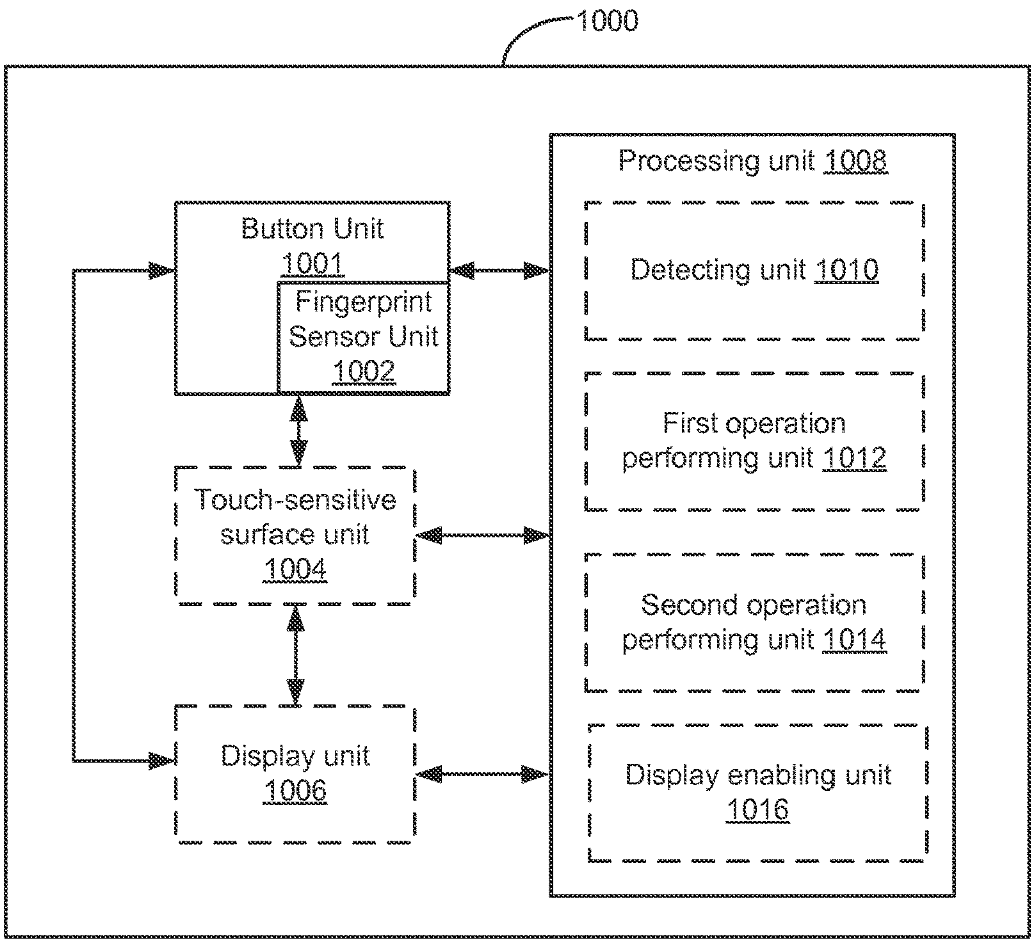
FIG. 10 is a functional block diagram of an electronic device in accordance with some embodiments.

In accordance with some embodiments, FIG. 10 shows a functional block diagram of an electronic device 1000 configured in accordance with the principles of the various described embodiments. The functional blocks of the device are, optionally, implemented by hardware, software, or a combination of hardware and software to carry out the principles of the various described embodiments. It is understood by persons of skill in the art that the functional blocks described in FIG. 10 are, optionally, combined or separated into sub-blocks to implement the principles of the various described embodiments. Therefore, the description herein optionally supports any possible combination or separation or further definition of the functional blocks described herein.

As shown in FIG. 10, an electronic device 1000 includes a button unit 1001 with an integrated a fingerprint sensor unit 1002; and a processing unit 1008 coupled to the button unit 1001. The electronic device 1000 optionally includes a display unit 1006 configured to enable the display of one or more user interfaces; and a touch-sensitive surface unit 1004 configured to receive contacts. In some embodiments, the display unit 1006 and the touch-sensitive surface unit 1004 are coupled to the button unit 1001 and/or the processing unit 1008. In some embodiments, the processing unit 1008 includes a detecting unit 1010, a first operation performing unit 1012, a second operation performing unit 1014, and a display enabling unit 1016.

The processing unit 1008 is configured to: detect (e.g., with detecting unit 1010) a fingerprint on the integrated fingerprint sensor unit 1002. While continuing to detect the fingerprint on the integrated fingerprint sensor unit 1002, the processing unit 1008 is further configured to detect activation of the button unit 1001. In response to detecting activation of the button unit 1001: in accordance with a determination that the fingerprint was not continuously detected on the integrated fingerprint sensor unit 1002 for more than a predetermined period of time prior to detecting activation of the button unit 1001, the processing unit 1008 is configured to perform a first operation (e.g., with first operation performing unit 1012), wherein the first operation is a predefined operation associated with activation of the button unit 1001. In response to detecting activation of the button unit 1001: in accordance with a determination that the fingerprint was continuously detected on the integrated fingerprint sensor unit 1002 for more than the predetermined period of time prior to detecting activation of the button unit 1001, the processing unit 1008 is configured to perform a second operation different from the first operation (e.g., with second operation performing unit 1014), wherein the second operation is an operation associated with a user interface displayed on the display unit 1006 immediately prior to detecting activation of the button unit 1001.

In some embodiments, the display unit 1006 is configured to, prior to detecting the fingerprint on the integrated fingerprint sensor unit 1002, enable the display of a first user interface (e.g., with display enabling unit 1016).

In some embodiments, the first user interface is a user interface of a first application; and the first operation includes ceasing to enable the display of the first user interface and enabling the display of an application launch interface on the display unit 1006.

In some embodiments, the user interface of the first application includes a plurality of affordances that correspond to respective operations associated with the first application; and the second operation includes performing an operation associated with the first application that corresponds to a currently selected affordance of the plurality of affordances.

In some embodiments, the first user interface is an application launch interface; and the first operation includes ceasing to enable the display of the application launch interface and enabling the display of a predefined application associated with activation of the button unit 1001.

In some embodiments, the application launch interface includes a plurality of application-launch affordances that correspond to respective applications in a plurality of applications; and the second operation includes launching a respective application that corresponds to a currently selected application-launch affordance of the plurality of application-launch affordances.

In some embodiments, the processing unit 1008 is further configured to, prior to detecting activation of the button unit 1001: detect the fingerprint on the integrated fingerprint sensor unit 1002 for more than the predetermined period of time; and in response to detecting the fingerprint on the integrated fingerprint sensor unit 1002 for more than the predetermined period of time, enable the display of a representation of a focus selector on the display unit 1006.

In some embodiments, the processing unit 1008 is further configured to, prior to detecting activation of the button unit 1001: display a representation of a focus selector on the display unit 1006; detect movement of the fingerprint on the fingerprint sensor unit 1002; and in response to detecting the movement of the fingerprint on the fingerprint sensor unit 1002, move the representation of the focus selector on the display unit 1006 in accordance with movement of the fingerprint.

In some embodiments, the second operation is dependent on a location of a focus selector in the first user interface; and the first operation is independent of the location of the focus selector in the first user interface.

In some embodiments, the processing unit 1008 is further configured to, prior to detecting activation of the button unit 1001: detect movement of the fingerprint across the fingerprint sensor unit 1002 on the button unit 1001; and in response to detecting the movement of the fingerprint, performing a third operation in accordance with the movement of the fingerprint.

In some embodiments, the third operation includes selecting, as a currently selected option, a respective option from a plurality of options; and the second operation includes performing an action associated with the currently selected option.

In some embodiments, the first operation is independent of the currently selected option.

The operations in the information processing methods described above are, optionally implemented by running one or more functional modules in information processing apparatus such as general purpose processors (e.g., as described above with respect to FIGS. 1A and 3) or application specific chips.

The operations described above with reference to FIGS. 9A-9C are, optionally, implemented by components depicted in FIGS. 1A-1B or FIG. 10. For example, detecting operation 901, displaying operation 906, and performing operation 916 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub-event, such as selection of an object on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Locking an Orientation of a User Interface

Many electronic devices have different orientations, such as a portrait orientation and a landscape orientation. When these devices display user interfaces and content, the user interfaces and content is typically displayed in the same orientation as the device orientation. Sometimes, the user may want to have user interfaces and content displayed in an orientation different from the device orientation. The user can force the device to display user interfaces and content in a particular orientation by activating an option to lock the orientation of the user interfaces and content. In some methods, activating the orientation locking option requires opening menus and sub-menus and/or multiple gestures and button presses. The embodiments described below improve on these methods by allowing a user to lock the orientation with a simpler input. On a device with a fingerprint sensor, the user locks the user interface and content orientation by rotating a fingerprint in one direction on a fingerprint sensor while the user interface or content is displayed in the desired orientation, and unlock the orientation by rotating the fingerprint in the opposite direction on the fingerprint sensor. This makes the orientation locking process more efficient and simple for users.

In some embodiments, the device is an electronic device with a separate display (e.g., display 450) and a separate touch-sensitive surface (e.g., touch-sensitive surface 451). In some embodiments, the device is portable multifunction device 100, the display is touch screen 112, and the touch-sensitive surface includes tactile output generators 167 on the display (FIG. 1A). The device described below with reference to 11A-11F and 12A-12B includes one or more fingerprint sensors 169. In some embodiments, the one or more fingerprint sensors include one or more integrated fingerprint sensors 359-1 (FIG. 4B) that are integrated into the touch-sensitive surface (e.g., separate touch-sensitive surface 451 or touch sensitive display system 112). In some embodiments, the one or more fingerprint sensors include separate fingerprint sensors 359-2 (FIG. 4B) that are separate from the touch-sensitive surface (e.g., separate touch-sensitive surface 451 or touch sensitive display system 112). Unless specified otherwise, a fingerprint sensor 169 described below is, optionally, either an integrated fingerprint sensor 359-1 or a separate fingerprint sensor 359-2, depending on the configuration of the hardware and software of the device that includes the fingerprint sensor 169. For convenience of explanation, the embodiments described with reference to FIGS. 11A-11F and 12A-12B will be discussed with reference to touch screen 112 and fingerprint sensor 169; in such embodiments, the focus selector is, optionally: a respective contact, a representative point corresponding to a contact (e.g., a centroid of a respective contact or a point associated with a respective contact), or a centroid of two or more contacts detected on the touch screen 112, in place of a cursor. Analogous operations are, optionally, performed on a device with display 450, a separate touch-sensitive surface 451, and an integrated fingerprint sensor 359-1 or a separate fingerprint sensor 359-2 in response to detecting the inputs described in FIGS. 11A-11F on the integrated fingerprint sensor 359-1 or the separate fingerprint sensor 359-2 while displaying the user interfaces shown in FIGS. 11A-11F on the display 450.

Figure 11A:
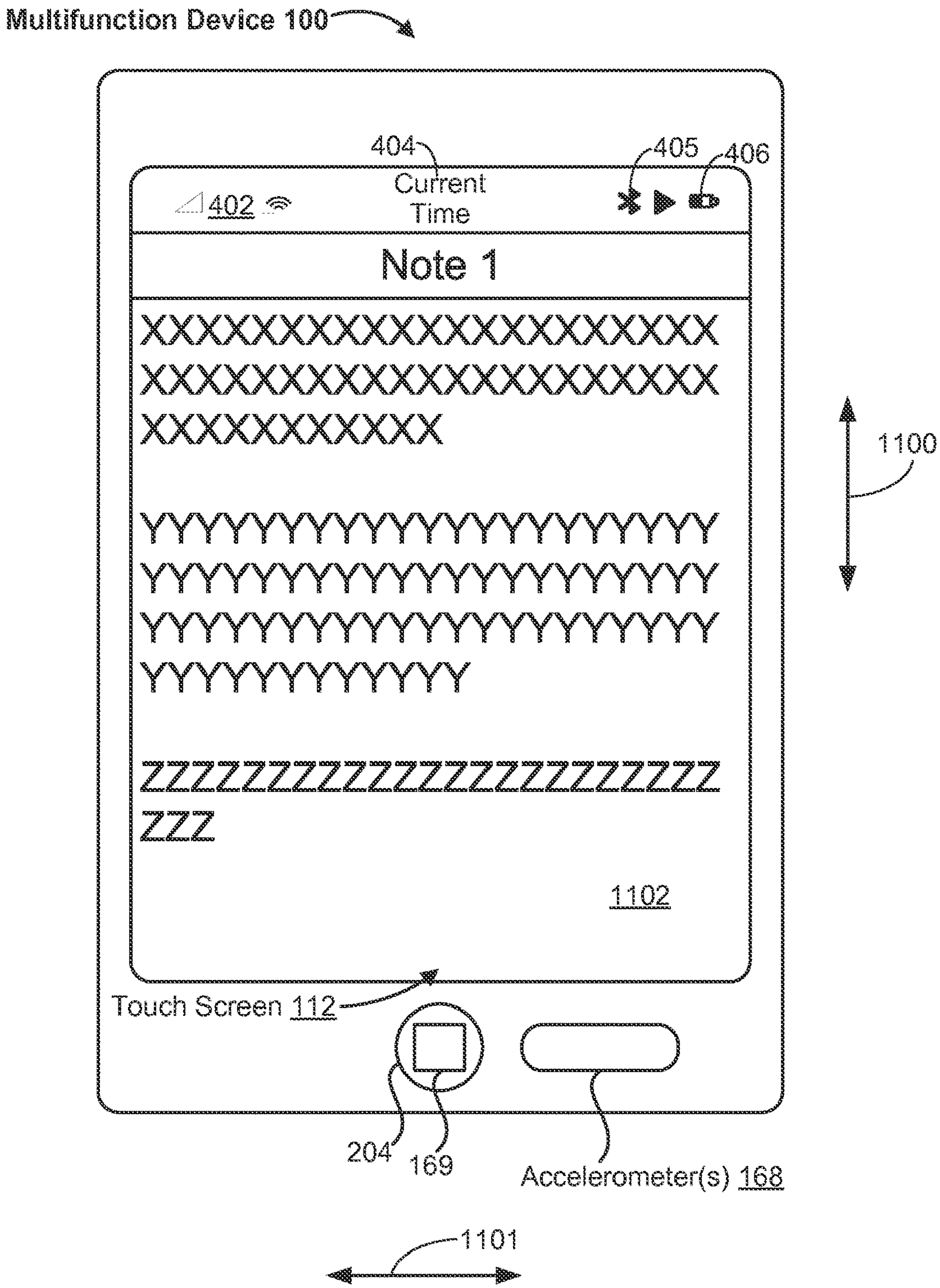
FIGS. 11A-11F illustrate exemplary user interfaces for locking an orientation of user interface in accordance with some embodiments.
Figure 12A:
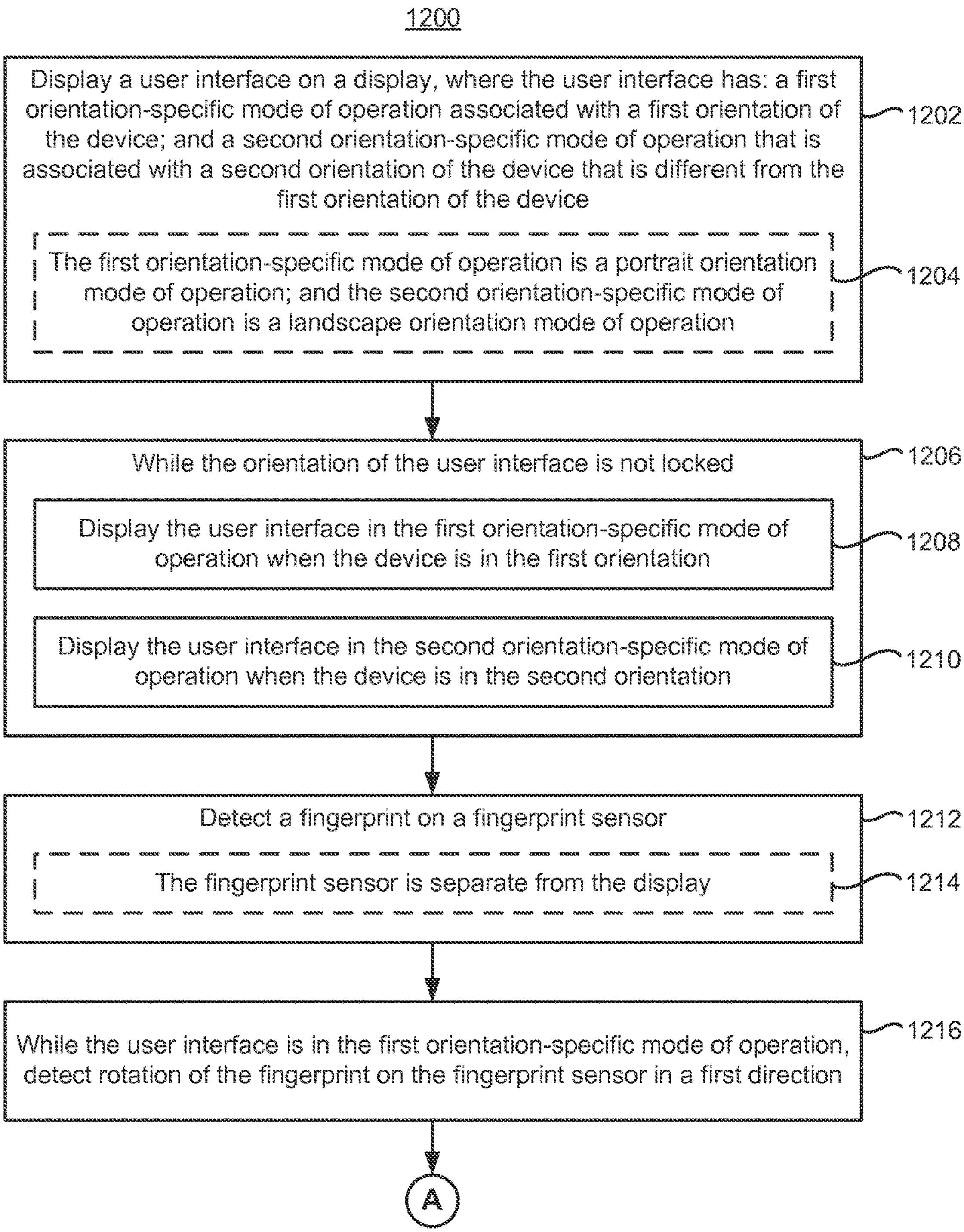
FIGS. 12A-12B are flow diagrams illustrating a method of locking an orientation of user interface in accordance with some embodiments.
Figure 12B:
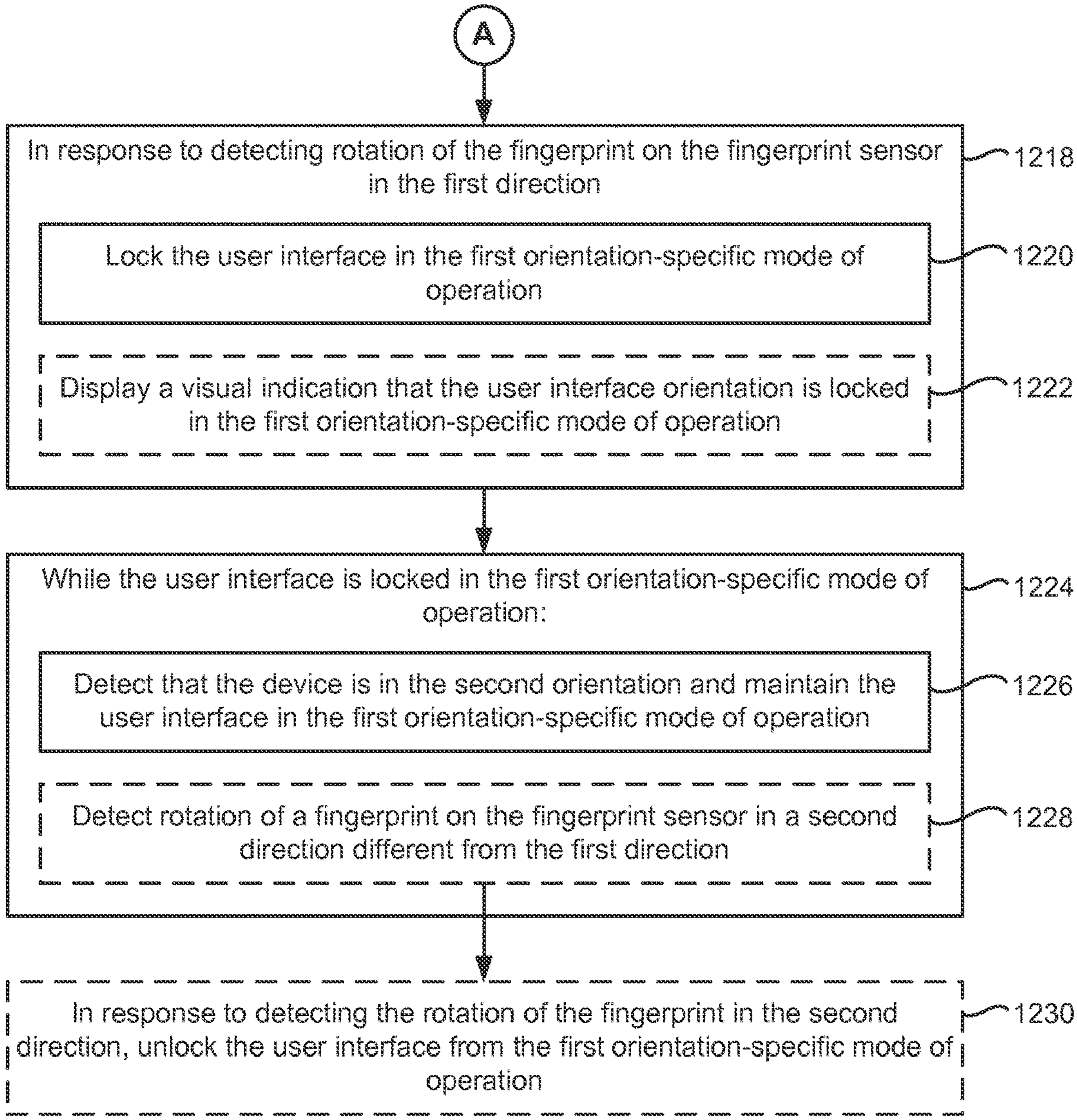

FIG. 11A illustrates user interface 1102 displayed on touch screen 112 of a device (e.g., device 100). User interface 1102 is a user interface of, for example, an application or an operating system running on device 100. For example, user interface 1102 as shown in FIG. 11A is a user interface for a notes application. In FIG. 11A, device 100 is oriented such that the vertical height (i.e., the dimension indicated by arrow 1100) of touch screen 112 is longer than the horizontal width (i.e., the dimension indicated by arrow 1101); touch screen 112 is in portrait orientation (e.g., a long axis of touch screen 112 is parallel to an up/down axis indicated by arrow 1100). In FIG. 11A, user interface 1102 is displayed in portrait mode, in accordance with the portrait orientation of touch screen 112. For example, in portrait mode, user interface 1102, right side up, is longer on dimension 1100 than dimension 1101.

Figure 11B:
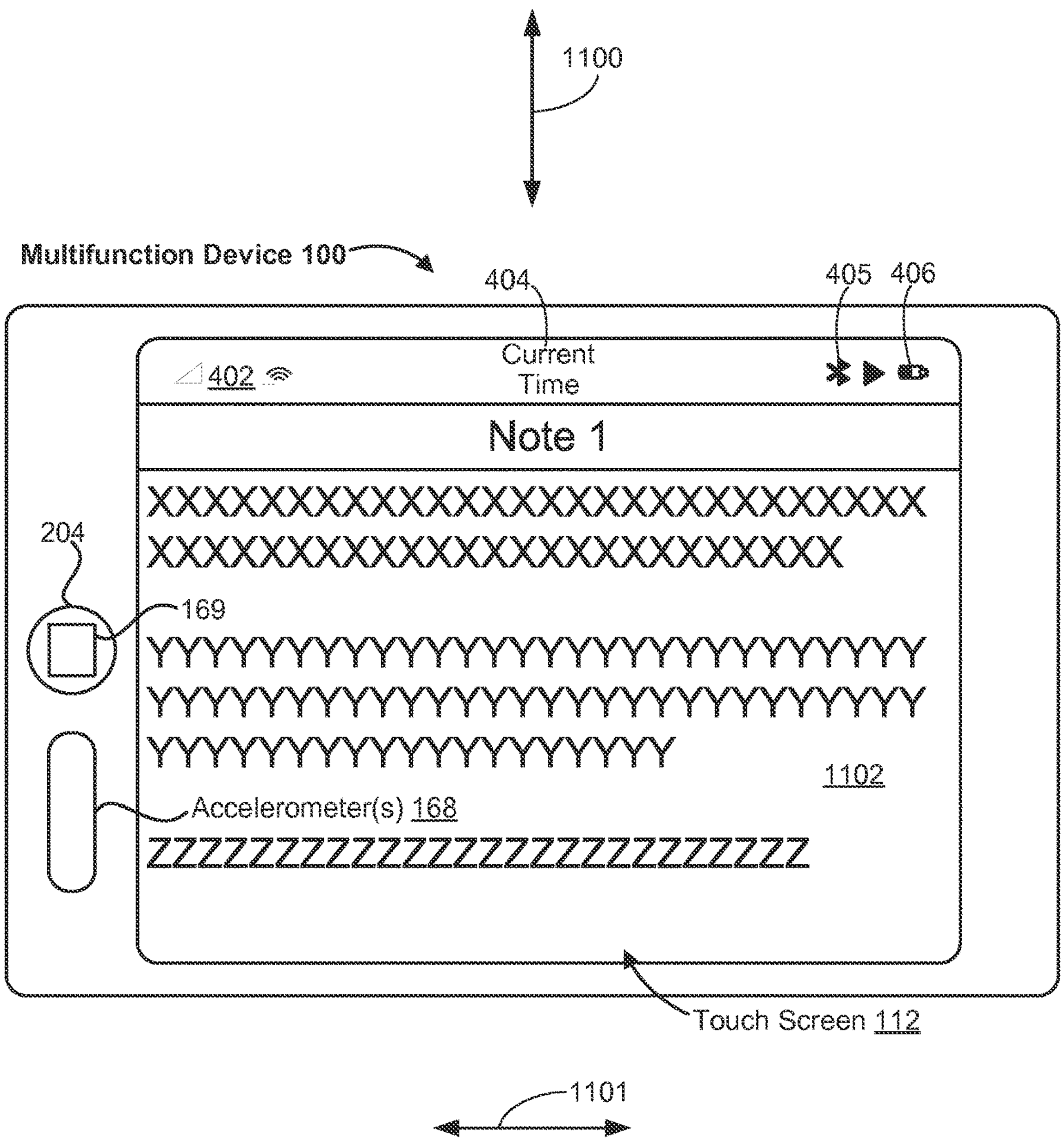

In FIG. 11B, device 100 is oriented such that the vertical height (i.e., dimension 1100) of touch screen 112 is shorter than the horizontal width (i.e., dimension 1101); touch screen 112 is in landscape orientation (e.g., a long axis of touch screen 112 is parallel to a right/left axis indicated by arrow 1101). In FIG. 11B, user interface 1102 is displayed in landscape mode, in accordance with the landscape orientation of touch screen 112. For example, in landscape mode, user interface 1102, right side up, is longer on dimension 1101 than dimension 1100.

It should be appreciated that, in FIGS. 11A-11F, the longer dimension of device 100 and the longer dimension of touch screen 112 are parallel. Thus, touch screen 112 is in portrait orientation (i.e., vertical height longer than horizontal width) when device 100 is in portrait orientation. Analogously, touch screen 112 is in landscape orientation when device 100 is in landscape orientation. In some embodiments, the longer dimension of device 100 is perpendicular to the longer dimension of touch screen 112; touch screen 112 is in portrait orientation when device 100 is in landscape orientation, and vice versa.

As shown in FIGS. 11A-11B, user interface 1102 is displayed in portrait or landscape mode in accordance with the orientation of touch screen 112. When touch screen 112 changes orientation (e.g., by a user rotating device 100 around an axis perpendicular to the surface of touch screen 112) and user interface 1102 is not locked to a particular orientation-specific mode, user interface 1102 is displayed in a mode in accordance with the new orientation (e.g., based on a sensed direction of gravity from an accelerometer integrated into the device). For example, when device 100 is turned from portrait orientation, as in FIG. 11A, to landscape orientation, as in FIG. 11B, device 100 changes the displayed user interface 1102 from portrait mode, as in FIG. 11A, to landscape mode, as in FIG. 11B. Similarly, when device 100 is turned from landscape orientation, as in FIG. 11B, to portrait orientation, as in FIG. 11A, device 100 changes the displayed user interface 1102 from landscape mode, as in FIG. 11B, to portrait mode, as in FIG. 11A.

Figure 11C:
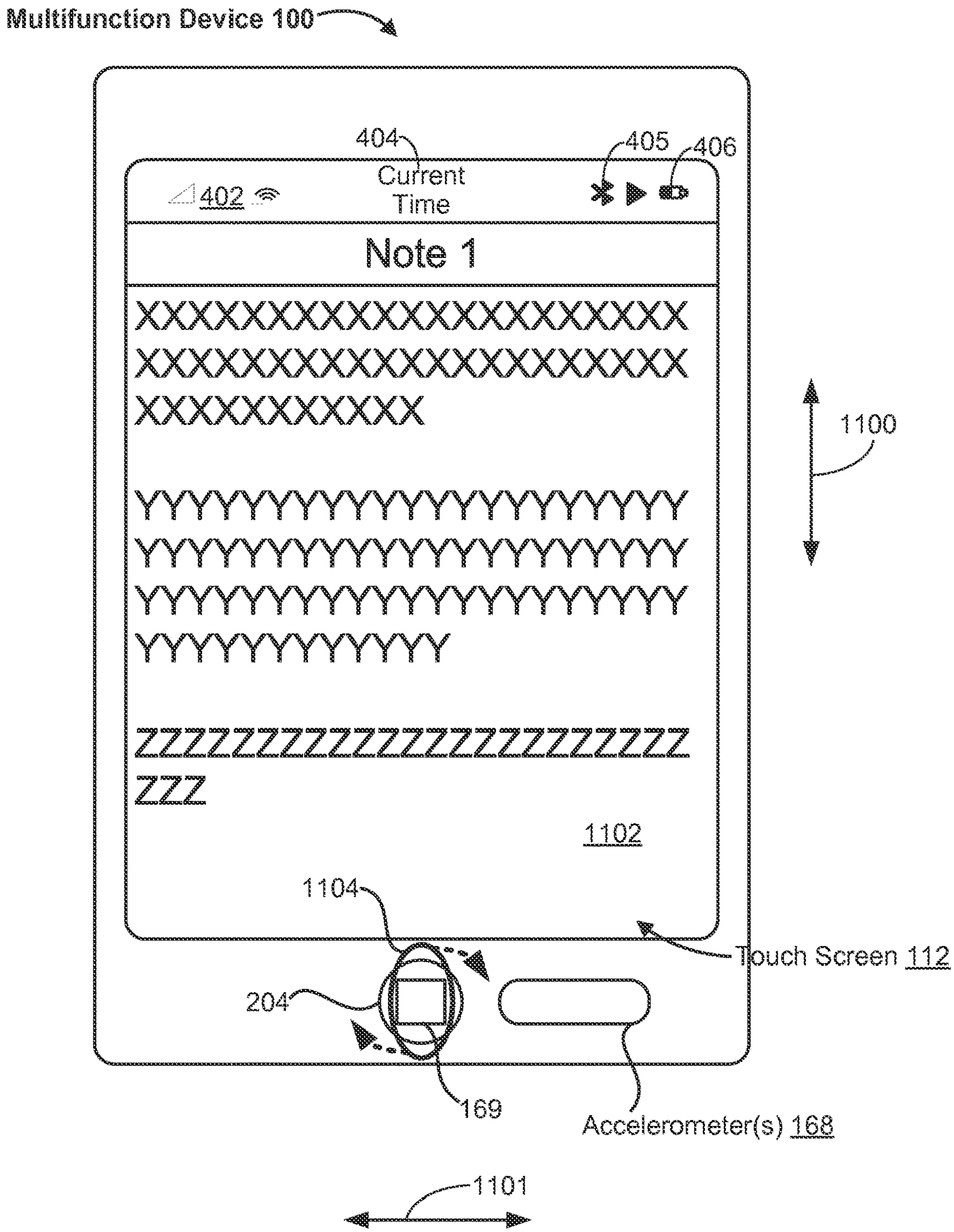
Figure 11D:
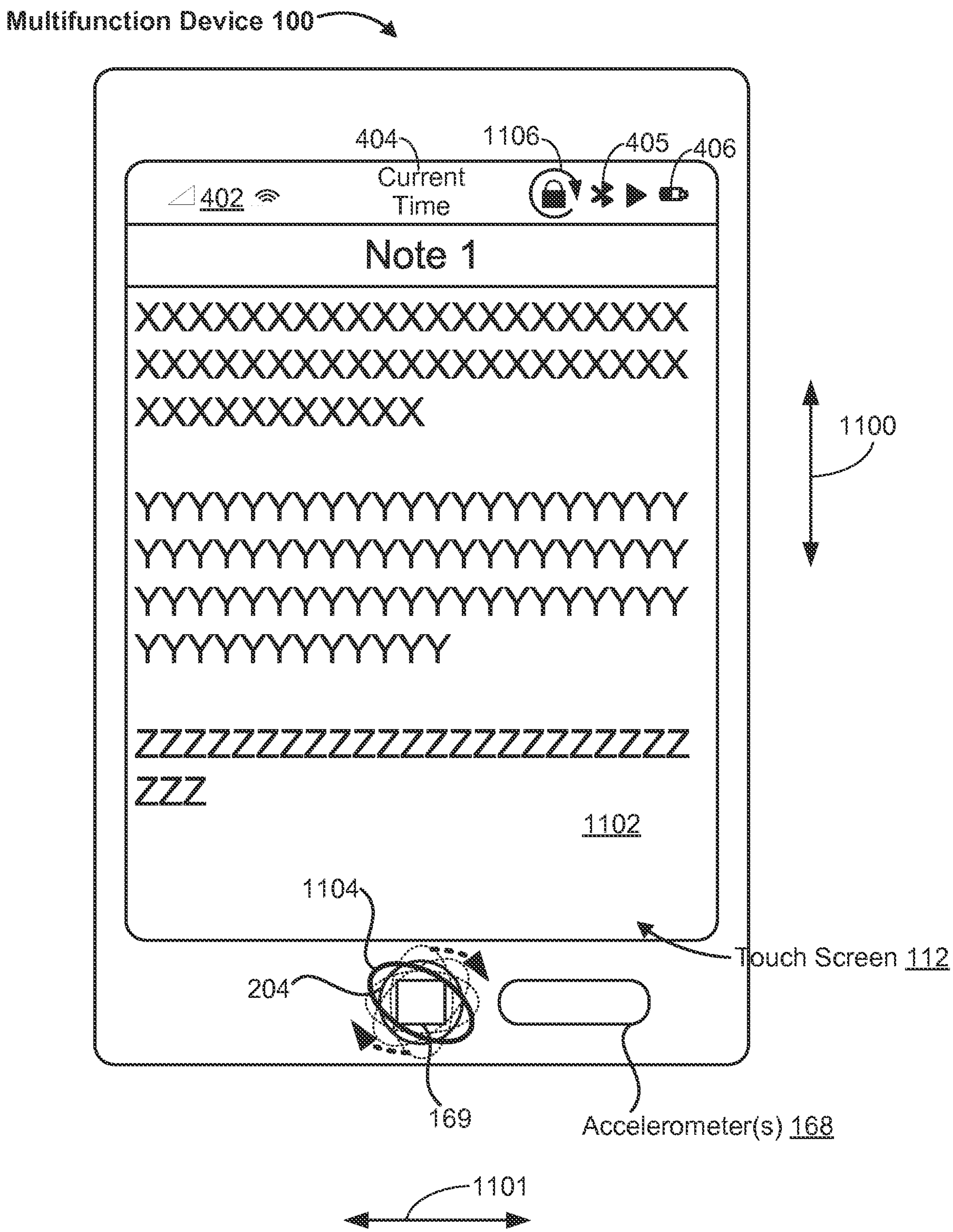

FIG. 11C illustrates device 100 detecting fingerprint 1104 on fingerprint sensor 169. Fingerprint 1104 is placed on fingerprint sensor 169 by, for example, a user making contact on fingerprint sensor 169 with a finger. FIG. 11C-11D illustrates device 100 detecting a rotation of fingerprint 1104 in a clockwise direction around fingerprint sensor 169. The rotation of fingerprint 1104 is detected while user interface 1102 is displayed in portrait mode. In some embodiments, the rotation of fingerprint 1104 is a twisting of fingerprint 1104 on fingerprint sensor 169. In some other embodiments, the rotation of fingerprint 1104 is a revolution of fingerprint 1104 around fingerprint sensor 169.

In response to detecting the rotation of fingerprint 1104 clockwise around fingerprint sensor 169 while user interface 1102 is displayed in portrait mode, device 100 locks user interface 1102 into portrait mode. In some embodiments, a visual indication (e.g., icon 1106, FIG. 11D) that user interface 1102 is locked in portrait mode is displayed. While user interface 1102 is locked in portrait mode, user interface 1102 is displayed in portrait mode whether touch screen 112 is in portrait orientation or in landscape orientation. When user interface 1102, locked in portrait mode, is displayed and device 100 is rotated to landscape orientation, user interface 1102 remains in portrait mode; user interface 1102 is displayed as if rotated 90 degrees. For example, FIG. 11E shows device 100 in landscape orientation while user interface 1102 is locked in portrait mode; user interface 1102 is displayed in portrait mode despite the landscape orientation of device 100.

Figure 11E:
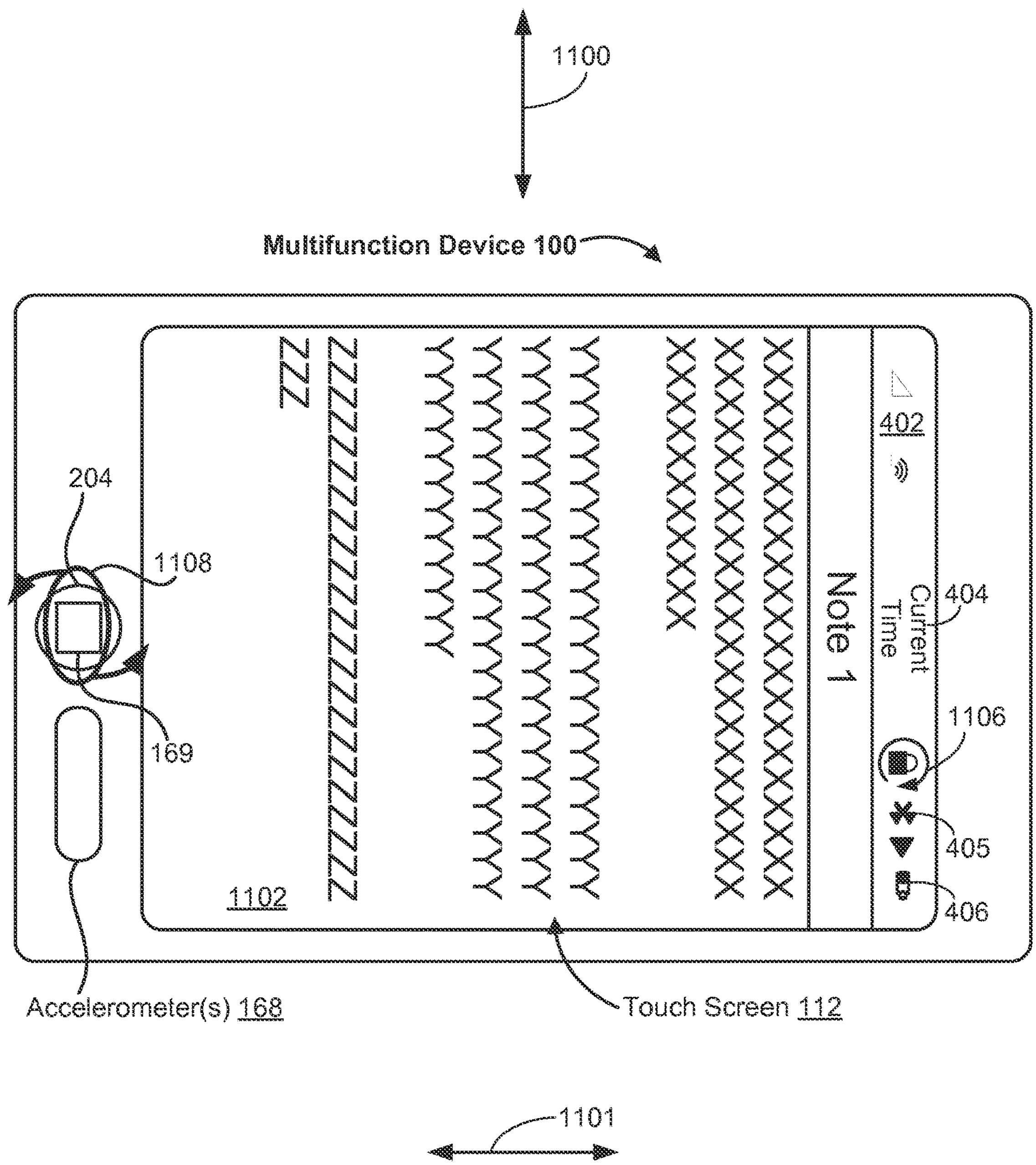
Figure 11F:
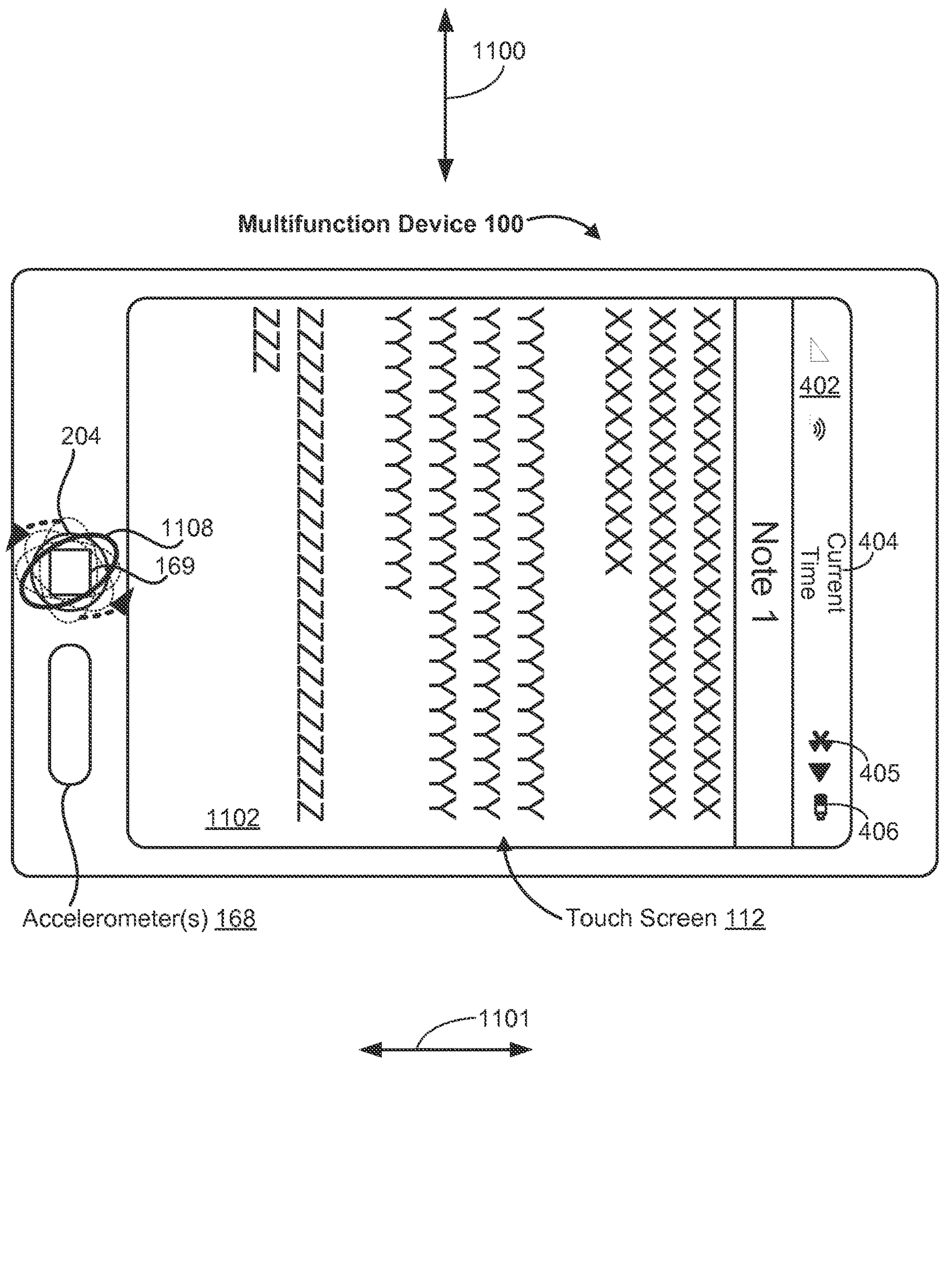

While user interface 1102 is locked in portrait mode, the device 100 detects fingerprint 1108 and a rotation of fingerprint 1108 in a counter-clockwise direction around fingerprint sensor 169, as shown in FIGS. 11E-11F. In response to detecting the rotation of fingerprint 1108 counterclockwise around fingerprint sensor 169 while user interface 1102 is locked in portrait mode, user interface 1102 is unlocked from portrait mode. If a visual indication (e.g., icon 1106, FIG. 11D) that user interface 1102 was locked in portrait mode was displayed while user interface 1102 was locked, then the visual indication ceases to be displayed. For example, FIG. 11F shows icon 1106 ceasing to be displayed in response to device 100 detecting the rotation of fingerprint 1108 counter-clockwise around fingerprint sensor 169. After user interface 1102 is unlocked from portrait mode, the display mode of user interface 1102 again follows the orientation of device 100 (e.g., in accordance with a direction of gravity as detected by the device using an accelerometer or other sensor), as in FIGS. 11A-11B. For example, in FIG. 11F, after user interface 1102 is unlocked from portrait mode, user interface 1102 reverts back to landscape mode, as in FIG. 11B, in accordance with the landscape orientation of device 100.

In some embodiments, operations analogous to those described above are performed to lock user interface 1102 into landscape mode. For example, a fingerprint rotation analogous to the rotation of fingerprint 1104 (FIGS. 11C-11D) while user interface 1102 is displayed in landscape mode (e.g., in accordance with device 100 being in landscape orientation) locks user interface 1102 into landscape mode. A fingerprint rotation analogous to the rotation of fingerprint 1108 (FIGS. 11E-11F) while user interface 1102 is locked in landscape mode unlocks user interface 1102 from landscape mode.

In some embodiments, the fingerprint rotation that locks user interface 1102 into a particular orientation mode (i.e., portrait mode or landscape mode) is counterclockwise, and the rotation to unlock is clockwise, as opposed to the vice versa described above.

FIGS. 12A-12B are flow diagrams illustrating a method 1200 of locking an orientation of user interface in accordance with some embodiments. The method 1200 is performed at an electronic device (e.g., device 300, FIG. 3, or portable multifunction device 100, FIG. 1A) with a display and a touch-sensitive surface. In some embodiments, the display is a touch screen display and the touch-sensitive surface is on the display. In some embodiments, the display is separate from the touch-sensitive surface. Some operations in method 1200 are, optionally, combined and/or the order of some operations is, optionally, changed.

As described below, the method 1200 provides an intuitive way to lock an orientation of user interface. The method reduces the cognitive burden on a user when locking an orientation of user interface, thereby creating a more efficient human-machine interface. For battery-operated electronic devices, enabling a user to lock an orientation of user interface faster and more efficiently conserves power and increases the time between battery charges.

The device displays (1202) a user interface on the display, where the user interface has a first orientation-specific mode of operation (e.g., portrait mode) associated with a first orientation of the device and a second orientation-specific mode of operation (e.g., landscape mode) that is associated with a second orientation of the device that is different from the first orientation of the device. FIGS. 11A-11B shows, for example, user interface 1102 displayed on touch screen 112. User interface 1102 is displayed in portrait mode when device 100 is in portrait orientation (FIG. 11A), and displayed in landscape mode when device 100 is in landscape orientation (FIG. 11B).

In some embodiments, the first orientation-specific mode of operation is a portrait orientation mode of operation, and the second orientation-specific mode of operation is a landscape orientation mode of operation (1204). As shown in FIGS. 11A-11B, user interface 1102 is displayed in portrait mode or landscape mode.

While the orientation of the user interface is not locked (1206), the device displays (1208) the user interface in the first orientation-specific mode of operation when the device is in the first orientation, and displays (1210) the user interface in the second orientation-specific mode of operation when the device is in the second orientation. FIGS. 11A-11B show user interface 1102 that is not locked in a particular orientation mode. User interface 1102 is displayed in portrait mode when device 100 is in portrait orientation (FIG. 11A), and displayed in landscape mode when device 100 is in landscape orientation (FIG. 11B).

The device detects (1212) a fingerprint on the fingerprint sensor. FIG. 11C, for example, shows fingerprint 1104 detected on fingerprint sensor 169. As another example, FIG. 11E shows fingerprint 1108 detected on fingerprint sensor 169. In some embodiments, the fingerprint sensor is (1214) separate from the display. For example, fingerprint sensor 169 is separate from touch screen 112.

While the user interface is in the first orientation-specific mode of operation, the device detects (1216) rotation of the fingerprint on the fingerprint sensor (e.g., where an orientation of the fingerprint changes relative to an orientation of the fingerprint sensor) in a first direction (e.g., clockwise). For example, FIG. 11D shows device 100 detecting rotation (e.g., twisting) of fingerprint 1104 on fingerprint sensor 169 in a clockwise direction. In response to detecting rotation of the fingerprint on the fingerprint sensor in the first direction (1218), the device locks (1220) the user interface in the first orientation-specific mode of operation. In FIG. 11D, for example, in response to detecting the clockwise rotation of fingerprint 1104 while user interface 1102 is displayed in portrait mode, device 100 locks user interface 1102 into portrait mode (e.g., as shown in FIG. 11E).

In some embodiments, in response to detecting rotation of the fingerprint on the fingerprint sensor in the first direction (1218), the device displays (1222) a visual indication that the user interface orientation is locked in the first orientation-specific mode of operation. In FIG. 11D, for example, in response to detecting the clockwise rotation of fingerprint 1104, in addition to locking user interface 1102 into portrait mode, device 100 displays icon 1106 to indicate that user interface 1102 is locked in portrait mode.

While the user interface is locked in the first orientation-specific mode of operation (1224), the device detects that the device is in the second orientation and maintains (1226) the user interface in the first orientation-specific mode of operation. For example, FIG. 11D shows device 100 in portrait orientation and user interface 1102 locked in portrait mode. When device 100 is rotated (e.g., by the user) to landscape orientation, device 100 detects that it is now in landscape orientation and maintains user interface 1102, which was locked in portrait mode, in portrait mode, as shown in FIG. 11E.

In some embodiments, while the user interface is in the second orientation-specific mode of operation, the device detects rotation of the fingerprint on the fingerprint sensor (e.g., where an orientation of the fingerprint changes relative to an orientation of the fingerprint sensor) in a first direction (e.g., clockwise); in response to detecting rotation of the fingerprint on the fingerprint sensor in the first direction, the device locks the user interface in the second orientation-specific mode of operation; and while the user interface is locked in the second orientation-specific mode of operation, the device detects that the device is in the first orientation and maintains the user interface in the second orientation-specific mode of operation. Thus, analogously, user interface 1102 is, optionally, locked into landscape mode, and is displayed in landscape mode even when device 100 is in portrait orientation.

In some embodiments, while the user interface is locked in the first orientation-specific mode of operation (1224), the device detects (1228) rotation of a fingerprint on the fingerprint sensor in a second direction (e.g., counterclockwise) different from the first direction. In response to detecting the rotation of the fingerprint in the second direction, the device unlocks (1230) the user interface from the first orientation-specific mode of operation. For example, FIG. 11F shows device 100 detecting a counterclockwise rotation (e.g., twisting) of fingerprint 1108 while user interface 1102 is locked in portrait mode. In response to detecting the counterclockwise rotation of fingerprint 1108 while user interface 1102 is locked in portrait mode, user interface 1102 is unlocked from portrait mode.

It should be understood that the particular order in which the operations in FIGS. 12A-12B have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., those methods described above) are also applicable in an analogous manner to method 1200 described above with respect to FIGS. 12A-12B. For example, the fingerprints and user interfaces described above with reference to method 1200 optionally have one or more of the characteristics of the fingerprints and user interfaces described herein with reference to other methods described herein (e.g., those methods described above). For brevity, these details are not repeated here.

Figure 13:
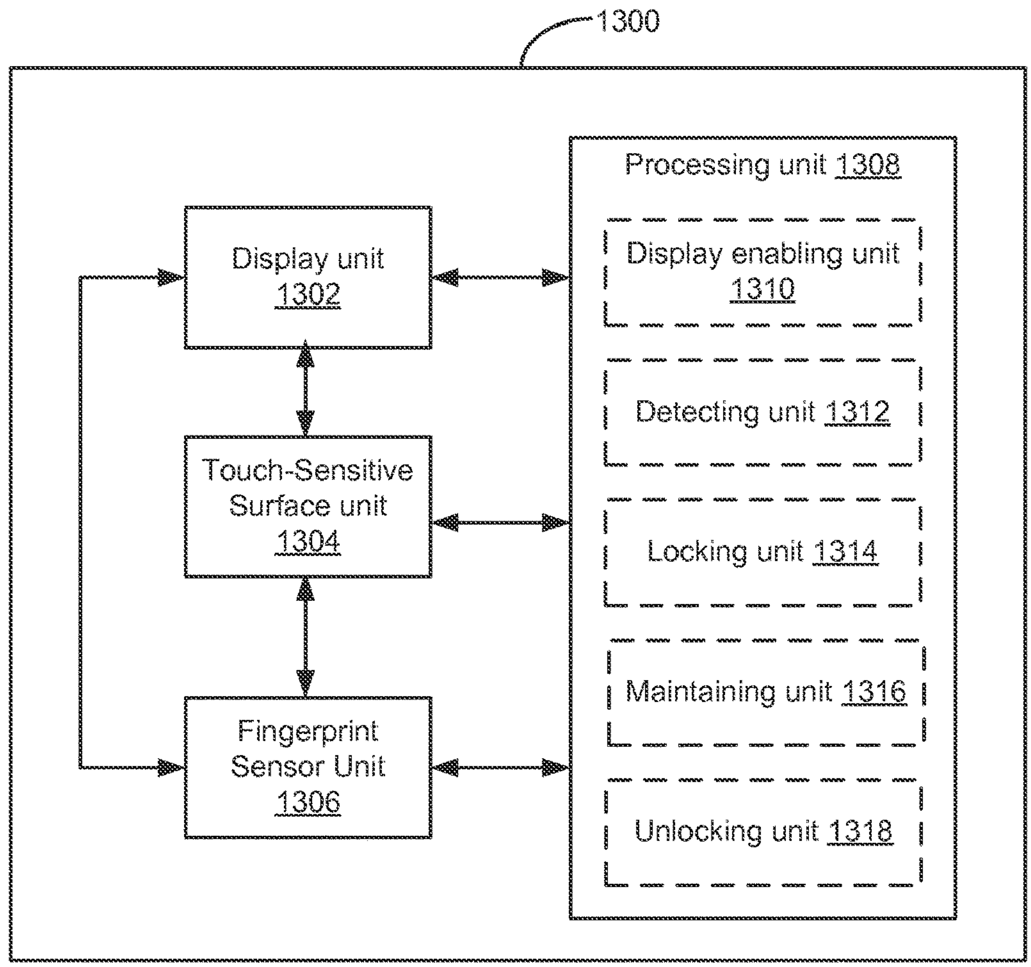
FIG. 13 is a functional block diagram of an electronic device in accordance with some embodiments.

In accordance with some embodiments, FIG. 13 shows a functional block diagram of an electronic device 1300 configured in accordance with the principles of the various described embodiments. The functional blocks of the device are, optionally, implemented by hardware, software, or a combination of hardware and software to carry out the principles of the various described embodiments. It is understood by persons of skill in the art that the functional blocks described in FIG. 13 are, optionally, combined or separated into sub-blocks to implement the principles of the various described embodiments. Therefore, the description herein optionally supports any possible combination or separation or further definition of the functional blocks described herein.

As shown in FIG. 13, an electronic device 1300 includes a display unit 1302 configured to display a user interface, where the user interface has a first orientation-specific mode of operation associated with a first orientation of the device 1300 and a second orientation-specific mode of operation that is associated with a second orientation of the device 1300 that is different from the first orientation of the device 1300, optionally, a touch-sensitive surface unit 1304, a fingerprint sensor unit 1306; and a processing unit 1308 coupled to the display unit 1302, the touch-sensitive surface unit 1304 and the fingerprint sensor unit 1306. In some embodiments, the processing unit 1308 includes a display enabling unit 1310, a detecting unit 1312, a locking unit 1314, a maintaining unit 1316, and an unlocking unit 1318.

The processing unit 1308 is configured to: while the orientation of the user interface is not locked: enable display of the user interface in the first orientation-specific mode of operation when the device 1300 is in the first orientation (e.g., with the display enabling unit 1310), and enable display of the user interface in the second orientation-specific mode of operation when the device 1300 is in the second orientation (e.g., with the display enabling unit 1310); detect a fingerprint on the fingerprint sensor unit 1306 (e.g., with the detecting unit 1312); while the user interface is in the first orientation-specific mode of operation, detect rotation of the fingerprint on the fingerprint sensor unit 1306 in a first direction (e.g., with the detecting unit 1312); in response to detecting rotation of the fingerprint on the fingerprint sensor unit 1306 in the first direction, lock the user interface in the first orientation-specific mode of operation (e.g., with the locking unit 1314); and while the user interface is locked in the first orientation-specific mode of operation, detect that the device 1300 is in the second orientation (e.g., with the detecting unit 1312) and maintain the user interface in the first orientation-specific mode of operation (e.g., with the maintaining unit 1316).

In some embodiments, the processing unit 1308 is configured to: while the user interface is locked in the first orientation-specific mode of operation, detect rotation of a fingerprint on the fingerprint sensor unit 1306 in a second direction different from the first direction (e.g., with the detecting unit 1312); and in response to detecting the rotation of the fingerprint in the second direction, unlock the user interface from the first orientation-specific mode of operation (e.g., with the unlocking unit 1318).

In some embodiments, the processing unit 1308 is configured to: in response to detecting rotation of the fingerprint on the fingerprint sensor unit 1306 in the first direction, enable display of a visual indication that the user interface orientation is locked in the first orientation-specific mode of operation (e.g., with the display enabling unit 1310).

In some embodiments, the first orientation-specific mode of operation is a portrait orientation mode of operation, and the second orientation-specific mode of operation is a landscape orientation mode of operation.

In some embodiments, the fingerprint sensor unit 1306 is separate from the display unit 1302.

The operations in the information processing methods described above are, optionally implemented by running one or more functional modules in information processing apparatus such as general purpose processors (e.g., as described above with respect to FIGS. 1A and 3) or application specific chips.

The operations described above with reference to FIGS. 12A-12B are, optionally, implemented by components depicted in FIGS. 1A-1B or FIG. 13. For example, detection operations 1212 and 1216, locking operation 1220, and detecting and maintaining operations 1226 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub-event, such as selection of an object on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Controlling Noise Reduction in Recorded Audio with a Fingerprint Sensor

Many electronic devices enable users to record media, including recording audio. While recording, a user typically wishes to reduce/cancel noise coming from sources other than the intended source in the recorded audio. For example, a user may wish to reduce the sound of his breathing in the recorded audio. However, a user may wish to stop or toggle the noise reduction at will. For example, the user may wish to provide commentary during certain parts of recorded media while cancelling inadvertent user sounds during other parts. Existing devices either do not provide the user this functionality or require the user to navigate through various menus and user interfaces. In the embodiments described below, an improved method for controlling noise reduction in recorded audio is achieved by using a fingerprint sensor to allow the user to toggle noise reduction on and off. This method streamlines the process of controlling noise reduction in recorded audio by doing so in response to a fingerprint sensor on an electronic device.

In some embodiments, the device is an electronic device with a separate display (e.g., display 450) and a separate touch-sensitive surface (e.g., touch-sensitive surface 451). In some embodiments, the device is portable multifunction device 100, the display is touch screen 112, and the touch-sensitive surface includes tactile output generators 167 on the display (FIG. 1A). The device described below with reference to 14A-14D and 15 includes one or more fingerprint sensors 169. In some embodiments, the one or more fingerprint sensors include one or more integrated fingerprint sensors 359-1 (FIG. 4B) that are integrated in to the touch-sensitive surface (e.g., separate touch-sensitive surface 451 or touch sensitive display system 112). In some embodiments, the one or more fingerprint sensors include separate fingerprint sensors 359-2 (FIG. 4B) that are separate from the touch-sensitive surface (e.g., separate touch-sensitive surface 451 or touch sensitive display system 112). Unless specified otherwise, a fingerprint sensor 169 described below is, optionally, either an integrated fingerprint sensor 359-1 or a separate fingerprint sensor 359-2, depending on the configuration of the hardware and software of the device that includes the fingerprint sensor 169. For convenience of explanation, the embodiments described with reference to FIGS. 14A-14D and 15 will be discussed with reference to display 450, a touch-sensitive surface 451, and an integrated fingerprint sensor 359-1, however analogous operations are, optionally, performed on a device with a separate touch-sensitive surface 451 and a separate fingerprint sensor 359-2 in response to detecting the inputs described in FIGS. 14A-14D on the integrated fingerprint sensor 359-2 while displaying the user interfaces shown in FIGS. 14A-14D on the display 450. Additionally, analogous operations are, optionally, performed on a device with a touch screen 112 in response to detecting the contacts described in FIGS. 14A-14D on a fingerprint sensor 169 (e.g., an integrated fingerprint sensor 359-1 or a separate fingerprint sensor 359-2) while displaying the user interfaces shown in FIGS. 14A-14D on the touch screen 112; in such embodiments, the focus selector is, optionally: a respective contact, a representative point corresponding to a contact (e.g., a centroid of a respective contact or a point associated with a respective contact), or a centroid of two or more contacts detected on the touch screen 112.

Figure 14A:
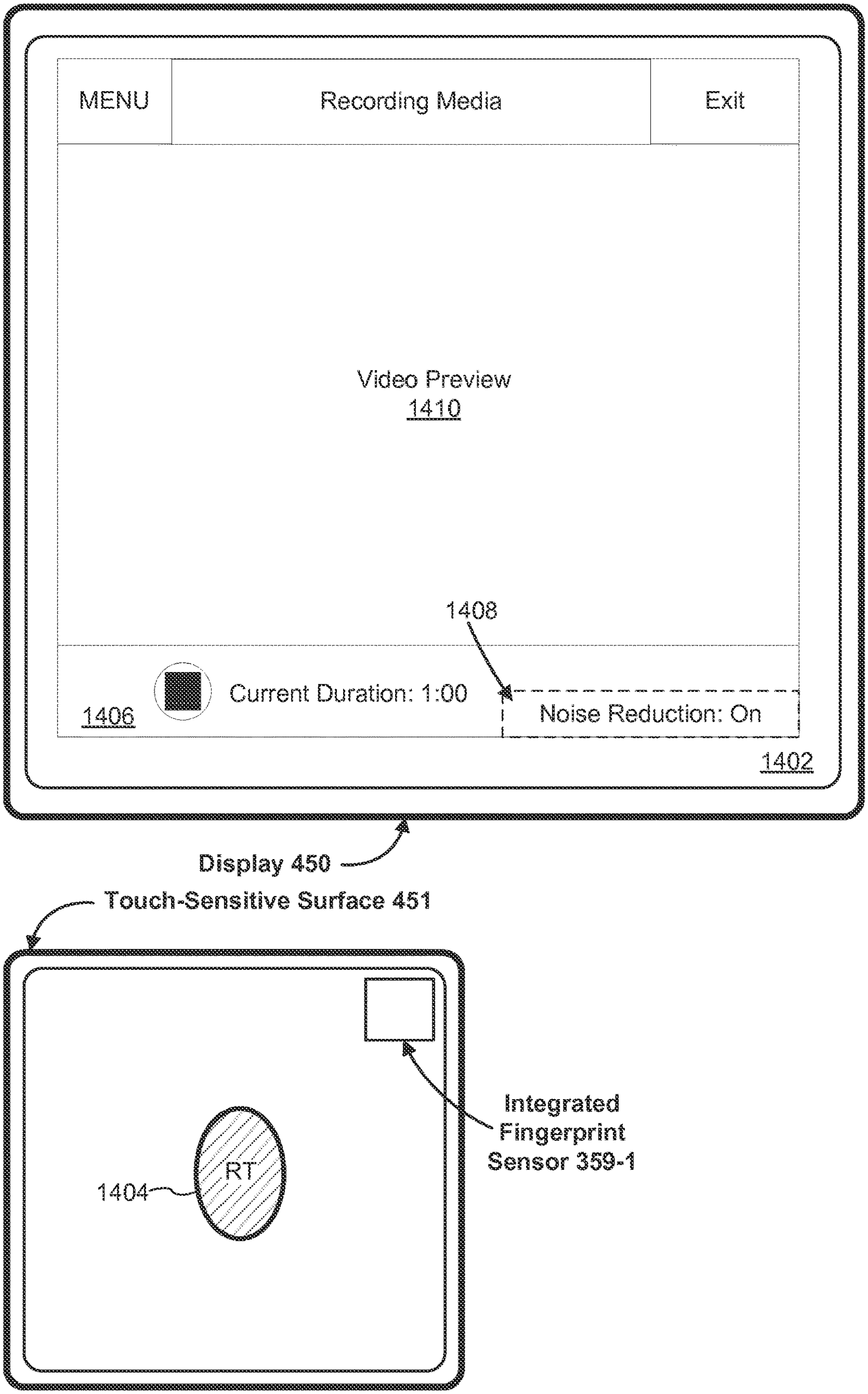
FIGS. 14A-14D illustrate exemplary user interfaces for controlling noise reduction in recorded audio with a fingerprint sensor in accordance with some embodiments.
Figure 14B:
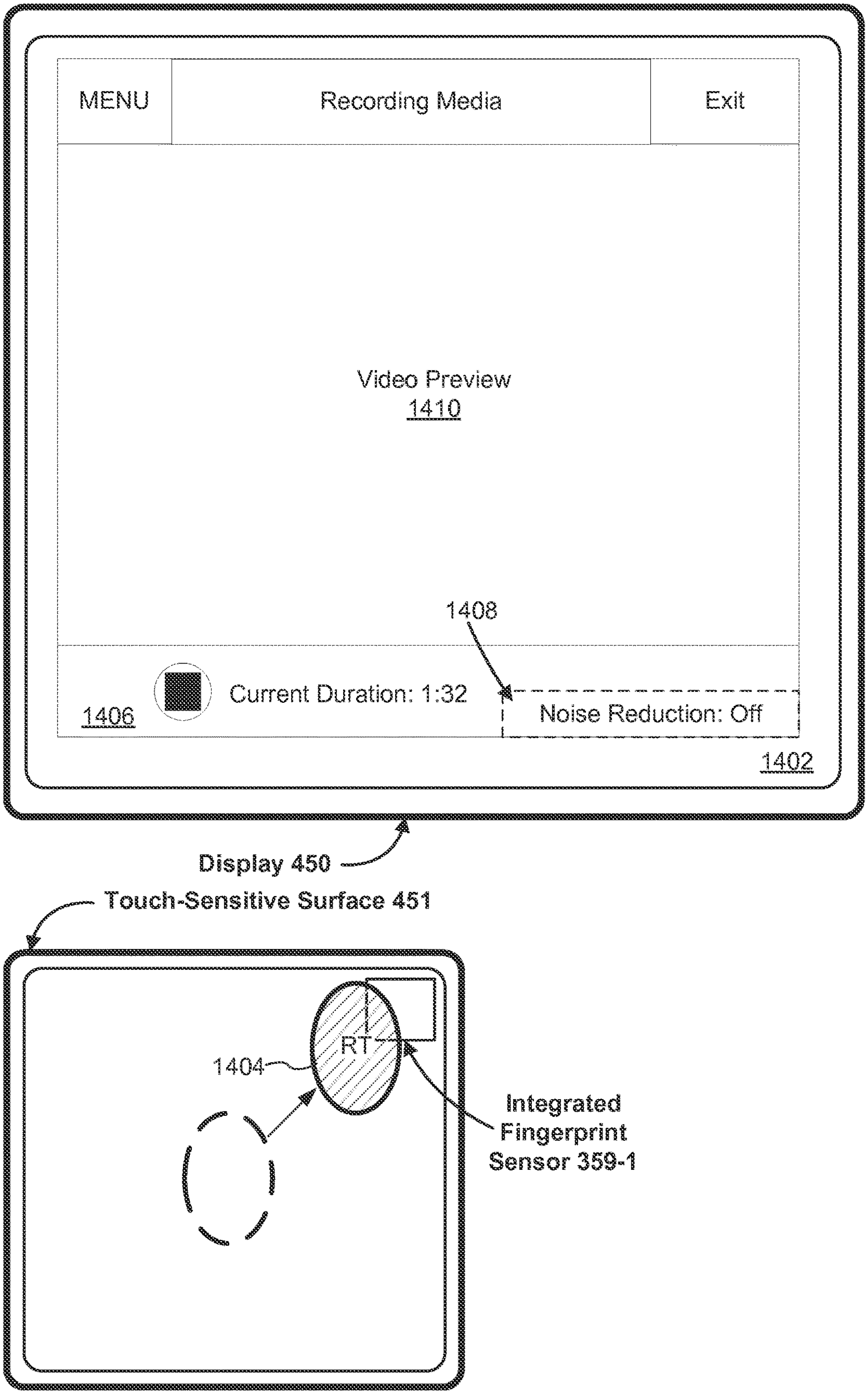
Figure 14C:
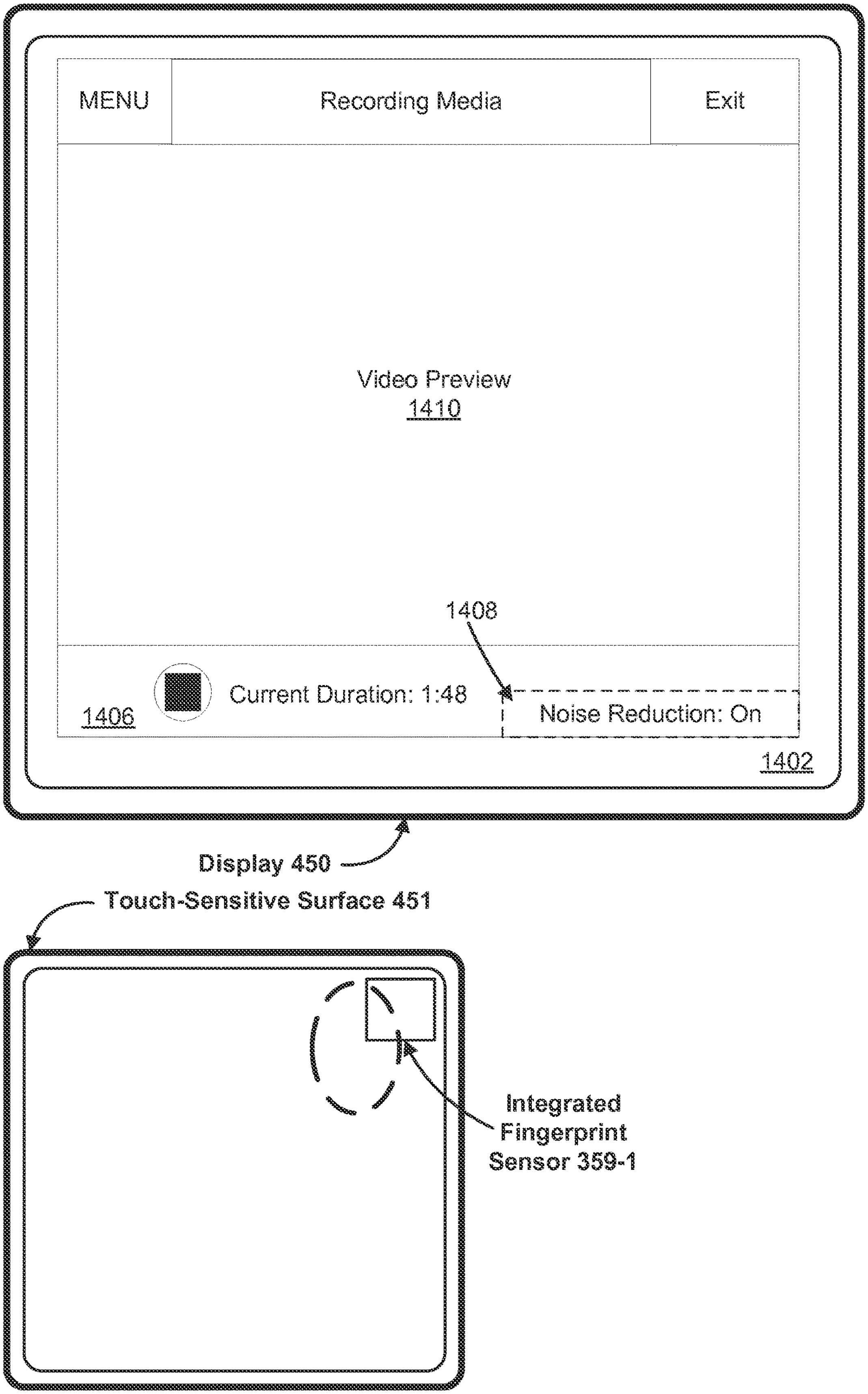
Figure 15:
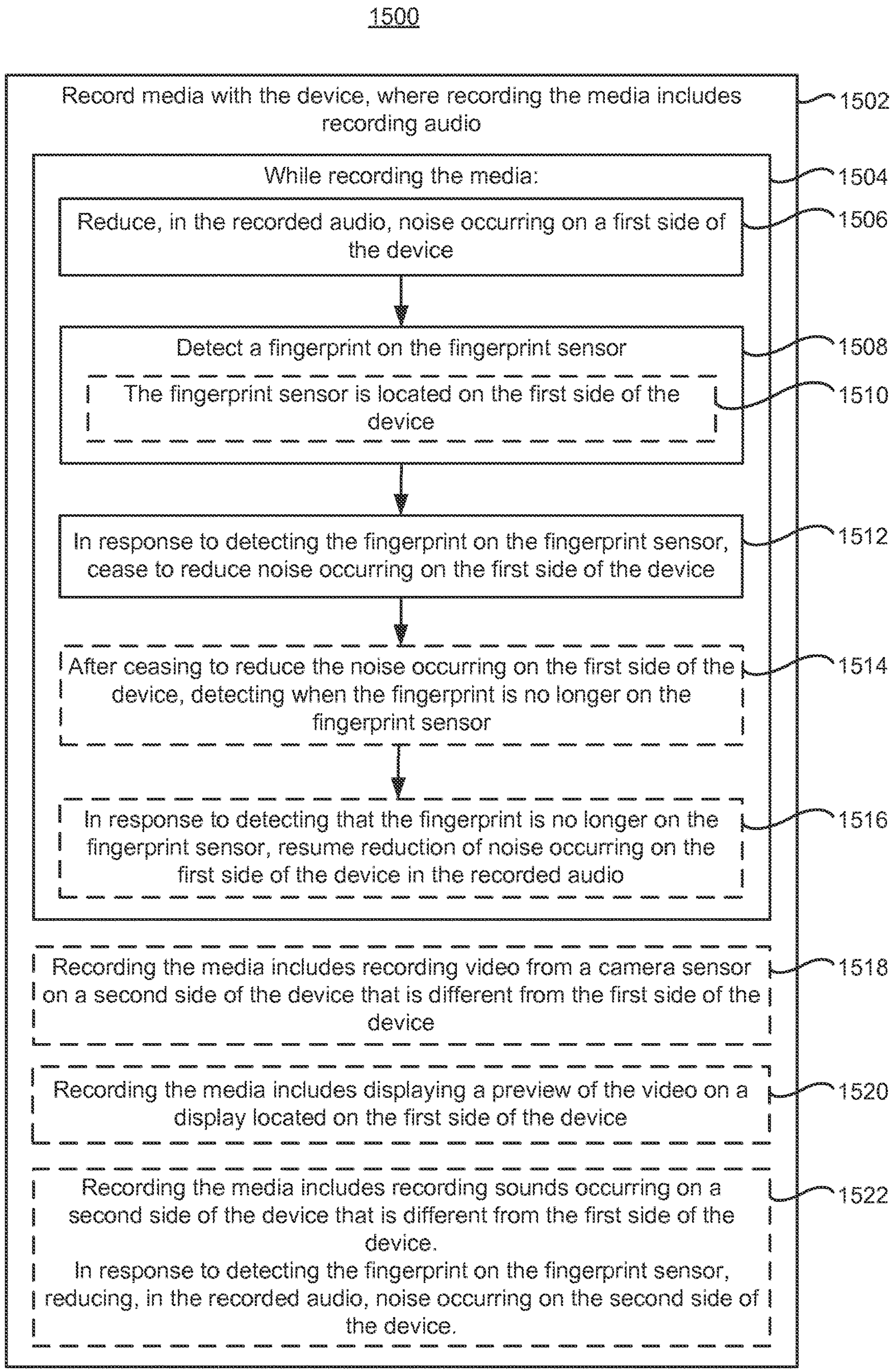
FIG. 15 is a flow diagram illustrating a method of controlling noise reduction in recorded audio with a fingerprint sensor in accordance with some embodiments.

FIGS. 14A-14C illustrate an example of controlling noise reduction in recorded audio with a fingerprint sensor. FIG. 14A shows user interface 1402, including media recording interface 1406 with noise reduction status 1408 and video preview 1410, displayed on display 450 of a device (e.g., portable multifunction device 100). FIG. 14A further illustrates touch-sensitive surface 451 with integrated fingerprint sensor 359-1. FIG. 14A also shows the device detecting fingerprint 1404 (e.g., a right thumb contact) on touch-sensitive surface 451 away from integrated fingerprint sensor 359-1 and noise reduction status 1408 indicating that noise reduction is on (e.g., active) in the recorded audio. FIG. 14B shows the device detecting fingerprint 1404 on touch-sensitive surface 451 over integrated fingerprint sensor 359-1 and noise reduction status 1408 indicating that noise reduction is off (e.g., inactive) in the recorded audio. FIG. 14C shows the device detecting that fingerprint 1404 is no longer on integrated fingerprint sensor 359-1 and noise reduction status 1408 indicating that noise reduction is on in the recorded audio.

Figure 14D:
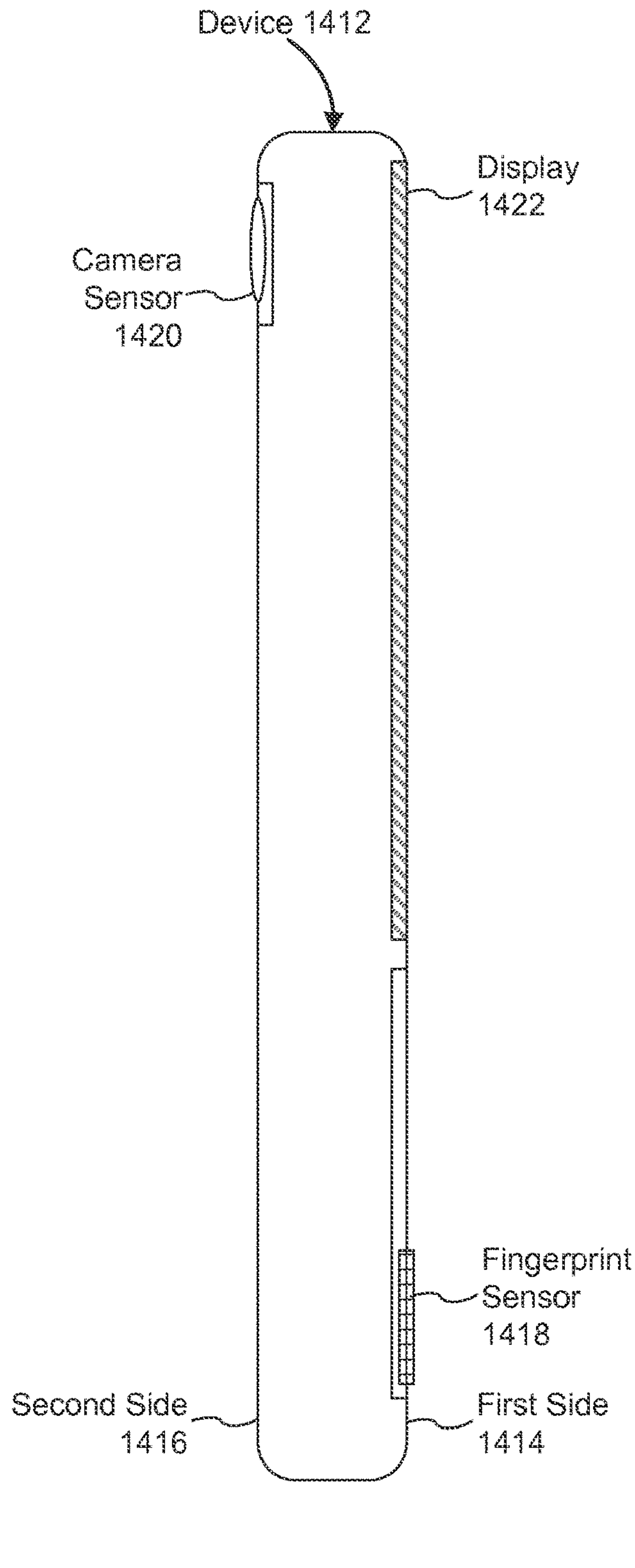

FIG. 14D illustrates an example of a device with a display, a fingerprint sensor, and a camera sensor for use in controlling noise reduction in recorded audio. FIG. 14D shows device 1412 with fingerprint sensor 1418 and display 1422 on first side 1414 and camera sensor 1420 on second side 1416.

FIG. 15 is a flow diagram illustrating a method 1500 of controlling noise reduction in recorded audio with a fingerprint sensor in accordance with some embodiments. The method 1500 is performed at an electronic device (e.g., device 300, FIG. 3, or portable multifunction device 100, FIG. 1A) with a display and a touch-sensitive surface. In some embodiments, the display is a touch screen display and the touch-sensitive surface is on the display. In some embodiments, the display is separate from the touch-sensitive surface. Some operations in method 1500 are, optionally, combined and/or the order of some operations is, optionally, changed.

As described below, the method 1500 provides an intuitive way to control noise reduction in recorded audio with a fingerprint sensor. The method reduces the cognitive burden on a user when controlling noise reduction in recorded audio, thereby creating a more efficient human-machine interface. For battery-operated electronic devices, enabling a user to control noise reduction in recorded audio faster and more efficiently conserves power and increases the time between battery charges.

The device records (1502) media, where recording the media includes recording audio. For example, FIG. 14A shows a device recording media as indicated by media recording interface 1406.

While recording the media (1504), the device reduces (1506), in the recorded audio, noise occurring on a first side of the device. For example, in FIG. 14A, noise reduction status 1408 indicates that the device is reducing noise in the recorded audio.

While continuing to record the media (1504), the device detects (1508) a fingerprint on the fingerprint sensor. For example, FIG. 14B shows the device detecting fingerprint 1404 (e.g., a right thumb contact) on integrated fingerprint sensor 359-1.

In some embodiments, the fingerprint sensor is located (1510) on the first side of the device. For example, FIG. 14D shows fingerprint sensor 1418 on first side 1414 of device 1412.

While continuing to record the media (1504) and in response to detecting the fingerprint on the fingerprint sensor, the device ceases (1512) to reduce noise occurring on the first side of the device. For example, FIG. 14B shows the device detecting fingerprint 1404 (e.g., a right thumb contact) on integrated fingerprint sensor 359-1 and noise reduction status 1408 indicating that the device has ceased to reduce noise in the recorded audio.

In some embodiments, after ceasing to reduce the noise occurring on the first side of the device, the device detects (1514) when the fingerprint is no longer on the fingerprint sensor, and, in response to detecting that the fingerprint is no longer on the fingerprint sensor, the device resumes (1516) reduction of noise occurring on the first side of the device in the recorded audio. For example, a device is initially cancelling noise from one side of the device (e.g., so as to avoid recording the breathing or other noises created by a videographer that the videographer does not intend to record) and subsequently, when the device detects a fingerprint on a fingerprint sensor, the device temporarily ceases to reduce/cancel noise on the first side of the camera (e.g., so that a videographer can comment on the video) and then the device resumes noise cancellation for noises on the first side of the device after or in response to ceasing to detect the fingerprint on the fingerprint sensor (e.g., once the videographer has finished commenting on the video). FIG. 14C, for example, shows the device no longer detecting fingerprint 1404 on integrated fingerprint sensor 359-1 (e.g., fingerprint 1404 lifted off or moved away from integrated fingerprint sensor 359-1). FIG. 14C further shows noise reduction status 1408 indicating that the device has resumed reduction of noise in the recorded audio.

In some embodiments, recording the media includes recording (1518) video from a camera sensor on a second side of the device that is different (e.g., opposite from) from the first side of the device. For example, the video is recorded using a front-facing camera and noise is reduced/cancelled using acoustic beam forming to cancel audio input from behind the device. For example, FIG. 14D shows camera sensor 1420 on second side 1416 of device 1412.

In some embodiments, recording the media includes displaying (1520) a preview of the video on a display located on the first side of the device (e.g., the side that the user is on). From another viewpoint, the method includes displaying a preview of the video on the display located on the first side of the device. For example, FIG. 14A shows video preview 1410 on display 450 of a device.

In some embodiments, recording the media includes recording sounds occurring on a second side of the device that is different from the first side of the device, and, in response to detecting the fingerprint on the fingerprint sensor, the device reduces (1522), in the recorded audio, noise occurring on the second side of the device. For example, FIG. 14B shows the device detecting fingerprint 1404 (e.g., a right thumb contact) on integrated fingerprint sensor 359-1. In this example, and in accordance with these embodiments, the device has ceased to reduce noise occurring on the first side of the device (as indicated by noise reduction status 1408) and is reducing noise occurring on the second side of the device (indication of noise reduction on the second side of the device is not shown in FIG. 14B).

It should be understood that the particular order in which the operations in FIG. 15 have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., those methods described above) are also applicable in an analogous manner to method 1500 described above with respect to FIG. 15. For example, the fingerprints and contacts described above with reference to method 1500 optionally have one or more of the characteristics of the fingerprints and contacts described herein with reference to other methods described herein (e.g., those methods described above). For brevity, these details are not repeated here.

Figure 16:
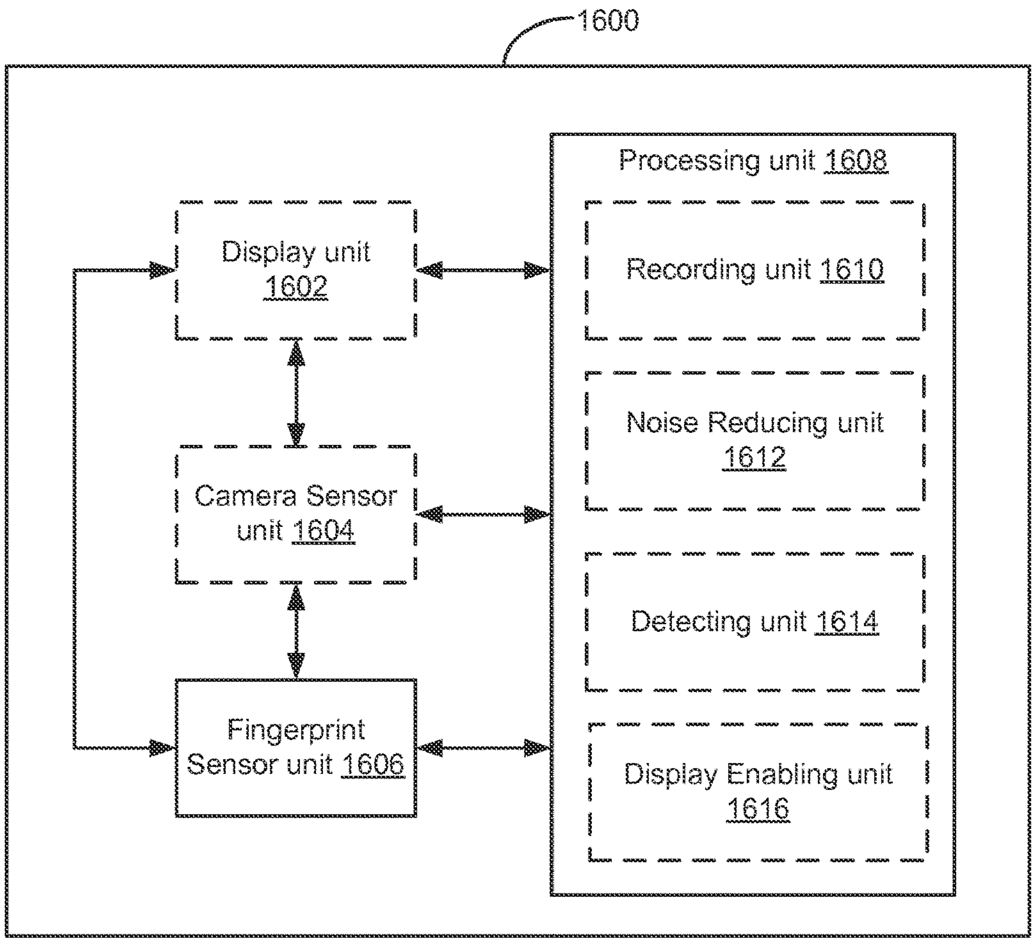
FIG. 16 is a functional block diagram of an electronic device in accordance with some embodiments.

In accordance with some embodiments, FIG. 16 shows a functional block diagram of electronic device 1600 configured in accordance with the principles of the various described embodiments. The functional blocks of the device are, optionally, implemented by hardware, software, or a combination of hardware and software to carry out the principles of the various described embodiments. It is understood by persons of skill in the art that the functional blocks described in FIG. 16 are, optionally, combined or separated into sub-blocks to implement the principles of the various described embodiments. Therefore, the description herein optionally supports any possible combination or separation or further definition of the functional blocks described herein.

As shown in FIG. 16, electronic device 1600 includes fingerprint sensor unit 1606 and processing unit 1608 coupled to fingerprint sensor unit 1606. In some embodiments, electronic device 1600 further includes display unit 1602 and camera sensor unit 1604 coupled to processing unit 1608. In some embodiments, processing unit 1608 includes recording unit 1610, noise reducing unit 1612, detection unit 1614, and display enabling unit 1616.

Processing unit 1608 is configured to record (e.g., with recording unit 1610) media with the device, where recording the media includes recording audio. Processing unit 1608 is further configured to, while recording the media, reduce (e.g., with noise reducing unit 1612), in the recorded audio, noise occurring on a first side of the device, detect (e.g., with detecting unit 1614) a fingerprint on the fingerprint sensor unit, and, in response to detecting the fingerprint on the fingerprint sensor unit, cease to reduce (e.g., with noise reducing unit 1612) noise occurring on the first side of the device.

In some embodiments, fingerprint sensor unit 1606 is located on the first side of the device.

In some embodiments, processing unit 1608 is further configured to, after ceasing to reduce (e.g., with noise reducing unit 1612) the noise occurring on the first side of the device, detect (e.g., with detecting unit 1614) when the fingerprint is no longer on the fingerprint sensor, and, in response to detecting (e.g., with detecting unit 1614) that the fingerprint is no longer on the fingerprint sensor unit, resume reduction (e.g., with noise reducing unit 1612) of noise occurring on the first side of the device in the recorded audio.

In some embodiments, electronic device 1600 further comprises a camera sensor unit on a second side of the device that is different from the first side of the device and processing unit 1608 is further configured to record (e.g., with recording unit 1610) video from the camera sensor unit.

In some embodiments, the electronic device further comprises display unit 1602 located on the first side of the device and recording (e.g., with recording unit 1610) the media includes enabling display (e.g., with display enabling unit 1616) of a preview of the video on the display unit.

In some embodiments, recording the media includes recording (e.g., with recording unit 1610) sounds occurring on a second side of the device that is different from the first side of the device and processing unit 1608 is further configured to, in response to detecting the fingerprint on the fingerprint sensor unit, reduce (e.g., with noise reducing unit 1612), in the recorded audio, noise occurring on the second side of the device.

The operations in the information processing methods described above are, optionally implemented by running one or more functional modules in information processing apparatus such as general purpose processors (e.g., as described above with respect to FIGS. 1A and 3) or application specific chips.

The operations described above with reference to FIG. 15 are, optionally, implemented by components depicted in FIGS. 1A-1B or FIG. 16. For example, recording operation 1402, reducing operation 1506, and detection operation 1508 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub-event, such as selection of an object on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Performing Operations Based on a Class-Based Profile

Many electronic devices have multiple functions and multiple users. Not all functions are suitable for all users, and thus certain function restrictions are implemented for some user. In some situations, user identification at a device is done through a login process, where users identify themselves specifically with a username and password. However, switching between users through a login process is time-consuming and inefficient. Also, the identity of the specific user is not essential for all function restrictions. The embodiments described below improve on these methods by restricting or modifying functions based on user classes identified by fingerprint. When a device detects a fingerprint of a user, the device identifies a one or more user classes based on the detected fingerprint selects profiles associated with the identified user classes as active, including at least one class that is not unique to the user. When the device receives a request to perform one or more operations, the device performs a respective operation based on the request and the active profiles. The respective operation can be in addition to or instead of the requested operation(s). By customizing operations and functions on the device based on user classes that not unique (e.g., are agnostic) to the specific user identity, function restrictions can be implemented on the device for situations where frequent user login and logoff is inefficient (e.g., parent sharing a device with a child) or unfeasible (e.g., public or semi-public devices for use by a broader population than a closed circle of users).

In some embodiments, the device is an electronic device with a separate display (e.g., display 450) and a separate touch-sensitive surface (e.g., touch-sensitive surface 451). In some embodiments, the device is portable multifunction device 100, the display is touch screen 112, and the touch-sensitive surface includes tactile output generators 167 on the display (FIG. 1A). The device described below with reference to 17A-17K and 18A-18B includes one or more fingerprint sensors 169. In some embodiments, the one or more fingerprint sensors include one or more integrated fingerprint sensors 359-1 (FIG. 4B) that are integrated in to the touch-sensitive surface (e.g., separate touch-sensitive surface 451 or touch sensitive display system 112). In some embodiments, the one or more fingerprint sensors include separate fingerprint sensors 359-2 (FIG. 4B) that are separate from the touch-sensitive surface (e.g., separate touch-sensitive surface 451 or touch sensitive display system 112). Unless specified otherwise, a fingerprint sensor 169 described below is, optionally, either an integrated fingerprint sensor 359-1 or a separate fingerprint sensor 359-2, depending on the configuration of the hardware and software of the device that includes the fingerprint sensor 169. For convenience of explanation, the embodiments described with reference to FIGS. 17A-17K and 18A-18B will be discussed with reference to display 450, a separate touch-sensitive surface 451 and a separate fingerprint sensor 359-2, however analogous operations are, optionally, performed on a device with an integrated fingerprint sensor 359-1 in response to detecting the inputs described in FIGS. 17A-17K on the integrated fingerprint sensor 359-1 while displaying the user interfaces shown in FIGS. 17A-17K on the display 450. Additionally, analogous operations are, optionally, performed on a device with a touch screen 112 in response to detecting the contacts described in FIGS. 17A-17K on a fingerprint sensor 169 (e.g., an integrated fingerprint sensor 359-1 or a separate fingerprint sensor 359-2) while displaying the user interfaces shown in FIGS. 17A-17K on the touch screen 112; in such embodiments, the focus selector is, optionally: a respective contact, a representative point corresponding to a contact (e.g., a centroid of a respective contact or a point associated with a respective contact), or a centroid of two or more contacts detected on the touch screen 112, in place of a cursor.

Figure 17A:
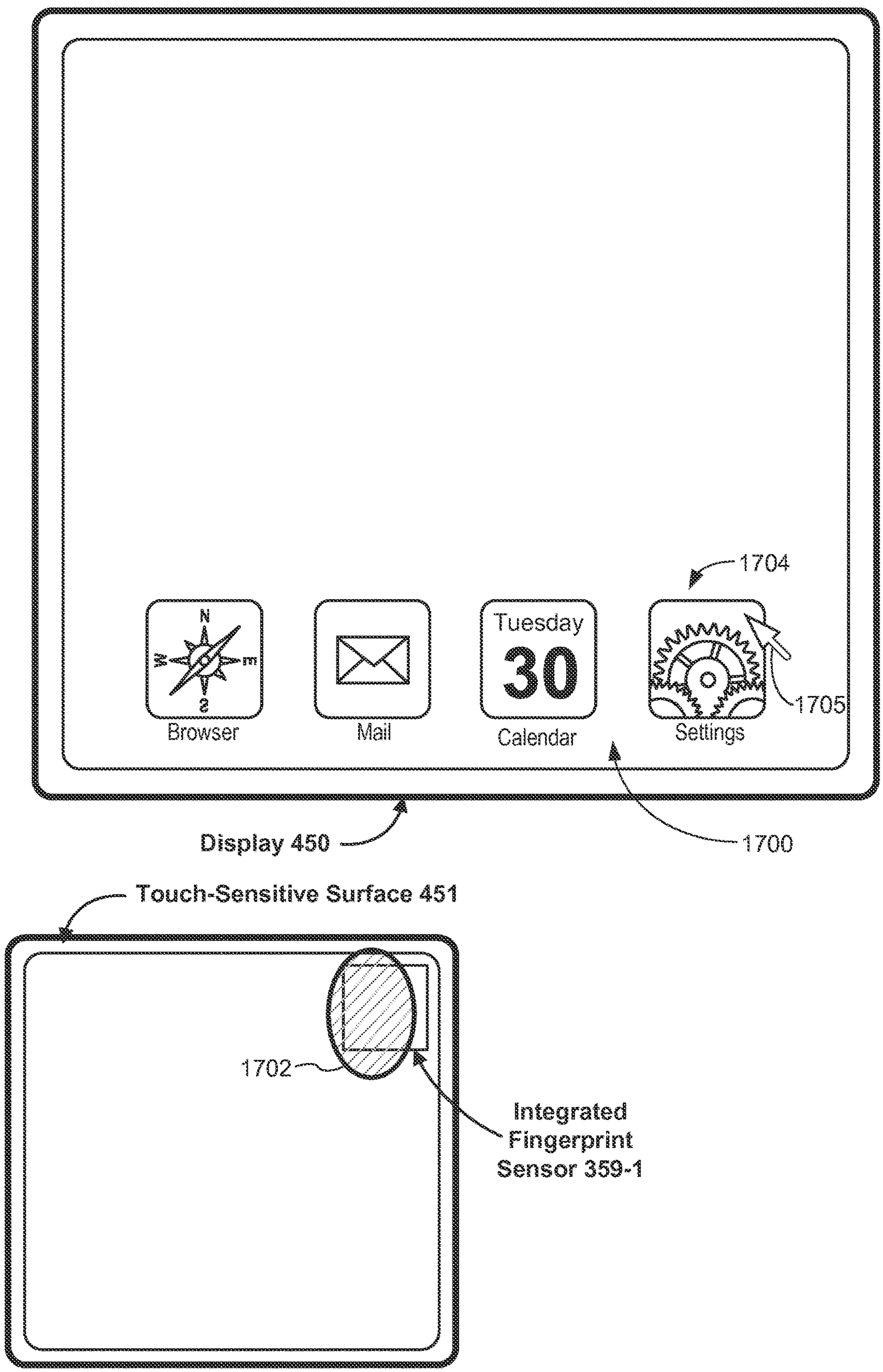
FIGS. 17A-17K illustrate exemplary user interfaces for performing operations based on a class-based profile in accordance with some embodiments.

FIG. 17A illustrates a device with display 450, touch-sensitive surface 451, and integrated fingerprint sensor 359-1. User interface 1700 is displayed on display 450. As shown in FIG. 17A, user interface 1700 is, for example, a desktop graphical user interface, a home screen or menu, or the like. User interface 1700 is, optionally, another type of user interface, such as a user interface for an application. User interface 1700 optionally includes one or more application icons, such as "Settings" icon 1704 and application icons similar to the application icons displayed in user interface 400 (FIG. 4A). A user can interact with user interface 1700 and make requests for one or more operations to be performed by the device using a respective input element, such as touch-sensitive surface 451, a button, a mouse, or a keyboard. For example, a user can activate a user interface for adjusting device settings (e.g., settings user interface 1708, FIG. 17C) by activating "Settings" icon 1704 using, for example, touch-sensitive surface 451 (e.g., performing a tap gesture on touch-sensitive surface 451 associated with a focus selector such as cursor 1705 that is at a location on the display corresponding to "Settings" icon 1704).

In some embodiments, the device is associated with multiple profiles. The multiple profiles include one or more user-specific profiles and one or more class-based profiles. In some embodiments, each user-specific profile corresponds to a respective user. In some embodiments, each of the class-based profiles, which are distinct from the user-specific profiles, corresponds to a respective class of users. In some embodiments, one or more of the class-based profiles correspond to age-based user classes. Examples of age-based class-based profiles include a class-based profile corresponding to adults (e.g., users 18 years or older), a class-based profile corresponding to non-adults or children (e.g., users under 18 years old), and a class-based profile corresponding to seniors (e.g., users older than 65 years old). In some embodiments, the profiles are retrieved from the memory of the device (e.g., memory 102 or 370). In some other embodiments, the profiles are received from a remote computer system. The profiles are retrieved or received in response to one or more particular operations (e.g., detection of a fingerprint on fingerprint sensor 359) or as part of a predefined routine.

The device also includes data regarding one or more fingerprints that have been previously registered at the device. Each registered fingerprint corresponds to a respective user-specific profile. In some embodiments, the registered fingerprints are stored in, and retrieved from, the memory (e.g., memory 102 or 370) of the device.

Figure 17B:
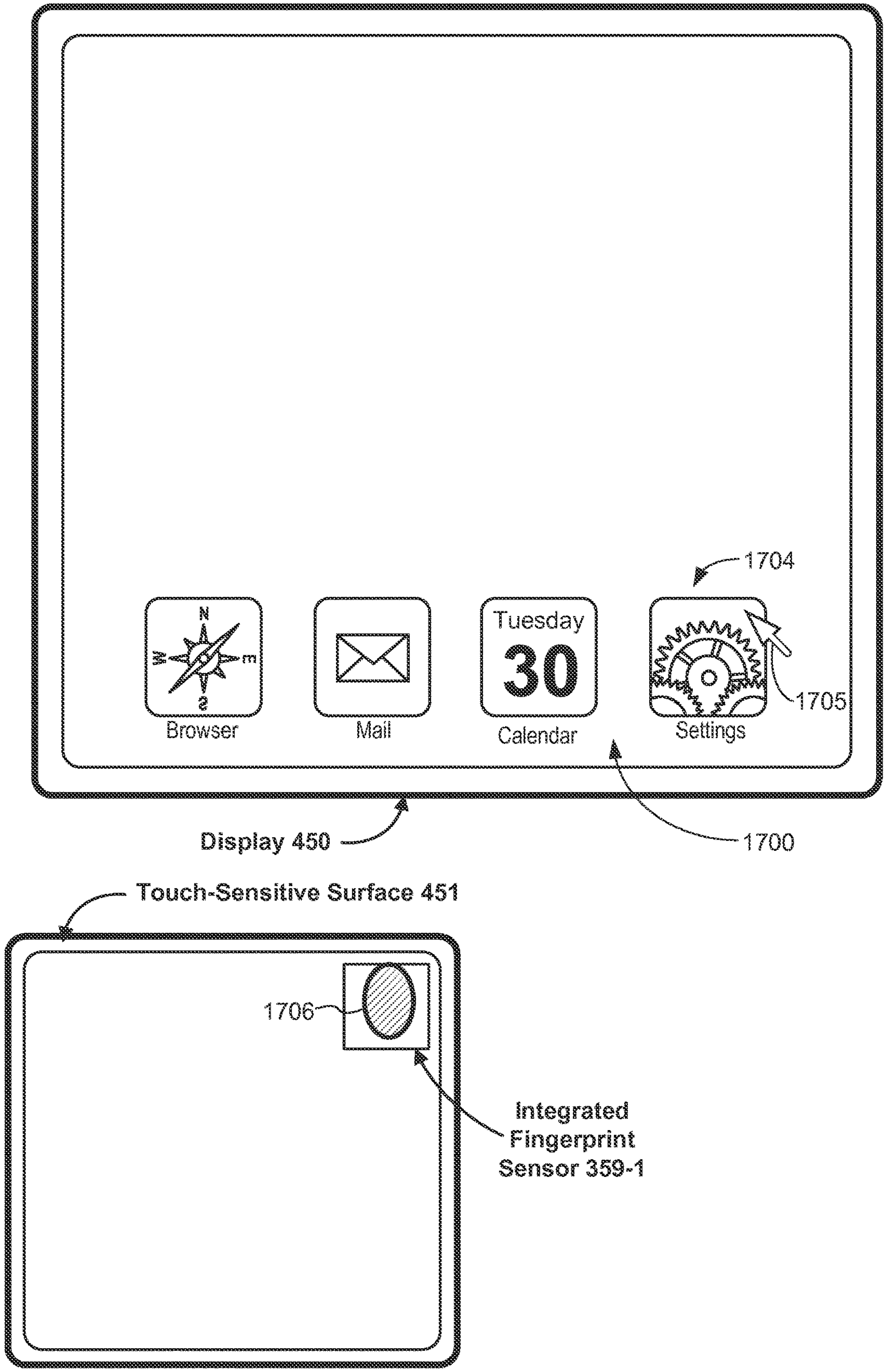

While a user interface (e.g., user interface 1700) is displayed on display 450, a fingerprint is detected on integrated fingerprint sensor 359-1. FIGS. 17A-17B illustrate fingerprints of different sizes detected on integrated fingerprint sensor 359-1. FIG. 17A illustrates fingerprint 1702 being detected on integrated fingerprint sensor 359-1, and FIG. 17B illustrates fingerprint 1706 being detected on integrated fingerprint sensor 359-1 instead of fingerprint 1702. Fingerprint 1702 and fingerprint 1706 are fingerprints from two different users who respectively belong to different classes of users. For example, fingerprint 1702 is determined to belong to a user in a class of adult users, and fingerprint 1706, which is smaller than fingerprint 1702 and determined by the device to be about the size of a child's fingerprint, is determined to belong to a user in a class of child users.

Based on the detected fingerprint, the device selects one or more class-based profiles, from class-based profiles associated with the device, as active profiles that correspond to the detected fingerprint. For example, for fingerprint 1702, the device selects an "Adults" profile as an active profile, as well as any other class-based profile for which the device determines that the user to which fingerprint 1702 belongs fits. For fingerprint 1706, the device selects a "Children" profile, as well as any other class-based profile for which the device determines that the user to which fingerprint 1706 belongs fits. It should be appreciated that a user can be associated with multiple classes. Thus, for a given detected fingerprint, multiple class-based profiles can be selected as active (e.g., a fingerprint could be associated with the "adults" class of users and the "male" class of users or the "children" class of users and the "female" class of users).

In some embodiments, the class-based profiles are selected without regard to authentication of the detected fingerprint. For example, selection of class-based profiles does not require comparison of the detected fingerprint to previously registered fingerprints associated with the device. In some embodiments, the selection of class-based profiles is based on the characteristics and features of the detected fingerprint. For example, the "Adults" profile is selected for fingerprint 1702 and the "Children" profile is selected for fingerprint 1706 based on the sizes of these respective fingerprints; fingerprint 1706 is determined to be a child's fingerprint based on its size, and fingerprint 1702 is determined to be an adult's fingerprint based on its size.

In some embodiments, the class-based profiles are selected in addition to selection of a user-specific profile based on a comparison of the detected fingerprint to previously registered fingerprints at the device. In some embodiments, identification or selection of a user-specific profile aids in the selection of class-based profiles. For example, one or more class-based profiles are, optionally, selected based on a comparison of the user-specific profile to characteristics of the classes based on which the respective class-based profiles are defined.

Figure 17C:
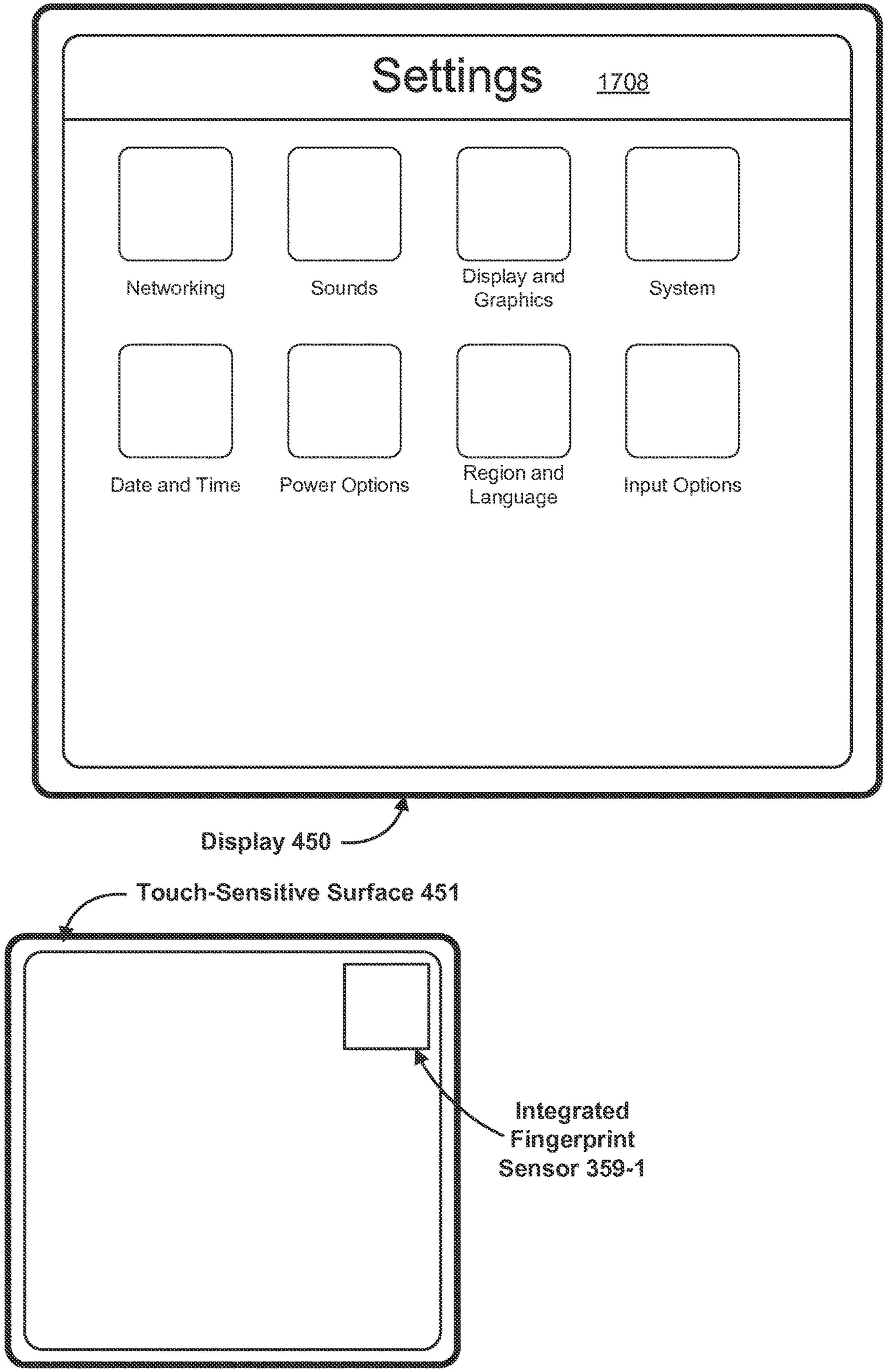
Figure 18A:
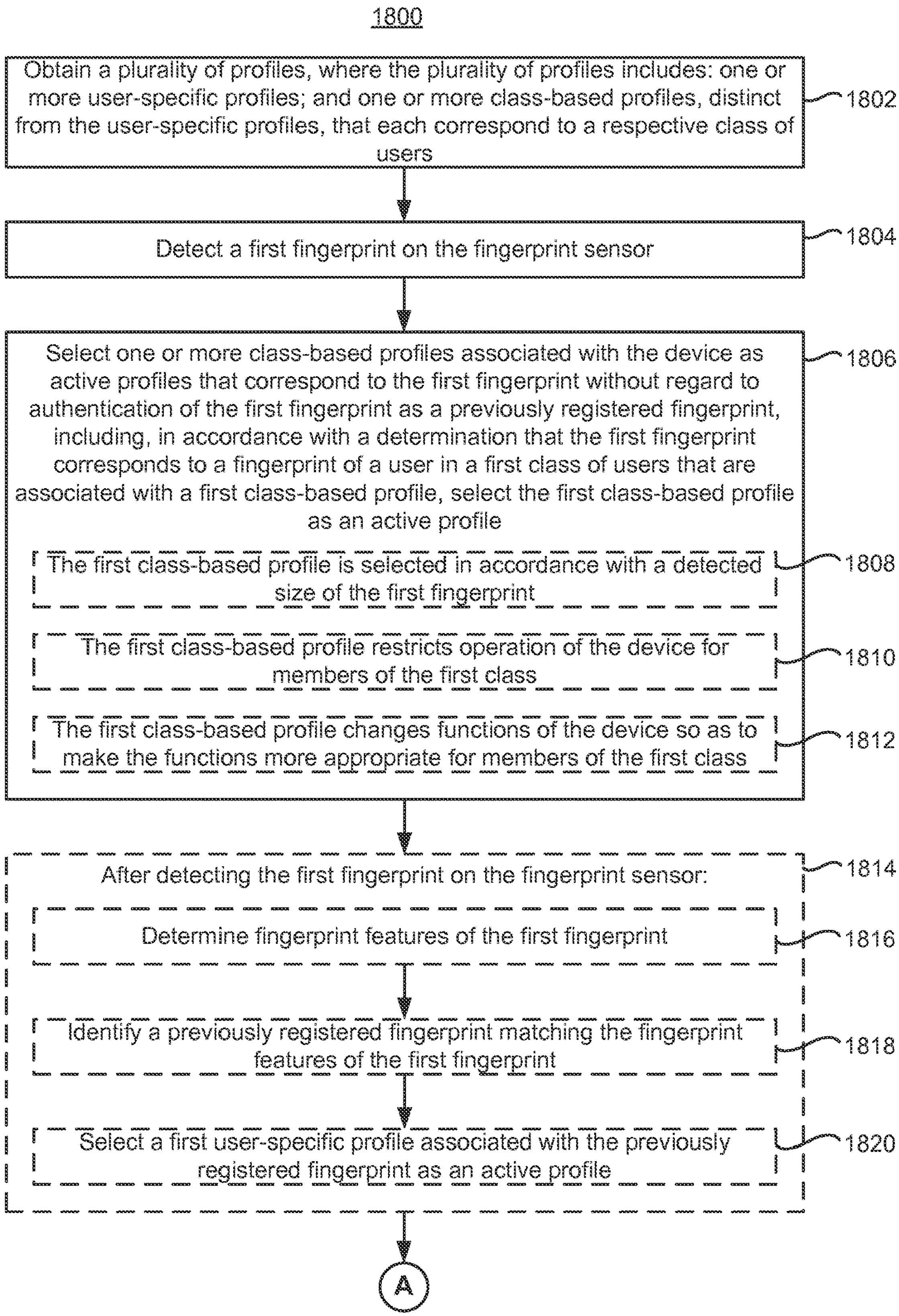
FIGS. 18A-18B are flow diagrams illustrating a method of performing operations based on a class-based profile in accordance with some embodiments.
Figure 18B:
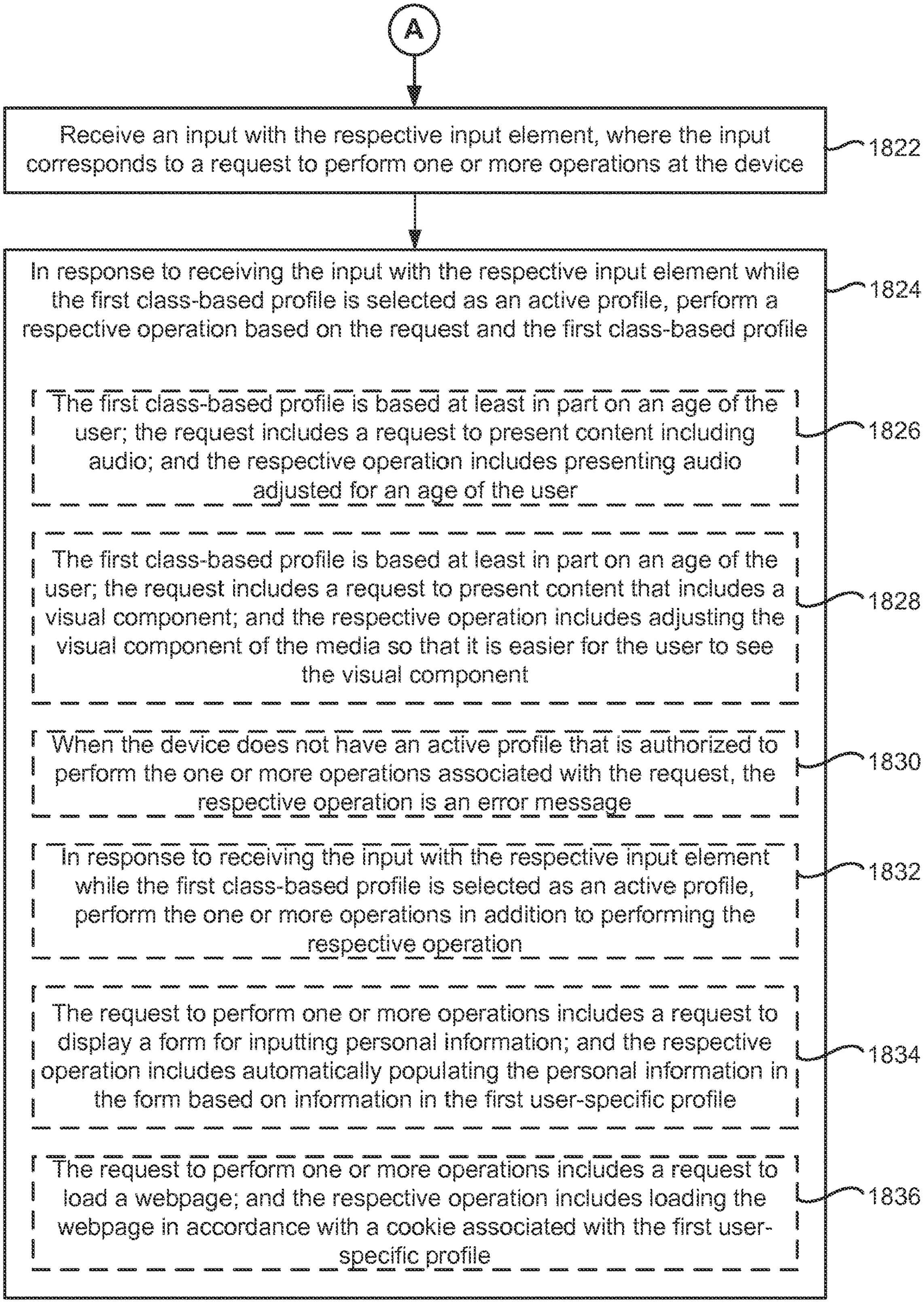

After the device selects one or more class-based profiles as active profiles for the device, the device receives an input, with the respective input element, corresponding to a request to perform one or more operations at a device. For example, the device receives an input to activate "Settings" icon 1704 (or "Settings" icon 446) (e.g., a gesture on touch-sensitive surface 451 while a focus selector such as cursor 1705 is located over "Settings" icon 1704), which corresponds to a request to display settings user interface 1708 (FIG. 17C). Depending on the active class-based profiles, settings user interface 1708 is displayed or an error message is displayed instead. For example, on the device as shown in FIGS. 17A-17B, settings user interface 1708 is not displayed if the "Children" profile is active. Thus, for example, if the detected fingerprint is fingerprint 1702 (FIG. 17A), and thus the "Adults" profile, but not the "Children" profile, is selected as active, settings user interface 1708 is displayed, as shown in FIG. 17C; the operation of displaying settings user interface 1708 is performed based on the request and the active "Adults" profile.

Figure 17D:
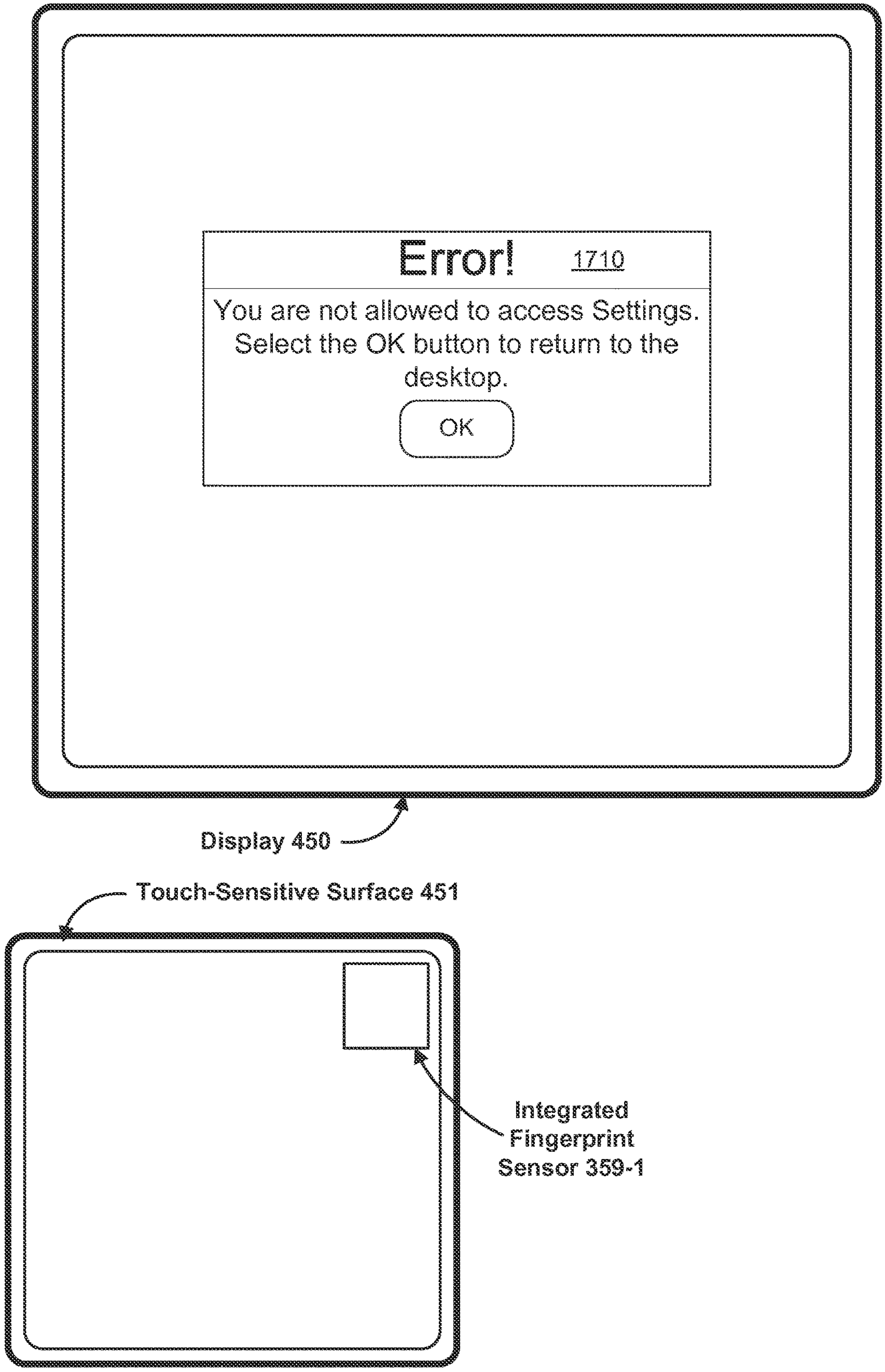

On the other hand, if the detected fingerprint is fingerprint 1706 (FIG. 17B), and thus the "Children" profile, but not the "Adults" profile, is selected as active, then settings user interface 1708 is not displayed. Instead, an error message or the like (e.g., error message 1710) indicating that settings user interface 1708 is not accessible is displayed, as shown in FIG. 17D; the operation of displaying error message 1710 is performed based on the request and the active "Children" profile.

Another example of an input corresponding to a request to perform one or more operations at a device is a request to open a video application. For example, the user performs a gesture (e.g., a tap or double tap gesture) on touch-surface surface 451 while a focus selector is located over online video icon 432 (FIG. 4A) to open an online video application (e.g., online video module 155, FIG. 1A). As another example, the user performs a gesture (e.g., a tap or double tap gesture) on touch-sensitive surface 451 while a focus selector (e.g., a contact detected on touchscreen 112 or a cursor displayed on display 450) is located over a media or video application icon (e.g., icon 422, FIG. 4A) in user interface 400 to open an application (e.g., video and music player module 152, FIG. 1A) for viewing videos stored at the device. For convenience, both the application for viewing online videos and the application for viewing videos stored at the device are, hereinafter, both referred to as video application(s).

Figure 17E:
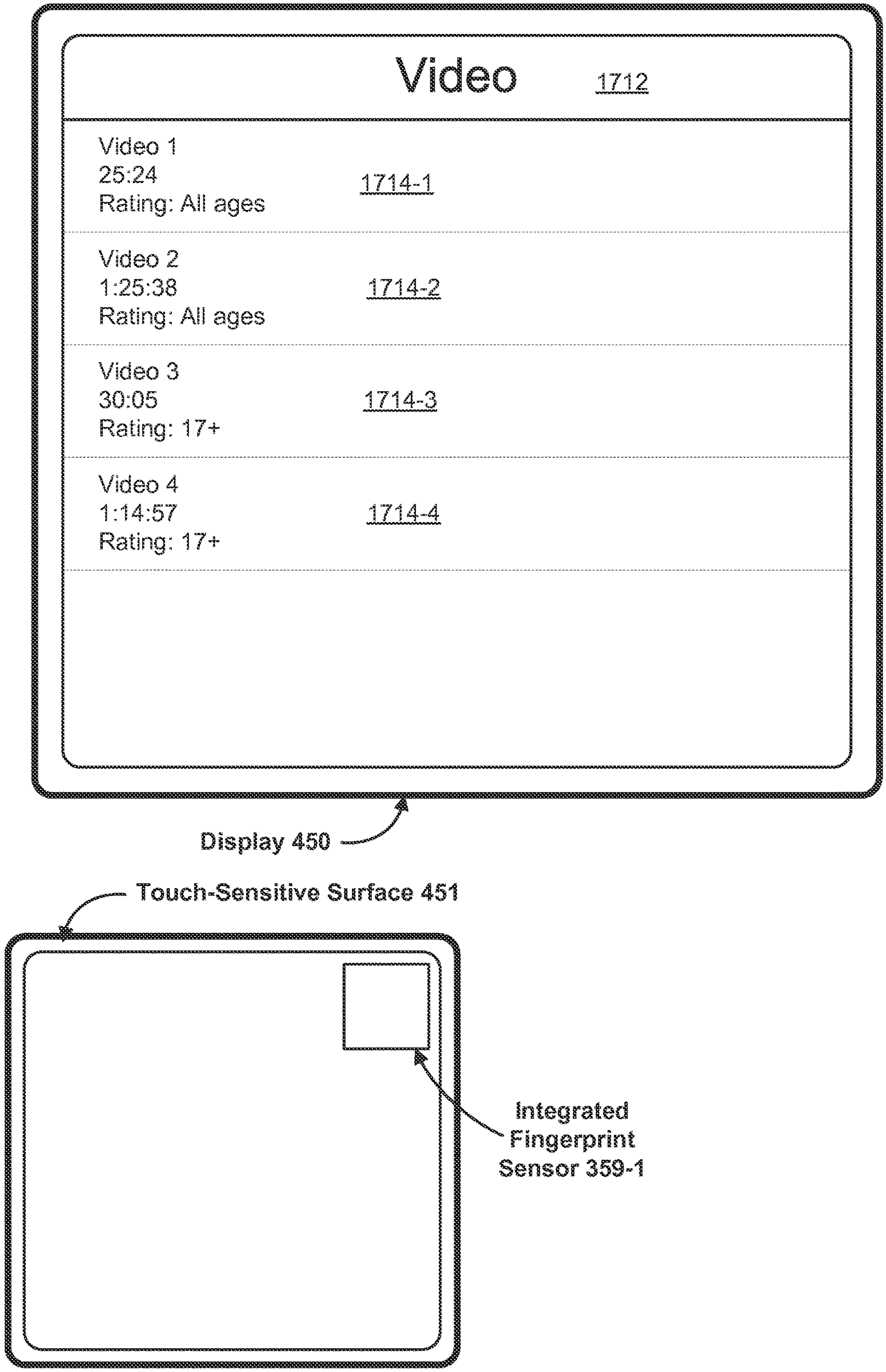
Figure 17F:
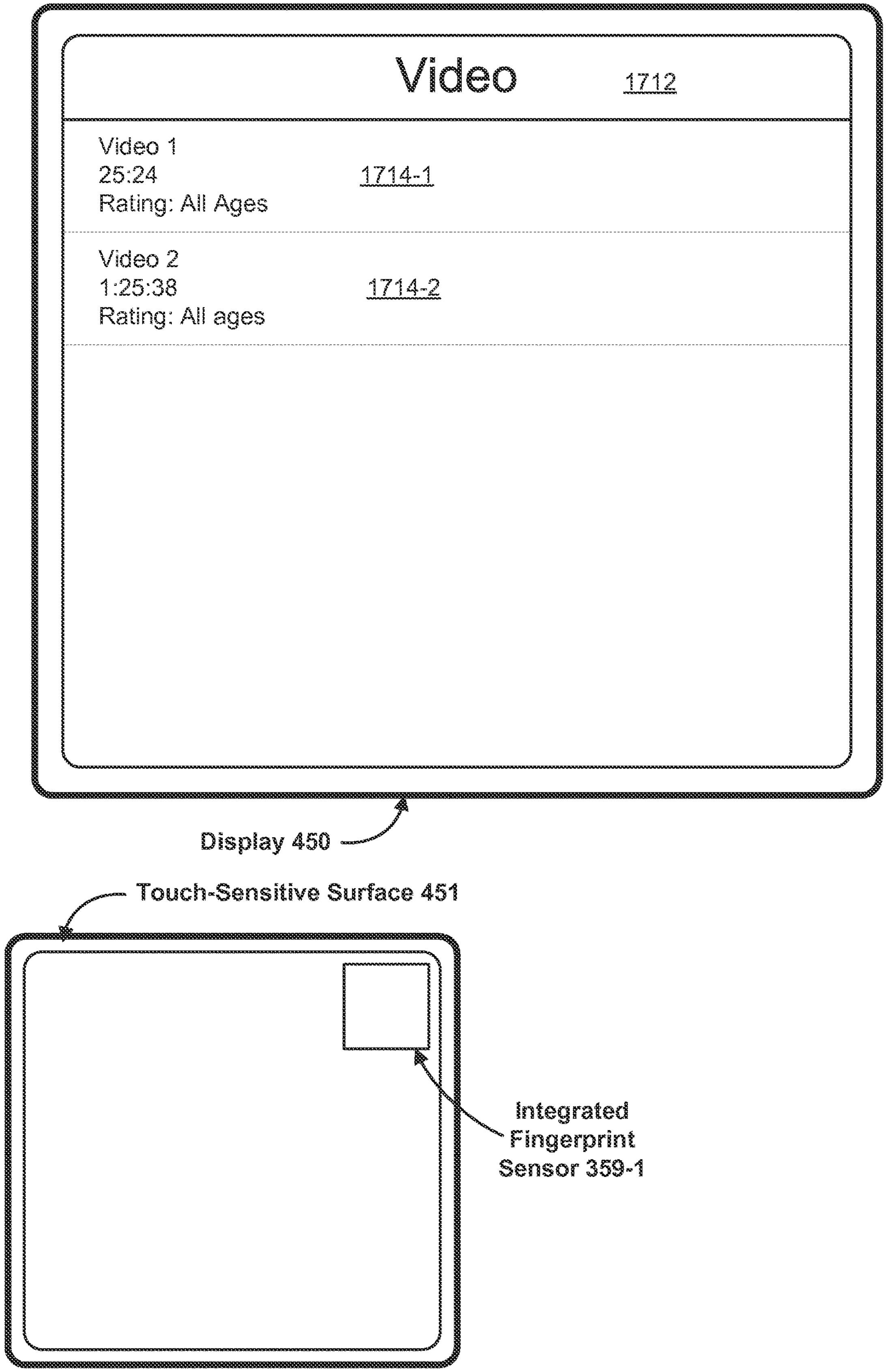
Figure 17G:
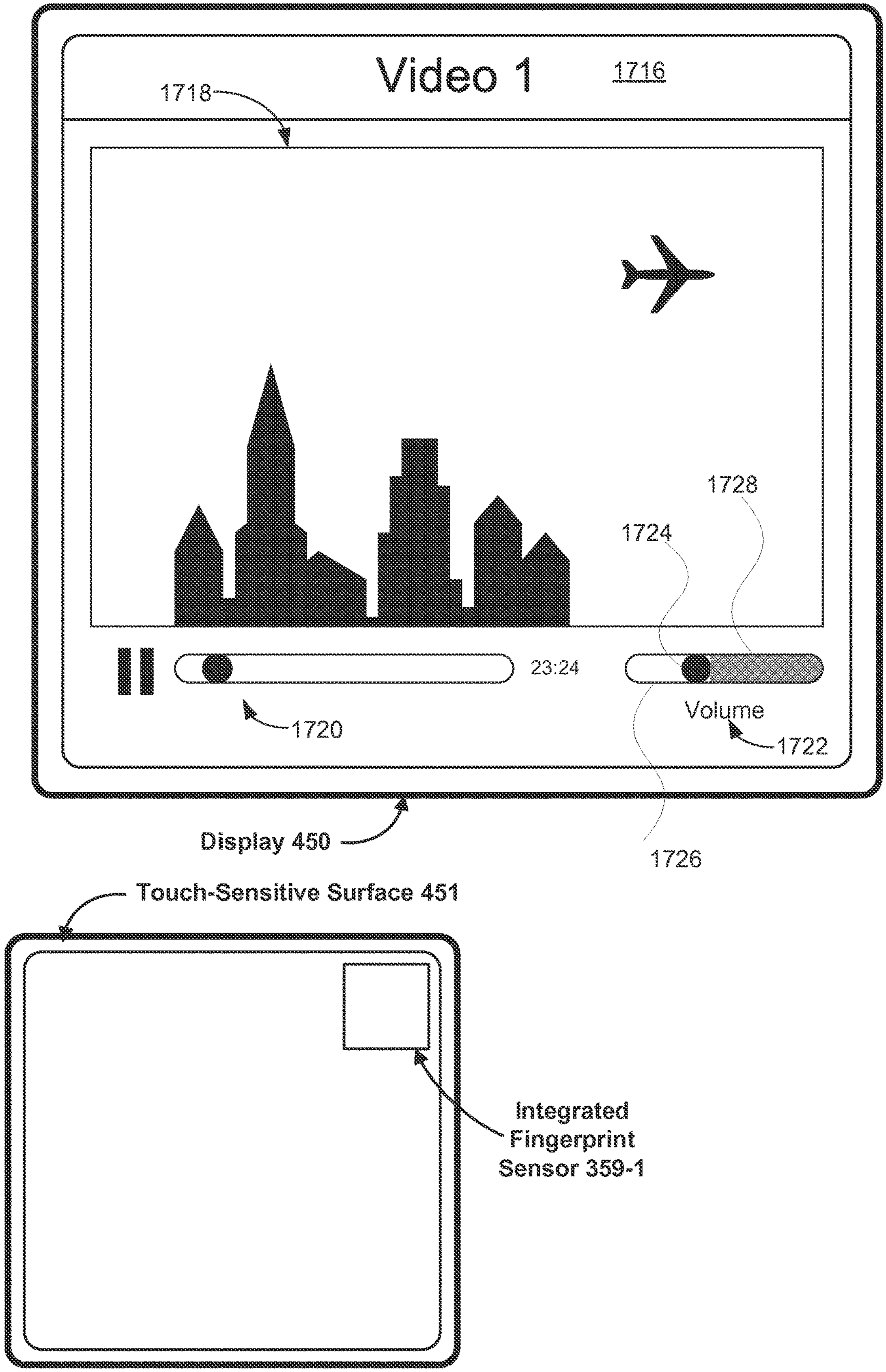

When a video application is opened, a user interface corresponding to the video application, such as user interface 1712, is displayed. User interface 1712 shows a list of videos 1714 stored at the device that can be selected for playback. FIGS. 17E-17F illustrates differences in the list of videos 1714 displayed in user interface 1712 depending on which class-based profile is active at the device when the video application was launched. FIG. 17E illustrates the list of videos 1714 that is displayed when the "Adults" profile is active at the device. With the "Adults" profile active, the list of videos 1714 displayed in user interface 1712 includes videos suitable for all ages and/or children (e.g., videos 1714-1 and 1714-2, rated as "All ages") and videos that may not be suitable for children (e.g., videos 1714-3 and 1714-4, rated as "17+"). FIG. 17E illustrates the list of videos 1714 that is displayed when the "Children" profile is active at the device. With the "Children" profile active, the list of videos 1714 displayed in user interface 1712 includes videos suitable for all ages and/or children (e.g., videos 1714-1 and 1714-2) and excludes videos that may not be suitable for children (e.g., videos 1714-3 and 1714-4).

Another example of an input corresponding to a request to perform one or more operations at a device is a request to play a video. For example, the user performs a gesture (e.g., a tap or double tap gesture) on touch-surface surface 451 while a focus selector (e.g., a contact detected on touch-screen 112 or a cursor displayed on display 450) is located over a video 1714 in the list of videos in user interface 1712 (FIG. 17E or 17F) to select the video 1714. In response to detecting the gesture, video playback interface 1716 is displayed and playback starts (alternatively, video playback starts when the user activates a play button). Video playback interface 1716 includes video frame 1718, playback controls 1720 (e.g., play/pause button, scrubber), and volume control 1722 for controlling the volume level of the audio content in the video. Volume control 1722 includes volume slider bar 1726 and thumb 1724; the position of thumb 1724 in volume slider bar 1726 indicates the current volume level. In some embodiments, if certain class-based profiles are active at the device when a video 1714 is selected for playback, a maximum volume level restriction is imposed. For example, if the "Children" profile is active when the video 1714 is selected for playback, volume thumb 1724 is restricted from moving beyond a certain level in volume slider bar 1726. For example, in FIG. 17G, volume thumb 1724 is restricted from moving into area 1728 in volume slider bar 1726. This caps the maximum volume at a level below 100%, thus helping to prevent hearing damage. If the "Adults" profile is active, the maximum volume level restriction is not imposed; the user can move volume thumb 1724 along the entire length of volume slider 1726.

Figure 17H:
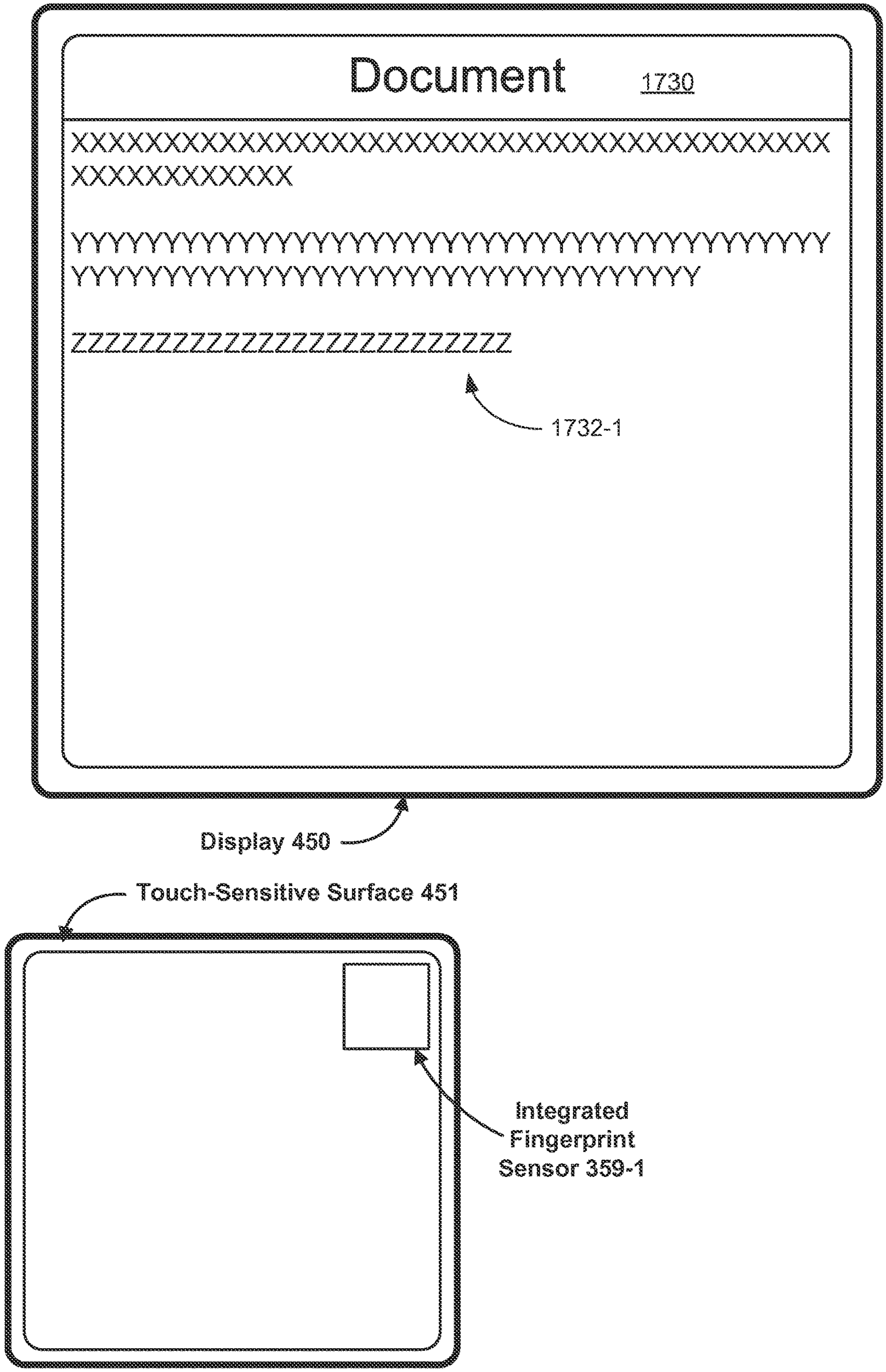

Another example of an input corresponding to a request to perform one or more operations at a device is a request to display a document. For example, the user makes a request to open a document (e.g., selects a document in an application or selects a hyperlink in a web browser). In response to the request, the device displays the document in a user interface (e.g., user interface 1730). User interface 1730 is a user interface for any application that is capable of displaying documents or text, such as a word processing application, web browser, e-reader application, and so on. In some embodiments, the device automatically adjusts the zoom scale of the displayed document or the font size of the text in the displayed document based on the active class-based profile. For example, FIGS. 17H and 171 show document 1732 displayed in user interface 1730. If the active class-based profile is "Adults," the zoom level is set to a default or normal level (e.g., 100%), as shown with document 1732-1 in FIG. 17H. If the active class-based profile is "Children" or a class-based profile corresponding to seniors, the zoom level is set to a higher level (e.g., 200%), as shown with document 1732-2 in FIG. 17I. With the higher zoom level, text in document 1732 appears bigger on display 450 and thus easier for a child or a senior citizen to read.

In some embodiments, when a fingerprint (e.g., fingerprint 1702 or 1706) is detected on fingerprint sensor 359-1, a user-specific profile is identified and selected as well as the one or more class-based profiles. For example, when fingerprint 1702 is detected on fingerprint sensor 359-1 (FIG. 17A), the device identifies a matching fingerprint from the previously registered fingerprints on the device and selects a user-specific profile associated with the identified fingerprint matching fingerprint 1702 to be the active user-specific profile on the device, as well identifying and selecting one or more class-based profiles to be active on the device, as described above. Similarly, when fingerprint 1706 is detected on fingerprint sensor 359-1 (FIG. 17B), the device identifies a matching fingerprint from the previously registered fingerprints on the device and selects a user-specific profile associated with the identified fingerprint matching fingerprint 1706 to be the active user-specific profile on the device, as well identifying and selecting one or more class-based profiles to be active on the device, as described above.

Figure 17I:
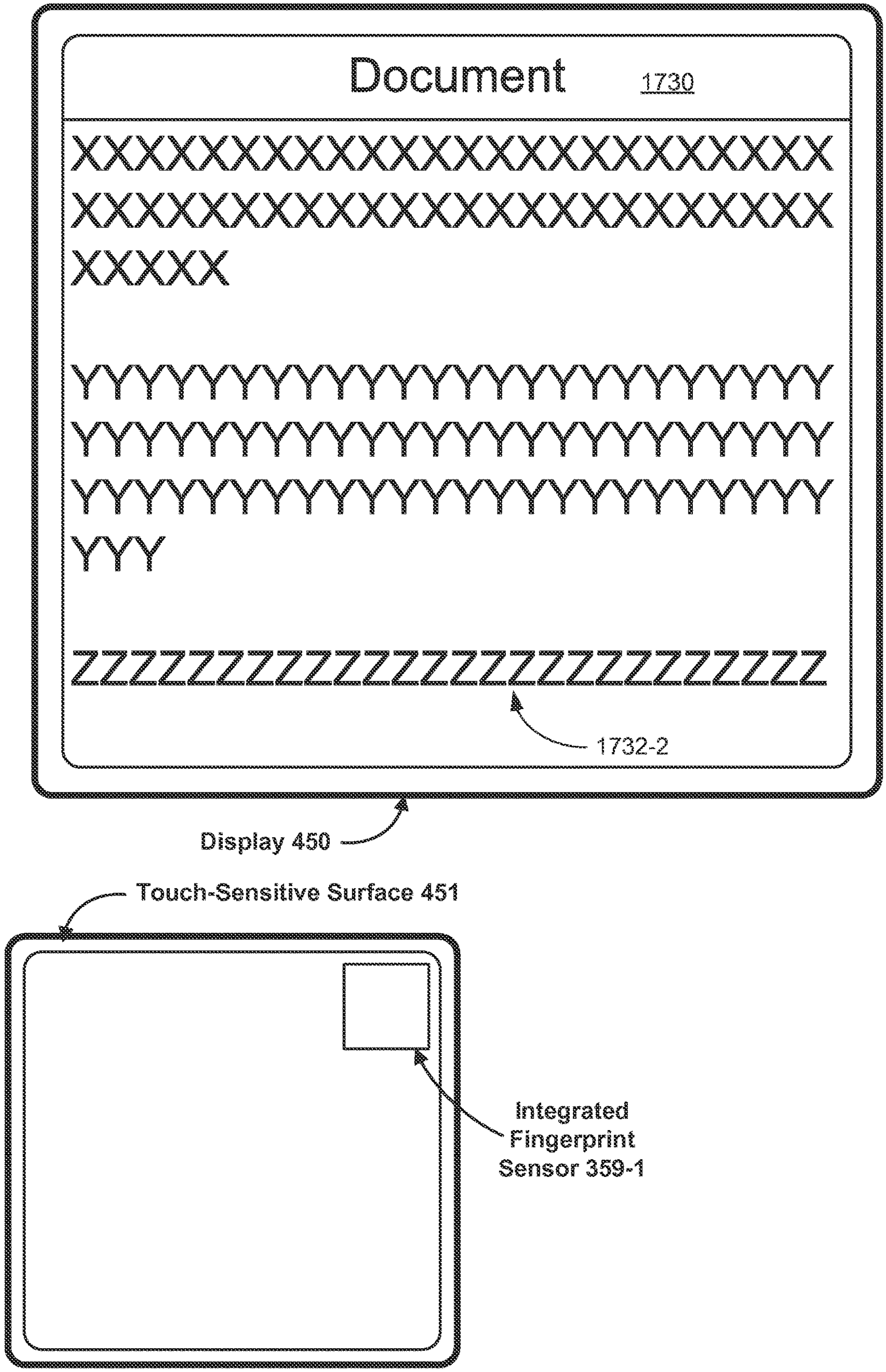
Figure 17J:
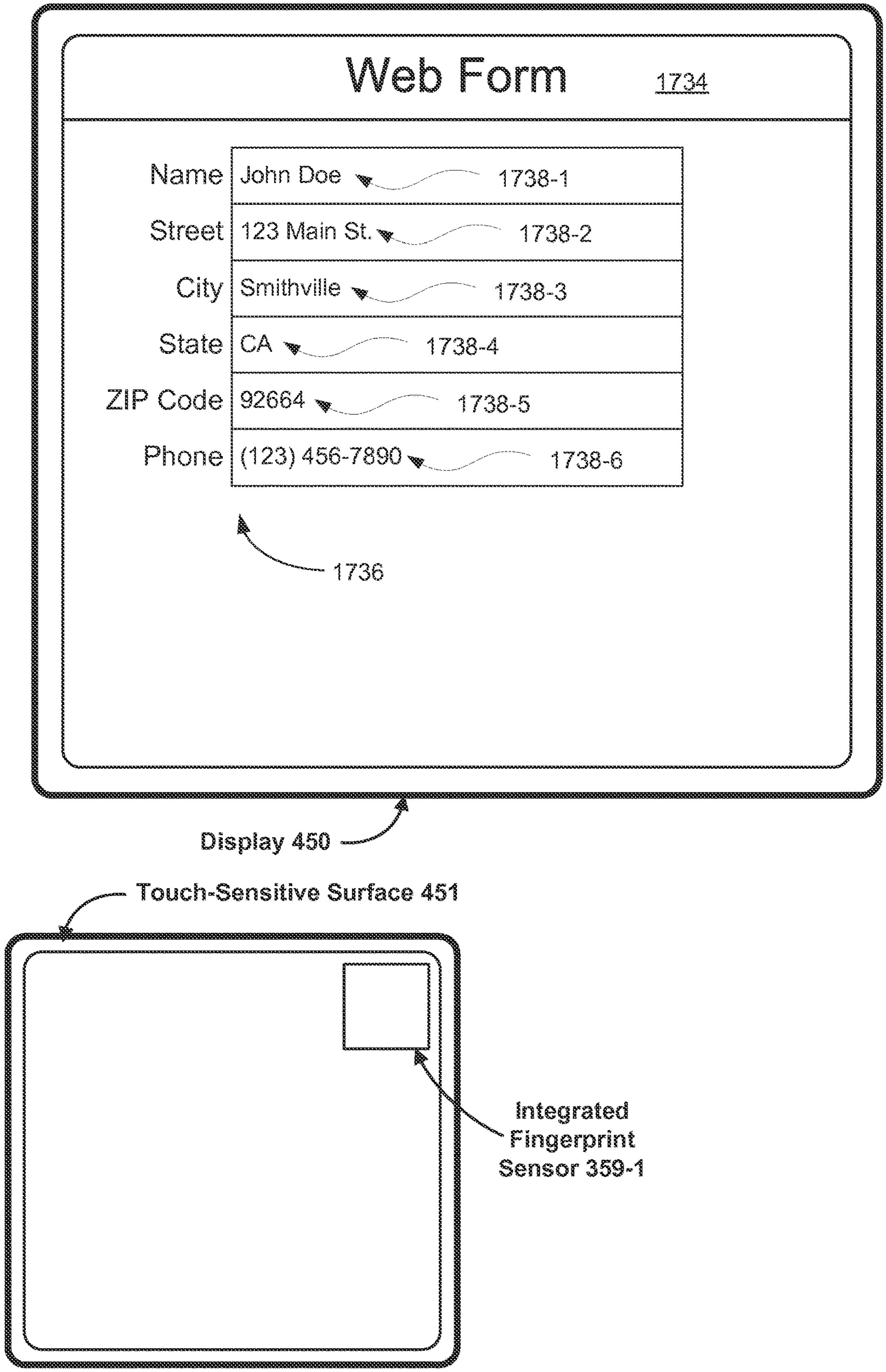

In some embodiments, when the device receives an input corresponding to a request to perform one or more operations, the device performs a respective operation, in response to the request, based on the active user-specific profile. For example, FIG. 17J illustrates web form 1734 (e.g., a web page with finable form fields) for inputting personal information displayed on display 450 in response to a user input corresponding to a request to display web form 1734 in an application (e.g., a web browser). The input includes, for example, the user selecting (e.g., by tap gesture on; by mouse click while a focus selector is located over) a hyperlink to web form 1734. Web form 1734 includes personal information fields 1736, such as name, one or more address-related fields (e.g., street, city, etc.), and phone number. In response to receiving the request to display web form 1734, the device displays web form 1734 and populates fields 1736 in web form 1734 with personal information 1738-1 thru 1738-6 based on the active user-specific profile (e.g., a name, address and phone number for "John Doe"). Personal information 1738 used to populate fields 1736 are drawn from information associated with the active user-specific profile, such as contact information associated with the active user-specific profile.

Figure 17K:
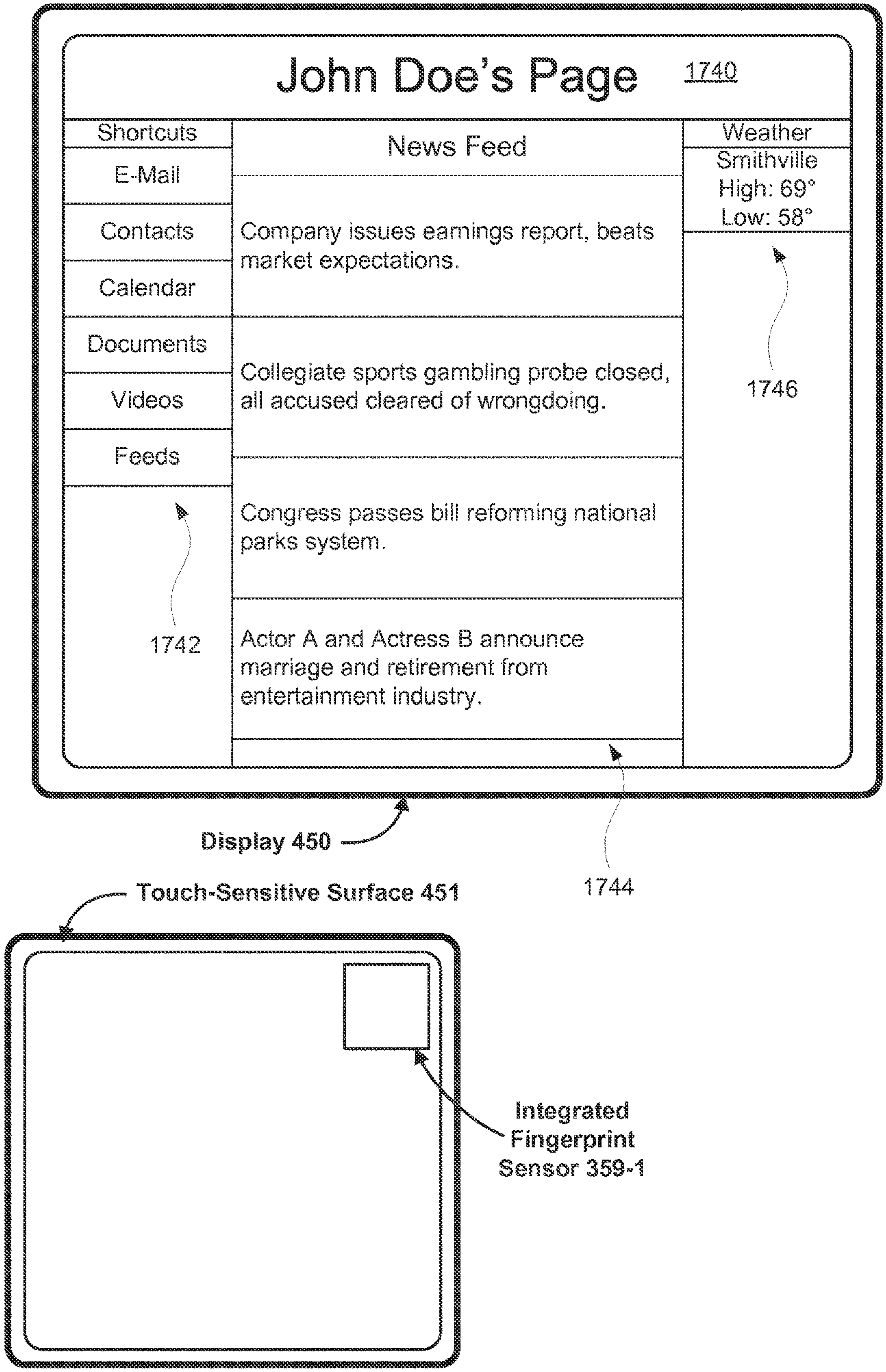

As another example, FIG. 17K illustrates personalized web page 1740 displayed on display 450 in response to a user input corresponding to a request to load web page 1740 in an application (e.g., a web browser). The input includes, for example, the user selecting (e.g., by tap gesture on; by mouse click while a focus selector is located over) a hyperlink to web page 1740 or completing a login procedure for loading web page 1740. Web page 1740 includes content personalized to the user associated with the active user-specific profile. The personalized content includes, for example, shortcuts or links 1742 to web applications or other website features, where the set of shortcuts 1742 being presented is personalized to the user's preferences or historical pattern of web usage; news feed 1744, where the news categories and/or news sources are personalized to the user's preferences; and weather 1746 personalized to a location associated with the user (e.g., home address, work address, current location).

Web page 1740 with personalized content 1742, 1744, and 1746 is loaded in accordance with a cookie associated with the active user-specific profile; the host of web page 1740 identifies the user to which web page 1740 is personalized based on the cookie. The cookie is stored in, for example, the memory (e.g., memory 102 or 370) of the device.

FIGS. 18A-18B are flow diagrams illustrating a method 1800 of performing operations based on a class-based profile in accordance with some embodiments. The method 1800 is performed at an electronic device (e.g., device 300, FIG. 3, or portable multifunction device 100, FIG. 1A) with a display, a fingerprint sensor, and a respective input element (e.g., a touch-sensitive surface, a button or a keyboard). In some embodiments, the input element is the fingerprint sensor. In some embodiments, the input element is different from the fingerprint sensor. In some embodiments, the display is a touch screen display and the touch-sensitive surface is on the display. In some embodiments, the display is separate from the touch-sensitive surface. Some operations in method 1800 are, optionally, combined and/or the order of some operations is, optionally, changed.

As described below, the method 1800 provides an intuitive way to perform operations based on a class-based profile. The method reduces the cognitive burden on a user when performing operations by customizing the operations based on a class-based profile, thereby creating a more efficient human-machine interface. For battery-operated electronic devices, enabling a user to perform operations based on a class-based profile faster and more efficiently conserves power and increases the time between battery charges.

The device obtains (e.g., retrieving from memory or receiving from a remote computer system) a plurality of profiles (1802), where the plurality of profiles includes one or more user-specific profiles and one or more class-based profiles, distinct from the user-specific profiles, that each correspond to a respective class of users. The profiles are stored in, for example, the memory (e.g., memory 102 or 370) of the device or in the cloud.

The device detects (1804) a first fingerprint on the fingerprint sensor. FIG. 17A, for example, shows the device detecting fingerprint 1702. FIG. 17B shows the device detecting fingerprint 1706.

The device selects (1806) one or more class-based profiles associated with the device as active profiles that correspond to the first fingerprint without regard to authentication of the first fingerprint as a previously registered fingerprint (e.g., determining that the first fingerprint corresponds to a fingerprint of a user in the first class does not include directly comparing the first fingerprint to previously registered fingerprints), including, in accordance with a determination that the first fingerprint corresponds to a fingerprint of a user in a first class of users that are associated with a first class-based profile, selecting the first class-based profile as an active profile. In some embodiments, the first class-based profile is selected without authenticating the fingerprint as a previously registered fingerprint. For example, if no authentication is required or the fingerprint does not match any of the previously registered fingerprints, the device can still adjust the function of the device in accordance with one or more active class-based profiles that are determined based on generalized characteristics of the fingerprint and thus do not require a positive identification of a user associated with the fingerprint.

For example, if fingerprint 1702 is detected (FIG. 17A), the device selects an "Adults" class-based profile without regard to whether fingerprint 1702 matches a previously registered fingerprint (e.g., the "Adults" class-based profile is selected based on a size of the fingerprint without needing to identify the user by matching the pattern of the fingerprint to a known fingerprint pattern associated with the user). If fingerprint 1706 is detected (FIG. 17B), the device selects a "Children" class-based profile without regard to whether fingerprint 1706 matches a previously registered fingerprint (e.g., the "Children" class-based profile is selected based on a size of the fingerprint without needing to identify the user by matching the pattern of the fingerprint to a known fingerprint pattern associated with the user).

In some embodiments, the first class-based profile is selected (1808) in accordance with a detected size of the first fingerprint. For example, if the detected first fingerprint is below a predefined size threshold (e.g., average feature size, maximum diameter, etc.), then the first fingerprint is classified as a child's fingerprint and a generic child profile is selected as an active profile for the device. Thus, in some embodiments, the first fingerprint is determined to be a child fingerprint either based on identification of the first fingerprint as belonging to a user that is below a predefined or user-specified age (e.g., 12 years old) or based on a determination that the first fingerprint has fingerprint characteristics that are typical characteristics of a child's fingerprint and thus is most likely the fingerprint of a child, even if the fingerprint has not been registered as belonging to a particular child. For example, the "Adults" profile is selected for fingerprint 1702, and the "Children" profile is selected for fingerprint 1706, which is smaller than fingerprint 1702.

In some embodiments, the first class-based profile restricts (1810) operation of the device for members of the first class. For example, when a child-specific profile is an active profile, the device limits access to particular settings, applications, information that is inappropriate (e.g., violent or otherwise restricted) or sensitive (e.g., passwords, financial information, account settings, and/or performing destructive actions such as deleting documents and applications). For example, while the "Children" profile is active, access to settings user interface 1708 is restricted. Thus, if "Settings" icon 1704 is activated while the "Children" profile is active, settings user interface 1708 (FIG. 17C) is not displayed. Instead, error message 1710 is displayed, for example as shown in FIG. 17D.

In some embodiments, the first class-based profile changes (1812) functions of the device so as to make the functions more appropriate for members of the first class. For example, when a child-specific profile is an active profile, the device adapts programs for interaction with a child (e.g., using child-specific workout profiles instead of adult-specific workout profiles in a workout application or displaying children's books rather than adult books in an e-reader application). For example, while the "Children" profile is active, access to videos not suitable for children is restricted. Thus, while the "Children" profile is active, as shown in FIG. 17F, the list of videos 1714 in user interface 1712 listing videos 1714 excludes videos that may not be suitable for children (e.g., videos 1714-3 and 1714-4).

In some embodiments, after detecting the first fingerprint on the fingerprint sensor (1814), the device determines (1816) fingerprint features of the first fingerprint, identifies (1818) a previously registered fingerprint matching the fingerprint features of the first fingerprint, and selects (1820) a first user-specific profile associated with the previously registered fingerprint as an active profile (e.g., in addition to selecting the first class-based user profile as an active profile). These fingerprint analysis/matching operations are optionally performed at a central processing unit of the device or at a secured processing device associated with the fingerprint sensor. In some embodiments, the device determines whether to select any of a set of one or more user-specific profiles as an active profile and, optionally, does not select any of the plurality of profiles as an active profile if none of the user-specific profiles are determined to be associated with the first fingerprint (e.g., if none of the user-specific profiles are associated with previously registered fingerprints that match the first fingerprint). In some embodiments, if no user-specific profile is selected, a default profile is used instead. For example, after detecting fingerprint 1702 or 1706, the device also determines if the detected fingerprint matches a previously registered fingerprint. If a previously registered fingerprint is identified for the detected fingerprint, a user-specific profile associated with the identified previously registered fingerprint is selected as active on the device, in addition to any class-based profiles selected as active (e.g., as shown in FIGS. 17J and 17K, where a web form 1734 and a webpage 1740 are loaded in accordance with user-specific information associated with a user-specific profile selected based on a detected fingerprint).

The device receives (1822) an input with the respective input element, where the input corresponds to a request to perform one or more operations at the device. In some embodiments, the input is received while the one or more profiles associated with the device are the active profiles (e.g., after the one or more profiles have been selected as active profiles). In some embodiments, the one or more profiles are selected as the active profiles in response to receiving the input. In some embodiments, the input includes a gesture on a touch-sensitive surface of the device. In some embodiments, the input includes moving the device within range of a near-field communication device and receiving a signal from the near-field communication device. The input can be, for example, a gesture on touch-sensitive surface 451 or a mouse click to activate "Settings" icon 1704 while a cursor 1705 is over "Settings" icon 1704, a gesture on touch-sensitive surface 451 or a mouse click to activate display of user interface 1712, a gesture on touch-sensitive surface 451 or a mouse click to select a video 1714 for playback, and so on. In some embodiments, the input is a tap gesture on a portion of a touchscreen display that includes a selectable icon, where the fingerprint sensor is integrated into the touchscreen display and the characteristics of the fingerprint are determined based on the tap gesture. In some embodiments, the input is a press input on a trackpad (e.g., a contact with an intensity above an activation intensity threshold or a contact and activation of a physical actuator underneath the trackpad or a separate actuator button) while a cursor is over the selectable icon on a display.

In response to receiving the input with the respective input element while the first class-based profile is selected as an active profile, the device performs (1824) a respective operation based on the request and the first class-based profile (and, optionally, based on one or more other active profiles). For example, in response to receiving the input to display settings user interface 1708 (e.g., a gesture on touch-sensitive surface to activate "Settings" icon 1704), the device displays settings user interface 1708 (FIG. 17C) or error message 1710 (FIG. 17D) based on which class-based profile is currently active (e.g., the settings user interface is displayed if the "Adults" profile is active and the error message is displayed if the "Children" profile is active). As another example, in response to receiving the input, the device displays a full list of videos 1714 (FIG. 17E) or a limited list of videos 1714 (FIG. 17F) based on which class-based profile is currently active (e.g., the full list of videos is displayed if the "Adults" profile is active and the limited list of videos is displayed if the "Children" profile is active).

In some embodiments, the first class-based profile is (1826) based at least in part on an age of the user, the request includes a request to present content including audio, and the respective operation includes presenting audio adjusted for an age of the user (e.g., reducing the maximum volume for a child and/or shifting the audio frequency down for an older adult). For example, in FIG. 17G, when playing back a video 1714, in response to receiving the request to play back the video 1714, while a "Children" profile is active, the device caps the maximum volume level for the audio content in the video 1714 (e.g., indicated by area 1728 in volume slider bar 1726) to help prevent hearing damage.

In some embodiments, the first class-based profile is (1828) based at least in part on an age of the user, the request includes a request to present content that includes a visual component, and the respective operation includes adjusting the visual component of the media so that it is easier for the user to see the visual component (e.g., increasing display brightness or contrast, and/or increasing text font size for an older adult). For example, in FIG. 17I, when displaying document 1732, in response to receiving the request to display a document, while a "Children" profile or a profile corresponding to seniors is active, the device displays the document at a larger zoom scale or with a larger text font size (e.g., the document with standard sized text is displayed if the "Adults" profile is active, as shown in FIG. 17H and the document with larger text is displayed if the "Children" profile is active, as shown in FIG. 17I).

In some embodiments, when (1830) the device does not have an active profile that is authorized to perform the one or more operations associated with the request, the respective operation is an error message (e.g., a message indicating that the active profile does not have permission to perform the requested operation such as accessing private information or a secure application such as a banking application). For example, when the device receives a request to display settings user interface 1708 while the "Children" profile is active and "Adults" profile is not active, and thus error message 1710 is displayed (FIG. 17D).

In some embodiments, in response to receiving the input with the respective input element while the first class-based profile is selected as an active profile, the device performs (1832) the one or more operations in addition to performing the respective operation (e.g., the device performs the requested operations and customizes the operations based on the active profile, such as by changing the output of the device to be more appropriate for the approximate age of the user). For example, when the device receives a request to play a video 1714 while the "Children" profile is active, the video is played and the maximum volume is capped, as described above with reference to FIG. 17G.

In some embodiments, the request to perform one or more operations includes (1834) a request to display a form for inputting personal information (e.g., loading an application or webpage that includes form fields for entering personal information such as a username, address, phone number, password, or payment information associated with the first user-specific profile), and the respective operation includes automatically populating the personal information in the form based on information in the first user-specific profile. For example, in FIG. 17J, in response to receiving a request to display web form 1734, the device displays web form 1734 and automatically populates fields 1736 with personal information 1738 based on a user-specific profile that is currently active.

In some embodiments, the request to perform one or more operations includes (1836) a request to load a webpage, and the respective operation includes loading the webpage in accordance with a cookie associated with the first user-specific profile. For example, in FIG. 17K, in response to receiving a request to display web page 1740, the device displays web page 1740 that is personalized to a user corresponding to a user-specific profile that is currently active based on a cookie associated with the active user-specific profile. In contrast, if a second user-specific profile is an active profile instead of the first user-specific profile being an active profile, the webpage would be loaded in accordance with a different cookie associated with the second user-specific profile.

It should be understood that the particular order in which the operations in FIGS. 18A-18B have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., those methods described above) are also applicable in an analogous manner to method 1800 described above with respect to FIGS. 18A-18B. For example, the fingerprints, gestures, and focus selectors described above with reference to method 1800 optionally have one or more of the characteristics of the fingerprints, gestures, and focus selectors described herein with reference to other methods described herein (e.g., those methods described above). For brevity, these details are not repeated here.

Figure 19:
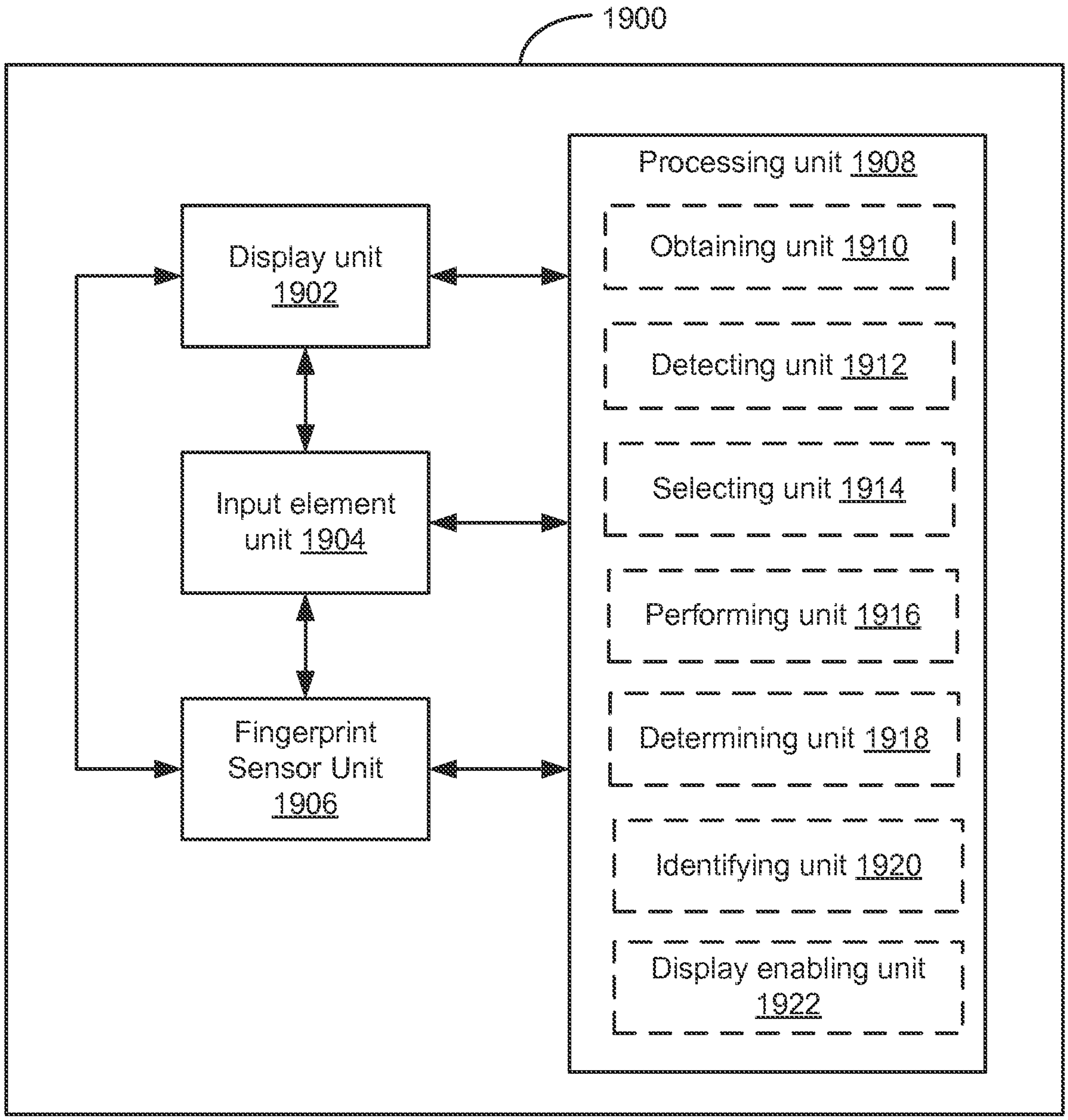
FIG. 19 is a functional block diagram of an electronic device in accordance with some embodiments.

In accordance with some embodiments, FIG. 19 shows a functional block diagram of an electronic device 1900 configured in accordance with the principles of the various described embodiments. The functional blocks of the device are, optionally, implemented by hardware, software, or a combination of hardware and software to carry out the principles of the various described embodiments. It is understood by persons of skill in the art that the functional blocks described in FIG. 19 are, optionally, combined or separated into sub-blocks to implement the principles of the various described embodiments. Therefore, the description herein optionally supports any possible combination or separation or further definition of the functional blocks described herein.

As shown in FIG. 19, an electronic device 1900 includes a display unit 1902, a respective input element unit 1904 (e.g., a touch-sensitive surface, touchscreen display, mouse, or other input element), a fingerprint sensor unit 1906, and a processing unit 1908 coupled to the display unit 1902, the respective input element unit 1904, and the fingerprint sensor unit 1906. In some embodiments, the processing unit 1908 includes an obtaining unit 1910, a detecting unit 1912, a selecting unit 1914, a performing unit 1916, a determining unit 1918, an identifying unit 1920, and a display enabling unit 1922.

The processing unit 1908 is configured to: obtain a plurality of profiles (e.g., with the obtaining unit 1910), where the plurality of profiles includes one or more user-specific profiles and one or more class-based profiles, distinct from the user-specific profiles, that each correspond to a respective class of users; detect a first fingerprint on the fingerprint sensor unit 1906 (e.g., with the detecting unit 1912); select one or more class-based profiles associated with the device as active profiles that correspond to the first fingerprint without regard to authentication of the first fingerprint as a previously registered fingerprint (e.g., with the selecting unit 1914), including, in accordance with a determination that the first fingerprint corresponds to a fingerprint of a user in a first class of users that are associated with a first class-based profile, select the first class-based profile as an active profile; receive an input with the respective input element unit 1904, where the input corresponds to a request to perform one or more operations at the device; and in response to receiving the input with the respective input element unit 1904 while the first class-based profile is selected as an active profile, perform a respective operation based on the request and the first class-based profile (e.g., with the performing unit 1916).

In some embodiments, the first class-based profile is selected in accordance with a detected size of the first fingerprint.

In some embodiments, the class-based profile restricts operation of the device for members of the class.

In some embodiments, the class-based profile changes functions of the device so as to make the functions more appropriate for members of the class.

In some embodiments, the class-based profile is based at least in part on an age of the user, the request includes a request to present content including audio, and the respective operation includes presenting audio adjusted for an age of the user.

In some embodiments, the class-based profile is based at least in part on an age of the user, the request includes a request to present content that includes a visual component, and the respective operation includes adjusting the visual component of the media so that it is easier for the user to see the visual component.

In some embodiments, when the device does not have an active profile that is authorized to perform the one or more operations associated with the request, the respective operation is an error message.

In some embodiments, the processing unit 1908 is configured to, in response to receiving the input with the respective input element unit 1904 while the first class-based profile is selected as an active profile, perform the one or more operations in addition to performing the respective operation (e.g., with the performing unit 1916).

In some embodiments, the processing unit 1908 is configured to, after detecting the first fingerprint on the fingerprint sensor unit 1906, determine fingerprint features of the first fingerprint (e.g., with the determining unit 1918), identify a previously registered fingerprint matching the fingerprint features of the first fingerprint (e.g., with the identifying unit 1920), and select a first user-specific profile associated with the previously registered fingerprint as an active profile (e.g., with the selecting unit 1914).

In some embodiments, the request to perform one or more operations includes a request to enable display of a form for inputting personal information (e.g., with the display enabling unit 1922), and the respective operation includes automatically populating the personal information in the form based on information in the first user-specific profile.

In some embodiments, the request to perform one or more operations includes a request to load a webpage, and the respective operation includes loading the webpage in accordance with a cookie associated with the first user-specific profile.

The operations in the information processing methods described above are, optionally implemented by running one or more functional modules in information processing apparatus such as general purpose processors (e.g., as described above with respect to FIGS. 1A and 3) or application specific chips.

The operations described above with reference to FIGS. 18A-18B are, optionally, implemented by components depicted in FIGS. 1A-1B or FIG. 19. For example, detection operation 1804, selecting operation 1806, receiving operation 1822, and performing operation 1824 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub-event, such as selection of an object on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Changing Logging Preferences Based on Fingerprints

Many electronic devices log user activity in a variety of ways. For example, some devices log activity such as internet browsing history and/or phone history. As another example, some devices log frequently used words that, despite not corresponding to words in a default dictionary, are nonetheless frequently used by the user (e.g., the word "Vladivostok" may not appear in a standard device dictionary, but will automatically be added if a user from Vladivostok, Russia types the characters "Vladivostok" into a text message a certain number of times). As yet another example, some devices begin logging activity (e.g., activity from a global positioning system, or "GPS") when the device is determined to be lost or stolen (e.g., at the request of the user through a recovery application). However, many devices (e.g., portable multifunction devices) do not offer convenient ways to change the logging preferences. For example, when a user lends their device to another user, the device will continue to log unwanted browser history, phone history, and autocorrect inputs unless action is taken (e.g., changing settings in a setting menu) prior to the other user's use of the device. As another example, such devices will often forgo logging recovery data (e.g., GPS data) unless the user has remotely activated a logging feature (e.g., by sending a proper short message service, or "SMS", message to the device that activates logging operations, by including, for example the text "Find my phone").

In the embodiments described below, an improved method for changing logging preferences is achieved by detecting a fingerprint and determining if the fingerprint corresponds to a known user's profile. When it is, the user's profile is set as an active profile and a set of operations (e.g., including logging operations) is performed in accordance with the active profile. When the fingerprint does not correspond to a known user, the active profile is set to a default profile (e.g., a guest profile) and a different set of operations is performed. This method streamlines the process of changing logging preferences.

In some embodiments, the device is an electronic device with a separate display (e.g., display 450) and a separate touch-sensitive surface (e.g., touch-sensitive surface 451). In some embodiments, the device is portable multifunction device 100, the display is touch screen 112, and the touch-sensitive surface includes tactile output generators 167 on the display (FIG. 1A). The device described below with reference to 20A-20F and 21A-21B includes one or more fingerprint sensors 169. In some embodiments, the one or more fingerprint sensors include one or more integrated fingerprint sensors 359-1 (FIG. 4B) that are integrated in to the touch-sensitive surface (e.g., separate touch-sensitive surface 451 or touch sensitive display system 112). In some embodiments, the one or more fingerprint sensors include separate fingerprint sensors 359-2 (FIG. 4B) that are separate from the touch-sensitive surface (e.g., separate touch-sensitive surface 451 or touch sensitive display system 112). Unless specified otherwise, a fingerprint sensor 169 described below is, optionally, either an integrated fingerprint sensor 359-1 or a separate fingerprint sensor 359-2, depending on the configuration of the hardware and software of the device that includes the fingerprint sensor 169. For convenience of explanation, embodiments described with reference to FIGS. 20A-20F and 21A-21B will be discussed with reference to device operations that are performed in response to detecting inputs described in FIGS. 20A-20F on a touch screen 112 and/or a fingerprint sensor 169 (e.g., an integrated fingerprint sensor 359-1 or a separate fingerprint sensor 359-2) while displaying the user interfaces shown in FIGS. 20A-20F on touch screen 112. However, analogous operations are, optionally, performed on a device with a display 450, a separate touch-sensitive surface 451 and a separate fingerprint sensor 359-2 with an integrated fingerprint sensor 359-1 in response to detecting the inputs described in FIGS. 20A-20F on the integrated fingerprint sensor 359-1 while displaying the user interfaces shown in FIGS. 20A-20F on display 450. In some embodiments, the focus selector is, optionally: a respective contact, a representative point corresponding to a contact (e.g., a centroid of a respective contact or a point associated with a respective contact), or a centroid of two or more contacts detected on the touch screen 112, in place of a cursor. In some embodiments, a visual representation of the focus selector is displayed (e.g., a user interface object to which the focus selector is pointing is visually distinguished from the other user interface objects).

FIGS. 20A-20D illustrate an example of some embodiments in which a device determines that a scanned fingerprint is associated with a user's profile.

Figure 20A:
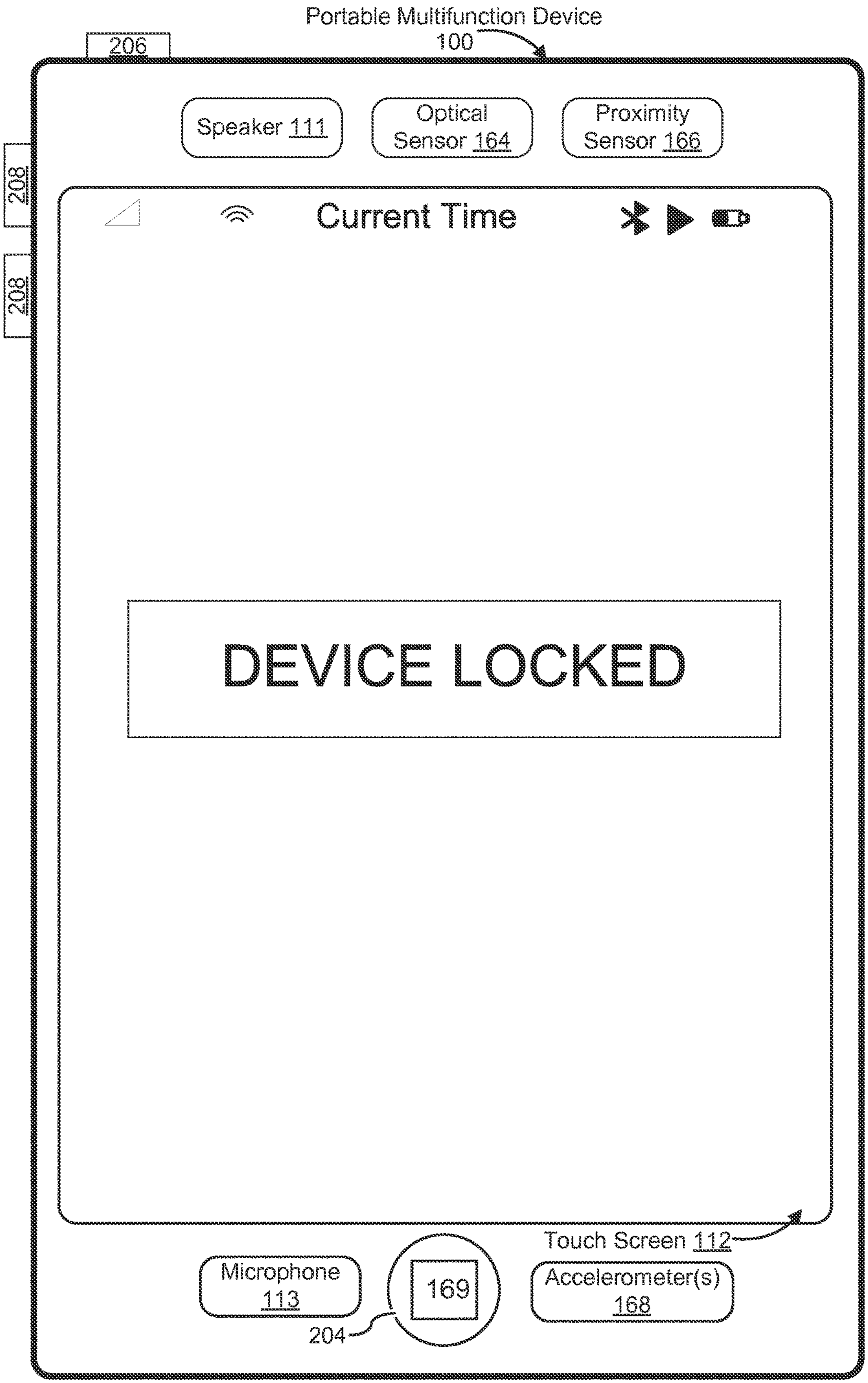
FIGS. 20A-20F illustrate exemplary user interfaces implemented on devices that change logging preferences based on fingerprints.
Figure 21A:
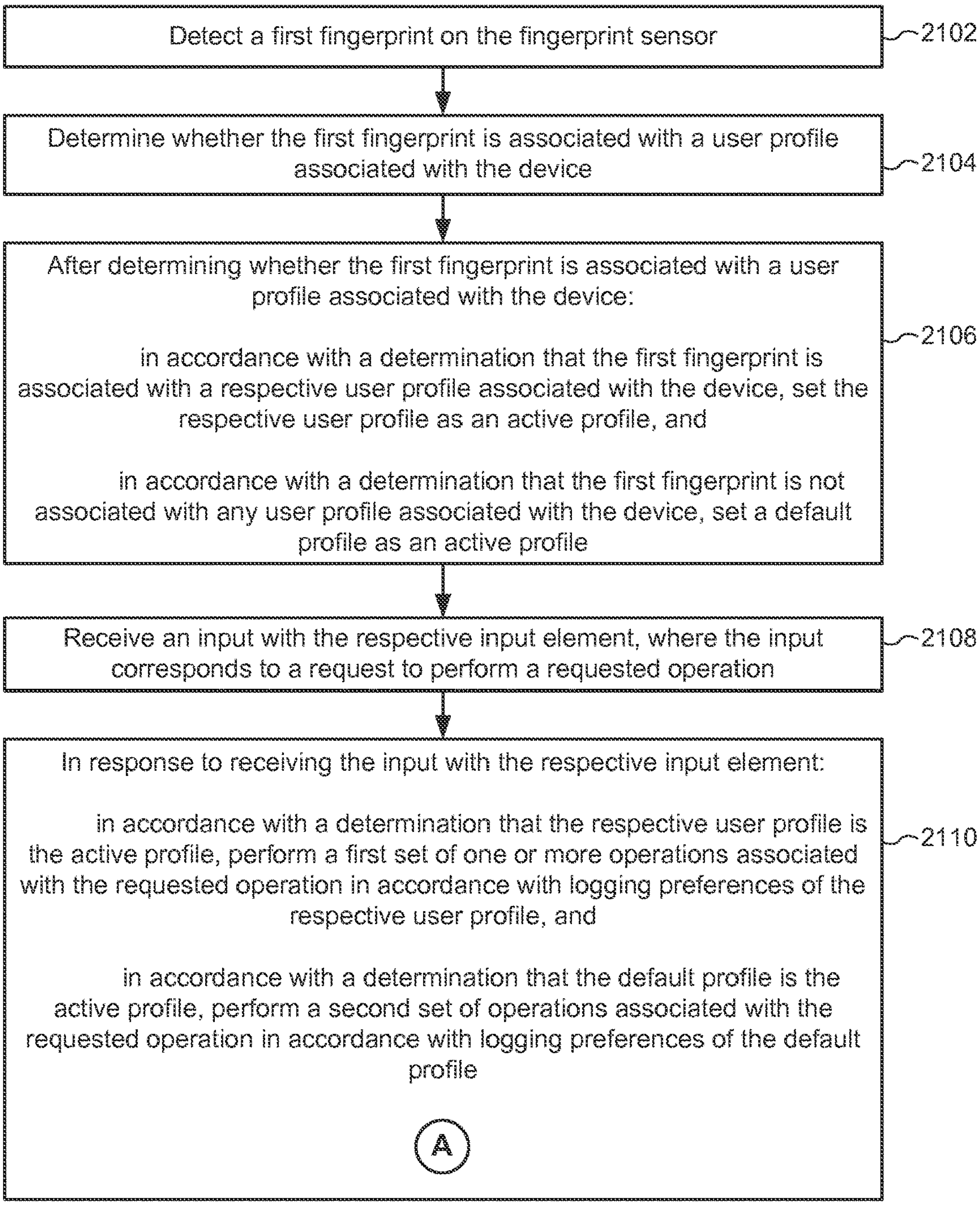

FIG. 20A illustrates an exemplary user interface implemented on a device that changes logging preferences based on fingerprints. In FIG. 20A, the device is locked, meaning that at least some functionality of the device is unavailable until the device is unlocked by a user (e.g., phone functionality, applications, photos, etc). In this example, the device features a home button 204 that includes an integrated fingerprint sensor 169.

Figure 20B:
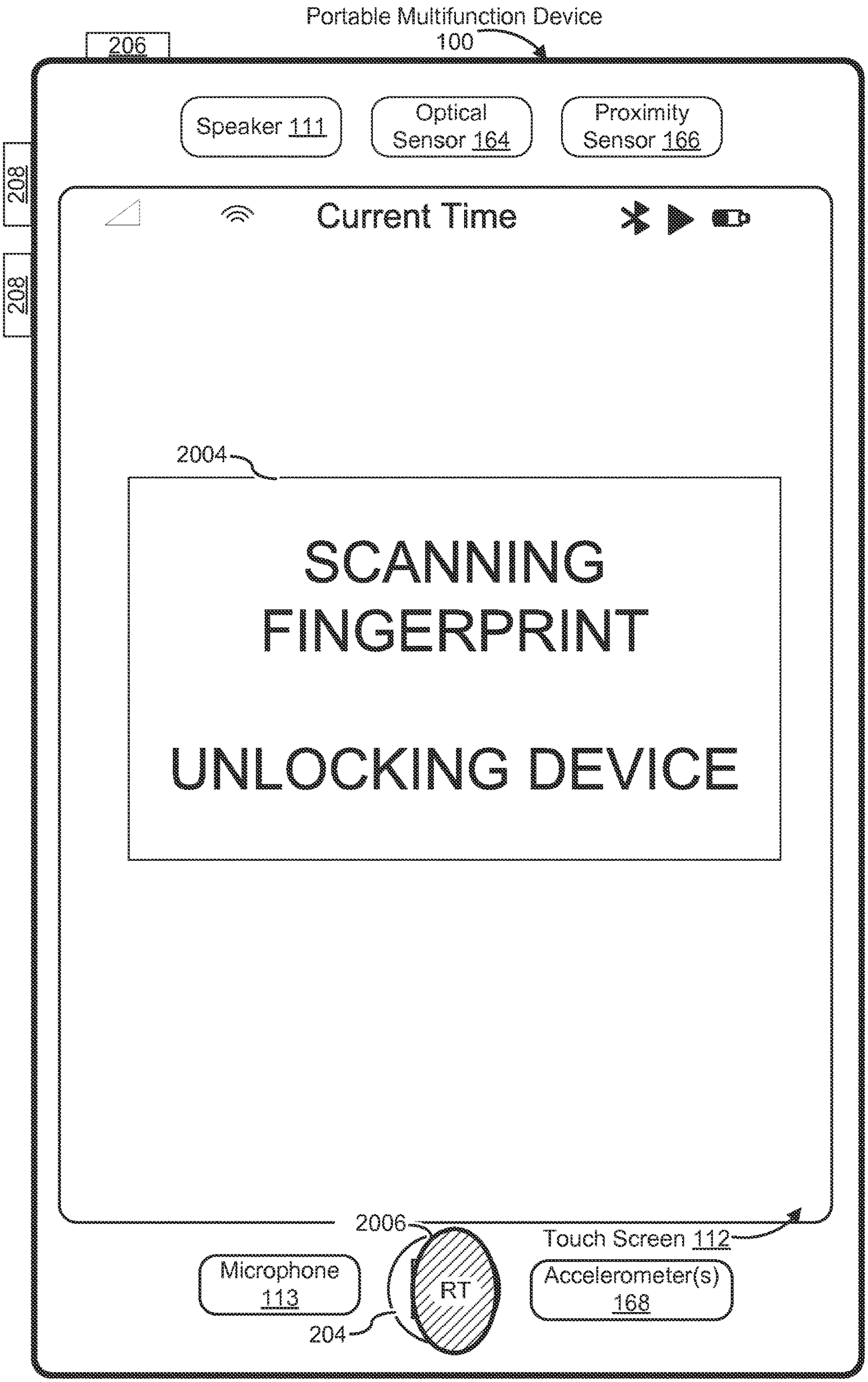

FIG. 20B, a fingerprint 2006 is detected on fingerprint sensor 169. In this example, detection of a fingerprint that is recognized by the device unlocks the device. In some embodiments, as explained below, when an unrecognized fingerprint is detected, the device unlocks to a default or guest profile. In this example, a visual cue 2004 is provided to indicate that the device is scanning a fingerprint and unlocking the device. In some embodiments, however, the device must be unlocked separately (e.g., through a gesture such as swipe-to-unlock, by entering a password, some combination thereof, or through different unlocking functionality). In some embodiments, the device can be unlocked by several users, each user having a unique user profile. When the device is unlocked by virtue of a fingerprint being recognized as belonging to a respective unique user associated with a unique user profile, the user's profile is set as an active profile, as explained below.

Figure 20C:
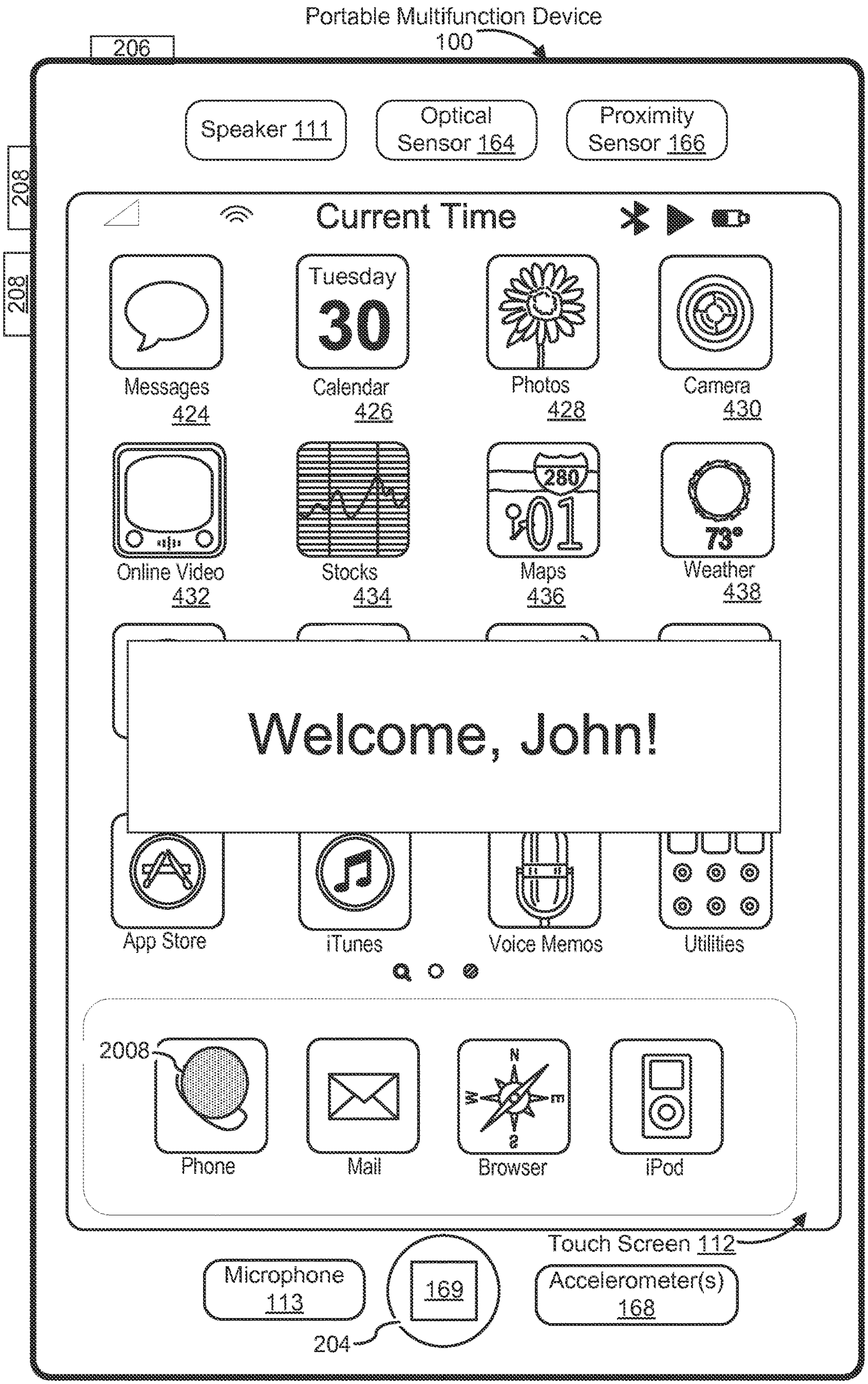
Figure 20D:
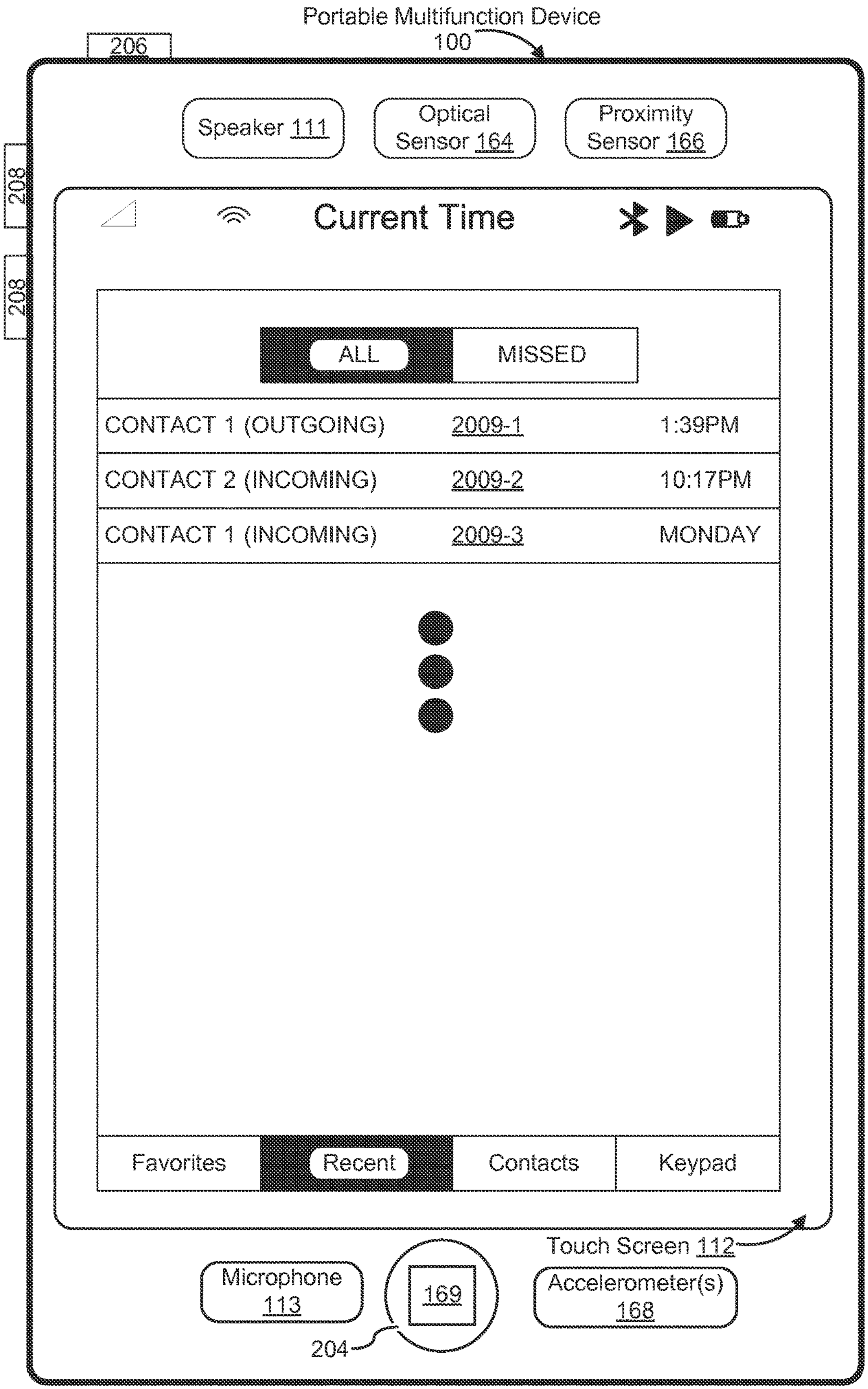

As shown in the example illustrated in FIG. 20C, the device has determined that the fingerprint is associated with a user John, unlocked the device and set John's profile as the active profile. In some embodiments, the user profile stores information (e.g., in one or more databases) as to the user's preferences, settings, browser history, phone history and the like. In some embodiments, when the device determines that scanned fingerprint 2006 belongs to John, the device retrieves John's preferences, settings, history and the like from the databases from memory and alters the device behavior accordingly. By way of example, FIG. 20C illustrate illustrates an input (e.g., contact 2008) corresponding to selection of a phone application for placing phone calls. The device responds by loading the phone application, as shown in FIG. 20D. Because John's profile is the active profile, a list of John's recent phone conversations (e.g., user interface objects 2009 representing phone conversation) is displayed to facilitate convenient call back and the ability to dial frequently dialed numbers with ease.

In some embodiments, the device stores multiple user profiles. For example, when the device scans a fingerprint and determines that it is associated with a user Jane, who also has a user profile on the device, the device loads Jane's profile. By way of example, Jane's recent phone conversations are available to Jane in lieu of John's when the phone application is selected.

Figure 20E:
Figure 20F:
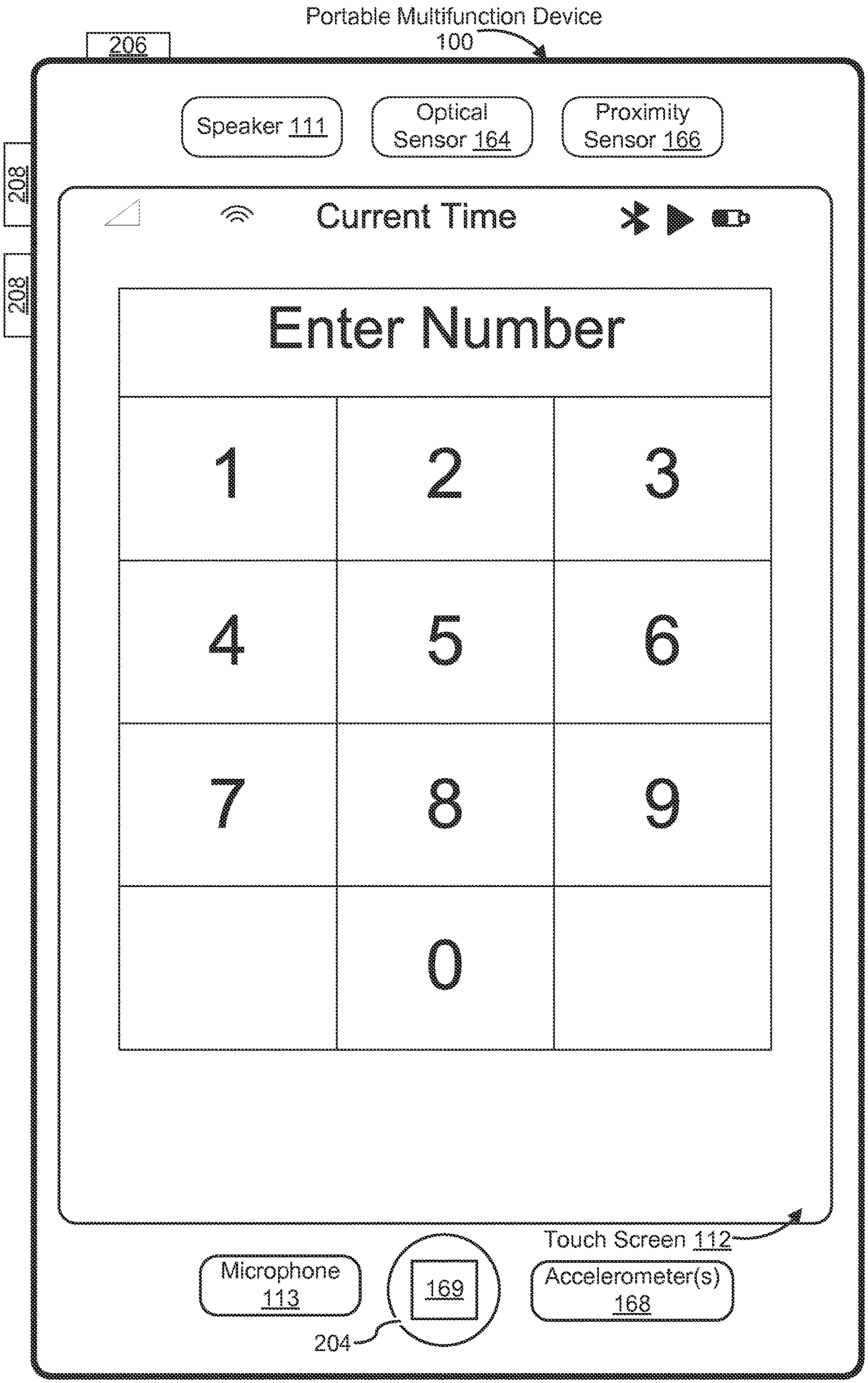

In some embodiments, as illustrated in FIGS. 20A-20B and FIG. 20E-20F, the device alters its behavior when a fingerprint is scanned and the device determines that the fingerprint does not correspond to a user with a user profile. FIGS. 20A-20B have already been described with reference to the previous example, with the difference that in this example, fingerprint 2006 is not associated with a user's profile. Thus, as shown in FIG. 20E, the device welcomes the user as a "Guest User," indicating that a guest or default profile has been set as the active profile. FIGS. 20E-20F offer an example of how, in some embodiments, the device alters its functionality in accordance with a default or guest profile being set as the active profile. FIG. 20E illustrates detection of an input (e.g., a contact 2010) corresponding selection of the phone application. In contrast to FIG. 20D, in which an active user's recent phone conversations were shown, the device in FIG. 20F displays a keypad interface for the phone with no recent conversations listed. Thus, an unauthorized user is prohibited from viewing or dialing an authorized user's frequent contacts. It should be appreciated that the instant disclosure is intended to support a broad range of differences in functionality between an identified user's profile and a default user's profile. Some such optional differences in device functionality are described with reference to method 2100 described with reference to FIGS. 21A-21B.

FIGS. 21A-21B are flow diagrams illustrating a method 2100 of changing logging preferences in accordance with some embodiments. The method 2100 is performed at an electronic device (e.g., device 300, FIG. 3, or portable multifunction device 100, FIG. 1A) with a fingerprint sensor and one or more input elements, including a respective input element. In some embodiments, the device includes a display and a touch-sensitive surface. In some embodiments, the display is a touch screen display and the touch-sensitive surface is on the display. In some embodiments, the display is separate from the touch-sensitive surface. In some embodiments, the touch-sensitive surface is the respective input element and/or the fingerprint sensor. Some operations in method 2100 are, optionally, combined and/or the order of some operations is, optionally, changed.

As described below, the method 2100 provides an intuitive way to change logging preferences. The method reduces the cognitive burden on a user when changing logging preferences, thereby creating a more efficient human-machine interface. For battery-operated electronic devices, enabling a user to change logging preferences faster and more efficiently conserves power and increases the time between battery charges.

A device with a respective input element (e.g., a touch-sensitive surface, a button or a keyboard) and a fingerprint sensor detects (2102) a first fingerprint on the fingerprint sensor.

The device determines (2104) whether the first fingerprint is associated with a user profile associated with the device. In some embodiments, the user profile is a profile from a set of one or more user-specific profiles, generic profiles and other non-default profiles, associated with the device, that are not the default profile. In some embodiments, after detecting the first fingerprint on the fingerprint sensor and before determining whether the first fingerprint is associated with a user profile associated with the device, the device determines fingerprint features of the first fingerprint and identifies a previously registered fingerprint, if any, that matches or is associated with the fingerprint features of the first fingerprint. When the first fingerprint corresponds to a respective previously registered fingerprint associated with a non-default profile, the device determines that the fingerprint is associated with the respective non-default profile. In contrast, when the first fingerprint does not correspond to a previously registered fingerprint associated with a non-default profile, the device determines that the fingerprint is not associated with any of the non-default profiles. These fingerprint analysis/matching operations are optionally performed at a central processing unit of the device, while in other implementations the fingerprint analysis/matching operations are performed at a secured processing device associated with the fingerprint sensor. These fingerprint analysis/matching operations are optionally performed a specified time (e.g., when unlocking the device, as described with reference to FIGS. 20A-20C). In some embodiments, fingerprint analysis and matching is performed whenever a fingerprint is detected and matched to a profile on the fingerprint (e.g., the device is nearly constantly attempting to determine the user).

After determining whether the first fingerprint is associated with a user profile associated with the device, and in accordance with a determination that the first fingerprint is associated with a respective user profile associated with the device, the device sets (2106) the respective user profile as an active profile. In some embodiments, only one user profile can be an active profile at a time. In some embodiments multiple user profiles can be active profiles at the same time. For example, a user-specific profile and one or more generic profiles are, optionally, selected as active profiles at the same time and the settings and other characteristics associated with multiple active profiles are used by the device to interpret inputs received by device. As discussed previously, FIGS. 20C-20D illustrate an example in which the device is set to a single user's profile (e.g., a user profile belonging to John).

Also after determining whether the first fingerprint is associated with a user profile associated with the device, and in accordance with a determination that the first fingerprint is not associated with any user profile associated with the device, the device sets a default profile as an active profile. In some embodiments, when the default profile is an active profile, it is the only active profile (e.g., any other profile overrides the default profile). As discussed previously, FIGS. 20E-20F illustrate an example in which the device is set to a default, or guest, profile.

The device receives (2108) an input with the respective input element, where the input corresponds to a request to perform a requested operation. In some embodiments, the input is received while the respective user profile or the default profile is an active profile (e.g., after the respective user profile or the default profile has been selected as the active profile). In some embodiments, the device determines whether to select the respective user profile or the default profile as the active profile in response to receiving the input.

In response to receiving the input with the respective input element, in accordance with a determination that the respective user profile is the active profile, the device performs (2110) a first set of one or more operations associated with the requested operation in accordance with logging preferences of the respective user profile. Also in response to receiving the input with the respective input element, in accordance with a determination that the default profile is the active profile, the device performs a second set of operations associated with the requested operation in accordance with logging preferences of the default profile. In some embodiments, the logging preferences of a profile correspond to instructions that indicate which activities that are performed on the device are to be logged or otherwise recorded by the device. For example, logging preferences of a first user indicate that browser history is to be tracked and application state information (e.g., open web browser tabs) is to be saved, while default logging preferences indicate that browser history is not to be tracked and that application state information is not to be saved (e.g., open web browser tabs are to be closed when the web browser ceases to be the active application).

In some embodiments, performing the first set of operations includes (2112) logging operations of a first type of operation performed on the device, and performing the second set of operations includes forgoing logging operations of the first type of operation performed on the device that would have been logged in accordance with logging preferences of the respective user profile. Thus, in some embodiments, the device does not log certain activities of temporary/unauthorized users (e.g., so as to avoid cluttering up a browsing history or recent call log of the user with activities of temporary/unauthorized users of the device).

In some embodiments, the first type of operations includes (2114) operations that are used by the device to customize operation of the device based on historical usage patterns of the device (e.g., by a primary user). For example, when the device determines that a temporary/unauthorized user is using the device, the device stops customizing one or more of: autocorrect suggestions, search history, search suggestions, browser history, username/password login information, recently used applications, recently dialed phone numbers, read/unread markers for email and/or read/unread notifications for the device until an authorized user starts to use the device again. In some embodiments, after the authorized user starts using the device again, the device starts logging the first type of operations again. Thus, in some embodiments, for a device with a single primary authorized user, the "learned" customizations of the device that are determined based on usage patterns of the authorized user are not disturbed if the user hands the device to a temporary/unauthorized user such as a friend or family member of the authorized user. Rather, while the device performs the operations requested by the temporary/unauthorized user, the device ignores those inputs for the purpose of customizing the behavior of the device in accordance with historical usage patterns.

In some embodiments, performing the second set of operations includes (2116) logging operations of a second type of operation performed on the device, and performing the first set of operations includes forgoing logging operations of the second type of operation performed on the device that would have been logged in accordance with logging preferences of the default user profile. Thus, in some embodiments, when an unauthorized user is using a device, activities of the unauthorized user are closely monitored by the device. However, when the authorized user is using the device (e.g., as determined by the fingerprints of the authorized user being detected on the fingerprint sensor), this data is not stored so as not to unnecessarily intrude upon the activities of the authorized user.

In some embodiments, the second type of operation includes (2118) operations that assist in performing forensic operations associated with a lost or stolen device (e.g., logging location information, network activity, browsing history, application use, access to private information such as bank account information, email, voicemail, etc.). Thus, in some embodiments, if the device determines that an unauthorized user is using the device, the device optionally begins tracking operations performed by the unauthorized user so that the authorized user can later be informed of the actions of the unauthorized user that may have compromised sensitive information such as financial details, personal emails, and the like.

In some embodiments, the second type of operation includes (2120) operations that assist in locating the device (e.g., logging location information identified from a GPS, WiFi or other sources). Thus, in some embodiments, if the device determines that an unauthorized user is using the device, the device optionally begins tracking the device to aid in recovery of the device.

In some embodiments, the device sends (e.g., periodically) to a remote server a log record that includes a representation of the logging operations of the second type of operation. In some embodiments, the log record is accessible (only) to an owner of the device and can be used by the owner to help identify a location of the device so as to aid in recovery of the device. Additionally, in some situations, the log records provide information that aids in determining the identity of the unauthorized user of the device, such as call history, web browsing history, location data, and/or a record of fingerprints detected on the fingerprint sensor.

It should be understood that the particular order in which the operations in FIGS. 21A-21B have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., those methods described above) are also applicable in an analogous manner to method 2100 described above with respect to FIGS. 21A-21B. For example, the fingerprints, contacts, gestures, and user interface objects, described above with reference to method 2100 optionally have one or more of the characteristics of the fingerprints, contacts, gestures, and user interface objects, described herein with reference to other methods described herein (e.g., those methods described above). For brevity, these details are not repeated here.

Figure 22:
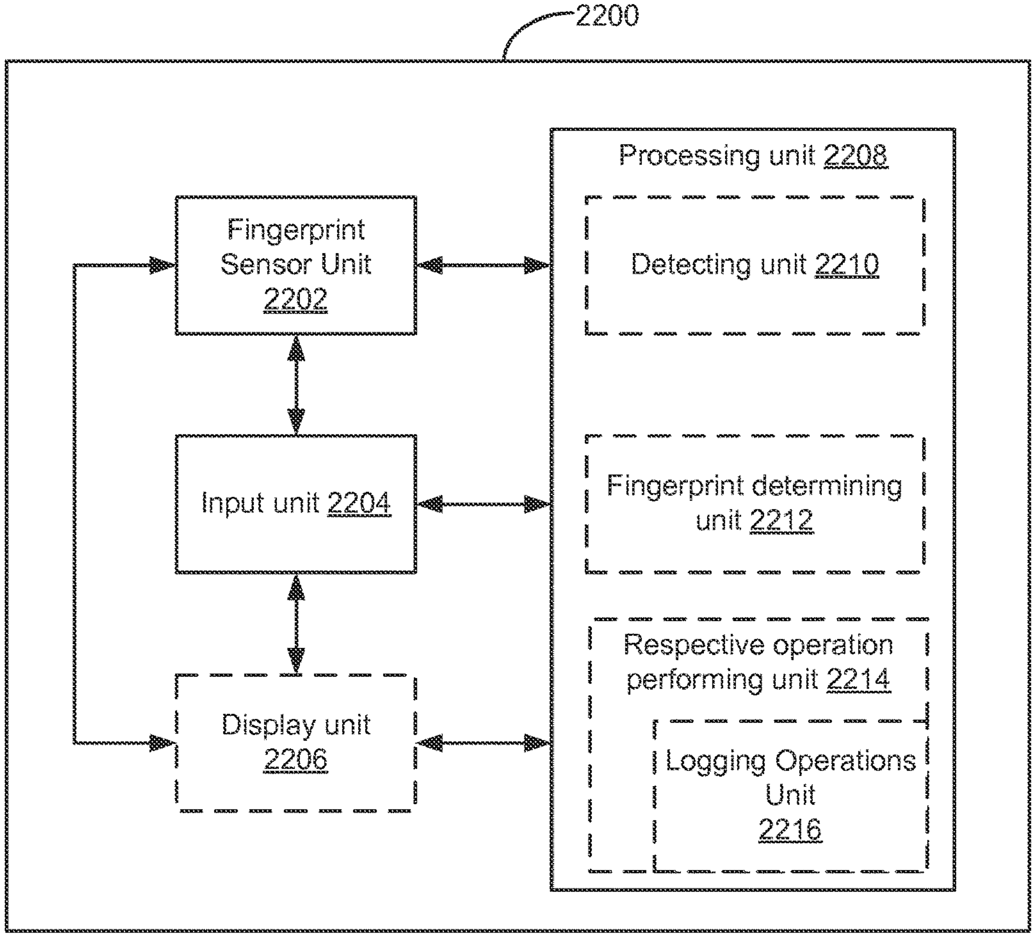
FIG. 22 is a functional block diagram of an electronic device in accordance with some embodiments.

In accordance with some embodiments, FIG. 22 shows a functional block diagram of an electronic device 2200 configured in accordance with the principles of the various described embodiments. The functional blocks of the device are, optionally, implemented by hardware, software, or a combination of hardware and software to carry out the principles of the various described embodiments. It is understood by persons of skill in the art that the functional blocks described in FIG. 22 are, optionally, combined or separated into sub-blocks to implement the principles of the various described embodiments. Therefore, the description herein optionally supports any possible combination or separation or further definition of the functional blocks described herein.

As shown in FIG. 22, an electronic device 2200 includes a fingerprint sensor unit 2202; an input unit 2204; and a processing unit 2208 coupled to the fingerprint sensor unit 2202 and the input unit 2204. The electronic device 2200 optionally includes a display unit 2206 configured to enable the display of one or more user interfaces and/or one or more user interface objects. In some embodiments, the processing unit 2208 includes a detecting unit 2210, a fingerprint determining unit 2212, one or more respective operation performing units 2214. In some embodiments, one or more of the respective operation performing units 2214 include one or more logging operation units 2216 (e.g., a GPS logging unit, a browser history logging unit, etc.).

The processing unit 2208 is configured to: detect a first fingerprint on the fingerprint sensor unit 2212 and determine whether the first fingerprint is associated with a user profile associated with the device. After determining whether the first fingerprint is associated with a user profile associated with the device, and in accordance with a determination that the first fingerprint is associated with a respective user profile associated with the device, the processing unit 2208 is configured to set the respective user profile as an active profile; and, in accordance with a determination that the first fingerprint is not associated with any user profile associated with the device, the processing unit 2208 is configured to set a default profile as an active profile. In response to receiving the input with the respective input unit 2204, and in accordance with a determination that the respective user profile is the active profile, the processing unit 2208 is configured to perform a first set of one or more operations associated with the requested operation in accordance with logging preferences of the respective user profile; and in accordance with a determination that the default profile is the active profile, the processing unit 2208 is configured to perform a second set of operations associated with the requested operation in accordance with logging preferences of the default profile.

In some embodiments, performing the first set of operations includes logging operations (e.g., performed with a logging operation unit 2216) of a first type of operation performed on the device; and performing the second set of operations includes forgoing logging operations of the first type of operation performed on the device that would have been logged in accordance with logging preferences of the respective user profile.

In some embodiments, the first type of operations include operations that are used by the device to customize operation of the device based on historical usage patterns of the device.

In some embodiments, performing the second set of operations includes logging operations of a second type of operation performed on the device (e.g., performed with the same logging operations unit 2216 or, alternatively, a different logging operations unit 2216 than the logging operations unit 2216 used for logging operations of the first set of operations); and performing the first set of operations includes forgoing logging operations of the second type of operation performed on the device that would have been logged in accordance with logging preferences of the default user profile.

In some embodiments, the second type of operation includes operations that assist in performing forensic operations associated with a lost or stolen device (e.g., with a GPS logging unit).

In some embodiments, the second type of operation includes operations that assist in locating the device (e.g., with a GPS logging unit).

In some embodiments, the processing unit 2208 is further configured to send to a remote server a log record that includes a representation of the logging operations of the second type of operation.

The operations in the information processing methods described above are optionally implemented by running one or more functional modules in information processing apparatus such as general purpose processors (e.g., as described above with respect to FIGS. 1A and 3) or application specific chips.

The operations described above with reference to FIGS. 21A-21B are, optionally, implemented by components depicted in FIGS. 1A-1B or FIG. 22. For example, detection operation 2102, edit determining operation 2104, and setting operation 2106 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub-event, such as selection of an object on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Performing a Respective Restricted Operation Based on Fingerprint-Verification Information Many electronic devices are enabled to perform a restricted operation in response to a user inputting a valid authorization credential (e.g., a password or a swipe pattern). Such devices, however, rely on the restricted operation comparing a previously stored authorization credential with the inputted authorization credential in order to validate the inputted authorization credential. The device described below improves on existing methods by generating fingerprint-verification information (e.g., indicative of a "no match," a "weak match" or a "strong match") for a respective fingerprint in accordance with system-level fingerprint-verification criteria. In turn, the device utilizes the pre-computed fingerprint-verification information to determine whether to perform the restricted operation.

The device obtains the fingerprint-verification criteria (e.g., indicating how many verified minutia points a fingerprint needs to be assigned a respective confidence level) for controlling verification of fingerprints. Then, the device determines fingerprint-verification information for a respective input corresponding to a respective restricted operation based at least in part on: a comparison between identified fingerprint features of the respective input and fingerprint features of one or more previously registered fingerprints; and the fingerprint-verification criteria. The device only performs the respective restricted operation in accordance with a determination that the fingerprint-verification information meets operation-specific (or application-specific) authorization criteria for the respective restricted operation.

In some embodiments, the device is an electronic device with a separate display (e.g., display 450) and a separate touch-sensitive surface (e.g., touch-sensitive surface 451). In some embodiments, the device is portable multifunction device 100, the display is touch screen 112, and the touch-sensitive surface includes tactile output generators 167 on the display (FIG. 1A). The device described below with reference to FIGS. 23A-23G and 24A-24D includes one or more fingerprint sensors 169. In some embodiments, the one or more fingerprint sensors include one or more integrated fingerprint sensors 359-1 (FIG. 4B) that are integrated in to the touch-sensitive surface (e.g., separate touch-sensitive surface 451 or touch sensitive display system 112). In some embodiments, the one or more fingerprint sensors include separate fingerprint sensors 359-2 (FIG. 4B) that are separate from the touch-sensitive surface (e.g., separate touch-sensitive surface 451 or touch sensitive display system 112). Unless specified otherwise, a fingerprint sensor 169 described below is, optionally, either an integrated fingerprint sensor 359-1 or a separate fingerprint sensor 359-2, depending on the configuration of the hardware and software of the device that includes the fingerprint sensor 169. For convenience of explanation, the embodiments described with reference to FIGS. 23A-23G and 24A-24D will be discussed with reference to touch screen 112 and fingerprint sensor 169 (e.g., an integrated fingerprint sensor 359-1 or a separate fingerprint sensor 359-2); in such embodiments, the focus selector is, optionally: a respective contact, a representative point corresponding to a contact (e.g., a centroid of a respective contact or a point associated with a respective contact), or a centroid of two or more contacts detected on the touch screen 112, in place of a cursor. Analogous operations are, optionally, performed on a device with display 450, a separate touch-sensitive surface 451, and an integrated fingerprint sensor 359-1 or a separate fingerprint sensor 359-2 in response to detecting the inputs described in FIGS. 23A-23G on the integrated fingerprint sensor 359-1 or separate fingerprint sensor 359-2, while displaying the user interfaces shown in FIGS. 23A-23G on the display 450.

Figure 23A:
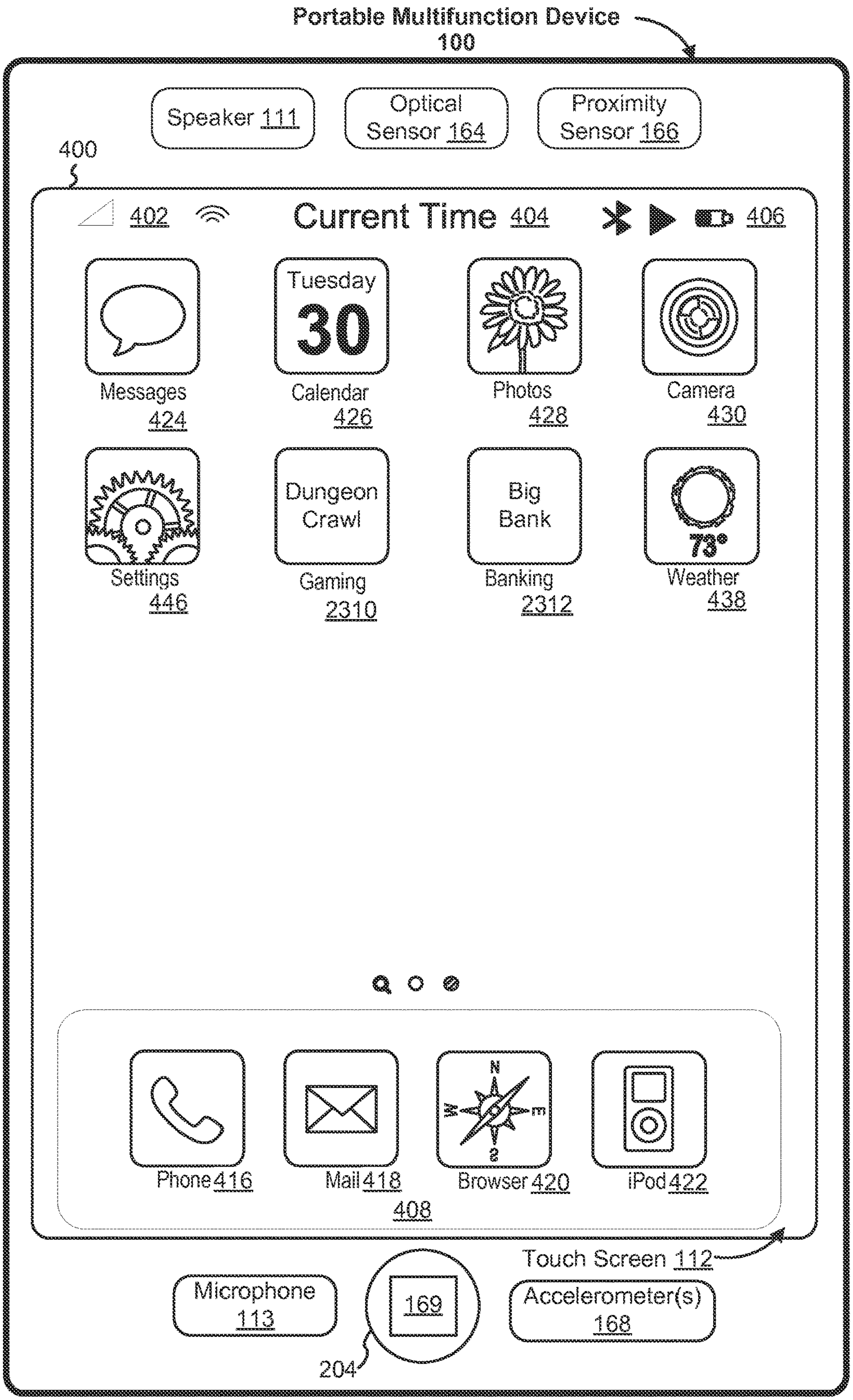
FIGS. 23A-23G illustrate exemplary user interfaces for performing a respective restricted operation based on fingerprint-verification information in accordance with some embodiments.

FIG. 23A illustrates portable multifunction device 100 displaying a user interface 400 on touch screen 112 with a plurality of applications including gaming application 2310 and banking application 2312. FIG. 23A further illustrates home button 204 with fingerprint sensor 169 (e.g., separate fingerprint sensor 359-2) integrated into home button 204. Alternatively or additionally, in some embodiments, a fingerprint sensor is integrated into at least a portion of touch screen 112 (e.g., integrated fingerprint sensor 359-1).

Figure 23B:

FIG. 23B illustrates portable multifunction device 100 detecting a user input 2302 over banking application 2312 of user interface 400 on touch screen 112. User input 2302, for example, is a user's right index finger. Access to banking application 2312, for example, is a restricted operation.

In some embodiments, portable multifunction device 100 identifies fingerprint features of user input 2302 while user input 2302 is over banking application 2312 on touch screen 112 via a fingerprint sensor integrated with at least a portion of touch screen 112 (e.g., integrated fingerprint sensor 359-1). Portable multifunction device 100, for example, identifies minutia points of user input 2302, including fingerprint endings, fingerprint ridge bifurcations and short fingerprint ridges. Furthermore, portable multifunction device 100 determines fingerprint-verification information for respective user input 2302 based at least in part on: a comparison between the fingerprint features of the user input 2302 and fingerprint features of one or more previously registered fingerprints; and fingerprint-verification criteria.

In some embodiments, the fingerprint-verification criteria specifies a plurality of classifications (or confidence values) for a detected fingerprint based on a percentage of matching minutia points in relation to one or more previously registered fingerprints. For example, user input 2302 is classified into one of three classifications (or confidence values) according to the fingerprint-verification criteria. In this example, the fingerprint-verification information indicates that user input 2302 is a "no match" if 30% or fewer of the detected fingerprint's minutia points match, a "weak match" if more than 30% and less than 70% of the detected fingerprint's minutia points match, or a "strong match" if more than 70% of the detected fingerprint's minutia points match. In some embodiments, a user is enabled to modify the fingerprint-verification criteria by, for example, modifying one or more of the above percentage values relating to a respective one of the three classifications.

In some embodiments, portable multifunction device 100 is not configured to identify fingerprint features of user input 2302 while user input 2302 is on touch screen 112. In other words, portable multifunction device 100 does not have a fingerprint sensor integrated with touch screen 112 (e.g., integrated fingerprint sensor 359-1). In response to detecting user input 2302 over banking application 2312 (e.g., a restricted operation) on touch screen 112, portable multifunction device 100 prompts the user to provide a fingerprint on a dedicated fingerprint sensor 169 (e.g., separate fingerprint sensor 359-2) integrated with home button 204.

Figure 23C:
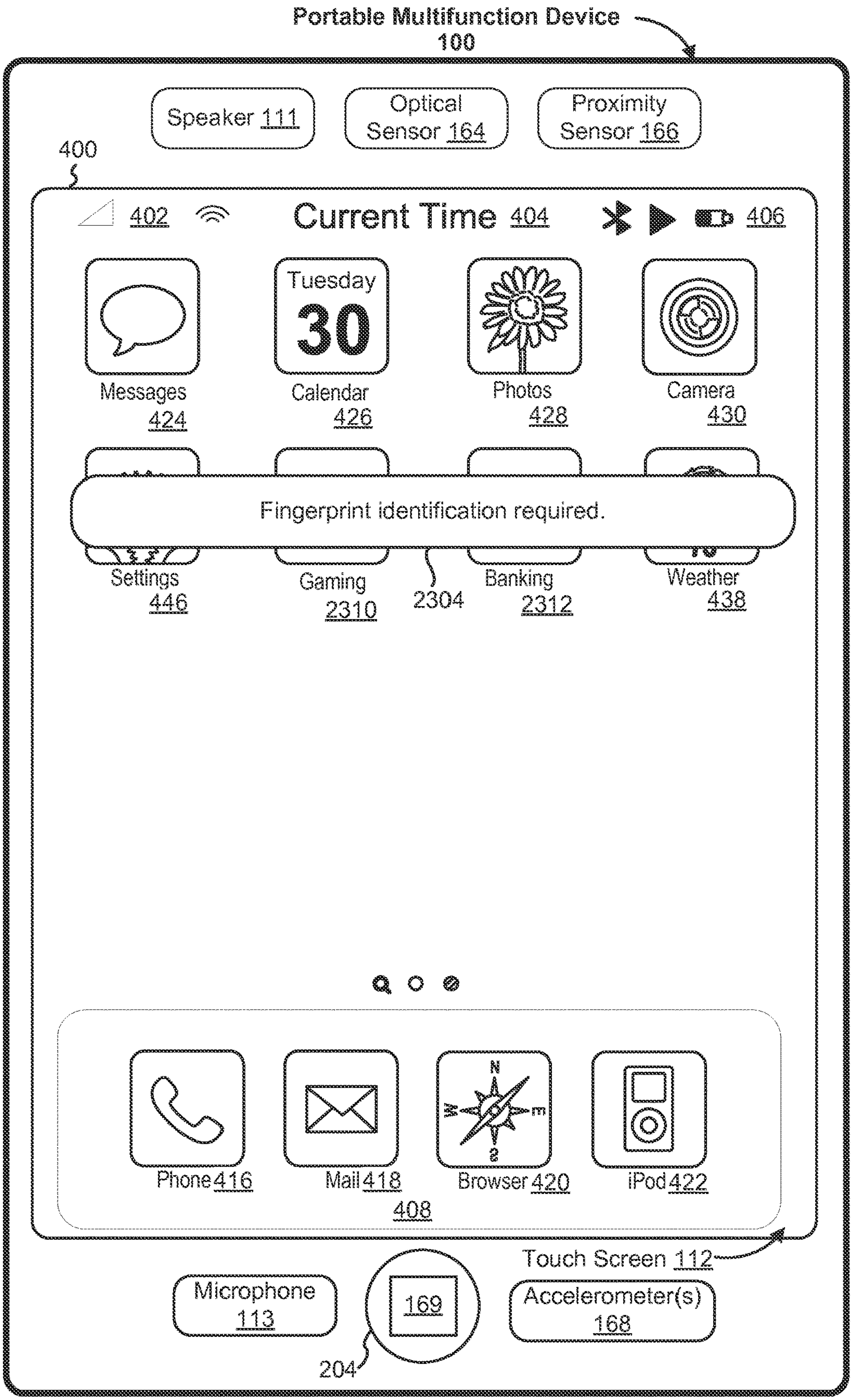

FIG. 23C illustrates portable multifunction device 100 prompting the user to provide a fingerprint on dedicated fingerprint sensor 169 integrated with home button 204, in response to detecting input 2302 over banking application 2312 (e.g., a restricted operation) on touch screen 112 in FIG. 23B. FIG. 23C illustrates text box 2304 displayed on user interface 400 of touch screen 112 indicating that fingerprint identification is required for access to banking application 2312.

Figure 23D:
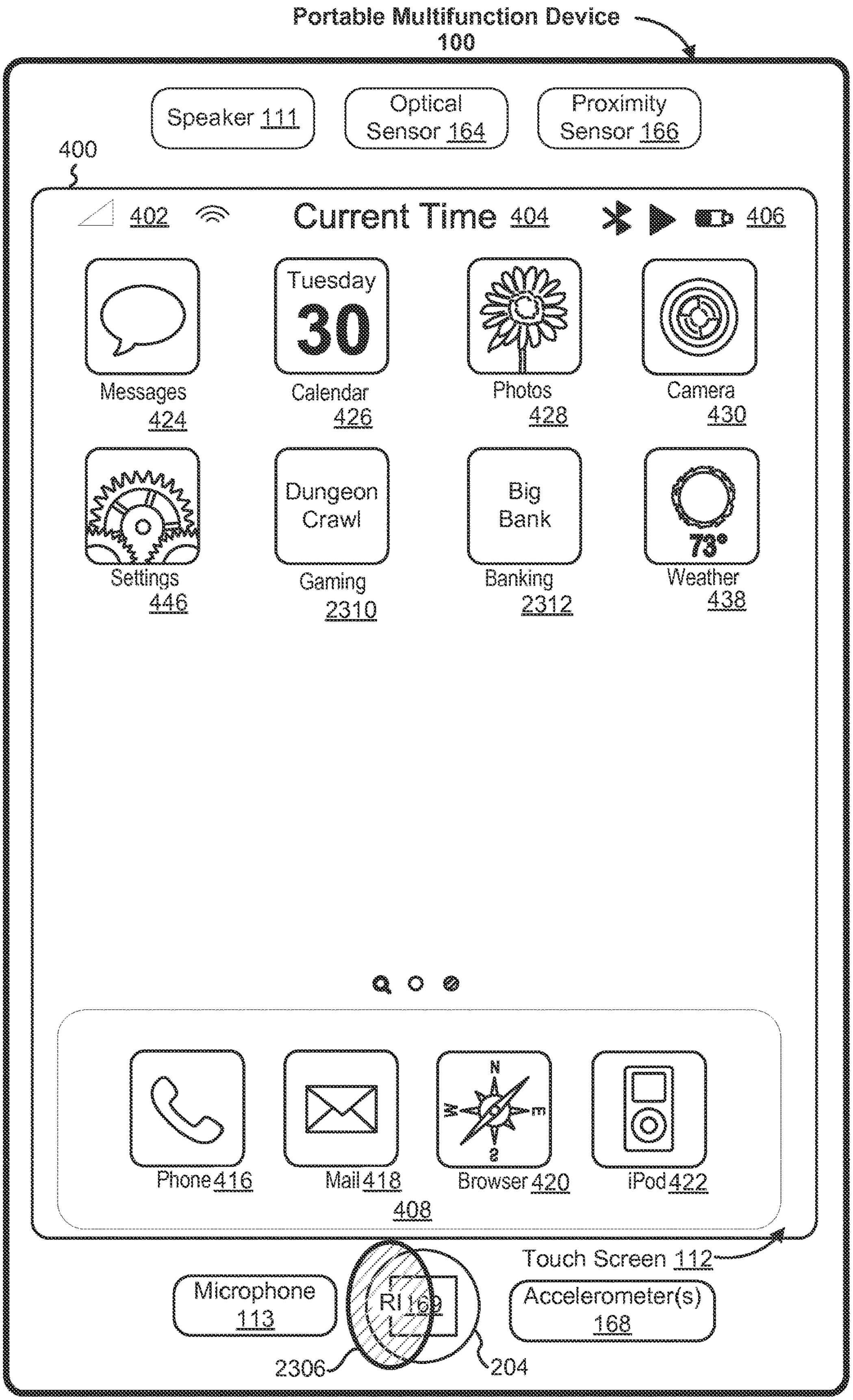

FIG. 23D illustrates portable multifunction device 100 detecting a user input 2306 over fingerprint sensor 169 integrated with home button 204, in response to the prompt in FIG. 23C. User input 2306, for example, is a user's right index finger. Fingerprint sensor 169 identifies fingerprint features of user input 2306 and determines fingerprint-verification information for the respective input based at least in part on: a comparison between the fingerprint features of respective input 2306 and fingerprint features of one or more previously registered fingerprints; and fingerprint-verification criteria.

Figure 23E:
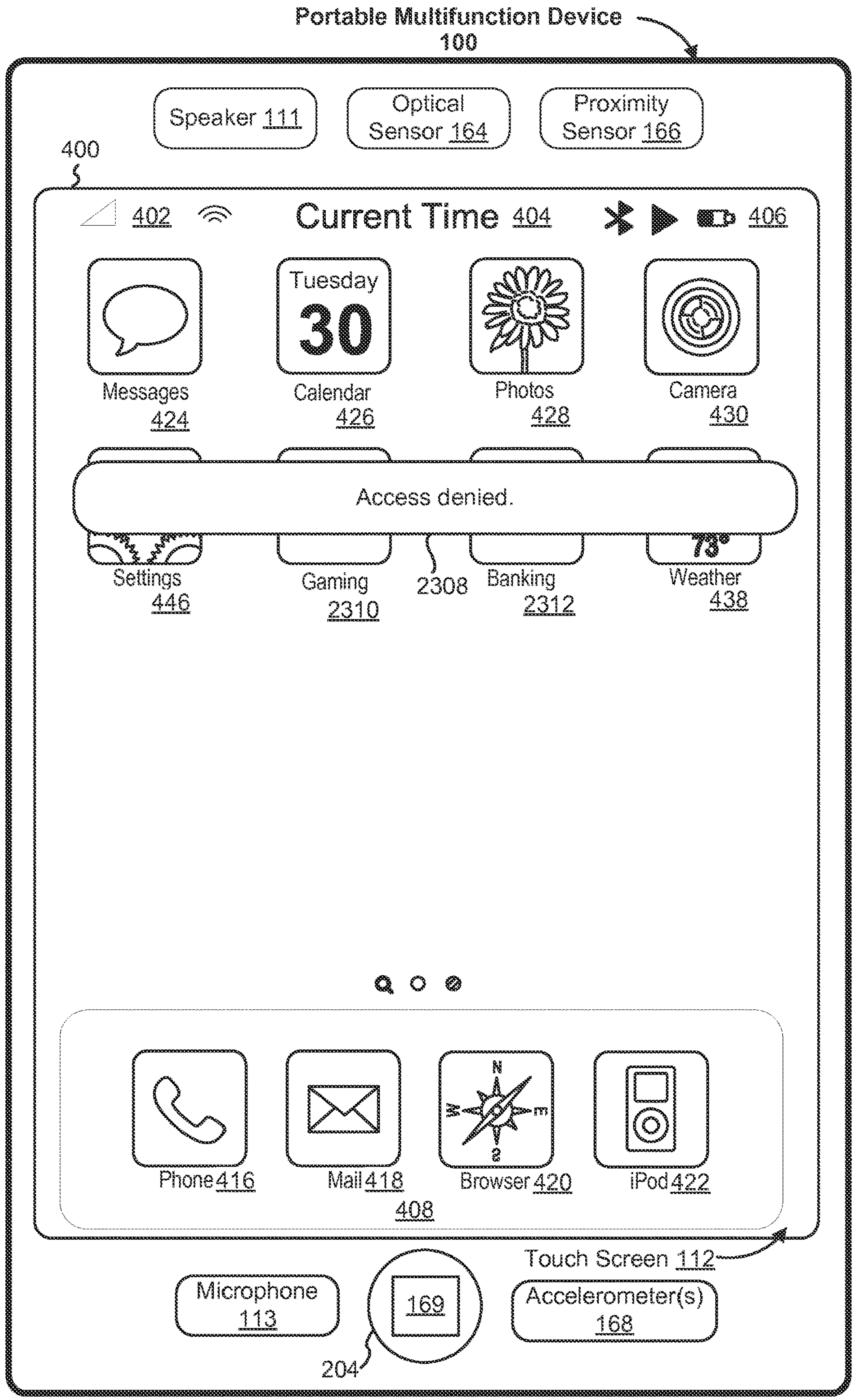

FIG. 23E illustrates text box 2308 displayed on user interface 400 of touch screen 112 indicating that the device is forgoing performing a respective restricted operation (e.g., denying access to banking application 2312), in response to detecting user input 2302 in FIG. 23B, or user input 2306 in FIG. 23D, and in accordance with a determination that the respective fingerprint-verification information does not meet respective authorization criteria for the respective restricted operation (e.g., operation-specific criteria set by banking application 2312). For example, banking application 2312's authorization criteria requires a "strong match" to access banking application 2312 (e.g., a secured application), and the fingerprint-verification information corresponding to user input 2302 in FIG. 23B, or user input 2306 in FIG. 23D, indicates a "weak match." In contrast, gaming application 2310's authorization criteria requires only a "weak match" to access gaming application 2310 (e.g., an unsecured application). In this example, access to banking application 2312 is denied because the respective fingerprint-verification information does not meet banking application 2312's authorization criteria.

Figure 23F:
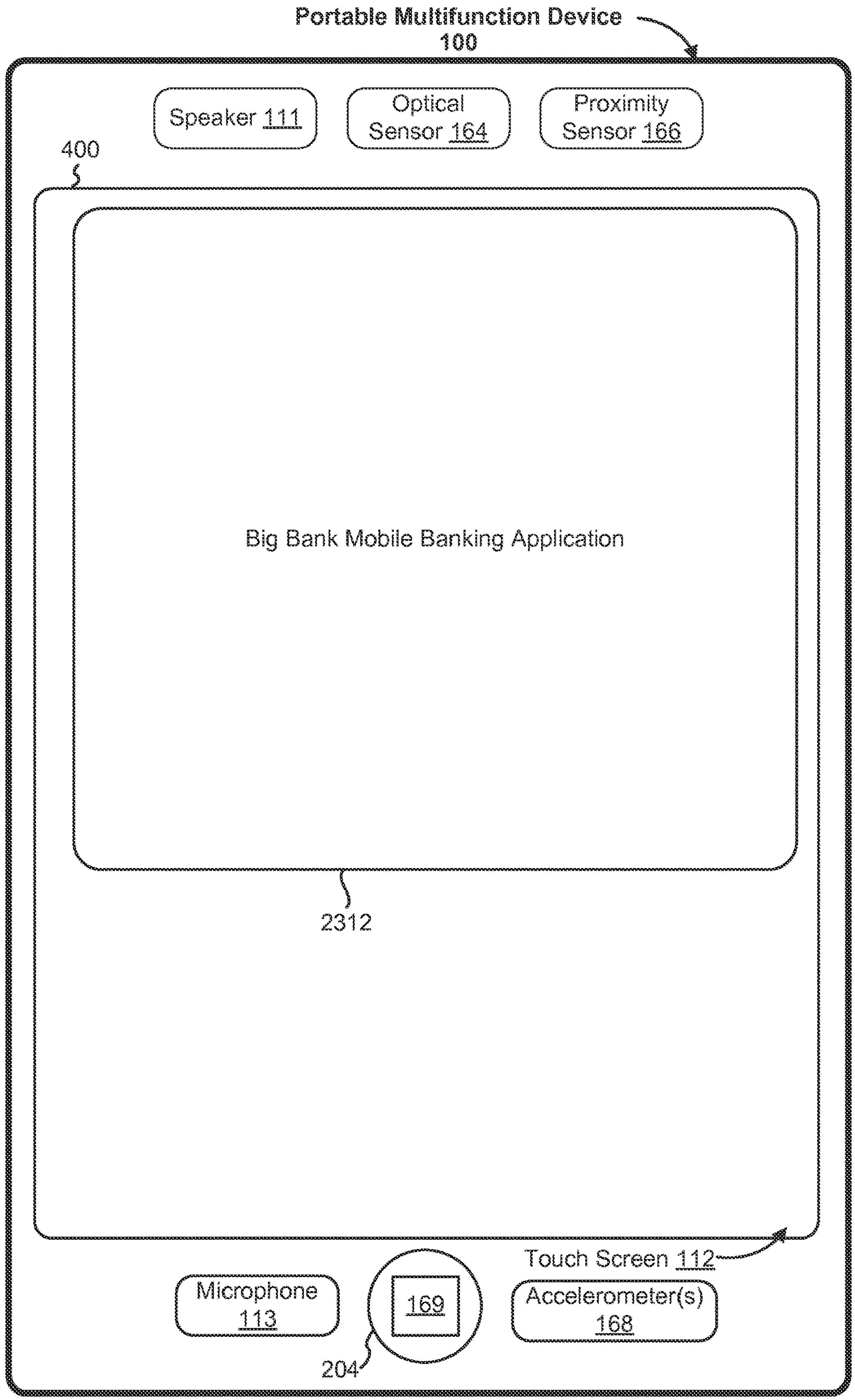

FIG. 23F illustrates performing a respective restricted operation (e.g., granting access to and displaying banking application 2312) in response to detecting user input 2302 in FIG. 23B, or user input 2306 in FIG. 23D, and in accordance with a determination that the respective fingerprint-verification information meets respective authorization criteria for the respective restricted operation. For example, banking application 2312's authorization criteria requires a "strong match" to access banking application 2312, and the fingerprint-verification information corresponding to user input 2302 in FIG. 23B, or user input 2306 in FIG. 23D, indicates a "strong match." In this example, access to banking application 2312 is granted and banking application 2312 is displayed on user interface 400 of touch screen 112 because the respective fingerprint-verification information meets banking application 2312's authorization criteria.

Figure 23G:
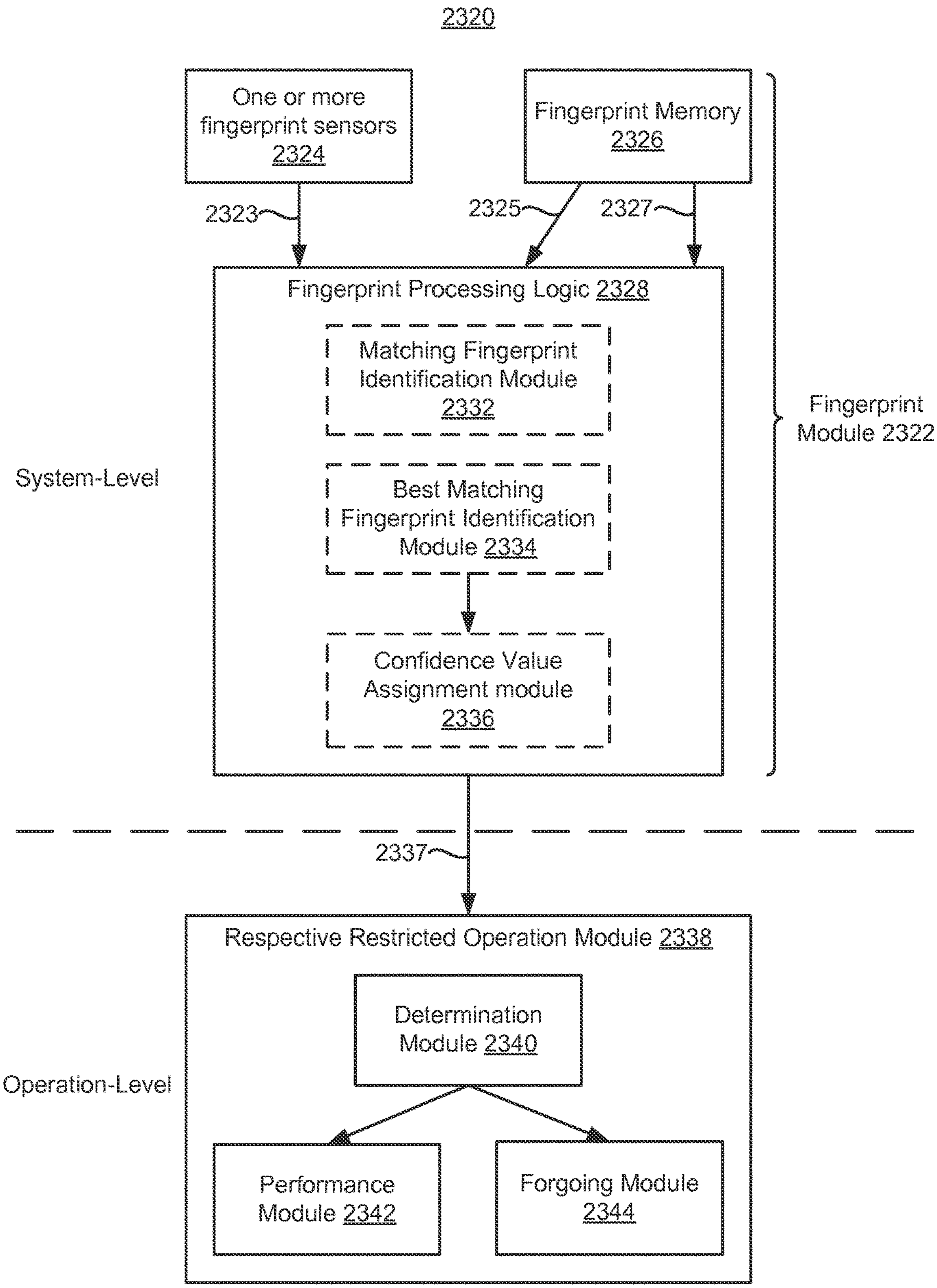
Figure 24A:
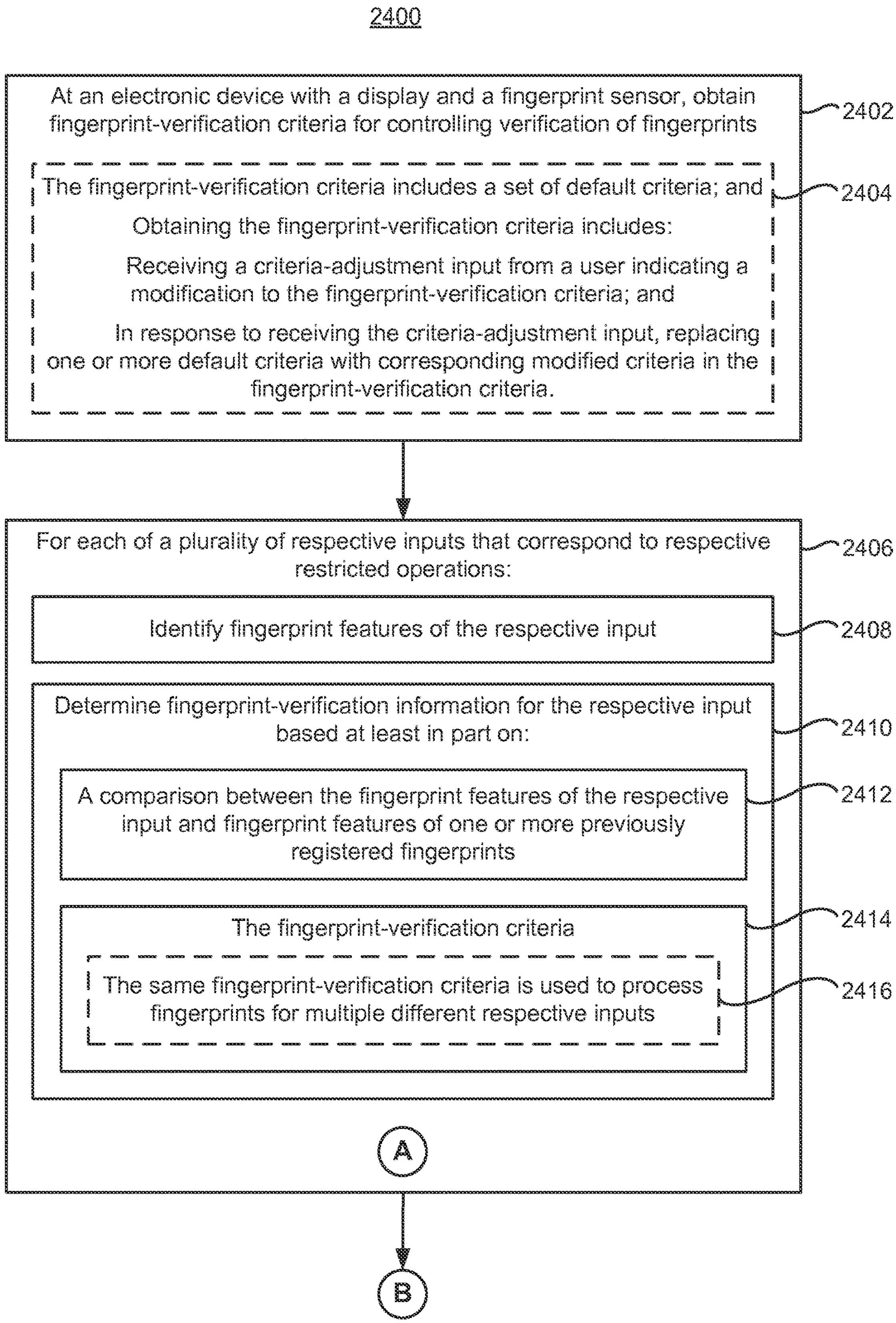
FIGS. 24A-24D are flow diagrams illustrating a method of performing a respective restricted operation based on fingerprint-verification information in accordance with some embodiments.
Figure 24B:
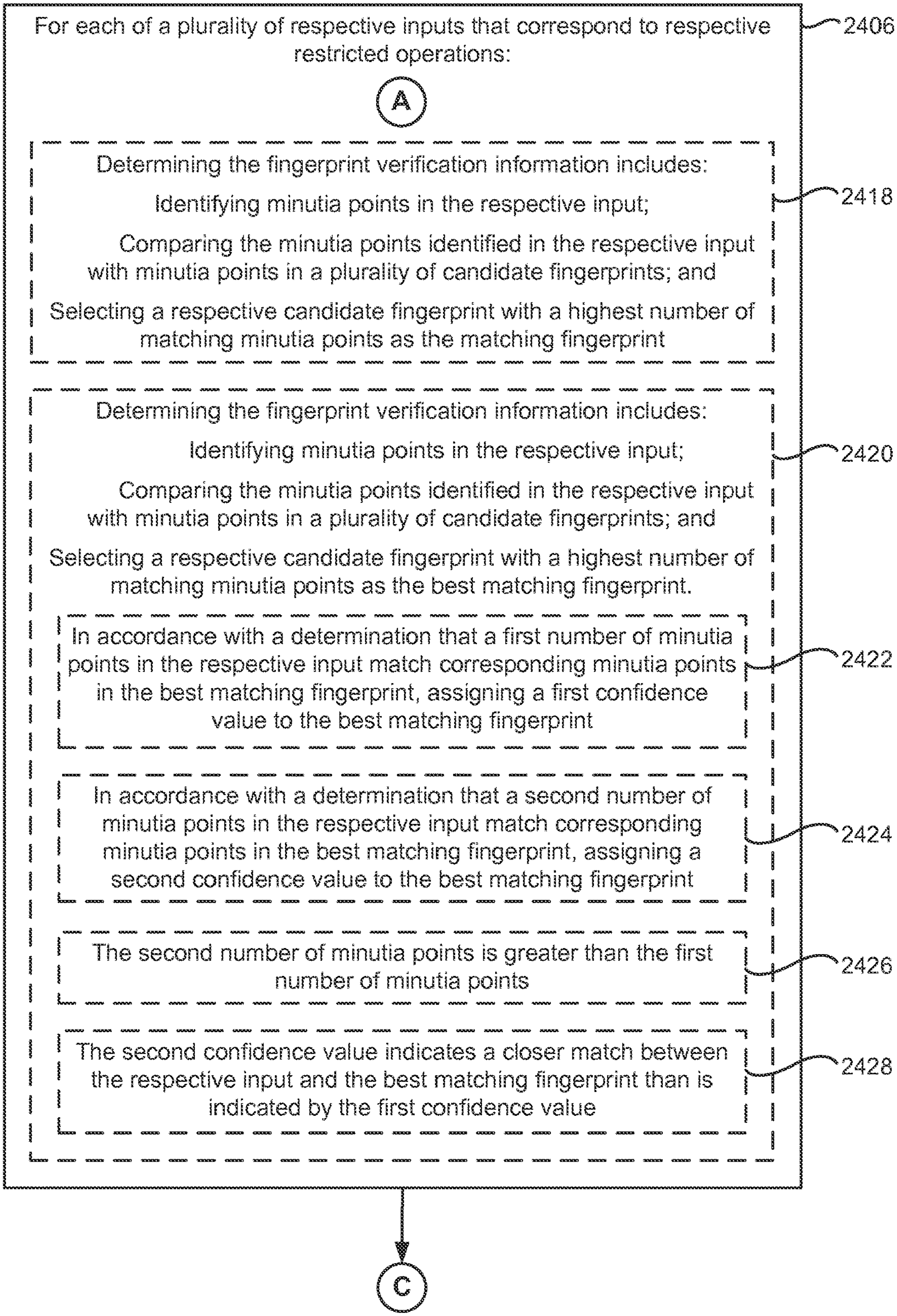
Figure 24C:
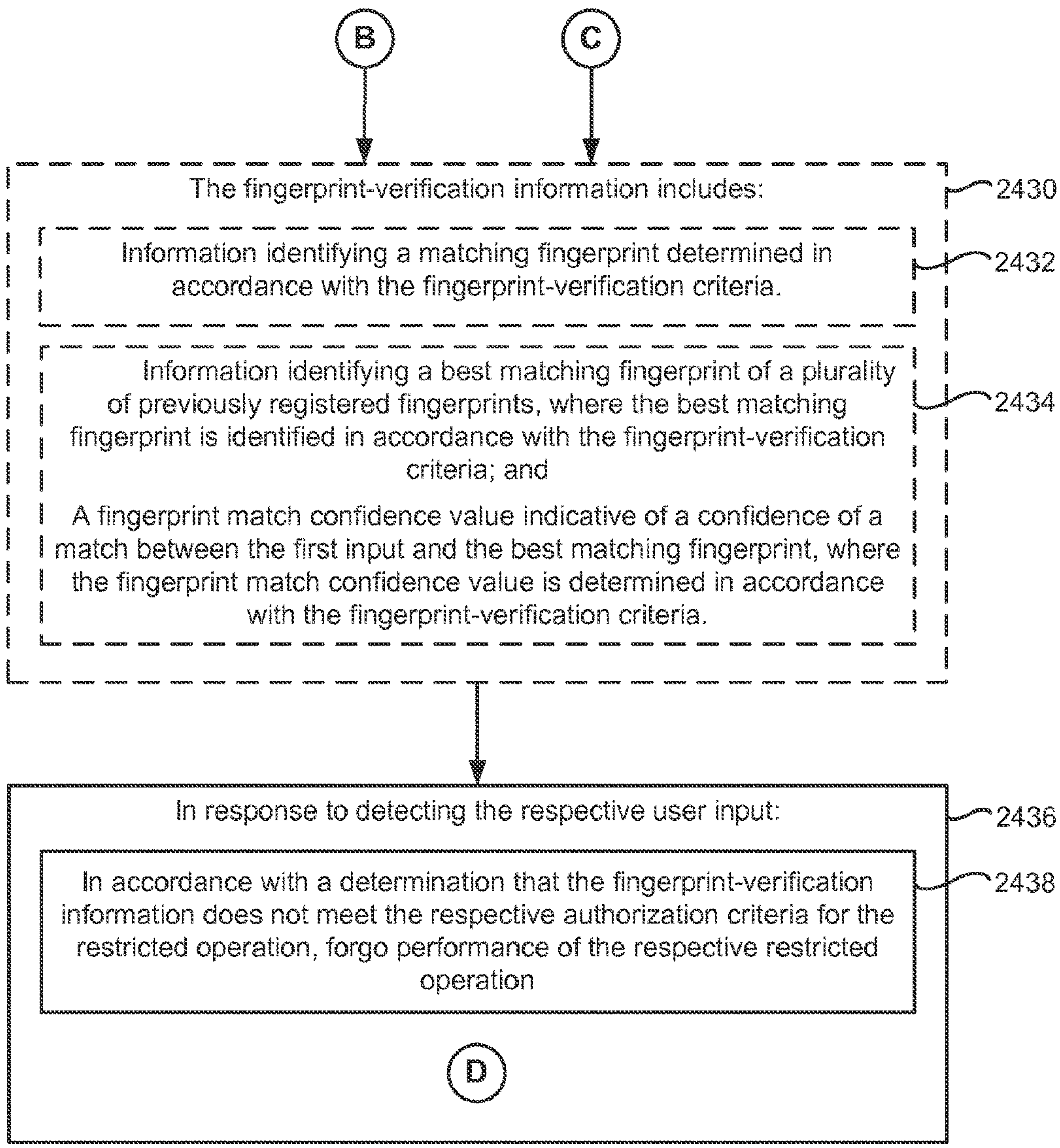
Figure 24D:
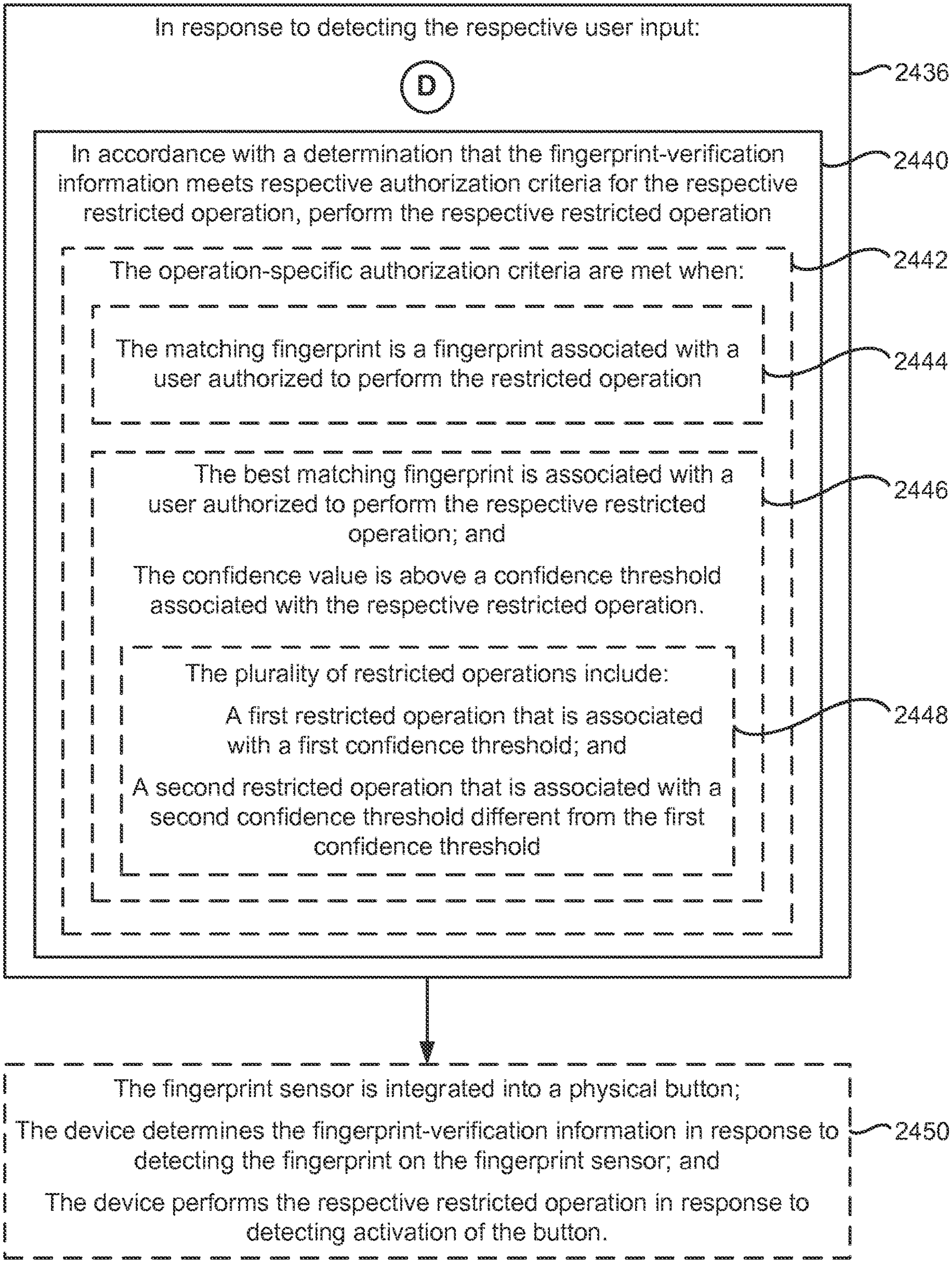

FIG. 23G illustrates a schematic diagram of a process 2320 for performing a respective restricted operation based on fingerprint-verification information in accordance with some embodiments. In some embodiments, process 2320 is performed at a portable multifunction device 100 or a component of portable multifunction device 100. In some embodiments, at least a portion of process 2320 is performed at a component of portable multifunction device 100. For example, a fingerprint module 2322 is a component of portable multifunction device 100, and fingerprint module 2322 includes one or more fingerprint sensors 2324 (e.g., including an integrated fingerprint sensor 359-1 and/or a separate fingerprint sensor 359-2), a fingerprint memory 2326 and fingerprint processing logic 2328 coupled to one or more fingerprint sensors 2324 via line 2323 and fingerprint memory 2326 via lines 2325 and 2327.

One or more fingerprint sensors 2324 are configured to identify fingerprint features of a respective input. Fingerprint memory 2326 is configured to store fingerprint features of one or more previously registered fingerprints. In some embodiments, fingerprint memory 2326 is further configured to also store fingerprint-verification criteria. Fingerprint processing logic 2328 is configured to determine fingerprint-verification information based at least in part on: fingerprint-verification criteria obtained from fingerprint memory 2326 via line 2325; and a comparison of the fingerprint features of the respective input obtained from one or more fingerprint sensors 2324 via line 2323 and fingerprint features of one or more previously registered fingerprints obtained from fingerprint memory 2326 via line 2327. Fingerprint processing logic 2328 is further configured to provide the fingerprint-verification information via line 2337 to respective restricted operation module 2338. In some embodiments, fingerprint module 2322 consists of secured dedicated computing hardware that has additional security features so as to enhance security of the fingerprint-verification information.

In some embodiments, matching fingerprint identification module 2332 of fingerprint processing logic 2328 identifies a matching fingerprint in accordance with the fingerprint-verification criteria. In some embodiments, best matching fingerprint identification module 2332 of fingerprint processing logic 2328 identifies a best matching fingerprint in accordance with the fingerprint-verification criteria. Furthermore, in some embodiments, confidence assignment module 2336 assigns a match confidence value to the best matching fingerprint.

Respective restricted operation module 2338 (e.g., a banking application) obtains fingerprint-verification information via line 2337 from fingerprint processing logic 2328 and determines via determination module 2340 whether the fingerprint-verification information meets respective authorization criteria for the respective restricted operation. Performance module 2342 performs the restricted operation (e.g., grants access to the banking application) when that the fingerprint-verification information obtained from fingerprint processing logic 2328 meets the respective authorization criteria for the restricted operation. Forgoing module 2344 forgoes performance of the restricted operation (e.g., denies access to the banking application) when the fingerprint-verification information obtained from fingerprint processing logic 2328 does not meet the respective authorization criteria for the restricted operation.

FIGS. 24A-24D are flow diagrams illustrating a method 2400 of performing a respective restricted operation based on fingerprint-verification information in accordance with some embodiments. The method 2400 is performed at an electronic device (e.g., device 300, FIG. 3, or portable multifunction device 100, FIG. 1A) with a display and a fingerprint sensor. In some embodiments, the display is a touch screen display and the fingerprint sensor is on the display. In some embodiments, the display is separate from the fingerprint sensor. Some operations in method 2400 are, optionally, combined and/or the order of some operations is, optionally, changed.

As described below, the method 2400 provides an intuitive way to perform a respective restricted operation based on fingerprint-verification information. The method reduces the cognitive burden on a user when performing a respective restricted operation based on fingerprint-verification information, thereby creating a more efficient human-machine interface. For battery-operated electronic devices, enabling a user to perform a respective restricted operation based on fingerprint-verification information faster and more efficiently conserves power and increases the time between battery charges.

The device obtains (2402) (e.g., retrieves from memory or receives from a remote computer system) or accesses (e.g., in memory or in one or more instructions of fingerprint module 2322) fingerprint-verification criteria for controlling (e.g., determining or generating) verification of fingerprints. For example, the fingerprint-verification criteria sets a number of minutia points of a fingerprint that need to be verified to determine that a detected fingerprint is a previously registered fingerprint and/or the fingerprint-verification criteria sets how many verified minutia points of a fingerprint need to be verified for the fingerprint to be assigned different confidence levels indicative of a confidence of the match between the detected fingerprint and the previously registered fingerprint. FIG. 23G, for example, shows fingerprint processing logic 2328 obtaining fingerprint-verification criteria from fingerprint memory 2326 via line 2325 for determining fingerprint-verification information.

In some embodiments, the fingerprint-verification criteria includes (2404) a set of default criteria; and obtaining the fingerprint-verification criteria includes: receiving a criteria-adjustment input from a user indicating a modification to the fingerprint-verification criteria; and in response to receiving the criteria-adjustment input, replacing one or more default criteria with corresponding modified criteria in the fingerprint-verification criteria. For example, while in a user-adjustable settings mode, the device receives a user input specifying the system-level verification criteria. In some embodiments, changing the fingerprint-verification criteria will change which fingerprints are matched with which inputs and/or the confidence level of the matches. Thus, in some embodiments, an input that would have matched with a first fingerprint at a first confidence level using the default fingerprint-verification criteria would instead match the first fingerprint at a second confidence level (different from the first confidence level) using the modified fingerprint-verification criteria.

In some circumstances, the fingerprint-verification criteria are adjusted so that a closer match between the respective input and a previously registered fingerprint is required to identify the respective input as matching the previously registered fingerprint or reach a particular confidence level that the respective input matches the previously registered fingerprint. For example, the user increases the security of the device by decreasing the likelihood of false positive matches in exchange for a corresponding increase in the likelihood of false negative matches. In some circumstances, the fingerprint-verification criteria are adjusted (e.g., by reducing a required confidence level for fingerprint matching) so that a less close match between the respective input and a previously registered fingerprint will be accepted to identify the respective input as matching the previously registered fingerprint. For example, the user decreases the security of the device by increasing in the likelihood of false positive matches in exchange for a corresponding decrease in the likelihood of false negative matches.

For each of a plurality of respective inputs that correspond (2406) to respective restricted operations, the device identifies (2408) fingerprint features of the respective input. FIG. 23D, for example, shows fingerprint sensor 169 integrated with home button 204 of portable multifunction device 100 identifying fingerprint features of user input 2306.

Furthermore, for each of a plurality of respective inputs that correspond (2406) to respective restricted operations, the device determines (2410) fingerprint-verification information for the respective input based at least in part on: a comparison (2412) between the fingerprint features of the respective input and fingerprint features of one or more previously registered fingerprints; and the fingerprint-verification criteria (2414). As one example, portable multifunction device 100 detects a fingerprint (e.g., user input 2306 in FIG. 23D) on the fingerprint sensor (e.g., fingerprint sensor 169 integrated with home button 204 in FIG. 23D), identifies features of the fingerprint, and compares the features of the fingerprint with features of previously registered fingerprints. In many circumstances a match between features of a detected fingerprint (e.g., user input 2306 in FIG. 23D) and a previously registered fingerprint will not be a perfect match (e.g., the detected fingerprint matches 5 out of 10 minutia points), and thus it is ambiguous whether or not the detected fingerprint matches the previously registered fingerprint. In order to resolve this ambiguity, the device optionally applies fingerprint-verification criteria to the results of the comparison between the features of the detected fingerprint and the features of the previously registered fingerprint. For example, the fingerprint-verification criteria specify that a detected fingerprint that matches 3 or fewer minutia points (30% or fewer) is classified as "not matching," while a detected fingerprint that matches between 4-6 minutia points (more than 30% and less than 70%) is classified as a "weak match," and a detected fingerprint that matches 7 or more minutia points (70% or more) is classified as a "strong match."

In some embodiments, the device uses (2416) the same fingerprint-verification criteria to process fingerprints for multiple different (e.g., sequential) respective inputs. For example, the fingerprint-verification criteria is system-level criteria or operation-independent criteria and is applied to a comparison between the detected fingerprint and the previously registered fingerprints to generate fingerprint-verification information without regard to the operation for which the fingerprint-verification information will be used.

In some embodiments, the device determines (2418) the fingerprint verification information by: identifying minutia points in the respective input; comparing the minutia points identified in the respective input with minutia points in a plurality of candidate fingerprints; and selecting a respective candidate fingerprint with a highest number of matching minutia points as the matching fingerprint. In some embodiments, the minutia points for a fingerprint include one or more of: fingerprint ridge endings, fingerprint ridge bifurcations, and short fingerprint ridges (sometimes called dots). A fingerprint ridge ending is a point at which a fingerprint ridge terminates. A fingerprint ridge bifurcation is a point at which a single fingerprint ridge splits into two fingerprint ridges. A short fingerprint ridge is a ridge that is significantly shorter than an average ridge length of a fingerprint ridge in the fingerprint. FIG. 23G, for example, shows matching fingerprint identification module 2332 configured to select a respective candidate fingerprint with a highest number of matching minutia points as the matching fingerprint.

In some embodiments, the device determines (2420) the fingerprint verification information by: identifying minutia points in the respective input; comparing the minutia points identified in the respective input with minutia points in a plurality of candidate fingerprints; and selecting a respective candidate fingerprint with a highest number of matching minutia points as the best matching fingerprint. FIG. 23G, for example, shows best matching fingerprint identification module 2334 configured to select a respective candidate fingerprint with a highest number of matching minutia points as the best matching fingerprint.

In some embodiments, the device assigns (2422) a first confidence value to the best matching fingerprint, in accordance with a determination that a first number of minutia points in the respective input match corresponding minutia points in the best matching fingerprint. The device further assigns (2424) a second confidence value to the best matching fingerprint, in accordance with a determination that a second number of minutia points in the respective input match corresponding minutia points in the best matching fingerprint. The second number of minutia points is greater (2426) than the first number of minutia points, and the second confidence value indicates (2428) a closer match between the respective input and the best matching fingerprint than is indicated by the first confidence value. FIG. 23G, for example, shows confidence value assignment module 2336 configured to assign a respective confidence value to the best matching fingerprint. In some embodiments, when a second number of minutia points in the respective input match corresponding minutia points in the best matching fingerprint, only the second confidence value is assigned to the best matching fingerprint.

In some embodiments, the fingerprint-verification information includes (2430) information identifying (2432) a matching fingerprint determined in accordance with the fingerprint-verification criteria. FIG. 23G, for example, shows matching fingerprint identification module 2332 configured to include information identifying a matching fingerprint in the fingerprint-verification information.

In some embodiments, the fingerprint-verification information includes (2430) information identifying (2434) a best matching fingerprint of a plurality of previously registered fingerprints, where the best matching fingerprint is identified in accordance with the fingerprint-verification criteria; and a fingerprint match confidence value indicative of a confidence of a match between the first input and the best matching fingerprint, where the fingerprint match confidence value is determined in accordance with the fingerprint-verification criteria. FIG. 23G, for example, shows best matching fingerprint identification module 2334 configured to include information identifying a best matching fingerprint and a match confidence value in the fingerprint-verification information.

In response to detecting (2436) the respective input, the device forgoes (2438) performance of the respective restricted operation, in accordance with a determination that the fingerprint-verification information does not meet the respective authorization criteria for the restricted operation (e.g., operation-specific authorization criteria). For example, the respective authorization criteria indicate which previously registered fingerprints are authorized to perform the respective restricted operation and optionally indicate a minimum confidence level that is to be met in order for the respective restricted operation to be performed. FIG. 23E, for example, shows portable multifunction device denying access to banking application 2312, in response to detecting user input 2302 on touch screen 112 in FIG. 23B, or user input 2306 on fingerprint sensor 169 in FIG. 23D, and in accordance with a determination that the fingerprint-verification information (e.g., generated in response to the detection of user input 2302 in FIG. 23B, or user input 2306 in FIG. 23D) does not meet the respective authorization criteria for banking application 2312.

In response to detecting (2436) the respective input, the device performs (2440) the respective restricted operation, in accordance with a determination that the fingerprint-verification information meets respective authorization criteria for the respective restricted operation. FIG. 23F, for example, shows portable multifunction device 100 granting access to and displaying banking application 2312 (e.g., the respective restricted operation), in response to detecting user input 2302 on touch screen 112 in FIG. 23B, or user input 2306 on fingerprint sensor 169 in FIG. 23D, and in accordance with a determination that the fingerprint-verification information (e.g., generated in response to the detection of user input 2302 in FIG. 23B, or user input 2306 in FIG. 23D) meets the respective authorization criteria for banking application 2312.

For example, after the detected fingerprint has been classified in accordance with the fingerprint-verification criteria, this fingerprint-verification information (e.g., "no match," "weak match" or "strong match") is passed to individual applications to handle in accordance with application-specific or operation-specific authorization criteria. For example in some circumstances, a non-secure application (e.g., an application that relies on the fingerprint-verification information only for user identification), such as gaming application 2310, uses authorization criteria that only requires a weak match, and thus gaming application 2310 will accept the detected fingerprint as a first fingerprint if the detected fingerprint is classified as either a "weak match" or a "strong match" for the first fingerprint (e.g., in accordance with the fingerprint-verification criteria). In contrast, in some circumstances, a secure application (e.g., an application that relies on the fingerprint-verification information to determine whether or not to permit access to sensitive information), such as banking application 2312, uses authorization criteria that requires a strong match, and thus banking application 2312 will only accept the detected fingerprint as a first fingerprint if the detected fingerprint is classified as a "strong match" for the first fingerprint (e.g., in accordance with the fingerprint-verification criteria).

In the example above, gaming application 2310 and banking application 2312 both rely on the pre-computed fingerprint-verification information (e.g., "no match," "weak match" or "strong match") generated in accordance with the fingerprint-verification criteria rather than comparing the detected fingerprint and the previously registered fingerprints directly. As a preliminary matter, performing the comparison process once and providing the pre-computed fingerprint-verification information to multiple applications or processes can substantially decrease the computing resources used by device 100, thereby increasing the energy efficiency, battery life, and responsiveness of device 100. Additionally, having the different applications and processes use the pre-computed fingerprint-verification information enables device 100 or the user to easily adjust the security of multiple fingerprint sensitive operations or applications quickly and efficiently by adjusting the fingerprint-verification criteria.

For example, device 100 can adjust the fingerprint-verification criteria by increasing the number (or percentage) of minutia point matches needed for a "strong match" of a detected fingerprint with a previously registered fingerprint (e.g., without changing the authorization information for one or more operations or applications), so as to strengthen security of secure applications (e.g., banking application 2312) without affecting the ease of use of non-secure applications (e.g., gaming application 2310). Similarly, device 100 can adjust the fingerprint-verification criteria by decreasing the number (or percentage) of minutia point matches needed for a "strong match" and/or a "weak match" (e.g., without changing the authorization information for one or more operations or applications), so as to decrease the incidence of false negative matches (e.g., the user may choose to accept weaker security if the device repeatedly fails to correctly identify the user's fingerprints).

In some embodiments, the operation-specific criteria are met (2442) when the matching fingerprint is (2444) a fingerprint associated with a user authorized to perform the restricted operation. For example, the matching fingerprint is associated with the user profile of the user who logged into (or unlocked) portable multifunction device 100. In some embodiments, the operation-specific criteria are met (2442) when the best matching fingerprint is (2446) associated with a user authorized to perform the respective restricted operation, and the confidence value is above a confidence threshold associated with the respective restricted operation.

In some embodiments, the plurality of restricted operations include (2448): a first restricted operation that is associated with a first confidence threshold; and a second restricted operation that is associated with a second confidence threshold different from the first confidence threshold. Thus, in some embodiments, where the first input includes fingerprint features that match the best matched fingerprint with a confidence value that is above the first confidence threshold and below the second confidence threshold, the first input would enable the user to perform the first restricted operation but would not enable the user to perform the second restricted operation. For example, a confidence threshold for identifying a user for making electronic payments via banking application 2312 is higher than the confidence threshold for identifying a user for gaming application 2310. Thus a quick, low resolution scan of a user's fingerprint would suffice for identifying the user for gaming application 2310, while a more careful, high resolution scan of the user's fingerprint is, optionally, required to authorize an electronic payment via banking application 2312 for the user.

In some embodiments, the fingerprint sensor is integrated (2450) into a physical button; in response to detecting the fingerprint on the fingerprint sensor, the device determines the fingerprint-verification information; and in response to detecting activation of the button, the device performs the respective restricted operation. In some embodiments, the physical button is an intensity-sensitive region of the housing of the device that is determined to have been activated by the device when the intensity detected on the button is increased over an activation intensity threshold. In some embodiments, the physical button is coupled to an electronic switch where movement of the physical button along a first axis (e.g., up and down or left to right) closes the switch and activates the physical button (sometimes resulting in an audible or tactile "click"). FIG. 23D, for example, shows fingerprint sensor 169 integrated with home button 204. In response to detecting input 2306 on fingerprint sensor 169 in FIG. 23D, for example, portable multifunction device 100 determines fingerprint-verification information corresponding to input 2306. And further, in response to detecting activation of home button 204 (e.g., downward movement of button 204 in FIG. 23D), portable multifunction device 100 grants access to banking application 2312 and displays banking application 2312 in FIG. 23F.

It should be understood that the particular order in which the operations in FIGS. 24A-24D have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., those methods described above) are also applicable in an analogous manner to method 2400 described above with respect to FIGS. 24A-24D. For example, the inputs fingerprints, contacts described above with reference to method 2400 optionally have one or more of the characteristics of the inputs fingerprints, contacts described herein with reference to other methods described herein (e.g., those methods described above). For brevity, these details are not repeated here.

Figure 25:
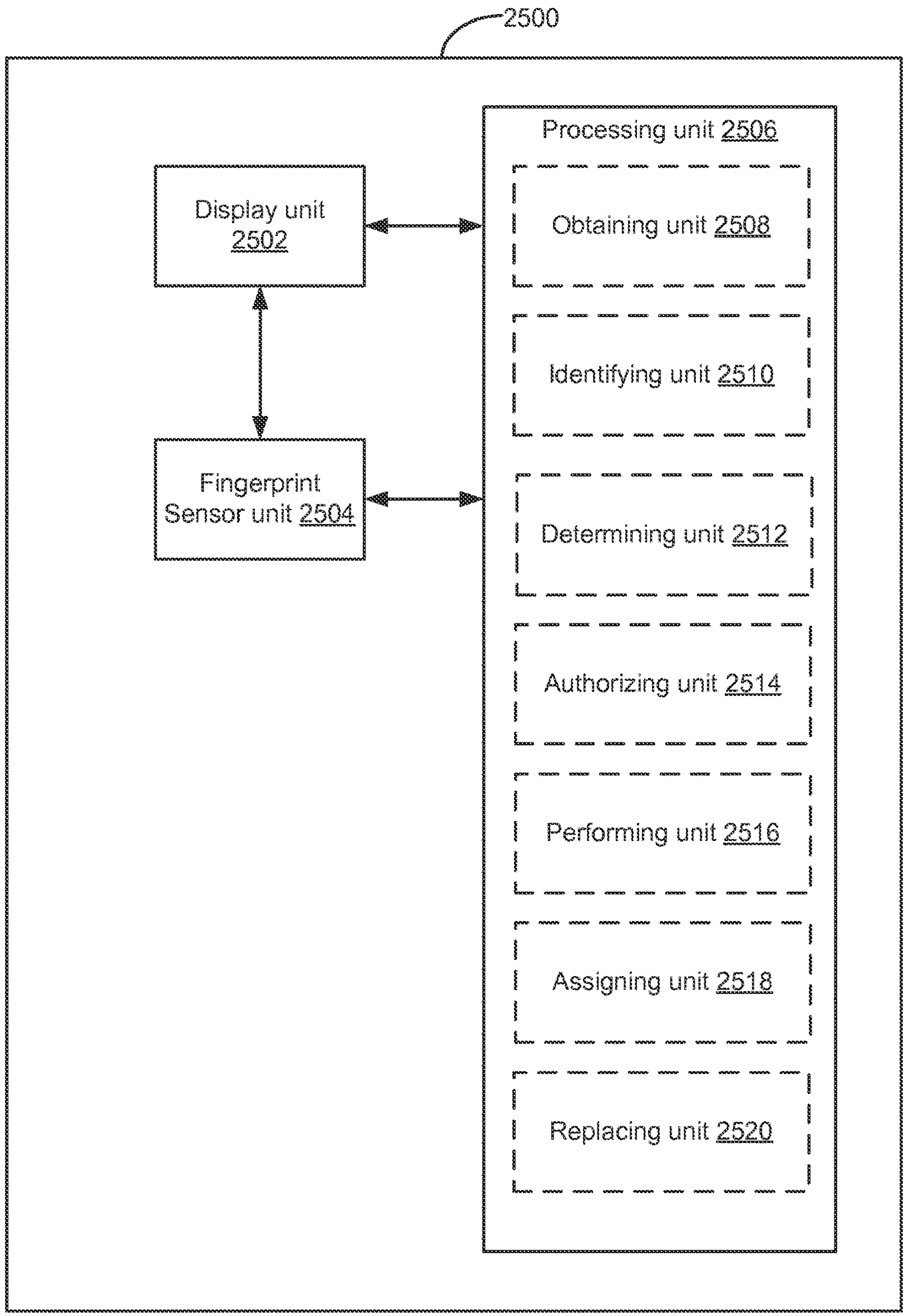
FIG. 25 is a functional block diagram of an electronic device in accordance with some embodiments.

In accordance with some embodiments, FIG. 25 shows a functional block diagram of an electronic device 2500 configured in accordance with the principles of the various described embodiments. The functional blocks of the device are, optionally, implemented by hardware, software, or a combination of hardware and software to carry out the principles of the various described embodiments. It is understood by persons of skill in the art that the functional blocks described in FIG. 25 are, optionally, combined or separated into sub-blocks to implement the principles of the various described embodiments. Therefore, the description herein optionally supports any possible combination or separation or further definition of the functional blocks described herein.

As shown in FIG. 25, an electronic device 2500 includes a display unit 2502 configured to display one or more user interface objects, a fingerprint sensor unit 2504; and a processing unit 2506 coupled to the display unit 2502 and the fingerprint sensor unit 2504. In some embodiments, the processing unit 2506 includes an obtaining unit 2508, an identifying unit 2510, a determining unit 2512, an authorizing unit 2514, a performing unit 2516, an assigning unit 2518 and a replacing unit 2520.

The processing unit 2506 is configured to obtain (e.g., with obtaining unit 2508) or otherwise access fingerprint-verification criteria for controlling verification of fingerprints. For each of a plurality of respective inputs that correspond to respective restricted operations, the processing unit 2506 is further configured to identify (e.g., with identifying unit 2510) fingerprint features of the respective input and determine (e.g., with determining unit 2512) fingerprint-verification information for the respective input based at least in part on: a comparison between the fingerprint features of the respective input and fingerprint features of one or more previously registered fingerprints; and the fingerprint-verification criteria. In response to detecting the respective input, the processing unit 2506 is configured to: in accordance with a determination (e.g., with authorizing unit 2514) that the fingerprint-verification information meets respective authorization criteria for the respective restricted operation, perform (e.g., with performing unit 2516) the respective restricted operation; and in accordance with a determination (e.g., with authorizing unit 2514) that the fingerprint-verification information does not meet the respective authorization criteria for the restricted operation, forgo performance of the respective restricted operation.

In some embodiments, the same fingerprint-verification criteria is used to process fingerprints for multiple different respective inputs.

In some embodiments, the fingerprint-verification information includes information identifying a matching fingerprint determined in accordance with the fingerprint-verification criteria.

In some embodiments, the operation-specific authorization criteria are met when the matching fingerprint is a fingerprint associated with a user authorized to perform the restricted operation.

In some embodiments, the processing unit is configured to determine the fingerprint verification information by: identifying (e.g., with identifying unit 2510) minutia points in the respective input; comparing (e.g., with determining unit 2512) the minutia points identified in the respective input with minutia points in a plurality of candidate fingerprints; and selecting (e.g., with determining unit 2512) a respective candidate fingerprint with a highest number of matching minutia points as the matching fingerprint.

In some embodiments, the fingerprint-verification information includes: information identifying a best matching fingerprint of a plurality of previously registered fingerprints, where the best matching fingerprint is identified in accordance with the fingerprint-verification criteria; and a fingerprint match confidence value indicative of a confidence of a match between the first input and the best matching fingerprint, where the fingerprint match confidence value is determined in accordance with the fingerprint-verification criteria.

In some embodiments, the operation-specific authorization criteria are met when: the best matching fingerprint is associated with a user authorized to perform the respective restricted operation; and the confidence value is above a confidence threshold associated with the respective restricted operation.

In some embodiments, the plurality of restricted operations include: a first restricted operation that is associated with a first confidence threshold; and a second restricted operation that is associated with a second confidence threshold different from the first confidence threshold.

In some embodiments, the processing unit is configured to determine the fingerprint verification information by: identifying (e.g., with identifying unit 2510) minutia points in the respective input; comparing (e.g., with determining unit 2512) the minutia points identified in the respective input with minutia points in a plurality of candidate fingerprints; and selecting (e.g., with determining unit 2512) a respective candidate fingerprint with a highest number of matching minutia points as the best matching fingerprint.

In some embodiments, the processing unit is configured to: in accordance with a determination that a first number of minutia points in the respective input match corresponding minutia points in the best matching fingerprint, assign (e.g., with assigning unit 2518) a first confidence value to the best matching fingerprint; and in accordance with a determination that a second number of minutia points in the respective input match corresponding minutia points in the best matching fingerprint, assign (e.g., with assigning unit 2518) a second confidence value to the best matching fingerprint, where: the second number of minutia points is greater than the first number of minutia points; and the second confidence value indicates a closer match between the respective input and the best matching fingerprint than is indicated by the first confidence value.

In some embodiments, the fingerprint-verification criteria includes a set of default criteria; and the processing unit 2506 is configured to obtain (e.g., with obtaining unit 2508) the fingerprint-verification criteria by: receiving (e.g., with obtaining unit 2508) a criteria-adjustment input from a user indicating a modification to the fingerprint-verification criteria; and in response to receiving the criteria-adjustment input, replacing (e.g., with replacing unit 2520) one or more default criteria with corresponding modified criteria in the fingerprint-verification criteria.

In some embodiments, the fingerprint sensor unit 2504 is integrated into a physical button; the processing unit 2506 is configured to determine (e.g., with determining unit 2512) the fingerprint-verification information in response to detecting the fingerprint on the fingerprint sensor unit 2504; and the processing unit 2506 is configured to perform (e.g., with the performing unit 2516) the respective restricted operation in response to detecting activation of the button.

The operations in the information processing methods described above are, optionally implemented by running one or more functional modules in information processing apparatus such as general purpose processors (e.g., as described above with respect to FIGS. 1A and 3) or application specific chips.

The operations described above with reference to FIGS. 24A-24D are, optionally, implemented by components depicted in FIGS. 1A-1B or FIG. 25. For example, obtaining operation 2402, identifying operation 2408, determining operations 2410, and performing operation 2440 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub-event, such as selection of an object on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Associating Identity and Location Information

Many electronic devices allow users to interact with their environment through interactive maps displayed on a display. For example, such electronic devices (e.g., portable multifunction devices) often allow users to indicate their presence at a particular business or well-known landmark on social media sites. In such situations, such electronic devices often display a map on a touch screen display and a user can interact with the map by, for example, tapping on the location of the business or well-known landmark. As another example, such electronic devices often include cameras, and it is desirable to provide users with a convenient way to associate identity and location metadata with photographs taken using the device. For example, in some embodiments, a user can indicate the location of a photograph by tapping on a corresponding location on a map displayed on a touch screen display and by further indicating the identity author and/or the subjects of the photograph through separate inputs. Existing methods of associating identity and location information with, for example, a social media post or as metadata associated with a photograph typically require separate inputs indicating each of identity and location.

In the embodiments described below, an improved method for associating identity and location information is achieved by detecting an input that is associated with both a displayed location on a map (e.g., a location that corresponds to a geographic location) and with a fingerprint detected on a fingerprint sensor. The method identifies a user that corresponds to the fingerprint and performs an operation associated with the location and the user, such as posting an indication of the user's presence at the location to social media or adding metadata indicating the location of a photograph and that the user is a subject and/or author of the photograph.

In some embodiments, the device is an electronic device with a separate display (e.g., display 450) and a separate touch-sensitive surface (e.g., touch-sensitive surface 451). In some embodiments, the device is portable multifunction device 100, the display is touch screen 112, and the touch-sensitive surface includes tactile output generators 167 on the display (FIG. 1A). The device described below with reference to 26A-26G and 27 includes one or more fingerprint sensors 169. In some embodiments, the one or more fingerprint sensors include one or more integrated fingerprint sensors 359-1 (FIG. 4B) that are integrated in to the touch-sensitive surface (e.g., separate touch-sensitive surface 451 or touch sensitive display system 112). In some embodiments, the one or more fingerprint sensors include separate fingerprint sensors 359-2 (FIG. 4B) that are separate from the touch-sensitive surface (e.g., separate touch-sensitive surface 451 or touch sensitive display system 112). Unless specified otherwise, a fingerprint sensor 169 described below is, optionally, either an integrated fingerprint sensor 359-1 or a separate fingerprint sensor 359-2, depending on the configuration of the hardware and software of the device that includes the fingerprint sensor 169. For convenience of explanation, embodiments described with reference to FIGS. 26A-26G and 27 will be discussed with reference to device operations that are performed in response to detecting inputs described in FIGS. 26A-26G on a fingerprint sensor 169 (e.g., an integrated fingerprint sensor 359-1 or a separate fingerprint sensor 359-2) while displaying the user interfaces shown in FIGS. 26A-26G on touch screen 112. However, analogous operations are, optionally, performed on a device with a display 450, a separate touch-sensitive surface 451 and a separate fingerprint sensor 359-2 with an integrated fingerprint sensor 359-1 in response to detecting the inputs described in FIGS. 26A-26G on the integrated fingerprint sensor 359-1 while displaying the user interfaces shown in FIGS. 26A-26G on display 450. In some embodiments, the focus selector is, optionally: a respective contact, a representative point corresponding to a contact (e.g., a centroid of a respective contact or a point associated with a respective contact), or a centroid of two or more contacts detected on the touch screen 112, in place of a cursor.

Figure 26A:
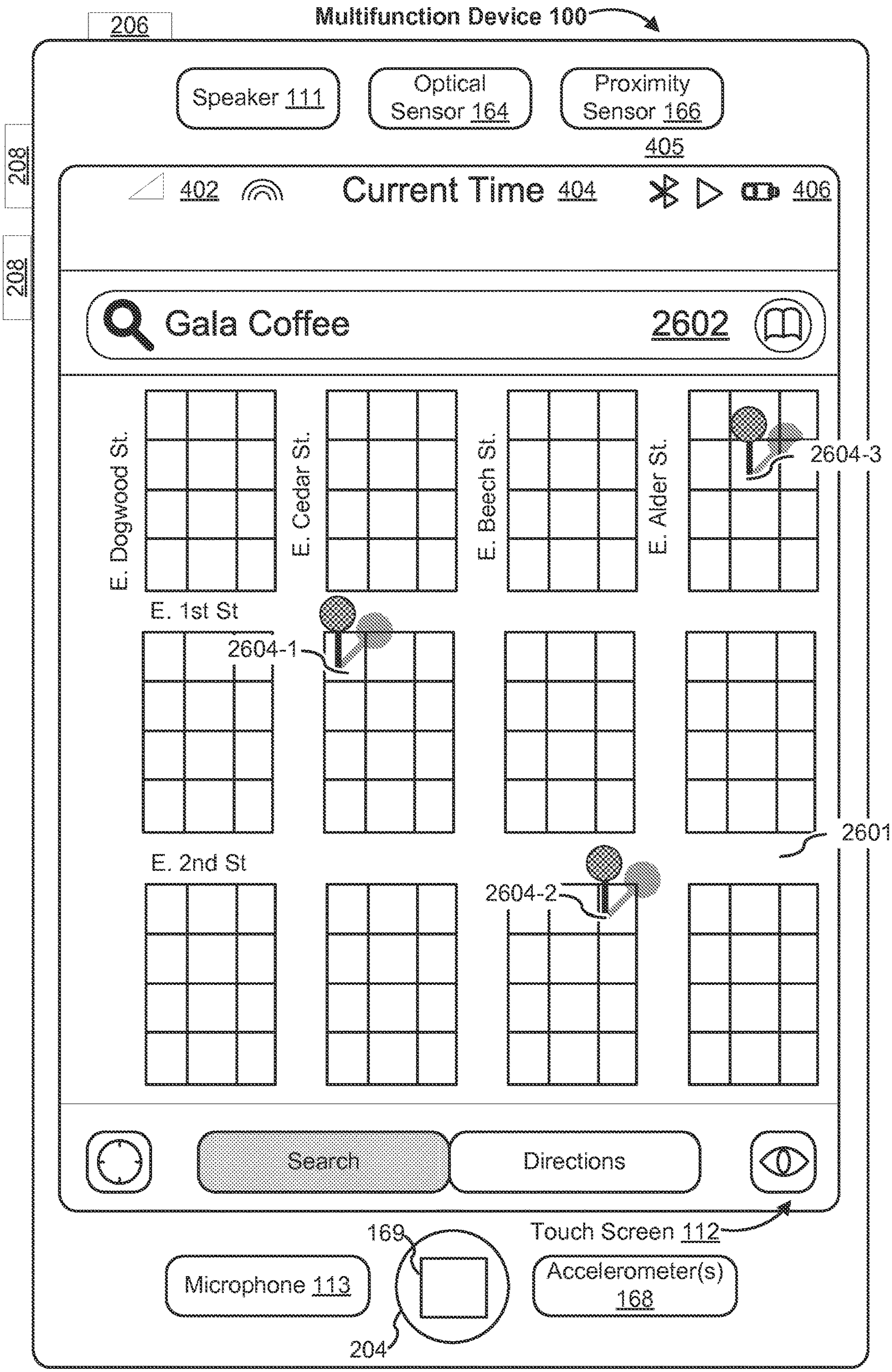
FIGS. 26A-26G illustrate exemplary user interfaces for associating identity and location information in accordance with some embodiments.
Figure 27:
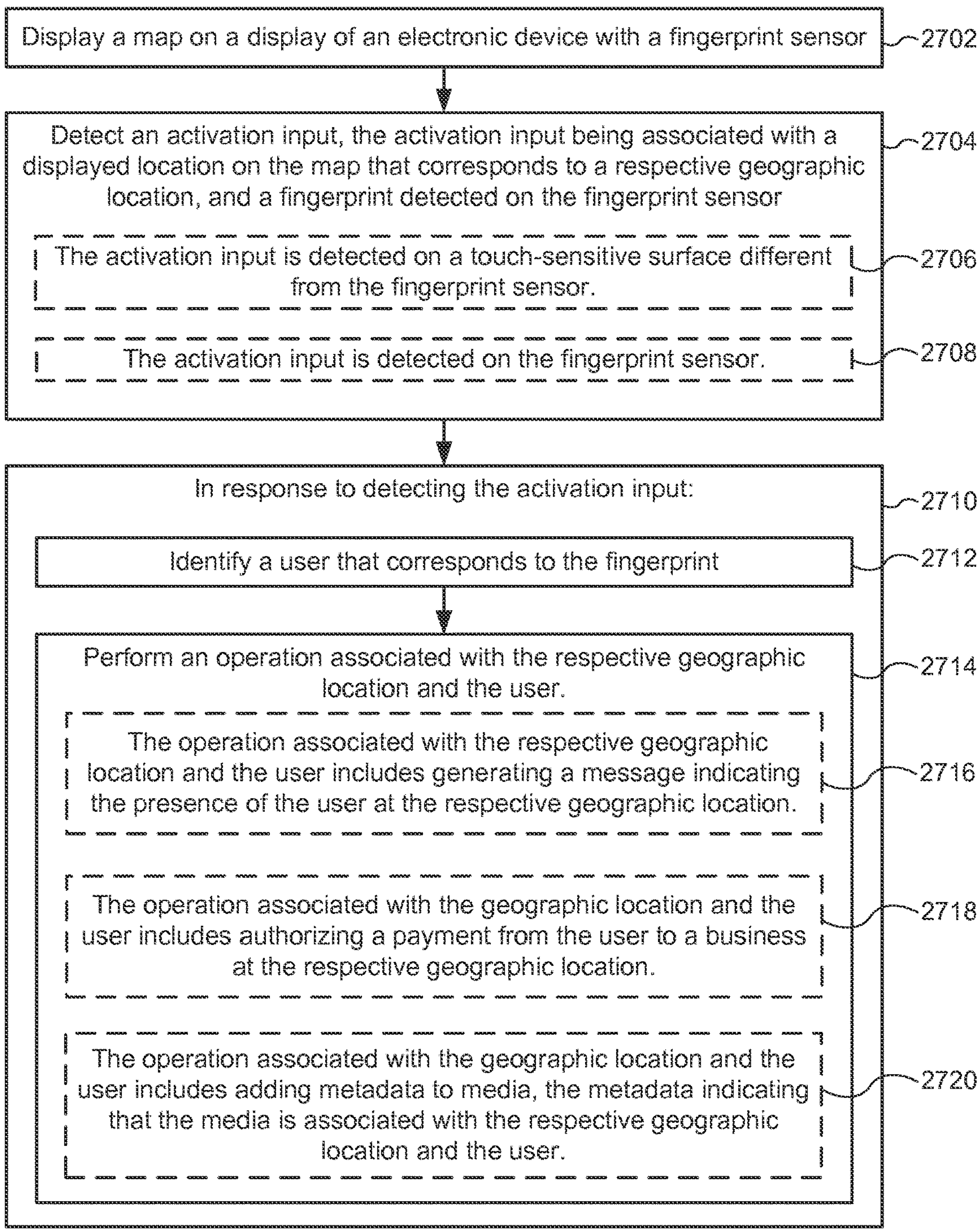
FIG. 27 is a flow diagram illustrating a method of associating identity and location information in accordance with some embodiments.

FIG. 26A illustrates a device displaying a user interface 2601 that includes display of a map. In this example, the user interface is displayed as part of an application that assists users in navigating to local business and landmarks. For example, when the user searches on the term "Gala Coffee" in search bar 2602, the device returns several results and displays their locations as pin-drops 2604 on user interface 2601.

Figure 26B:
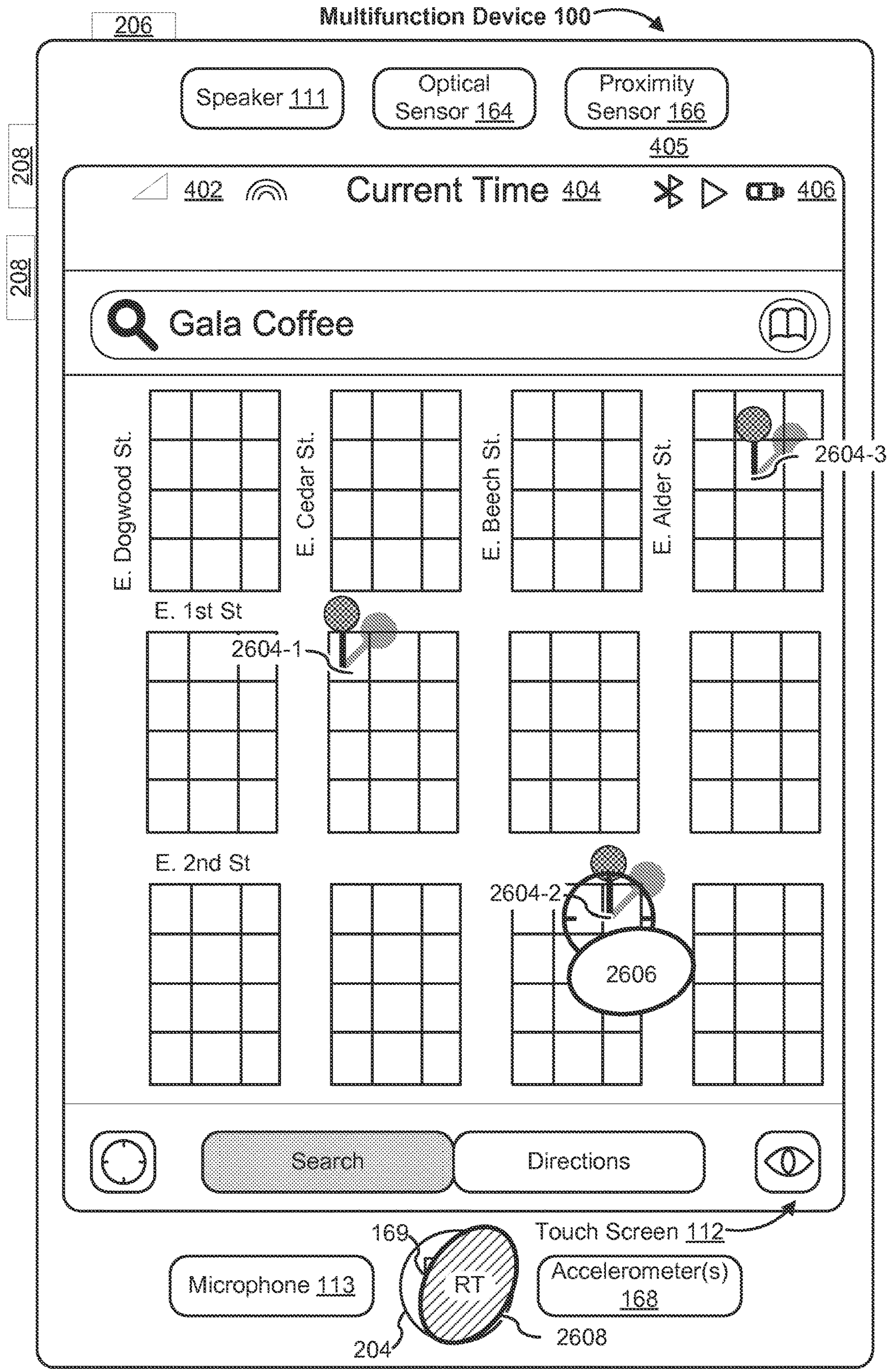

FIG. 26B illustrates detection of a contact 2606 on touch screen 112 and detection of a fingerprint 2608 on a separate fingerprint sensor 169. Contact 2606 is an example of an activation input that triggers an operation of the device that is associated with both the location of contact 2606 on the map (e.g., a physical location corresponding to the displayed location on the map at which contact 2606 is received) as well as the identified fingerprint. In some embodiments (e.g., when touch screen 112 is configured to identify fingerprints), a single contact acts as both an activation input and as an input for which a fingerprint is identified (e.g., a fingerprint is detected corresponding to contact 2606). In some embodiments, a fingerprint is detected on separate fingerprint sensor 169 and another type of activation input, such as a speech input, is detected by the device and associated with a particular location on the map, as described in greater detail with respect to FIG. 27.

FIGS. 26C-26G illustrate examples of various operations that the device performs according to some embodiments. As noted above, these operations are associated with both the location of contact 2606 on the map as well as the identified fingerprint. It should be understood that the present disclosure is intended to support a broad range of operations that are associated with a location and identity, and that the operations shown in FIGS. 26C-26G are merely exemplary.

Figure 26C:
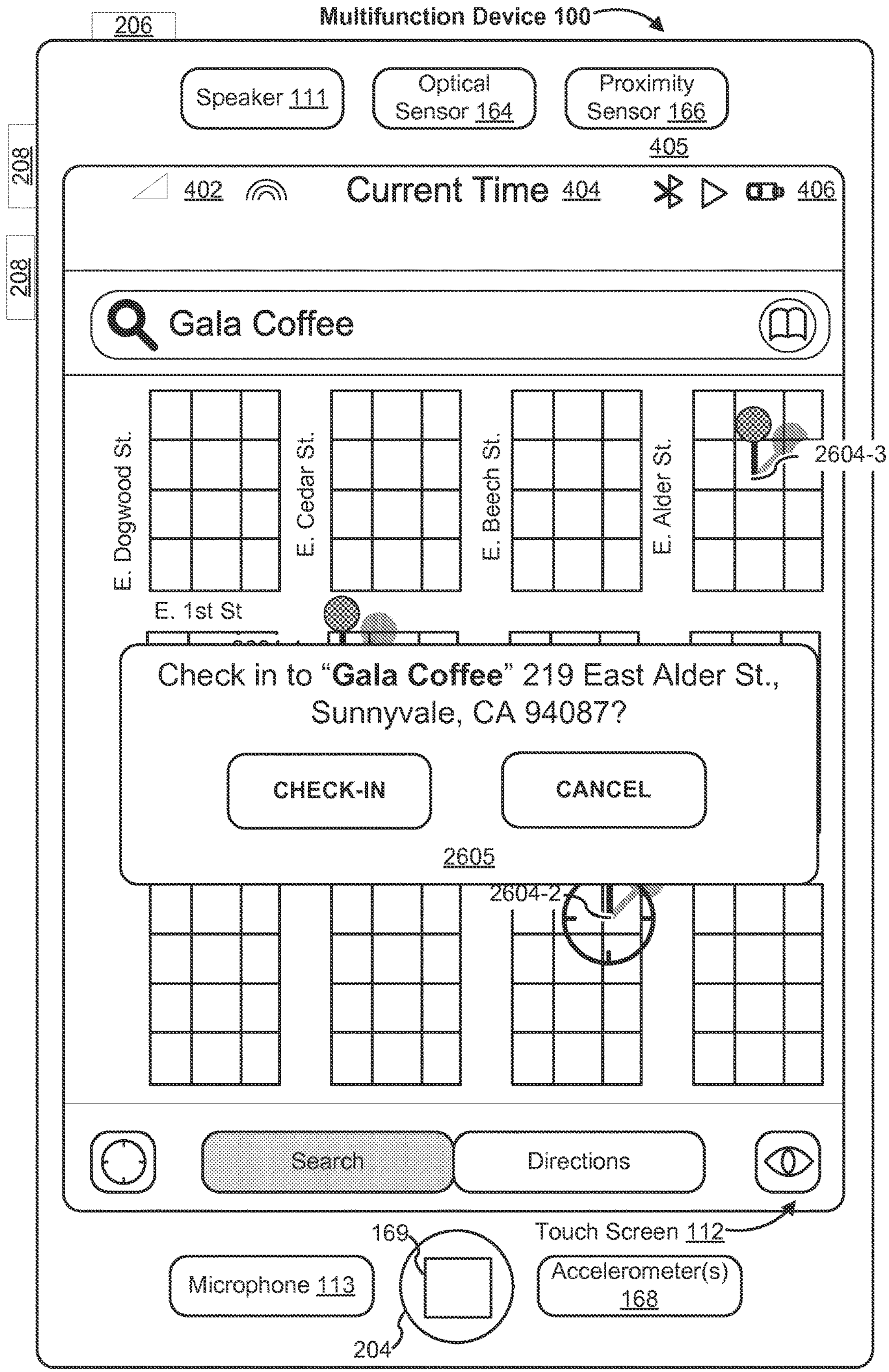

FIG. 26C illustrates an example in which the operation includes indicating the presence of the user (e.g., the user whose fingerprint was identified) at a particular "Gala Coffee" store. In this example, the user has selected a particular pin-drop corresponding to the particular Gala Coffee shop 2604-2. In some embodiments, the device displays a confirmation message 2605 asking the user to confirm that they want to "Check in" at the particular "Gala Coffee" and identifying the address of the location of the check in. For example, activating the "CHECK IN" affordance in confirmation message 2605 will cause the device to post the user's presence on a social media website.

Figure 26D:
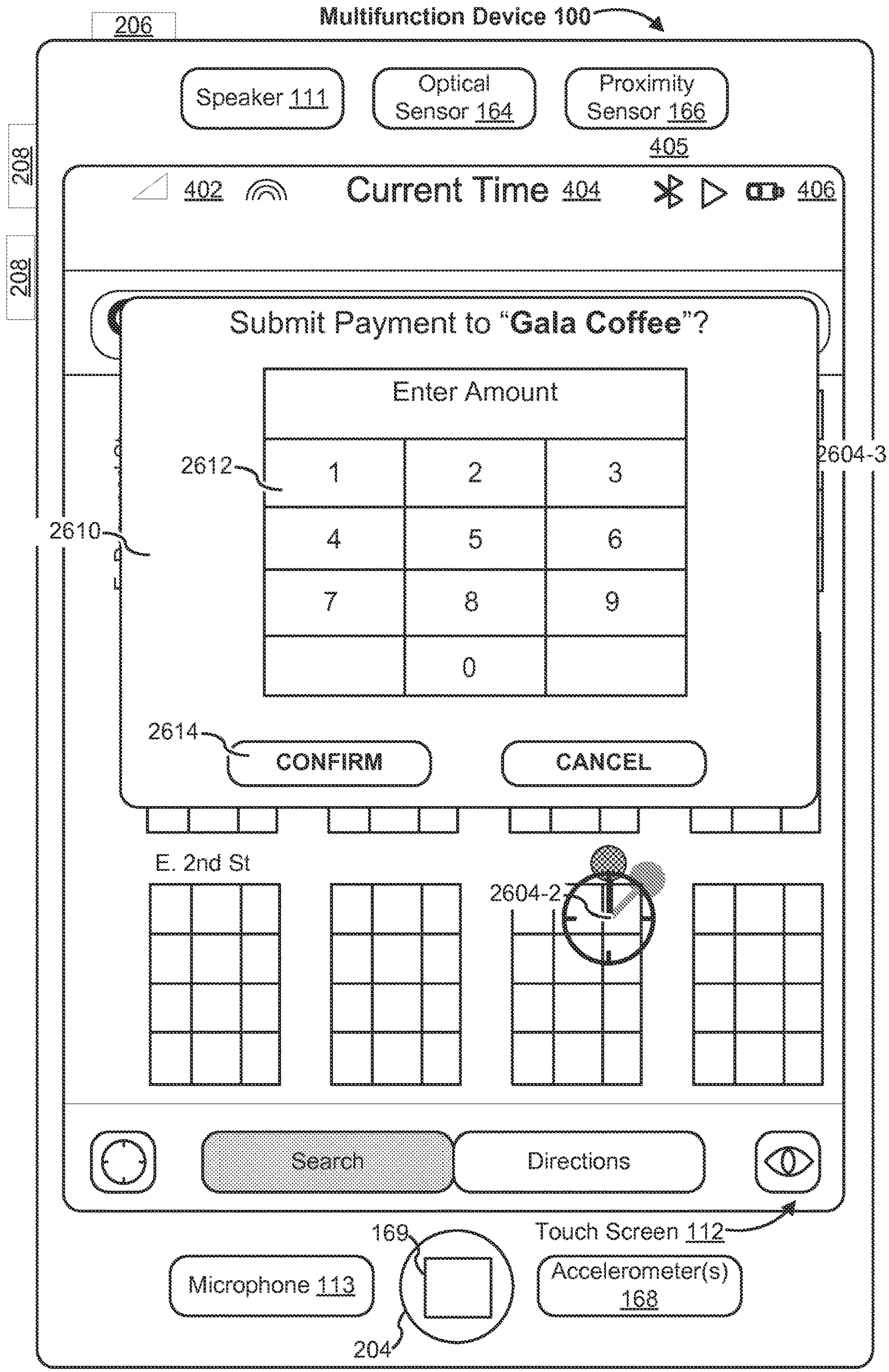

FIG. 26D illustrates an alternate (or in some circumstances, additional) example of an operation that the device performs in response to contact 2606, in accordance with some embodiments. As was the case in FIG. 26C, the user has selected a pin-drop corresponding to the "Gala Coffee" 2604-2 store. However, in this example, the device responds by prompting the user to submit a payment amount through payment prompt 2610. The user can enter an amount using keypad 2612 within prompt 2610 and then select "CONFIRM" button 2614 to submit the payment. In some embodiments, a user can link different accounts to different fingers. For example, a right thumb fingerprint will cause payment to be submitted through the user's debit accord whereas a left index fingerprint will cause payment to be submitted through the user's credit account.

Figure 26E:
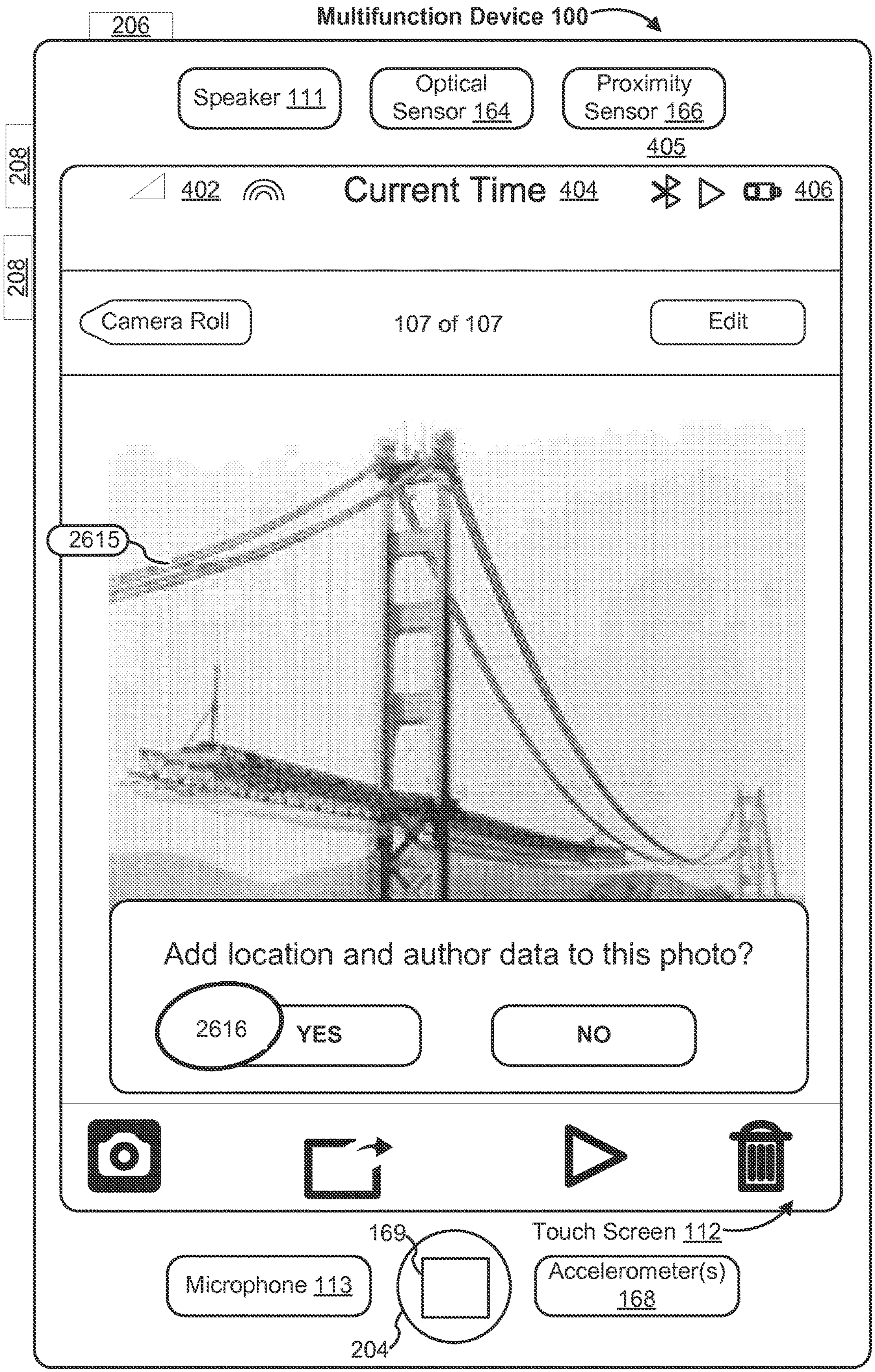
Figure 26F:
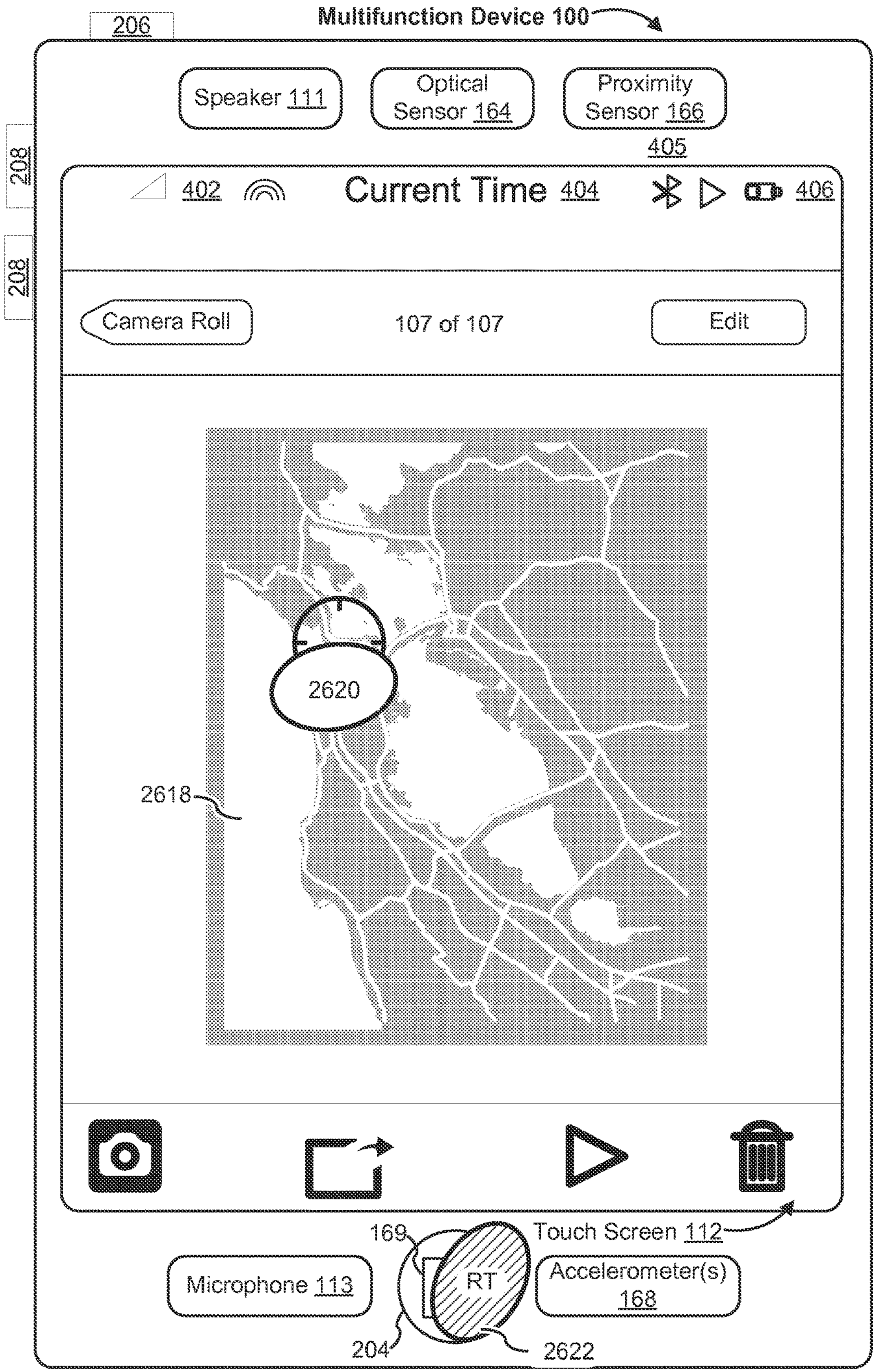
Figure 26G:
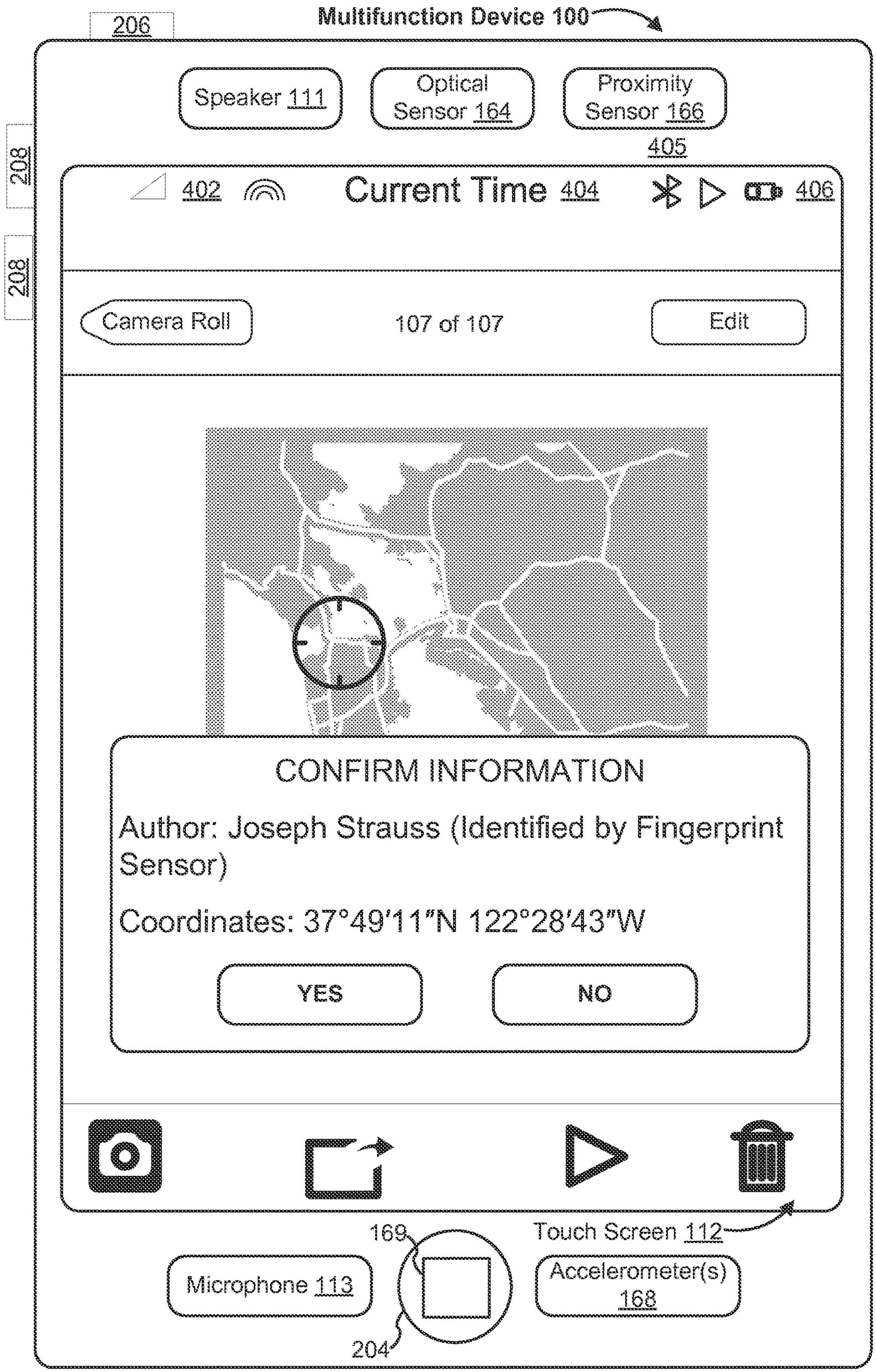

FIGS. 26E-26G illustrate an alternate example of a device operation performed in response to a contact 2616, in accordance with some embodiments. FIG. 26E illustrates display of a photograph 2615 of the Golden Gate Bridge taken from a location in San Francisco, Calif. In some circumstances, photograph 2615 is a photograph that was previously taken by the device (e.g., when the device is equipped with a camera phone). In some circumstances, photograph 2615 is a photograph that was previously taken by a different device and transmitted to the device (e.g., over a network, by email, downloaded from the internet, etc.). As shown in FIG. 26E, the device optionally displays a prompt asking the user if the user would like to add metadata (in this example, location and author data) to the photo. FIG. 26E also illustrates detection of a contact 2616 indicating in the affirmative that the user would like to association location and author metadata with photograph 2615.

FIG. 26F continues the example illustrated in FIG. 26E. Upon selection of the "YES" affordance in FIG. 26E via contact 2616, the device displays a map 2618 for associating metadata including location information (e.g., geotagging) with photograph 2615. The device detects a contact 2620 at a location on the map that has special significance for the photograph (e.g., where the photograph was taken). The device also detects a fingerprint 2622 on fingerprint sensor 169 corresponding to a user and identifies a user to whom it belongs. As shown in FIG. 26G, the device associates data associated with both the location on map 2618 of contact 2620 (in this case, the coordinate location of the Golden Gate Bridge, San Francisco, Calif.), as well as the identity of the user to whom fingerprint 2622 belongs (e.g., Joseph Strauss, as shown in FIG. 26G).

FIG. 27 is a flow diagram illustrating a method 2700 of associating identity and location information in accordance with some embodiments. The method 2700 is performed at an electronic device (e.g., device 300, FIG. 3, or portable multifunction device 100, FIG. 1A) with a display and a touch-sensitive surface. In some embodiments, the display is a touch screen display and the touch-sensitive surface is on the display. In some embodiments, the display is separate from the touch-sensitive surface. Some operations in method 2700 are, optionally, combined and/or the order of some operations is, optionally, changed.

As described below, method 2700 provides an intuitive way to associate identity and location information. The method reduces the cognitive burden on a user when associating identity and location information, thereby creating a more efficient human-machine interface. For battery-operated electronic devices, enabling a user to associate identity and location information faster and more efficiently conserves power and increases the time between battery charges.

The device displays (2702) a map on a display of an electronic device with a fingerprint sensor (2702). For example, FIG. 26A illustrates a device with a fingerprint sensor 169 displaying a map.

The device detects (2704) an activation input, the activation input being associated with a displayed location on the map that corresponds to a respective geographic location and a fingerprint detected on the fingerprint sensor. For example, the activation input is performed while a focus selector is at the displayed location on the map in order to associate the activation input with the displayed location on the map and the corresponding geographic location (e.g., contact 2606 in FIG. 26B). In some embodiments, the activation input is associated with the fingerprint detected on the fingerprint sensor in accordance with a determination that the activation input is performed while the fingerprint is detected on the fingerprint sensor.

In some embodiments, the activation input is a speech input. For example, while displaying the map shown in FIG. 26A and detecting the fingerprint on the fingerprint sensor, the user will say "I'm at Gala Coffee on 1st and Cedar," which the device will interpret as an activation input for the particular Gala Coffee (represented by pin-drop 2604-1) at the intersection of East 1st Street and East Cedar Street. In some embodiments, the activation input is a speech input that corresponds to a request for the device to use location determination functionality of the device to determine the user's location. For example, while (or after, or before) fingerprint 2608 is detected, the user will say "Use my current location," and the device will determine the user's current location (e.g., using global positioning system software and/or hardware). Alternatively, the user will say "I'm at Gala Coffee," or "Check in at Gala Coffee" and the device will recognize the input as a request to check in the identified user at the nearest Gala Coffee (e.g., the Gala Coffee represented by pin-drop 2604-1 when the device determines that user is located at the intersection of East 1st Street and East Cedar Street).

In some embodiments, the activation input is detected (2706) on a touch-sensitive surface different from the fingerprint sensor (e.g., the activation input is detected on a portion of a touchpad or touch screen display that does not include an integrated fingerprint sensor, the activation input occurring concurrently or substantially concurrently with a fingerprint being placed on the integrated fingerprint sensor, as shown in FIGS. 26A-26G).

In some embodiments, the activation input is detected (2708) on the fingerprint sensor (e.g., the activation input is detected on a portion of a touchpad or touch screen display that includes an integrated fingerprint sensor, and the integrated fingerprint sensor is used to identify the user that corresponds to the fingerprint).

In response to detecting the activation input (2710), the device identifies (2712) a user that corresponds to the fingerprint (e.g., identifying a user profile that includes a previously registered fingerprint that matches the fingerprint detected on the fingerprint sensor). The device then performs (2714) an operation associated with the respective geographic location and the user.

In some embodiments, the operation associated with the respective geographic location and the user includes (2716) generating a message indicating the (virtual or physical) presence of the user at the respective geographic location (e.g., the user can "check in" to a geographic location such as a restaurant, store, park, or other place of business by selecting a location on the map that corresponds to the place of business while simultaneously having a fingerprint on a fingerprint sensor, as shown in FIGS. 26A-26C). In some embodiments, the generated message indicates that the user is currently physically present at the respective geographic location. In some embodiments, the generated message indicates that the user was previously physically present or will be physically present at the respective geographic location in the future. In some embodiments, the message indicating the presence of the user indicates an actual physical presence of the user at the location (e.g., the user checks in at a restaurant while the user is eating at the restaurant to indicate that the user is eating at the restaurant). In some embodiments, the message indicating the presence of the user indicates a virtual presence of the user (e.g., the user checks in at a restaurant to request a reservation at the restaurant or indicate that the user has made a reservation at the restaurant, or the user checks in at a location where a meeting is occurring even though the user is participating in the meeting remotely via phone or video conference).

In some embodiments, the operation associated with the geographic location and the user includes (2718) authorizing a payment from the user to a business at the respective geographic location (e.g., a step in authorizing a payment to a store is to select a location on the map that corresponds to the location of the store while a fingerprint is on a fingerprint sensor, as shown in FIG. 26D).

In some embodiments, the operation associated with the geographic location and the user includes (2720) adding metadata to media, the metadata indicating that the media is associated with the respective geographic location and the user (e.g., geotagging a photo taken by the user or of the user by adding metadata to the photo that indicates both a location where the photo was taken and that the user took the photo or appears in the photo, as shown in FIGS. 26E-26G).

It should be understood that the particular order in which the operations in FIG. 27 have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., those methods described above) are also applicable in an analogous manner to method 2700 described above with respect to FIG. 27. For example, the fingerprints, inputs, maps, and focus selectors described above with reference to method 2700 optionally have one or more of the characteristics of the fingerprints, inputs, maps, and focus selectors described herein with reference to other methods described herein (e.g., those methods described above). For brevity, these details are not repeated here.

Figure 28:
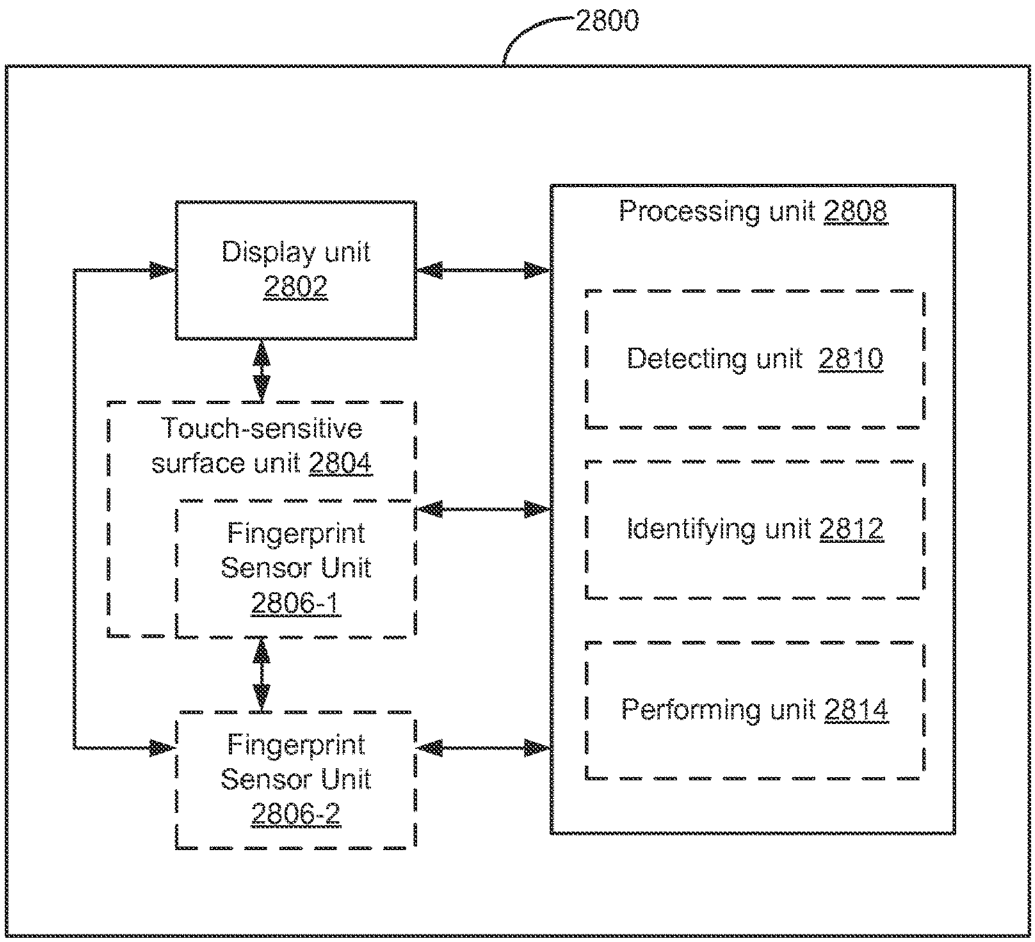
FIG. 28 is a functional block diagram of an electronic device in accordance with some embodiments.

In accordance with some embodiments, FIG. 28 shows a functional block diagram of an electronic device 2800 configured in accordance with the principles of the various described embodiments. The functional blocks of the device are, optionally, implemented by hardware, software, or a combination of hardware and software to carry out the principles of the various described embodiments. It is understood by persons of skill in the art that the functional blocks described in FIG. 28 are, optionally, combined or separated into sub-blocks to implement the principles of the various described embodiments. Therefore, the description herein optionally supports any possible combination or separation or further definition of the functional blocks described herein.

As shown in FIG. 28, an electronic device 2800 includes a display unit 2802 configured to display a user interface including a map, a fingerprint sensor unit 2806; and a processing unit 2808 coupled to the display unit 2802 and the fingerprint sensor unit 2806. In some embodiments, the device includes a touch-sensitive surface unit 2804 with an incorporated fingerprint sensor unit 2806-1. In such embodiments, the processing unit is coupled to the touch-sensitive surface unit 2804 together with the fingerprint sensor unit 2804-1. In some embodiments, the device includes a separate fingerprint sensor unit 2806-2. In some embodiments, the processing unit 2808 includes a detecting unit 2810, an identifying unit 2812, and a performing unit 2814.

The processing unit 2808 is configured to detect an activation input, the activation input being associated with a displayed location on the map that corresponds to a respective geographic location and a fingerprint detected on the fingerprint sensor unit 2806. In response to detecting the activation input: the processing unit 2808 is configured to identify a user that corresponds to the fingerprint and perform an operation associated with the respective geographic location and the user.

In some embodiments, the activation input is detected on a touch-sensitive surface unit 2804 different from the fingerprint sensor unit 2804.

In some embodiments, the activation input is detected on the fingerprint sensor unit 2804.

In some embodiments, the operation associated with the respective geographic location and the user includes generating a message indicating the presence of the user at the respective geographic location, as discussed in more detail above.

In some embodiments, the operation associated with the geographic location and the user includes authorizing a payment from the user to a business at the respective geographic location, as discussed in more detail above.

In some embodiments, the operation associated with the geographic location and the user includes adding metadata to media, the metadata indicating that the media is associated with the respective geographic location and the user, as discussed in more detail above.

The operations in the information processing methods described above are, optionally implemented by running one or more functional modules in information processing apparatus such as general purpose processors (e.g., as described above with respect to FIGS. 1A and 3) or application specific chips.

The operations described above with reference to FIG. 27 are, optionally, implemented by components depicted in FIGS. 1A-1B or FIG. 28. For example, display operation 2702, detecting operation 2704, and identifying operation 2712 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub-event, such as selection of an object on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Assigning Workspaces to Users

Many electronic devices have graphical user interfaces that allow users to perform a variety of functions and operations associated with the respective user interfaces (e.g., data storage options, text editing applications, drawing applications, and the like). Furthermore, many electronic devices are shared between two or more users. While interacting with such shared devices, a user frequently desires to create and define a personal workspace or work area with custom-defined functions and operations (e.g., a custom list of applications, personal data storage space, custom data formatting options such as user-specified text fonts, line widths, drawing options and the like) based on the user's own preferences.

Some approaches for users to create their own personal workspace on a shared device include creation of separate user accounts (e.g., with separate user names and passwords to associate users to their respective accounts). The users can then log into their respective accounts using their respective user names and passwords. These approaches are limited in a manner that only one user would be able to log into his or her respective account at any given time on the shared device, thereby making it difficult for multiple users to concurrently access their accounts on the same shared device. Additionally, these approaches require navigation through a hierarchy of menus and settings to switch between workspaces which can be confusing and time-consuming for users.

The disclosed embodiments provide a convenient and efficient method of partitioning a shared workspace on a multifunction device by enabling a user to define a area on a display of the multifunction device by using one or more contacts to define the perimeter or boundary of the area. Based at least on a fingerprint detected in the one or more contacts used by the user to define the area, the device associates the area with the respective user and associates the area with the user's personal preferences and settings. As a result, one or more users can quickly and efficiently define respective workspaces or work areas on the same physical device and have their custom settings associated with the respective workspaces based on fingerprint identification of the users.

In some embodiments, the device is an electronic device with a separate display (e.g., display 450) and a separate touch-sensitive surface (e.g., touch-sensitive surface 451). In some embodiments, the device is portable multifunction device 100, the display is touch screen 112, and the touch-sensitive surface includes tactile output generators 167 on the display (FIG. 1A). The device described below with reference to 29A-29S and 30A-30B includes one or more fingerprint sensors 169. In some embodiments, the one or more fingerprint sensors include one or more integrated fingerprint sensors 359-1 (FIG. 4B) that are integrated in to the touch-sensitive surface (e.g., separate touch-sensitive surface 451 or touch sensitive display system 112). In some embodiments, the one or more fingerprint sensors include separate fingerprint sensors 359-2 (FIG. 4B) that are separate from the touch-sensitive surface (e.g., separate touch-sensitive surface 451 or touch sensitive display system 112). Unless specified otherwise, a fingerprint sensor 169 described below is, optionally, either an integrated fingerprint sensor 359-1 or a separate fingerprint sensor 359-2, depending on the configuration of the hardware and software of the device that includes the fingerprint sensor 169. For convenience of explanation, the embodiments described with reference to FIGS. 29A-29S and 30A-30B will be discussed with reference to display 450, a separate touch-sensitive surface 451 and a separate fingerprint sensor 359-2, however analogous operations are, optionally, performed on a device with an integrated fingerprint sensor 359-1 in response to detecting the inputs described in FIGS. 29A-29S on the integrated fingerprint sensor 359-1 while displaying the user interfaces shown in FIGS. 29A-29S on the display 450. Additionally, analogous operations are, optionally, performed on a device with a touch screen 112 in response to detecting the contacts described in FIGS. 29A-29S on a fingerprint sensor 169 (e.g., an integrated fingerprint sensor 359-1 or a separate fingerprint sensor 359-2) while displaying the user interfaces shown in FIGS. 29A-29S on the touch screen 112; in such embodiments, the focus selector is, optionally: a respective contact, a representative point corresponding to a contact (e.g., a centroid of a respective contact or a point associated with a respective contact), or a centroid of two or more contacts detected on the touch screen 112, in place of a displayed cursor.

FIG. 29A illustrates a first user interface (e.g., an application launch user interface or a home screen interface), with user selectable icons (e.g., user-selectable icons 424-446 corresponding to a plurality of launchable applications), that is displayed on a display 2900 of a portable multi-function device 100. In some embodiments, display 2900 is a touch-sensitive display with an array of touch sensors that are responsive to touch. In some embodiments, the array of touch sensors is in a plane coincident (e.g., collocated or co-planar) with a plane that defines the display elements forming display. A combined display 2900 and touch-sensitive surface is sometimes referred to herein as a touch screen 112. In some embodiments, the device includes a touch sensitive surface (e.g., in a plane coincident, collocated or coplanar with the display) with an array of touch sensors that are responsive to touch and the touch sensitive surface includes a fingerprint sensing capability (e.g., the touch sensitive surface includes an array of fingerprint sensors capable of detecting fingerprints with high spatial precision). Thus, in some embodiments, the device is capable of detecting one or more fingerprints on the touch sensitive surface and optionally associating the one or more fingerprints with one or more corresponding users of the device.

Figure 29B:
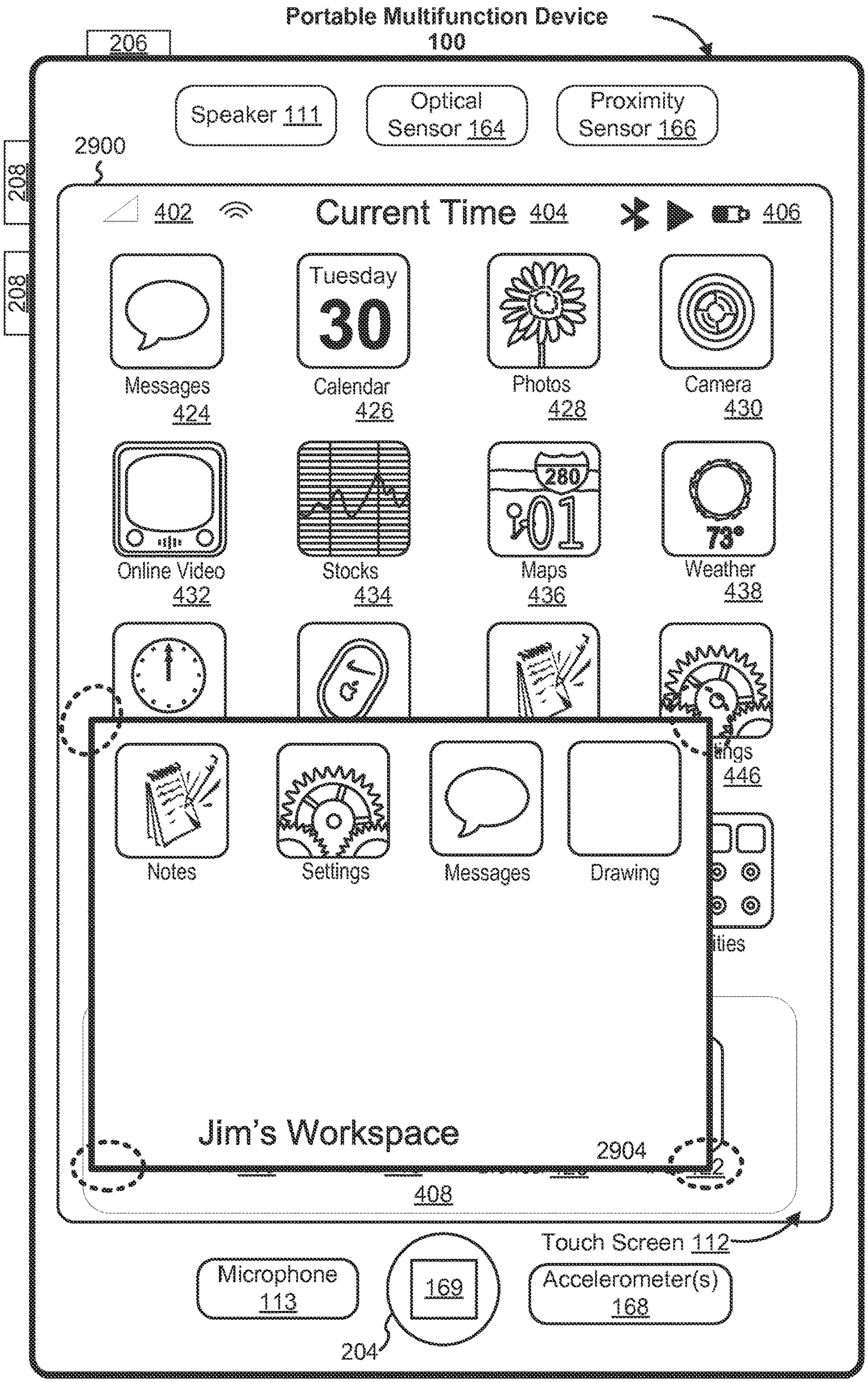

FIGS. 29A-29B illustrate detecting a first set of one or more inputs (e.g., including one or more contacts with one or more corresponding fingerprints) on the touch screen 112 that define a first area (e.g., delineate a first perimeter that bounds a first area) on the touch screen 112. FIGS. 29A-29B further illustrate determining that a first contact in the one or more contacts includes a first fingerprint associated with a first user. Accordingly, FIGS. 29A-29B illustrate that the device associates the first area with the first user (e.g., as a workspace for the first user with custom work settings specific to the first user).

As shown in FIG. 29A, the device detects a first set of one or more inputs including contacts with corresponding fingerprints 2902-*a*, 2902-*b*, 2902-*c*, and 2902-*d*) on the touch screen 112 of device 100. The first set of inputs (e.g., including corresponding fingerprints 2902-*a*, 2902-*b*, 2902-*c*, and 2902-*d*) define a (e.g., substantially rectangular) perimeter that forms the border or boundary of a first (e.g., substantially rectangular) area on the touch screen surface of the device. As shown in FIG. 29B, the device determines that one or more of the fingerprints 2902-*a*, 2902-*b*, 2902-*c*, and 2902-*d* is associated with a first user (e.g., Jim). Accordingly, the device associates (e.g., designates) the first area of the touch screen 112 with the first user (e.g., based on a comparison of the detected fingerprints with fingerprint features of fingerprints of the user that determines that the detected fingerprints match fingerprints of the user). For example, the first area is a workspace that is designated to Jim and includes Jim's preferred (e.g., custom-defined) applications (e.g., and corresponding application launch icons). As shown in FIG. 29B, a user has the improved convenience of carving out, outlining or designating his or her personal workspace (e.g., from a shared workspace), on a multifunction device, with his or her custom preferred settings, simply by using one or more inputs (e.g., with one or more contacts having one or more corresponding fingerprints) to define the boundary or perimeter of an area for the personal workspace.

Figure 29C:
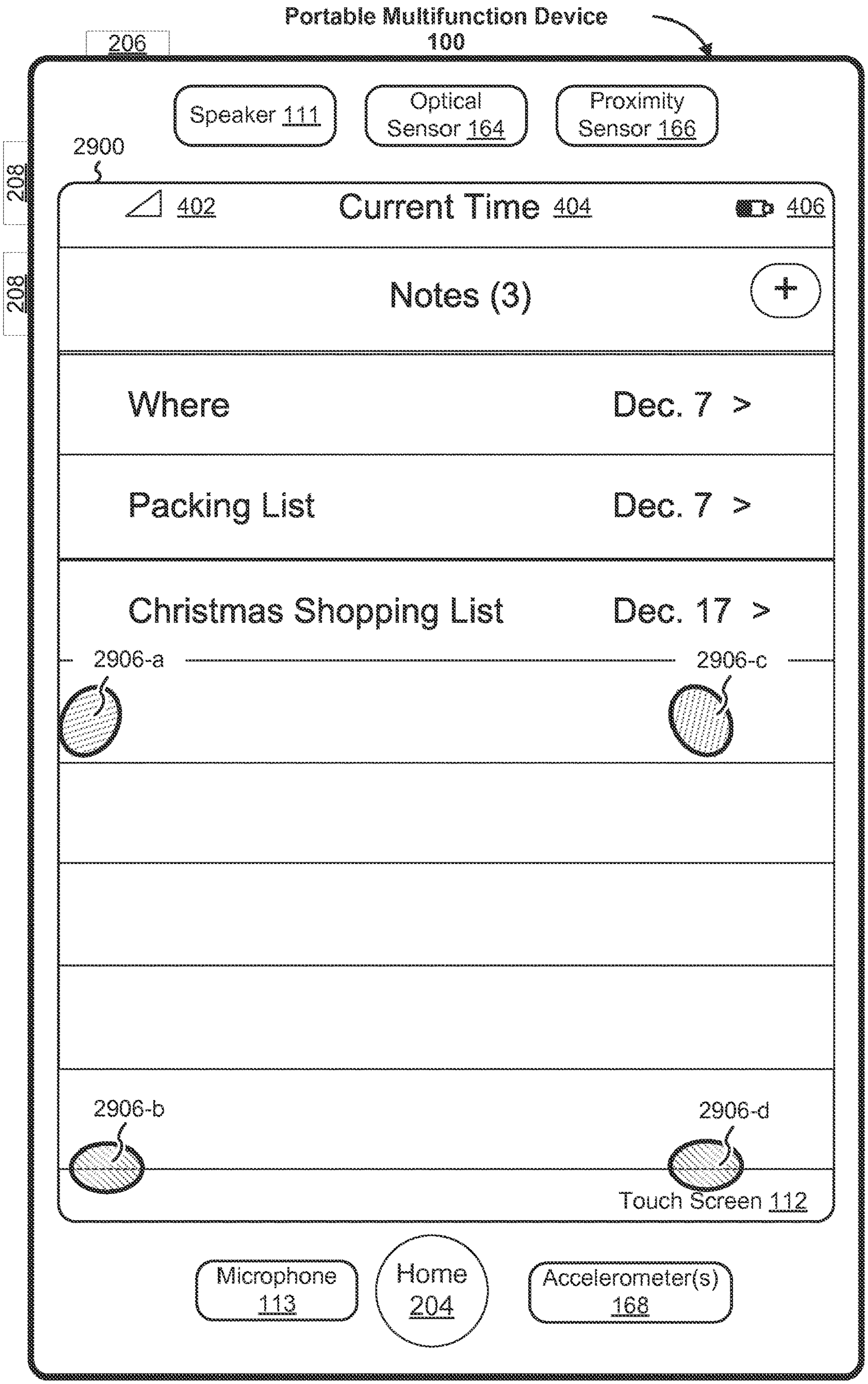
Figure 29D:
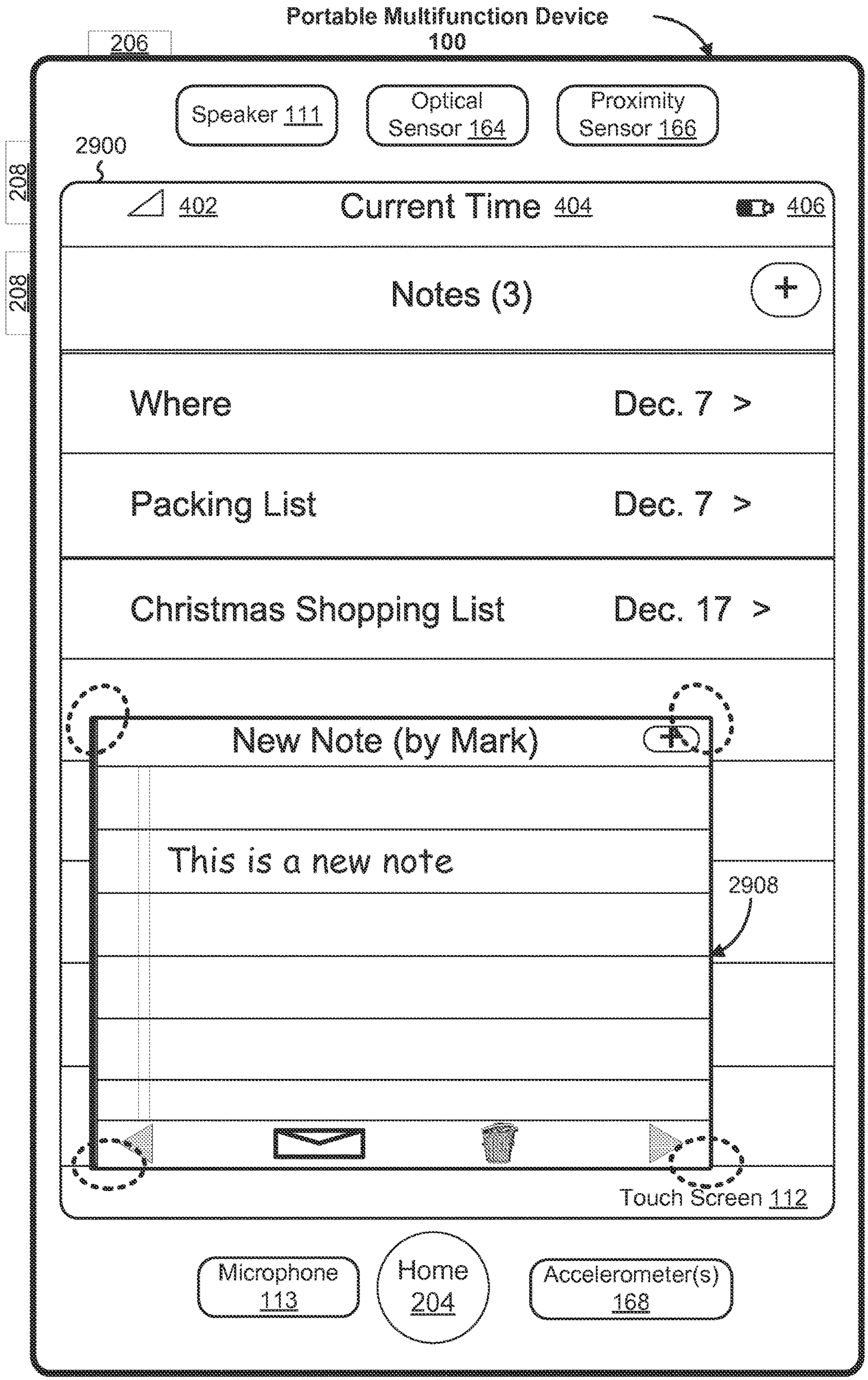

Along similar lines, FIG. 29C illustrates a second user interface (e.g., a notepad or text editing application user interface) with a list of notes (e.g., most recently created or edited notes by one or more users), in a common workspace, that is displayed on touch screen 112 of a portable multifunction device 100. FIGS. 29C-29D illustrate detecting a first set of one or more inputs (e.g., including one or more fingerprints 2906-*a*, 2906-*b*, 2906-*c*, and 2906-*d*) associated with a first user (e.g., Mark) on the touch screen 112, where the first set of one or more inputs defines a first area.

Figure 29E:
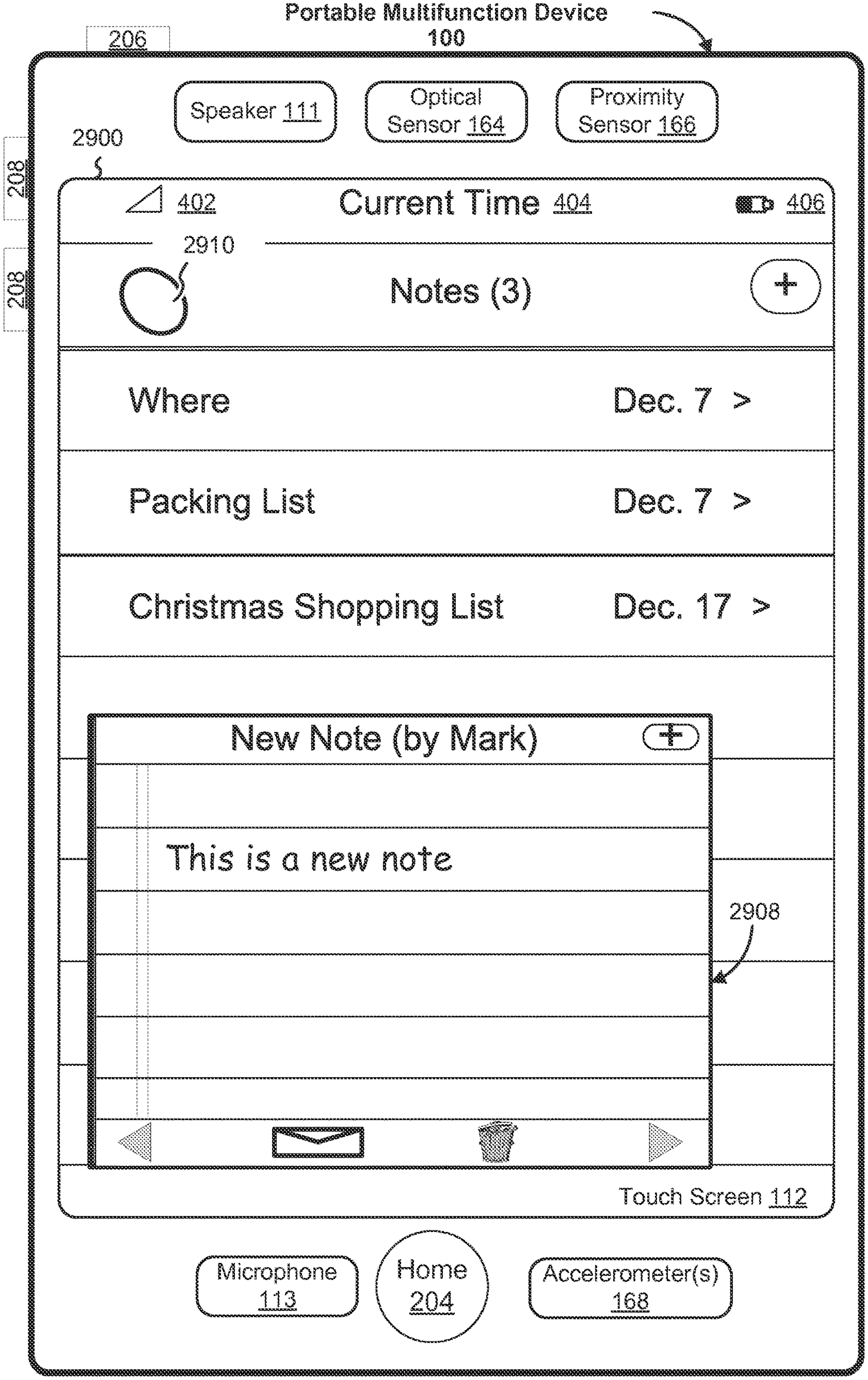
Figure 29F:
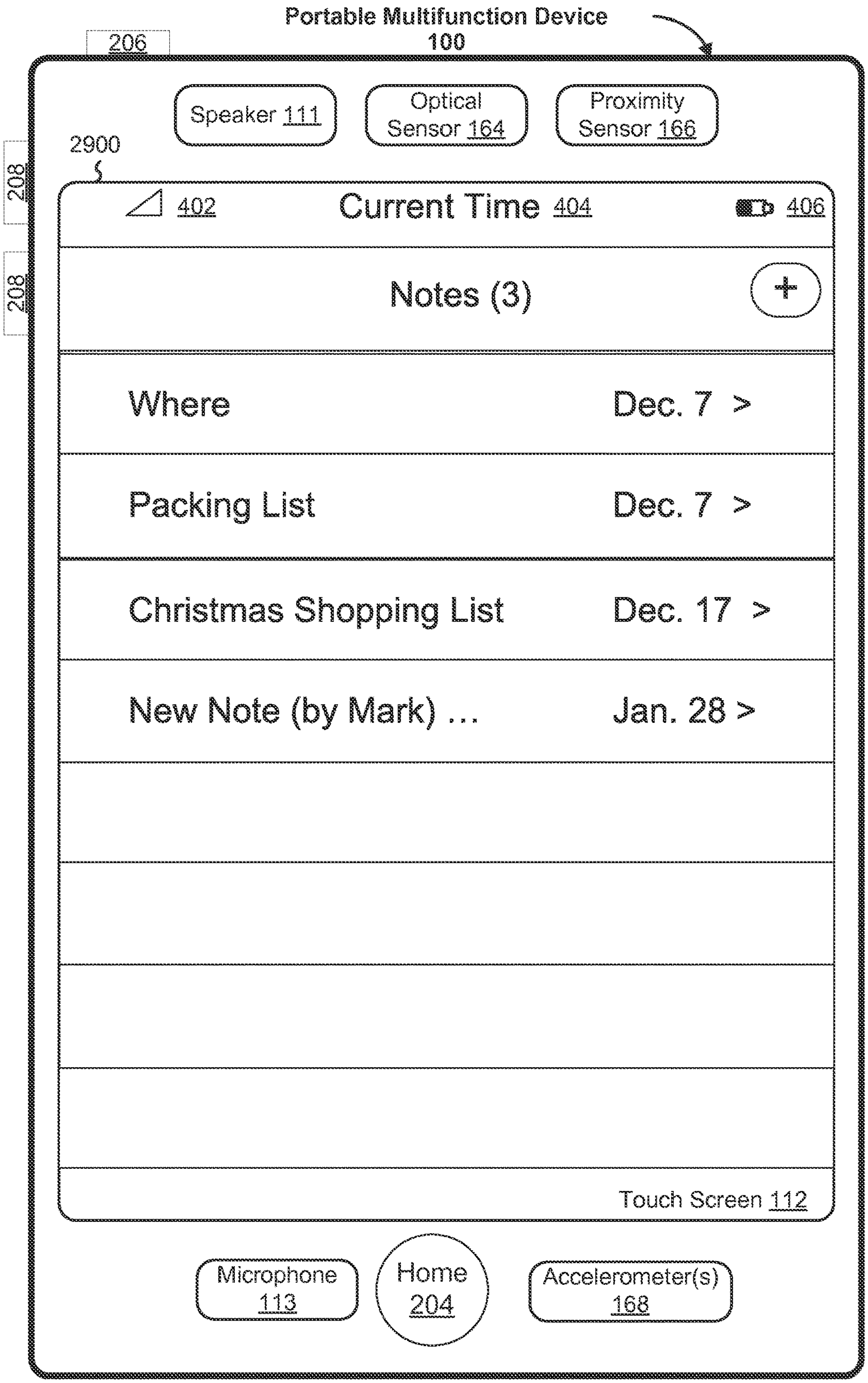

As shown in FIG. 29D, the first set of one or more inputs is associated with (e.g., defines the boundary or perimeter of) a first area (e.g., rectangular text editing workspace 2908) associated with the first user (e.g., with Mark) based at least on determining that the first set of inputs includes one or more fingerprints corresponding to the first user. As shown in FIG. 29D, text entered by the first user in the first area (e.g., the new note by Mark entered by way of a second set of one or more inputs) is associated with a first operation (e.g., text entered in the first area is displayed and formatted in accordance with custom settings such as font, text size, formatting and the like) based on the preferences of the first user (e.g., Mark). As shown in FIGS. 29E-29F, the device detects a third set of one or more inputs (e.g., contact 2910) on the touch screen 112 outside the first area (e.g., outside the rectangular text editing workspace 2908). If the device detected inputs corresponding to creating a new note that were not associated with the area of the display, then the new note would be generated using default preferences (e.g., different font, text size and formatting preferences). As shown in FIGS. 29E-29F in accordance with a determination that the third set of one or more inputs (e.g., contact 2910) is outside the first area, the device performs a second operation (e.g., minimizes the new note by Mark to redisplay the list of recently created or edited notes).

Thus, in some embodiments, after carving out, outlining, defining, or designating his or her personal workspace (e.g., from a shared workspace), on a multifunction device, the user has the improved convenience of performing a first operation (e.g., in accordance with or associated with his or her custom preferred settings) simply by placing one or more contacts inside the first area (e.g., corresponding to his or her personal workspace); and of performing a second operation (e.g., dismissing the personalized workspace or generating a new note in accordance with default preferences) by placing one or more contacts outside the first area.

Figure 29G:
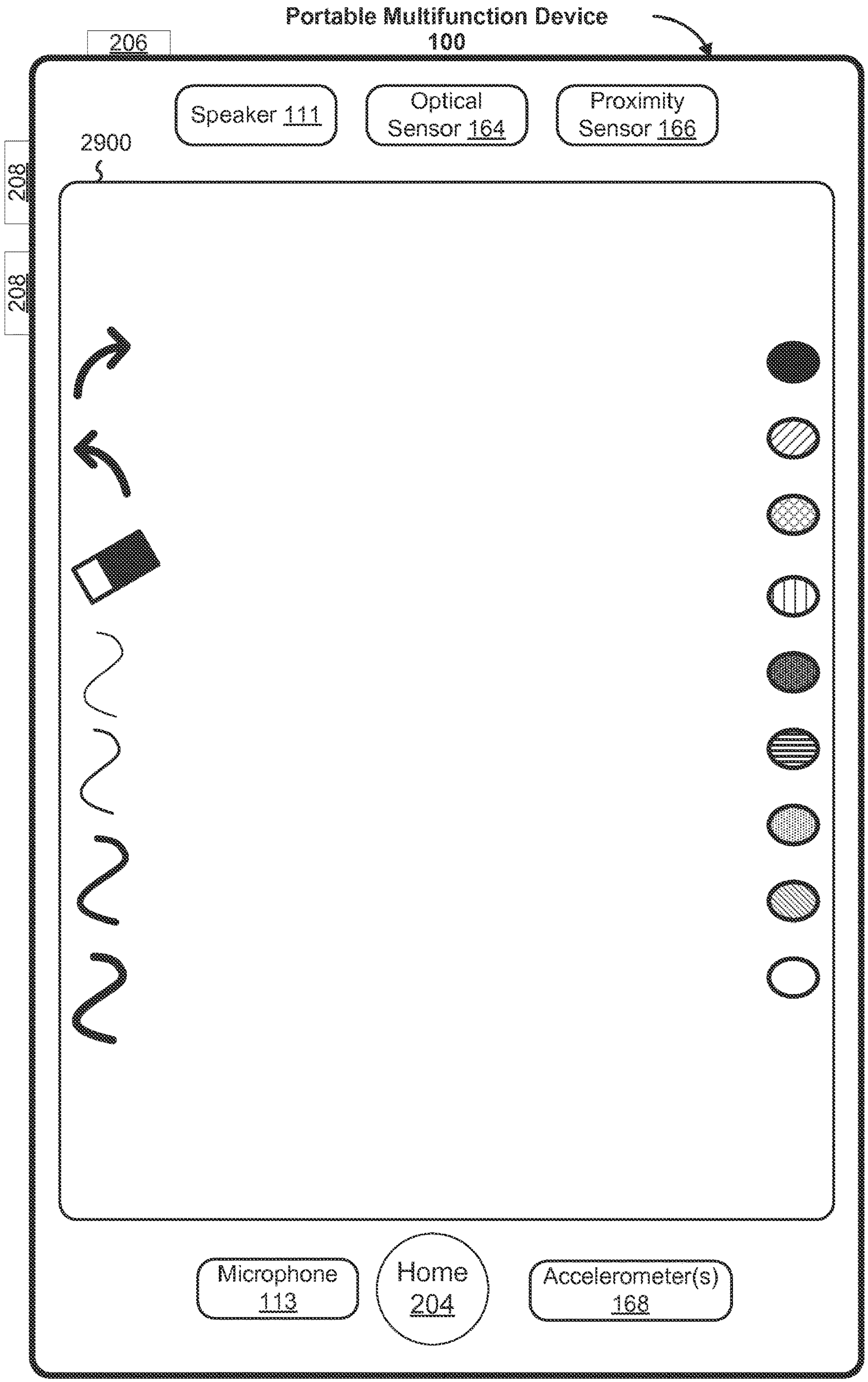
Figure 29H:
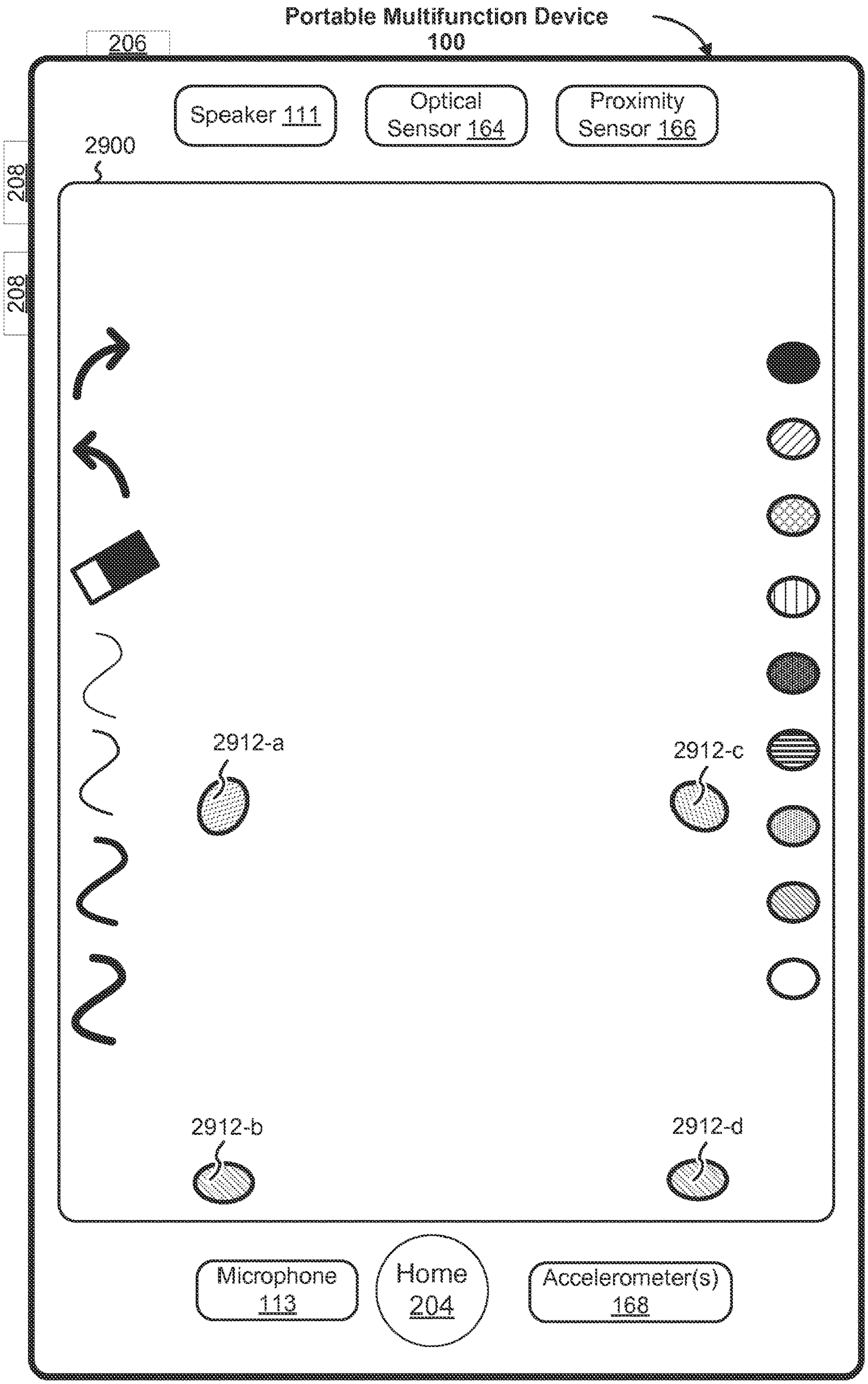
Figure 29I:
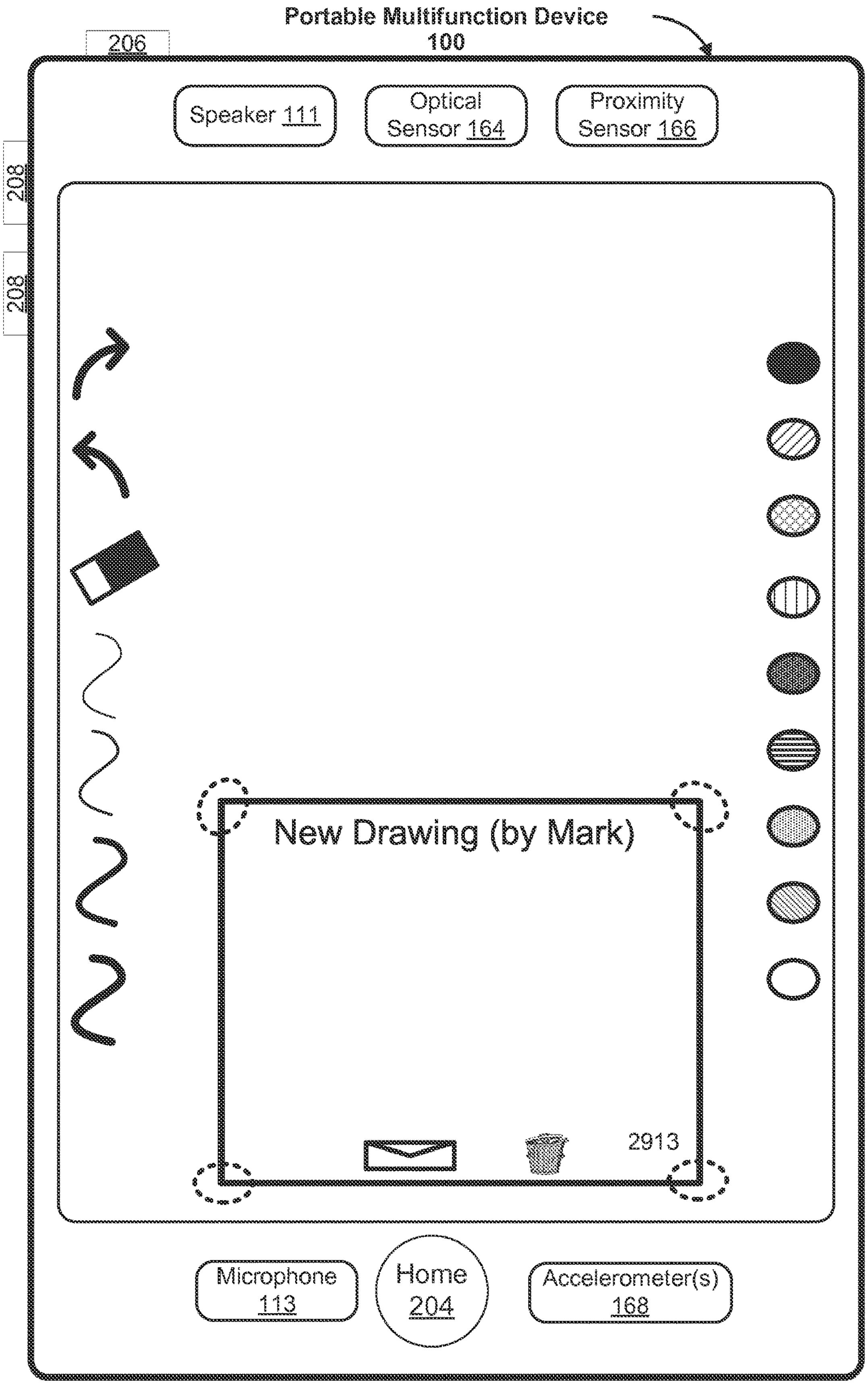

As yet another example, FIG. 29G illustrates a third user interface (e.g., a drawing application user interface), with a common shared (e.g., between one or more users) workspace for creating drawings, that is displayed on touch screen 112 of portable multi-function device 100. FIG. 29H illustrates detecting a first set of one or more inputs (e.g., including one or more fingerprints 2912-*a*, 2912-*b*, 2912-*c*, and 2912-*d*) associated with a first user (e.g., Mark) on the touch screen 112. As shown in FIG. 29I, the first set of one or more inputs defines a first area (e.g., rectangular drawing workspace 2913) associated with the first user (e.g., with Mark) based at least on determining that the first set of inputs includes one or more fingerprints corresponding to the first user (e.g., corresponding to Mark).

Figure 29J:
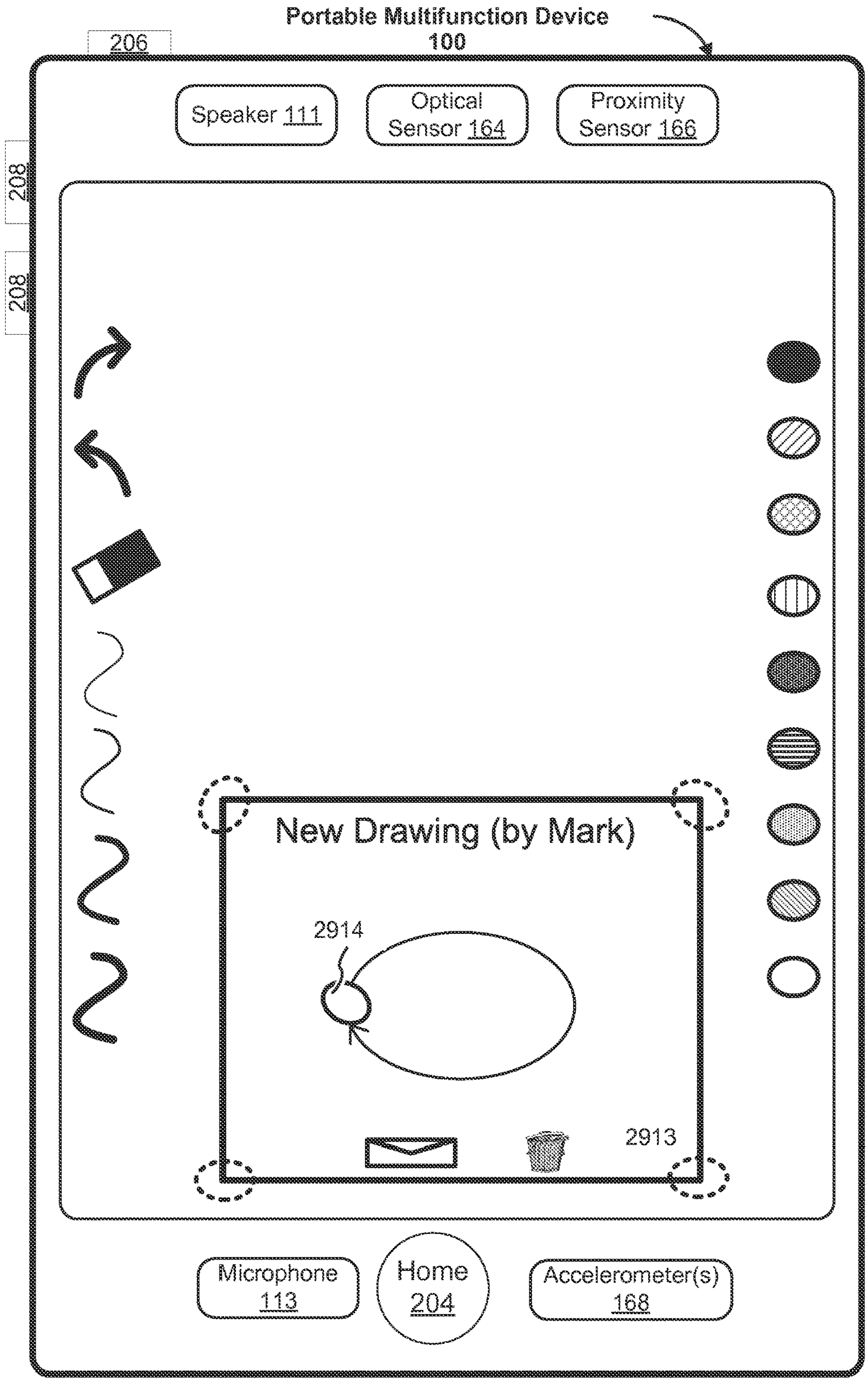
Figure 29K:
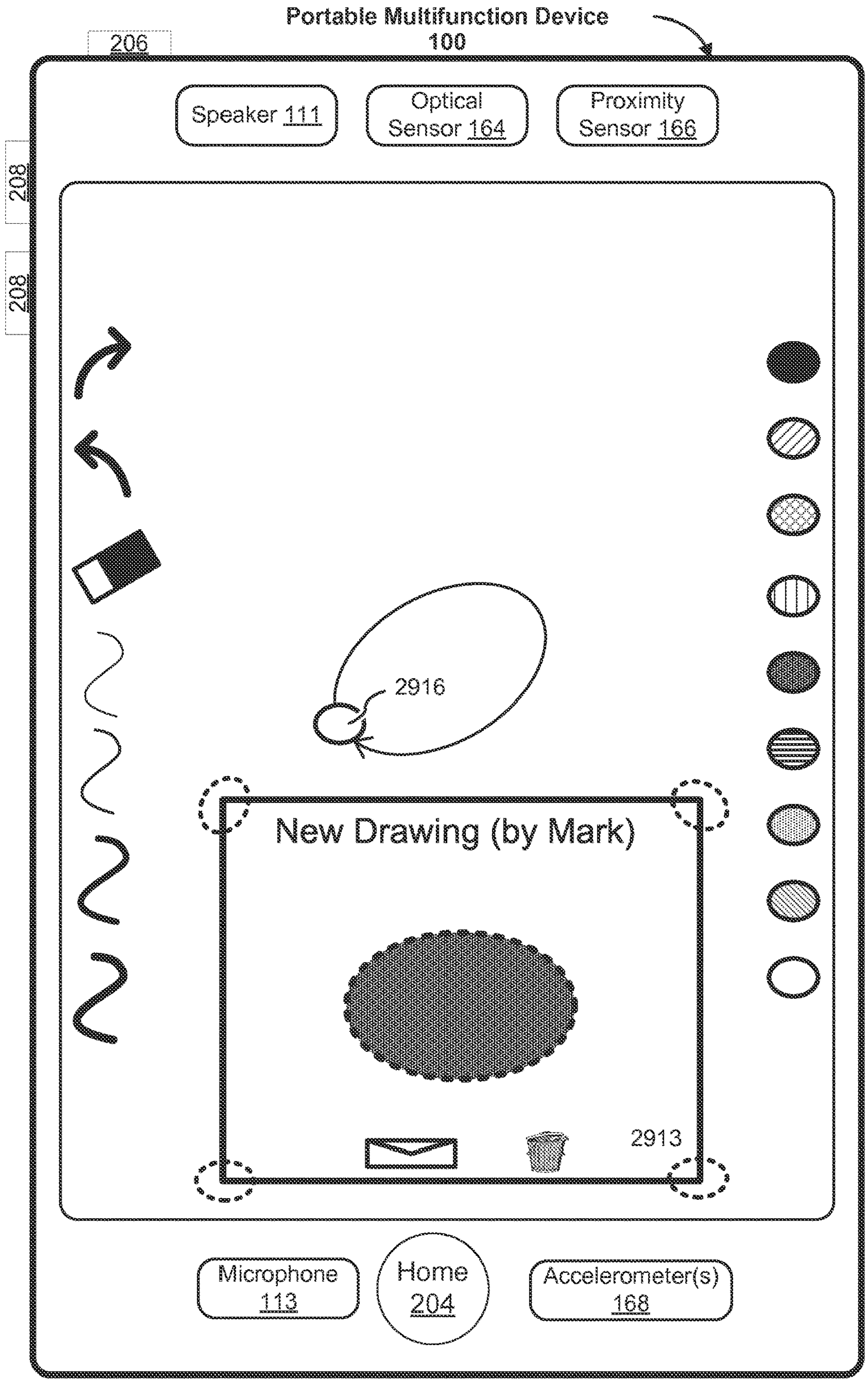
Figure 29L:
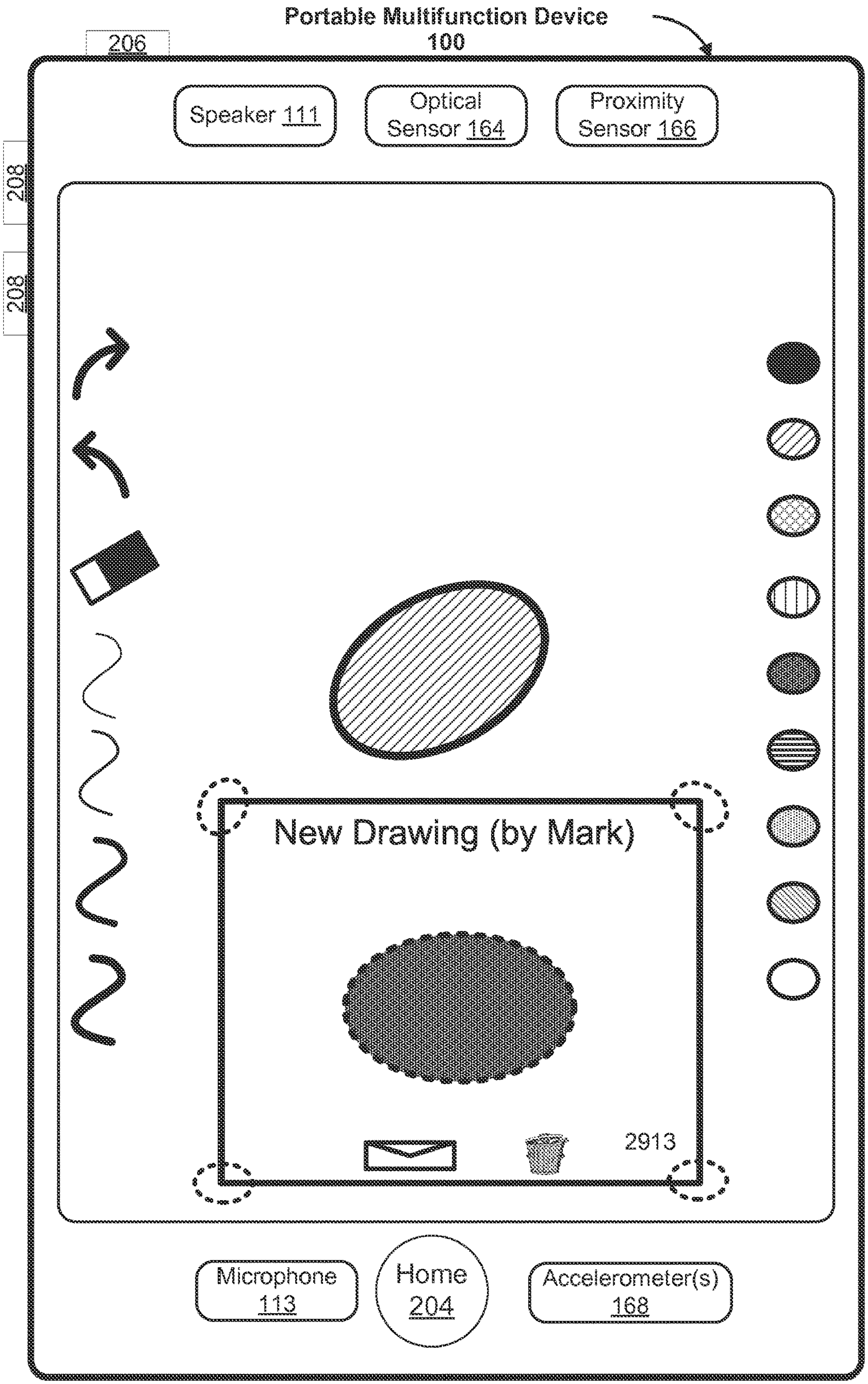
Figure 29M:
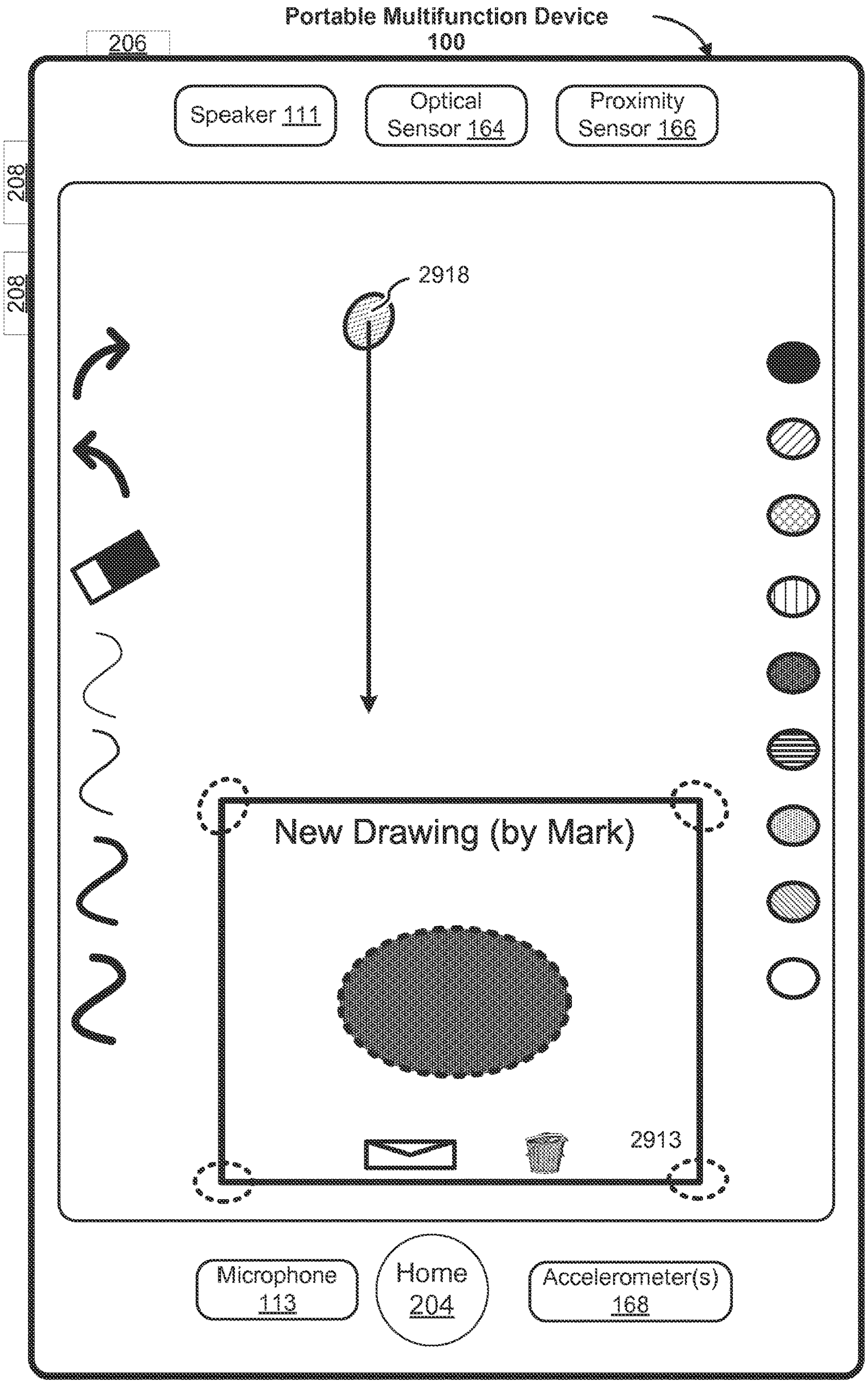
Figure 29N:
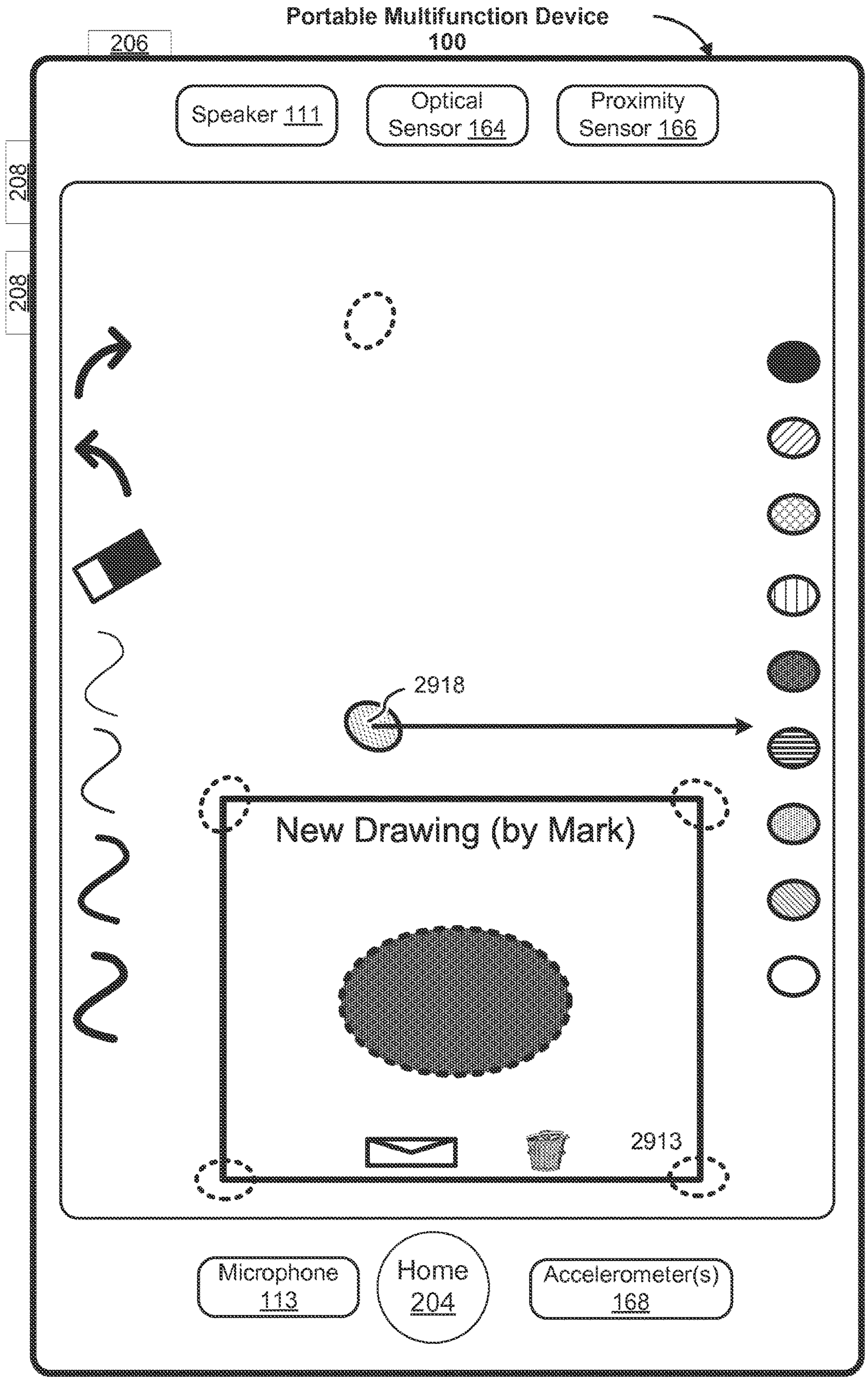
Figure 29O:
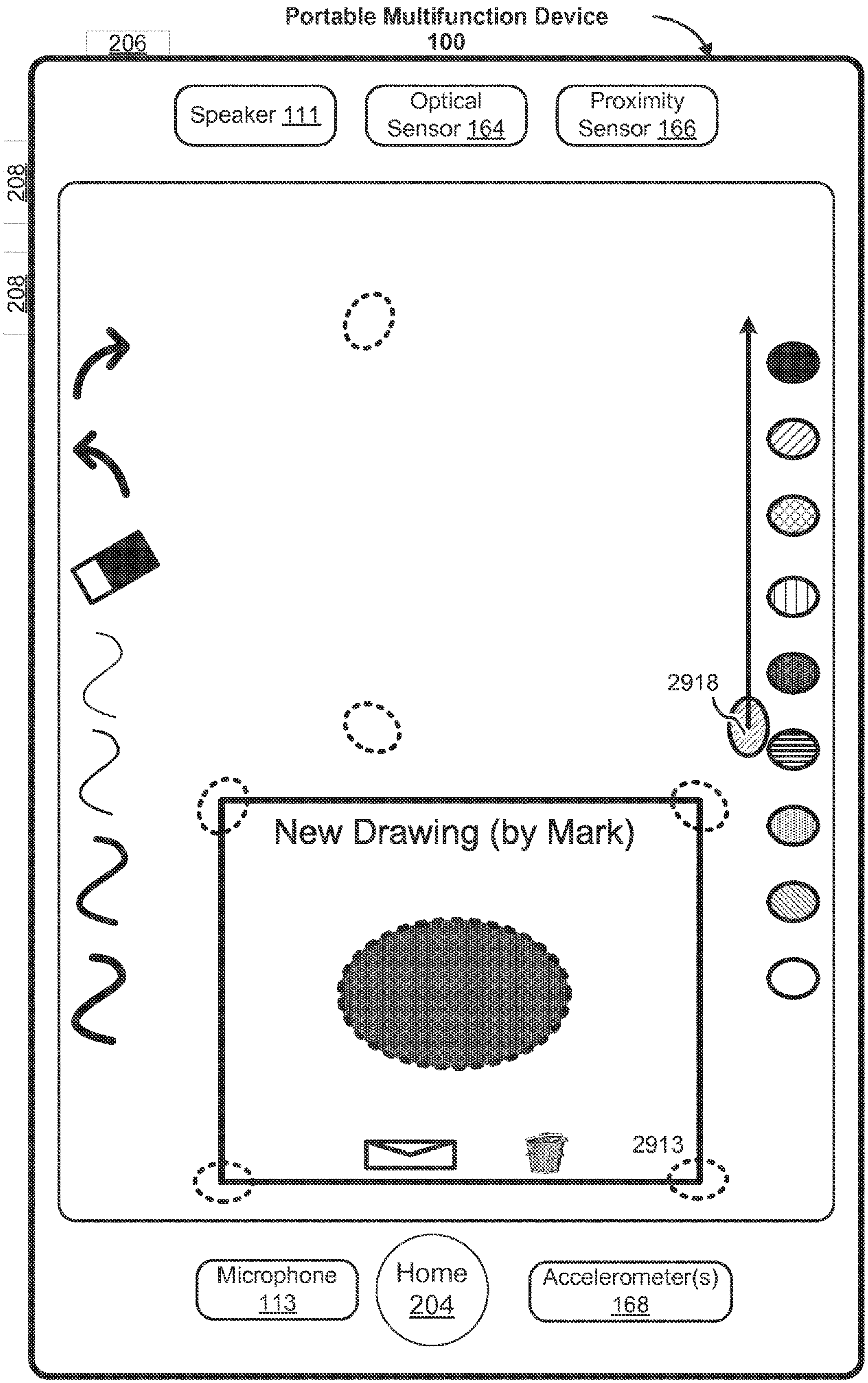
Figure 29P:
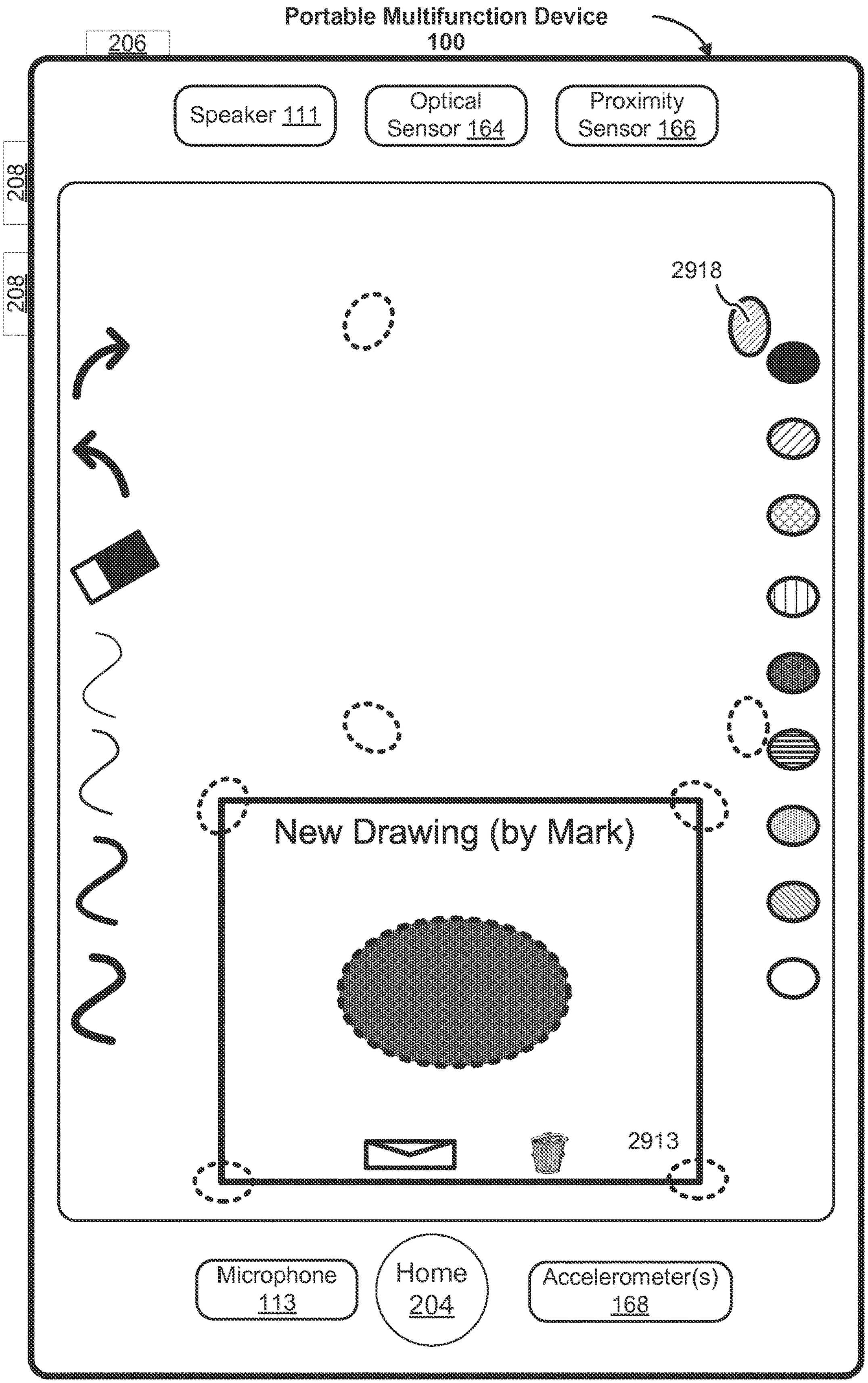

FIGS. 29J-29K further illustrate detecting a second set of one or more inputs (e.g., a contact 2914) on the touch screen 112 within the first area (e.g., within Mark's rectangular drawing workspace 2913) and attributing the contact to the first user. For example, upon detecting contact 2914 within Mark's drawing workspace 2913, the device performs a first operation in accordance with custom settings associated with the first user (e.g., the device fills in the shape and outlines the shape drawn in the first area, by movement of contact 2914, based on Mark's preferences or custom settings such as color preferences, boundary settings and the like). On the other hand, as shown in FIGS. 29K-29L the device detects a third set of one or more inputs (e.g., a contact 2916) on the touch screen 112 outside the first area (e.g., outside Mark's rectangular drawing workspace 2913) and performs a second operation (e.g., in accordance with or associated with default settings, such as default color or fill and boundary settings that are distinct from Mark's custom settings as shown in FIG. 29L).

Figure 29Q:
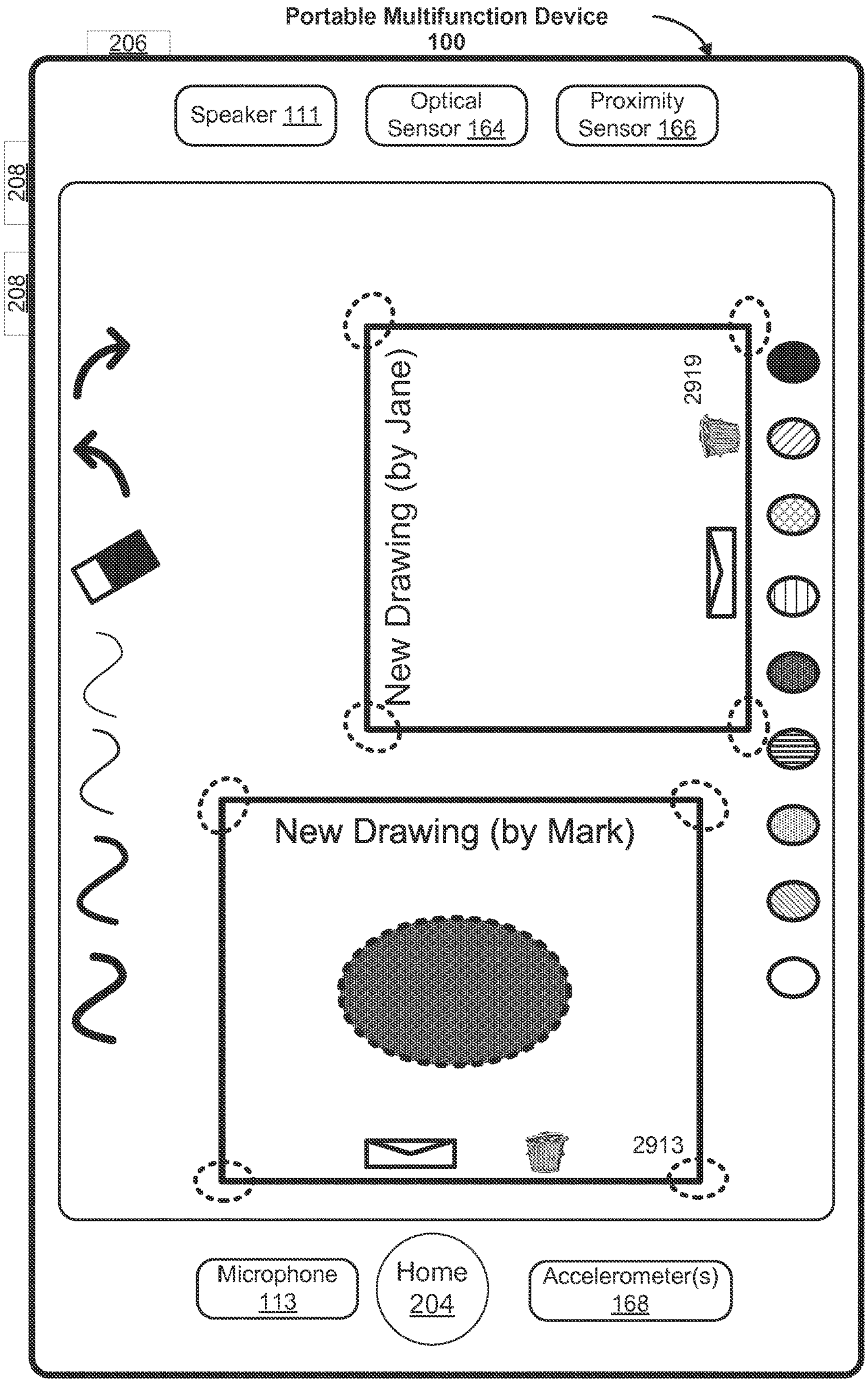

As shown in FIGS. 29M-29Q, while the first area is associated with the first user, a fourth set of one or more inputs (e.g., including one or more instances of a moving fingerprint 2918) associated with a second user (e.g., Jane) is detected on the touch screen 112. As shown in FIGS. 29M-29Q, the fourth set of one or more inputs defines a second area (e.g., rectangular drawing workspace 2919) associated with the second user (e.g., with Jane) based at least on determining that the fourth set of inputs includes one or more fingerprints (e.g., fingerprint 2918) corresponding to the second user (e.g., corresponding to Jane). As shown in FIG. 29Q, the second area (e.g., rectangular drawing workspace 2919) is proximate to the vertical right edge of the display (e.g., with reference to the orientation of the device shown in FIG. 29Q). Accordingly, the second area (including one or more user interface objects in the second area) is oriented using the vertical right edge of the display as the bottom of the second area display.

Figure 29R:
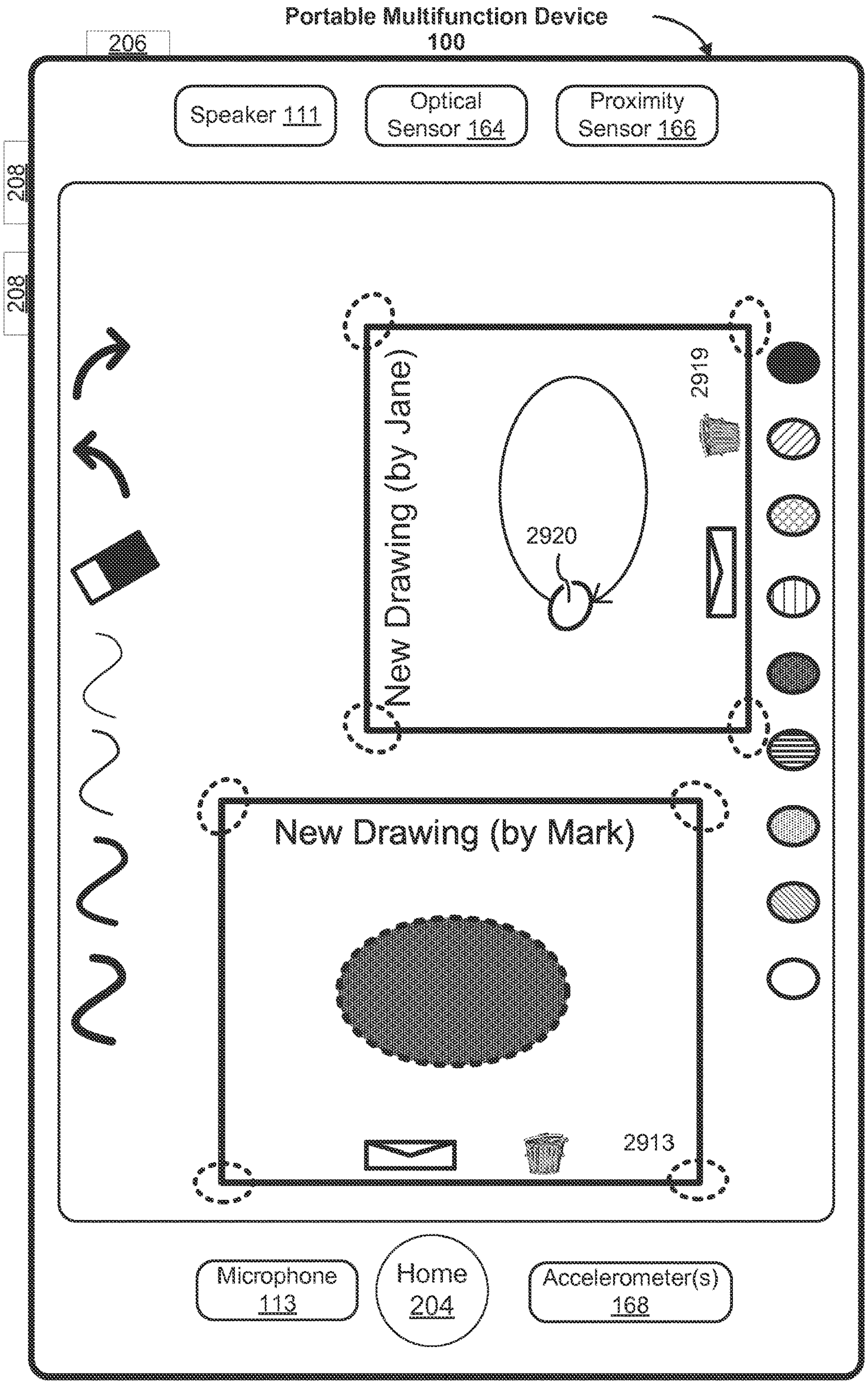
Figure 29S:
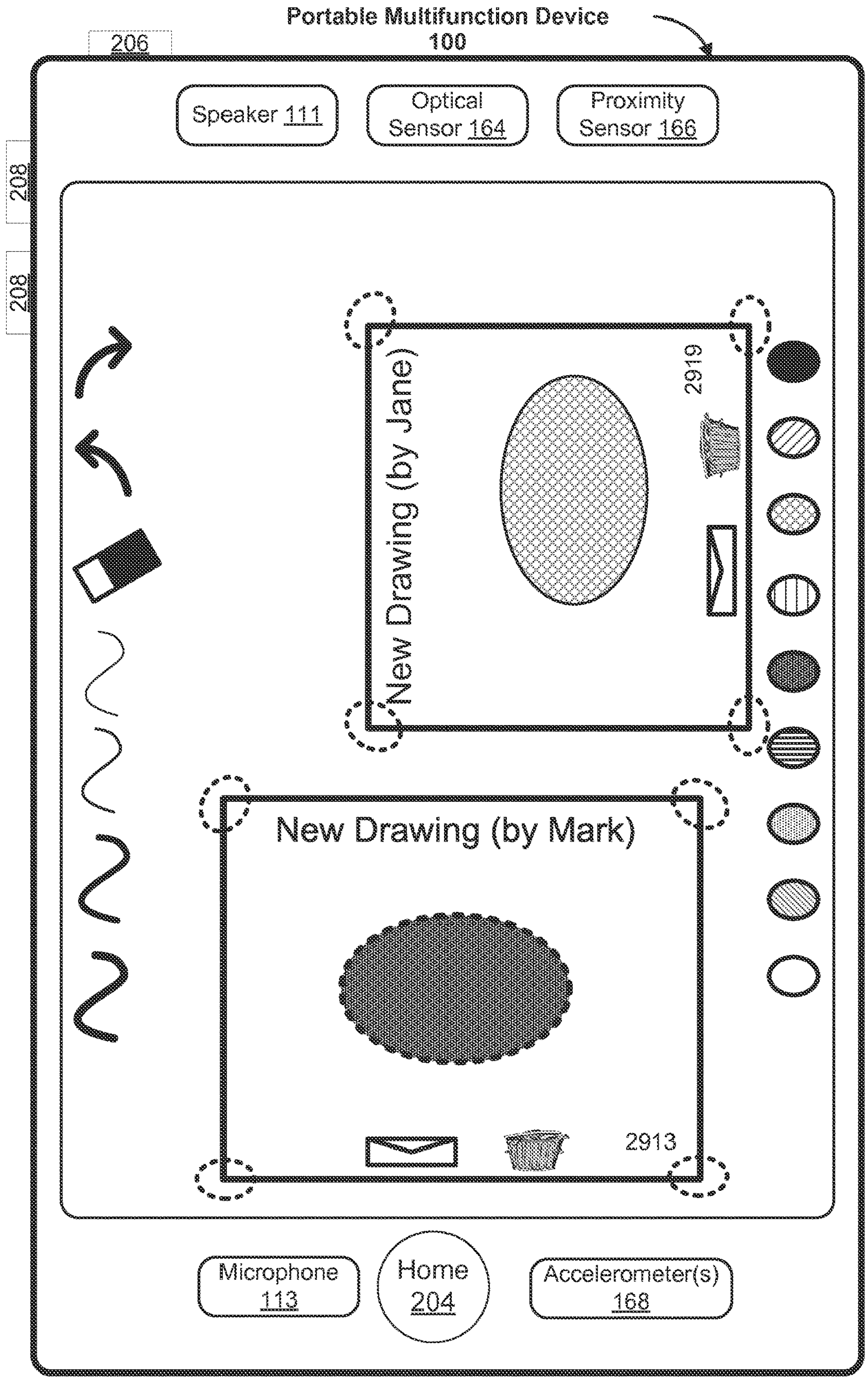
Figure 30A:
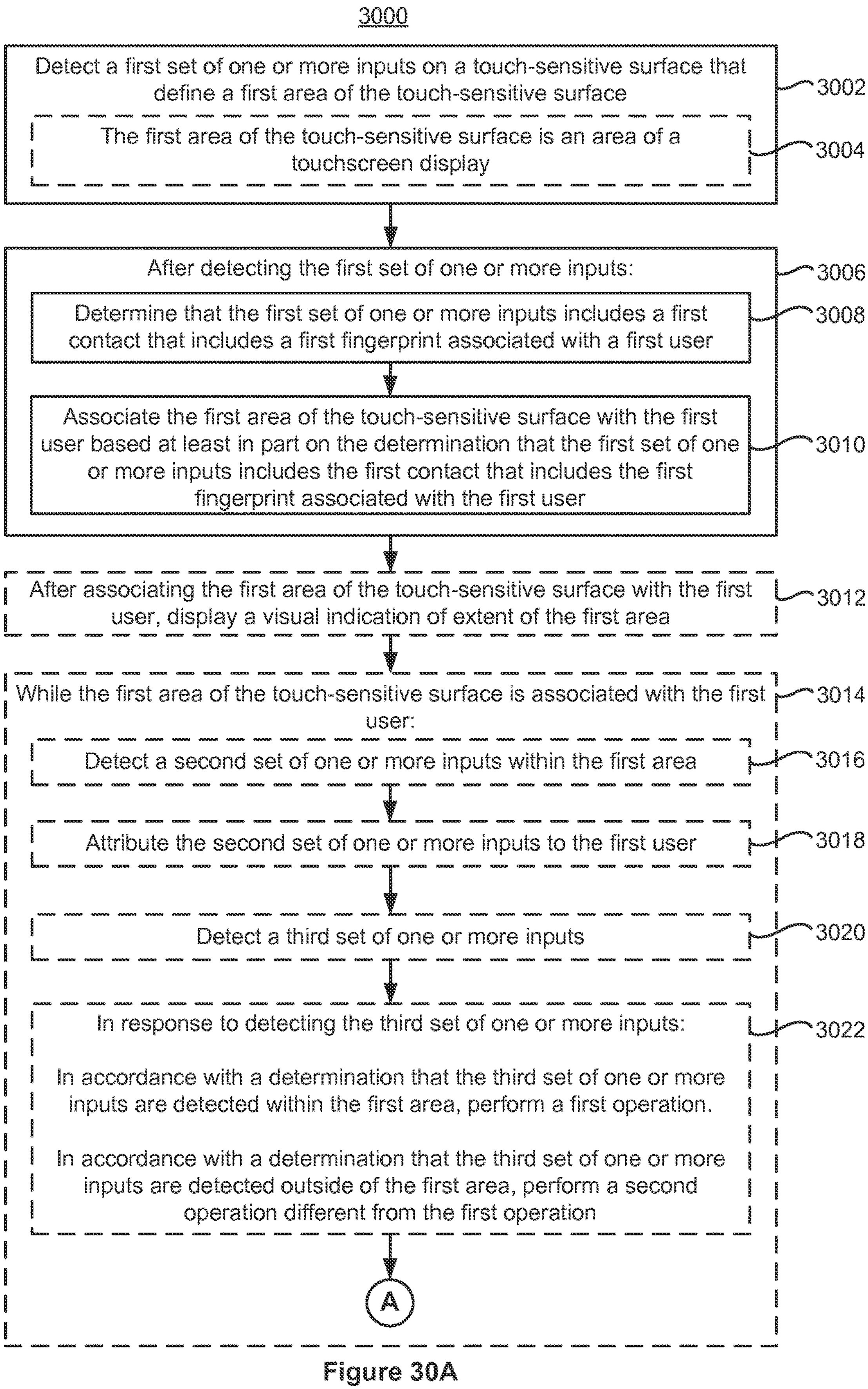
FIGS. 30A-30B are flow diagrams illustrating a method of assigning workspaces to one or more users in accordance with some embodiments.
Figure 30B:
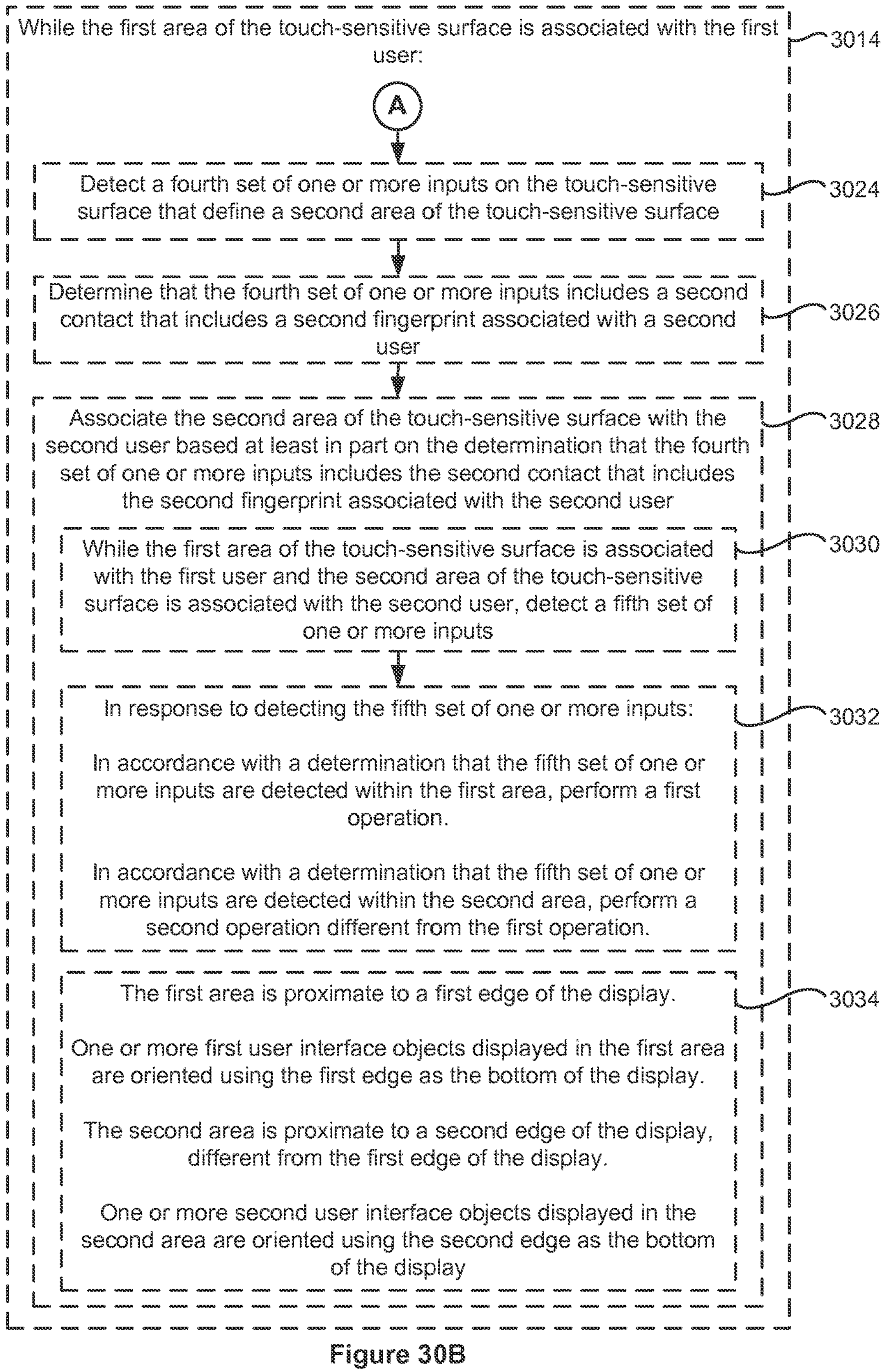

As shown in FIGS. 29R-29S, the device detects a second set of one or more inputs (e.g., a contact 2920) on the touch screen 112 within the second area (e.g., within Jane's rectangular drawing workspace 2919) and attributes the contact 2920 to the second user (e.g., to Jane). For example, upon detecting contact 2919 within Jane's drawing workspace 2919, the device performs a second operation in accordance with custom settings associated with the second user (e.g., the device fills in the shape and outlines the shape drawn in the second area by movement of contact 2919 based on Jane's preferences or custom settings such as color, boundary settings and the like). As shown in FIG. 29S, Jane's preferences specify a thinner line width and a lighter fill for objects than the line width and fill specified by Mark's preferences.

Thus, in some embodiments, after a first user defines his or her personal workspace (e.g., from a shared workspace) on a multifunction device, a second user can concurrently define his or her own workspace (e.g., distinct from the workspace of the first user). As a result, two or more users can simultaneously share a workspace on a multifunction device by partitioning it into their respective work areas using a perimeter defined by their respective finger contacts; the device then associates the respective work areas of the individual users with the respective users based on their respective fingerprints. In some embodiments, the separate workspaces correspond to different documents (e.g., a drawing document for Mark and a separate drawing document for Jane, so that when areas 2913 and 2919 are dismissed, the objects drawn by Mark and Jane will be saved in separate documents associated with the respective user who drew the object). In some embodiments, the separate workspaces correspond to different workspaces in the same document (e.g., Mark and Jane are making contributions to different portions of the same document, so that when areas 2913 and 2919 are dismissed, the objects drawn by Mark and Jane will continue to be shown in the same document).

FIGS. 30A-30B are flow diagrams illustrating a method 3000 of assigning associating areas of a touch-sensitive surface with one or more users in accordance with some embodiments. The method 3000 is performed at an electronic device (e.g., device 300, FIG. 3, or portable multifunction device 100, FIG. 1A) with a display and a touch-sensitive surface. In some embodiments, the display is a touch screen display and the touch-sensitive surface is on the display. In some embodiments, the display is separate from the touch-sensitive surface. Some operations in method 3000 are, optionally, combined and/or the order of some operations is, optionally, changed.

As described below, the method 3000 provides an intuitive way to associating areas of a touch-sensitive surface with one or more users. The method reduces the cognitive burden on a user when selecting a workspace, thereby creating a more efficient human-machine interface. For battery-operated electronic devices, enabling a user to select or self-designate a workspace faster and more efficiently conserves power and increases the time between battery charges.

The device detects (3002) a first set of one or more inputs on the touch-sensitive surface that define a first area of the touch-sensitive surface. For example, the device detects a user outlining an area of the touch-sensitive surface with a finger (e.g., as explained with reference to FIGS. 29M-29P) or detects a user placing 2, 3 or 4 fingers on the display simultaneously to identify corners of a workspace (e.g., as explained with reference to FIGS. 29A, 29C, and 29H). In some embodiments, the first area of the touch-sensitive surface is (3004) an area of a touchscreen display (e.g., first area 2904, FIG. 29B; first area 2908, FIG. 29D; first area 2913, FIG. 5I).

After detecting (3006) the first set of one or more inputs (e.g., in response to detecting the first set of one or more inputs): the device determines (3008) that the first set of one or more inputs includes a first contact that includes a first fingerprint associated with a first user (e.g., fingerprints 2902-*a*, 2902-*b*, 2902-*c*, and 2902-*d* associated with Jim, FIGS. 29A-29B; fingerprints 2906-*a*, 2906-*b*, 2906-*c*, and 2906-*d* associated with Mark, FIGS. 29C-29D; fingerprints 2912-*a*, 2912-*b*, 2912-*c*, and 2912-*d* associated with Mark, FIGS. 29H-29I). The device associates (3010) the first area of the touch-sensitive surface with the first user based at least in part on the determination that the first set of one or more inputs includes the first contact that includes the first fingerprint associated with the first user (e.g., first area 2904 associated with Jim, FIG. 29B; first area 2908 associated with Mark, FIG. 29D; first area 2913 associated with Mark, FIG. 29I). Thus, in some embodiments, a user is able to select a portion of a shared workspace on the touch-sensitive surface as the user's workspace by tracing an outline of an area in the shared workspace using one or more contacts that include fingerprints associated with the user. The user is then able to use this individual workspace to perform user-specific operations that are associated with the user (e.g., use custom applications as explained with reference to FIG. 29B; use a custom fonts and letter sizes as explained with reference to FIG. 29D; use a custom line width and boundary setting and shape color or fill as explained with reference to FIG. 29K).

In some embodiments, after associating the first area of the touch-sensitive surface with the first user, the device displays (3012) a visual indication of extent of the first area. For example, the device displays a border around the first area (e.g., a border around first area 2904 associated with Jim, FIG. 29B; or around first area 2908 associated with Mark, FIG. 29D; or around first area 2913 associated with Mark, FIG. 29I).

In some embodiments, while the first area of the touch-sensitive surface is associated (3014) with the first user, the device performs one on more steps described with reference to operations 3016-3034. The device detects (3016) a second set of one or more inputs within the first area. The device attributes (3018) the second set of one or more inputs to the first user. For example, the device performs one or more operations in response to detecting the second set of one or more inputs within the first area, stores data generated in accordance with the second set of one or more inputs in a storage location associated with the first user or otherwise treats the second set of one or more inputs as though they are inputs from the first user. In some embodiments, the second set of one or more inputs are attributed to the first user based on the location of the inputs in the first area without requiring other indications that the second set of one or more inputs correspond to the user. For example, the device does not identify fingerprints of contacts in the second set of one or more inputs. Instead, gestures that occur in the first area are assumed to be inputs by the first user.

In some embodiments, the device detects (3020) a third set of one or more inputs. In response to detecting (3022) the third set of one or more inputs: in accordance with a determination that the third set of one or more inputs are detected within the first area, the device performs a first operation (e.g., the device performs a text editing operation in accordance with the first user's font preferences as explained with reference to FIG. 29D; or upon detecting contact 2914 within the first area 2913, the device uses the first user's custom line width and shape fill for a drawing, as explained with reference to FIGS. 29J-29K); and in accordance with a determination that the third set of one or more inputs are detected outside of the first area, the device performs a second operation different from the first operation (e.g., upon detecting contact 2910 outside the first area 2908, the device minimizes the new note created by the first user and redisplays a list of recently created or edited notes, explained with reference to FIG. 29E; upon detecting contact 2916 outside the first area 2913, the device uses a default line width and shape fill for a drawing, as explained with reference to FIGS. 29K-29L). For example, inputs within the first area are translated into visual elements in accordance with user preferences of the first user (e.g., text font preference, text color preference, line color/width preference, custom dictionary or autocorrect options, or custom application toolbar settings associated with the first user), while inputs outside of the first area are translated into visual elements in accordance with default user preferences (e.g., default text font preference, default text color preference, default line color/width preference, default dictionary or autocorrect options, or default application toolbar settings).

In some embodiments, the device detects (3024) a fourth set of one or more inputs on the touch-sensitive surface that define a second area of the touch-sensitive surface (e.g., movement of contact including fingerprint 2918 that defines second area 2919, FIG. 29Q). For example, the device detects a second user outlining an area of the touch-sensitive surface (e.g., as explained with reference to FIGS. 29M-29Q) with a finger or placing 2, 3 or 4 fingers on the display simultaneously to identify corners of a workspace for the second user. The device determines (3026) that the fourth set of one or more inputs includes a second contact that includes a second fingerprint associated with a second user (e.g., fingerprint 2918 associated with Jane, FIG. 29Q). The device associates (3028) the second area of the touch-sensitive surface with the second user based at least in part on the determination that the fourth set of one or more inputs includes the second contact that includes the second fingerprint associated with the second user (e.g., the device associated second area 2919 with Jane based at least on determining that fingerprint 2918 is associated with Jane). In some embodiments, the second area of the touch-sensitive surface is distinct from (e.g., non-overlapping with) the first area of the touch-sensitive surface.

In some embodiments, while the first area of the touch-sensitive surface is associated with the first user and the second area of the touch-sensitive surface is associated with the second user, the device detects (3030) a fifth set of one or more inputs. In response to detecting the fifth set of one or more inputs: in accordance with a determination (3032) that the fifth set of one or more inputs are detected within the first area, the device performs a first operation (e.g., upon detecting contact 2914 within the first area 2913, the device uses custom settings for line width or shape fill based on Mark's preferences, as explained with reference to FIGS. 29J-29K); and in accordance with a determination that the fifth set of one or more inputs are detected within the second area, the device performs a second operation different from the first operation (e.g., upon detecting contact 2920 within the second area 2919, the device uses custom settings for line width or shape fill based on Jane's preferences, as explained with reference to FIGS. 29R-29S). For example, inputs within the first area are translated into visual elements in accordance with user preferences of the first user (e.g., text markup color, text font preference, text color preference, line color/width preference, custom dictionary or autocorrect options, and/or custom application toolbar settings associated with the first user), while inputs within the second area are translated into visual elements in accordance with user preferences of the second user (e.g., text markup color, text font preference, text color preference, line color/width preference, custom dictionary or autocorrect options, and/or custom application toolbar settings associated with the second user).

In some embodiments, the first area is proximate to a first edge of the display (e.g., first area 2913 is proximate to the horizontal lower edge of the display with reference to the orientation of the device shown in FIGS. 29G-29S); one or more first user interface objects displayed in the first area are oriented using the first edge as the bottom of the display (e.g., Mark's drawing workspace is oriented using the horizontal lower edge as the bottom, as explained with reference to FIGS. 29I-29L); the second area is proximate to a second edge of the display, different from the first edge of the display (e.g., second area 2919 is proximate to the vertical right edge of the display with reference to the orientation of the device shown in FIGS. 29G-29S); and one or more second user interface objects displayed in the second area are oriented using the second edge as the bottom of the display (e.g., Jane's drawing workspace is oriented using the vertical right edge as the bottom, as explained with reference to FIGS. 29Q-29S). For example, the device orients text/graphical objects in the first area so that "bottoms" of objects/text are towards an edge of the display closest to the first area. Similarly, the device orients text/graphical objects in the second area so that "bottoms" of objects/text are towards an edge of the display closest to the second area.

It should be understood that the particular order in which the operations in FIGS. 30A-30B have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., those methods described above) are also applicable in an analogous manner to method 3000 described above with respect to FIGS. 30A-30B. For example, the fingerprints, contacts, user interface objects, inputs, visual indications described above with reference to method 3000 optionally have one or more of the characteristics of the fingerprints, contacts, user interface objects, inputs, visual indications described herein with reference to other methods described herein (e.g., those methods described above). For brevity, these details are not repeated here.

Figure 31:
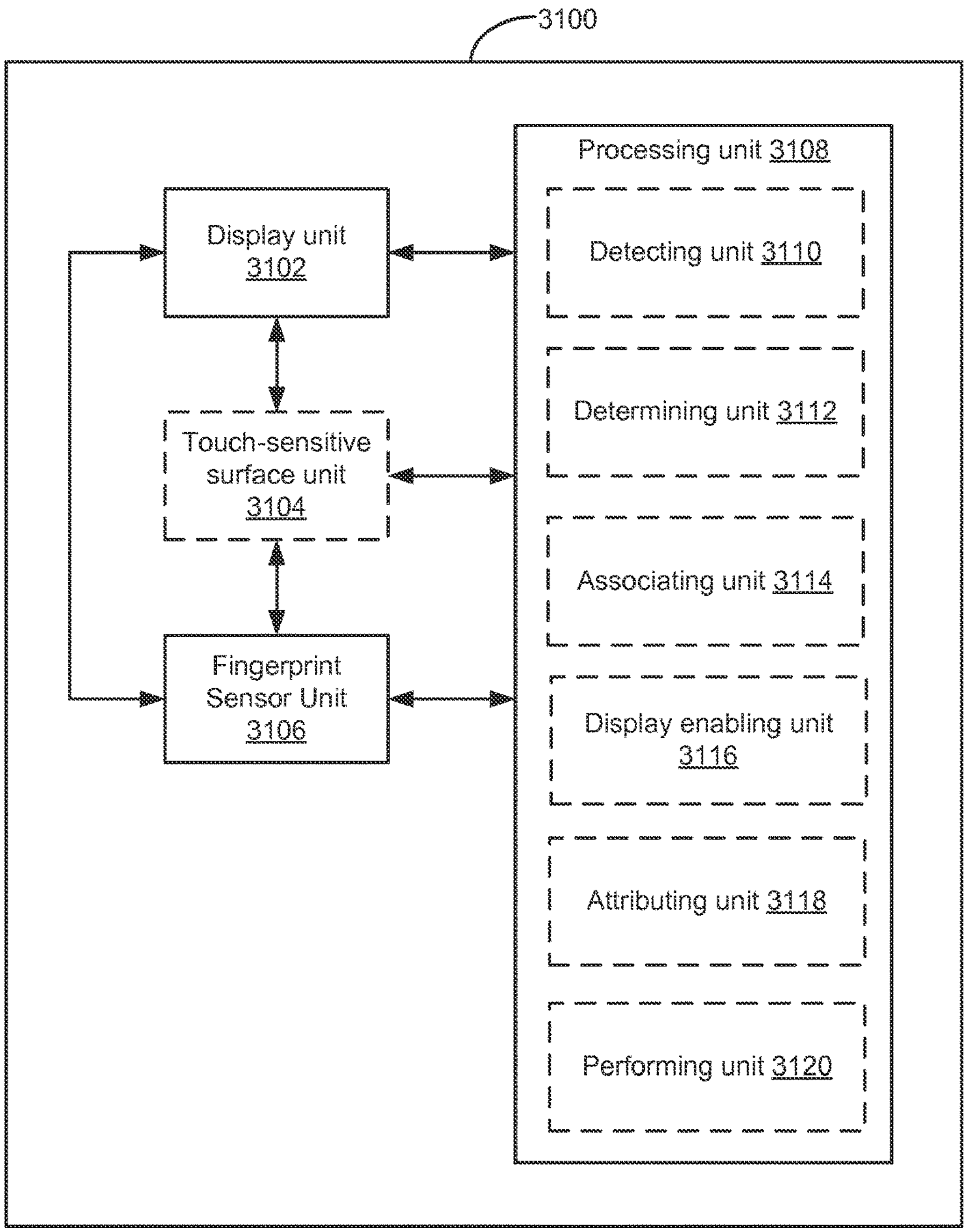
FIG. 31 is a functional block diagram of an electronic device in accordance with some embodiments.

In accordance with some embodiments, FIG. 31 shows a functional block diagram of an electronic device 3100 configured in accordance with the principles of the various described embodiments. The functional blocks of the device are, optionally, implemented by hardware, software, or a combination of hardware and software to carry out the principles of the various described embodiments. It is understood by persons of skill in the art that the functional blocks described in FIG. 31 are, optionally, combined or separated into sub-blocks to implement the principles of the various described embodiments. Therefore, the description herein optionally supports any possible combination or separation or further definition of the functional blocks described herein.

As shown in FIG. 31, an electronic device 3100 includes a display unit 3102 configured to display one or more user interface objects, a touch-sensitive surface unit 3104 configured to receive a contact on the touch-sensitive surface unit 3104, a fingerprint sensor unit 3106; and a processing unit 3108 coupled to the display unit 3102, the touch-sensitive surface unit 3104, and the fingerprint sensor unit 3106. In some embodiments, the processing unit 3108 includes a detecting unit 3110, a determining unit 3112, an associating unit 3114, a display enabling unit 3116, an attributing unit 3118, and a performing unit 3120.

The processing unit 3108 is configured to: detect a first set of one or more inputs on the touch-sensitive surface unit 3104 that define a first area of the touch-sensitive surface unit 3104 (e.g., with the detecting unit 3110); and after detecting the first set of one or more inputs: determine that the first set of one or more inputs includes a first contact that includes a first fingerprint associated with a first user (e.g., with the determining unit 3112); and associate the first area of the touch-sensitive surface unit 3104 with the first user based at least in part on the determination that the first set of one or more inputs includes the first contact that includes the first fingerprint associated with the first user (e.g., with the associating unit 3114).

In some embodiments, the first area of the touch-sensitive surface unit 3104 is an area of a touchscreen display.

In some embodiments, the processing unit 3108 is configured to, after associating the first area of the touch-sensitive surface unit 3104 with the first user, enable display of a visual indication of extent of the first area (e.g., with the display enabling unit 3116).

In some embodiments, the processing unit 3108 is configured to, while the first area of the touch-sensitive surface unit 3104 is associated with the first user: detect a second set of one or more inputs within the first area (e.g., with the detecting unit 3110); and attribute the second set of one or more inputs to the first user (e.g., with the attributing unit 3118).

In some embodiments, the processing unit 3108 is configured to: while the first area of the touch-sensitive surface unit 3104 is associated with the first user, detect a third set of one or more inputs (e.g., with the detecting unit 3110); and in response to detecting the third set of one or more inputs: in accordance with a determination that the third set of one or more inputs are detected within the first area, perform a first operation (e.g., with the performing unit 3120); and in accordance with a determination that the third set of one or more inputs are detected outside of the first area, perform a second operation different from the first operation (e.g., with the performing unit 3120).

In some embodiments, the processing unit 3108 is configured to: while the first area of the touch-sensitive surface unit 3104 is associated with the first user, detect a fourth set of one or more inputs on the touch-sensitive surface unit that define a second area of the touch-sensitive surface unit 3104 (e.g., with the detecting unit 3110); determine that the fourth set of one or more inputs includes a second contact that includes a second fingerprint associated with a second user (e.g., with the determining unit 3112); and associate the second area of the touch-sensitive surface unit 3104 with the second user based at least in part on the determination that the fourth set of one or more inputs includes the second contact that includes the second fingerprint associated with the second user (e.g., with the associating unit 3114).

In some embodiments, the processing unit 3108 is configured to: while the first area of the touch-sensitive surface unit 3104 is associated with the first user and the second area of the touch-sensitive surface unit 3104 is associated with the second user, detect a fifth set of one or more inputs (e.g., with the detecting unit 3110); and in response to detecting the fifth set of one or more inputs: in accordance with a determination that the fifth set of one or more inputs are detected within the first area, perform a first operation (e.g., with the performing unit 3120); and in accordance with a determination that the fifth set of one or more inputs are detected within the second area, perform a second operation different from the first operation (e.g., with the performing unit 3120).

In some embodiments, the first area is proximate to a first edge of the display unit 3102; one or more first user interface objects displayed in the first area are oriented using the first edge as the bottom of the display unit 3102; the second area is proximate to a second edge of the display unit 3102, different from the first edge of the display unit 3102; and one or more second user interface objects displayed in the second area are oriented using the second edge as the bottom of the display unit 3102.

The operations in the information processing methods described above are, optionally implemented by running one or more functional modules in information processing apparatus such as general purpose processors (e.g., as described above with respect to FIGS. 1A and 3) or application specific chips.

The operations described above with reference to FIGS. 30A-30B are, optionally, implemented by components depicted in FIGS. 1A-1B or FIG. 31. For example, detection operation 3002, determining operation 3008, and associating operation 3010 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub-event, such as selection of an object on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Training a User on Proper Fingering Techniques

Effectively performing tasks such as typing on an electronic device and playing a piano or electric keyboard require a user to use proper fingering techniques. For example, a technique known as “touch typing” was developed to improve a user’s speed and accuracy when typing on a keyboard (e.g., a QWERTY keyboard associated with an electronic device or typewriter). This technique involves a user lightly placing eight fingers (excluding their right and left thumbs) along the middle row of letters on a QWERTY keyboard (e.g., the user’s left pinky finger, ring finger, middle finger, and index finger are places on the “A”, “S”, “D”, and “F” keys, respectively, and the user’s right index finger, middle finger, ring finger, and pinky finger are placed on the “J”, “K”, “L”, and “;” keys, respectively). Using this set-up as a base hand position, each key of the keyboard is assigned a finger that should be used to depress the key, causing the letter associated with the depressed key to by typed on a connected device (e.g., an electronic device such as a computer, or typewriter). When proficient at touch typing, a user can rely on muscle memory, rather than visual identification, to type a string of letters, increasing their efficiency. Conventional methods for training a user on proper typing technique include instructions for a user to depress a particular key with a corresponding finger and/or perform a series of practice exercises. However, while the computer can provide feedback as to the accuracy of the letters that are typed, computer cannot provide the user with feedback as to whether they have used the correct finger to depress the respective keys on the keyboard.

Likewise, playing a musical keyboard with high proficiency requires proper fingering technique, both to produce consistent sound quality (e.g., by depressing the keys with proper technique) and to achieve adequate speed and accuracy (e.g., by simultaneously depressing a combination of keys in a chord or serially depressing a series of keys in a musical passage). Conventional methods for training a musician to play a musical keyboard (e.g., a piano) include one-on-one (e.g., "private") lessons with an instructor, who is able to demonstrate proper technique and provide feedback to the learning musician. However, private lessons can be prohibitively expensive and typically must be scheduled well in advance. Alternatively, programs exist that enable a user to connect a keyboard to an electronic device or allow use of an electronic device with a touch-sensitive surface as a proxy keyboard. Similar to programs used to learn typing on a computer, these programs are able to provide feedback on the accuracy of the notes being played, but not the user's fingering technique.

In embodiments described below, improved methods and user interfaces for training proper fingering techniques (e.g., for typing or playing a musical keyboard) are achieved at an electronic device by detecting finger contacts and analyzing the fingerprints associated with the finger contacts. In this fashion, the electronic device can determine which fingers, and in some embodiments which portion of the fingertips, were used to make the contacts. Advantageously, unlike conventional electronic methods for training typing and musical keyboard playing, the methods and user interfaces described below provide feedback indicating whether proper fingering techniques are being used (e.g., whether the correct fingers are being used for typing, whether the user is contacting a musical keyboard at the correct elevation and direction, and whether appropriate combinations of fingers are being used to play musical chords and passages). Furthermore, the methods and user interfaces described below can be used to self-teach, eliminating the costs and scheduling restrictions associated with taking private music lessons.

In some embodiments, the device is an electronic device with a separate display (e.g., display 450) and a separate touch-sensitive surface (e.g., touch-sensitive surface 451). In some embodiments, the device is portable multifunction device 100, the display is touch screen 112, and the touch-sensitive surface includes tactile output generators 167 on the display (FIG. 1A). The device described below with reference to 32A-32S and 33A-33C includes one or more fingerprint sensors 169. In some embodiments, the one or more fingerprint sensors include one or more integrated fingerprint sensors 359-1 (FIG. 4B) that are integrated in to the touch-sensitive surface (e.g., separate touch-sensitive surface 451 or touch sensitive display system 112). In some embodiments, the one or more fingerprint sensors include separate fingerprint sensors 359-2 (FIG. 4B) that are separate from the touch-sensitive surface (e.g., separate touch-sensitive surface 451 or touch sensitive display system 112). Unless specified otherwise, a fingerprint sensor 169 described below is, optionally, either an integrated fingerprint sensor 359-1 or a separate fingerprint sensor 359-2, depending on the configuration of the hardware and software of the device that includes the fingerprint sensor 169. For convenience of explanation, the embodiments described with reference to FIGS. 32A-32S and 33A-33C to a touch screen 112 with an integrated fingerprint sensor 359-1 (e.g., a touch screen 112 with a spatial resolution that is high enough to detect fingerprint features formed by individual fingerprint ridges), however analogous operations are, optionally, performed on a device with a separate fingerprint sensor 359-1 in response to detecting the inputs described in FIGS. 32A-32S on the integrated fingerprint sensor 359-1 while displaying the user interfaces shown in FIGS. 32A-32S on the display 450.

FIGS. 32A-32S illustrate multifunction device 100 having a touch screen 112 with a spatial resolution that is high enough to detect fingerprint features formed by individual fingerprint ridges, allowing them to be used as fingerprint sensors. In some embodiments, multifunction device 100 alternatively, or in addition, has a separate fingerprint sensor 169. FIGS. 32A-32P illustrate user interface 3200 displayed on touch screen 112, user interface 3200 including musical keyboard 3201 having a plurality of activatable user interface objects (e.g., keys 3202-1 to 3202-24). FIGS. 32Q-32S illustrate user interface 3240 displayed on touch screen 112, user interface 3240 including QWERTY character entry keyboard 3222 having a plurality of activatable user interface objects (e.g., keys 3232-1 to 3232-41). FIGS. 32C-32K and 32M include audio frequency meter 3210 showing the one or more sound frequencies of audio output 3208 generated at speaker 111 in response to an audio output generating event (e.g., detection of a qualifying contact at a position on touch screen 112 corresponding to the display of a key on musical keyboard 3201). These audio frequency meters are typically not part of the displayed user interface, but are provided to aid in the interpretation of the figures.

FIGS. 32A-32P illustrate various embodiments where multifunction device 100 detects a fingerprint pattern of a contact at a position on touch screen 112 corresponding to display of an activatable music key in a musical keyboard, and based upon one or more characteristics of the fingerprint pattern, provides feedback to the user if the fingering used to make the contact on touch screen 112 is not a preferred fingering and plays a note (e.g., generated audio output 3208) if the fingering used to make the contact is a preferred fingering.

For example, FIGS. 32A-32G illustrate various embodiments in which multifunction device 100 detects a fingerprint pattern of contact 3204 at a position on touch screen 112 corresponding to display of key 3202-5 (e.g., the "E3" key) on musical keyboard 3201, as illustrated in FIG. 32A. Multifunction device 100 determines whether the fingerprint pattern of contact 3204 corresponds to a preferred fingering, the preferred fingering including at least a criterion that the finger corresponding to the fingerprint pattern of contact 3204 used to activate "E3" key 3202-5 is the user's left middle finger.

FIGS. 32B, 32D-32F illustrate various embodiments in which the fingering used to make contact 3205 is not a preferred fingering based upon at least a criterion that the "E3" key 3202-5 is contacted by the user's left middle finger. Multifunction device 100 analyzes a fingerprint pattern of contact 3205 (e.g., including at least a determination of the identity of the finger corresponding to the fingerprint pattern) and determines that contact 3205 in FIGS. 32B, 32D-32F was made by the user's left ring (LR) finger. Because the user's left ring finger does not match the predetermined preferred finger (e.g., the user's left middle finger), multifunction device 100 provides feedback to the user indicating that a preferred fingering was not used.

In some embodiments, the feedback indicating that the user has used the wrong finger (e.g., their left ring finger instead of their left middle finger) includes visual feedback. For example, as illustrated in FIGS. 32B and 32D, when "E3" key 3202-5 is contacted with the user's left ring (LR) finger, large "X" 3206 is displayed on touch screen 112.

In some embodiments, the feedback indicating that the user has used the wrong finger (e.g., their left ring finger instead of their left middle finger) includes audible feedback. For example, as illustrated in FIG. 32E, when "E3" key 3202-5 is contacted with the user's left ring (LR) finger, multifunction device 100 generates audio output 3208 at speaker 111 having a frequency 3210 of 161.00 Hz, which is out of tune with a true "E3" tone, which has a frequency of 164.81 Hz. Particularly when played in a sequence of notes (e.g., as part of a musical passage), or in a chord, the user perceives that the note is "off," indicating that they have used a non-preferred fingering.

In some embodiments, the feedback indicating that the user has used the wrong finger (e.g., their left ring finger instead of their left middle finger) includes tactile feedback. For example, as illustrated in FIG. 32F, when "E3" key 3202-5 is contacted with the user's left ring (LR) finger, multifunction device 100 generates tactile output 3212 (e.g., using tactile output generator 167).

Figure 32C:
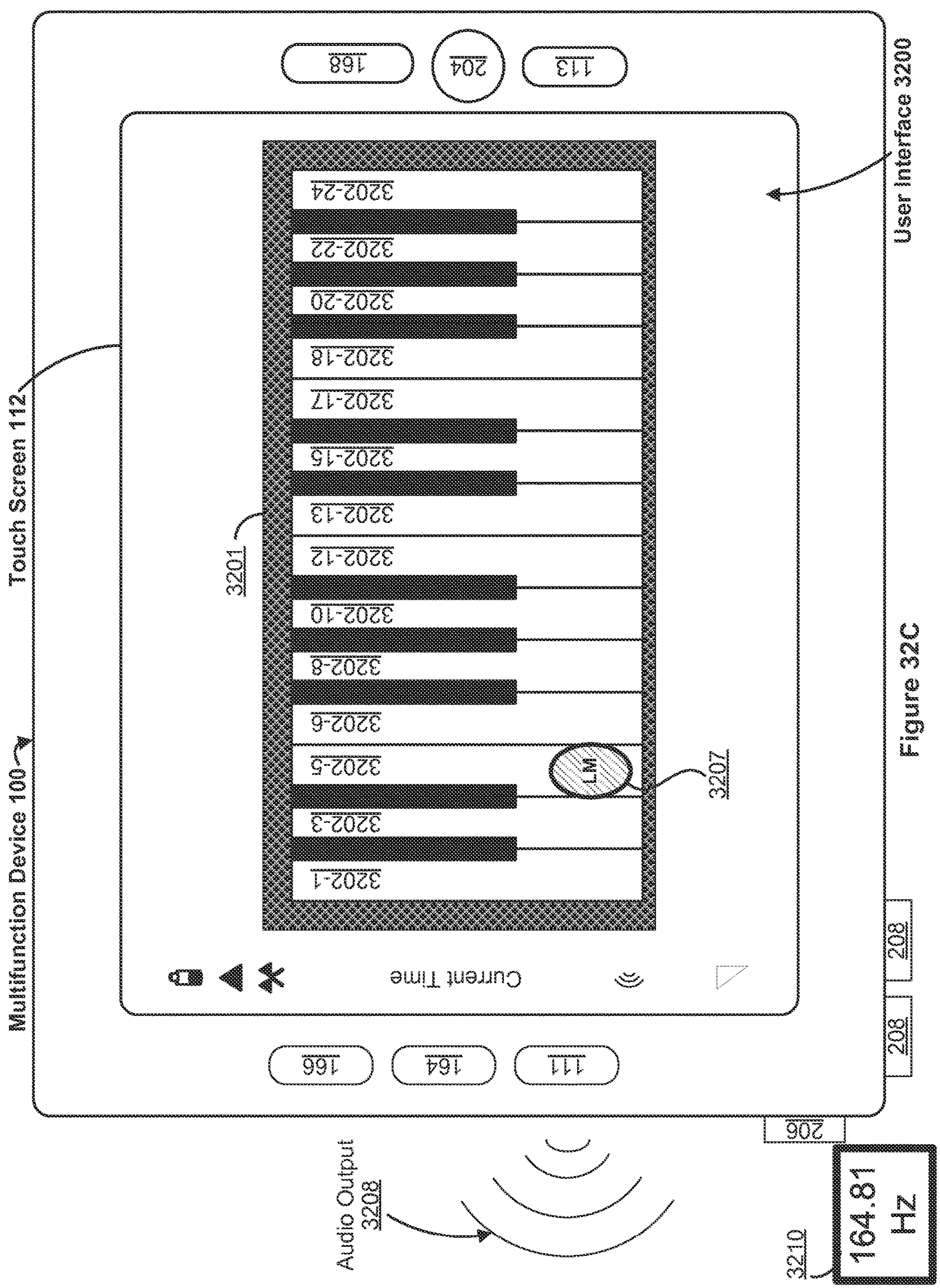
Figure 32D:
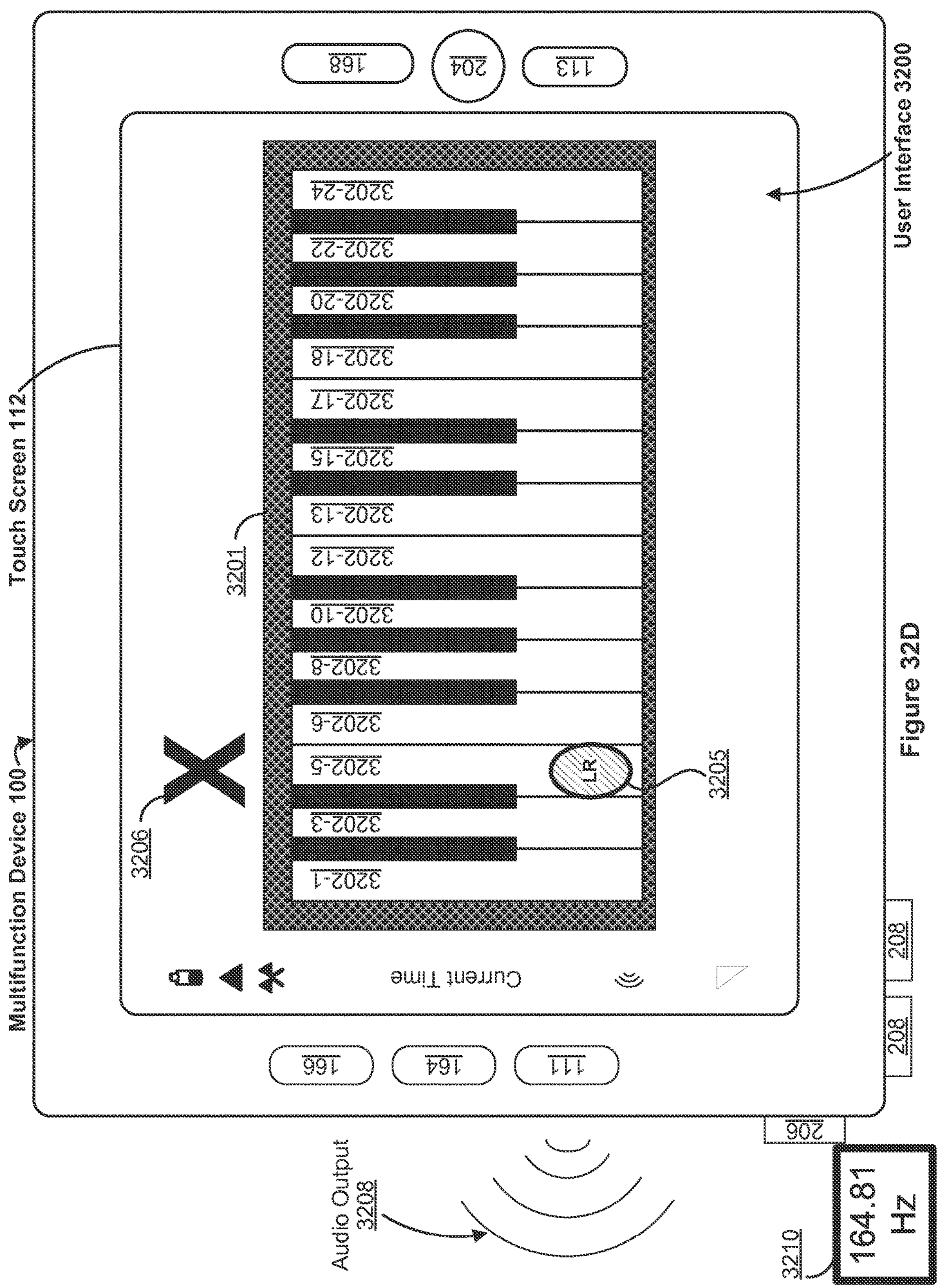
Figure 32E:
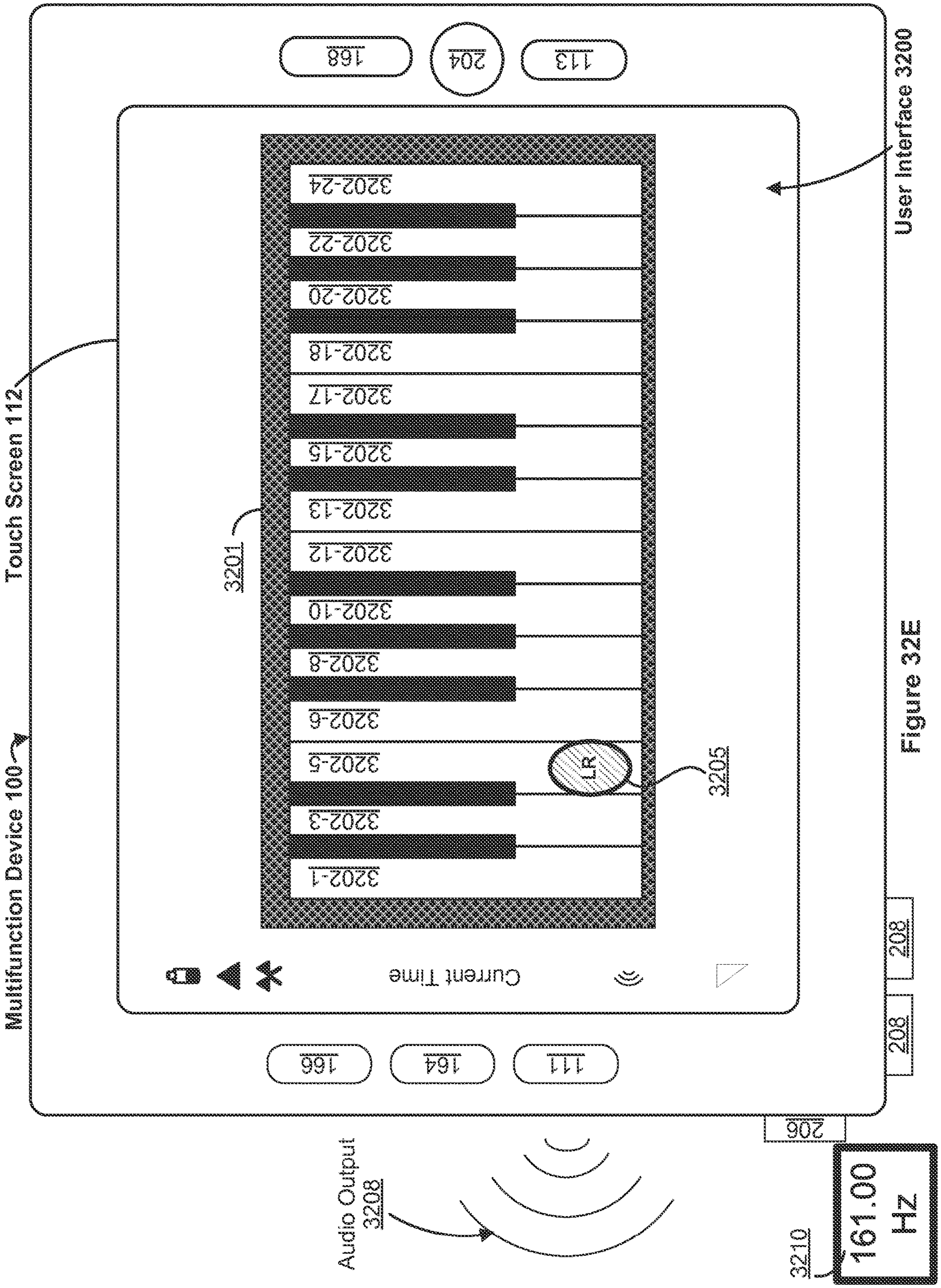
Figure 32F:
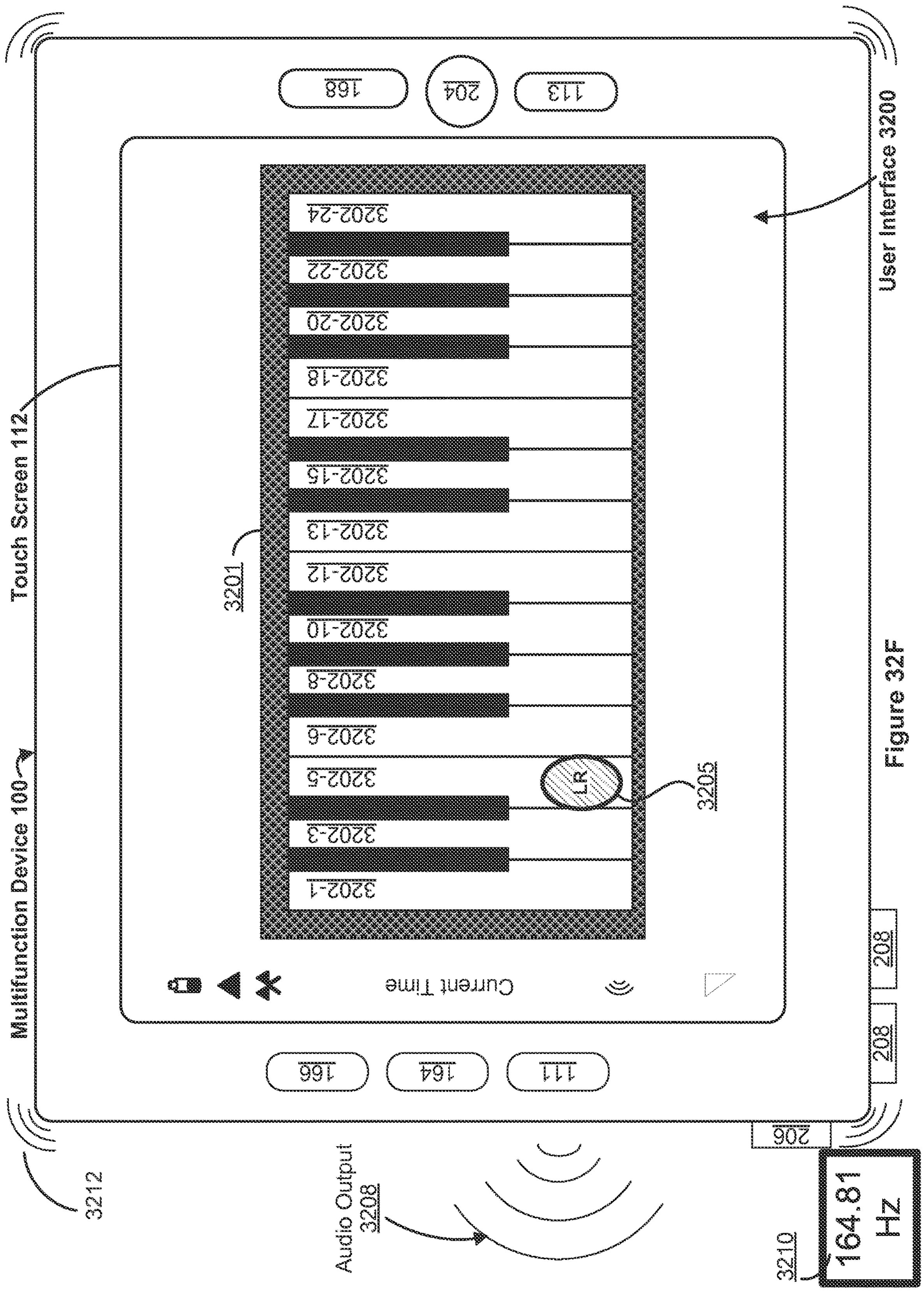
Figure 32G:
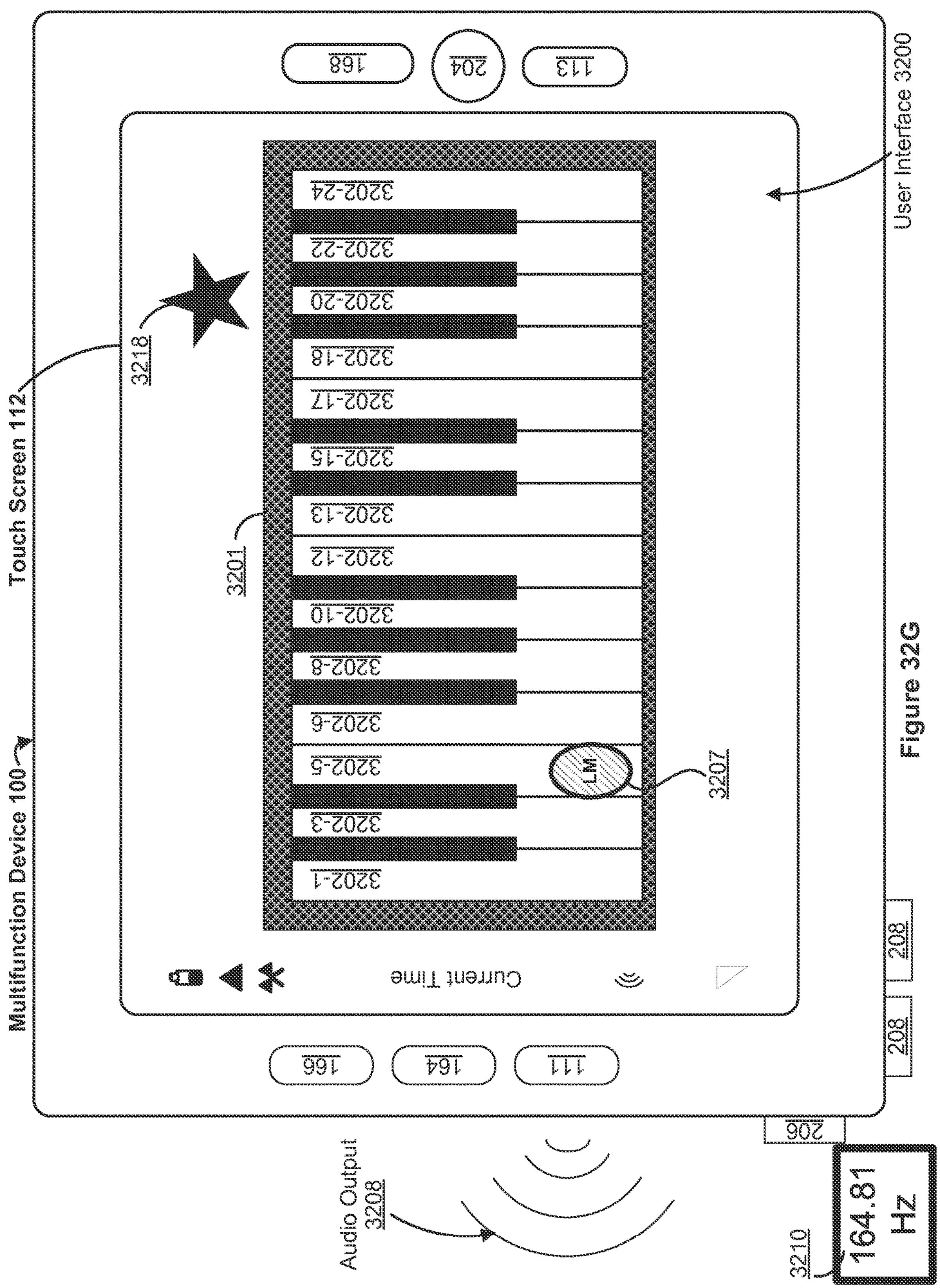

FIGS. 32C and 32G illustrate various embodiments in which the fingering used to make contact 3207 is a preferred fingering based upon at least a criterion that the "E3" key 3202-5 is contacted by the user's left middle (LM) finger. Multifunction device 100 analyzes a fingerprint pattern of contact 3207 (e.g., including at least a determination of the identity of the finger corresponding to the fingerprint pattern) and determines that contact 3207 in FIGS. 32C and 32G was made by the user's left middle (LM) finger. Because the user's left middle finger is the predetermined preferred finger, multifunction device 100 generates audio output 3208 at speaker 111 having a frequency of 164.81 Hz, corresponding to the true frequency of an "E3" tone. In FIG. 32C, in accordance with some embodiments, multifunction device 100 does not provide feedback indicating that the preferred fingering was used. In FIG. 32G, in accordance with some embodiments, multifunction device 100 provides feedback indicating that the preferred fingering was used by displaying star 3218 on touch screen 112.

Figure 32H:
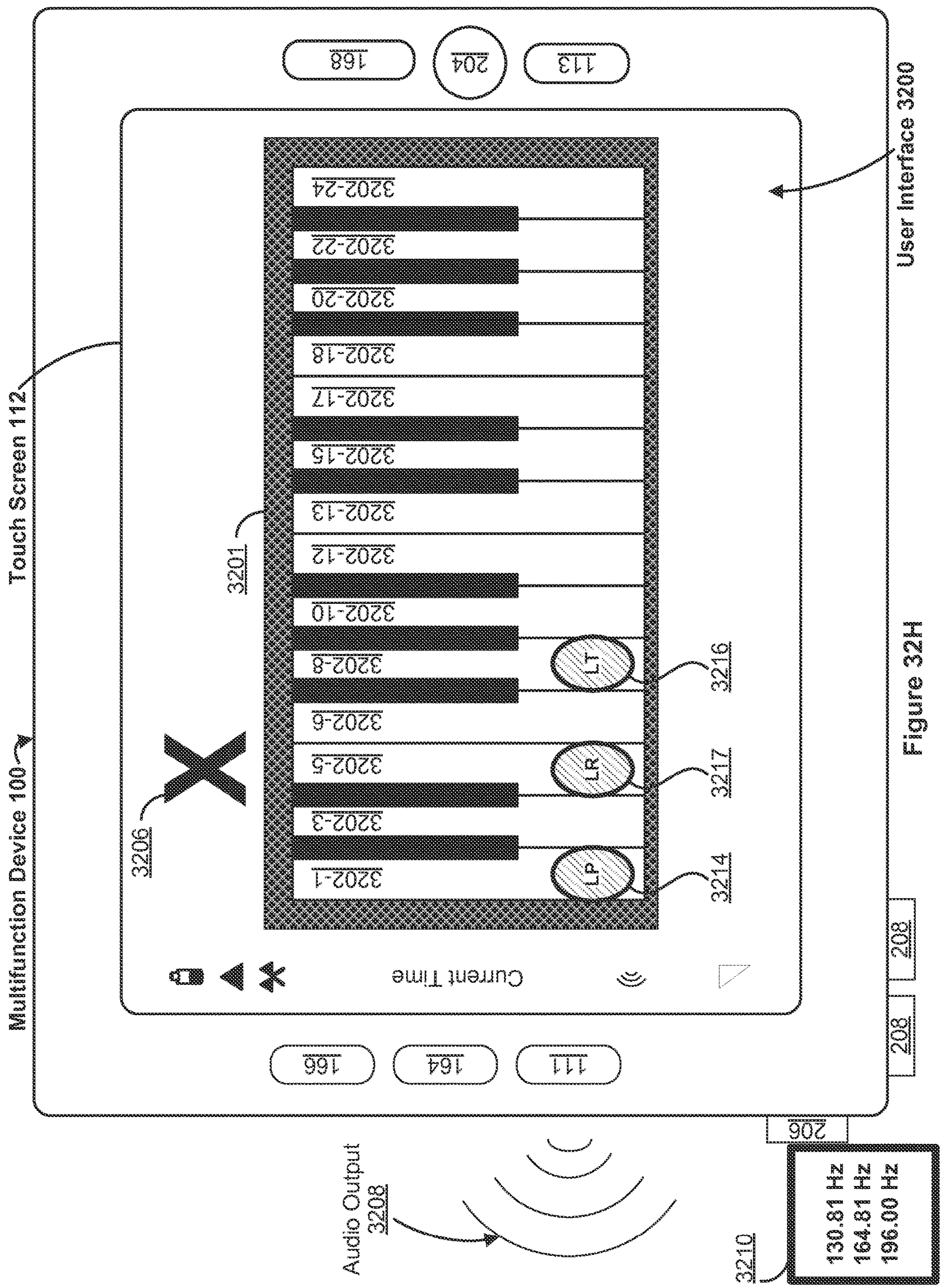
Figure 32I:
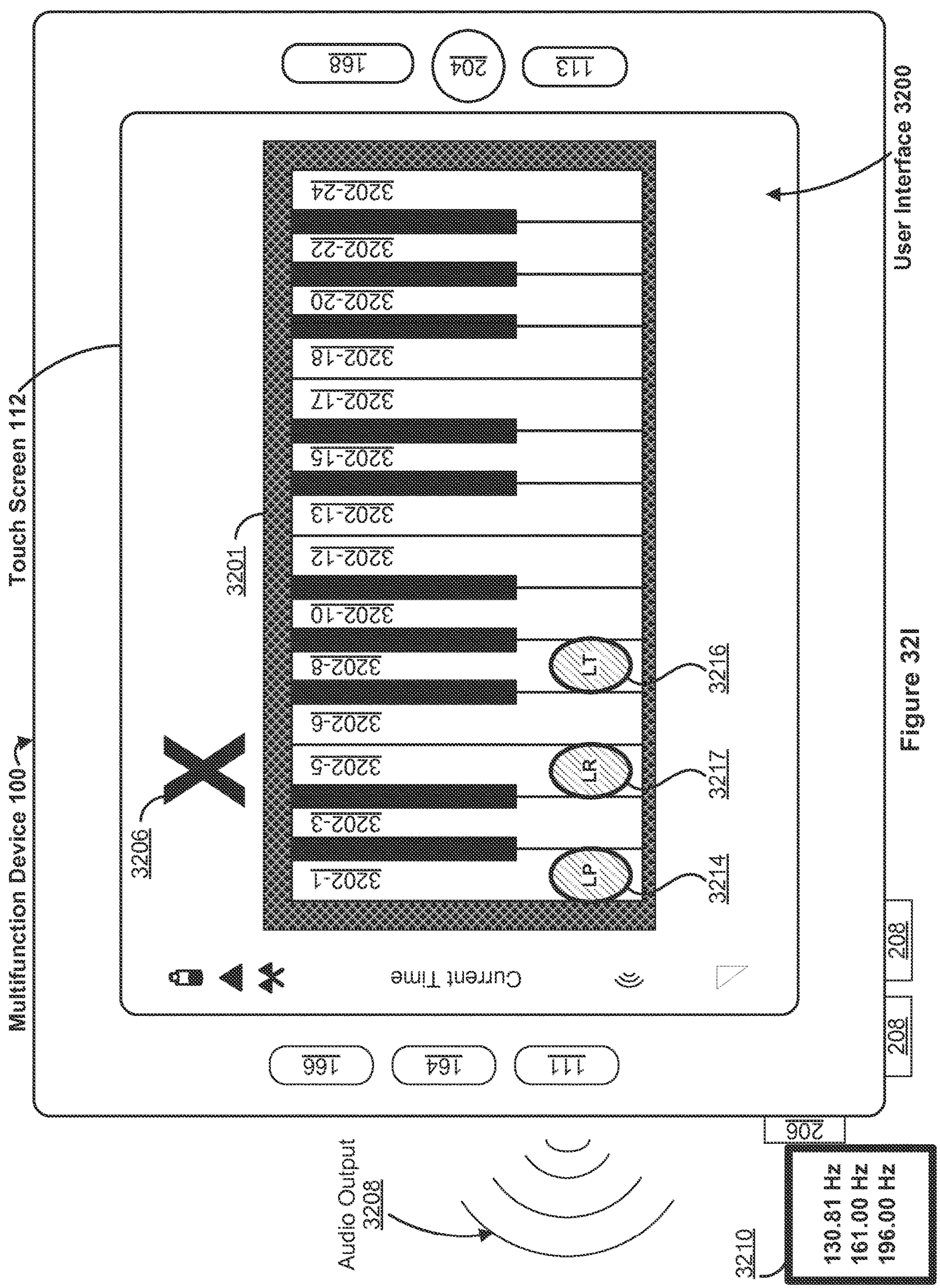
Figure 32J:
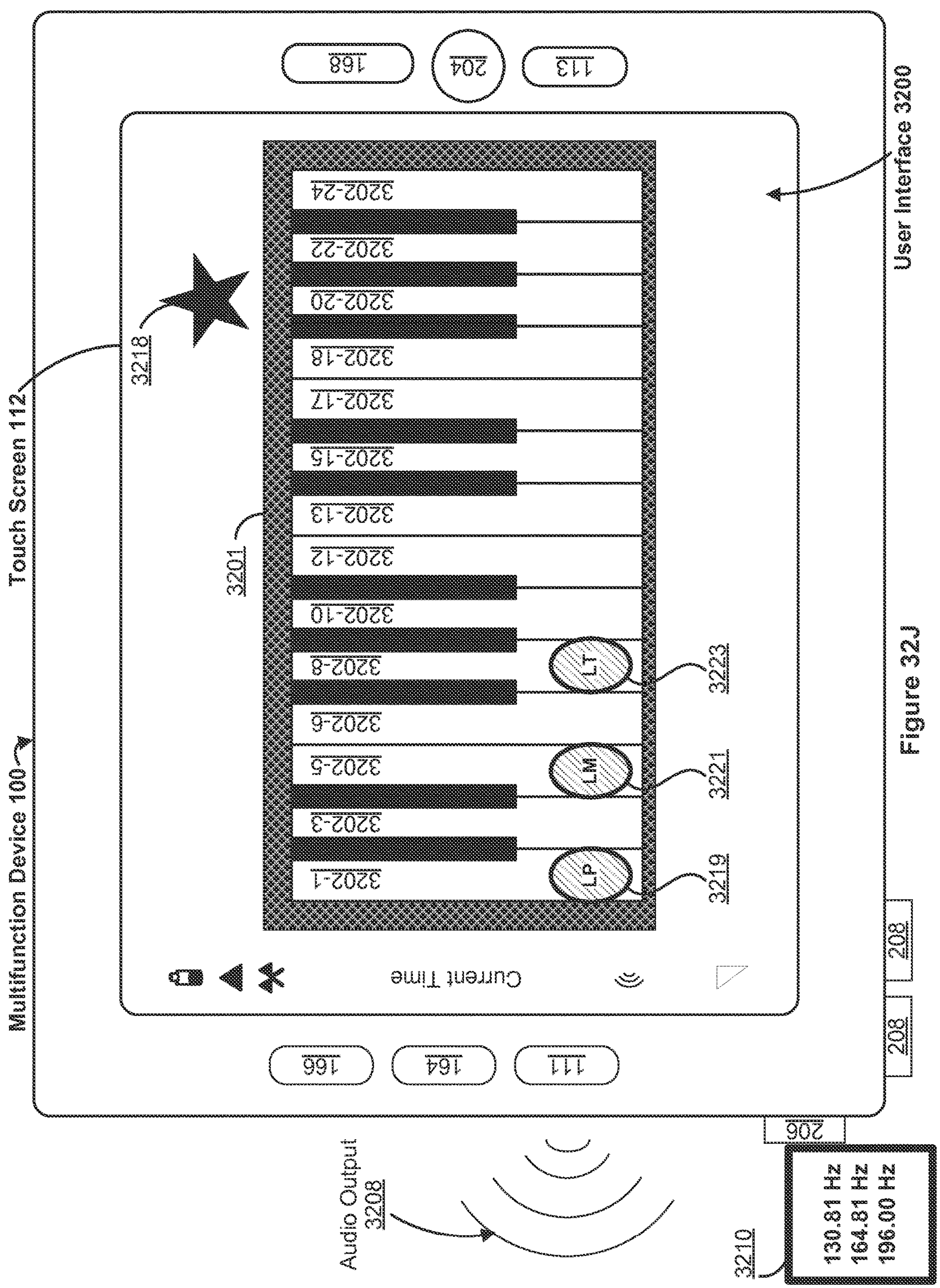

FIGS. 32H-32J illustrate various embodiments in which the preferred fingering to play a C-major triad includes a user's left pinky finger, left middle finger, and left thumb. For example, the preferred fingering criteria includes criterion that the fingerprint patterns of contacts 3214, 3217, and 3216, used to activate "C" key 3202-1, "E3" key 3202-5, and "G" key 3202-8 on musical keyboard 3201 in FIGS. 32H-32J, respectively, correspond to the preferred fingering.

FIGS. 32H-32I illustrate various embodiments in which the fingering used to make contacts 3214, 3217, and 3216 in FIGS. 32H-32I is not the preferred fingering, because the fingerprint pattern of contact 3217 in FIGS. 32H-32I, used to activate "E3" key 3202-5 on musical keyboard 3201, corresponds to the user's left ring (LR) finger, rather than the user's left middle finger. In FIG. 32H, in accordance with some embodiments, multifunction device 100 provides visual feedback indicating that a non-preferred fingering was used by displaying large "X" 3206 on touch screen 112. In FIG. 32I, in accordance with some embodiments, multifunction device 100 provides visual and audio feedback indicating that a non-preferred fingering was used by displaying large "X" 3206 on touch screen 112 and by generating audio output 3208 at speaker 111, audio output 3208 including a tone having a frequency of 161.00 Hz, creating a C major chord that is audibly out of tune.

FIG. 32J illustrates an embodiment in which the fingering used to play the C major triad is the preferred fingering, based at least on a determination that the fingerprint patterns of contacts 3219, 3221, and 3223 in FIG. 32J correspond to the user's left pinky finger (LP), left middle finger (LM), and left thumb (LT), respectively. In response, in accordance with some embodiments, multifunction device 100 generates audio output 3208 at speaker 111 corresponding to a properly tuned C major triad and provides visual feedback indicating that the fingering used to play the chord was the preferred fingering, by displaying star 3218 on touch screen 112.

Figure 32K:
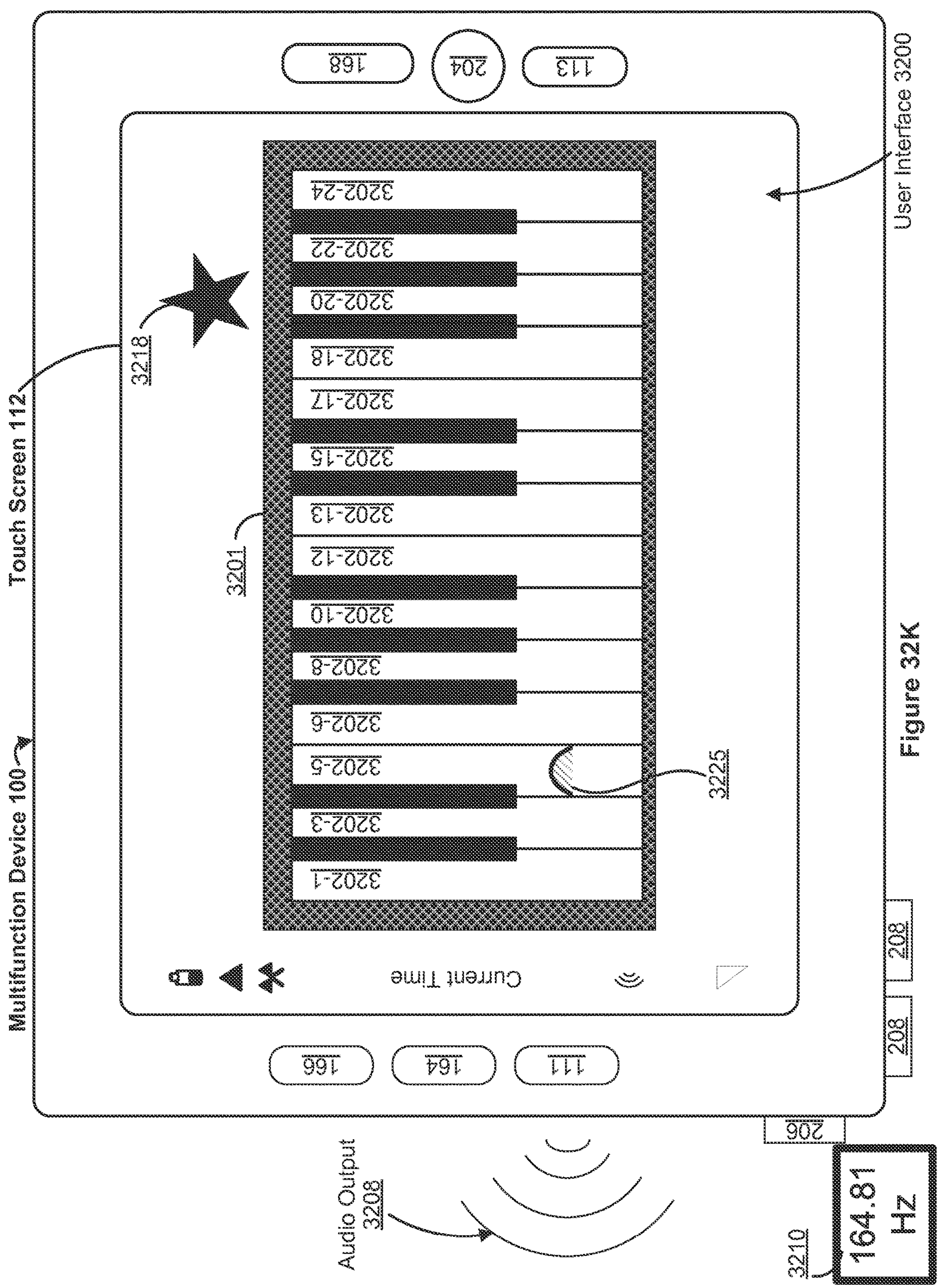
Figure 32L:
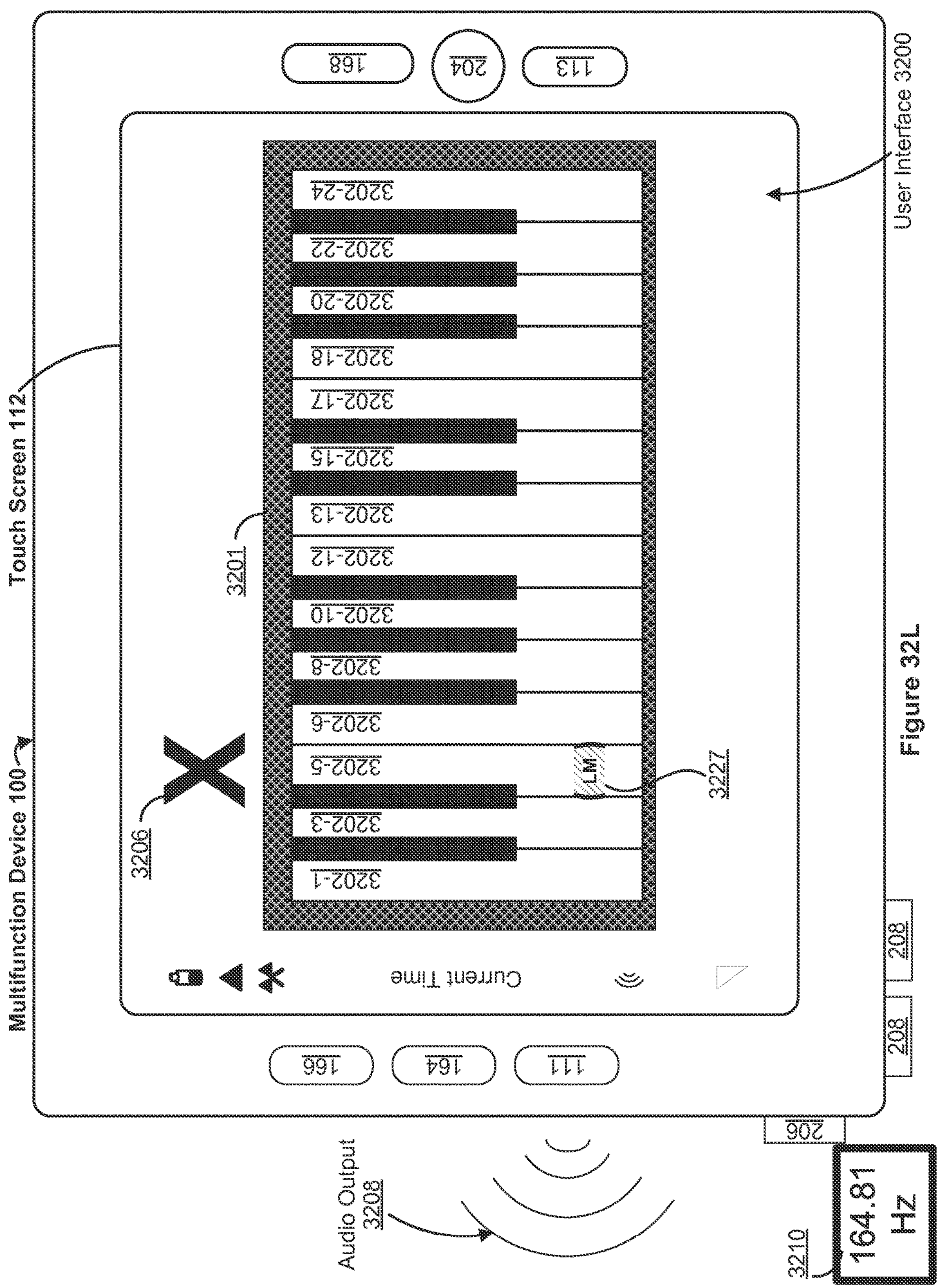

FIG. 32K-32L illustrate various embodiments in which the preferred fingering criteria include a criterion that the fingerprint pattern of the activating contact corresponds with the user contacting touch screen 112 with the tip of their fingertip, as opposed to the pad or entirety of their fingertip.

As illustrated in FIG. 32K, multifunction device 100 detects contact 3225 at a position on touch screen 112 corresponding to the display of activatable "E3" key 3202-5 of musical keyboard 3201. Because the fingerprint pattern of contact 3225 in FIG. 32K corresponds to the tip of the user's left middle (LM) fingertip, multifunction device 100 determines that the contact meets the predetermined fingering criteria and generates audio output 3208 at speaker 111 having a frequency of 164.81 Hz, corresponding to a properly tuned "E3" tone. Multifunction device 100, in accordance with some embodiments, also provides visual feedback indicating that the fingering used to play the note was the preferred fingering, by displaying star 3218 on touch screen 112.

FIG. 32L illustrates an embodiment in which the preferred fingering criteria, including a criterion that a tip of the user's finger is used to activate the key, are not met. Multifunction device 100 detects contact 3227 on touch screen 112 at a position corresponding to display of "E3" key 3202-5 on musical keyboard 3201 in FIG. 32L. Upon a determination that contact 3227 in FIG. 32L does not meet the preferred fingering criteria, because the fingertip pattern of the contact corresponds to the pad of the user's left middle (LM) fingertip, Multifunction device 100 displays large "X" 3206 on touch screen 112, providing visual feedback indicating that preferred fingering was not user.

FIGS. 32M-32P illustrate various embodiments in which the preferred fingering criteria further includes a criterion that the user activate a musical key with a finger motion moving backward towards an edge of the musical keyboard.

Figure 32M:
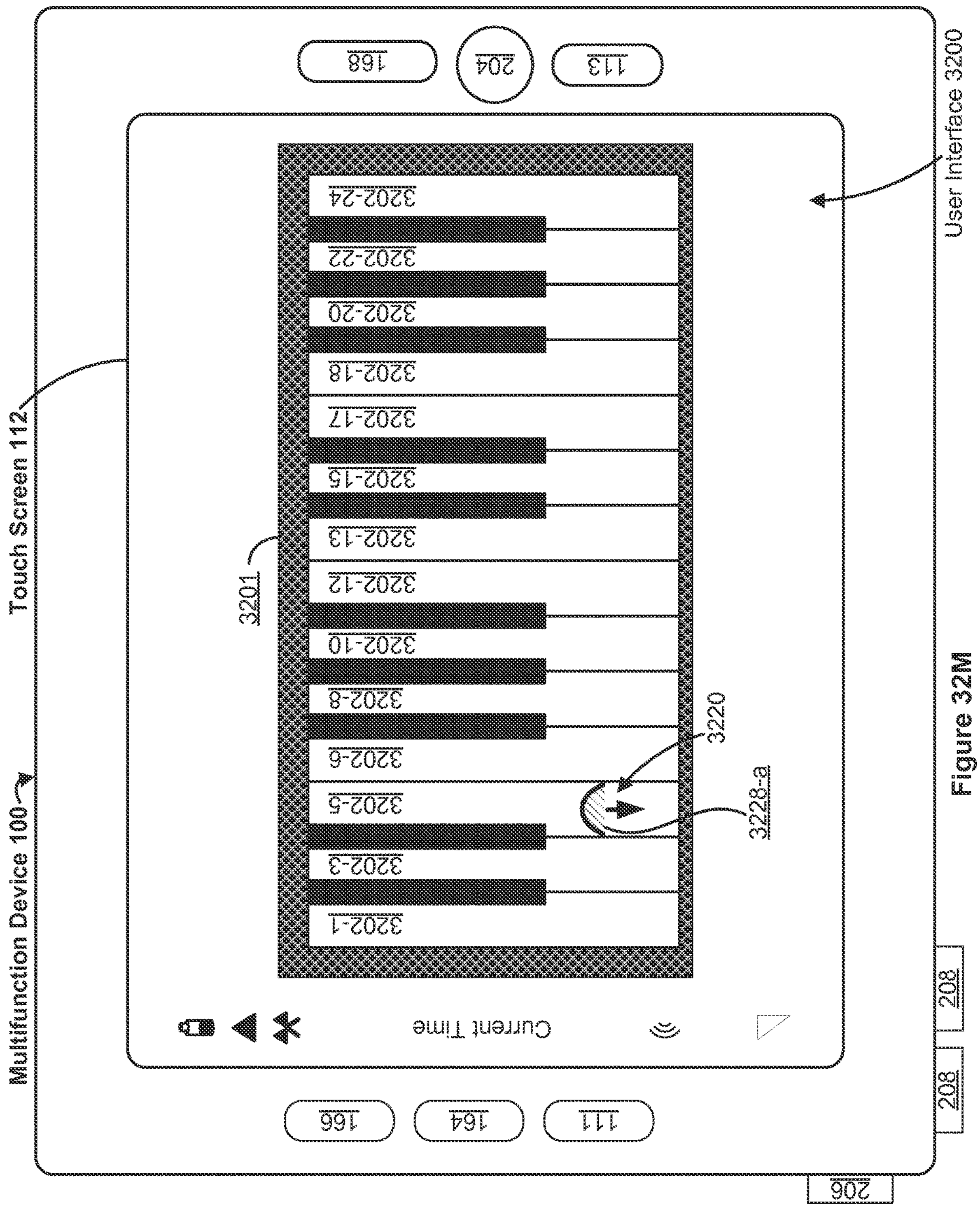
Figure 32N:
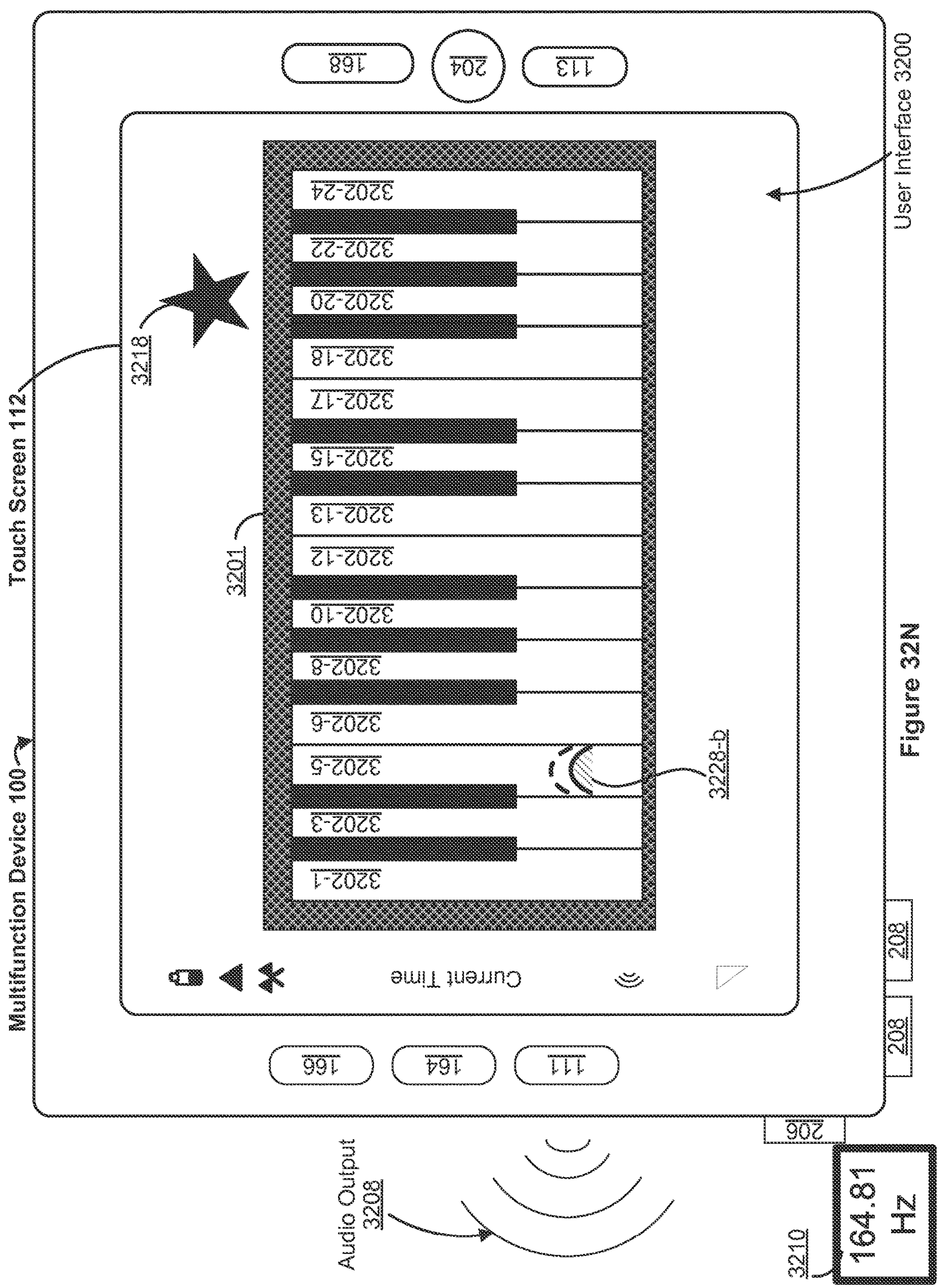

As illustrated in FIGS. 32M-32N, multifunction device 100 detects contact 3228 at a position on touch screen 112 corresponding to the display of activatable "E3" key 3202-5 of musical keyboard 3201. Because the fingerprint pattern of contact 3228 includes movement 3220 of contact 3228 from position 3228-*a* on touch screen 112 in FIG. 32M to position 3228-*b* on touch screen 112 in FIG. 32N, multifunction device 100 determines that the contact meets the predetermined fingering criteria and, in response, generates audio output 3208 at speaker 111 having a frequency of 164.81 Hz, corresponding to a properly tuned "E3" tone. Multifunction device 100, in accordance with some embodiments, also provides visual feedback indicating that the fingering used to play the note was the preferred fingering, by displaying star 3218 on touch screen 112 in FIG. 32N. The fingerprint pattern of contact 3228 in FIGS. 32M-32N also corresponds to the tip of the user's left middle (LM) fingertip, further matching preferred fingering criteria in accordance with some embodiments.

Figure 32O:
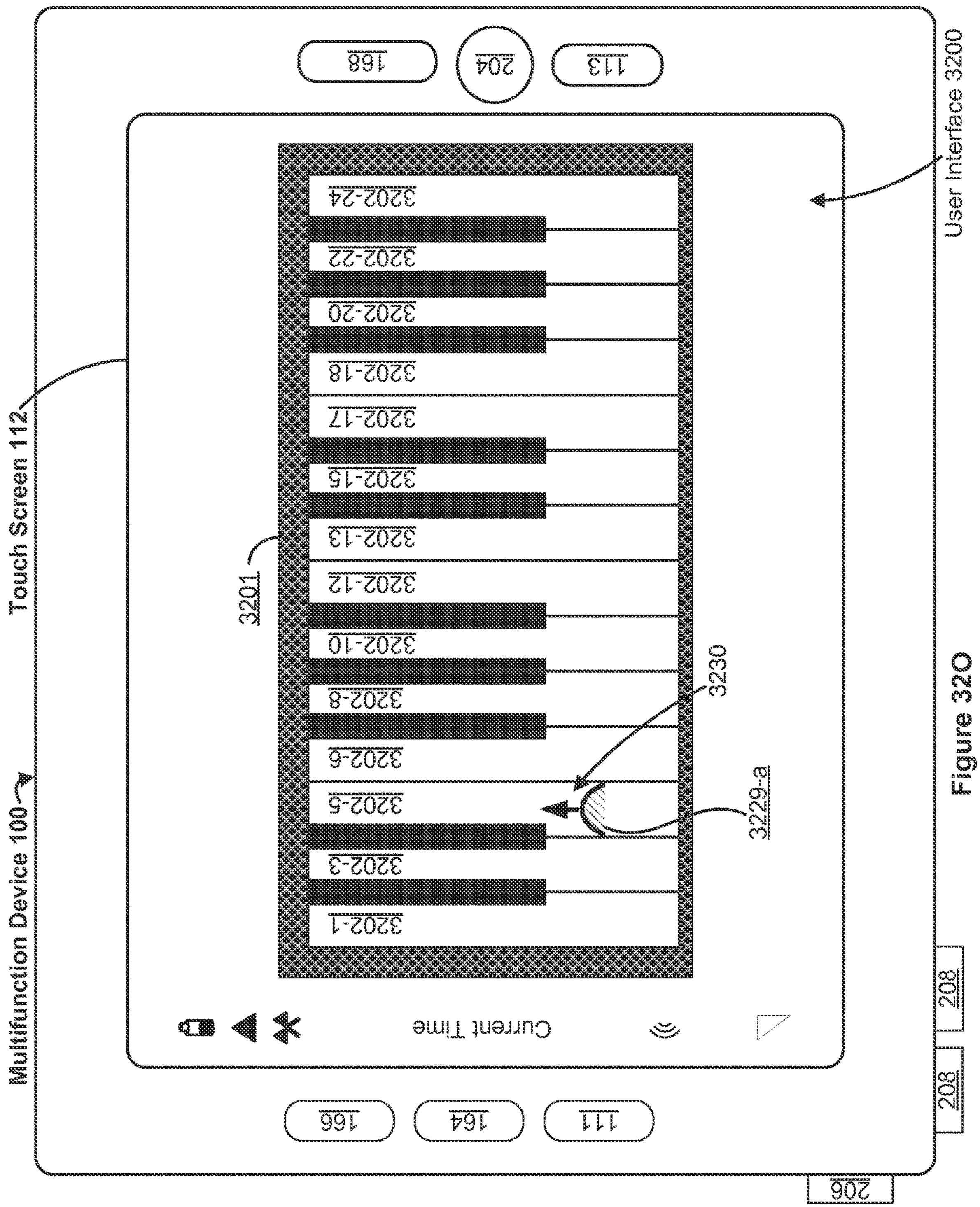
Figure 32P:
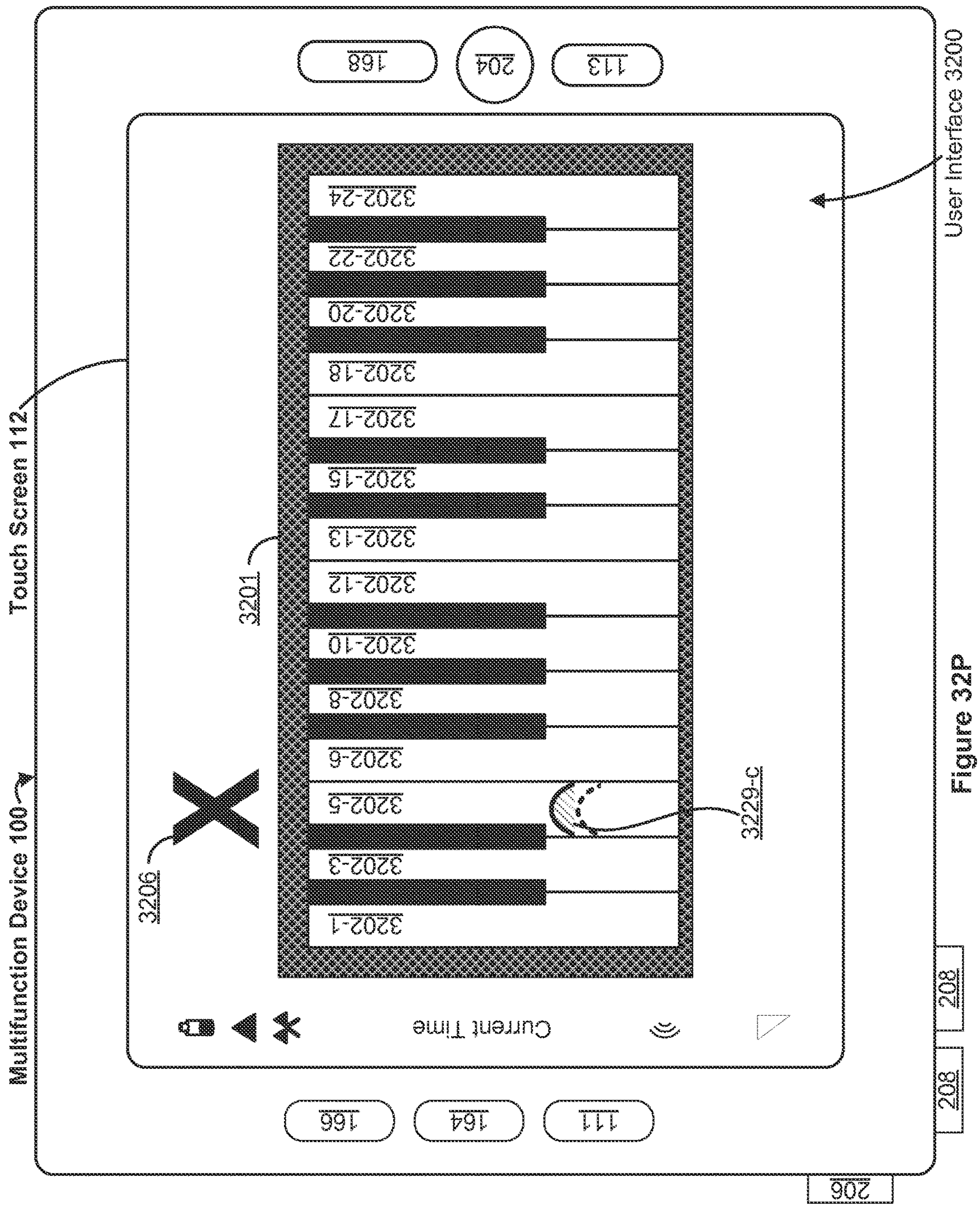
Figure 32Q:
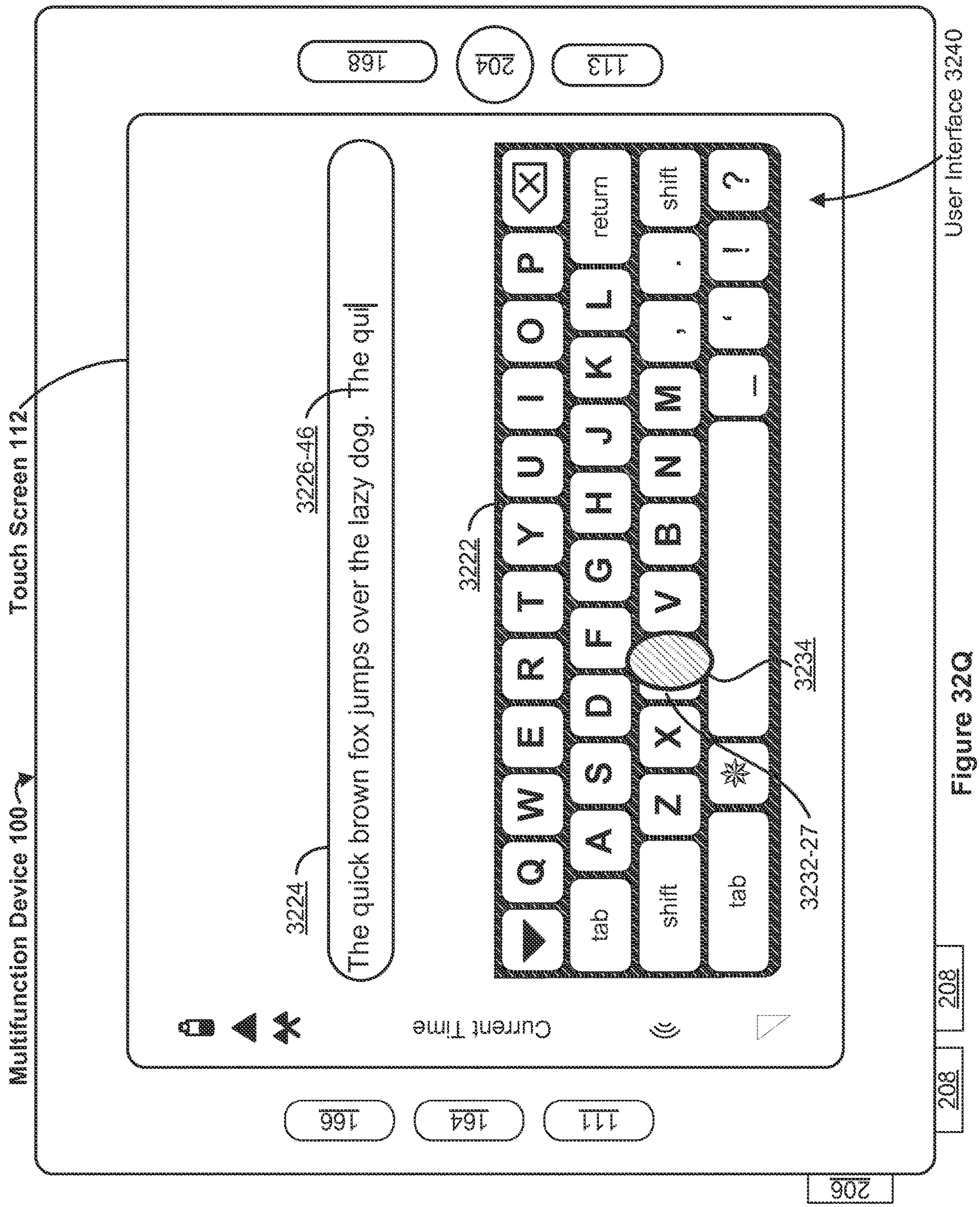
Figure 32R:
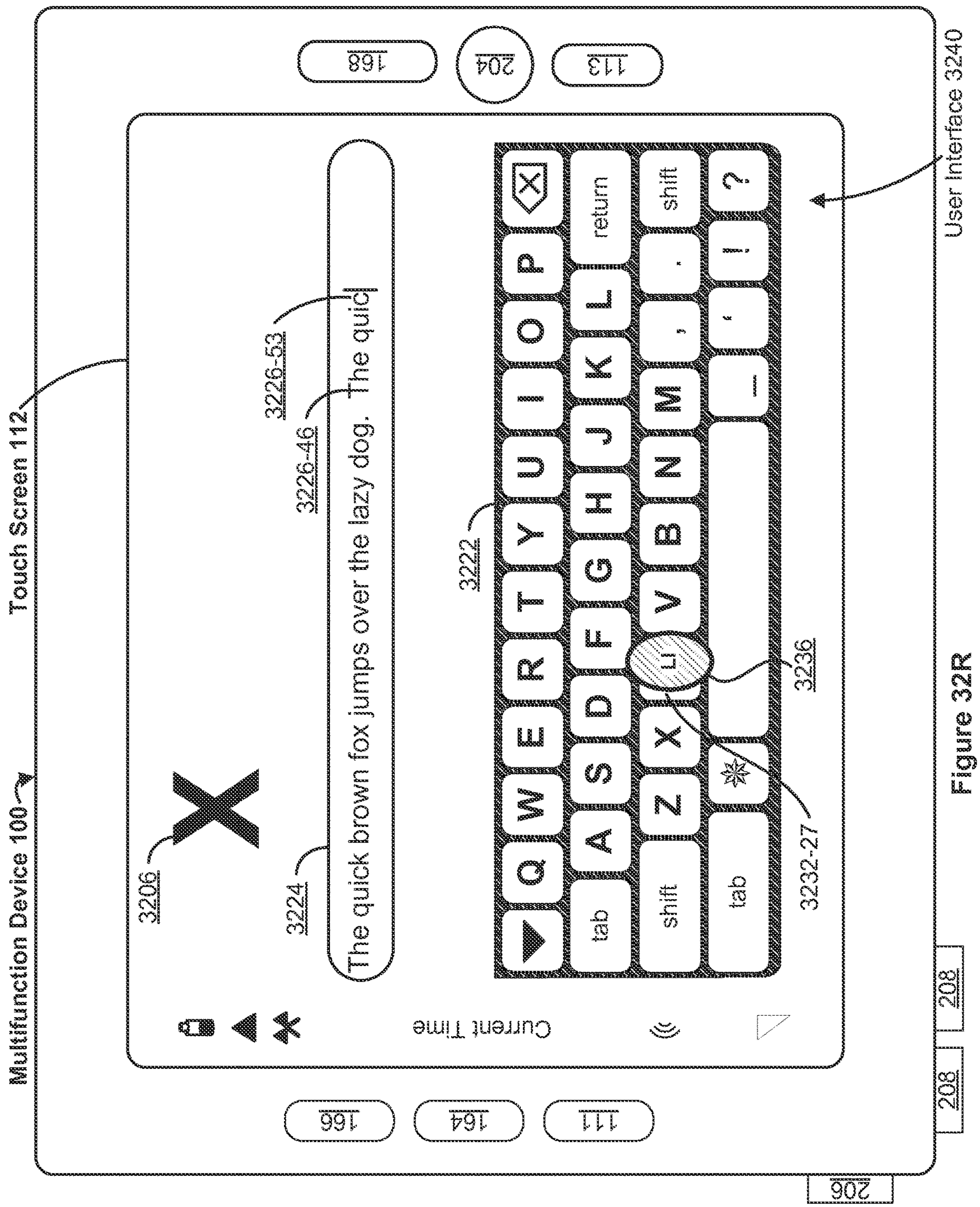

As illustrated in FIGS. 32O-32P, multifunction device 100 detects contact 3229 at a position on touch screen 112 corresponding to the display of activatable "E3" key 3202-5 of musical keyboard 3201. Because the fingerprint pattern of contact 3229 in FIGS. 32O-32P includes movement 3230 of contact 3229 from position 3229-*a* on touch screen 112 in FIG. 32O to position 3229-*b* on touch screen 112 in FIG. 32P, multifunction device 100 determines that the contact does not meet the predetermined fingering criteria and, in response, provides visual feedback indicating that the fingering used to play the note was not the preferred fingering, by displaying large "X" 3206 on touch screen 112 in FIG. 32P.

FIGS. 32Q-32S illustrate various embodiments where multifunction device 100 detects a fingerprint pattern of a contact at a position on touch screen 112 corresponding to display of an activatable character entry key on a character entry keyboard, and based upon one or more characteristics of the fingerprint pattern, provides feedback to the user if the fingering used to make the contact on touch screen 112 does not meet a preferred fingering criteria and enters a character (e.g., the letter "c" 3232-27) if the fingering used to make the contact does meet a preferred fingering criteria. The preferred fingering including at least a criterion that the user contact "C" key 3232-27 with their left middle finger.

In FIG. 32Q, multifunction device 100 detects contact 3234 on touch screen 112 at a position corresponding to display of character entry key 3232-27 (e.g., the "C" key). Multifunction device 100 analyzes the fingerprint pattern of contact 3234 in FIG. 32Q to determine at least the identity of the user finger corresponding to the contact.

In some embodiments, as illustrated in FIG. 32R, because multifunction device 100 determines that the fingerprint pattern of contact 3236 in FIG. 32R corresponds to the left index (LI) finger of the user, the contact does not meet the predefined preferred fingering criteria. In response, multifunction device 100 displays large "X" 3206 on touch screen 112, providing visual feedback that the user did not use preferred fingering. In response to detecting contact 3236 in FIG. 32R, multifunction device 100 also displays character "C" 3226-53 in text box 3224, in accordance with some embodiments.

In some embodiments, as illustrated in FIG. 32S, because multifunction device 100 determines that the fingerprint pattern of contact 3238 in FIG. 32S corresponds to the left middle (LM) finger of the user, the contact meets the predefined preferred fingering criteria. In response, multifunction device 100 displays character "c" 3226-53 in text box 3224. In some embodiments, when the contact that activates the character entry key does not meet the preferred fingering criteria, the device does not enter the character corresponding to the character entry key (e.g., the device treats the selection of a character entry key with a non-preferred finger as a failure to activate the key, instead requiring the user to use the preferred finger to activate the character entry key in order to enter the character).

FIGS. 33A-33C are flow diagrams illustrating a method 3300 of training a user on proper fingering techniques in accordance with some embodiments. The method 3300 is performed at an electronic device (e.g., device 300, FIG. 3, or portable multifunction device 100, FIG. 1A) with a display and a touch-sensitive surface. In some embodiments, the display is a touch screen display and the touch-sensitive surface is on the display. In some embodiments, the display is separate from the touch-sensitive surface. Some operations in method 3300 are, optionally, combined and/or the order of some operations is, optionally, changed.

As described below, the method 3300 provides an intuitive way to train a user on proper fingering techniques. The method reduces the cognitive burden on a user when learning proper fingering techniques, thereby creating a more efficient human-machine interface. For battery-operated electronic devices, enabling a user to learn proper fingering techniques faster and more efficiently conserves power and increases the time between battery charges.

In some embodiments, an electronic device (e.g., multifunction device 100 in FIGS. 32A-32S) with a touch-sensitive surface (e.g., touch screen 112 in FIGS. 32A-32S) and a display (e.g., touch screen 112 in FIGS. 32A-32S) displays (3302) a user interface (e.g., user interface 3200 in FIGS. 32A-32S) including a respective activatable user interface object (e.g., musical "E3" key 3202-5 of musical keyboard 3201 in FIGS. 32A-32P and/or character "C" entry key 3232-27 of QWERTY character entry keyboard 3222 in FIGS. 32Q-32S). In some embodiments, the user interface includes a plurality of activatable user interface objects (e.g., a plurality of user interface objects that are capable of being activated). For example, user interface 3200 displays a plurality of activatable musical keys 3202-1 to 3202-24 of musical keyboard 3201 in FIGS. 32A-32P, and user interface 3240 displays a plurality of activatable character entry keys 3232-1 to 3232-41 of QWERTY character entry keyboard 3222 in FIGS. 32Q-32S.

In some embodiments, the respective activatable user interface object (e.g., activatable musical "E3" key in FIGS. 32A-32P) is (3304) one of a plurality of activatable user interface objects that correspond to keys (e.g., activatable musical keys 3202-1 to 3202-24 in FIGS. 32A-32P) in a representation of a musical keyboard (e.g., a virtual piano keyboard such as musical keyboard 3201 in FIGS. 32A-32P).

In some embodiments, the respective activatable user interface object (e.g., activatable character "C" entry key 3232-27 in FIGS. 32Q-32S) is (3306) one of a plurality of activatable user interface objects that correspond to keys (e.g., activatable character entry keys 3232-1 to 3232-41) in a representation of a character entry keyboard (e.g., a virtual text keyboard, such as QWERTY keyboard 3222 in FIGS. 32Q-32S).

The electronic device (e.g., multifunction device 100) detects (3308) a fingerprint pattern of a contact (e.g., contact 3204, 3205, 3207, 3214, 3216, 3217, 3219, 3221, 3223, 3225, 3227, 3228, 3229, 3234, 3236, and/or 3238 in FIGS. 32A-32S) on a touch-sensitive surface (e.g., touch screen 112) that corresponds to a focus selector (e.g., contact 3204, 3205, 3207, 3214, 3216, 3217, 3219, 3221, 3223, 3225, 3227, 3228, 3229, 3234, 3236, and/or 3238 in FIGS. 32A-32S) that is over the respective activatable user interface object (e.g., musical "E3" key 3202-5 in FIGS. 32A-32P and/or character "C" entry key 3232-27 in FIGS. 32Q-32S) on a display (e.g., touch screen 112). In some embodiments, as illustrated in FIGS. 32A-32S, the device detects a contact on a touchscreen display over the respective activatable user interface object. In some embodiments, the device detects a contact on a touch sensitive surface, separate from an associated display, at a position corresponding to a position on the associated display displaying a focus selector.

In response (3310) to detecting the fingerprint pattern of the contact (e.g., contact 3204, 3205, 3207, 3214, 3216, 3217, 3219, 3221, 3223, 3225, 3227, 3228, 3229, 3234, 3236, and/or 3238 in FIGS. 32A-32S) on the touch-sensitive surface that corresponds to the focus selector that is over the respective activatable user interface object (e.g., musical "E3" key 3202-5 in FIGS. 32A-32P and/or character "C" entry key 3232-27 in FIGS. 32Q-32S) on the display (e.g., touch screen 112): the device (e.g., multifunction device 100) analyzes (3312) the fingerprint pattern of the contact (e.g., contact 3204, 3205, 3207, 3214, 3216, 3217, 3219, 3221, 3223, 3225, 3227, 3228, 3229, 3234, 3236, and/or 3238 in FIGS. 32A-32S) on the touch-sensitive surface (e.g., touch screen 112) to determine one or more fingering characteristics of the contact and determines (3314) whether the contact (e.g., contact 3204, 3205, 3207, 3214, 3216, 3217, 3219, 3221, 3223, 3225, 3227, 3228, 3229, 3234, 3236, and/or 3238 in FIGS. 32A-32S) meets predefined preferred fingering criteria based on the one or more fingering characteristics.

In some embodiments, the preferred fingering criteria include (3316) a criterion that is met when a finger that corresponds to the fingerprint pattern of the contact (e.g., contact 3204, 3205, 3207, 3214, 3216, 3217, 3219, 3221, 3223, 3225, 3227, 3228, 3229, 3234, 3236, and/or 3238 in FIGS. 32A-32S) used to activate the activatable user interface object (e.g., musical "E3" key 3202-5 in FIGS. 32A-32P and/or character "C" entry key 3232-27 in FIGS. 32Q-32S) matches a predefined preferred finger of a hand for activating the activatable user interface object (e.g., the "j" key on a QWERTY keyboard is preferably activated by the right index finger using standard touch-typing criteria and an "f" key on a QWERTY keyboard is preferably activated by the left index finger using standard touch-typing criteria). For example, a preferred fingering criterion is met in FIGS. 32C, 32G, and 32J-32N when musical "E3" key 3202-5 is activated by contacts 3207, 3221, 3225, 3227, and/or 3228 having a fingerprint pattern corresponding to the user's left middle (LM) finger. In contrast, the preferred fingering criterion is not met in FIGS. 32B, 32D-32F, and 32H-32I when musical "E3" key 3202-5 is activated by contact 3205 and/or 3217 having a fingerprint pattern corresponding to the user's left ring (LR) finger. As another example, a preferred fingering criterion is met in FIG. 32S when character "C" entry key 3232-27 is activated by contact 3228 having a fingerprint pattern corresponding to the user's left middle (LM) finger. In contrast, the preferred fingering criterion is not met in FIG. 32R when character "C" entry key 3232-27 is activated by contact 3236 having a fingerprint pattern corresponding to the user's left index (LI) finger.

In some embodiments, the preferred fingering criteria include (3318) a criterion that is met when the fingerprint pattern of the contact (e.g., contact 3225, 3227, 3228, and/or 3229 in FIGS. 32K-32P) on the touch-sensitive surface (e.g., touch screen 112) corresponds to an initial angle of elevation between a finger used to activate the activatable user interface object (e.g., musical "E3" key 3202-5 in FIGS. 32K-32P) and the display (e.g., touch screen 112) on which the activatable user interface object is displayed that is within a predefined range of preferred initial angles of elevation for activating the activatable user interface object. (e.g., a key on a musical keyboard is preferably played with the tip of a finger rather than the pad of a finger using standard piano playing guidelines). For example, a preferred fingering criterion is met in FIGS. 32K and 32M-32P when musical "E3" key 3202-5 is activated by contact 3225, 3228, and/or 3229 having a fingerprint pattern corresponding to the tip of the user's fingertip. In contrast, the preferred fingering criterion is not met is FIG. 32L when musical "E3" key 3202-5 is activated by contact 3227 having a fingerprint pattern corresponding to the pad of the user's fingertip.

In some embodiments, the preferred fingering criteria include (3320) a criterion that is met when the fingerprint pattern of the contact (e.g., contact 3228 and/or 3229 in FIGS. 32M-32P) on the touch-sensitive surface (e.g., touch screen 112) corresponds to a motion of a finger that activates the activatable user interface object (e.g., musical "E3" key 3202-5 in FIGS. 32K-32P) that is within a predefined range of preferred motions for activating the activatable user interface object (e.g., a key on a musical keyboard should be played with the tip of a finger moving backward toward an edge of the keyboard rather than forward into the keyboard, and/or with a predefined intensity). For example, a preferred fingering criterion is met in FIGS. 32M-32N when musical "E3" key 3202-5 is activated by contact 3228 having a fingerprint pattern corresponding to motion of the user's fingertip backwards from the initial location of the contact on touch screen 112 towards the front edge of the representation of musical keyboard 3201 displayed on touch screen 112 (e.g., movement 3220 of contact 3228 from position 3228-*a* in FIG. 32M to position 3228-*b* in FIG. 32N). In contrast, the preferred fingering criterion is not met in FIGS. 32O-32P when musical "E3" key 3202-5 is activated by contact 3229 having a fingerprint pattern corresponding to motion of the user's fingertip forwards from the initial location of the contact on touch screen 112 away from the front edge of the representation of musical keyboard 3201 displayed on touch screen 112 (e.g., movement 3230 of contact 3229 from position 3229-*a* in FIG. 32O to position 3229-*b* in FIG. 32P).

In accordance with a determination that the contact (e.g., contact 3204, 3205, 3207, 3214, 3216, 3217, 3219, 3221, 3223, 3225, 3227, 3228, 3229, 3234, 3236, and/or 3238 in FIGS. 32A-32S) does not meet the preferred fingering criteria, the device (e.g., multifunction device 100) provides (3322) feedback indicating that the preferred fingering criteria have not been met (e.g., visual feedback such as large "X" 3206 displayed on touch screen 112 in FIGS. 32B, 32D, 32H-32I, 32L, 32P, and 32R; audio feedback such as audio output 3208 including a frequency of 161.00 Hz generated at speaker 111 in FIGS. 32E and 32I; and/or tactile feedback such as tactile output 3212 generated, for example, by tactile output generator 167 in FIG. 32F).

In some embodiments, in accordance with the determination that the contact does not meet the preferred fingering criteria, the device (e.g., multifunction device 100) performs (3324) the operation (e.g., plays musical note "E3," or enters character "C" into an active text box) associated with the activatable user interface object (e.g., musical "E3" key 3202-5 in FIGS. 32A-32P and/or character "C" entry key 3232-27 in FIGS. 32Q-32S). Thus, in some embodiments, even when the preferred fingering criteria are not met, the device still activates the activatable user interface object and performs a corresponding operation, such as playing a note corresponding to a key on the keyboard while providing visual, audio, and/or tactile feedback that the key was "pressed" incorrectly. For example, upon a determination that contact 3205 and/or 3217 does not meet a predefined fingering criteria including at least a criterion that musical "E3" key 3202-5 is activated by the user's left middle (LM) finger, multifunction device 100 generates audio output 3208 having a frequency of 164.81 (e.g., corresponding to the true frequency of an "E3" tone) at speaker 111, corresponding to activation of musical "E3" key 3202-5 in FIGS. 32D and 32H, while providing a different indication that the key was activated using non-preferred fingering (e.g., displaying a large "X" 3206 in FIGS. 32D and 32H because the user's left index finger was used to activate musical "E3" key 3202-5). In another example, upon a determination that contact 3236 does not meet a predefined fingering criteria including at least a criterion that character "C" entry key 3232-27 is activated by the user's left middle (LM) finger, multifunction device 100 enters (e.g., displays) character "C" 3226-53 into text box 3224 displayed on touch screen 112, corresponding to activation of character "C" entry key 3232-27, while providing a different indication that the key was activated using non-preferred fingering (e.g., displaying a large "X" 3206 in FIG. 32R because the users left index finger was used to activate C" entry key 3232-27).

In some embodiments, in accordance with a determination that the contact (e.g., contact 3204, 3205, 3207, 3214, 3216, 3217, 3219, 3221, 3223, 3225, 3227, 3228, 3229, 3234, 3236, and/or 3238 in FIGS. 32A-32S) does not meet the preferred fingering criteria, the device (e.g., multifunction device 100) forgoes (3326) performance of the operation (e.g., does not play musical note "E3," or does not enter character "c" into an active text box) associated with the activatable user interface object (e.g., musical "E3" key 3202-5 in FIGS. 32A-32P and/or character "C" entry key 3232-27 in FIGS. 32Q-32S). Thus, in some embodiments, when the preferred fingering criteria are not met, the device does not activate the activatable user interface object and perform a corresponding operation, such as playing a note corresponding to a key on the keyboard that would be played if the preferred fingering criteria were met. For example, upon a determination that contact 3205 and/or 3229 does not meet a predefined fingering criteria including at least a criterion that musical "E3" key 3202-5 is activated by the user's left middle (LM) finger, multifunction device 100 foregoes generating audio output 3208 having a frequency of 164.81 (e.g., corresponding to the true frequency of an "E3" tone) at speaker 111, corresponding to activation of musical "E3" key 3202-5 in FIGS. 32B and 32O-32P.

In some embodiments, the feedback indicating that the preferred fingering criteria have not been met includes (3328) audible feedback generated by the device (e.g., speakers play warning sound or note sounds "off" as though a musical keyboard had been incorrectly played when fingering criteria for playing a note on the musical keyboard have not been met). For example, upon a determination that contact 3205 and/or 3217 does not meet a predefined fingering criteria including at least a criterion that musical "E3" key 3202-5 is activated by the user's left middle (LM) finger, multifunction device 100 generates audio output 3208 including a frequency of 161.00 Hz (e.g., corresponding to an "E3" tone that is out of tune) at speaker 111, indicating to the user that a preferred fingering was not used to activate musical "E3" key 3202-5 in FIGS. 32E and 32I. In some embodiments, the audible feedback includes changing a loudness, reverberation or other audible property of the corresponding note instead of or in addition to changing the frequency of the audio output to indicate that the preferred fingering was not used.

In some embodiments, the feedback indicating that the preferred fingering criteria have not been met includes (3330) visual feedback displayed on the display (e.g., the display of the device flashes or displays highlighting near the contact). For example, upon a determination that contact 3205, 3217, 3227, and/or 3229 does not meet the a predefined fingering criteria including at least a criterion that musical "E3" key 3202-5 is activated by the user's left middle (LM) finger, multifunction device 100 displays large "X" 3206 on touch screen 112, indicating to the user that a preferred fingering was not used to activate musical "E3" key 3202-5 in FIGS. 32B, 32D, 32H-32I, 32L, and 32P. In another example, upon a determination that contact 3236 does not meet a predefined fingering criteria including at least a criterion that character "C" entry key 3232-27 is activated by the user's left middle (LM) finger, multifunction device 100 displays large "X" 3206 on touch screen 112, indicating to the user that a preferred fingering was not used to activate character "C" entry key 3232-27 in FIG. 32R.

In some embodiments, the feedback indicating that the preferred fingering criteria have not been met includes (3332) tactile feedback generated by the device (e.g., the device buzzes or provides some other tactile output indicating that the user's fingering is incorrect). For example, upon a determination that contact 3205 in FIG. 32F does not meet a predefined fingering criteria including at least a criterion that musical "E3" key 3202-5 is activated by the user's left middle (LM) finger, multifunction device 100 generates tactile output 3212 (e.g., using tactile output generator 167), indicating to the user that a preferred fingering was not used to activate musical "E3" key 3202-5 in FIG. 32F.

In accordance with a determination that the contact (e.g., contact 3204, 3205, 3207, 3214, 3216, 3217, 3219, 3221, 3223, 3225, 3227, 3228, 3229, 3234, 3236, and/or 3238 in FIGS. 32A-32S) meets the preferred fingering criteria, the device (e.g., multifunction device 100) performs (3334) an operation associated with the activatable user interface object (e.g., musical "E3" key 3202-5 in FIGS. 32A-32P and/or character "C" entry key 3232-27 in FIGS. 32Q-32S). For example, the device activates the activatable user interface object without providing feedback indicating that the preferred fingering criteria have not been met. For example, upon a determination that contact 3207, 3221, 3225, and/or 3228 meets a predefined fingering criteria including at least a criterion that musical "E3" key 3202-5 is activated by the user's left middle (LM) finger, multifunction device 100 generates audio output 3208 including a frequency of 164.81 (e.g., corresponding to the true frequency of an "E3" tone) at speaker 111, corresponding to activation of musical "E3" key 3202-5 in FIGS. 32C, 32G, 32J-32K, and 32M-32N. In another example, upon a determination that contact 3238 meets a predefined fingering criteria including at least a criterion that character "C" entry key 3232-27 is activated by the user's left middle (LM) finger, multifunction device 100 enters (e.g., displays) character "c" 3226-53 into text box 3224 displayed on touch screen 112, corresponding to activation of character "C" entry key 3232-27 in FIG. 32S.

In some embodiments, in accordance with a determination that the contact meets the preferred fingering criteria, the device (e.g., multifunction device 100) provides (3336) feedback indicating that the preferred fingering criteria have been met. (e.g., visual, audio, and/or tactile feedback). For example, upon a determination that contact 3207, 3221, 3225, and/or 3228 in FIGS. 32G, 32J-32K, and 32N meets a predefined fingering criteria including at least a criterion that musical "E3" key 3202-5 is activated by the user's left middle (LM) finger, multifunction device 100 displays star 3218 on touch screen 112, indicating to the user that a preferred fingering was used to activate musical "E3" key 3202-5 in FIGS. 32G, 32J-32K, and 32N. In another example, upon a determination that contact 3228 in FIG. 32S meets a predefined fingering criteria including at least a criterion that character "C" entry key 3232-27 is activated by the user's left middle (LM) finger, multifunction device 100 displays star 3218 on touch screen 112, indicating to the user that a preferred fingering was used to activate character "C" entry key 3232-27 in FIG. 32S.

It should be understood that the particular order in which the operations in FIGS. 33A-33C have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., those methods described above) are also applicable in an analogous manner to method 3300 described above with respect to FIGS. 33A-33C. For example, the fingerprints, contacts, user interface objects, and focus selectors described above with reference to method 3300 optionally have one or more of the characteristics of the fingerprints, contacts, user interface objects, and focus selectors described herein with reference to other methods described herein (e.g., those methods described above). For brevity, these details are not repeated here.

Figure 34:
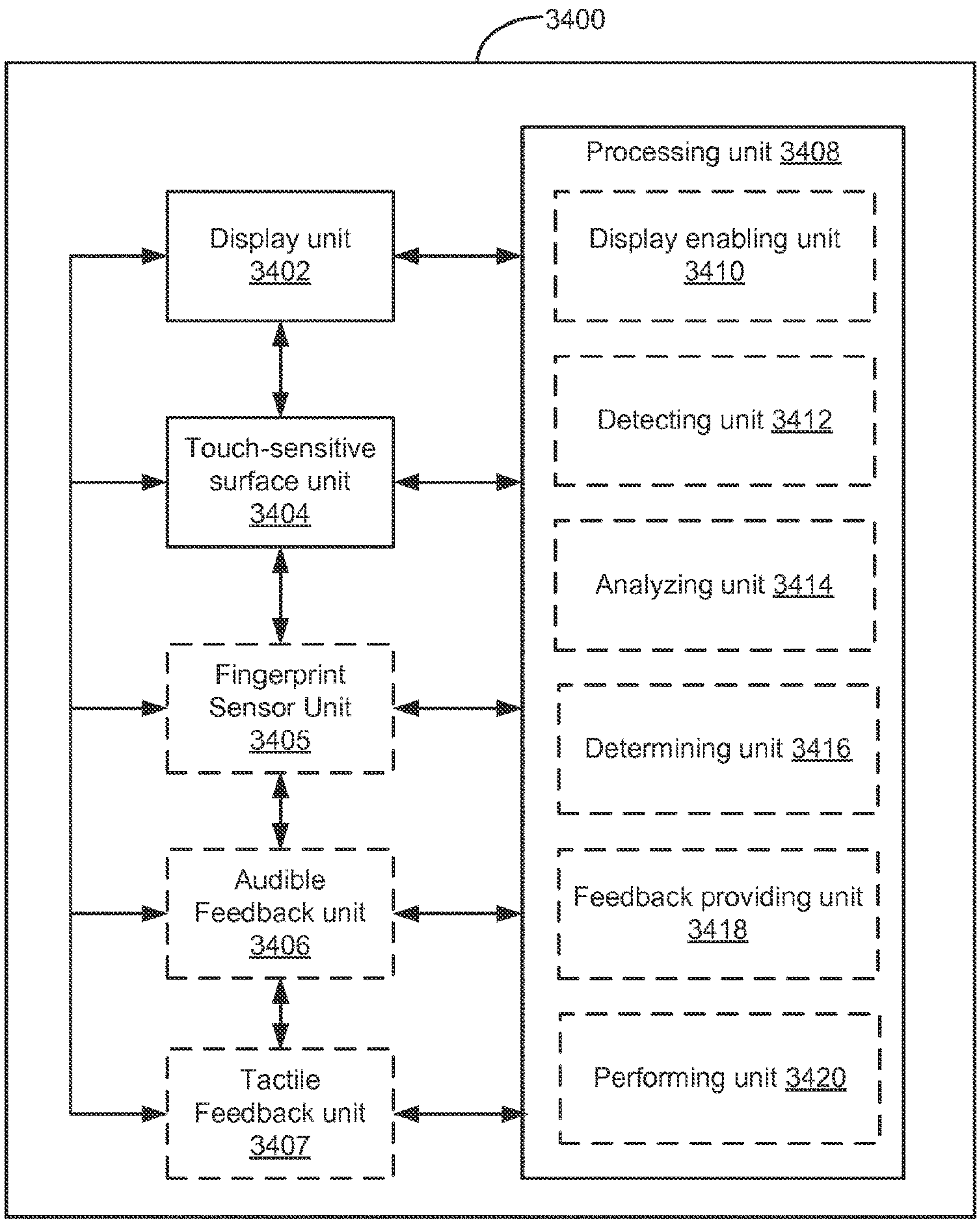
FIG. 34 is a functional block diagram of an electronic device in accordance with some embodiments.

In accordance with some embodiments, FIG. 34 shows a functional block diagram of an electronic device 3400 configured in accordance with the principles of the various described embodiments. The functional blocks of the device are, optionally, implemented by hardware, software, or a combination of hardware and software to carry out the principles of the various described embodiments. It is understood by persons of skill in the art that the functional blocks described in FIG. 34 are, optionally, combined or separated into sub-blocks to implement the principles of the various described embodiments. Therefore, the description herein optionally supports any possible combination or separation or further definition of the functional blocks described herein.

As shown in FIG. 34, an electronic device 3400 includes a display unit 3402 configured to display a graphic user interface, a touch-sensitive surface unit 3404 configured to receive user contacts, optionally a fingerprint sensor unit 3405, an audible feedback unit 3406 for providing audible feedback and a tactile feedback unit 3407 for providing tactile feedback; and a processing unit 3408 coupled to the display unit 3402, the touch-sensitive surface unit 3404 and optionally the fingerprint sensor unit 3405, the audible feedback unit 3406 and the tactile feedback unit 3407. In some embodiments, the processing unit 3408 includes a display enabling unit 3410, a detecting unit 3412, an analyzing unit 3414, a determining unit 3416, a feedback providing unit 3418, and a performing unit 3420.

The processing unit 3408 is configured to enable display of a user interface including a respective activatable user interface object (e.g., with the display enabling unit 3410) and detect a fingerprint pattern of a contact on the touch-sensitive surface unit 3402 that corresponds to a focus selector that is over the respective activatable user interface object on the display unit 3402 (e.g., with the detecting unit 3412). The processing unit 3408 is also configured to, in response to detecting the fingerprint pattern of the contact on the touch-sensitive surface unit 3404 that corresponds to the focus selector that is over the respective activatable user interface object on the display unit 3402, analyze the fingerprint pattern of the contact on the touch-sensitive surface unit 3404 to determine one or more fingering characteristics of the contact (e.g., with the analyzing unit 3414) and determine whether the contact meets predefined preferred fingering criteria based on the one or more fingering characteristics (e.g., with the determining unit 3416). The processing unit 3408 is further configured to, in accordance with a determination that the contact does not meet the preferred fingering criteria, provide feedback indicating that the preferred fingering criteria have not been met (e.g., with the feedback providing unit 3418). The processing unit 3408 is further configured to, in accordance with a determination that the contact meets the preferred fingering criteria, perform an operation associated with the activatable user interface object (e.g., with the performing unit 3420).

In some embodiments, the processing unit 3408 is further configured to, in accordance with the determination that the contact does not meet the preferred fingering criteria, perform the operation associated with the activatable user interface object (e.g., with the performing unit 3420).

In some embodiments, the processing unit 3408 is further configured to, in accordance with a determination that the contact does not meet the preferred fingering criteria, forgo performance of the operation associated with the activatable user interface object (e.g., with the performing unit 3420).

In some embodiments, the processing unit 3408 is further configured to, in accordance with a determination that the contact meets the preferred fingering criteria, provide feedback indicating that the preferred fingering criteria have been met (e.g., with the feedback providing unit 3418).

In some embodiments, the respective activatable user interface object is one of a plurality of activatable user interface objects that correspond to keys in a representation of a musical keyboard.

In some embodiments, the respective activatable user interface object is one of a plurality of activatable user interface objects that correspond to keys in a representation of a character entry keyboard.

In some embodiments, the preferred fingering criteria include a criterion that is met when a finger that corresponds to the fingerprint pattern of the contact used to activate the activatable user interface object matches a predefined preferred finger of a hand for activating the activatable user interface object.

In some embodiments, the preferred fingering criteria include a criterion that is met when the fingerprint pattern of the contact on the touch-sensitive surface unit corresponds to an initial angle of elevation between a finger used to activate the activatable user interface object and the display unit 3402 on which the activatable user interface object is displayed that is within a predefined range of preferred initial angles of elevation for activating the activatable user interface object.

In some embodiments, the preferred fingering criteria include a criterion that is met when the fingerprint pattern of the contact on the touch-sensitive surface unit 3404 corresponds to a motion of a finger that activates the activatable user interface object that is within a predefined range of preferred motions for activating the activatable user interface object.

In some embodiments, the feedback indicating that the preferred fingering criteria have not been met includes audible feedback generated by the device 3400 (e.g., with the audible feedback unit 3406).

In some embodiments, the feedback indicating that the preferred fingering criteria have not been met includes visual feedback displayed on the display unit 3402.

In some embodiments, the feedback indicating that the preferred fingering criteria have not been met includes tactile feedback generated by the device 3400 (e.g., with the tactile feedback unit 3407).

The operations in the information processing methods described above are, optionally implemented by running one or more functional modules in information processing apparatus such as general purpose processors (e.g., as described above with respect to FIGS. 1A and 3) or application specific chips.

The operations described above with reference to FIGS. 33A-33C are, optionally, implemented by components depicted in FIGS. 1A-1B or FIG. 34. For example, displaying operation 3302, detecting operation 3308, analyzing operation 3312, determining operation 3314, feedback providing operations 3322 and 3336, performing operations 3324 and 3334, and forgoing operation 3326 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub-event, such as selection of an object on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Operating a Portion of a Touch-Sensitive Surface in an Enhanced-Sensitivity Mode of Operation Many electronic devices have applications that make use of identity authentication, such as applications that have logins or applications that access private content. A method of identity authentication is fingerprint detection and verification. A device can include a touch-sensitive surface of sufficient sensitivity to detect fingerprints. However, such touch-sensitive surfaces consume more power, and if the device runs on a battery, decreases the time between charges. The embodiments described below include a device that has a touch-sensitive surface that can be sub-divided into regions that can be operated in a mode of enhanced sensitivity that is sufficient to detect fingerprints or in a mode of reduced sensitivity. A region of the touch-sensitive surface is operated in the enhanced-sensitivity mode if one or more criteria are met, and is otherwise operated in the reduced-sensitivity mode. This enhances the sensitivity of portions of the touch-sensitive surface on an as-needed basis. By operating portions of the touch-sensitive surface in the enhanced-sensitivity mode on an as-needed basis, power consumption is reduced while the device remains capable of fingerprint detection, thereby providing a convenient and efficient user interface that conserves battery power.

In some embodiments, the device is an electronic device with a separate display (e.g., display 450) and a separate touch-sensitive surface (e.g., touch-sensitive surface 451). In some embodiments, the device is portable multifunction device 100, the display is touch screen 112, and the touch-sensitive surface includes tactile output generators 167 on the display (FIG. 1A). The device described below with reference to 35A-35J and 36A-36B optionally includes one or more fingerprint sensors 169. In some embodiments, the one or more fingerprint sensors include one or more integrated fingerprint sensors 359-1 (FIG. 4B) that are integrated in to the touch-sensitive surface (e.g., separate touch-sensitive surface 451 or touch sensitive display system 112). In some embodiments, the one or more fingerprint sensors include separate fingerprint sensors 359-2 (FIG. 4B) that are separate from the touch-sensitive surface (e.g., separate touch-sensitive surface 451 or touch sensitive display system 112). Unless specified otherwise, a fingerprint sensor 169 described below is, optionally, either an integrated fingerprint sensor 359-1 or a separate fingerprint sensor 359-2, depending on the configuration of the hardware and software of the device that includes the fingerprint sensor 169. For convenience of explanation, the embodiments described with reference to FIGS. 35A-35J and 36A-36B will be discussed with reference to touch screen 112; in such embodiments, the focus selector is, optionally: a respective contact, a representative point corresponding to a contact (e.g., a centroid of a respective contact or a point associated with a respective contact), or a centroid of two or more contacts detected on the touch screen 112, in place of a cursor. Analogous operations are, optionally, performed on a device with display 450, a separate touch-sensitive surface 451, and optionally one or more fingerprint sensors 169 in response to detecting the inputs described in FIGS. 35A-35J on the touch-sensitive surface 451 while displaying the user interfaces shown in FIGS. 35A-35J on the display 450.

Figure 35A:
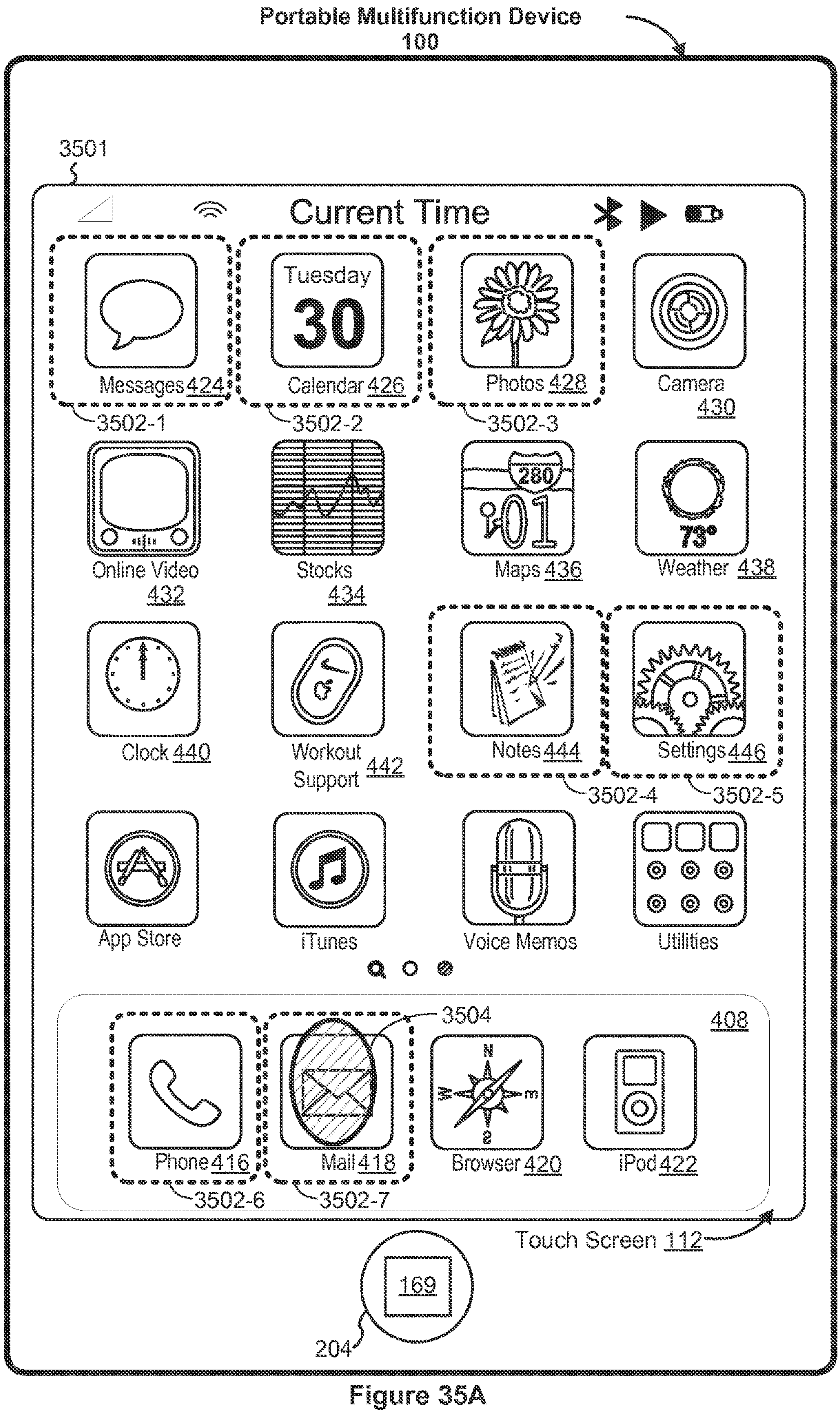
FIGS. 35A-35J illustrate exemplary user interfaces for operating a portion of a touch-sensitive surface in an enhanced-sensitivity mode of operation in accordance with some embodiments.
Figure 36A:
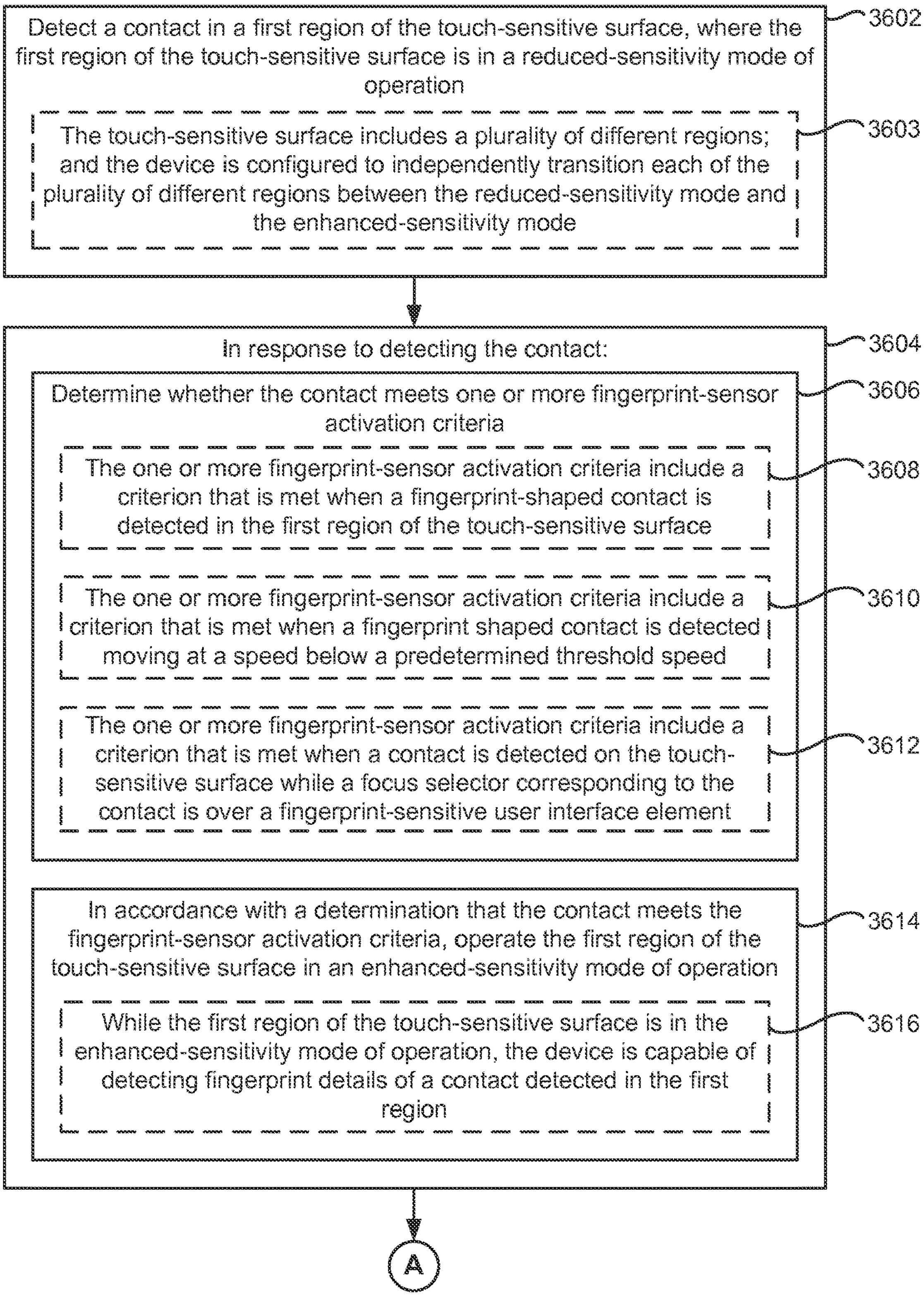
FIGS. 36A-36B are flow diagrams illustrating a method of operating a portion of a touch-sensitive surface in an enhanced-sensitivity mode of operation in accordance with some embodiments.
Figure 36B:
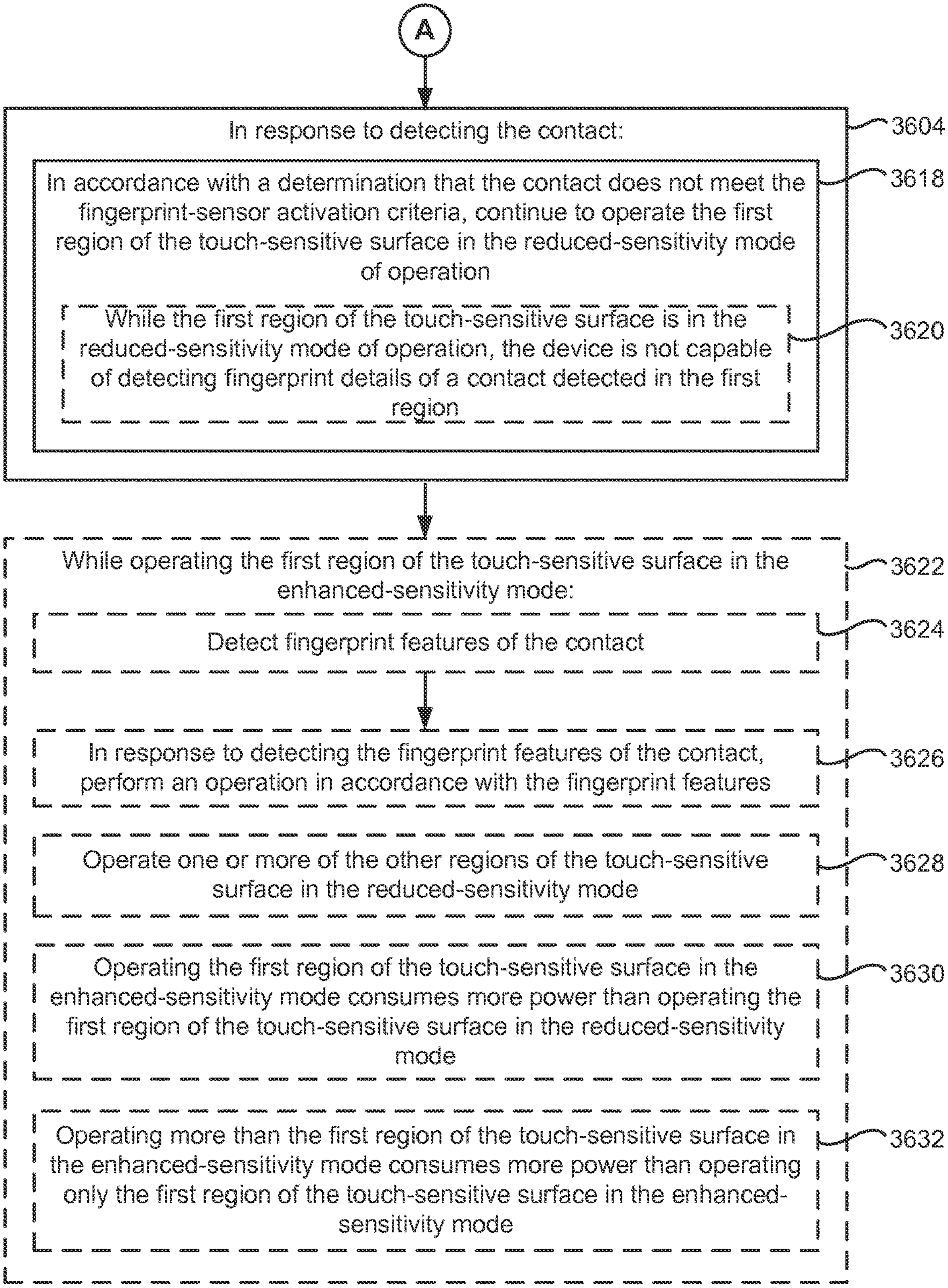

FIG. 35A illustrates user interface 3501 displayed on touch screen 112 of a device (e.g., device 100). User interface 3501 includes one or more application icons, as described above with reference to FIG. 4A. Touch screen 112 includes one or more regions 3502, each of which corresponds to a respective application icon. As shown in FIG. 35A, region 3502-1 corresponds to "Messages" icon 424. Region 3502-2 corresponds to "Calendar" icon 426. Region 3502-3 corresponds to "Photos" icon 428. Region 3502-4 corresponds to "Notes" icon 444. Region 3502-5 corresponds to "Settings" icon 446. Region 3502-6 corresponds to "Phone" icon 416. Region 3502-7 corresponds to "Mail" icon 418. In some embodiments, the regions correspond to quadrants (or other geometric divisions) of the touch sensitive surface (e.g., touch screen 112).

Device 100 operates a respective region (e.g., one of regions 3502 in FIG. 35A) in a reduced-sensitivity mode or an enhanced-sensitively mode. When device 100 operates a respective region (e.g., one of regions 3502 in FIG. 35A) operating in enhanced-sensitivity mode, device 100 is capable of detecting the presence/absence of a contact in the respective region (e.g., one of regions 3502 in FIG. 35A) on touch screen 112 and movement of the contact, and also is capable of detecting fingerprint features of the contact, such as minutia features that enable the contact to be uniquely identified as a previously registered fingerprint. When device 100 operates the respective region (e.g., one of regions 3502 in FIG. 35A) in reduced-sensitivity mode, device 100 is capable of detecting the presence/absence of the contact in the respective region (e.g., one of regions 3502 in FIG. 35A) on touch screen 112 and movement of the contact, but is not capable of detecting fingerprint features of the contact. Thus, for example, when a contact is located in a respective region (e.g., one of regions 3502 in FIG. 35A) of device 100 that is being operated in enhanced-sensitivity mode, device 100 is capable of detecting fingerprint features, which can be used for identity authentication or authorized access, and/or detection of fine movement of the contact. On the other hand, when a contact is located in a respective region (e.g., one of regions 3502 in FIG. 35A) operating in reduced-sensitivity mode, device 100 is not capable of detecting fingerprint features of the contact. In some embodiments, device 100 independently operates and transitions each respective region (e.g., one of regions 3502 in FIG. 35A) between reduced-sensitivity mode and enhanced-sensitivity mode. In some embodiments, the a majority of touch screen 112 or, optionally the entire touch screen 112, is capable of being operated in the enhanced-sensitivity mode of operation.

When there is no contact detected on a respective region (e.g., one of regions 3502 in FIG. 35A), device 100 operates the respective region (e.g., one of regions 3502 in FIG. 35A) in reduced-sensitivity mode. Operating a respective region (e.g., one of regions 3502 in FIG. 35A) in reduced-sensitivity mode consumes less power than operating the same respective region (e.g., one of regions 3502 in FIG. 35A) in enhanced-sensitivity mode. When device 100 detects a contact in a respective region (e.g., one of regions 3502 in FIG. 35A) that is operating in reduced-sensitivity mode, device 100 operates the respective region (e.g., one of regions 3502 in FIG. 35A) in enhanced-sensitivity mode if the contact meets one or more fingerprint-sensor activation criteria, and otherwise continues to operate the respective region (e.g., one of regions 3502 in FIG. 35A) in reduced-sensitivity mode.

In some embodiments, the one or more fingerprint-sensor activation criteria include a criterion that is met when a fingerprint-shaped contact is detected in the respective region (e.g., one of regions 3502 in FIG. 35A). Thus, for example, a fingerprint-shaped contact detected in the respective region (e.g., one of regions 3502 in FIG. 35A) would activate the enhanced-sensitivity mode, but a stylus contact would not. In some embodiments, a single contact gesture activates the enhanced-sensitivity mode of operation, while a multi-contact gesture does not activate the enhanced-sensitivity mode of operation.

In some embodiments, the one or more fingerprint-sensor activation criteria include a criterion that is met when a fingerprint-shaped contact is detected to be moving or rotating (e.g., twisting) at a speed below a predetermined threshold speed (or at a rotation speed below a predetermined threshold). For example, a fingerprint that is slowly moving through or twisting in a respective region (e.g., one of regions 3502 in FIG. 35A) activates the enhanced-sensitivity mode for the respective region (e.g., one of regions 3502 in FIG. 35A). In some embodiments, the one or more fingerprint-sensor activation criteria include a criterion that is met when a contact is detected on touch screen 112 while a focus selector corresponding to the contact is over a fingerprint-sensitive user interface element. In some embodiments, on touch screen 112, the focus selector corresponding to the contact is the contact itself. Thus, for example, this criterion is met when a contact is detected on touch screen 112 over a fingerprint-sensitive user interface element. An example of a fingerprint-sensitive user interface element is an application icon whose corresponding application is configured to require authentication or authorization for access. In some embodiments, whether an application requires authentication or authorization for access is configurable by a user of device 100. Another example of a fingerprint-sensitive user interface element is an interactive user interface object (e.g., a virtual dial or knob).

In some embodiments, when the device operates a respective region (e.g., one of regions 3502 in FIG. 35A) in enhanced-sensitivity mode, the device operates the other respective regions 3502 in reduced-sensitivity mode. Operating only one respective region (e.g., one of regions 3502 in FIG. 35A) in enhanced-sensitivity mode consumes less power than operating multiple respective regions 3502 in enhanced-sensitivity mode. In some embodiments, when the contact no longer meets the criteria, or the contact is removed from the respective region (e.g., by liftoff of the contact from touch screen 112), device 100 reverts to operating the respective region (e.g., one of regions 3502 in FIG. 35A) in reduced-sensitivity mode. In some embodiments, the reversion to operating the respective region (e.g., one of regions 3502 in FIG. 35A) in reduced-sensitivity mode occurs after a predetermined amount of time after the contact is removed or no longer meets the criteria (e.g., a timeout).

Figure 35B:
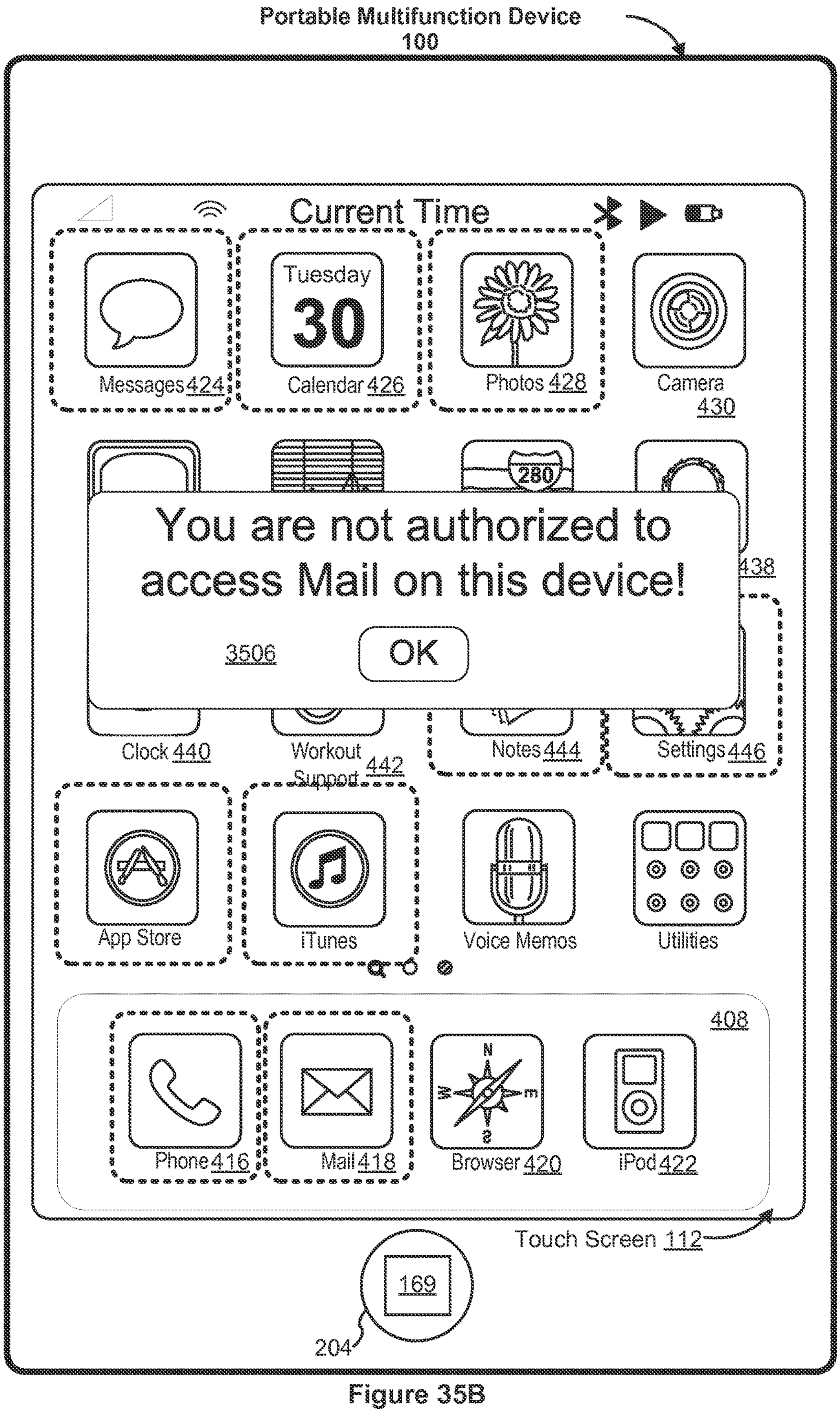
Figure 35C:
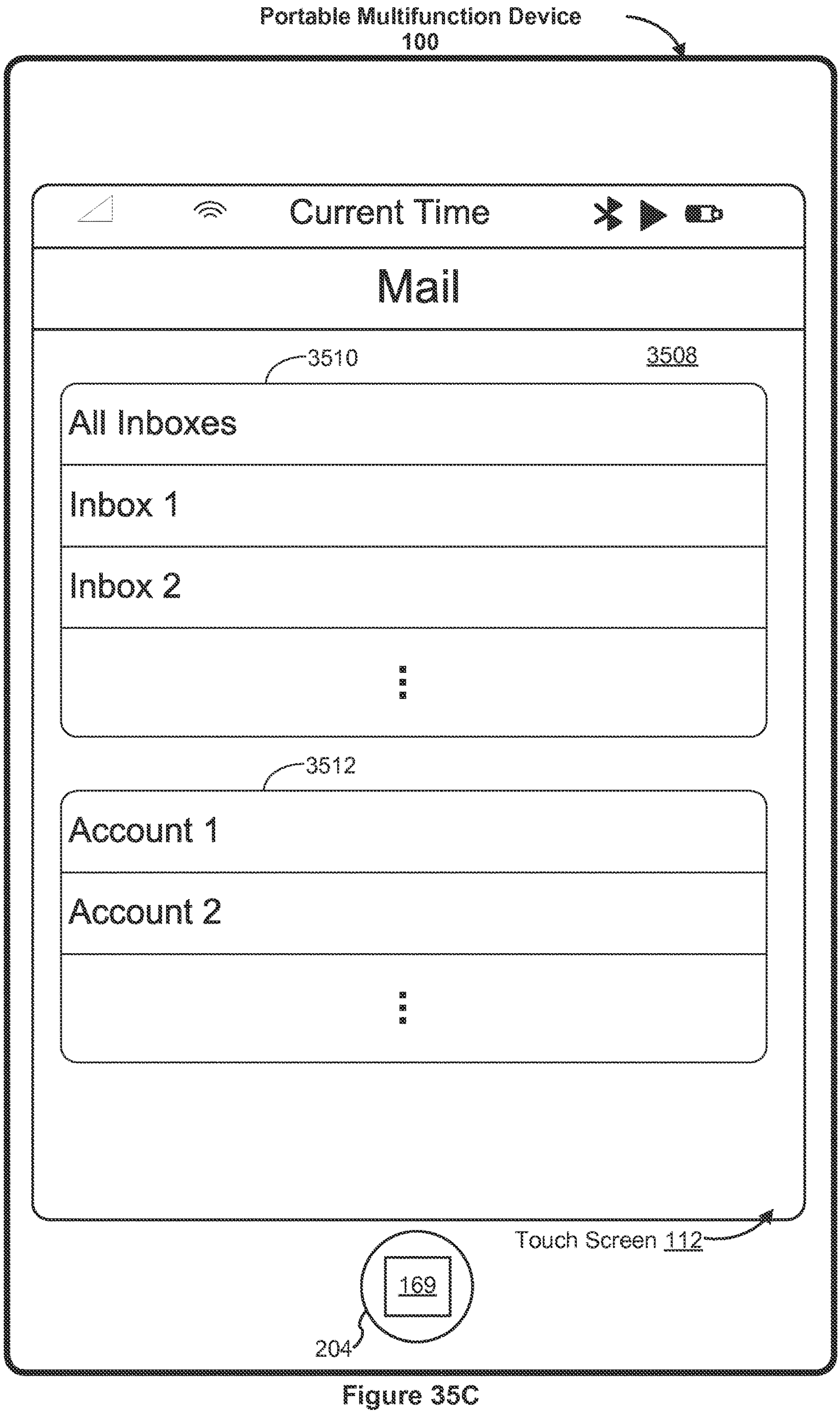

FIG. 35A shows a contact with fingerprint 3504 detected on “Mail” icon 418. “Mail” icon 418 corresponds to region 3502-7, which is being operated by device 100 in reduced-sensitivity mode. In FIG. 35A, e-mail client module 140, to which “Mail” icon 418 corresponds, is configured to require authentication or authorization for access. In response to detecting the contact with fingerprint 3504 on “Mail” icon 418, device 100 starts to operate region 3502-7 in enhanced-sensitivity mode. With region 3502-7 operating in enhanced-sensitivity mode, device 100 is capable of detecting fingerprint features of fingerprint 3504 for purposes of authorization. In some embodiments, if device 100 determines that fingerprint 3504 does not correspond to a previously registered fingerprint or does not belong to an authorized user of e-mail client module 140, device 100 displays message 3506 alerting the user of the lack of authorization to access e-mail client module 140, as shown in FIG. 35B. If device 100 determines that fingerprint 3504 corresponds to a previously registered fingerprint that belongs to an authorized user of e-mail client module 140, device 100 activates email client module 140 and displays user interface 3508 of e-mail client module 140, as shown in FIG. 35C. User interface 3508 includes, for example, a listing of email accounts 3512 and a listing of corresponding inboxes 3510.

In some embodiments, a user of device 100 can have access to some email accounts (and corresponding inboxes) and not others. When user interface 3508 of e-mail client module 140 is displayed, email accounts listing 3512 and inboxes listing 3510 only includes the email accounts and inboxes the user is authorized to access, based on the fingerprint detected in region 3502-7.

Figure 35D:
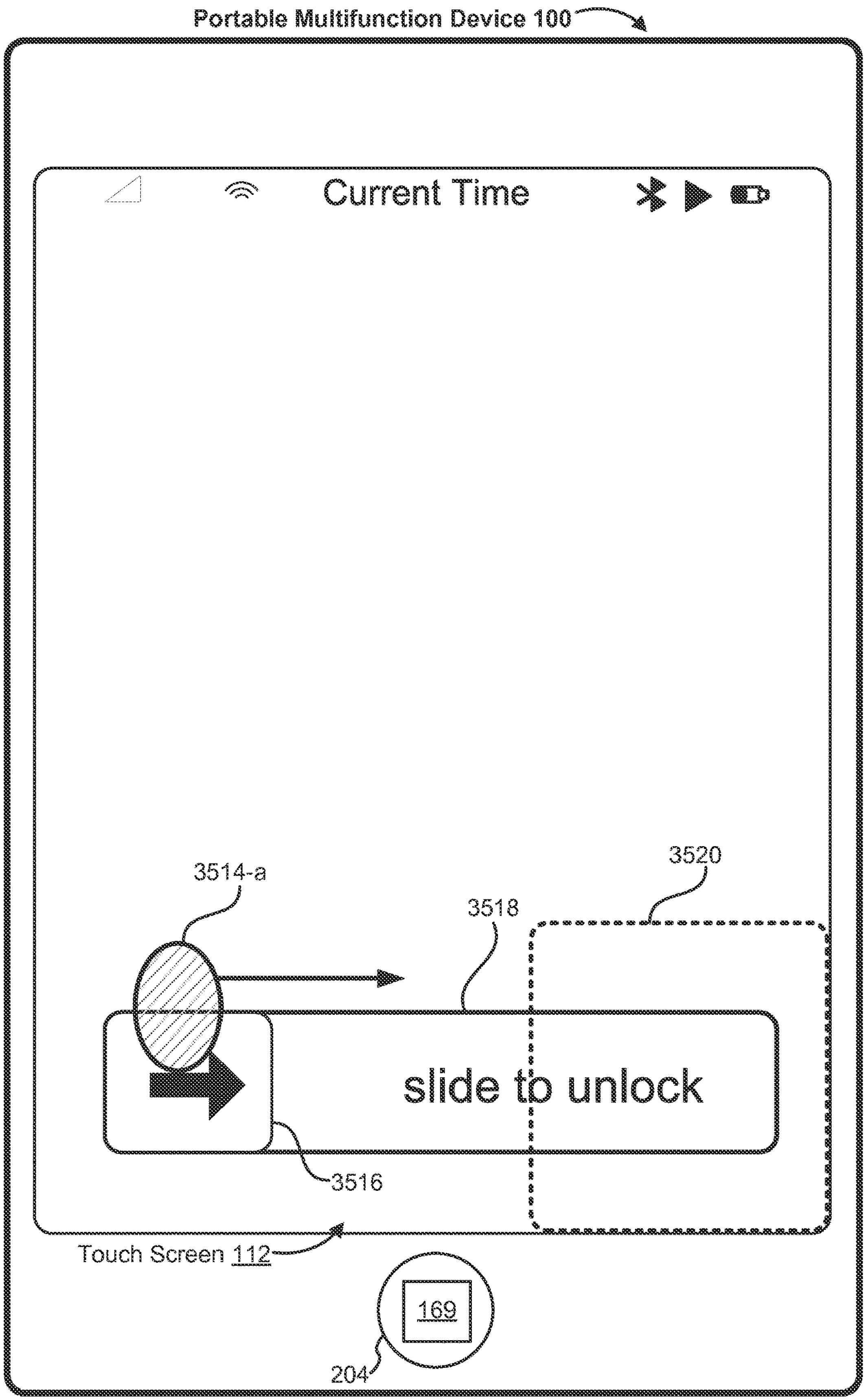

FIG. 35D illustrates device 100 in a locked state. While device 100 is in the locked state and touch screen 112 is active (e.g., not in sleep mode), a lock screen is displayed on touch screen 112. The lock screen includes unlock object 3516 and virtual groove (or unlock image) 3518, with unlock object 3516 located at one end (e.g., the left end) of virtual groove (or unlock image) 3518. Device 100 can be unlocked by dragging unlock object 3516 to the opposite end (e.g., the right end) of virtual groove 3518. Touch screen 112 also includes region 3520 that device 100 operates in reduced-sensitivity mode or enhanced-sensitivity mode. When there is no contact detected in region 3520, region 3520 is operated in reduced-sensitivity mode.

Figure 35E:
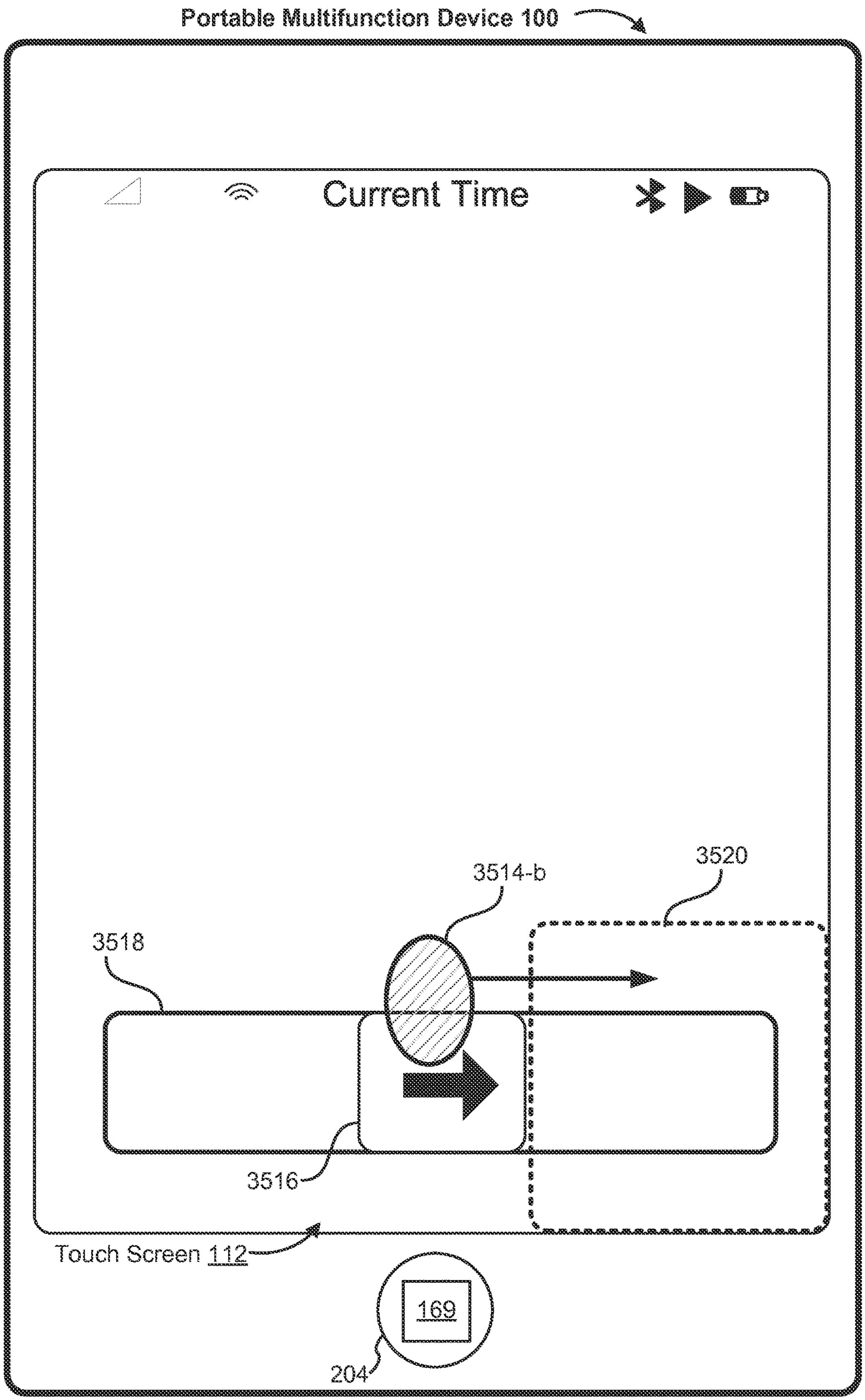
Figure 35F:
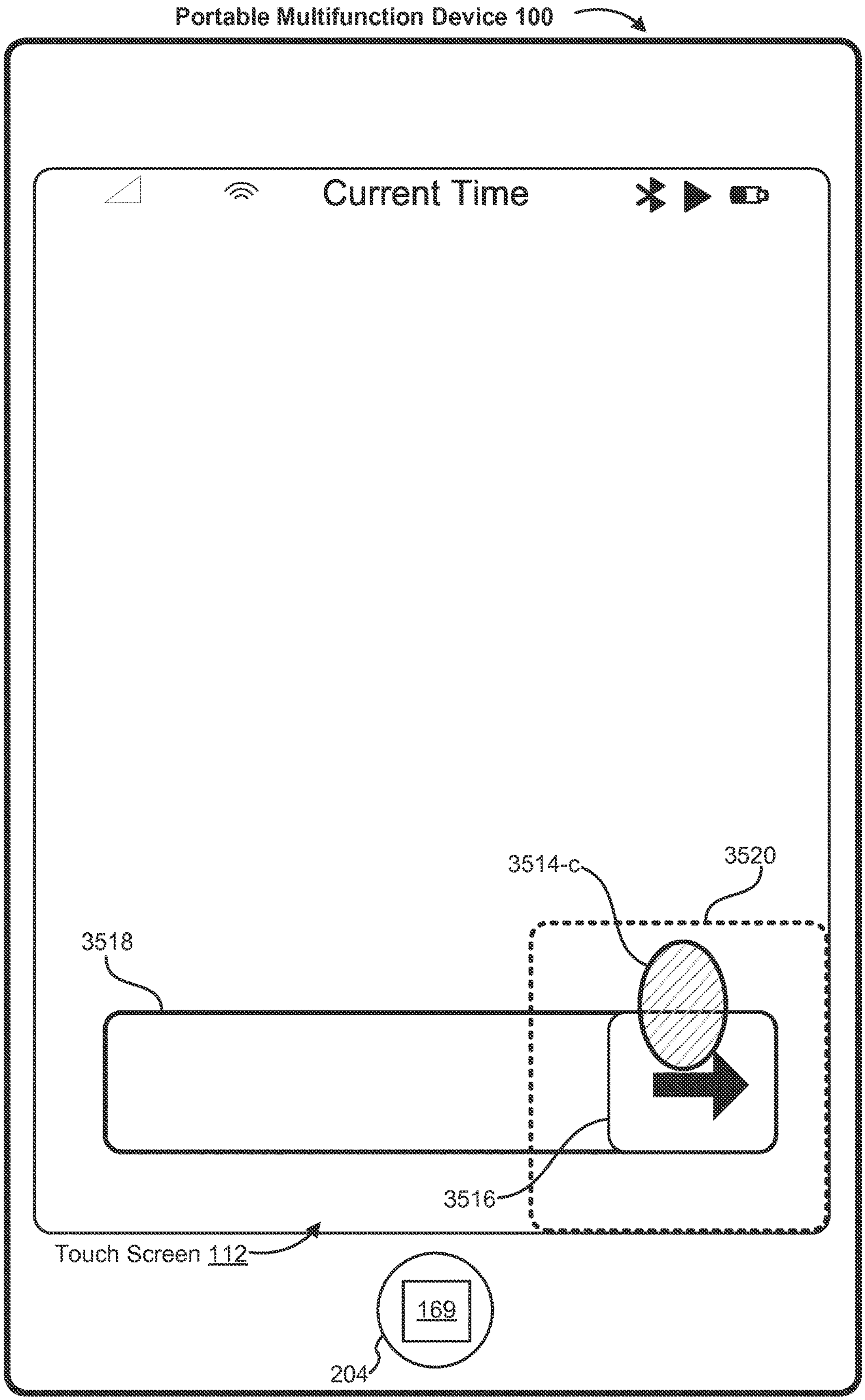

A contact with fingerprint 3514 on unlock object 3516, and movement of the contact and fingerprint 3514 toward the right end of virtual groove 3518, are detected on touch screen 112. In response to detecting the movement of the contact, unlock object 3516 moves toward the right end of virtual groove 3518, as shown in FIGS. 35E-35F and in FIG. 35G; the contact drags unlock object 3516 toward the right end of virtual groove 3518. Before fingerprint 3514 reaches region 3520 (e.g., while fingerprint 3514 is at location 3514-*a* or 3514-*b*), region 3520 remains in reduced-sensitivity mode.

Figure 35G:
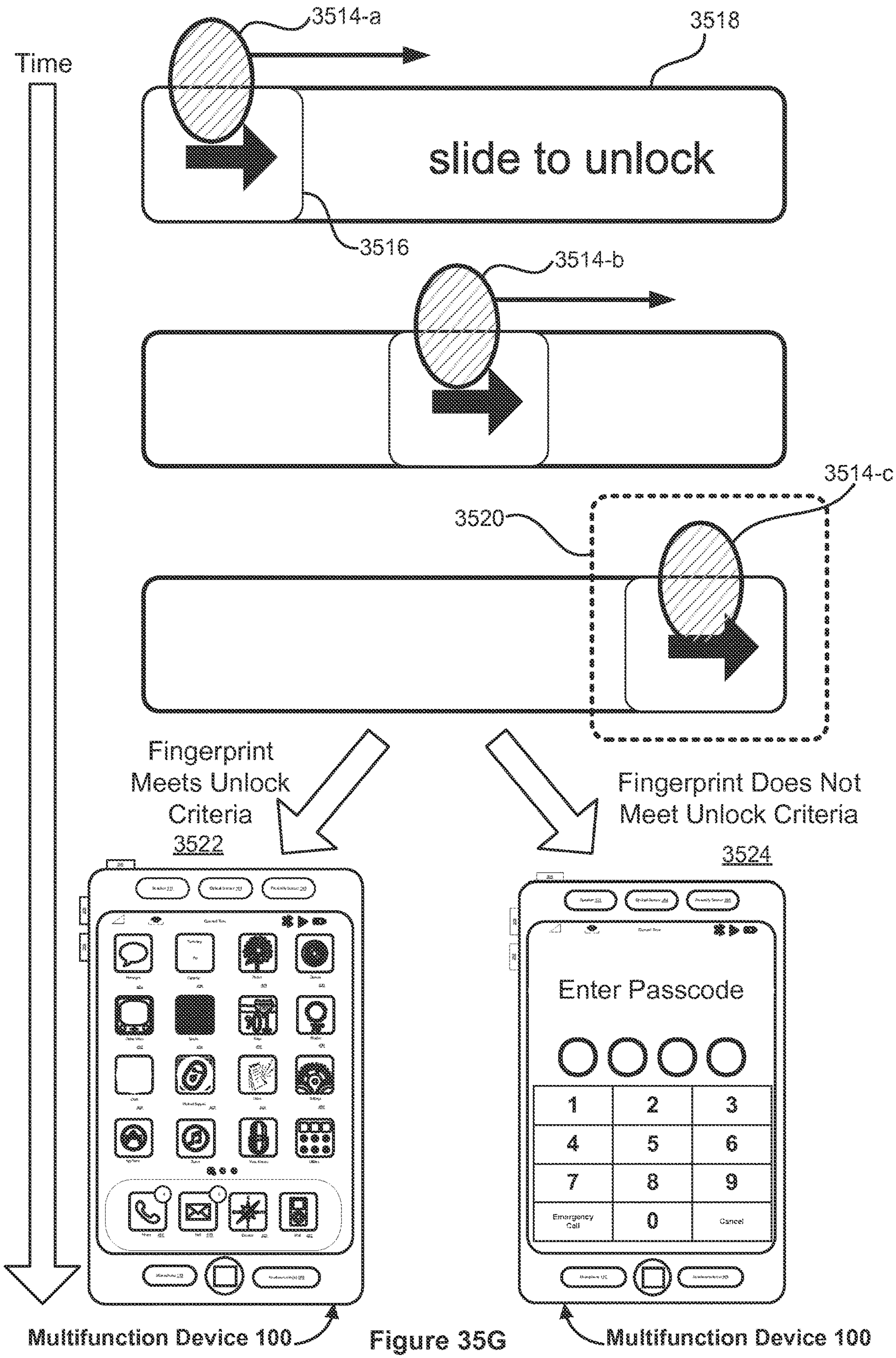

When the device detects fingerprint 3514 in region 3520 (e.g., when the contact with fingerprint 3514 has moved to location 3514-*c*), as shown in FIG. 35F and in FIG. 35G, device 100 operates region 3520 in enhanced-sensitivity mode. In some embodiments, device 100 operates region 3520 in enhanced-sensitivity mode if the contact with fingerprint 3514 is detected moving in region 3520 below a predetermined speed threshold. Device 100 detects one or more fingerprint features of fingerprint 3514. Based on the detected fingerprint features, device 100 determines whether fingerprint 3514 meets one or more unlock criteria or not. In the example shown in FIG. 35G, if fingerprint 3514 meets 3522 unlock criteria (e.g., the fingerprint is a previously registered fingerprint of a user of device 100), then device 100 is unlocked and, for example, an application launch user interface (or other unlocked interface) is displayed. In contrast, if fingerprint 3514 does not meet 3524 unlock criteria (e.g., the fingerprint is not identified as a previously registered fingerprint of a user of device 100) or if the features of fingerprint 3514 cannot be detected (e.g., because region 3520 is in reduced-sensitivity mode), then device 100 remains in the locked state and optionally displays an alternative user interface for unlocking device 100 (e.g., a passcode entry user interface). Alternatively, when fingerprint 3514 does not meet 3524 unlock criteria, the lock screen shown in FIG. 35D is redisplayed.

Figure 35H:
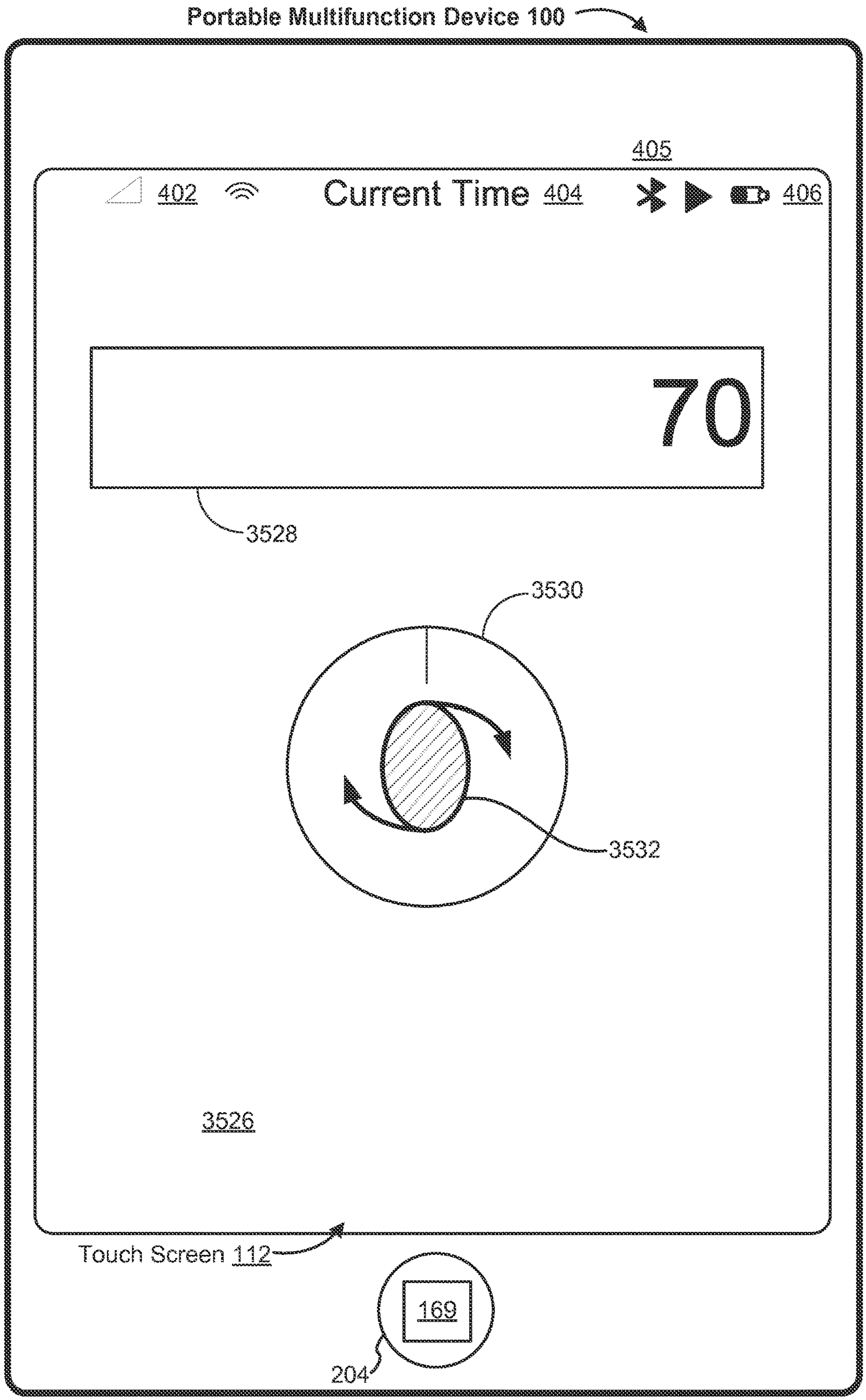

FIG. 35H shows user interface 3526 displayed on touch screen 112. User interface 3526 includes numeral value field 3528 and virtual knob 3530. User interface 3526 is a user interface of an application that includes numerical value input and/or manipulation (e.g., a calculator, a thermostat control application, a unit converter, a spreadsheet). A user interacts with virtual knob 3530 to adjust a value displayed in numerical value field 3528. For example, a user places a fingerprint on touch screen 112 over virtual knob 3530 and twists the fingerprint to turn virtual knob 3530. The value in numerical value field 3528 changes with the turning of virtual knob 3530.

Figure 35I:
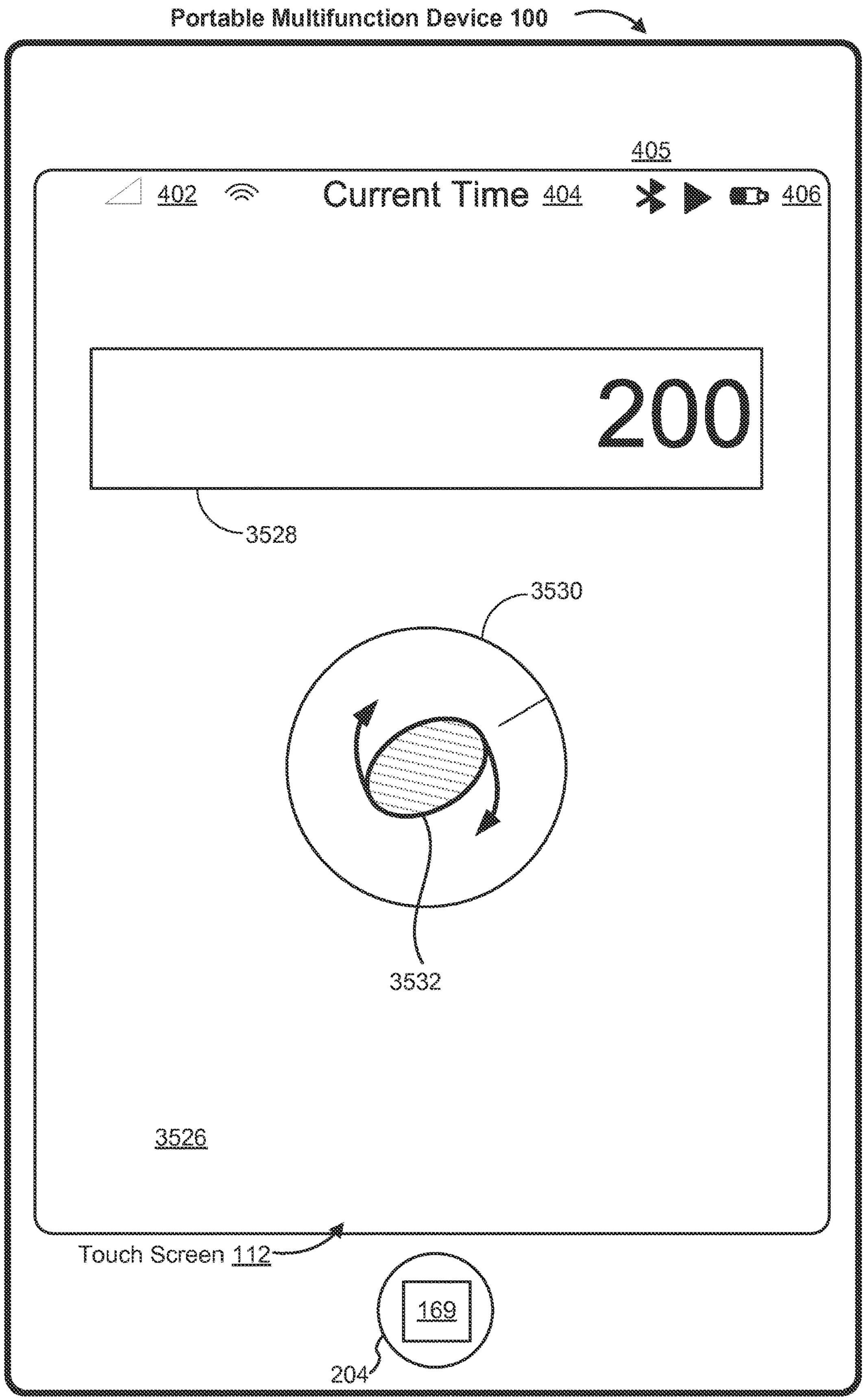
Figure 35J:
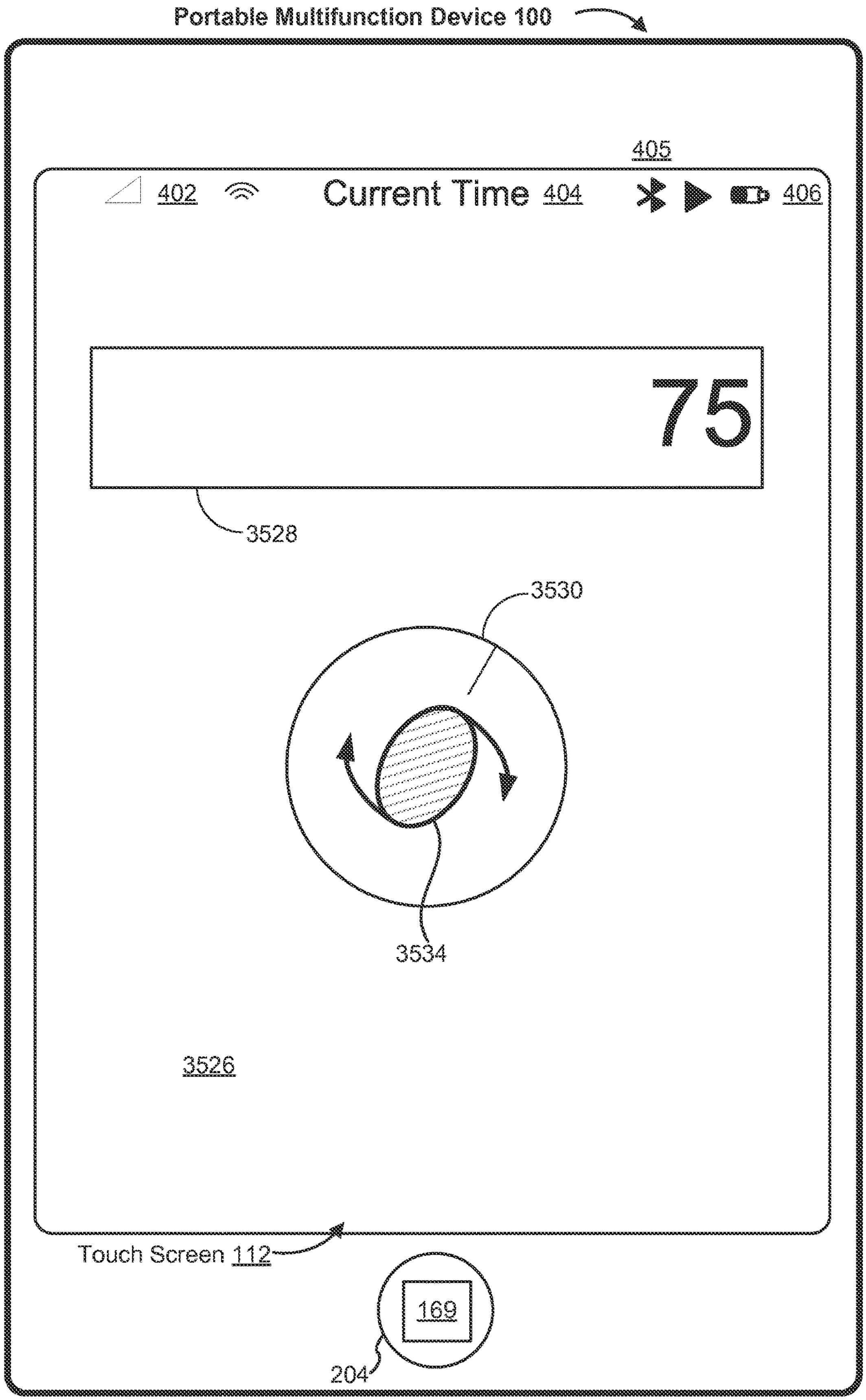

In FIGS. 35H-35J, the area of virtual knob 3530 is a region of touch screen 112 that device 100 operates in reduced-sensitivity mode or enhanced-sensitivity mode. When there is no fingerprint detected on virtual knob 3530, device 100 operates a portion of touch screen 112 that includes virtual knob 3530 in reduced-sensitivity mode. When a fingerprint is detected on virtual knob 3530, device 100 operates a portion of touch screen 112 that includes virtual knob 3530 in either reduced-sensitivity mode or enhanced-sensitivity mode based on the rate at which the detected fingerprint twists. For example, FIG. 35I illustrates fingerprint 3532 detected on virtual knob 3530. The user twists fingerprint 3532 at a rate above a predetermined threshold speed. In accordance with the above-threshold twisting rate of fingerprint 3532, device 100 operates a portion of touch screen 112 that includes virtual knob 3530 in reduced-sensitivity mode. While operating the portion of touch screen 112 that includes virtual knob 3530 in reduced-sensitivity mode, device 100 detects motion (e.g., twisting) of fingerprint 3532 but not the features of fingerprint 3532. Thus, device 100 detects twisting of fingerprint 3532 in relatively coarse increments. Virtual knob 3530 rotates in coarse increments in accordance with the detected coarse twisting increments of fingerprint 3532. The value in numerical value field 3528 changes in coarse increments in accordance with the coarse increments of rotation of virtual knob 3530.

FIG. 35J illustrates fingerprint 3534, analogous to fingerprint 3532, detected on virtual knob 3530. The user twists fingerprint 3534 at a rate below the predetermined threshold speed. In accordance with the below-threshold twisting rate of fingerprint 3534, device 100 operates the portion of touch screen 112 that includes virtual knob 3530 in enhanced-sensitivity mode. While operating the portion of touch screen 112 that includes virtual knob 3530 in enhanced-sensitivity mode, device 100 detects features of fingerprint 3532 as well as its twisting motion. By detecting the features of fingerprint 3532, device 100 is able to detect the movement of those features and thus detect fine movement, including twisting in fine increments, of fingerprint 3532. Virtual knob 3530 rotates in fine increments in accordance with the detected fine twisting increments of fingerprint 3530. The value in numerical value field 3528 changes in fine increments accordance with the fine increments of rotation of virtual knob 3530. In some embodiments, device 100 operates the portion of touch screen 112 that includes virtual knob 3530 in enhanced-sensitivity mode in response to detecting fingerprint 3534 twisting in virtual knob 3530, without regard to the speed of the twisting.

As shown in FIGS. 35A-35J, touch screen 112 includes one or more regions that device 100 operates in reduced-sensitivity mode or enhanced-sensitivity mode. It should be appreciated that, in some embodiments, any portion of touch screen 112 (or touch-sensitive surface 451) is capable of being operated by the device (e.g., device 100 or 300) in reduced-sensitivity mode or enhanced-sensitivity mode. In some embodiments, for a given displayed user interface, some portions of touch screen 112 (or touch-sensitive surface 451), such as the portions of touch screen 112 outside of regions 3502, region 3520, or virtual knob 3530, remain in reduced-sensitivity mode; the capability to transition those portions between reduced-sensitivity mode and enhanced-sensitivity mode is disabled. For example, for user interface 3501 as shown in FIG. 35A, the capability to transition the portions of touch screen 112 outside of regions 3502 between reduced-sensitivity mode and enhanced-sensitivity mode is disabled. Also, in some embodiments, a region where the transitioning between sensitivity modes is enabled moves along with the corresponding user interface object or affordance. For example, in FIG. 35A, if the locations of “Notes” icon 444 and “Weather” icon 438 are swapped with each other, region 3502-5 moves to the new location of “Notes” icon 444, and the portion of touch screen 112 corresponding to the old location of “Notes” icon 444 (i.e., the new location of “Weather” icon 438) is disabled from transitioning between reduced-sensitivity mode and enhanced-sensitivity mode.

In some embodiments, the portions of the touch-sensitive surface that are transitioned between the reduced-sensitivity mode and enhanced-sensitivity mode correspond to different groups of sensors that can be enabled and disabled separately. For example, a first set of sensors corresponding to a lower right quadrant of touch screen 112, a second set of sensors corresponding to an upper right quadrant of touch screen 112, a third set of sensors corresponding to a lower left quadrant of touch screen 112, and a fourth set of sensors corresponding to an upper left quadrant of touch screen 112 can each be independently transitioned between the reduced-sensitivity mode and the enhanced-sensitivity mode. In some embodiments, the different regions are selected to be transitioned between the reduced-sensitivity mode and the enhanced-sensitivity mode based on a location of a contact or a user interface object on touch screen 112, as described in greater detail above. In situations where the device determines that a region of the user interface that needs enhanced-sensitivity data spans multiple regions of sets of sensors, the device, optionally, enables all of the multiple regions of sets of sensors to operate in the enhanced-sensitivity mode of operation, while one or more other sets of sensors continue to operate in the reduced-sensitivity mode of operation.

FIGS. 36A-36B are flow diagrams illustrating a method 3600 of operating a portion of a touch-sensitive surface in an enhanced-sensitivity mode of operation in accordance with some embodiments. The method 3600 is performed at an electronic device (e.g., device 300, FIG. 3, or portable multifunction device 100, FIG. 1A) with a display and a touch-sensitive surface. In some embodiments, the display is a touch screen display and the touch-sensitive surface is on the display. In some embodiments, the display is separate from the touch-sensitive surface. Some operations in method 3600 are, optionally, combined and/or the order of some operations is, optionally, changed.

As described below, the method 3600 provides an intuitive way to operate a portion of a touch-sensitive surface in an enhanced-sensitivity mode of operation. The method reduces the cognitive burden on a user when operating a touch-sensitive surface, thereby creating a more efficient human-machine interface. For battery-operated electronic devices, enabling operation of a portion of a touch-sensitive surface in an enhanced-sensitivity mode of operation conserves power and increases the time between battery charges.

The device detects (3602) a contact in a first region of the touch-sensitive surface, where the first region of the touch-sensitive surface is in a reduced-sensitivity mode of operation. FIG. 35A, for example, illustrates a contact with fingerprint 3504 detected in region 3502-7 that is being operated in reduced-sensitivity mode. FIG. 35F shows a contact with fingerprint 3514 moving to location 3514-*c*, which is in region 3520 that is being operated in reduced-sensitivity mode. FIG. 35H shows a contact with fingerprint 3532 detected in virtual knob 3530, which is also a region that is being operated in reduced-sensitivity mode. In some embodiments, the touch-sensitive surface includes (3603) a plurality of different regions (e.g., regions that correspond to subsets of the touch-sensitive surface), and the device is configured to independently transition each of the plurality of different regions between the reduced-sensitivity mode and the enhanced-sensitivity mode (e.g., the device can turn the enhanced-sensitivity mode "on" for one or more of the regions without turning the enhanced-sensitivity mode on for the whole touch-sensitive surface). Turning the enhanced-sensitivity mode on in certain areas, but not in others, if there is no need to have the whole touch-sensitive surface in enhanced-sensitivity mode, reduces demands on the processor and extends battery life. For example, FIG. 35A shows regions 3502-1 through 3502-7. In some embodiments, the device is configured to independently transition each of regions 3502-1 through 3502-7 (or regions of touch screen 112 that include these regions) between reduced-sensitivity mode and enhanced-sensitivity mode.

In response to detecting the contact (3604), the device determines (3606) whether the contact meets one or more fingerprint-sensor activation criteria. Device 100 determines, for example, whether fingerprint 3504 (or fingerprint 3514 or 3532 or 3534) meets one or more fingerprint-sensor activation criteria.

In some embodiments, the one or more fingerprint-sensor activation criteria include (3608) a criterion that is met when a fingerprint-shaped contact is detected in the first region of the touch-sensitive surface. For example, a fingerprint-sensor activation criterion is met by detection of a contact with fingerprint 3504 in region 3502-7 (or detection of a contact with fingerprint 3514 in region 3520).

In some embodiments, the one or more fingerprint-sensor activation criteria include (3610) a criterion that is met when a fingerprint-shaped contact is detected moving at a speed below a predetermined threshold speed (e.g., enhanced-sensitivity helps make slow movement more accurate/slow movement indicates that the user is interacting with a fingerprint sensitive user interface element). For example, a fingerprint-sensor activation criterion is met by detection of fingerprint 3534 twisting in virtual knob 3530 at a rate below a predetermined threshold. As another example, a fingerprint-sensor activation criterion is met by detection of a contact with fingerprint 3514 moving in region 3520 at a rate below a predetermined threshold.

In some embodiments, the one or more fingerprint-sensor activation criteria include (3612) a criterion that is met when a contact is detected on the touch-sensitive surface while a focus selector corresponding to the contact is over a fingerprint-sensitive user interface element. For example, the device detects a contact over a control that operates in accordance with a detected fingerprint (e.g., a knob or dial that operates in response to twisting of a fingerprint, or an affordance that is restricted so that it is only activated in accordance with a detected fingerprint) and turns on the fingerprint sensitivity in a region of the touch-sensitive surface that includes the contact and/or the control so that the fingerprint corresponding to the contact can be identified and used to operate the control. For example, a fingerprint-sensor activation criterion is met by detection of fingerprint 3534 twisting in virtual knob 3530. As another example, a fingerprint-sensor activation criterion is met by detection of a contact with fingerprint 3504 in region 3502-7.

In accordance with a determination that the contact meets the fingerprint-sensor activation criteria, the device operates (3614) the first region of the touch-sensitive surface in an enhanced-sensitivity mode of operation (e.g., for contacts within the first region of the touch-sensitive surface, the device can detect the presence/absence and movement of the contact, and, in addition, the device can detect fingerprint features of the contact such as minutia features that enable the contact to be uniquely identified as a previously registered fingerprint). For example, device 100 operates region 3502-7 (and similarly region 3520 or a portion of touch screen 112 that includes virtual knob 3530) in enhanced-sensitivity mode when the fingerprint-sensor activation criteria are met.

In accordance with a determination that the contact does not meet the fingerprint-sensor activation criteria, the device continues to operate (3618) the first region of the touch-sensitive surface in the reduced-sensitivity mode of operation (e.g., for regions of the touch-sensitive surface that are operating in the reduced-sensitivity mode, the device can detect the presence/absence and movement of the contact, but is not able to detect fingerprint features of the contact such as minutia features that would enable the contact to be uniquely identified as a previously registered fingerprint). For example, in FIG. 35I, when the fingerprint-sensor activation criteria includes movement or rotation below a threshold rate, when fingerprint 3532 twists above the threshold speed, the device 100 continues to operate virtual knob 3530 in reduced-sensitivity mode.

In some embodiments, while the first region of the touch-sensitive surface is in the enhanced-sensitivity mode of operation, the device is capable (3616) of detecting fingerprint details of a contact detected in the first region; and while the first region of the touch-sensitive surface is in the reduced-sensitivity mode of operation, the device is not capable (3620) of detecting fingerprint details of a contact detected in the first region. For example, while device 100 is operating region 3502-7 (or region 3520 or 3530) in enhanced-sensitivity mode, device 100 is capable of detecting fingerprint details (e.g., fingerprint features) of a contact (e.g., a contact with fingerprint 3504, a contact with fingerprint 3514, a contact with fingerprint 3534) detected in the region. While device 100 is operating region 3502-7 (or region 3520 or 3530) in reduced-sensitivity mode, device 100 is not capable of detecting fingerprint details (e.g., fingerprint features) of a contact detected in the region and thus does not track movements of the contact as precisely as when the region is operating in the enhanced-sensitivity mode.

In some embodiments, while operating the first region of the touch-sensitive surface in the enhanced-sensitivity mode (3622), the device detects (3624) fingerprint features of the contact, and, in response to detecting the fingerprint features of the contact, performs (3626) an operation in accordance with the fingerprint features (e.g., in response to detecting the fingerprint features of the contact, the device performs an identity-based operation or an operation that requires detecting fingerprint features of the contact). For example, the device detects small movements of the contact based on detecting movements of fingerprint minutia features, where the small movements of the contact would not be detectable based on movement of the overall contact without looking at the fingerprint features. In FIGS. 35B-35C, device 100 detects the features of fingerprint 3504 in region 3502-7 and either displays error message 3506 or displays user interface 3508 of e-mail client module 140 based on the detected features of fingerprint 3504. In FIG. 35G, device 100 detects the features of fingerprint 3514 in region 3520 and unlocks device 100 or leaves device 100 based on whether the fingerprint 3514 meets unlock criteria 3522 or does not meet the unlock criteria 3524. In FIG. 35J, device 100 detects movement of features of fingerprint 3534 in virtual knob 3530 and rotates virtual knob 3530 in fine increments in accordance with the detected movement of the fingerprint features.

In some embodiments, while operating the first region in the enhanced-sensitivity mode (3622), the device operates (3628) one or more of the other regions of the touch-sensitive surface in the reduced-sensitivity mode (e.g., while the first region is enabled to detect fingerprint details of contacts detected on the touch-sensitive surface, other regions of the touch-sensitive surface are able to detect the presence/absence and movement of contacts, without detecting fingerprint details of the contacts). For example, FIG. 35A shows multiple regions 3502 that are operable in reduced-sensitivity mode or enhanced-sensitivity mode (and the remainder of touch screen 112 is operable in reduced-sensitivity mode). While region 3502-7 is operated in enhanced-sensitivity mode, the other regions 3502 are operated in reduced-sensitivity mode. Maintaining some of the regions of the touch screen 112 in reduced-sensitivity mode while operating a respective region in enhanced-sensitivity mode provides the benefits of enhanced precision and/or ability to authenticate a user in the respective region while reducing power usage by keeping other regions in a lower power reduced-sensitivity mode when the enhanced-sensitivity mode is not needed for the other regions.

In some embodiments, operating (3630) the first region of the touch-sensitive surface in the enhanced-sensitivity mode consumes more power than operating the first region of the touch-sensitive surface in the reduced-sensitivity mode. Thus, switching the first region of the touch-sensitive surface from reduced-sensitivity mode to enhanced-sensitivity mode on an "as needed" basis reduces the overall energy consumption of the device, thereby increasing energy efficiency and battery life of the device. For example, operating region 3502-7 in enhanced-sensitivity mode when a contact is detected within, and in reduced-sensitivity mode at other times reduces power consumption compared to operating region 3502-7 in enhanced-sensitivity mode all the time.

In some embodiments, operating (3632) more than the first region of the touch-sensitive surface in the enhanced-sensitivity mode consumes more power than operating only the first region of the touch-sensitive surface in the enhanced-sensitivity mode (e.g., while operating the rest of the touch-sensitive surface in the reduced-sensitivity mode). Thus, operating the rest of the touch-sensitive surface in the reduced-sensitivity mode while operating the first region of the touch-sensitive surface in the enhanced-sensitivity mode reduces the overall energy consumption of the device, thereby increasing energy efficiency and battery life of the device. For example, operating just whichever region 3502 in which a contact is detected (e.g., region 3502-7 in FIG. 35A) in enhanced-sensitivity mode and the rest in reduced-sensitivity mode reduces power consumption compared to operating more than one of regions 3502 in enhanced-sensitivity mode.

It should be understood that the particular order in which the operations in FIGS. 36A-36B have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., those methods described above) are also applicable in an analogous manner to method 3600 described above with respect to FIGS. 36A-36B. For example, the fingerprints, contacts, and user interfaces described above with reference to method 3600 optionally have one or more of the characteristics of the fingerprints, contacts, and user interfaces described herein with reference to other methods described herein (e.g., those methods described above). For brevity, these details are not repeated here.

Figure 37:
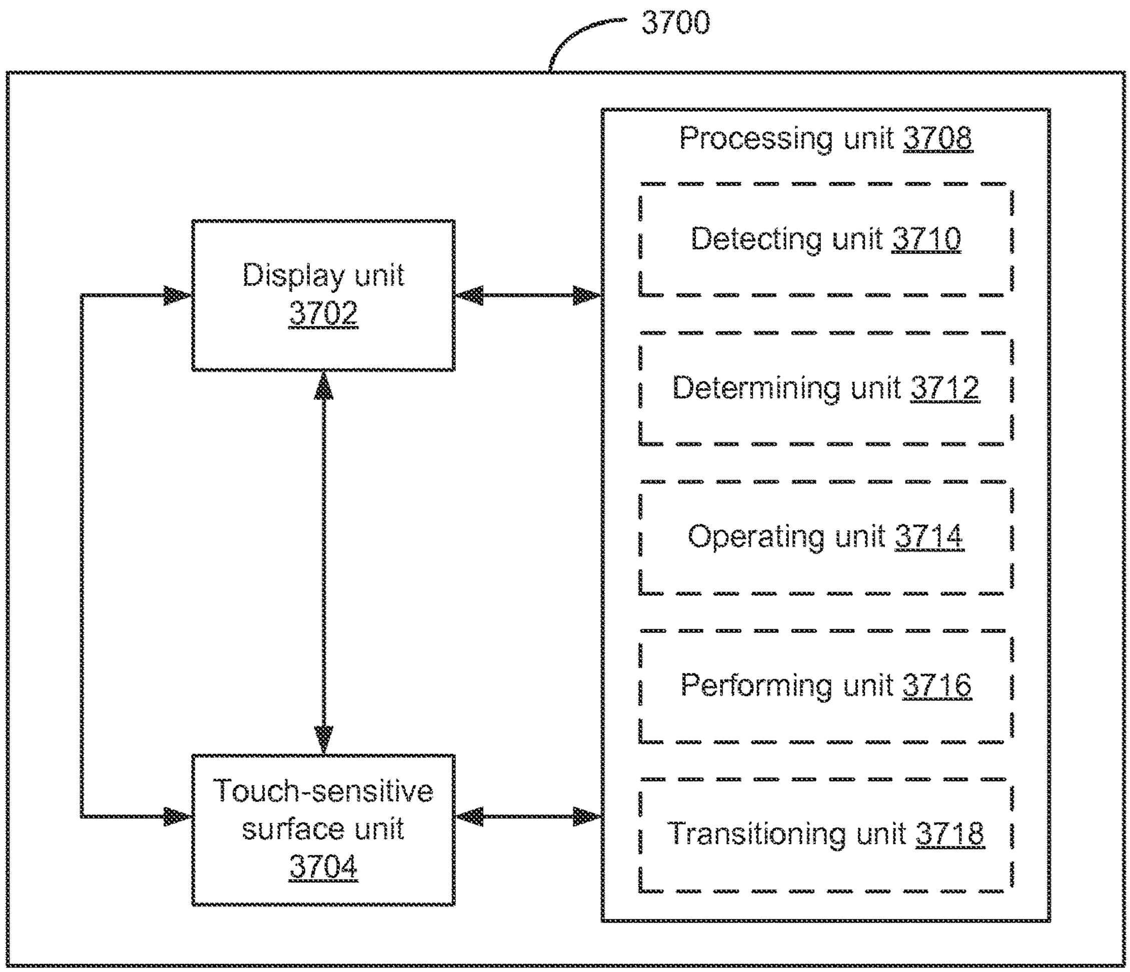
FIG. 37 is a functional block diagram of an electronic device in accordance with some embodiments.

In accordance with some embodiments, FIG. 37 shows a functional block diagram of an electronic device 3700 configured in accordance with the principles of the various described embodiments. The functional blocks of the device are, optionally, implemented by hardware, software, or a combination of hardware and software to carry out the principles of the various described embodiments. It is understood by persons of skill in the art that the functional blocks described in FIG. 37 are, optionally, combined or separated into sub-blocks to implement the principles of the various described embodiments. Therefore, the description herein optionally supports any possible combination or separation or further definition of the functional blocks described herein.

As shown in FIG. 37, an electronic device 3700 includes a display unit 3702, a touch-sensitive surface unit 3704 configured to receive contacts, and a processing unit 3708 coupled to the display unit 3702 and the touch-sensitive surface unit 3704. In some embodiments, the processing unit 3708 includes a detecting unit 3710, a determining unit 3712, an operating unit 3714, a performing unit 3716, and a transitioning unit 3718.

The processing unit 3708 is configured to: detect a contact in a first region of the touch-sensitive surface unit 3704 (e.g., with the detecting unit 3710), where the first region of the touch-sensitive surface unit 3704 is in a reduced-sensitivity mode of operation; in response to detecting the contact: determine whether the contact meets fingerprint-sensor activation criteria (e.g., with the determining unit 3712); in accordance with a determination that the contact meets the fingerprint-sensor activation criteria, operate the first region of the touch-sensitive surface unit 3704 in an enhanced-sensitivity mode of operation (e.g., with the operating unit 3714); and in accordance with a determination that the contact does not meet the fingerprint-sensor activation criteria, continue to operate the first region of the touch-sensitive surface unit 3704 in the reduced-sensitivity mode of operation (e.g., with the operating unit 3714).

In some embodiments, while the first region of the touch-sensitive surface unit 3704 is in the enhanced-sensitivity mode of operation, the processing unit 3708 is capable of detecting fingerprint details of a contact detected in the first region (e.g., with the detecting unit 3710), and while the first region of the touch-sensitive surface unit 3704 is in the reduced-sensitivity mode of operation, the processing unit 3708 is not capable of detecting fingerprint details of a contact detected in the first region (e.g., with the detecting unit 3710).

In some embodiments, the processing unit 3708 is configured to, while operating the first region of the touch-sensitive surface unit 3704 in the enhanced-sensitivity mode: detect fingerprint features of the contact (e.g., with the detecting unit 3710), and in response to detecting the fingerprint features of the contact, perform an operation in accordance with the fingerprint features (e.g., with the performing unit 3716).

In some embodiments, the touch-sensitive surface unit 3704 includes a plurality of different regions, and the processing unit 3708 is configured to independently transition each of the plurality of different regions between the reduced-sensitivity mode and the enhanced-sensitivity mode (e.g., with the transitioning unit 3718).

In some embodiments, the processing unit 3708 is configured to, while operating the first region in the enhanced-sensitivity mode, operate one or more of the other regions of the touch-sensitive surface unit 3704 in the reduced-sensitivity mode (e.g., with the operating unit 3714).

In some embodiments, operating the first region of the touch-sensitive surface unit 3704 in the enhanced-sensitivity mode consumes more power than operating the first region of the touch-sensitive surface unit 3704 in the reduced-sensitivity mode.

In some embodiments, operating more than the first region of the touch-sensitive surface unit 3704 in the enhanced-sensitivity mode consumes more power than operating only the first region of the touch-sensitive surface unit 3704 in the enhanced-sensitivity mode.

In some embodiments, the one or more fingerprint-sensor activation criteria include a criterion that is met when a fingerprint-shaped contact is detected in the first region of the touch-sensitive surface unit 3704.

In some embodiments, the one or more fingerprint-sensor activation criteria include a criterion that is met when a fingerprint-shaped contact is detected moving at a speed below a predetermined threshold speed.

In some embodiments, the one or more fingerprint-sensor activation criteria include a criterion that is met when a contact is detected on the touch-sensitive surface unit 3704 while a focus selector corresponding to the contact is over a fingerprint-sensitive user interface element.

The operations in the information processing methods described above are, optionally implemented by running one or more functional modules in information processing apparatus such as general purpose processors (e.g., as described above with respect to FIGS. 1A and 3) or application specific chips.

The operations described above with reference to FIGS. 36A-36B are, optionally, implemented by components depicted in FIGS. 1A-1B or FIG. 37. For example, detection operation 3602, determining operation 3606, and operating operations 3614 and 3618 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub-event, such as selection of an object on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Performing Operations Associated with Fingerprint Gestures

Many electronic devices have respective applications for performing respective operations, along with respective corresponding user interfaces and affordances. Typically, in order to have an operation performed by a device, the user launches the corresponding application (e.g., by activating a corresponding application icon) on the device so that the corresponding user interfaces and affordances are displayed. The user then activates the operation using the user interface and affordances. However, sometimes the user wants an operation performed in the moment while interacting with an unrelated application or user interface. In current methods, the user would still have to activate the application icon to launch the application, in order to perform the operation. This is time consuming and detracts from the user experience. The embodiments described below improve on these methods by associating a particular fingerprint with an operation on a device. When the user performs a gesture with that fingerprint while a user interface unrelated to the desired operation is displayed, the device performs the operation. Thus, the user can activate an operation while a user interface unrelated to the operation is displayed; the user has the ability to activate the operation quickly and efficiently, thereby improving the speed and efficiency of the user interface.

In some embodiments, the device is an electronic device with a separate display (e.g., display 450) and a separate touch-sensitive surface (e.g., touch-sensitive surface 451). In some embodiments, the device is portable multifunction device 100, the display is touch screen 112, and the touch-sensitive surface includes tactile output generators 167 on the display (FIG. 1A). The device described below with reference to 38A-38P and 39A-39E optionally includes one or more fingerprint sensors 169. In some embodiments, the one or more fingerprint sensors include one or more integrated fingerprint sensors 359-1 (FIG. 4B) that are integrated in to the touch-sensitive surface (e.g., separate touch-sensitive surface 451 or touch sensitive display system 112). In some embodiments, the one or more fingerprint sensors include separate fingerprint sensors 359-2 (FIG. 4B) that are separate from the touch-sensitive surface (e.g., separate touch-sensitive surface 451 or touch sensitive display system 112). Unless specified otherwise, a fingerprint sensor 169 described below is, optionally, either an integrated fingerprint sensor 359-1 or a separate fingerprint sensor 359-2, depending on the configuration of the hardware and software of the device that includes the fingerprint sensor 169. For convenience of explanation, the embodiments described with reference to FIGS. 38A-38P and 39A-39E will be discussed with reference to touch screen 112 and optionally one or more fingerprint sensors 169; in such embodiments, the focus selector is, optionally: a respective contact, a representative point corresponding to a contact (e.g., a centroid of a respective contact or a point associated with a respective contact), or a centroid of two or more contacts detected on the touch screen 112, in place of a cursor. Analogous operations are, optionally, performed on a device with display 450, a separate touch-sensitive surface 451, and optionally one or more fingerprint sensors 169 in response to detecting the inputs described in FIGS. 38A-38P on the touch-sensitive surface 451 while displaying the user interfaces shown in FIGS. 38A-38P on the display 450.

FIG. 38A illustrates user interface 3801 displayed on touch screen 112 of a device (device 100). Touch screen 112 includes an integrated fingerprint sensor. In FIG. 38A, application launch user interface 3801 that includes one or more icons for launching respective applications is displayed on touchscreen display 112. At the device, one or more respective fingerprints are associated with respective operations. In some embodiments, the fingerprints are differentiated by hand and finger. For example, a right thumbprint is associated with a respective function or operation, and a left thumbprint is associated with another respective function or operation. In some embodiments, a camera-related function or operation (e.g., a shutter function for capturing a photo or video, displaying a camera preview) is associated with a respective fingerprint.

While application launch user interface 3801 is displayed on touch screen 112, the device detects a gesture with fingerprint 3802 on touch screen 112. Fingerprint 3802 is identified by the device as a right thumbprint. In this example, the right thumbprint is associated with display of a camera interface and a camera preview, and still image or photo capture. In response to detecting the gesture with fingerprint 3802, the device displays camera interface 3804, corresponding to camera module 143, on touch screen 112, as shown in FIG. 38B. In some embodiments, the device displays camera preview 3806 in response to detecting fingerprint 3802 on touch screen 112 for at least a predefined amount of time. Camera interface 3804 includes camera preview 3806. Camera preview 3806 shows content that is detected by a camera (e.g., optical sensor(s) 164) on the device, and previews what will be captured by the camera as a still image or video if a media capture function is activated on the device.

In some embodiments, fingerprints detected on touch screen 112 are identified based on comparison to previously registered features of fingerprints of users or to features associated with predefined fingerprint types. For example, fingerprint 3802 is identified as a right thumbprint through identification of fingerprint 3802 as the right thumbprint of a particular user or identification of fingerprint 3802 as a generic (i.e., without identifying that fingerprint 3802 belongs to a particular user) right thumbprint.

Figure 38C:
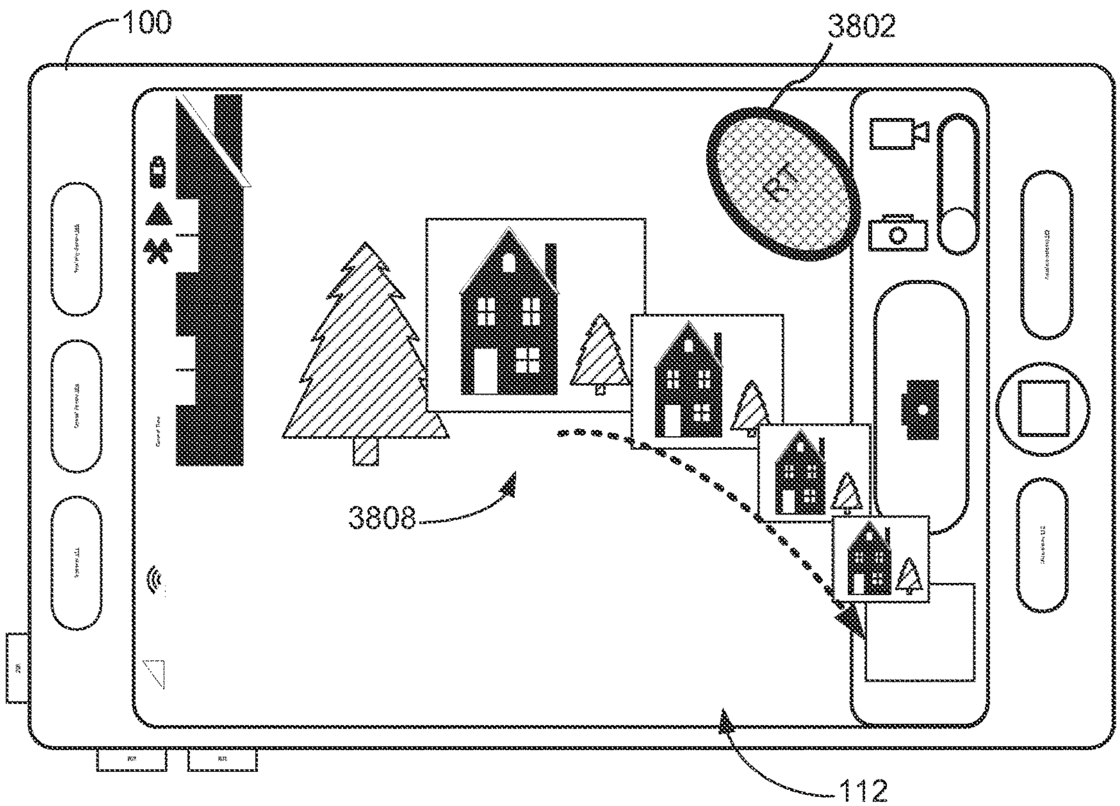
Figure 38D:
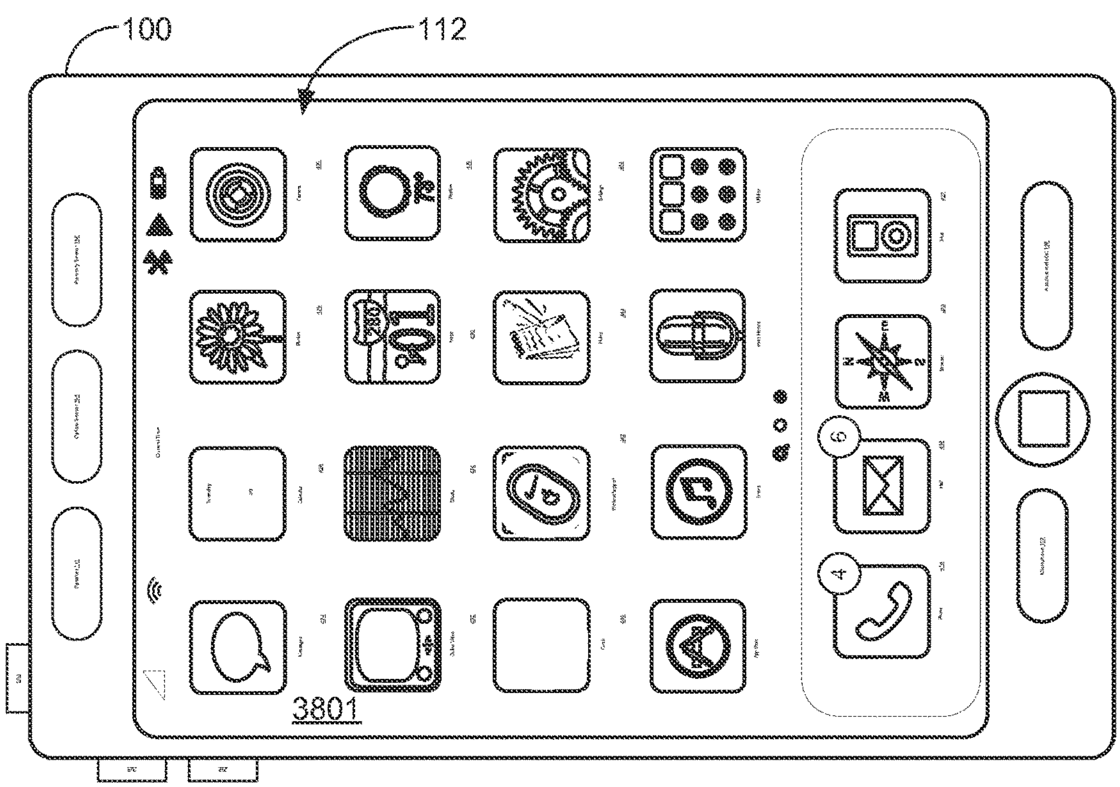

The device detects a continuation of the gesture with fingerprint 3802, where the continuation includes an increase in the intensity of a contact corresponding to fingerprint 3802 above a predefined intensity threshold (e.g., an intensity threshold that is higher than a standard contact-detection intensity threshold), as shown in FIG. 38C. For example, the user presses down on touch screen 112 with the contact corresponding to fingerprint 3802. In response to detecting the intensity increase above the threshold, the device activates a shutter function, which activates a capturing of a still image or photo corresponding to camera preview 3806. In some embodiments, the device displays an animation of representation 3808 of the captured photo moving to a film strip or camera roll for camera application 143, as illustrated in FIG. 38C. After the photo is captured, the device ceases displaying camera interface 3804 and camera preview 3806, and re-displays the previously displayed user interface (e.g., application launch user interface 3801), as shown in FIG. 38D.

In some embodiments, the device activates the shutter function for capturing content in response to detecting fingerprint 3802 continuously for longer than a respective time threshold (e.g., 2, 5, 10 seconds or any other reasonable time threshold), rather than in response to detecting an increase in the contact intensity. For example, the shutter function is activated if fingerprint 3802 in FIG. 38B is continuously detected, from initial detection, for longer than the time threshold. Thus, in some embodiments, even while a user interface that doesn't include an affordance for displaying a camera interface or activating a shutter function (or another operation) is displayed, a user can still activate display of a camera interface and/or a shutter function (or the another operation) with a gesture that includes a fingerprint associated with the respective operation(s).

Figure 38E:
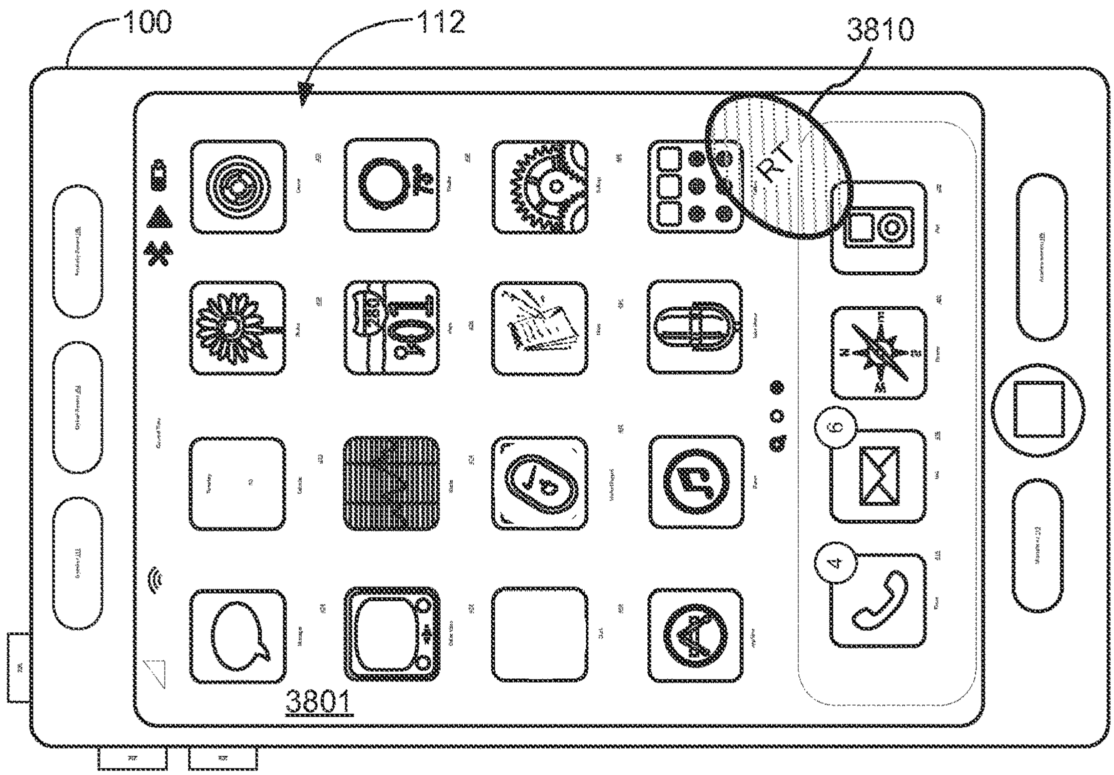
Figure 38F:
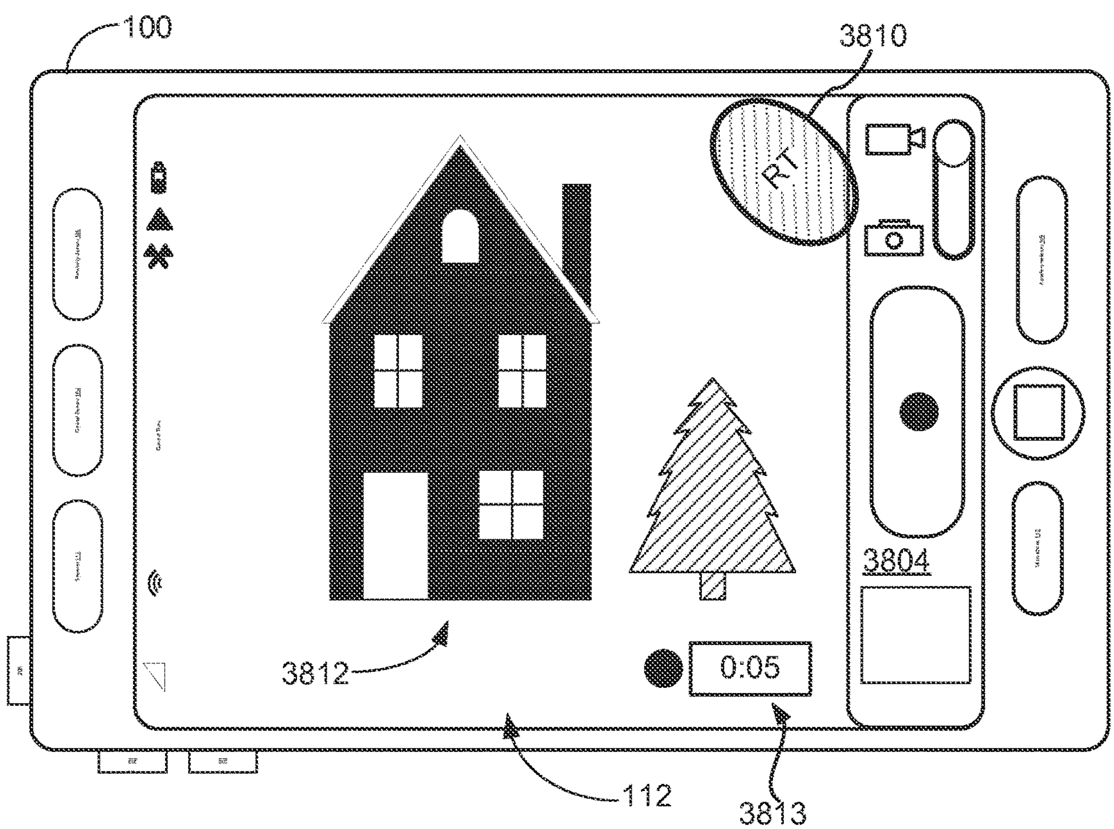
Figure 38G:
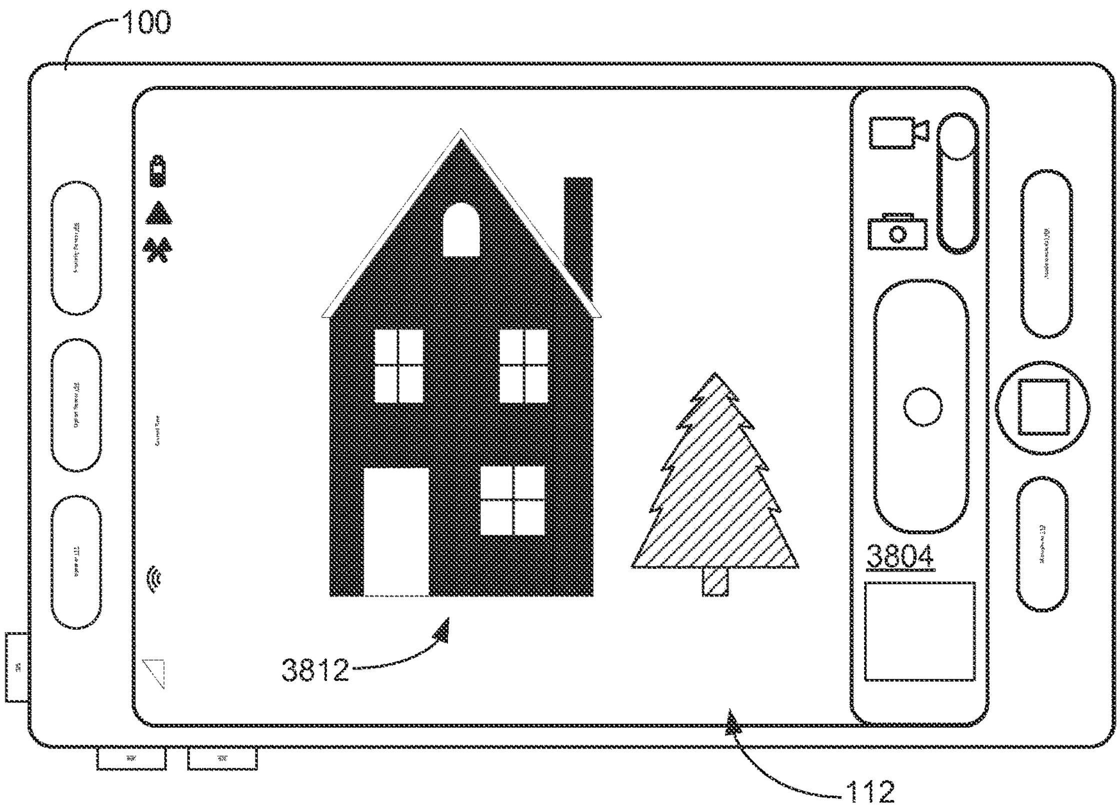
Figure 38H:
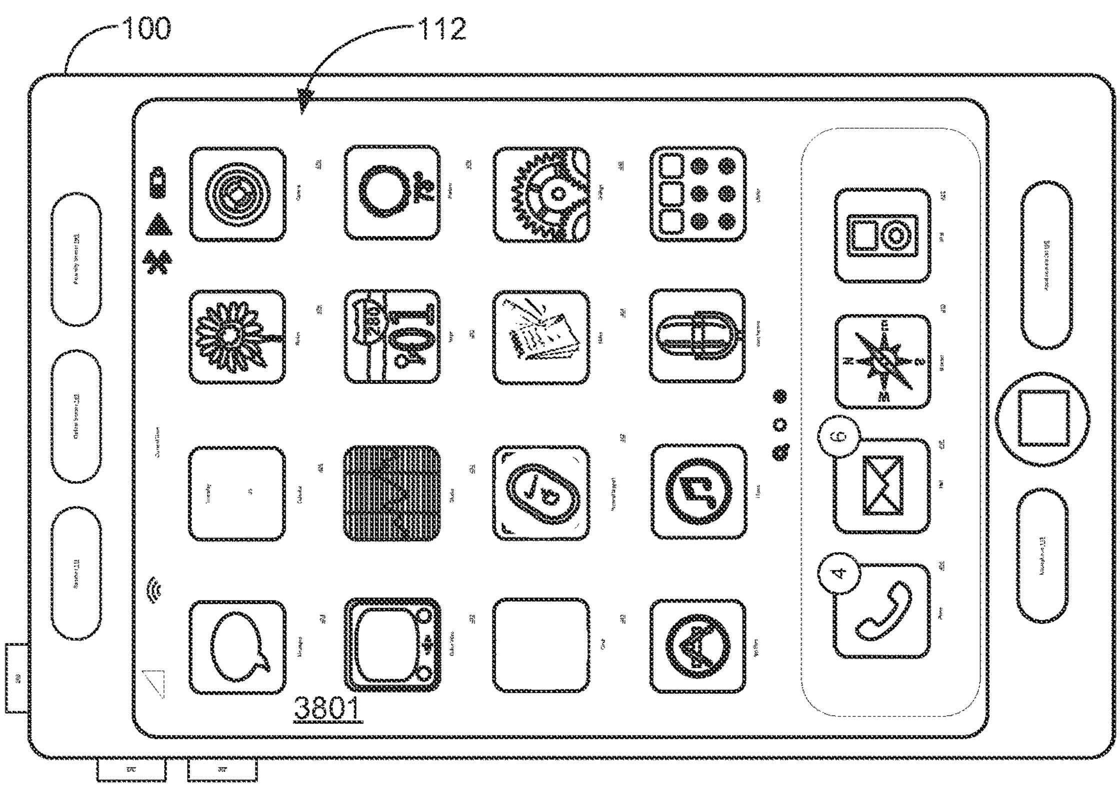

FIGS. 38E-38H illustrates another example of activating a respective operation while a user interface that does not include an affordance for activating the respective operation is displayed. FIG. 38E illustrates application launch user interface 3801 displayed on touch screen 112, as in FIG. 38A. A gesture with fingerprint 3810 is detected on touch screen 112. Fingerprint 3810 is detected by the device to be a right thumbprint. In this example, the right thumbprint is associated with display of a camera interface and a camera preview, and video recording. In response to detecting the gesture with fingerprint 3810, the device displays camera interface 3804 and camera preview 3812 on touch screen 112, as shown in FIG. 38F. Also, the device activates recording of video corresponding to camera preview 3812. While video is being recorded, recording indicator 3813 is, optionally, displayed on touch screen 112 to indicate that recording is in progress as well as the time length of the in-progress recording. FIG. 38G shows the gesture with fingerprint 3810 no longer detected on touch screen 112 due to, for example, fingerprint 3810 having been lifted off touch screen 112. In response to detecting the liftoff, the device ceases recording the video and ceases displaying camera interface 3804 and camera preview 3812, and re-displays user interface 3801, as shown in FIG. 38H.

Figure 38I:
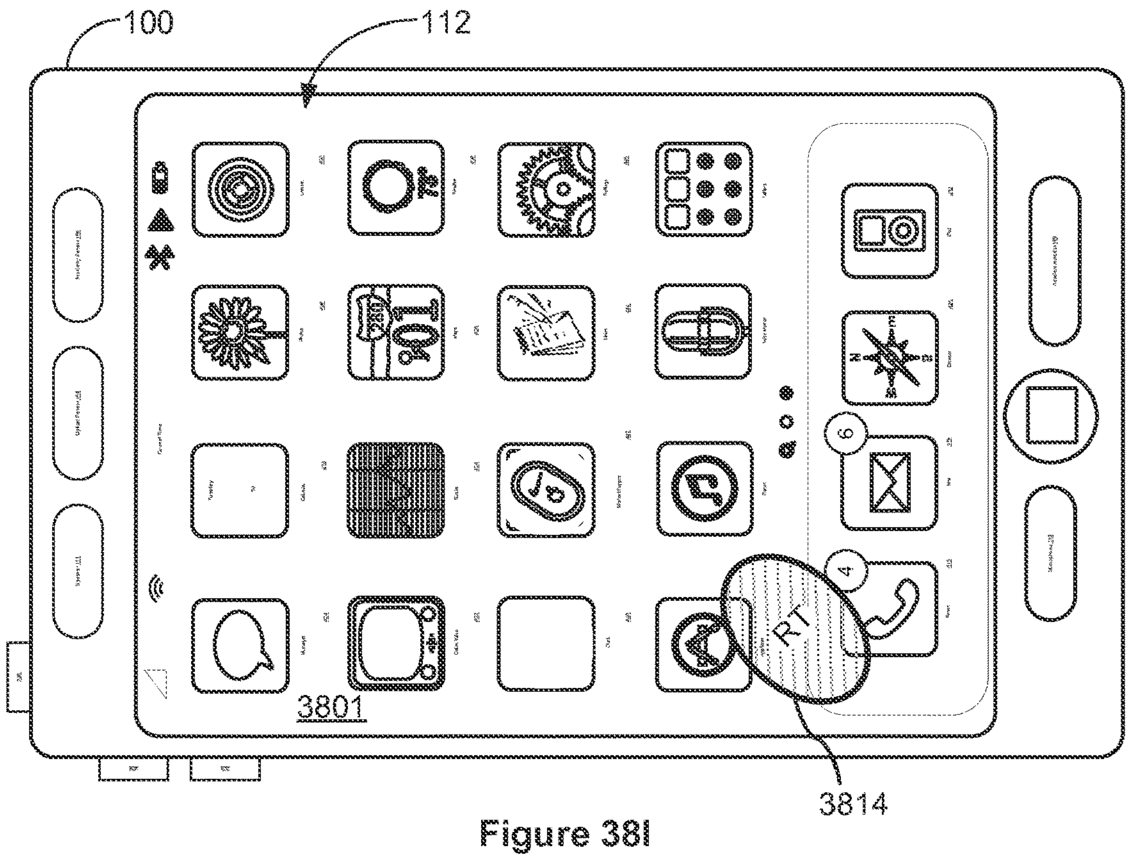
Figure 38J:
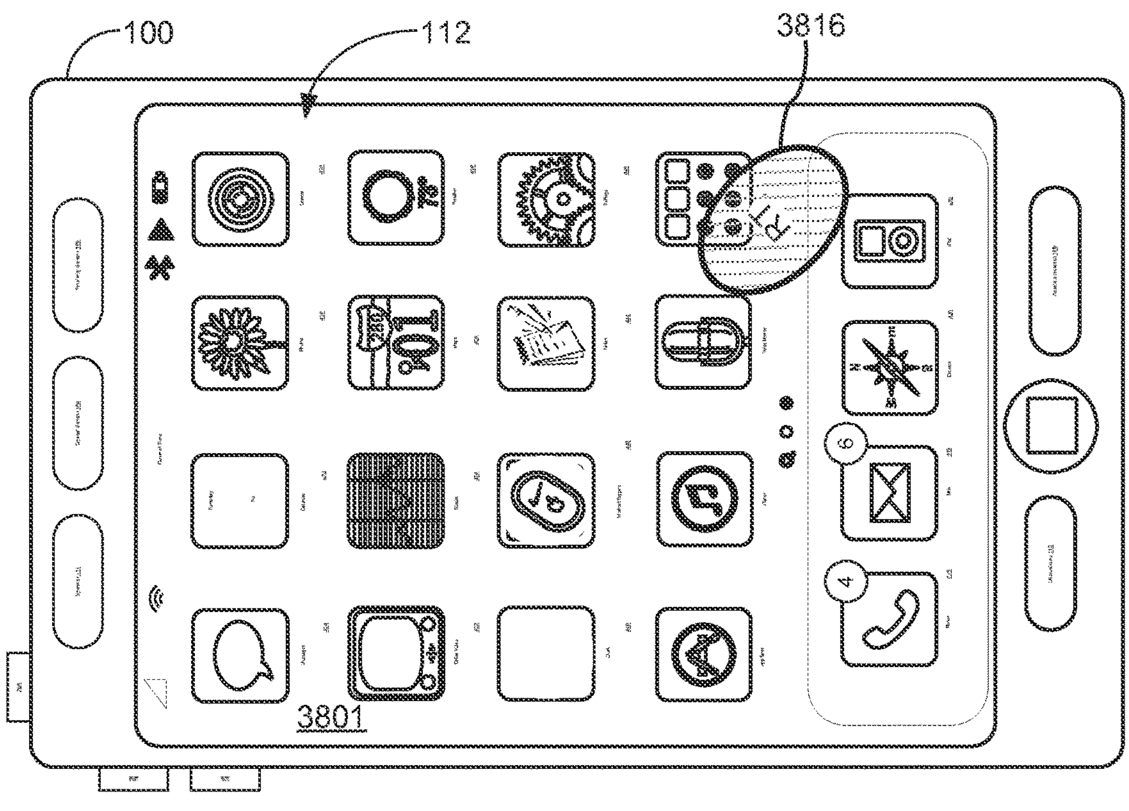

In some embodiments, the gesture that includes a fingerprint is specific with respect to orientation, location, and/or duration, and whether an operation associated with the fingerprint is activated depends on whether the fingerprint meets the orientation, location, and or duration requirements. For example, in some embodiments, if fingerprint 3802 is detected on touch screen 112 for less than a predefined time period, the operation is not performed. In some embodiments, if the fingerprint is detected at a location other than a predetermined location (e.g., the upper right quadrant of touch screen 112 based on the current screen orientation) on touch screen 112 (e.g., fingerprint 3814 being in the lower right quadrant (FIG. 38I), as opposed to fingerprint 3802 or 3810 being in the upper right quadrant), the operation is not performed. In some embodiments, if the fingerprint is detected at an orientation other than a predetermined orientation (e.g., 45°±10° degree angle from right-side-up vertical) on touch screen 112 (e.g., fingerprint 3816 being outside of the orientation angle range (FIG. 38J), as opposed to fingerprint 3802 or 3810 being within the orientation angle range), the operation is not performed (e.g., media is not capture, and the device does not replace display of a currently displayed user interface with the media capture user interface).

Figure 38K:
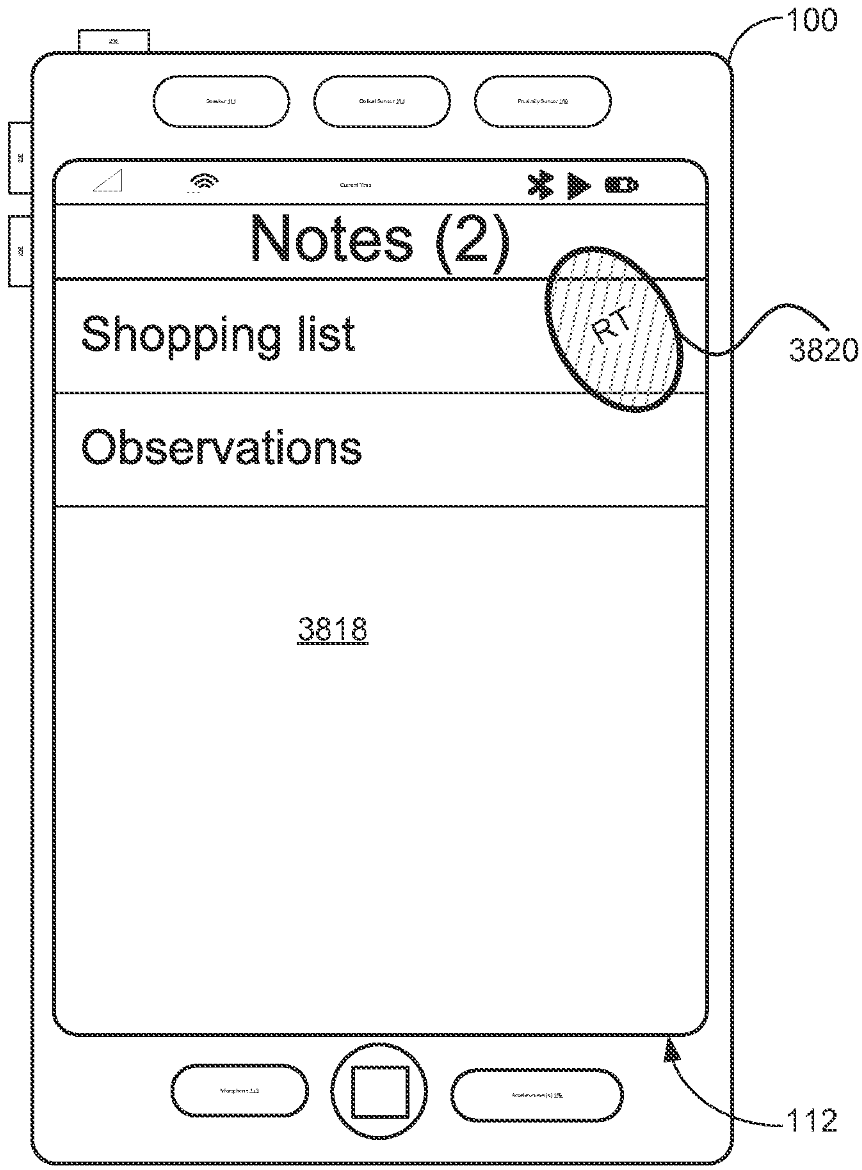
Figure 38L:
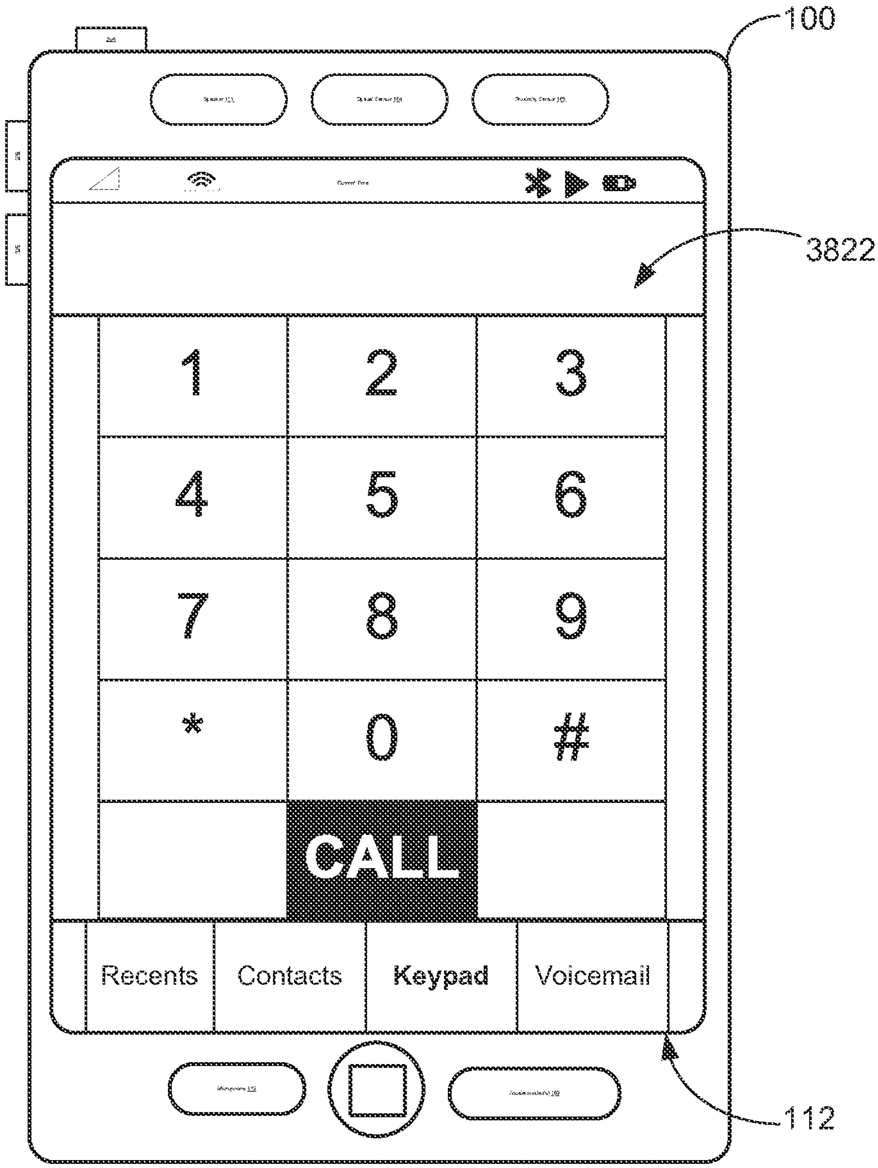

FIGS. 38K-38L illustrates yet another example of activating a respective operation while a user interface that does not include an affordance for activating the respective operation is displayed. FIG. 38K illustrates user interface 3818 for a notes application displayed on touch screen 112. A gesture with fingerprint 3820 is detected on touch screen 112, and then lifted off touch screen 112 after a predefined time period. Fingerprint 3820 is detected by the device to be a right thumbprint. In this example, the right thumbprint is associated with display of a communications interface, such as a phone application user interface, email application user interface, or a messaging application user interface. In response to detecting the gesture with fingerprint 3820 and the subsequent liftoff, the device displays phone application interface 3822 on touch screen 112, as shown in FIG. 38L.

Figure 38M:
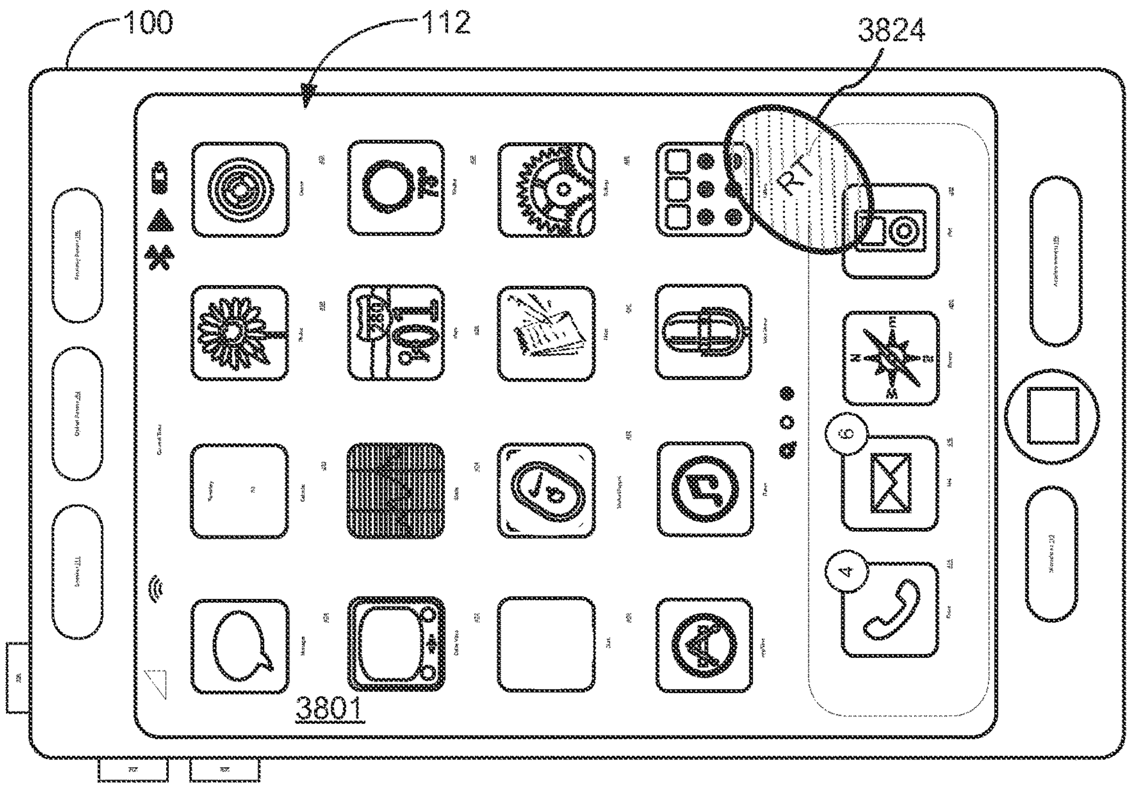
Figure 38N:
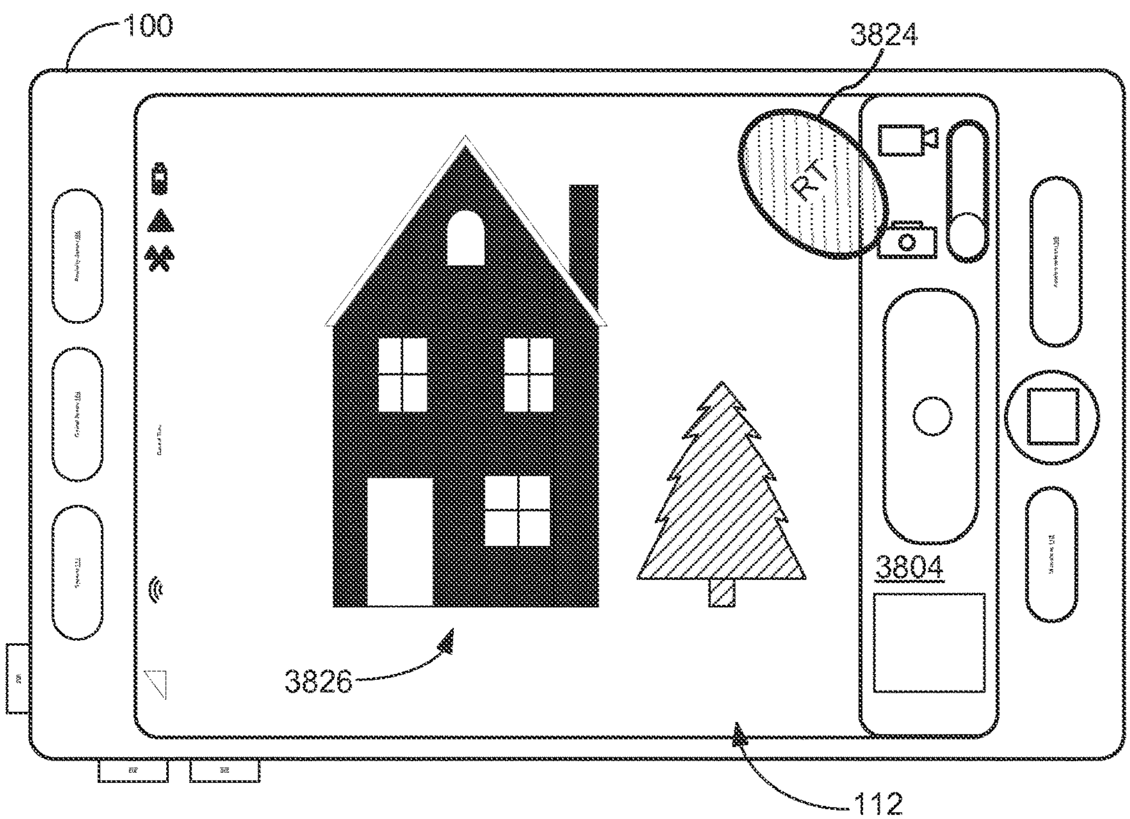

In some embodiments, multiple fingerprints are respectively associated on the device with different operations. For example, the right thumbprint is associated with still image capture and the left thumbprint is associated with video recording, an example of which is shown in FIGS. 38M-38P. FIG. 38M illustrates a gesture with fingerprint 3824 detected on touch screen 112 while application launch user interface 3801 is displayed on touch screen 112. Fingerprint 3824 is detected to be a right thumbprint. In response to detecting the gesture with fingerprint 3824, camera interface 3804 and camera preview 3826 are displayed and a photo corresponding to camera preview 3826 is captured, as shown in FIG. 38N. After the photo is captured, the device, optionally, ceases to display camera interface 3804 and camera preview 3826, and re-displays the previously displayed user interface (e.g., application launch user interface 3801).

Figure 38O:
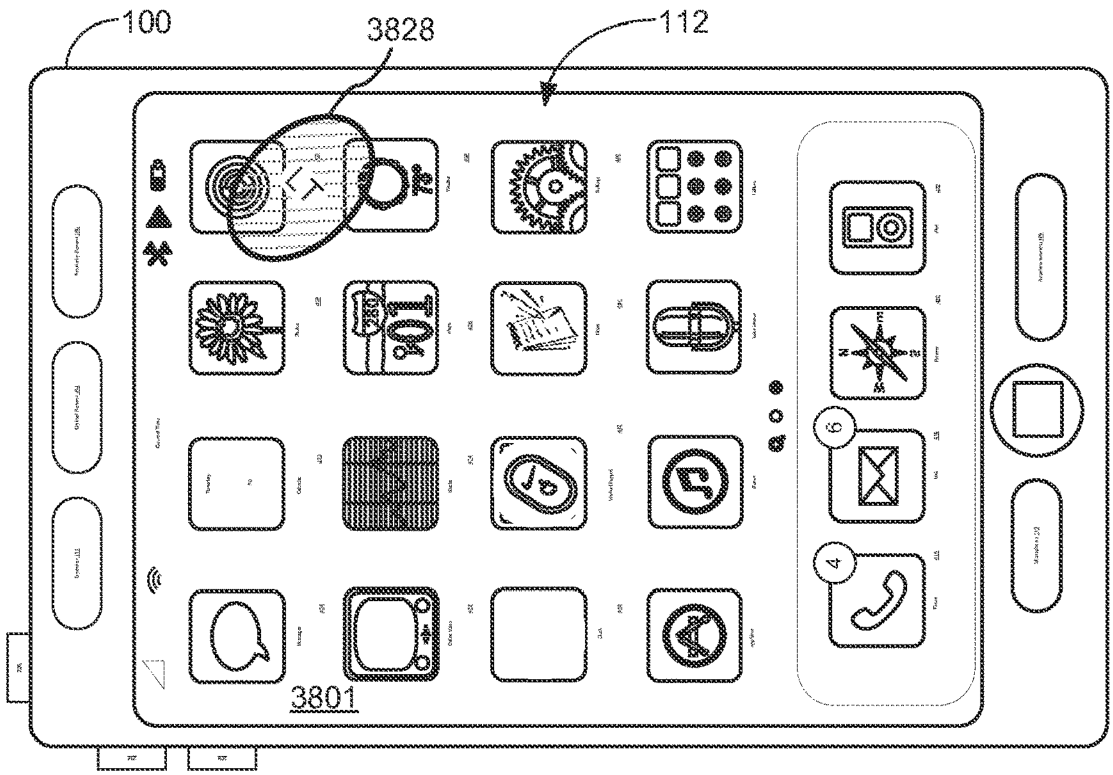
Figure 38P:
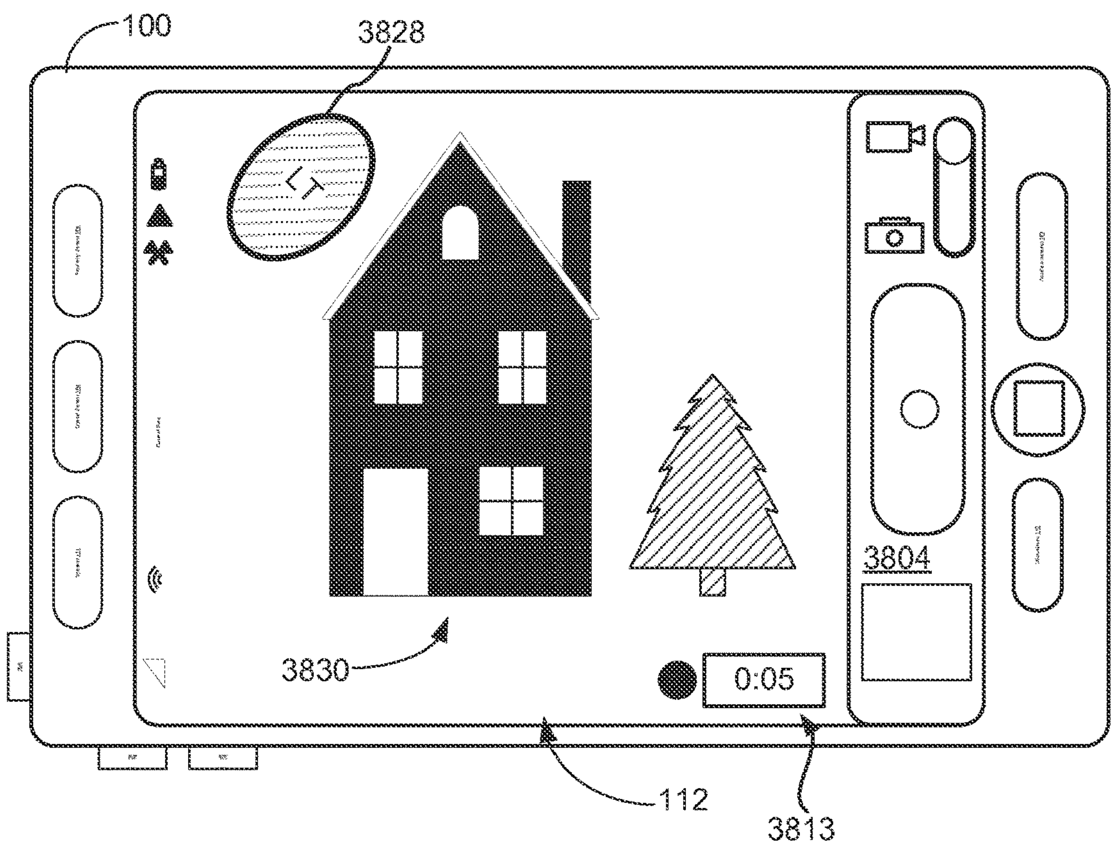
Figure 39A:
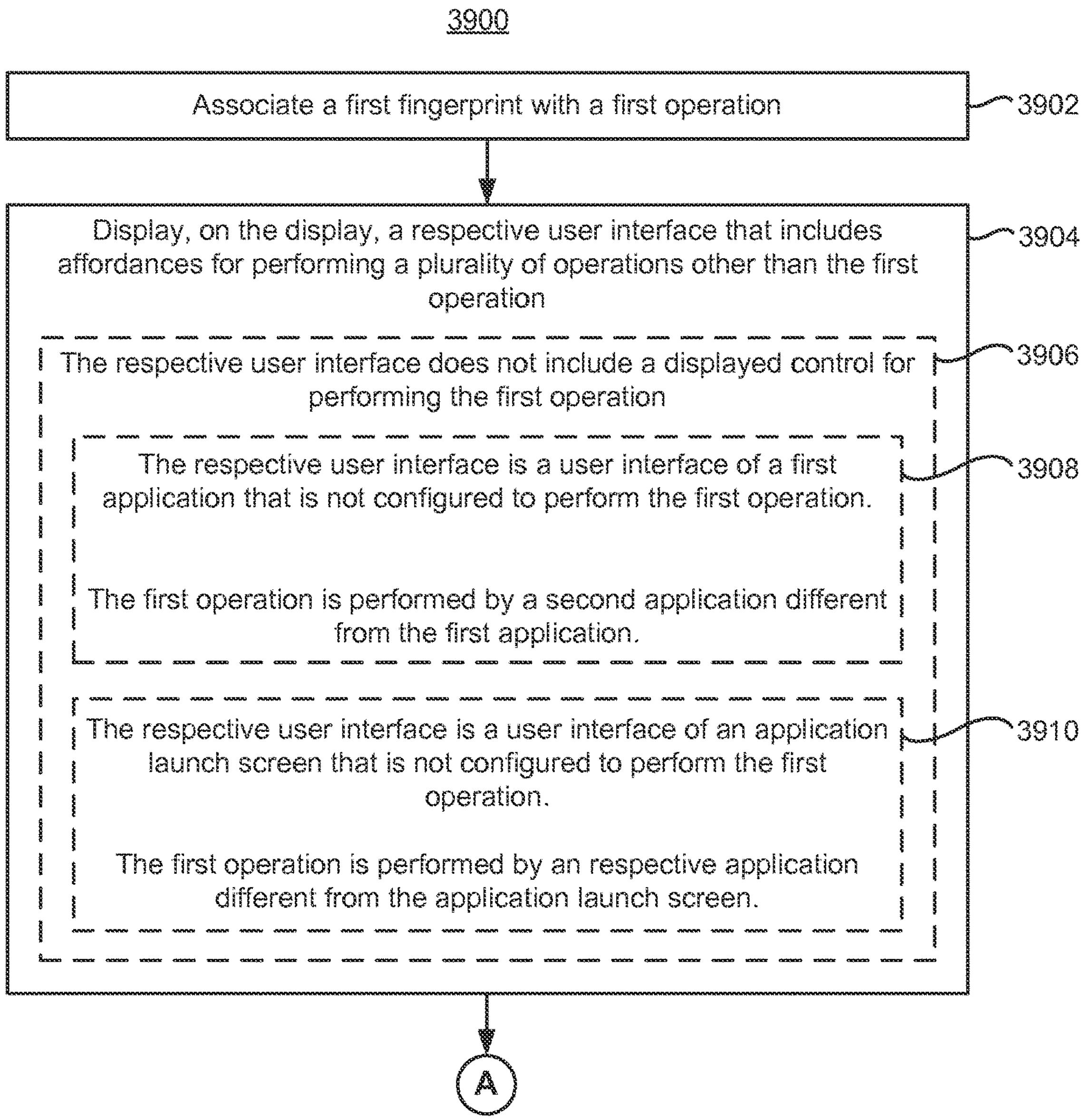
Figure 39C:
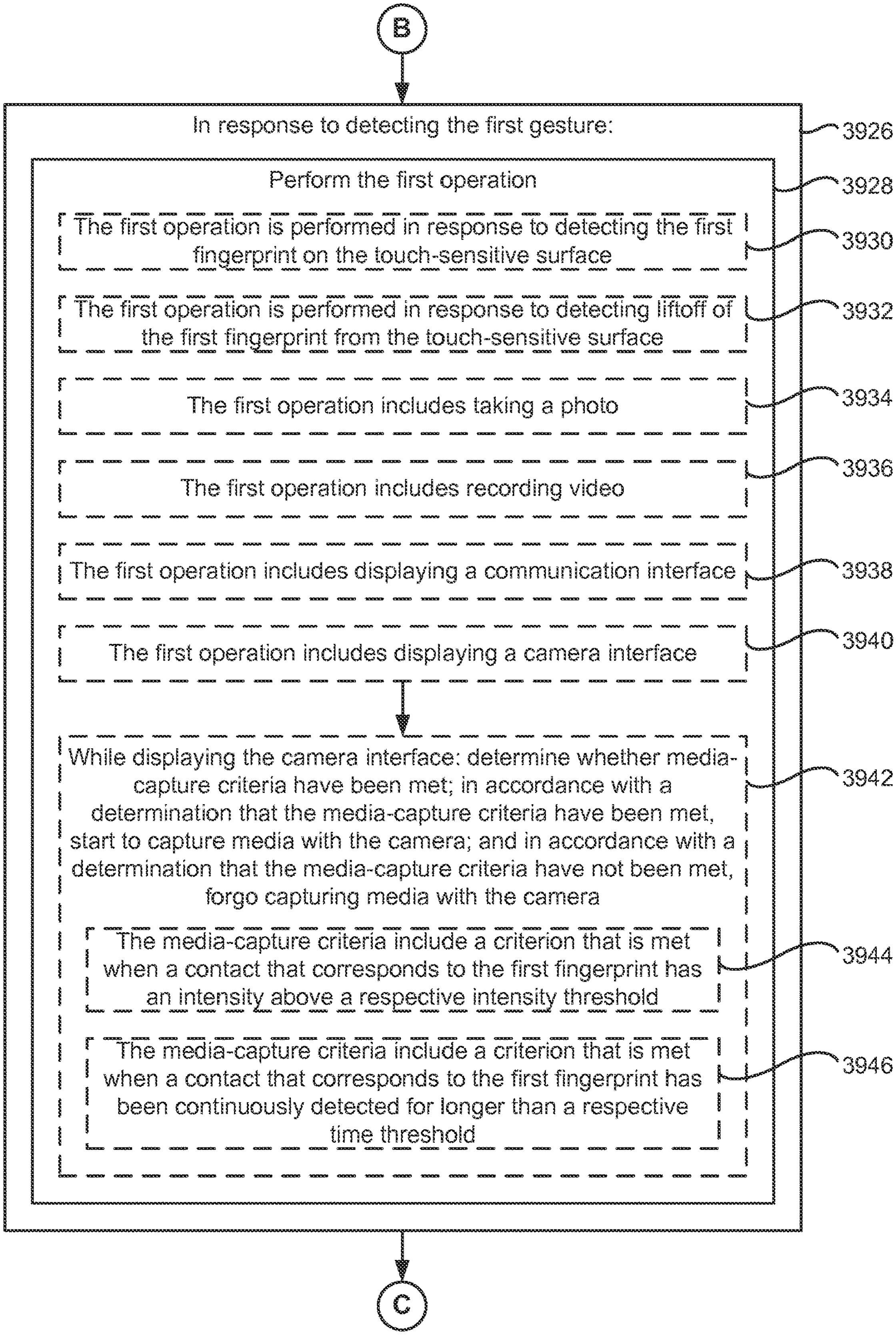
Figure 39D:
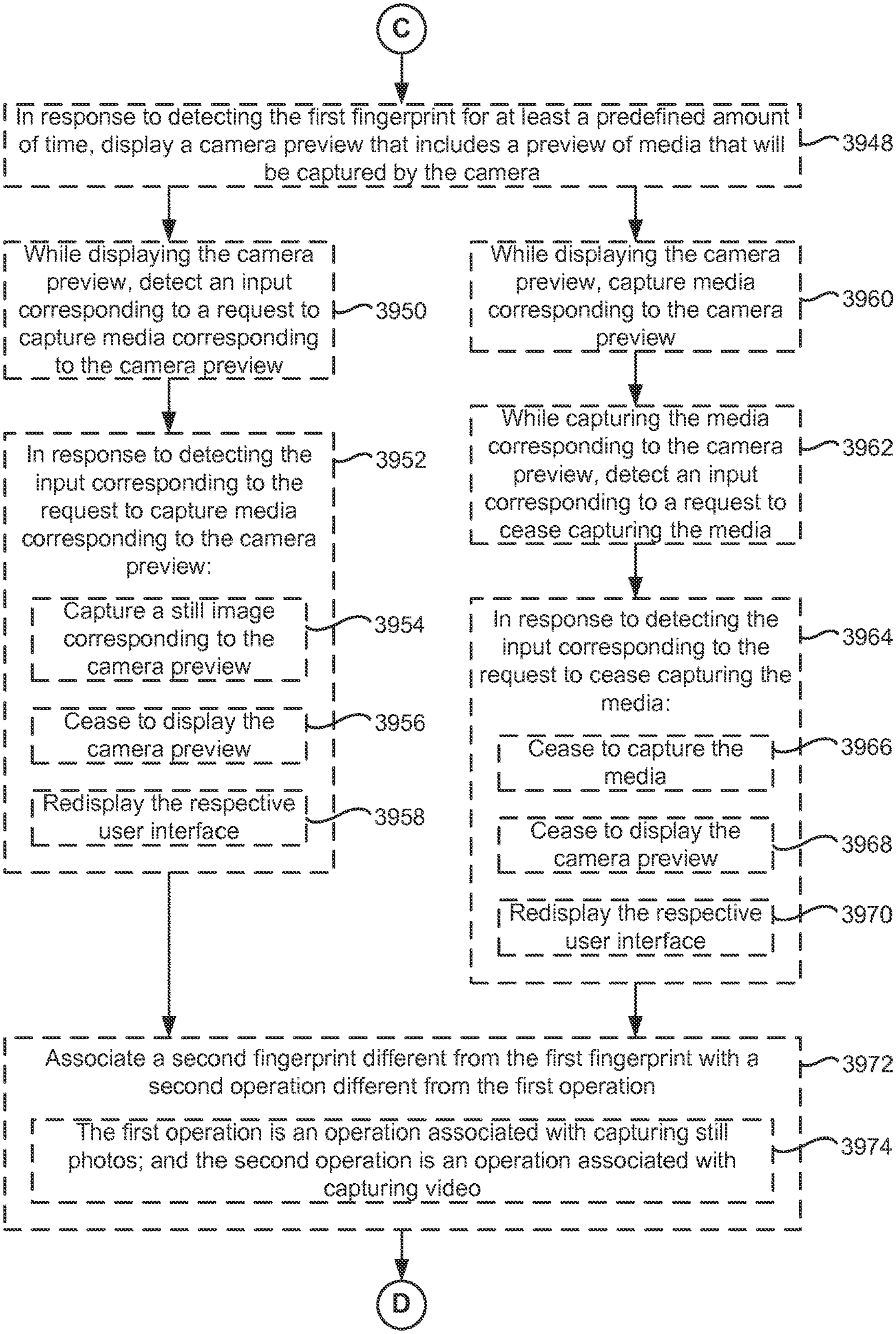
Figure 39E:
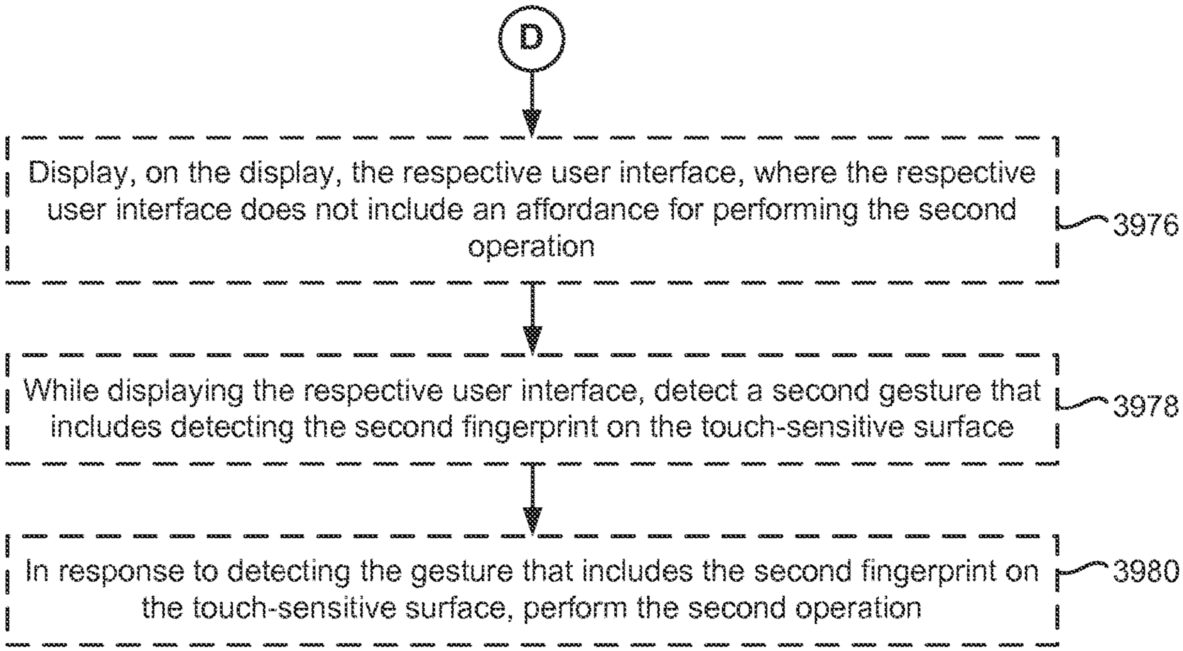

FIG. 38O illustrates a gesture with fingerprint 3828 detected on touch screen 112 while user interface 3801 is displayed on touch screen 112. Fingerprint 3828 is detected to be a left thumbprint. In response to detecting the gesture with fingerprint 3828, camera interface 3804 and camera preview 3830 are displayed and video corresponding to camera preview 3830 is captured, as shown in FIG. 38P. Video recording and display of camera interface 3804 and camera preview 3830 is, optionally, stopped when liftoff of the gesture with fingerprint 3828 is detected. After camera interface 3804 and camera preview 3830 ceases to be displayed, the device re-displays user interface 3801.

FIGS. 39A-39E are flow diagrams illustrating a method 3900 of performing operations associated with fingerprint gestures in accordance with some embodiments. The method 3900 is performed at an electronic device (e.g., device 300, FIG. 3, or portable multifunction device 100, FIG. 1A) with a display and a touch-sensitive surface. In some embodiments, the display is a touch screen display and the touch-sensitive surface is on the display. In some embodiments, the display is separate from the touch-sensitive surface. Some operations in method 3900 are, optionally, combined and/or the order of some operations is, optionally, changed.

As described below, the method 3900 provides an intuitive way to perform operations associated with fingerprint gestures. The method reduces the cognitive burden on a user when performing operations associated with fingerprint gestures, thereby creating a more efficient human-machine interface. For battery-operated electronic devices, enabling a user to perform operations associated with fingerprint gestures faster and more efficiently conserves power and increases the time between battery charges.

The device associates (3902) a first fingerprint with a first operation (e.g., during a fingerprint registration process assign the right thumbprint to a shutter function of a camera application). For example, in FIGS. 38A-38D, the right thumbprint is associated with a camera shutter function.

The device displays (3904), on the display, a respective user interface that includes affordances for performing a plurality of operations other than the first operation (e.g., the user interface is not a user interface for performing the first operation and the user interface does not contain affordances or other user interface elements for performing the first operation). User interface 3801 displayed on touch screen 112, as shown in FIGS. 38A and 38E, for example, includes affordances for launching applications (e.g., application icons) but not an affordance for capturing a photo or recording video. Similarly, user interface 3818 (FIG. 38K) includes affordances related to note-taking (e.g., respective affordances for opening an existing note, creating a new note, deleting a note, etc.) but not an affordance related to making a phone call. In some embodiments, the respective user interface does not include (3906) a displayed control for performing the first operation. For example, user interface 3801 (FIG. 38A or 38E) does not include a control for capturing a photo or recording video. User interface 3818 (FIG. 38K) does not include a control for making a phone call or for activating display of a phone application interface.

In some embodiments, the respective user interface is (3908) a user interface of a first application that is not configured to perform the first operation, and the first operation is performed by a second application different from the first application. For example, user interface 3818 (FIG. 38K) is a user interface for a notes application (e.g., notes module 153), which is not configured to perform camera operations. Camera operations are performed by a camera application (e.g., camera module 143). In some embodiments, the respective user interface is (3910) a user interface of an application launch screen that is not configured to perform the first operation, and the first operation is performed by a respective application different from the application launch screen. For example, user interface 3801 (FIG. 38A or 38E) is an application launch screen not configured to perform camera operations. Camera operations are performed by a camera application (e.g., camera module 143).

While displaying the respective user interface that includes affordances for performing the plurality of operations other than the first operation, the device detects (3912) a first gesture that includes detecting the first fingerprint on the touch-sensitive surface (e.g., a tap gesture, a tap and drag gesture, a touch and hold gesture, or other predefined gesture associated with performing the first operation). FIG. 38A, for example, shows device 100 detecting a gesture that includes fingerprint 3802 on touch screen 112. FIG. 38E shows device 100 detecting a gesture that includes fingerprint 3810 on touch screen 112. FIG. 38K shows device 100 detecting a gesture that includes fingerprint 3820 on touch screen 112.

In some embodiments, the first gesture is an orientation-specific gesture, and detecting the orientation-specific gesture includes (3914) detecting the first fingerprint on the touch-sensitive surface at a predetermined orientation. For example, the operation is only performed when the device detects a gesture performed with the thumb while the thumb is at a predefined angle (e.g., at 45° compared to a primary axis of the touch-sensitive surface) or within a predefined range of angles (e.g., at 45°±5°, 10°, or 15° compared to a primary axis of the touch-sensitive surface) relative to a primary axis of the touch-sensitive surface. In contrast, in some embodiments, if the first fingerprint is not at the predefined angle or within the predefined range of angles, then the first operation is not performed (e.g., no operation is performed, or an operation associated with a currently displayed icon (or other user interface element) at the location of the first fingerprint is performed instead of the first operation). For example, in FIGS. 38A-38C, the gesture with fingerprint 3802 is, optionally, orientation-specific, and fingerprint 3802 is detected to be within a predefined range of angles (e.g., 45°±10°) with respect to an axis parallel to a long edge of the device. In response to detecting the gesture with fingerprint 3802, camera interface 3804 and camera preview 3806 are displayed. On the other hand, fingerprint 3816 (FIG. 38J) is outside of the predefined angle range, and no camera interface or camera preview is displayed in response to detection of fingerprint 3816.

In some embodiments, the first gesture is a location-specific gesture, and detecting the location-specific gesture includes (3916) detecting the first fingerprint on the touch-sensitive surface at a predetermined location. For example, the operation is only performed when the device detects a gesture performed with the thumb while the thumb is at a predetermined location (e.g., the upper right hand corner of the touch-sensitive surface) on the touch-sensitive surface. In contrast, in some embodiments, if the first fingerprint is not at the predetermined location, then the first operation is not performed (e.g., no operation is performed, or an operation associated with a currently displayed icon (or other user interface element) at the location of the first fingerprint is performed instead of the first operation). For example, in FIGS. 38A-38C, the gesture with fingerprint 3802 is, optionally, location-specific, and fingerprint 3802 is detected to be within the predetermined location (e.g., upper right quadrant of touch screen 112 based on current screen orientation). In response to detecting the gesture with fingerprint 3802, camera interface 3804 and camera preview 3806 are displayed. On the other hand, fingerprint 3810 (FIG. 38I) is outside of the predetermined location, and no camera interface or camera preview is displayed in response to detection of fingerprint 3810.

In some embodiments, the first gesture is a duration-specific gesture, and detecting the duration-specific gesture includes (3918) detecting the first fingerprint on the touch-sensitive surface for at least a predetermined amount of time. For example, the operation is only performed when the device detects a gesture performed with a right thumb that is present on the touch-sensitive surface for more than a predefined time period (e.g., 0.05, 0.1, 0.2, 0.5 seconds, or some other reasonable time period). In contrast, in some embodiments, if the first fingerprint is not detected for at least the predetermined amount of time, then the first operation is not performed (e.g., no operation is performed, or an operation associated with a currently displayed icon (or other UI element) at the location of the first fingerprint is performed instead of the first operation). For example, in FIGS. 38A-38C, the gesture with fingerprint 3802 is, optionally, duration-specific, and fingerprint 3802 is detected on touch screen 112 for more than the predefined time period (e.g., 0.2 seconds). In response to detecting the gesture with fingerprint 3802, camera interface 3804 and camera preview 3806 are displayed. On the other hand, in some embodiments, if fingerprint 3802 is detected on touch screen 112 for less than the predefined time period, no camera interface or camera preview is displayed in response.

In some embodiments, the touch-sensitive surface is (3920) a touchscreen display with an integrated fingerprint sensor. The devices shown in FIGS. 38A-38P have a touch screen (e.g., touch screen 112) as the touch-sensitive surface on which gestures are detected. The touch screen has, optionally, an integrated fingerprint sensor. The integrated fingerprint sensor optionally spans the area of touch screen 112. In some embodiments touch screen 112 has a sufficiently high resolution touch sensing capability to detect ridges of fingerprints and the touch screen 112 can be used as a fingerprint sensor.

In some embodiments, the first fingerprint is a previously registered fingerprint (e.g., the first fingerprint is registered as a right thumb of user X, with the registration being stored in the memory of the device), and detecting the first gesture includes (3922) identifying a detected fingerprint as the first fingerprint based on a comparison between detected features of the detected fingerprint and previously registered features of the first fingerprint (e.g., the fingerprint is identified as being a thumb by matching the first fingerprint to a previously registered fingerprint of a particular user that was identified by the user as being a thumb fingerprint). For example, identification of fingerprint 3802 involves comparing fingerprint 3802 to previously registered fingerprints of users and identifying fingerprint 3802 as the particular fingerprint (e.g., right thumbprint) of a particular user.

In some embodiments, the first fingerprint is a predefined type of fingerprint (e.g., a "thumbprint"), and detecting the first gesture includes (3924) identifying a detected fingerprint as the first fingerprint based on a comparison between features of the detected fingerprint and features associated with the predefined type of fingerprint (e.g., the first fingerprint is identified as being a generic "thumb" without specifically identifying that the fingerprint is a particular fingerprint of a particular user). For example, identification of fingerprint 3802 involves comparing fingerprint 3802 to fingerprint features that are not user-specific (e.g., size) and identifying fingerprint 3802 as a generic finger (e.g., generic right thumb, generic left index finger, etc.).

In response to detecting the first gesture (3926), the device performs (3928) the first operation. For example, in FIG. 38B, camera interface 3804 and camera preview 3806 is displayed in response to the device detecting the gesture with fingerprint 3802. As another example, in FIG. 38N, a photo corresponding to camera preview 3826 is captured in response to the device detecting the gesture with fingerprint 3824.

In some embodiments, the first operation is performed (3930) in response to detecting the first fingerprint on the touch-sensitive surface (e.g., the first operation is performed in response to detecting the first fingerprint on the touch-sensitive surface). For example, the photo capture operation in FIG. 38N is performed by the device in response to the device detecting fingerprint 3824. As another example, display of camera interface 3804 and camera preview 3806 in FIG. 38A is performed by the device in response to the device detecting fingerprint 3802. In some embodiments, the first operation is performed in response to detecting the first fingerprint on the touch-sensitive surface for more than a predetermined amount of time.

In some embodiments, the first operation is performed (3932) in response to detecting liftoff of the first fingerprint from the touch-sensitive surface (e.g., the first operation is performed in response to detecting liftoff of the first fingerprint from the touch-sensitive surface after detecting the first fingerprint on the touch-sensitive surface). For example, the display of phone application interface 3822 in FIG. 38L is performed by the device in response to the device detecting liftoff of fingerprint 3820. In some embodiments, the first operation is performed in response to detecting liftoff of the first fingerprint from the touch-sensitive surface after detecting the first fingerprint on the touch-sensitive surface for more than a predetermined amount of time.

In some embodiments, the first operation includes (3934) taking a photo. For example, the device in FIGS. 38M-38N captures a photo in response to detecting fingerprint 3824. In some embodiments, the first operation includes (3936) recording video. For example, the device in FIGS. 38E-38F records video in response to detecting fingerprint 3810. In some embodiments, the first operation includes (3938) displaying a communication interface (e.g., a user interface for a phone, email or other electronic messaging application that is a default application associated with the first fingerprint, or is an application associated with the first fingerprint by a user of the device). For example, the device in FIGS. 38K-38L displays phone application interface 3822 in response to detecting fingerprint 3820. In some embodiments, the first operation includes (3940) displaying a camera interface (e.g., a user interface for a camera application for capturing photos or video). For example, the device in FIGS. 38A-38B displays camera interface 3804 in response to detecting fingerprint 3802.

In some embodiments, while displaying (3942) the camera interface, the device determines whether media-capture criteria have been met. In accordance with a determination that the media-capture criteria have been met, the device starts to capture media with a camera. In accordance with a determination that the media-capture criteria have not been met, the device forgoes capturing media with a camera. For example, in FIGS. 38B-38C, the device displays camera interface 3804. While displaying camera interface 3804, the device determines whether one or more media capture criteria are met. If the criteria are met, the device starts capturing media (e.g., one or more photos, video) with a camera (e.g., optical sensor(s) 164). If the criteria are not met, the device doesn't capture media.

In some embodiments, the media-capture criteria include (3944) a criterion that is met when a contact that corresponds to the first fingerprint has an intensity above a respective intensity threshold (e.g., the user presses down harder with the fingerprint to take a photo or start taking video while the camera preview is displayed). For example, fingerprint 3802 in FIG. 38C has an intensity above a respective intensity threshold (e.g., an intensity threshold that is greater than a contact-detection intensity threshold that corresponds to detecting a contact on the touch screen display 112), and thus meets the criteria. In response, the device captures a photo.

In some embodiments, the media-capture criteria include (3946) a criterion that is met when a contact that corresponds to the first fingerprint has been continuously detected for longer than a respective time threshold (e.g., the user maintains the contact on the touch-sensitive surface for a time that is longer than the respective time threshold to take a photo or to start taking video while the camera preview is displayed). For example, in FIG. 38C, the media-capture criterion is, optionally, a fingerprint detection duration criterion rather than an intensity criterion. The duration criterion is met if fingerprint 3802 is continuously detected for longer than a respective time threshold.

In some embodiments, in response to detecting the first fingerprint for at least a predefined amount of time, the device displays (3948) a camera preview that includes a preview of media that will be captured by a camera. For example, in FIG. 38B the device displays camera preview 3806 in response to detecting fingerprint 3802 for at least a predefined amount of time (e.g., 0.05, 0.1, 0.2, 0.5 seconds, or some other reasonable time period).

In some embodiments, while displaying the camera preview, the device detects (3950) an input corresponding to a request to capture media corresponding to the camera preview (e.g., the device detects liftoff of the first fingerprint, an increase in intensity of the fingerprint over the respective intensity threshold, or activation of a physical button associated with capturing a picture). In response to detecting (3952) the input corresponding to the request to capture media corresponding to the camera preview, the device captures (3954) a still image corresponding to the camera preview, ceases (3956) to display the camera preview, and redisplays (3958) the respective user interface. For example, in response to detecting the fingerprint on the touch-sensitive surface, the device displays a camera preview. In response to detecting liftoff of the fingerprint while displaying the camera preview, the device takes a photo and ceases to display the camera preview. Thus, while a user is in the middle of using the device for a respective task (e.g., reading news, checking email, or some other task), the user is able to quickly transition to photo capture mode, take a photo, and then return to the respective task with minimal interruption.

For example, FIGS. 38B-38D illustrate the intensity of fingerprint 3802 increasing above a respective intensity threshold while camera preview 3806 is displayed. The intensity increase is a request to the device to capture media corresponding to camera preview 3806. In response to detecting the request, the device captures a photo corresponding to camera preview 3806, ceases displaying camera preview 3806 (along with ceasing to display camera interface 3804), and redisplays user interface 3801.

In some embodiments, while displaying the camera preview, the device captures (3960) media (e.g., video or a series of still photos taken at predetermined intervals such as in a burst photo-capture mode) corresponding to the camera preview. In some embodiments, the device starts to capture the media in response to detecting the first fingerprint on the touch-sensitive surface. In some embodiments, the device starts to capture the media in response to detecting a subsequent capture-initiation input such as detecting the first fingerprint on the touch sensitive surface for more than a predetermined amount of time or detecting an increase in intensity of the first fingerprint above a respective intensity threshold. For example, FIG. 38F shows the device recording a video corresponding to camera preview 3812, while displaying camera preview 3812, in response to detecting fingerprint 3810.

In some embodiments, while capturing the media corresponding to the camera preview (e.g., after taking one or more photos in a series of photos or while capturing video), the device detects (3962) an input corresponding to a request to cease capturing the media (e.g., the device detects liftoff of the first fingerprint, detects an increase in intensity of the fingerprint over the respective intensity threshold, or detects activation of a physical button associated with ceasing to capture the media, or detects a tap or press and hold gesture on the touch-sensitive surface or a portion of the touch-sensitive surface corresponding to the a media capture icon). In response to detecting (3964) the input corresponding to the request to cease capturing the media, the device ceases (3966) to capture the media, ceases (3968) to display the camera preview, and redisplays (3970) the respective user interface. In some embodiments, in response to detecting the fingerprint on the touch-sensitive surface, the device displays a camera preview. In response to continuing to detect the fingerprint on the touch-sensitive surface for more than a predetermined amount of time, the device starts taking video, and in response to detecting liftoff of the fingerprint while displaying the camera preview, the device stops taking video and ceases to display the camera preview. Alternatively, in response to detecting the fingerprint on the touch-sensitive surface, the device displays a camera preview and in response to continuing to detect the fingerprint on the touch-sensitive surface for more than a predetermined amount of time, the device takes a series of multiple photos in a burst photo-capture mode, and in response to detecting liftoff of the fingerprint while displaying the camera preview, the device ceases to display the camera preview. Thus, while a user is in the middle of using the device for a respective task (e.g., reading news, checking email, or some other task), the user is able to quickly transition to video capture mode, take a video or a burst of photos, and then return to the respective task with minimal interruption. While video corresponding camera preview 3812 is being recorded (FIG. 38F), for example, the device detects liftoff of fingerprint 3810. In response, the device stops recording the video (FIG. 38G), ceases displaying camera preview 3812 (along with ceasing to display camera interface 3804), and redisplays user interface 3801 (FIG. 38H).

In some embodiments, the device associates (3972) a second fingerprint different from the first fingerprint with a second operation different from the first operation (e.g., during a fingerprint registration process assign the right thumbprint to a shutter function of a camera application). The device displays (3976), on the display, the respective user interface, where the respective user interface does not include an affordance for performing the second operation (e.g., the user interface is an application launch screen or a user interface for a different application that is not a user interface for performing the second operation and the user interface does not contain affordances or other user interface elements for performing the second operation). While displaying the respective user interface, the device detects (3978) a second gesture that includes detecting the second fingerprint on the touch-sensitive surface. In response to detecting the gesture that includes the second fingerprint on the touch-sensitive surface, the device performs (3980) the second operation. For example, in FIGS. 38M-38P, the right thumbprint is associated with photo capture, and the left thumbprint is associated with video recording. The device displays user interface 3801 (FIG. 38M), which does not include affordances for photo capture or video recording. The device captures a photo in response to detecting fingerprint 3824, which is a right thumbprint, and records video in response to detecting fingerprint 3828.

In some embodiments, the first operation is (3974) an operation associated with capturing still photos (e.g., displaying a still camera application user interface or capturing a photo), and the second operation is an operation associated with capturing video (e.g., displaying a video camera application user interface or taking a video). For example, when the user places a left thumbprint anywhere on the touch-sensitive surface (e.g., touchscreen) of the device, the device launches a still camera application, and when the user places a right thumbprint anywhere on the touch-sensitive surface (e.g., touchscreen) of the device, the device launches a video camera application. In some embodiments, the first operation and the second operation launch the same application but in different modes (e.g., a camera application is launched either in a still image capture mode if the device detects the gesture performed with the left thumbprint or a video capture mode if the device detects the gesture performed with the right thumbprint. For example, in FIGS. 38M-38P, the right thumbprint is associated with photo capture, and the left thumbprint is associated with video recording.

It should be understood that the particular order in which the operations in FIGS. 39A-39E have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., those methods described above) are also applicable in an analogous manner to method 3900 described above with respect to FIGS. 39A-39E. For example, the fingerprints, contacts, gestures described, and user interfaces above with reference to method 3900 optionally have one or more of the characteristics of the fingerprints, contacts, gestures, and user interfaces described herein with reference to other methods described herein (e.g., those methods described above). For brevity, these details are not repeated here.

Figure 40:
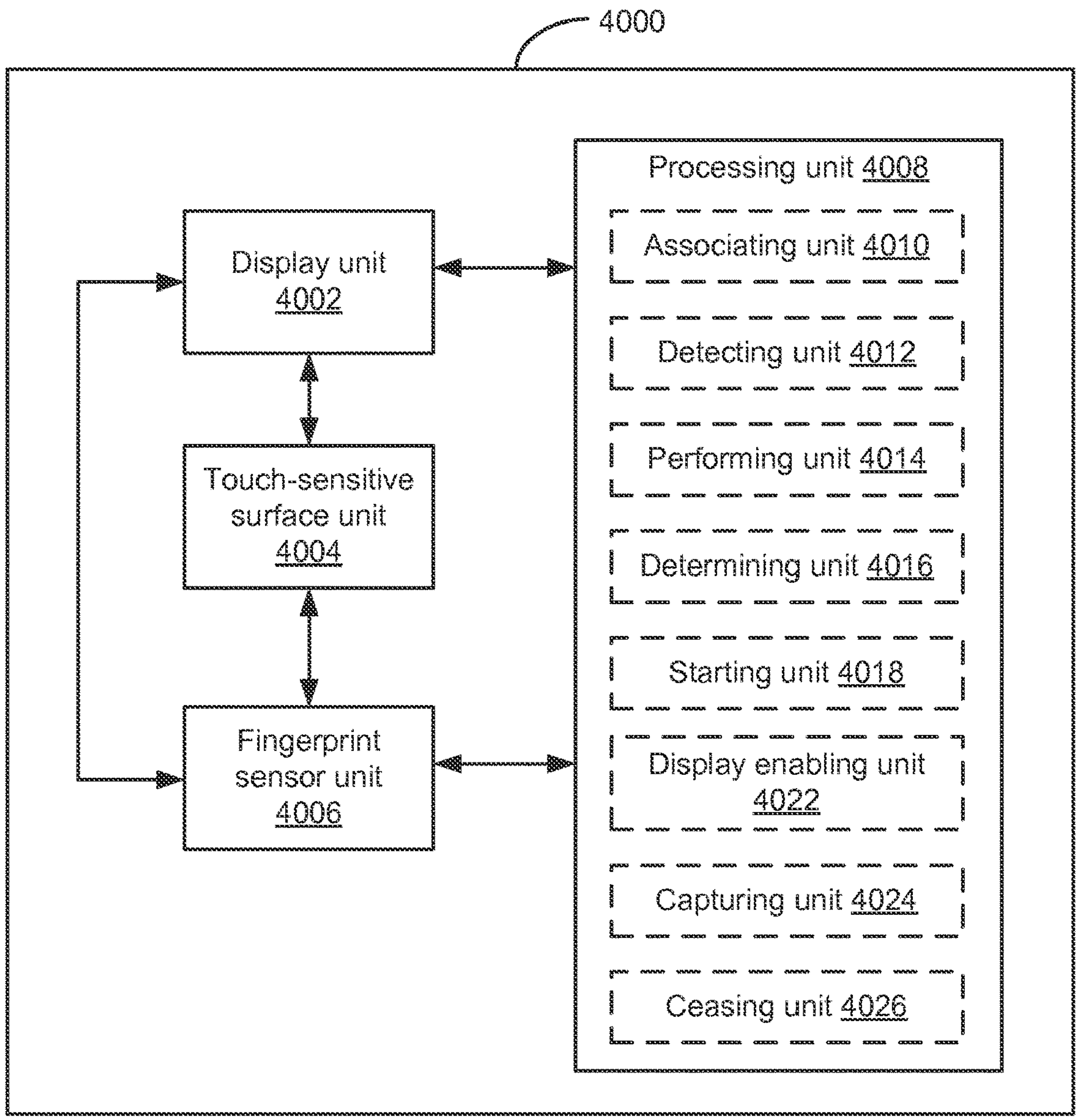
FIG. 40 is a functional block diagram of an electronic device in accordance with some embodiments.

In accordance with some embodiments, FIG. 40 shows a functional block diagram of an electronic device 4000 configured in accordance with the principles of the various described embodiments. The functional blocks of the device are, optionally, implemented by hardware, software, or a combination of hardware and software to carry out the principles of the various described embodiments. It is understood by persons of skill in the art that the functional blocks described in FIG. 40 are, optionally, combined or separated into sub-blocks to implement the principles of the various described embodiments. Therefore, the description herein optionally supports any possible combination or separation or further definition of the functional blocks described herein.

As shown in FIG. 40, an electronic device 4000 includes a display unit 4002 configured to display a respective user interface that includes affordances for performing a plurality of operations other than a first operation, a touch-sensitive surface unit 4004 configured to receive gestures, optionally a fingerprint sensor unit 4006 for detecting fingerprints, and a processing unit 4008 coupled to the display unit 4002 and the touch-sensitive surface unit 4004. In some embodiments, the processing unit 4008 includes an associating unit 4010, a detecting unit 4012, a performing unit 4014, a determining unit 4016, a starting unit 4018, a display enabling unit 4022, a capturing unit 4024, and a ceasing unit 4026.

The processing unit 4008 is configured to: associate a first fingerprint with the first operation (e.g., with the associating unit 4010); enable display of a respective user interface that includes affordances for performing a plurality of operations other than the first operation (e.g., with the display enabling unit 4022); while enabling display of the respective user interface that includes affordances for performing the plurality of operations other than the first operation, detect a first gesture that includes detecting the first fingerprint on the touch-sensitive surface unit 4004 (e.g., with the detecting unit 4012); and in response to detecting the first gesture, perform the first operation (e.g., with the performing unit 4014).

In some embodiments, the first operation is performed in response to detecting the first fingerprint on the touch-sensitive surface unit 4004.

In some embodiments, the first operation is performed in response to detecting liftoff of the first fingerprint from the touch-sensitive surface unit 4004.

In some embodiments, the first gesture is an orientation-specific gesture, and detecting the orientation-specific gesture includes detecting the first fingerprint on the touch-sensitive surface unit 4004 at a predetermined orientation.

In some embodiments, the first gesture is a location-specific gesture, and detecting the location-specific gesture includes detecting the first fingerprint on the touch-sensitive surface unit 4004 at a predetermined location.

In some embodiments, the first gesture is a duration-specific gesture, and detecting the duration-specific gesture includes detecting the first fingerprint on the touch-sensitive surface unit 4004 for at least a predetermined amount of time.

In some embodiments, the respective user interface does not include a displayed control for performing the first operation.

In some embodiments, the respective user interface is a user interface of a first application that is not configured to perform the first operation, and the first operation is performed by a second application different from the first application.

In some embodiments, the respective user interface is a user interface of an application launch screen that is not configured to perform the first operation, and the first operation is performed by an respective application different from the application launch screen.

In some embodiments, the first operation includes taking a photo.

In some embodiments, the first operation includes recording video.

In some embodiments, the first operation includes enabling display of a communication interface.

In some embodiments, the first operation includes enabling display of a camera interface.

In some embodiments, the processing unit 4008 is configured to, while enabling display of the camera interface: determine whether media-capture criteria have been met (e.g., with the determining unit 4016); in accordance with a determination that the media-capture criteria have been met, start to capture media with a camera (e.g., with the starting unit 4018 or the capturing unit 4024); and in accordance with a determination that the media-capture criteria have not been met, forgo capturing media with a camera (e.g., with the capturing unit 4024).

In some embodiments, the media-capture criteria include a criterion that is met when a contact that corresponds to the first fingerprint has an intensity above a respective intensity threshold.

In some embodiments, the media-capture criteria include a criterion that is met when a contact that corresponds to the first fingerprint has been continuously detected for longer than a respective time threshold.

In some embodiments, the processing unit 4008 is configured to, in response to detecting the first fingerprint for at least a predefined amount of time, enable display of a camera preview that includes a preview of media that will be captured by a camera (e.g., with the display enabling unit 4022).

In some embodiments, the processing unit 4008 is configured to: while enabling display of the camera preview, detect an input corresponding to a request to capture media corresponding to the camera preview (e.g., with the detecting unit 4012); and in response to detecting the input corresponding to the request to capture media corresponding to the camera preview: capture a still image corresponding to the camera preview (e.g., with the capturing unit 4024), cease enabling display of the camera preview (e.g., with the ceasing unit 4026), and re-enable display of the respective user interface (e.g., with the display enabling unit 4022).

In some embodiments, the processing unit 4008 is configured to: while enabling display of the camera preview, capture media corresponding to the camera preview (e.g., with the capturing unit 4024); while capturing the media corresponding to the camera preview, detect an input corresponding to a request to cease capturing the media (e.g., with the detecting unit 4012); and in response to detecting the input corresponding to the request to cease capturing the media: cease to capture the media (e.g., with the ceasing unit 4026), cease enabling display of the camera preview (e.g., with the ceasing unit 4026), and re-enable display of the respective user interface (e.g., with the display enabling unit 4022).

In some embodiments, the touch-sensitive surface unit 4004 is a touchscreen display with an integrated fingerprint sensor.

In some embodiments, the first fingerprint is a previously registered fingerprint, and detecting the first gesture includes identifying a detected fingerprint as the first fingerprint based on a comparison between detected features of the detected fingerprint and previously registered features of the first fingerprint.

In some embodiments, the first fingerprint is predefined type of fingerprint, and detecting the first gesture includes identifying a detected fingerprint as the first fingerprint based on a comparison between features of the detected fingerprint and features associated with the predefined type of fingerprint.

In some embodiments, the processing unit 4008 is configured to: associate a second fingerprint different from the first fingerprint with a second operation different from the first operation (e.g., with the associating unit 4010); enable display, on the display unit 4002, of the respective user interface (e.g., with the display enabling unit 4022), wherein the respective user interface does not include an affordance for performing the second operation; while enabling display of the respective user interface, detect a second gesture that includes detecting the second fingerprint on the touch-sensitive surface unit 4004 (e.g., with the detecting unit 4012); and in response to detecting the gesture that includes the second fingerprint on the touch-sensitive surface unit 4004, perform the second operation (e.g., with the performing unit 4014).

In some embodiments, the first operation is an operation associated with capturing still photos, and the second operation is an operation associated with capturing video.

The operations in the information processing methods described above are, optionally implemented by running one or more functional modules in information processing apparatus such as general purpose processors (e.g., as described above with respect to FIGS. 1A and 3) or application specific chips.

The operations described above with reference to FIGS. 39A-39E are, optionally, implemented by components depicted in FIGS. 1A-1B or FIG. 40. For example, detection operation 3912 and performing operation 3928 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub-event, such as selection of an object on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Displaying a Respective Control for a User Interface Based on Detection of a First Fingerprint Associated with Moving the Respective Control Many electronic devices have graphical user interfaces with a respective control for the user interface. The respective control (e.g., a color palate for an image editing application) is displayed on the user interface in response to a user toolbar or menu window selection with, for example, a cursor controlled by a mouse (or other peripheral device). The device described below improves on existing methods by displaying on a display a respective control for a user interface in response to detecting on a touch-sensitive surface a first fingerprint associated with moving the respective control. The first fingerprint corresponds to a focus selector at a first location on the display that does not include the respective control.

In some embodiments, the device is an electronic device with a separate display (e.g., display 450) and a separate touch-sensitive surface (e.g., touch-sensitive surface 451). In some embodiments, the device is portable multifunction device 100, the display is touch screen 112, and the touch-sensitive surface includes tactile output generators 167 on the display (FIG. 1A). The device described below with reference to FIGS. 41A-41K and 42A-42C includes one or more fingerprint sensors 169. In some embodiments, the one or more fingerprint sensors include one or more integrated fingerprint sensors 359-1 (FIG. 4B) that are integrated in to the touch-sensitive surface (e.g., separate touch-sensitive surface 451 or touch sensitive display system 112). In some embodiments, the one or more fingerprint sensors include separate fingerprint sensors 359-2 (FIG. 4B) that are separate from the touch-sensitive surface (e.g., separate touch-sensitive surface 451 or touch sensitive display system 112). Unless specified otherwise, a fingerprint sensor 169 described below is, optionally, either an integrated fingerprint sensor 359-1 or a separate fingerprint sensor 359-2, depending on the configuration of the hardware and software of the device that includes the fingerprint sensor 169. For convenience of explanation, the embodiments described with reference to FIGS. 41A-41K and 42A-42C will be discussed with reference to touch screen 112 and fingerprint sensor 169 (e.g., an integrated fingerprint sensor 359-1 or a separate fingerprint sensor 359-2); in such embodiments, the focus selector is, optionally: a respective contact, a representative point corresponding to a contact (e.g., a centroid of a respective contact or a point associated with a respective contact), or a centroid of two or more contacts detected on the touch screen 112, in place of a cursor. Analogous operations are, optionally, performed on a device with display 450, a separate touch-sensitive surface 451, and an integrated fingerprint sensor 359-1 or a separate fingerprint sensor 359-2 in response to detecting the inputs described in FIGS. 41A-41K on integrated fingerprint sensor 359-1 or separate fingerprint sensor 359-2, while displaying the user interfaces shown in FIGS. 41A-41K on display 450.

FIG. 41A-41K illustrate portable multifunction device 100 displaying a video game on user interface 4101 of touch screen 112. In some embodiments, touch screen 112 comprises a fingerprint sensor such that device 100 is enabled to detect a fingerprint at any position on touch screen 112. FIGS. 41B-41F and 41H-41K further illustrate device 100 displaying the video game in a pause mode indicated by pause symbol 4104 displayed on user interface 4101.

Figure 41A:
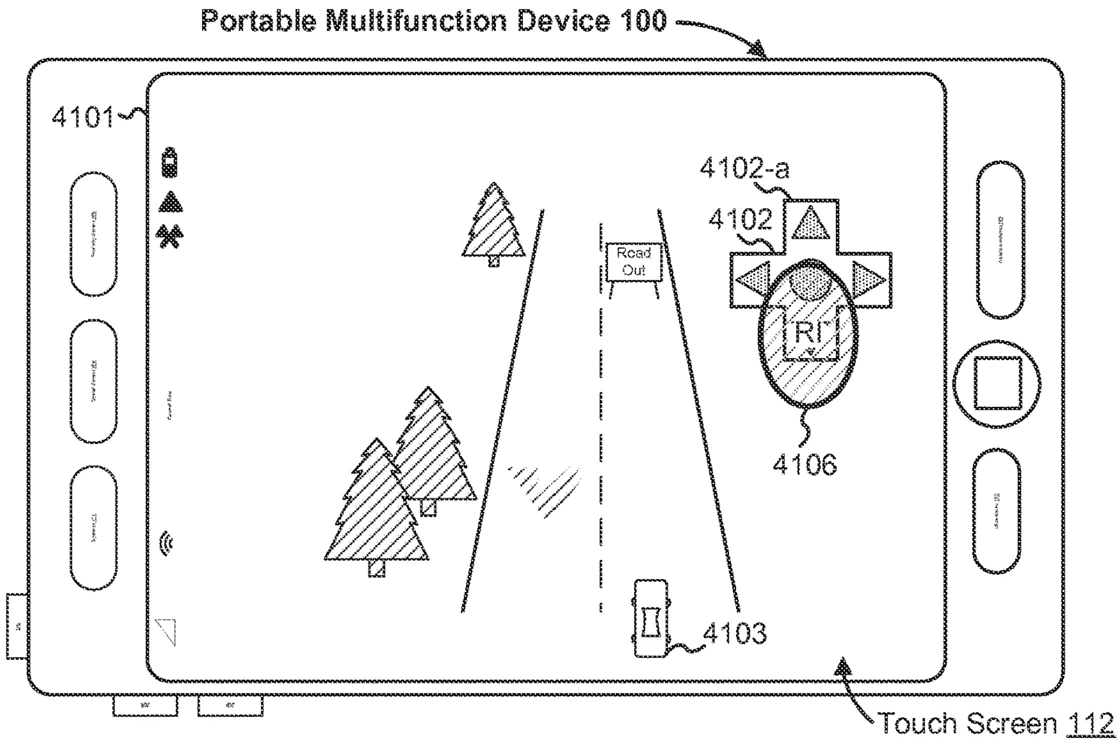
FIGS. 41A-41K illustrate exemplary user interfaces for displaying a respective control for a user interface based on detection of a first fingerprint associated with moving the respective control in accordance with some embodiments.

FIG. 41A illustrates displaying respective control 4102 (e.g., a directional pad, d-pad or joypad for directional control of an interactive object of the video game) for user interface 4101 at prior location 4102-*a*. Prior location 4102-*a* is different from first location 4102-*b* in FIGS. 41E-41H. Respective control 4102 is displayed at prior location 4102-*a* prior to detecting a first fingerprint (e.g., a user's right pinky finger) associated with moving respective control 4102 (e.g., fingerprint 4112 detected in FIG. 41D). In some embodiments, the first fingerprint corresponds to a finger that is not typically associated with manipulation of user interface objects (e.g., a user's ring or pinky finger). FIG. 41A further illustrates detecting fingerprint 4106 (e.g., a user's right index finger) over respective control 4102. In response to detecting fingerprint 4106, device 100 performs operations associated with respective control 4102.

Figure 41B:
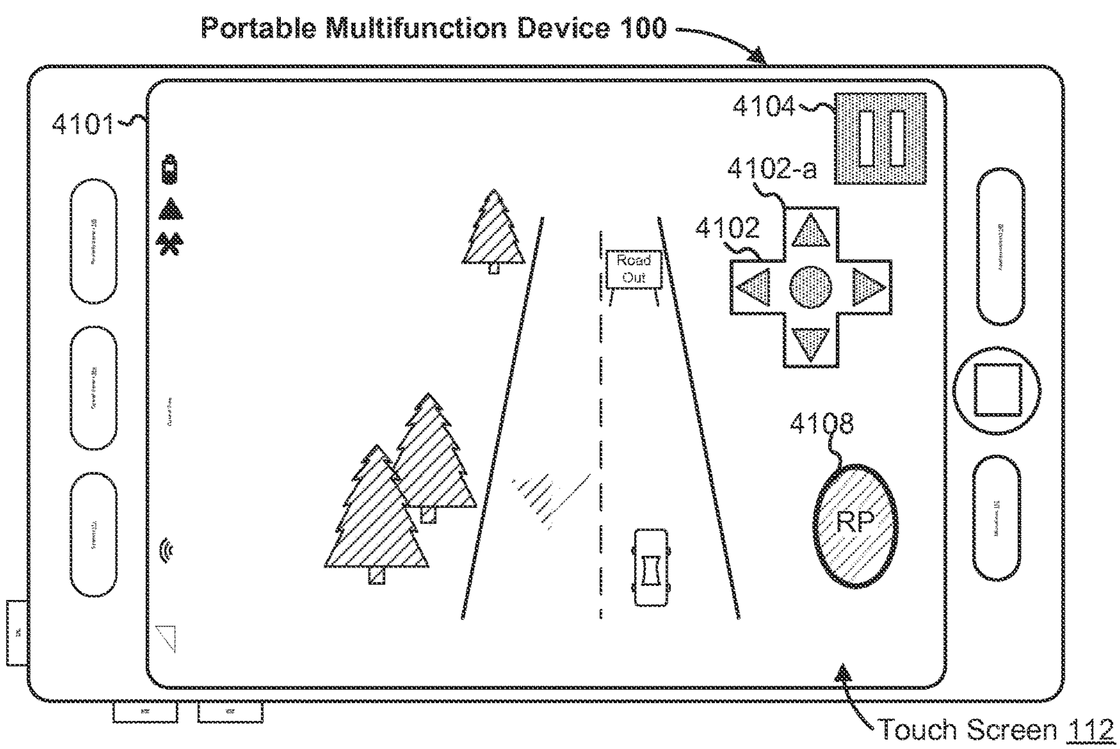

FIG. 41B illustrates detecting first fingerprint 4108 (e.g., a user's right pinky finger) associated with moving respective control 4102 at a first location on touch screen 112 while displaying respective control 4102 at prior location 4102-*a*. The first location is different from the prior location and does not include respective control 4102.

Figure 41C:
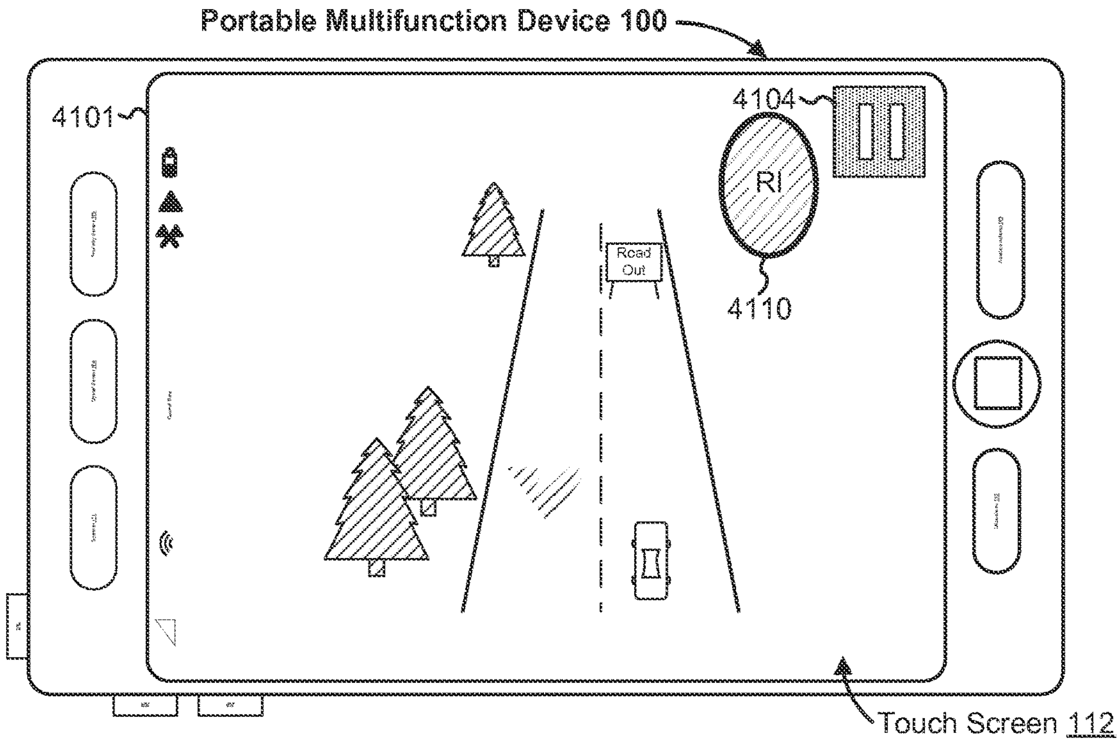

FIG. 41C illustrates detecting fingerprint 4110 on touch screen 112 while respective control 4102 is not displayed on touch screen 112. In response to detecting fingerprint 4110, device 100 forgoes displaying respective control 4102 in accordance with a determination that fingerprint 4110 is a fingerprint (e.g., a user's right index finger) different from the first fingerprint (e.g., a user's right pinky finger) and is not associated with moving respective control 4102 for user interface 4101.

Figure 41D:
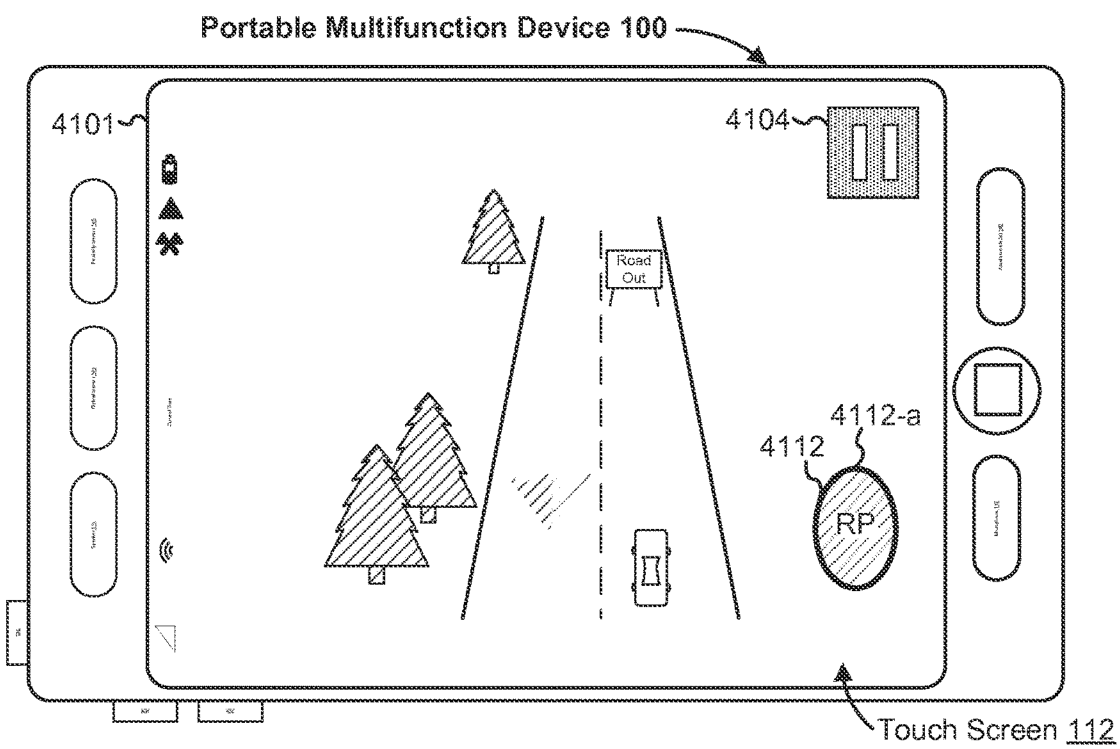
Figure 42A:
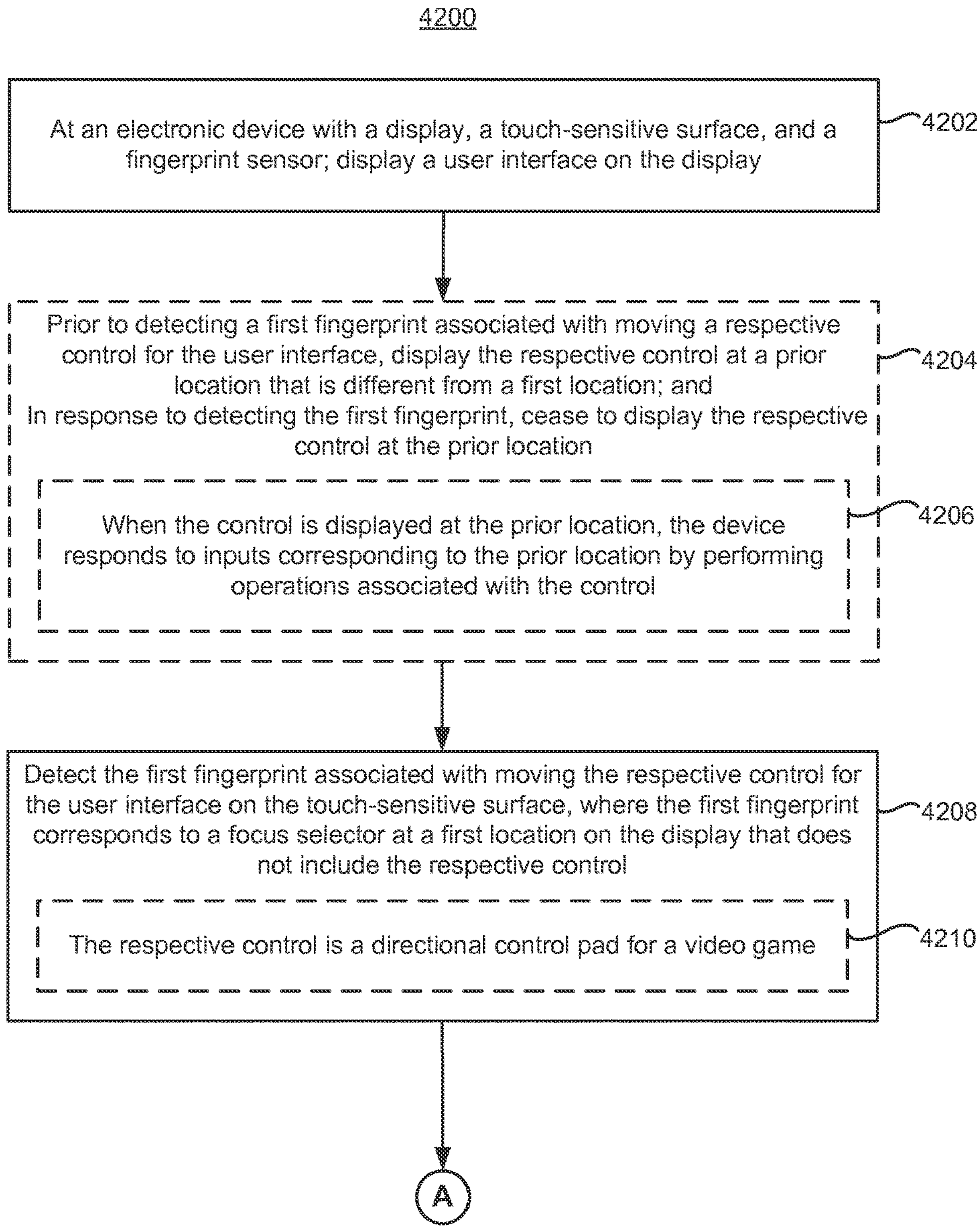
FIGS. 42A-42C are flow diagrams illustrating a method of displaying a respective control for a user interface based on detection of a first fingerprint associated with moving the respective control in accordance with some embodiments.
Figure 42B:
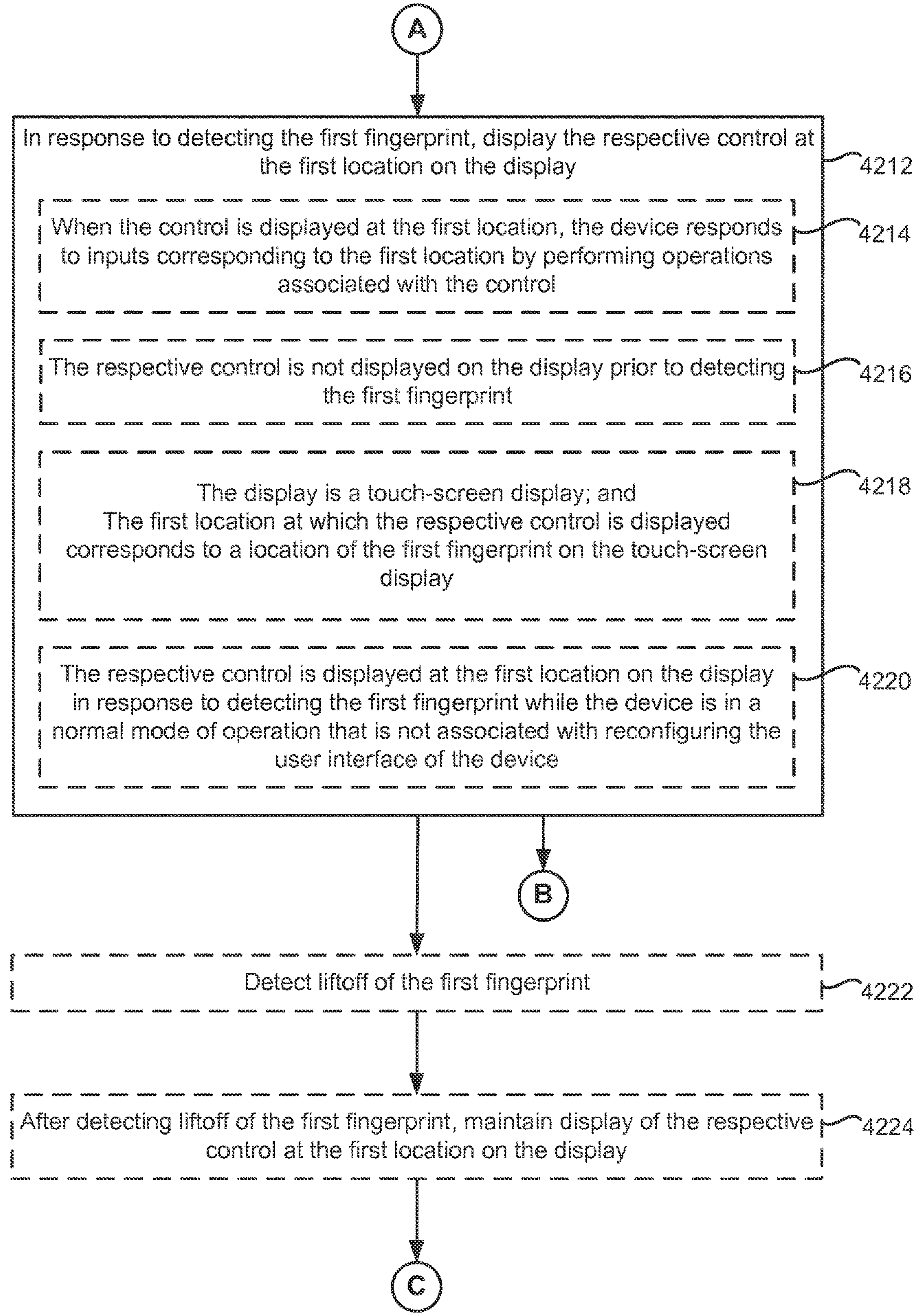
Figure 42C:
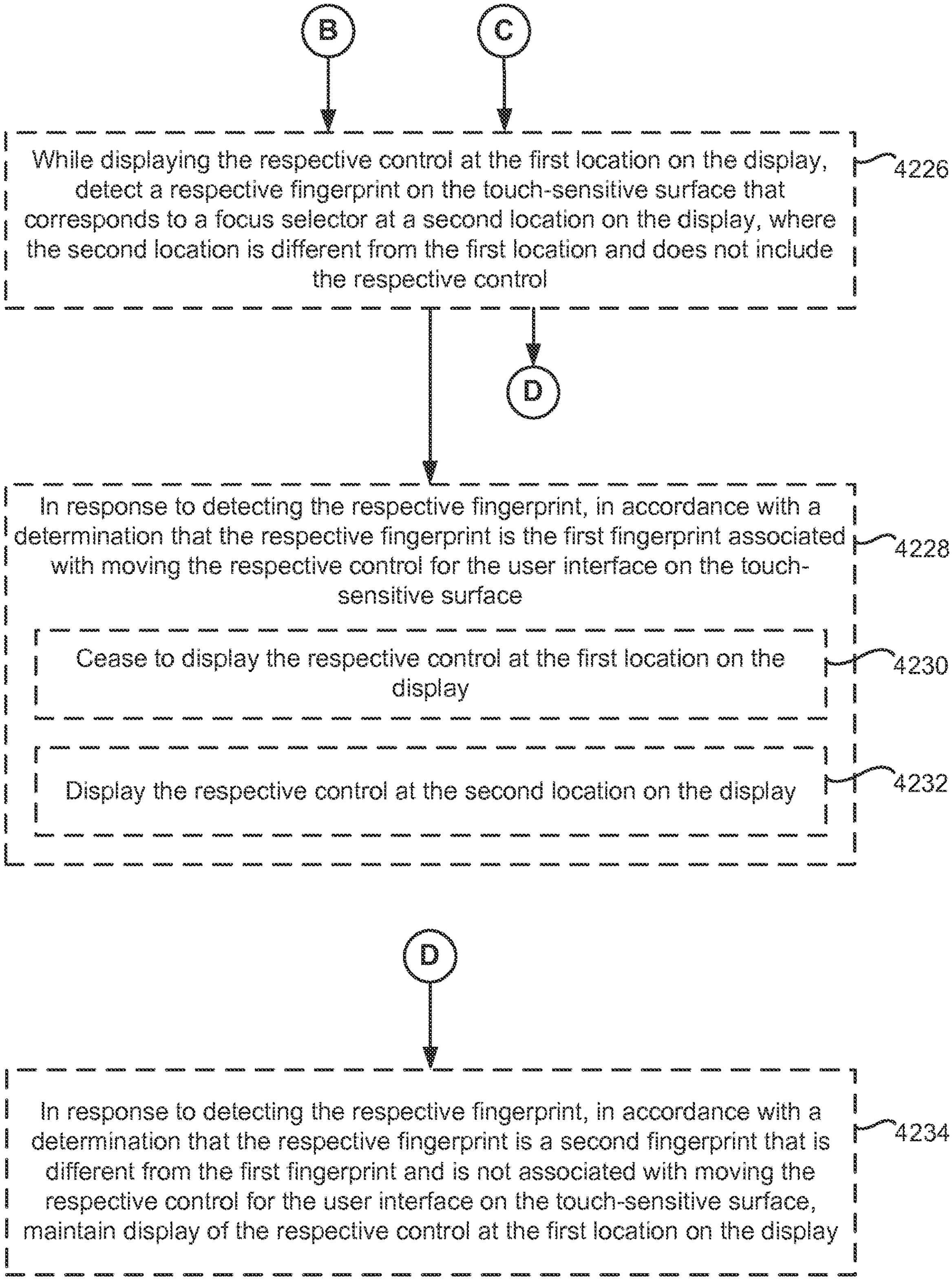

FIG. 41D illustrates detecting first fingerprint 4112 (e.g., a user's right pinky finger) associated with moving respective control 4102 for user interface 4101 at first position 4112-*a* on touch-sensitive surface 112. First fingerprint 4112 corresponds to a focus selector (e.g., a centroid of a respective contact associated with fingerprint 4112 detected on the touch screen 112) at first location 4112-*a* on touch screen 112 that does not include respective control 4102.

Figure 41E:
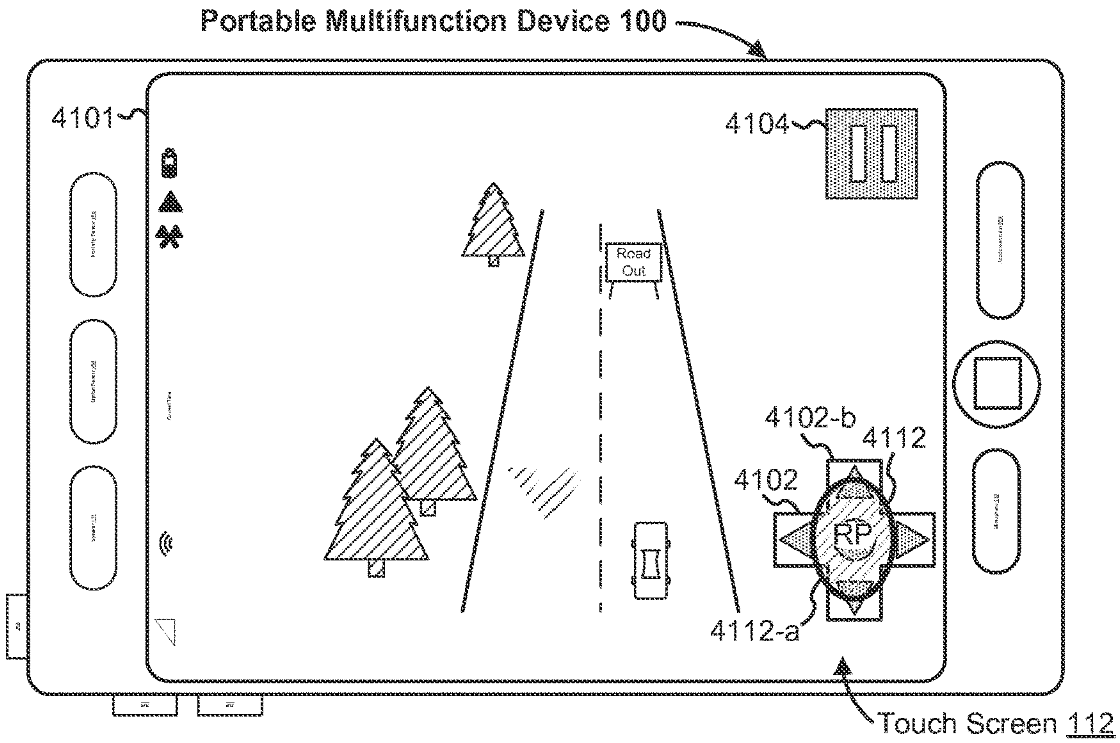

FIG. 41E illustrates displaying respective control 4102 at first location 4102-*a* on touch screen 112 in response to detecting first fingerprint 4112 (e.g., a user's right pinky finger) at first position 4112-*a* in FIG. 41D.

Figure 41F:
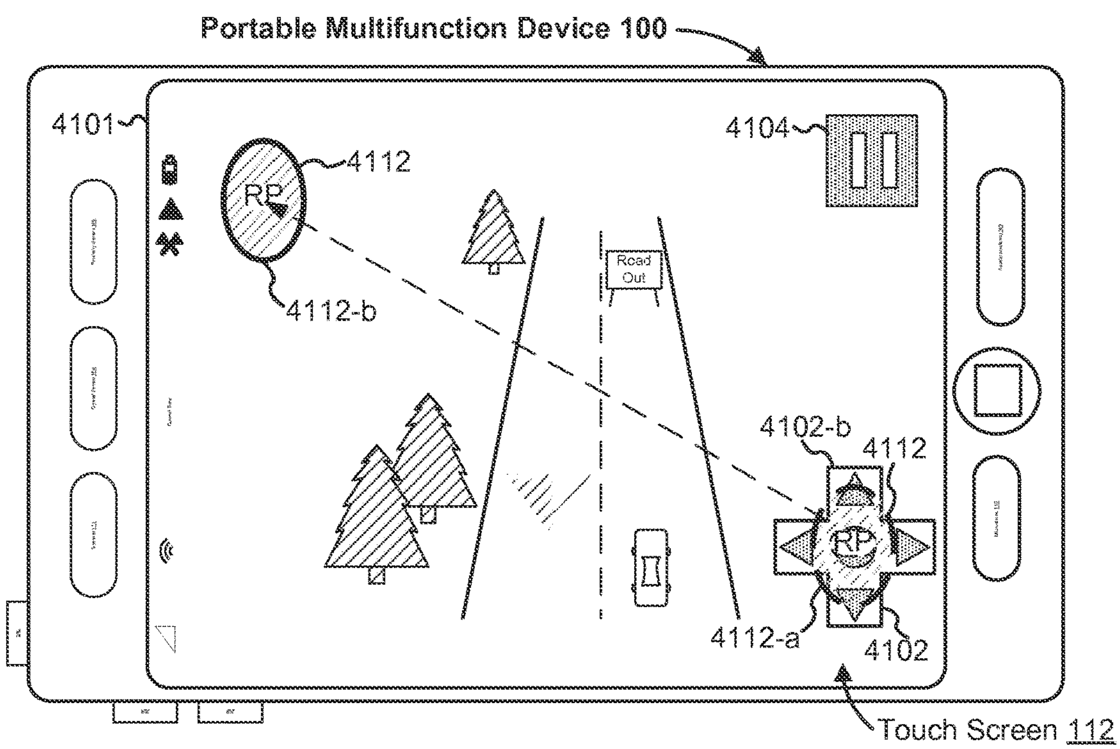

FIG. 41F illustrates detecting a dragging gesture of first fingerprint 4112 (e.g., a user's right pinky finger) on touch screen 112 from first location 4112-*a* to second location 4112-*b*. The second location is different from the first location and does not include respective control 4102.

Figure 41G:
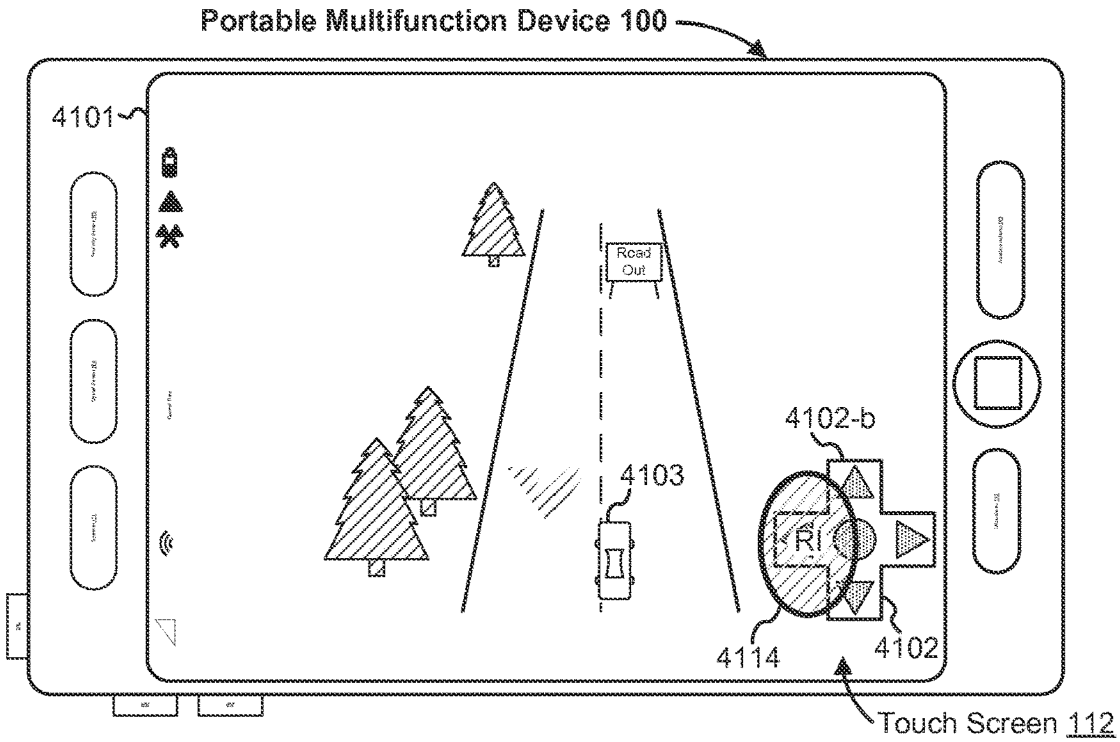

FIG. 41G illustrates detecting liftoff of first fingerprint 4112 from location 4112-*a* in FIG. 41E. FIG. 41G also illustrates maintaining display of respective control 4102 at first location 4102-*b* on touch screen 112 after detecting liftoff of first fingerprint 4112 from location 4112-*a* in FIG. 41E. FIG. 41G further illustrates detecting fingerprint 4114 (e.g., a user's right index finger) over respective control 4102. In response to detecting fingerprint 4114, device 100 performs operations associated with respective control 4102.

Figure 41H:
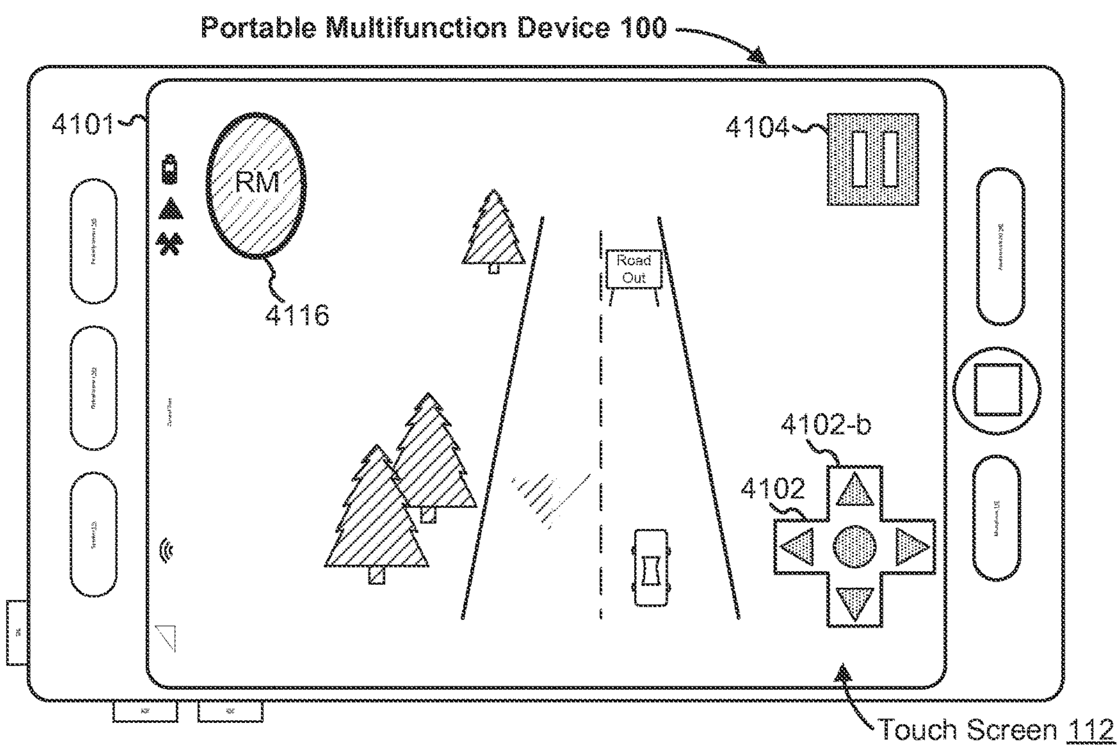

FIG. 41H illustrates detecting respective fingerprint 4116 (e.g., a user's right middle finger) at a second location while displaying respective control 4102 at first location 4102-*b* on touch screen 112. The second location is different from first location 4102-*b* and does not include respective control 4102.

Figure 41I:
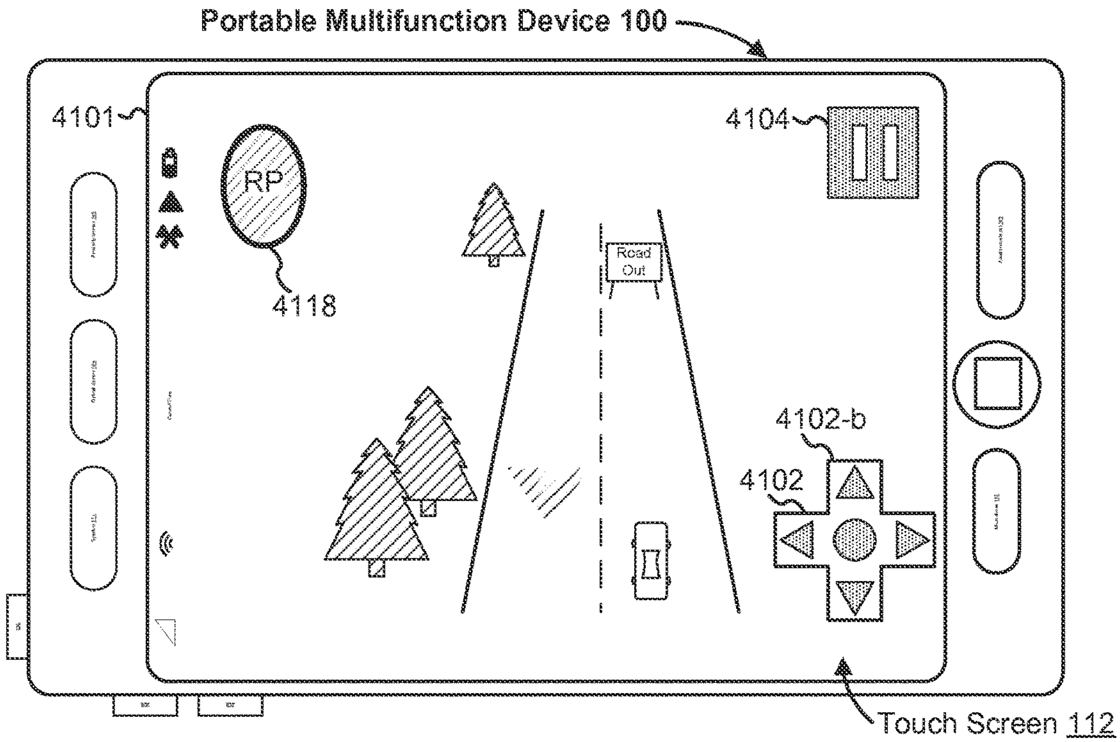

FIG. 41I illustrates detecting respective fingerprint 4118 (e.g., a user's right pinky finger) at a second location while displaying respective control 4102 at first location 4102-*b* on touch screen 112. The second location is different from first location 4102-*b* and does not include respective control 4102.

Figure 41J:
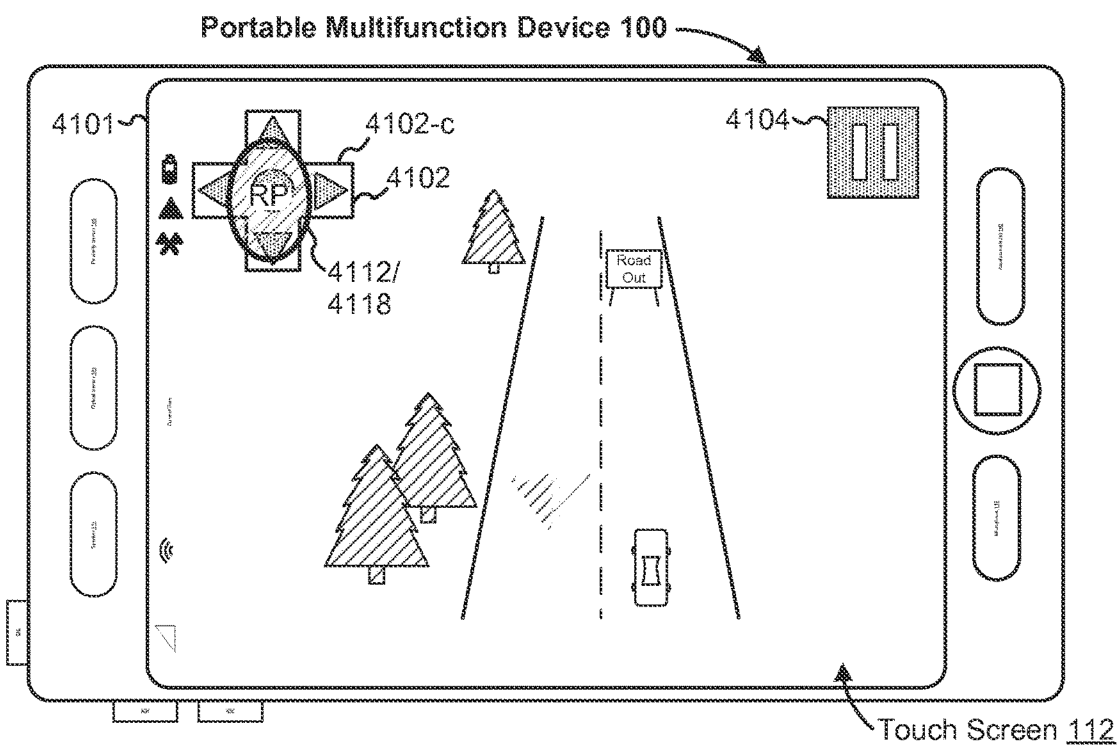

FIG. 41J illustrates ceasing to display respective control 4102 at first location 4102-*b* and displaying respective control 4102 at second location 4102-*c* on touch screen 112. Respective control 4102 is displayed at second location 4102-*c* on touch screen 112 in response to detecting respective fingerprint 4112 at second location 4112-*b* in FIG. 41F, or fingerprint 4118 in FIG. 41I, wherein the respective fingerprint 4112 or 4118 is the first fingerprint. For example, when the respective fingerprint 4118 is dragged to the second location 4112-*b* in FIG. 41F, respective control 4102 is displayed at second location 4102-*c* on touch screen 112. In another example, when the device detects touchdown of the respective fingerprint 4118 at the second location in FIG. 41I, respective control 4102 is displayed at the second location 4102-*c* on touch screen 112.

Figure 41K:
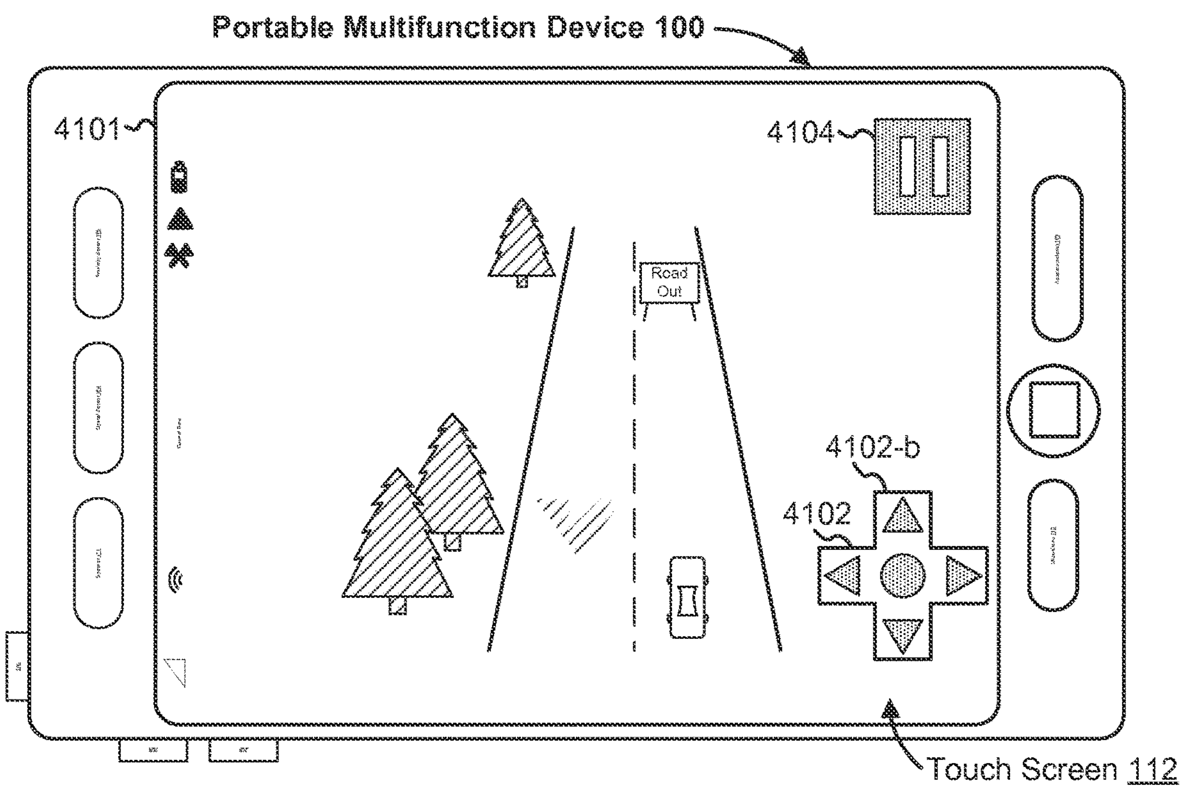

FIG. 41K illustrates maintaining display of respective control 4102 at first location 4102-*b* on touch screen 112 in response to detecting respective fingerprint 4116 at the second location in FIG. 41H and in accordance with a determination that respective fingerprint 4116 is a second fingerprint (e.g., a user's right middle finger) that is different from the first fingerprint (e.g., a user's right pinky finger) and is not associated with moving respective control 4102 for user interface 4101.

FIGS. 42A-42C are flow diagrams illustrating a method 4200 of displaying a respective control for a user interface based on detection of a first fingerprint associated with moving the respective control in accordance with some embodiments. The method 4200 is performed at an electronic device (e.g., device 300, FIG. 3, or portable multifunction device 100, FIG. 1A) with a display, a touch-sensitive surface and a fingerprint sensor. In some embodiments, the display is a touch screen display and the touch-sensitive surface is on the display. In some embodiments, the display is separate from the touch-sensitive surface. Some operations in method 4200 are, optionally, combined and/or the order of some operations is, optionally, changed.

As described below, the method 4200 provides an intuitive way to display a respective control for a user interface based on detection of a first fingerprint associated with moving the respective control. The method reduces the cognitive burden on a user when displaying a respective control for a user interface based on detection of a first fingerprint associated with moving the respective control, thereby creating a more efficient human-machine interface. For battery-operated electronic devices, enabling a user to display a respective control for a user interface based on detection of a first fingerprint associated with moving the respective control faster and more efficiently conserves power and increases the time between battery charges.

An electronic device with a display, a touch-sensitive surface, and a fingerprint sensor displays (4202) a user interface on the display. FIG. 41A-41K, for example, show portable multifunction device 100 displaying user interface 4101 including a video game on touch screen 112.

In some embodiments, (immediately) prior to detecting a first fingerprint associated with moving a respective control for the user interface, the device displays (4204) the respective control at a prior location that is different from a first location, and in response to detecting the first fingerprint, the device ceases to display the respective control at the prior location (e.g., the device moves the respective control from the prior location to a new location in response to detecting the first fingerprint). FIG. 41A, for example, shows device 100 displaying respective control 4102 for user interface 4101 at prior location 4102-*a*, prior to detecting a first fingerprint (e.g., a user's right pinky) associated with moving respective interface 4101. Prior location 4102-*a* of respective control 4102 in FIGS. 41A-41B is different from first location 4102-*b* of respective control 4102 in FIGS. 41E-41F. FIG. 41B, for example, shows device 100 detecting first fingerprint 4108 at a first location. FIG. 41E, for example, shows device 100 ceasing to display respective control 4102 at prior location 4102-*a* and displaying respective control 4102 at first location 4102-*b* in response to detecting first fingerprint 4108 at the first location in FIG. 41B.

In some embodiments, when the respective control is displayed at the prior location, the device responds (4206) to inputs corresponding to the prior location by performing operations associated with the respective control. Additionally, in some embodiments, when the respective control is displayed at the prior location, the device responds to inputs corresponding to the first location by performing operations (e.g., scrolling, selecting, etc.) that are not associated with the respective control (or, optionally by not performing any operations if the inputs do not correspond to other operations in the user interface). FIG. 41A, for example, shows device 100 performing operations associated with respective control 4102 in response to detecting fingerprint 4106 (e.g., a user's right index finger) over respective control 4102 while respective control 4102 is displayed at prior location 4102-*a*. In one example, device 100 changes direction of an interactive object of the video game (e.g., vehicle 4103) on user interface 4101 in accordance with the location of fingerprint 4106 over respective control 4102 corresponding to a downward direction.

The device detects (4208) the first (predetermined) fingerprint associated with moving (e.g., relocating on the display) the respective control for the user interface on the touch-sensitive surface, where the first fingerprint corresponds to a focus selector at a first location on the display that does not include the respective control. FIG. 41D, for example, shows device 100 detecting first fingerprint 4112 (e.g., a user's right pinky finger) at first location 4112-*a* on touch screen 112 that does not include respective control 4102. In FIG. 41D, for example, device 100 is not displaying respective control 4102 on touch screen 112. In some embodiments, the respective control corresponds to a hidden control for a user interface (e.g., directional controls for a video game, audio controls for a media playback application, a color palate or cropping tools for an image editing application, navigation controls for a web browser application, etc.).

In some embodiments, the respective control is (4210) a directional control pad for a video game (e.g., soft-joystick, virtual d-pad/directional pad/joypad). For example, when the device detects contacts interacting with the directional control pad (and the contacts do not include the first fingerprint), the device performs corresponding operations associated with the directional control pad, such as navigating through a user interface or changing the direction of motion or view of a vehicle or character in a video game. FIGS. 41A-41B and 41E-41K, for example, show device 100 displaying respective control 4102 which is a directional control for the video game displayed on touch screen 112.

In response to detecting the first fingerprint, the device displays (4212) the respective control at the first location on the display. FIG. 41E, for example, shows device 100 displaying respective control 4102 at first location 4102-*b* on touch screen 112 in response to detecting first fingerprint 4108 (e.g., a user's right pinky finger) at the first location in FIG. 41B, or first fingerprint 4112 (e.g., a user's right pinky finger) at first location 4112-*a* in FIG. 41D.

In some embodiments, when the respective control is displayed at the first location, the device responds (4214) to inputs corresponding to the first location by performing operations associated with the respective control. Additionally, in some embodiments, when the respective control is displayed at the first location, the device responds to inputs corresponding to the prior location by performing operations (e.g., scrolling, selecting, etc.) that are not associated with the respective control (or, optionally by not performing any operations if the inputs do not correspond to other operations in the user interface). FIG. 41G, for example, shows device 100 performing operations associated with respective control 4102 in response to detecting fingerprint 4114 (e.g., a user's right index finger) over respective control 4102 while respective control 4102 is displayed at first location 4102-*b*. In one example, device 100 changes direction of an interactive object of the video game (e.g., vehicle 4103) on user interface 4101 in accordance with the location of fingerprint 4114 over respective control 4102 corresponding to a left direction.

In some embodiments, the respective control is not displayed (4216) on the display (immediately) prior to detecting the first fingerprint. FIG. 41D, for example, shows device 100 not displaying respective control 4102 on touch screen 112 prior to detecting first fingerprint 4112 (e.g., a user's right pinky finger) at first location 4112-*a*.

In some embodiments, the display is (4218) a touch-screen display, and the first location at which the respective control is displayed corresponds to a location of the first fingerprint on the touch-screen display. FIGS. 41A-41K, for example, show portable multifunction device 100 with touch screen 112 which is a touch-sensitive display surface or a touch-screen display. Furthermore, FIG. 41E, for example, shows device 100 displaying respective control 4102 at first location 4102-*b* corresponding to the location of first fingerprint 4108 (e.g., a user's right pinky finger) at the first location in FIG. 41B on touch screen 112, or first fingerprint 4112 (e.g., a user's right pinky finger) at first location 4112-*a* in FIG. 41D on touch screen 112.

In some embodiments, the device displays (4220) the respective control at the first location on the display in response to detecting the first fingerprint while the device is in a normal mode of operation that is not associated with reconfiguring the user interface of the device (e.g., the respective control first appears or is moved on the display while the device is not in a separate reconfiguration mode). FIG. 41G, for example, shows device 100 displaying respective control 4102 at first location 4102-*b* on touch screen 112 while device 100 is in a normal mode of operation (e.g., video game play mode) that is not associated with reconfiguring user interface 4101 of device 100.

In some embodiments, the device detects (4222) liftoff of the first fingerprint, and after detecting liftoff of the first fingerprint, the device maintains (4224) display of the respective control at the first location on the display. For example, the respective control is permanently or semi-permanently moved to the first location until the user moves the respective control again by placing the first fingerprint at another location on the touch-sensitive surface. FIG. 41G, for example, shows device 100 detecting liftoff of first fingerprint 4112 (e.g., a user's right pinky finger) from first location 4112-*a* in FIG. 41E. FIG. 41G, for example, further shows device 100 maintaining display of respective control 4102 at first location 4102-*b* on touch screen 112 after detecting liftoff of first fingerprint 4112 from first location 4112-*a* in FIG. 41E.

In some embodiments, while displaying the respective control at the first location on the display, the device detects (4226) a respective fingerprint on the touch-sensitive surface that corresponds to a focus selector at a second location on the display, where the second location is different from the first location and does not include the respective control. In some embodiments, when the respective fingerprint is the first fingerprint, detecting the first fingerprint at the second location includes detecting a dragging gesture performed with the first fingerprint that corresponds to movement from the first location to the second location. In some embodiments, when the respective fingerprint is the first fingerprint, detecting the first fingerprint at the second location includes detecting a tap gesture performed with the first fingerprint at a location on the touch-sensitive surface that corresponds to the second location on the display.

FIG. 41F, for example, shows device 100 detecting a dragging gesture of respective fingerprint 4112 from first location 4112-*a* to second location 4112-*b* that does not include respective control 4102, while displaying respective control 4102 at first location 4102-*b*. In this example, respective fingerprint 4112 is the first fingerprint (e.g., a user's right pinky finger). FIG. 41H, for example, shows device 100 detecting respective fingerprint 4116 (e.g., a user's right middle finger) at a second location that does not include respective control 4102 and is different from first location 4112-*a* of first fingerprint 4112 in FIG. 41D, while displaying respective control 4102 at first location 4102-*b*. In this example, respective fingerprint 4116 is a second fingerprint (e.g., the user's right middle finger) different from the first fingerprint (e.g., a user's right pinky finger). FIG. 41I, for example, shows device 100 detecting respective fingerprint 4118 (e.g., a user's right pinky finger) at a second location that does not include respective control 4102 and is different from first location 4112-*a* of first fingerprint 4112 in FIG. 41D, while displaying respective control 4102 at first location 4102-*b*. In this example, respective fingerprint 4118 is the first fingerprint (e.g., a user's right pinky finger).

In some embodiments, in response to detecting (4228) the respective fingerprint and in accordance with a determination that the respective fingerprint is the first (predetermined) fingerprint associated with moving (e.g., relocating on the display) the respective control for the user interface on the touch-sensitive surface, the device: ceases (4230) to display the respective control at the first location on the display; and displays (4232) the respective control at the second location on the display (e.g., in response to detecting a subsequent input with the first fingerprint, the respective control is moved to a different location on the display). FIG. 41J, for example, shows device 100 ceasing to display respective control 4102 at first location 4102-*b* and displaying respective control 4102 at second location 4102-*c*. In this example, device 100 performs the aforementioned operations in response to detecting respective fingerprint 4112 at second location 4112-*b* in FIG. 41F, or respective fingerprint 4118 at the second location in FIG. 41I, and in accordance with a determination that respective fingerprint 4112 or 4118 is the first fingerprint (e.g., a user's right pinky finger) associated with moving respective control 4102.

In some embodiments, in response to detecting the respective fingerprint and in accordance with a determination that the respective fingerprint is a second fingerprint that is different from the first fingerprint and is not associated with moving (e.g., relocating on the display) the respective control for the user interface on the touch-sensitive surface, the device maintains (4234) display of the respective control at the first location on the display. The device also, optionally, performs an operation associated with the second location on the display that is not an operation corresponding to the respective control (e.g., if the gesture performed with the second fingerprint is a gesture for interacting with an icon or other user interface element displayed at the second location on the display). FIG. 41K, for example, shows device 100 maintaining display of respective control 4102 at first location 4102-*b*. In this example, device 100 performs the aforementioned operation in response to detecting respective fingerprint 4116 at second location in FIG. 41H and in accordance with a determination that respective fingerprint 4116 is a second fingerprint (e.g., a user's right middle finger) different from the first fingerprint (e.g., a user's right pinky finger) and is not associated with moving respective control 4102.

It should be understood that the particular order in which the operations in FIGS. 42A-42C have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., those methods described above) are also applicable in an analogous manner to method 4200 described above with respect to FIGS. 42A-42C. For example, the fingerprints, user interface objects, focus selectors described above with reference to method 4200 optionally have one or more of the characteristics of the fingerprints, user interface objects, focus selectors described herein with reference to other methods described herein (e.g., those methods described above). For brevity, these details are not repeated here.

Figure 43:
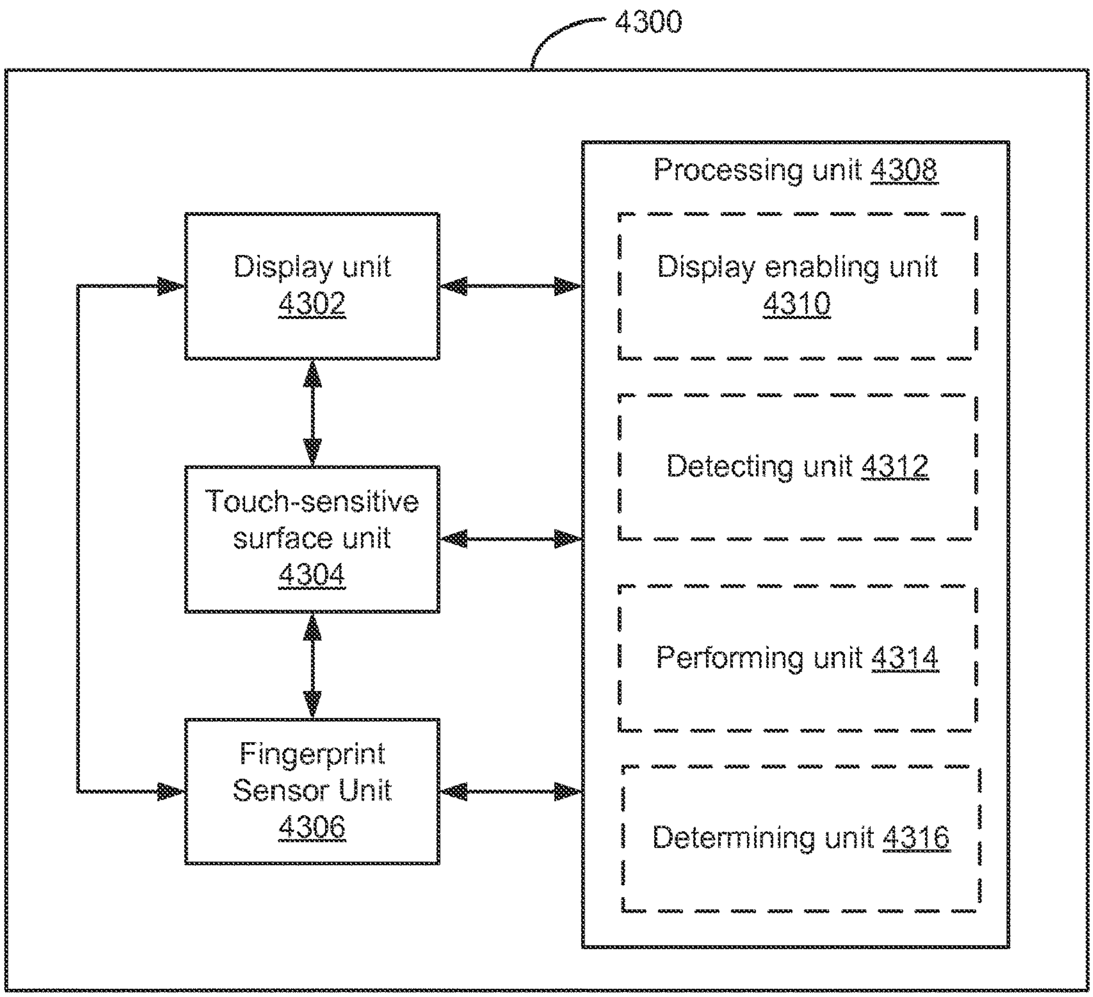
FIG. 43 is a functional block diagram of an electronic device in accordance with some embodiments.

In accordance with some embodiments, FIG. 43 shows a functional block diagram of an electronic device 4300 configured in accordance with the principles of the various described embodiments. The functional blocks of the device are, optionally, implemented by hardware, software, or a combination of hardware and software to carry out the principles of the various described embodiments. It is understood by persons of skill in the art that the functional blocks described in FIG. 43 are, optionally, combined or separated into sub-blocks to implement the principles of the various described embodiments. Therefore, the description herein optionally supports any possible combination or separation or further definition of the functional blocks described herein.

As shown in FIG. 43, an electronic device 4300 includes a display unit 4302 configured to display a graphic user interface, a touch-sensitive surface unit 4304 configured to receive one or more contacts, a fingerprint sensor unit 4306; and a processing unit 4308 coupled to the display unit 4302, the touch-sensitive surface unit 4304, and the fingerprint sensor unit 4306. In some embodiments, the processing unit 4308 includes a display enabling unit 4310, a detecting unit 4312, a performing unit 4314 and a determining unit 4316.

The processing unit 4308 is configured to detect (e.g., with the detecting unit 4312) a first fingerprint associated with moving a respective control for the user interface on the touch-sensitive surface unit 4304, where the first fingerprint corresponds to a focus selector at a first location on the display unit 4302 that does not include the respective control. In response to detecting the first fingerprint, the processing unit 4308 is configured to enable display (e.g., with the display enabling unit 4310) of the respective control at the first location on the display unit 4302.

In some embodiments, the respective control is not displayed on the display unit 4302 prior to detecting the first fingerprint.

In some embodiments, the processing unit 4308 is configured to: enable display (e.g., with the display enabling unit 4310) of the respective control at a prior location that is different from the first location, prior to detecting the first fingerprint; and in response to detecting the first fingerprint, cease display (e.g., with the display enabling unit 4310) of the respective control at the prior location.

In some embodiments, the processing unit 4308 is configured to: when the respective control is displayed at the prior location, respond to inputs corresponding to the prior location by performing (e.g., with the performing unit 4314) operations associated with the respective control; and when the respective control is displayed at the first location, respond to inputs corresponding to the first location by performing (e.g., with the performing unit 4314) operations associated with the respective control.

In some embodiments, the display unit 4302 is a touch-screen display unit, and the first location at which the respective control is displayed corresponds to a location of the first fingerprint on the touch-screen display unit.

In some embodiments, the processing unit 4308 is further configured to: detect (e.g., with the detecting unit 4312) liftoff of the first fingerprint; and after detecting liftoff of the first fingerprint, maintain display (e.g., with the display enabling unit 4310) of the respective control at the first location on the display unit 4302.

In some embodiments, processing unit 4308 is further configured to: while displaying (e.g., with the display enabling unit 4310) the respective control at the first location on the display unit 4302, detect (e.g., with the detecting unit 4312) a respective fingerprint on the touch-sensitive surface unit 4304 that corresponds to a focus selector at a second location on the display unit 4302, where the second location is different from the first location and does not include the respective control; and in response to detecting the respective fingerprint, in accordance with a determination (e.g., with the determining unit 4316) that the respective fingerprint is the first fingerprint associated with moving the respective control for the user interface on the touch-sensitive surface unit 4304: cease to display (e.g., with the display enabling unit 4310) the respective control at the first location on the display unit 4302; and enable display (e.g., with the display enabling unit 4310) of the respective control at the second location on the display unit 4302.

In some embodiments, the processing unit 4308 is further configured to maintain display (e.g., with the display enabling unit 4310) of the respective control at the first location on the display unit 4302, in response to detecting the respective fingerprint and in accordance with a determination (e.g., with the determining unit 4316) that the respective fingerprint is a second fingerprint that is different from the first fingerprint and is not associated with moving the respective control for the user interface on the touch-sensitive surface unit 4304.

In some embodiments, the respective control is a directional control pad for a video game.

In some embodiments, the processing unit 4308 is configured to enable display (e.g., with the display enabling unit 4310) of the respective control at the first location on the display unit 4302 in response to detecting the first fingerprint while the device is in a normal mode of operation that is not associated with reconfiguring the user interface of the device.

The operations in the information processing methods described above are, optionally implemented by running one or more functional modules in information processing apparatus such as general purpose processors (e.g., as described above with respect to FIGS. 1A and 3) or application specific chips.

The operations described above with reference to FIGS. 42A-42C are, optionally, implemented by components depicted in FIGS. 1A-1B or FIG. 43. For example, displaying operations 4204 and 4212, detecting operations 4204 and 4222, and performing operation 4210 and 4214 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub-event, such as selection of an object on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Configuring an Electronic Device as an Auxiliary Display

Many electronic devices have graphical user interfaces that display content and allow the user to interact with the device. Sometimes, the user may want to expand the graphical user interface beyond a display integrated in, or connected to, the device itself. For example, a user operating a desktop or laptop computer with a built-in or external display optionally connects a second electronic device or external display to the CPU through a cable, and then configure the second display to expand the graphical user interface from the first display onto the second display. Likewise, a user operating a portable multifunction electronic device (e.g., a smart phone, tablet computer, or digital planner) optionally connects (e.g., via wired or wireless connection) the portable device to a base computer to more easily configure the device, transfer files onto or off of the portable device, etc. In this fashion, the effective size of the graphical user interface is increased, improving the user's ability to interact with the device. However, current methods for configuring a second electronic device as an auxiliary display of a first electronic device require opening menus and sub-menus and/or multiple gestures and button presses to configure the display of the second device, which can be confusing and/or time consuming for the user. Accordingly, there is a need to provide methods and user interfaces that enable to the user to more efficiently and conveniently configure a second electronic device as an auxiliary display for a first electronic device.

The embodiments described below provide improved methods and user interfaces for configuring a second electronic device as an auxiliary display of a first electronic device. More specifically, according to some embodiments described below, methods and user interfaces are provided that allow a user to configure a second device as an auxiliary display for a first device by merely touching a fingerprint sensor on each device. In some embodiments, the methods and user interfaces correlate a respective fingerprint identity from a touch on the first device to a respective fingerprint identity from a touch on the second device, and automatically configure the second device as an auxiliary display for the first device. Alternatively, in some embodiments, upon detection of the first and second fingerprints, the user is prompted to confirm the configuration of the second device as an auxiliary display for the first device. In some embodiments described below, the orientation of the touch on the first and/or second electronic device determines the orientation of content displayed on the auxiliary display. In some embodiments, the identity of the fingerprint touch on the first and/or second device determines the direction in which the user interface of the first display is expanded onto the auxiliary display. For example, in some embodiments, where the user touches the first device with their left hand and touches the second device with their right hand, the user interface is expanded to the right on the auxiliary display, and vise versa. Advantageously, the methods and user interfaces described below simplify the process of configuring a second electronic device as an auxiliary display of a first device by reducing the number of required steps.

In some embodiments, the device is an electronic device with a separate display (e.g., display 450) and a separate touch-sensitive surface (e.g., touch-sensitive surface 451). In some embodiments, the device is portable multifunction device 100, the display is touch screen 112, and the touch-sensitive surface includes tactile output generators 167 on the display (FIG. 1A). The device described below with reference to 44A-44EE and 45A-45D includes one or more fingerprint sensors 169. In some embodiments, the one or more fingerprint sensors include one or more integrated fingerprint sensors 359-1 (FIG. 4B) that are integrated into the touch-sensitive surface (e.g., separate touch-sensitive surface 451 or touch sensitive display system 112). In some embodiments, the one or more fingerprint sensors include separate fingerprint sensors 359-2 (FIG. 4B) that are separate from the touch-sensitive surface (e.g., separate touch-sensitive surface 451 or touch sensitive display system 112). Unless specified otherwise, a fingerprint sensor 169 described below is, optionally, either an integrated fingerprint sensor 359-1 or a separate fingerprint sensor 359-2, depending on the configuration of the hardware and software of the device that includes the fingerprint sensor 169. For convenience of explanation, the embodiments described with reference to FIGS. 44A-44EE and 45A-45D will be discussed with reference to display 450, a separate touch-sensitive surface 451 and a separate fingerprint sensor 359-2, however analogous operations are, optionally, performed on a device with an integrated fingerprint sensor 359-1 in response to detecting the inputs described in FIGS. 44A-44EE on the integrated fingerprint sensor 359-1 while displaying the user interfaces shown in FIGS. 44A-44EE on the display 450. Additionally, analogous operations are, optionally, performed on a device with a touch screen 112 in response to detecting the contacts described in FIGS. 44A-44EE on a fingerprint sensor 169 (e.g., an integrated fingerprint sensor 359-1 or a separate fingerprint sensor 359-2) while displaying the user interfaces shown in FIGS. 44A-44EE on the touch screen 112; in such embodiments, the focus selector is, optionally: a respective contact, a representative point corresponding to a contact (e.g., a centroid of a respective contact or a point associated with a respective contact), or a centroid of two or more contacts detected on the touch screen 112, in place of cursor 4422.

FIGS. 44A-44J illustrate two electronic devices (e.g., multifunction devices 100-1 and 100-2), each having a touch screen 112 with a spatial resolution that is high enough to detect fingerprint features formed by individual fingerprint ridges, allowing them to be used as fingerprint sensors. Multifunction devices 100-1 and 100-2 are also illustrated as having separate fingerprint sensors 169. In some embodiments, each of multifunction devices 100-1 and 100-2 independently have a touch screen 112 that can be used as a fingerprint sensor, a separate fingerprint sensor 169, or both.

FIGS. 44A-44F illustrate various embodiments where first multifunction device 100-1 detects a first fingerprint 4402 and second multifunction device 100-2 detects a second fingerprint 4403 concurrently with, or after detection of first fingerprint 4402 (e.g., the fingerprints are detected simultaneously, substantially simultaneously, or in close temporal proximity). Multifunction device 100-2 communicates to multifunction device 100-1 with information that second fingerprint 4403 was detected. When predefined criteria are met by fingerprints 4402 and 4403, multifunction device 100-1 responds to multifunction device 100-2 with information that enables multifunction device 100-2 to be configured as an auxiliary display for multifunction device 100-1. When predetermined criteria are not met by the detection of fingerprints 4402 and 4403, multifunction device 100-2 is not configured as an auxiliary display for multifunction device 100-1.

Figure 44A:
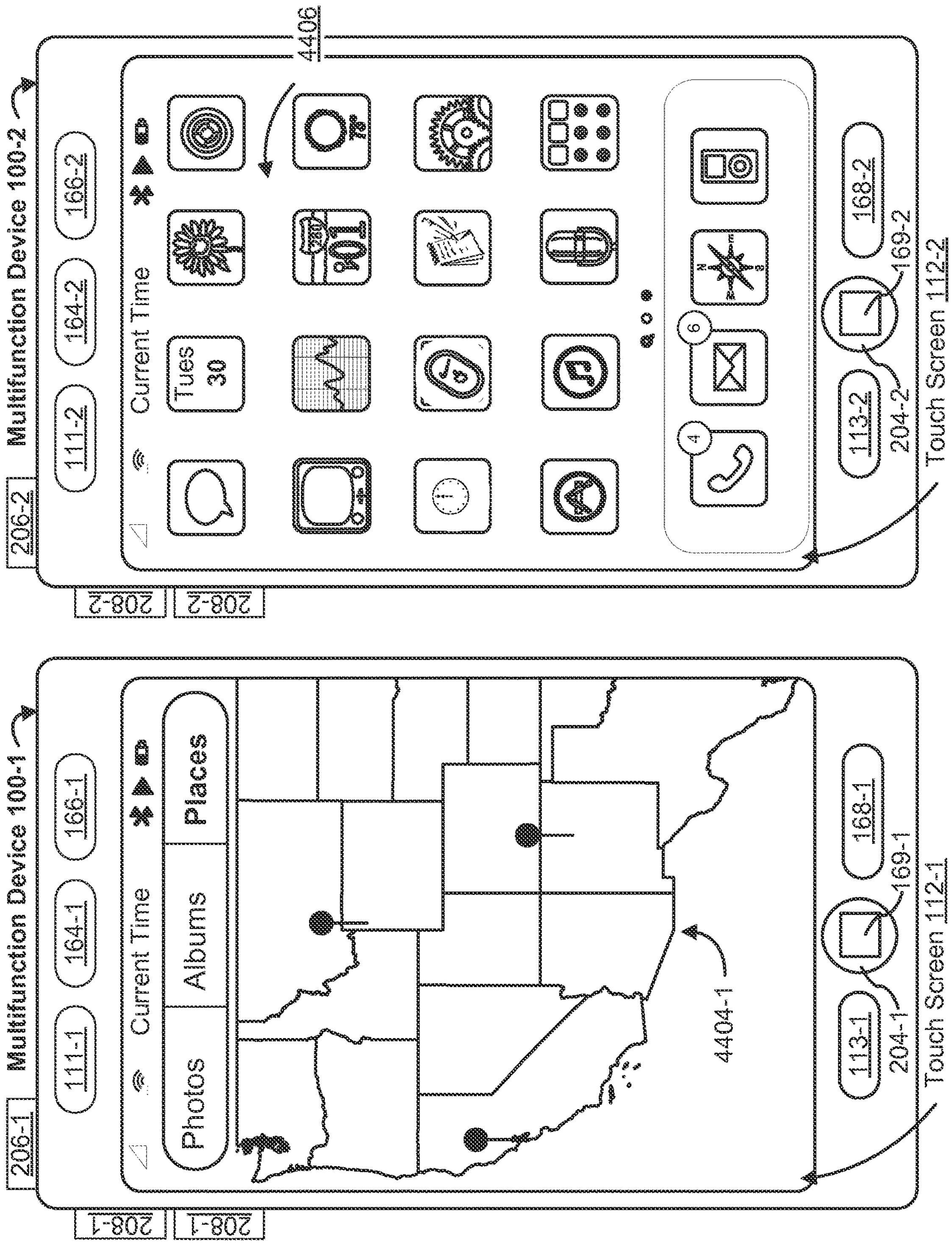
FIGS. 44A-44EE illustrate exemplary user interfaces for configuring a second electronic device as an auxiliary display in accordance with some embodiments.
Figure 44B:
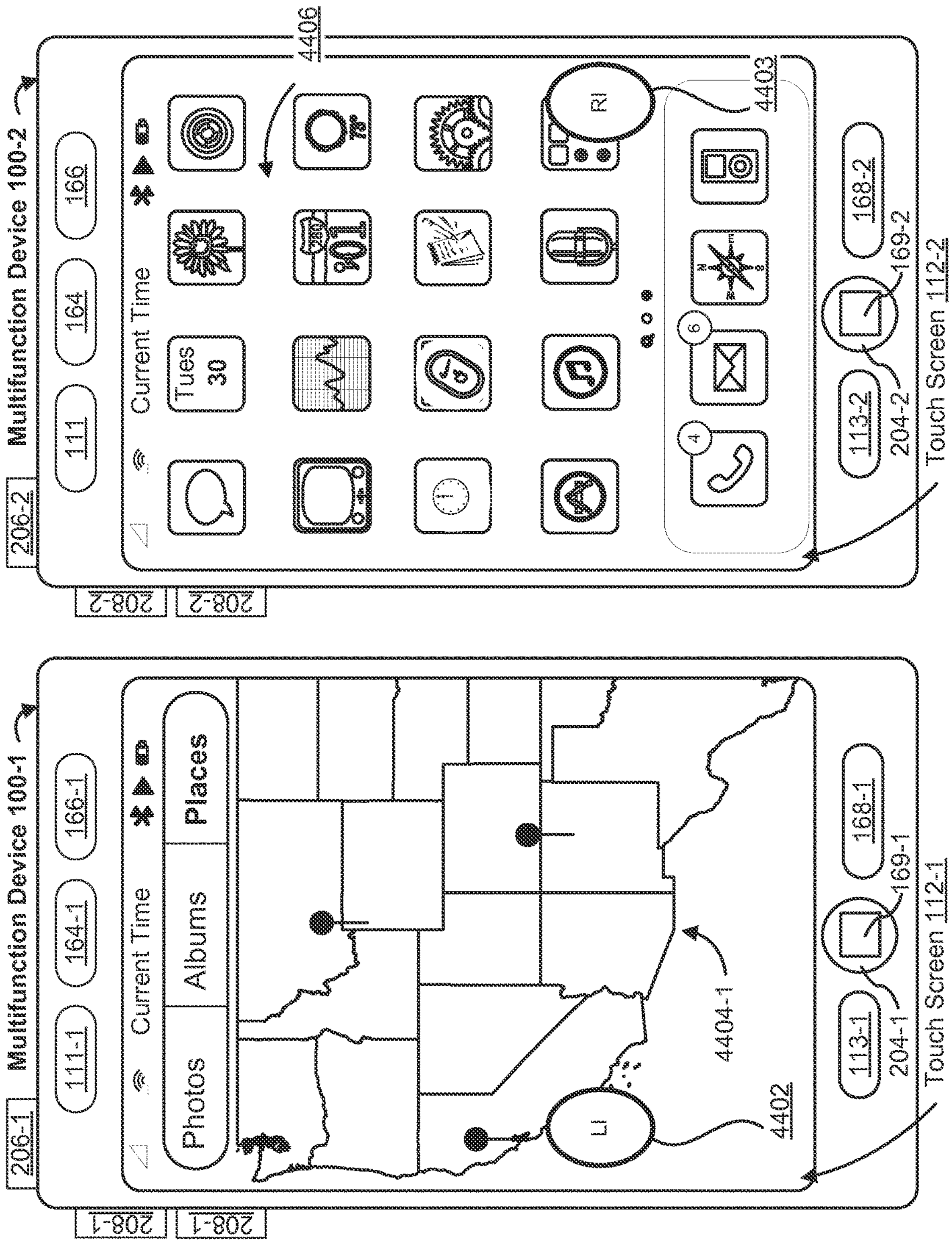

FIGS. 44A-44D illustrate an embodiment where the predefined criteria includes a criterion that the fingerprints 4402 and 4403 detected by both devices are registered to the same user. In FIG. 44A, multifunction device 100-1 displays a first user interface that includes map 4404-1 of the United States, while multifunction device 100-2 displays a second user interface including application launch screen 4406. In FIG. 44B, multifunction device 100-1 detects first fingerprint 4402, corresponding to the left index (LI) finger of a user, and multifunction device 100-2 detects second fingerprint 4403, corresponding to the right index (RI) finger of a user. Multifunction device 100-2 communicates to multifunction device 100-1 that second fingerprint 4403 was detected and, optionally, additional information about the contact (e.g., the identity of the fingerprint).

Figure 44C:
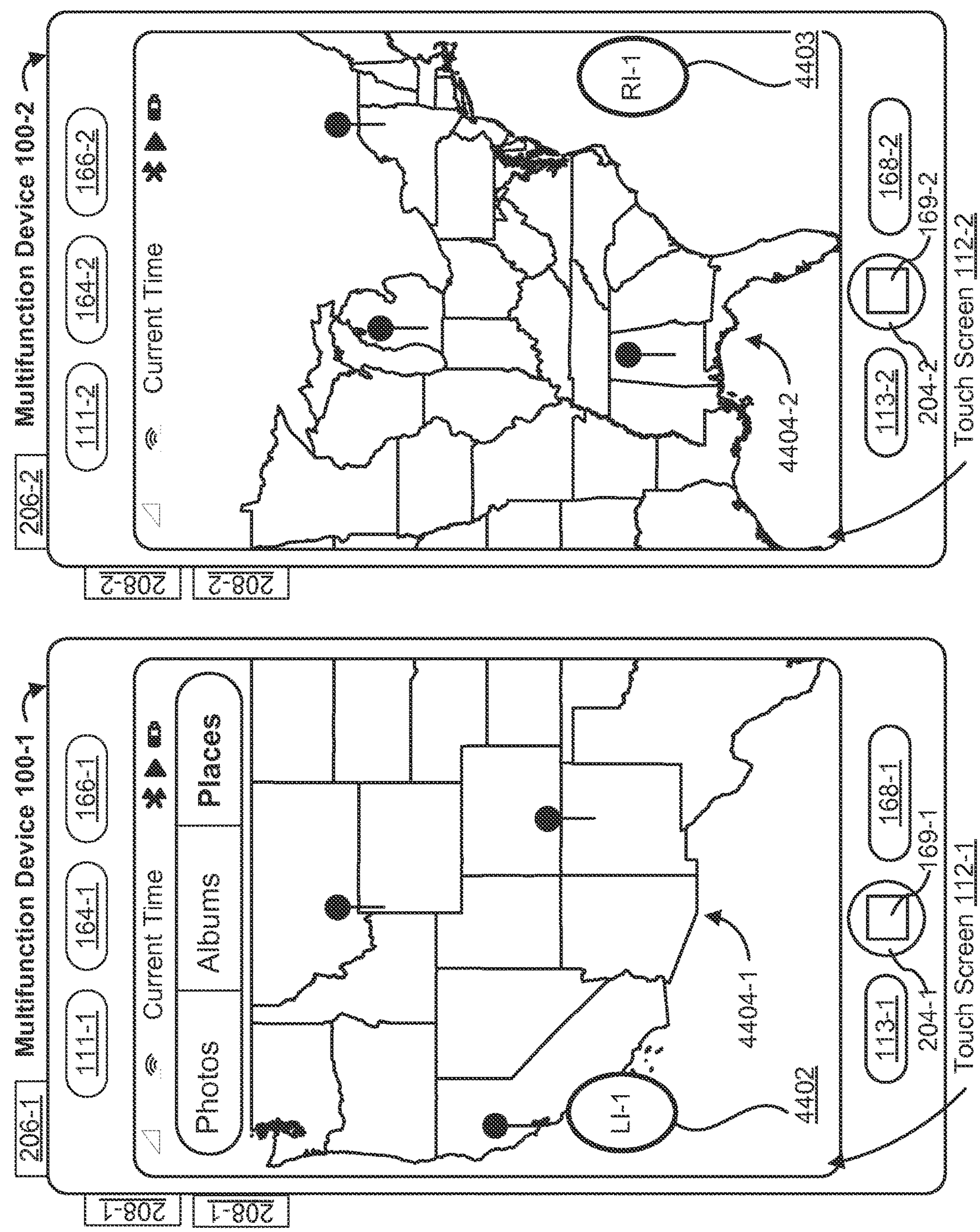

In FIG. 44C, where fingerprints 4402 and 4403 correspond to the same user (e.g., fingerprint 4402 is from the left index finger of user 1 and fingerprint 4403 is from the right index finger of user 1), the first user interface displayed on touch screen 112 of multifunction device 100-1 is extended onto multifunction device 100-2, such that map 4404 of the United States is displayed on touch screens 112 of both multifunction devices (e.g., the western United States is displayed as map 4404-1 on touch screen 112-1 of multifunction device 100-1 and the eastern United States is displayed as map 4404-2 on touch screen 112-2 of multifunction device 100-2), because the predefined criteria were satisfied (e.g., both fingerprints 4402 and 4403 were identified as belonging to the same user).

Figure 44D:
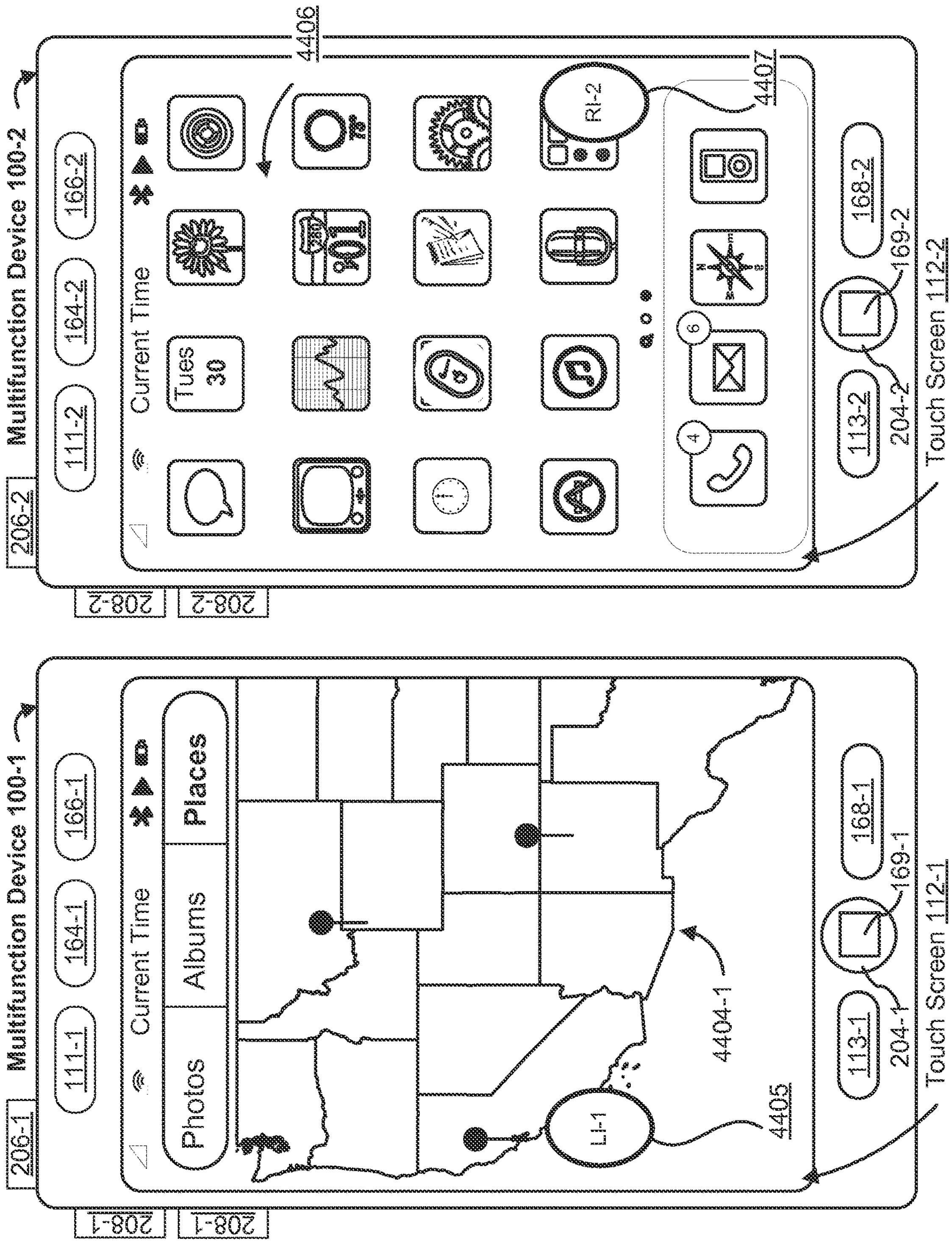

In FIG. 44D, where fingerprints 4405 and 4407 correspond to different users (e.g., fingerprint 4405 is from the left index finger of user 1 and fingerprint 4407 is from the right index finger of user 2), the first user interface is not extended onto multifunction device 100-2 (e.g., touch screen 112-1 of multifunction device 100-1 still displays the first user interface that includes map 4404-1 and touch screen 112-2 of multifunction device 100-2 still displays application launch screen 4406), because the predefined criteria were not satisfied (e.g., fingerprints 4405 and 4407 were identified as belonging to different users).

Figure 44E:
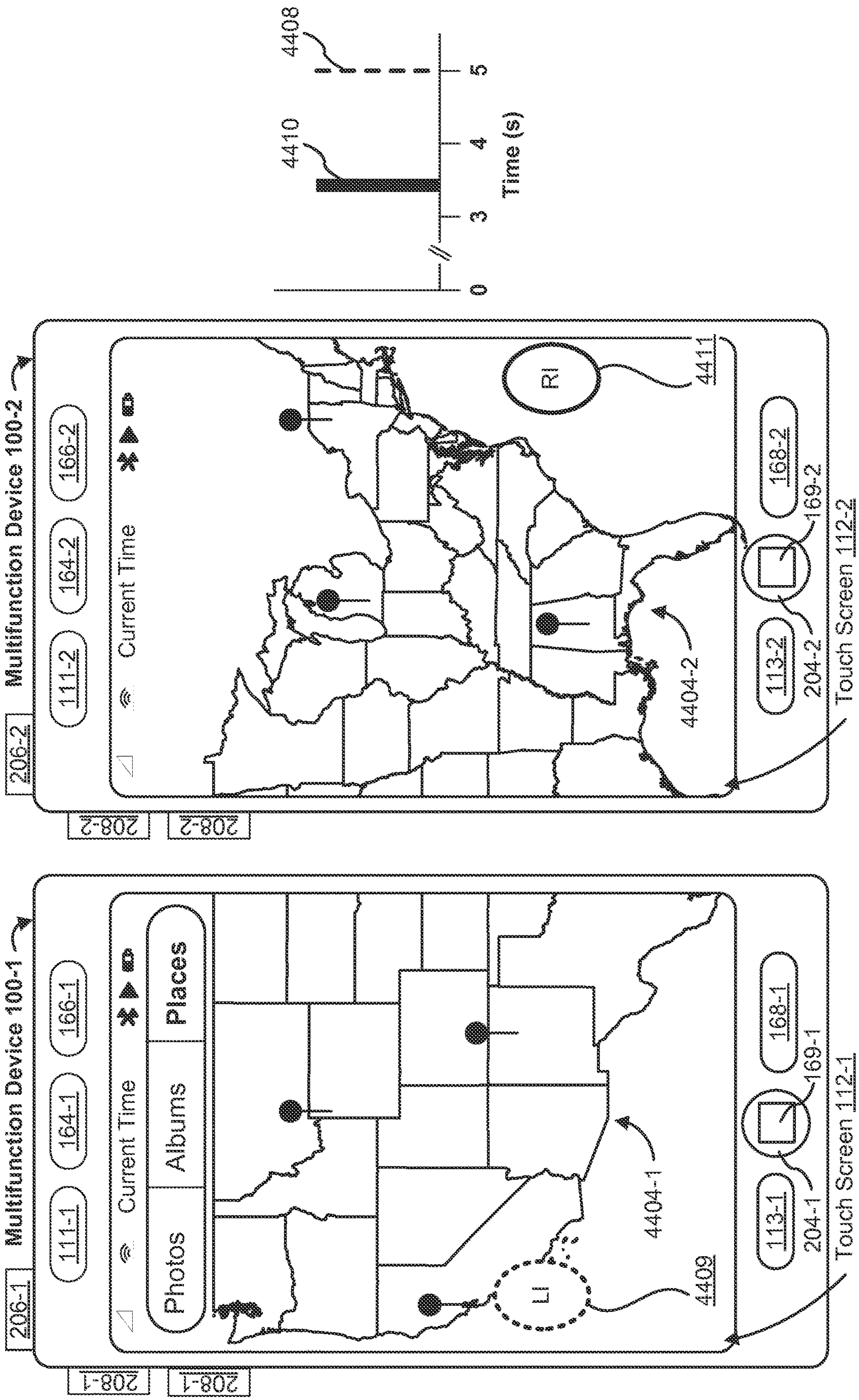
Figure 44F:
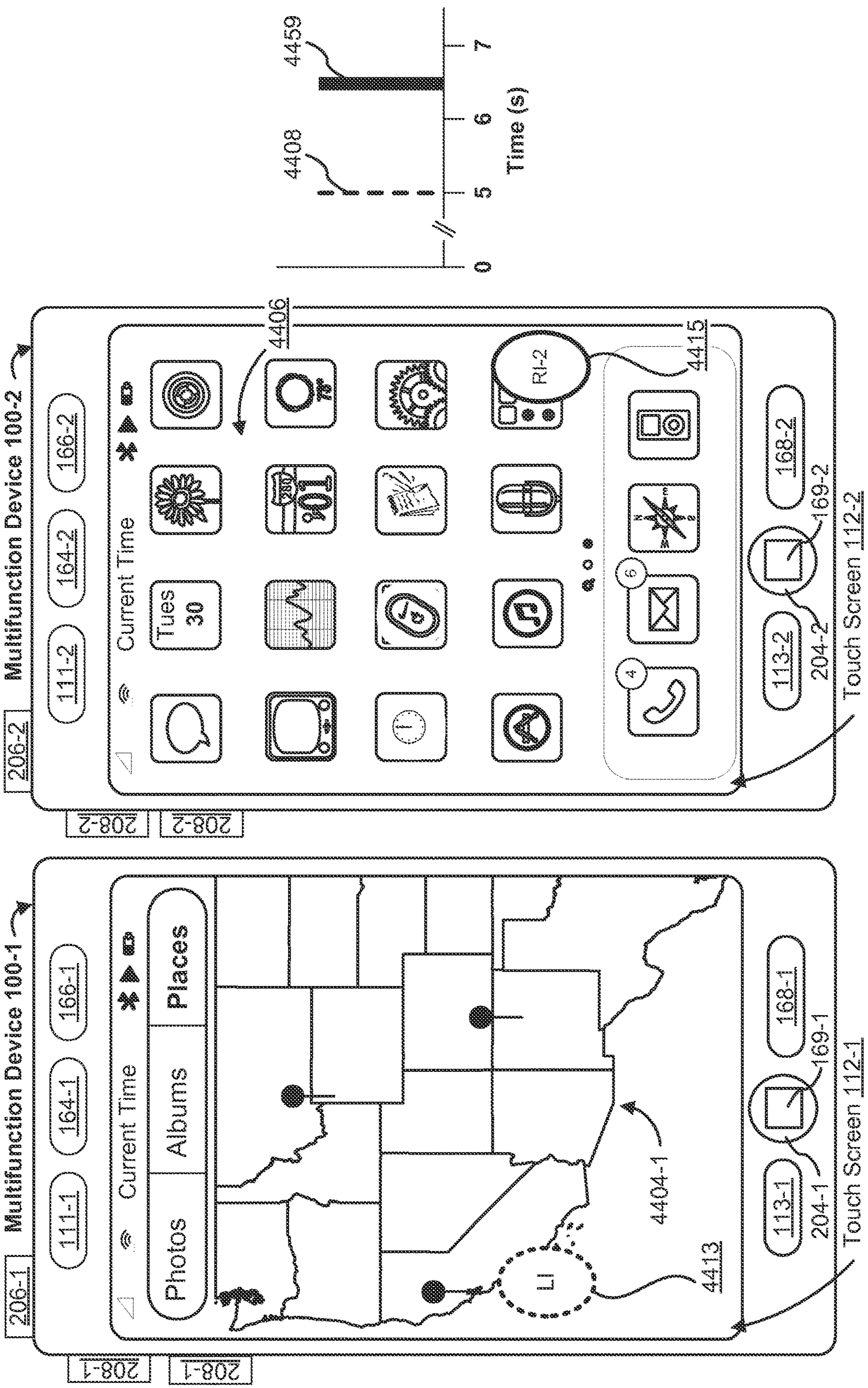

FIGS. 44E-44F illustrate an embodiment where the predefined criteria includes a criterion that the second fingerprint (e.g., fingerprints 4411 and 4415 in FIGS. 44E and 44F, respectively) is detected within a predetermined period of time after detection of the first fingerprint (e.g., fingerprints 4409 and 4413 in FIGS. 44E and 44F, respectively), for example the second contact must occur within 5 seconds after the first contact is detected. For example, in FIG. 44E, multifunction device 100-1 detects first fingerprint 4409 at a first time (e.g., defined as time 0) and multifunction device 100-2 detects second fingerprint 4411 at a second time 4410, after the first time and prior to a predetermined time 4408. Multifunction device 100-2 communicates to multifunction device 100-1 that second fingerprint 4411 was detected and, optionally, additional information about the contact (e.g., the time at which it was detected). The first user interface displayed on touch screen 112-1 of multifunction device 100-1 is extended onto multifunction device 100-2, such that map 4404 of the United States is displayed on touch screens 112 of both multifunction devices (e.g., the western United States is displayed as map 4404-1 on touch screen 112 of multifunction device 100-1 and the eastern United States is displayed as map 4404-2 on touch screen 112-2 of multifunction device 100-2), because the predetermined criteria were satisfied (e.g., second fingerprint 4411 was detected within five seconds of the detection of first fingerprint 4409). In contrast, in FIG. 44F, multifunction device 100-1 detects first fingerprint 4413 at a first time (e.g., defined as time 0) and multifunction device 100-2 detects second fingerprint 4415 at a second time 4459, after the first time and after a predetermined time 4408. Multifunction device 100-2 communicates to multifunction device 100-1 that second fingerprint 4415 was detected and, optionally, additional information about the contact (e.g., the time at which it was detected). The first user interface is not extended onto multifunction device 100-2 (e.g., touch screen 112-1 of multifunction device 100-1 still displays the first user interface that includes map 4404-1 and touch screen 112-2 of multifunction device 100-2 still displays application launch screen 4406), because the predefined criteria were not satisfied (e.g., second fingerprint 4415 was not detected within five seconds of the detection of first fingerprint 4413).

Figure 44G:
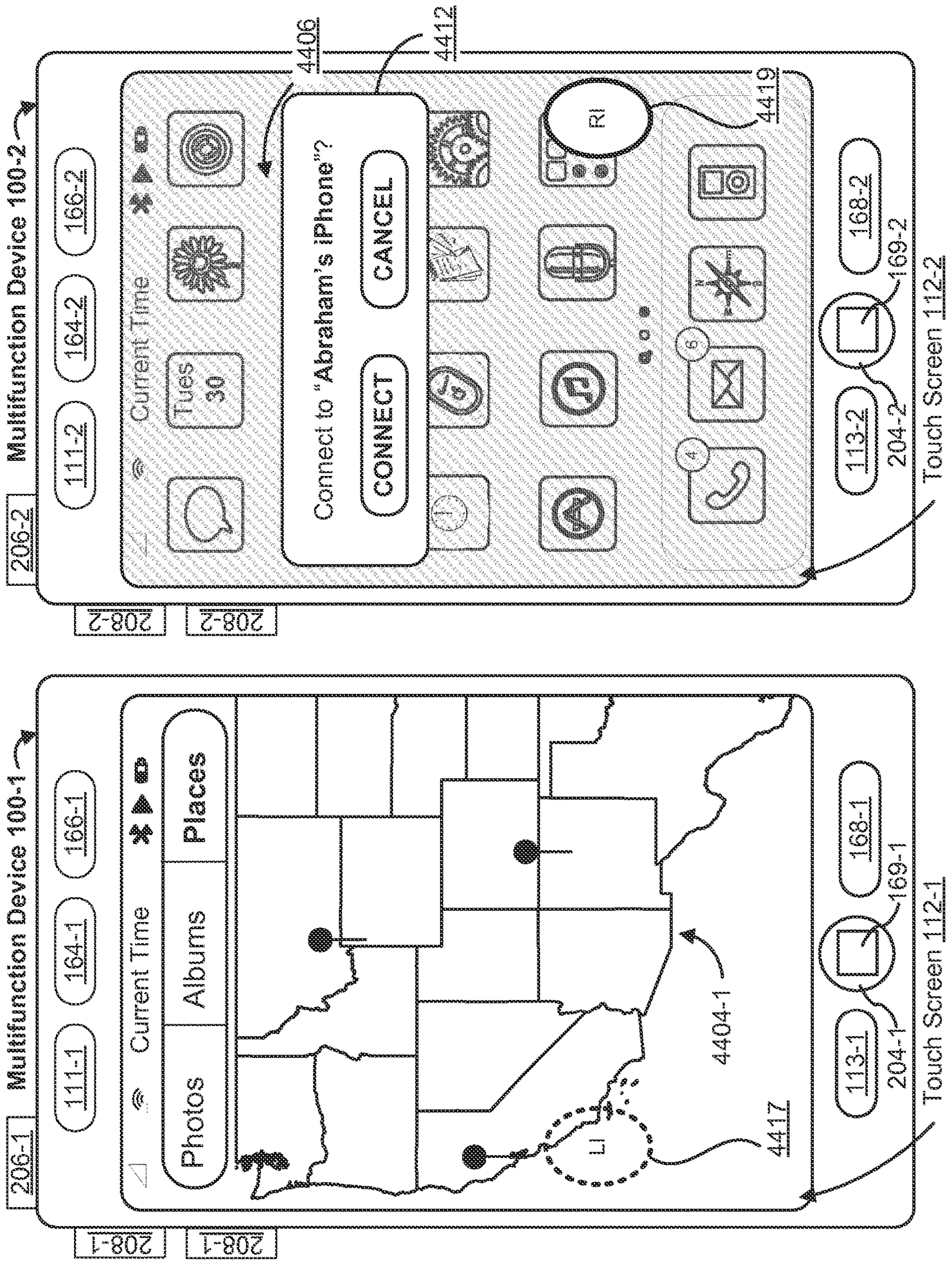
Figure 44H:
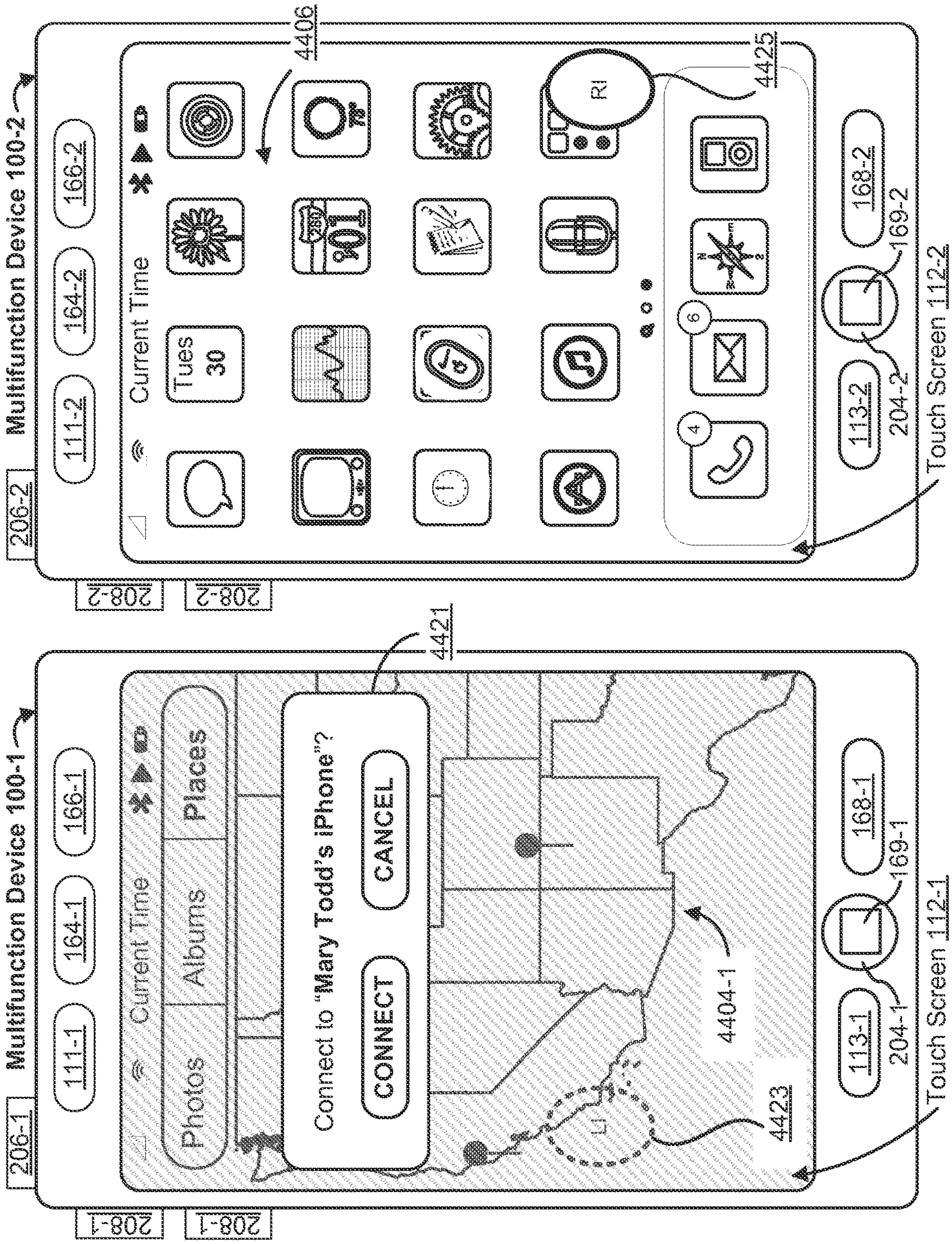

FIGS. 44G-44H illustrate various embodiment where user confirmation of the request to configure the second device as an auxiliary display is required. In FIGS. 44G-44H, multifunction device 100-1 and multifunction device 100-2 detect fingerprint 4417 and 4419, respectively. Multifunction device 100-2 communicates to multifunction device 100-1 with information that second fingerprint 4419 was detected. When predefined criteria are otherwise met by the detection of fingerprints 4417 and 4419, the user of second multifunction device 100-2 (as illustrated in FIG. 44G) and/or the user of first multifunction device 100-1 (as illustrated in FIG. 44H) is prompted (e.g., by display of prompt 4412 on touch screen 112-2 of multifunction device 100-2 in FIG. 44G or by display of prompt 4421 on touch screen 112-1 on multifunction device 100-1 in FIG. 44H) to confirm that second multifunction device 100-2 should be configured as an auxiliary display (e.g., the user has to verify that a request to connect to Abraham's and/or Mary Todd's iPhone has been made). Upon receiving confirmation of the request, the first user interface displayed on touch screen 112 of multifunction device 100-1 is extended onto multifunction device 100-2, such that map 4404 of the United States is displayed on touch screens 112 of both multifunction devices (e.g., the western United States is displayed as map 4404-1 on touch screen 112-1 of multifunction device 100-1 and the eastern United States is displayed as map 4404-2 on touch screen 112-2 of multifunction device 100-2, as illustrated in FIGS. 44C and 44E).

Figure 44I:
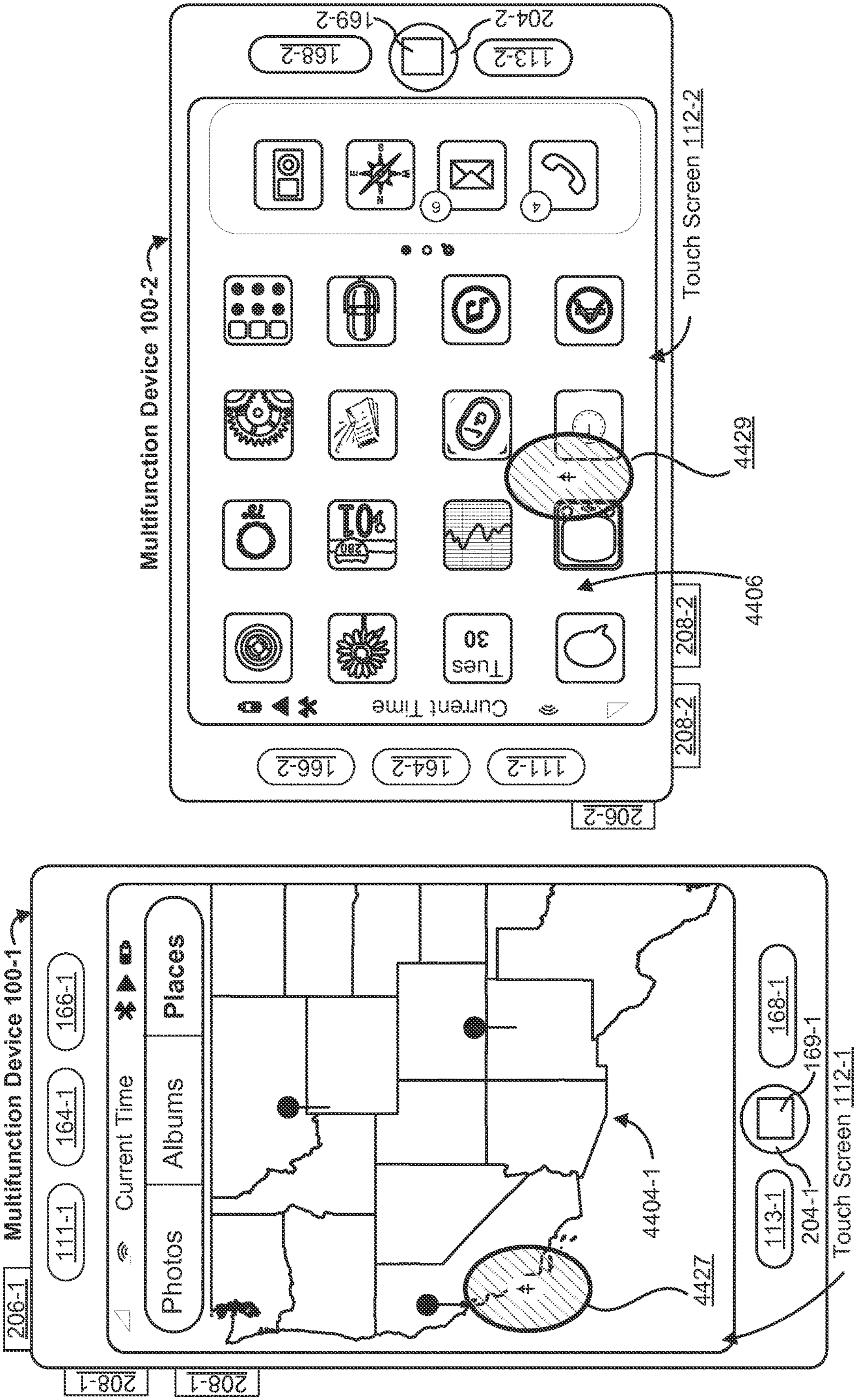
Figure 44J:
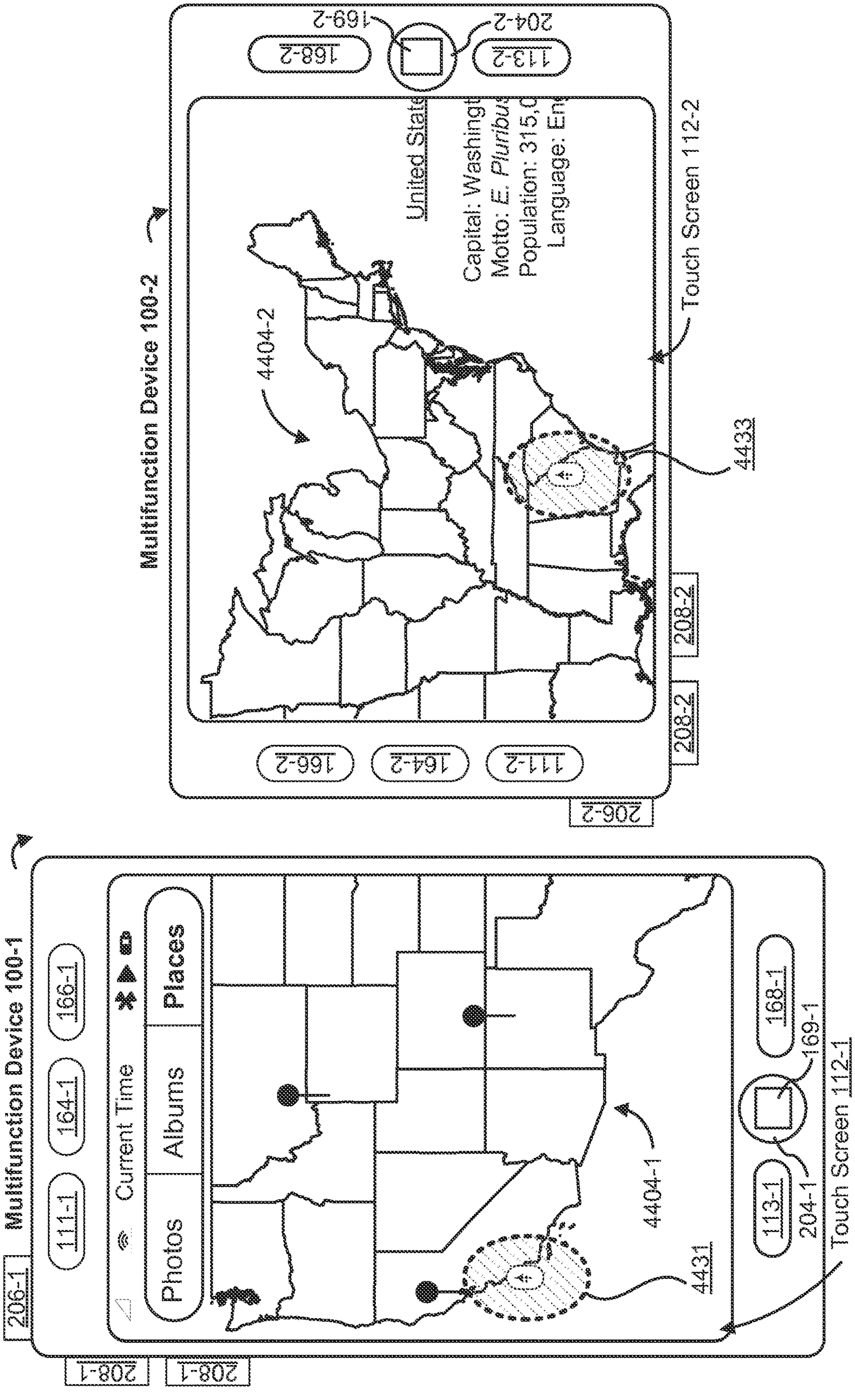

FIGS. 44I-44J illustrate an embodiment where an orientation of a fingerprint (e.g., fingerprint 4427 and/or fingerprint 4429) determines the orientation of the user display on the auxiliary display. In FIG. 44I, multifunction device 100-1 detects first fingerprint 4427, having a first orientation substantially parallel with the long axis of the device. Multifunction device 100-2 detects second fingerprint 4429, having a second orientation substantially perpendicular to the long axis of the device. Multifunction device 100-2 communicates to multifunction device 100-1 with information that second contact 4429 was detected and, optionally, additional information about the contact (e.g., the orientation of the contact). When predefined criteria are otherwise met by detection of fingerprints 4427 and 4429, the first user interface displayed on touch screen 112-1 of multifunction device 100-1 is extended onto touch screen 112-2 of multifunction device 100-2 in a landscape orientation corresponding to the orientation of second fingerprint 4429 relative to the long axis of the device, such that map 4404 of the United States is displayed on touch screens 112 of both multifunction devices (e.g., the western United States is displayed as map 4404-1 on touch screen 112-1 of multifunction device 100-1 and the eastern United States is displayed as map 4404-2 on touch screen 112-2 of multifunction device 100-2), as illustrated in FIG. 44J.

FIGS. 44K-44P illustrate three electronic devices (e.g., multifunction devices 100-1, 100-2, and 100-3), each having a fingerprint sensor 169. Various embodiments are illustrated in FIGS. 44K-44P where the identity of a fingerprint determines the direction in which a user interface displayed on a first electronic device is expanded onto the second electronic device.

Figure 44K:
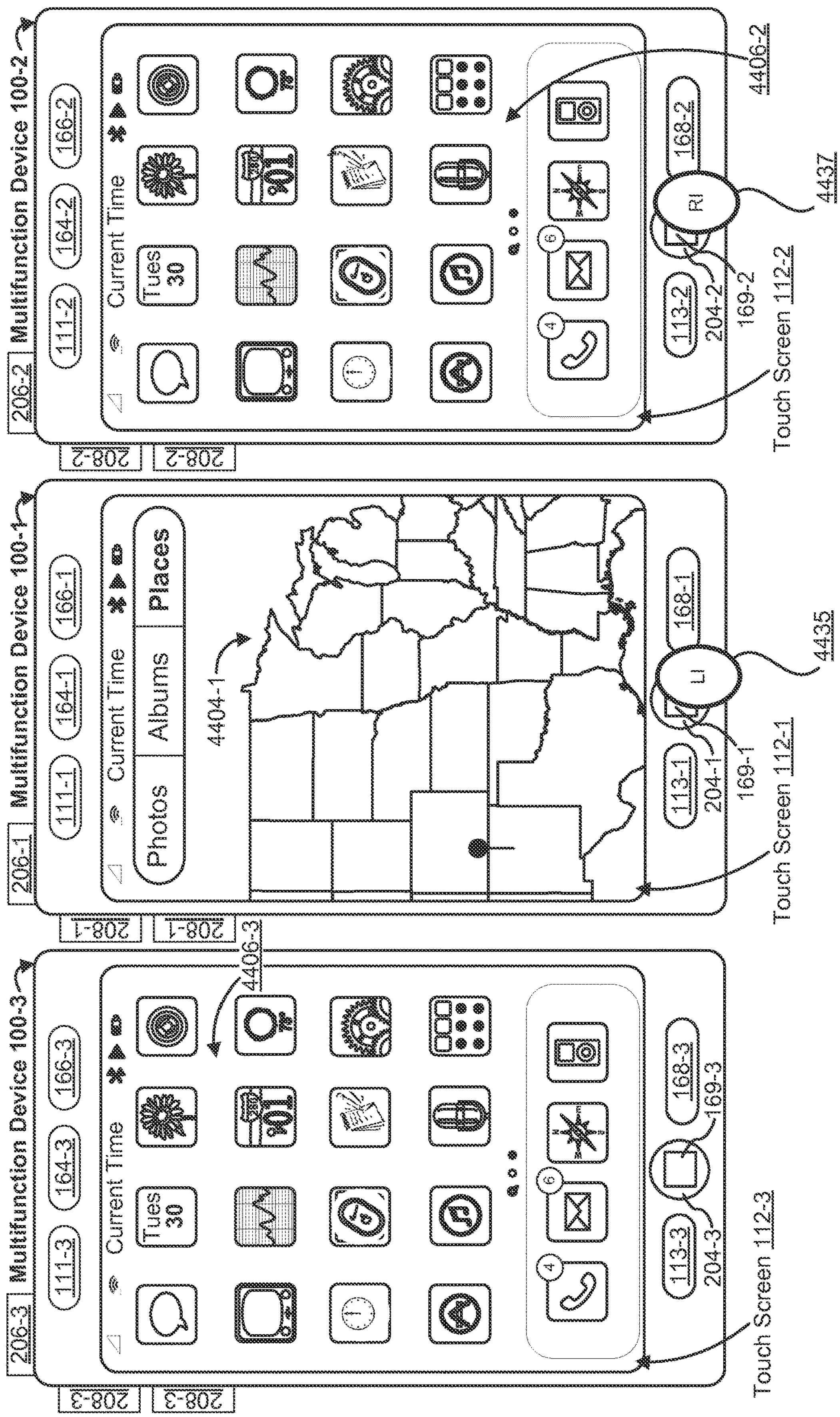
Figure 44L:
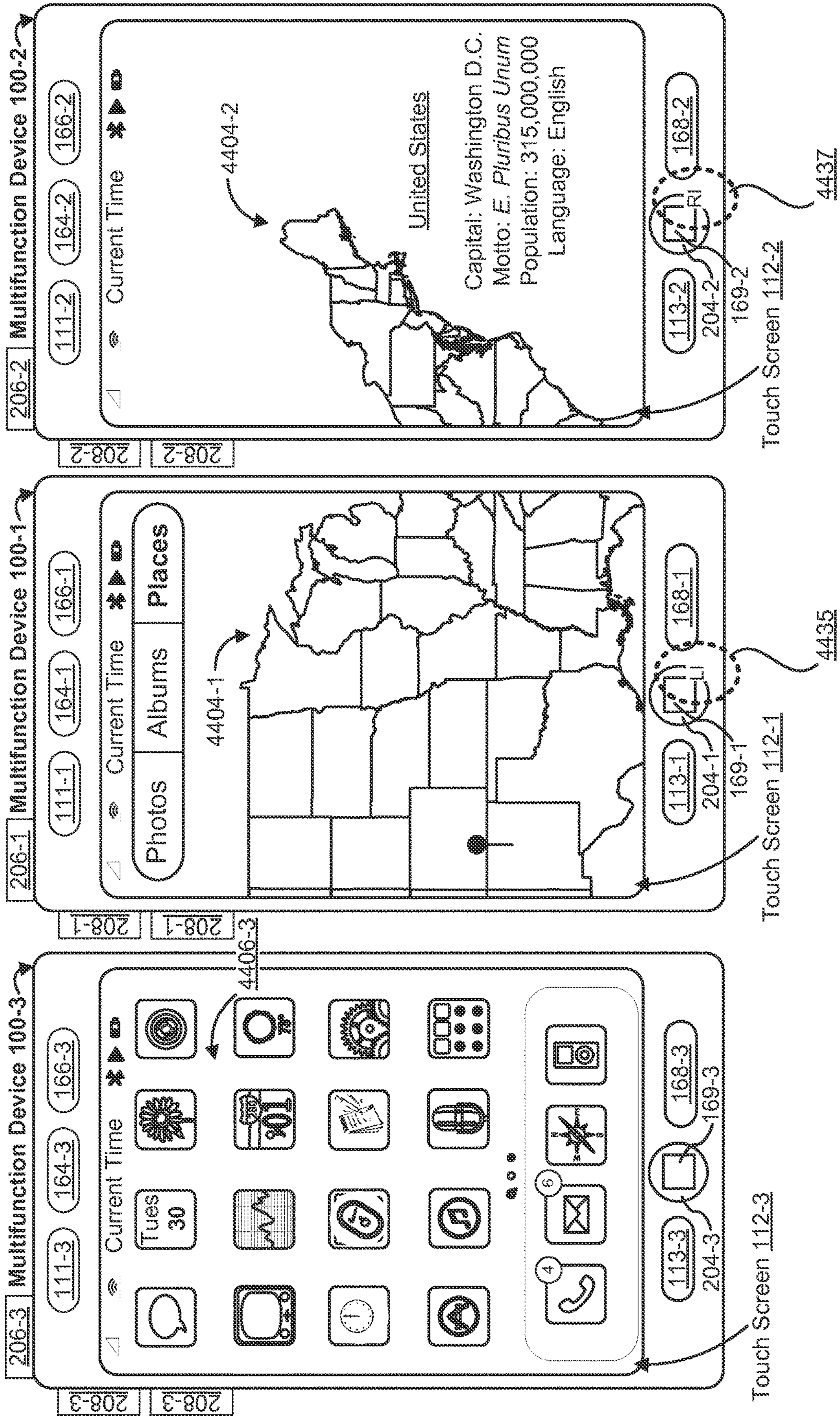
Figure 44M:
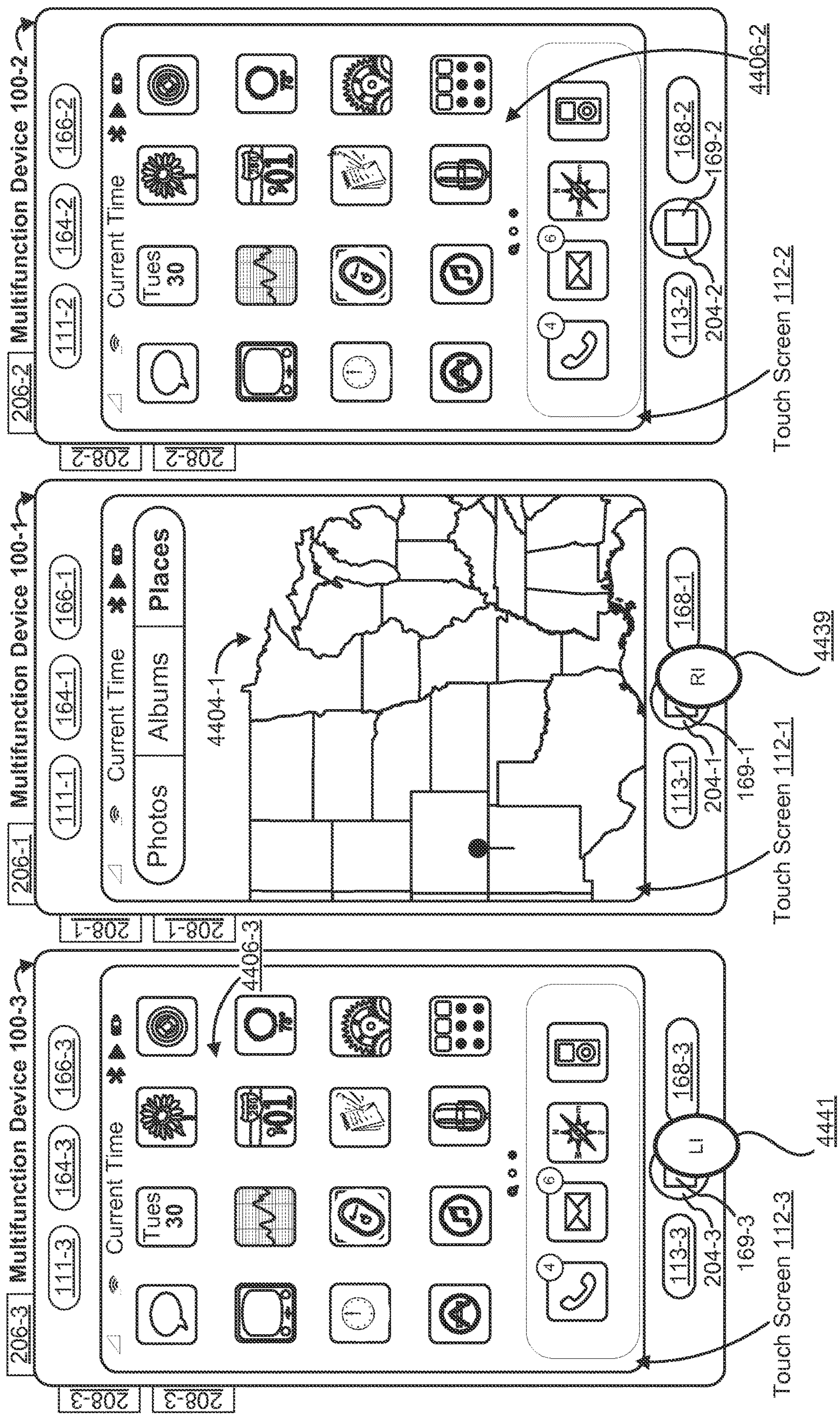
Figure 44N:
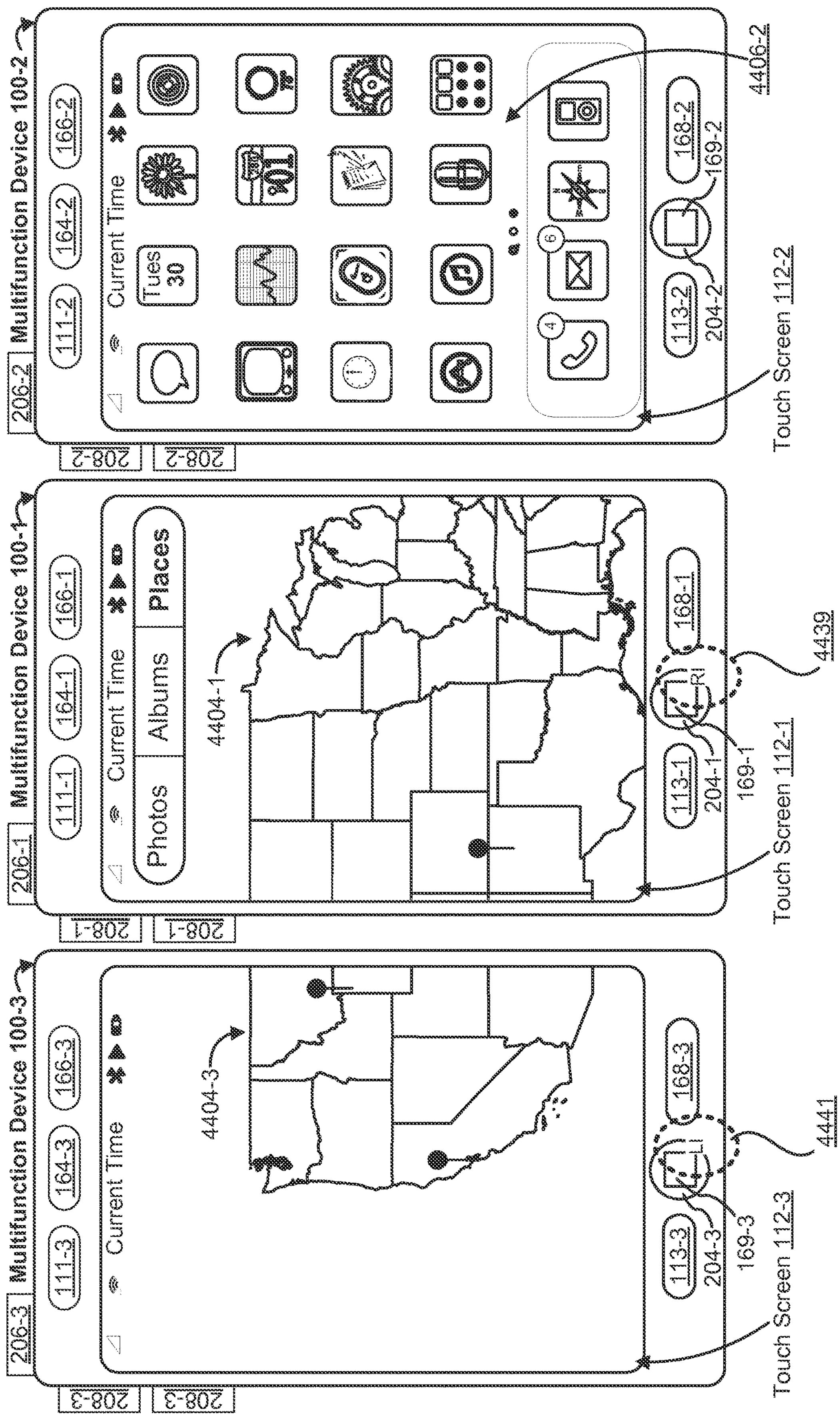

In some embodiments, as illustrated in FIGS. 44K-44N, the hand from which the finger corresponding to second fingerprint (e.g., fingerprint 4437 in FIGS. 44K-44L or fingerprint 4441 in FIGS. 44M-44M) belongs determines the direction in which the user interface is expanded with the auxiliary display. For example, in FIG. 44K, fingerprint 4435, corresponding to the user's left index (LI) finger, is detected by fingerprint sensor 169-1 on first multifunction device 100-1. Fingerprint 4437, corresponding to the user's right index (RI) finger, is detected by fingerprint sensor 169-2 on second multifunction device 100-2. In response, as illustrated in FIG. 44L, when predefined criteria are otherwise met by the detection of fingerprints 4435 and 4437, the first user interface displayed on touch screen 112-1 of multifunction device 100-1 is extended to the right onto touch screen 112-2 of multifunction device 100-2, such that map 4404 of the United States is displayed on touch screens 112 of both multifunction devices (e.g., the central United States is displayed as map 4404-1 on touch screen 112-1 of multifunction device 100-1 and the eastern seaboard of the United States is displayed as map 4404-2 on touch screen 112-2 of multifunction device 100-2), because the right index finger is located on the user's right hand. Similarly, as illustrated in FIG. 44M, fingerprint 4439, corresponding to the user's right index (RI) finger, is detected by fingerprint sensor 169-1 on first multifunction device 100-1. Fingerprint 4441, corresponding to the user's left index (LI) finger, is detected by fingerprint sensor 169-3 on second multifunction device 100-3. In response, as illustrated in FIG. 44N, when predefined criteria are otherwise met by the detection of fingerprints 4439 and 4441, the first user interface displayed on touch screen 112-1 of multifunction device 100-1 is extended to the left onto touch screen 112-3 of multifunction device 100-3, such that map 4404 of the United States is displayed on touch screens 112 of both multifunction devices (e.g., the central United States is displayed as map 4404-1 on touch screen 112-1 of multifunction device 100-1 and the west coast of the United States is displayed as map 4404-3 on touch screen 112-3 of multifunction device 100-3), because the left index finger is located on the user's left hand.

Figure 44O:
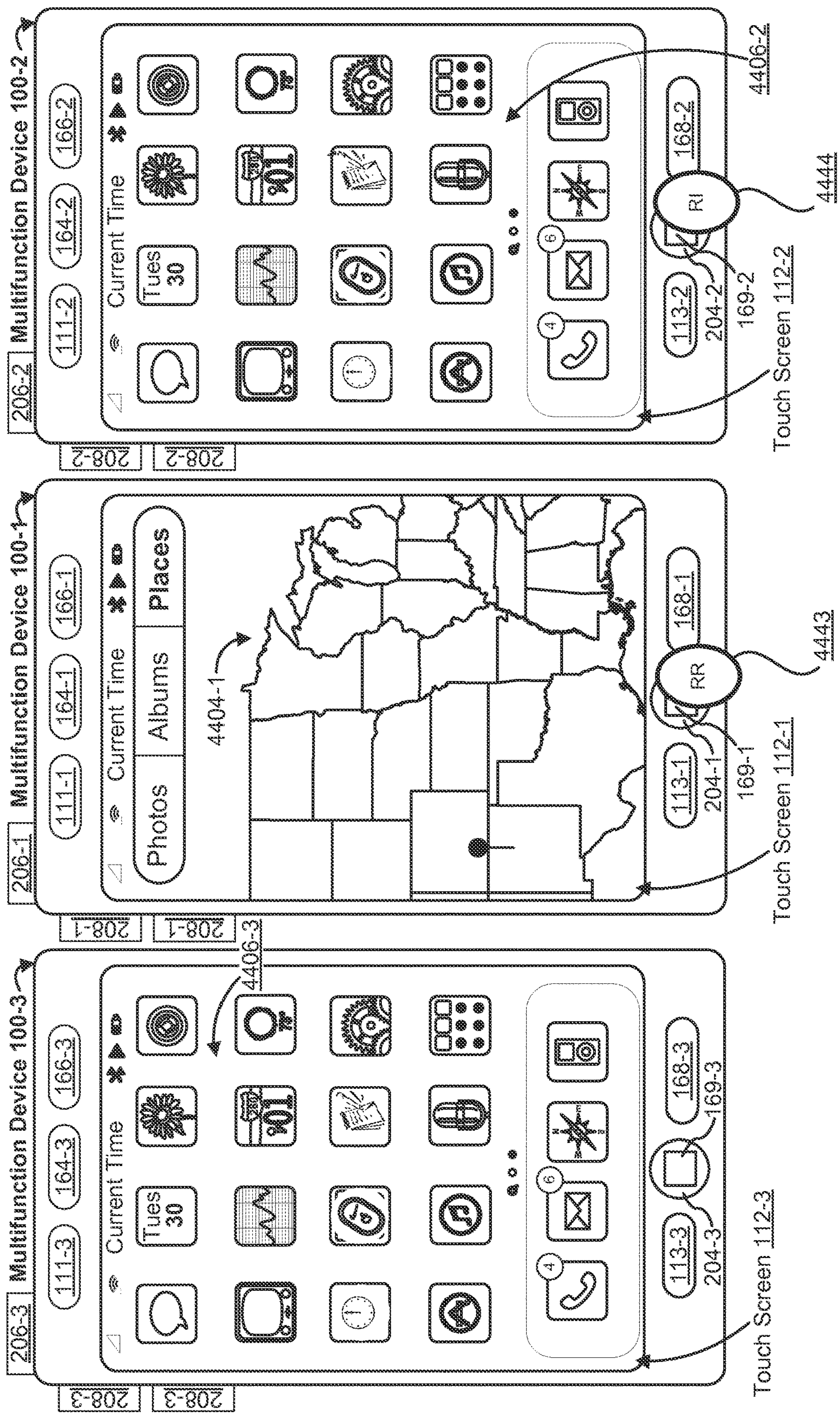
Figure 44P:
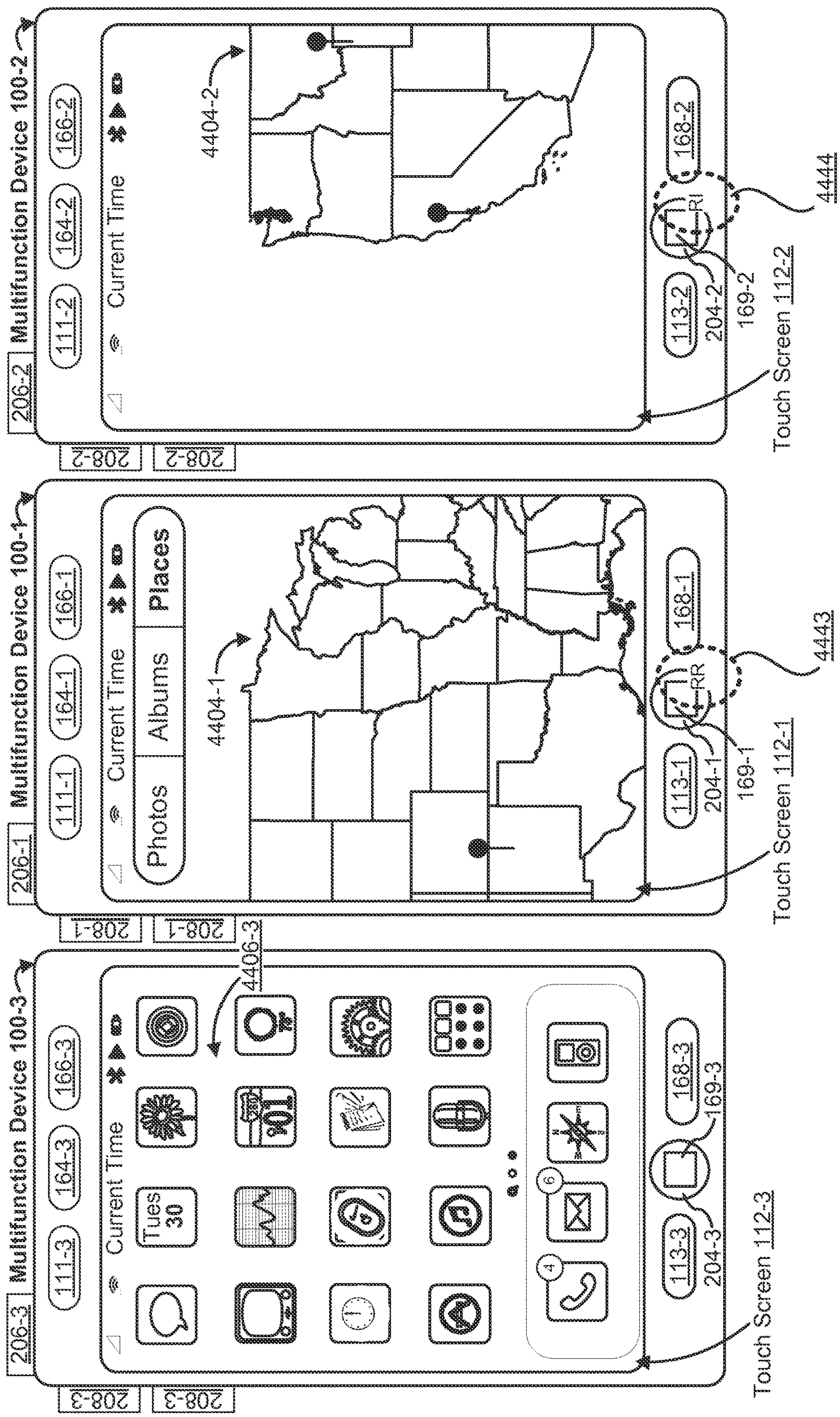

In some embodiments, as illustrated in FIGS. 44O-44P, the order on the user's hands, of the finger corresponding to the second fingerprint (e.g., fingerprint 4444) relative to the finger corresponding to the first fingerprint (e.g., fingerprint 4443) determines the direction in which the user interface is expanded with the auxiliary display. For example, in FIG. 44O, fingerprint 4443, corresponding to the user's right ring (RR) finger, is detected by fingerprint sensor 169-1 on first multifunction device 100-1. Fingerprint 4444, corresponding to the user's right index (RI) finger, is detected by fingerprint sensor 169-2 on second multifunction device 100-2. In response, as illustrated in FIG. 44P, when predefined criteria are otherwise met by the detection of fingerprints 4443 and 4444, the first user interface displayed on touch screen 112-1 of multifunction device 100-1 is extended to the left onto touch screen 112-2 of multifunction device 100-2, such that map 4404 of the United States is displayed on touch screens 112 of both multifunction devices (e.g., the central United States is displayed as map 4404-1 on touch screen 112-1 of multifunction device 100-1 and the west coast of the United States is displayed as map 4404-2 on touch screen 112-2 of multifunction device 100-2), because the right index finger is located to the user's left of the right ring finger on the user's hands.

Figure 44Q:
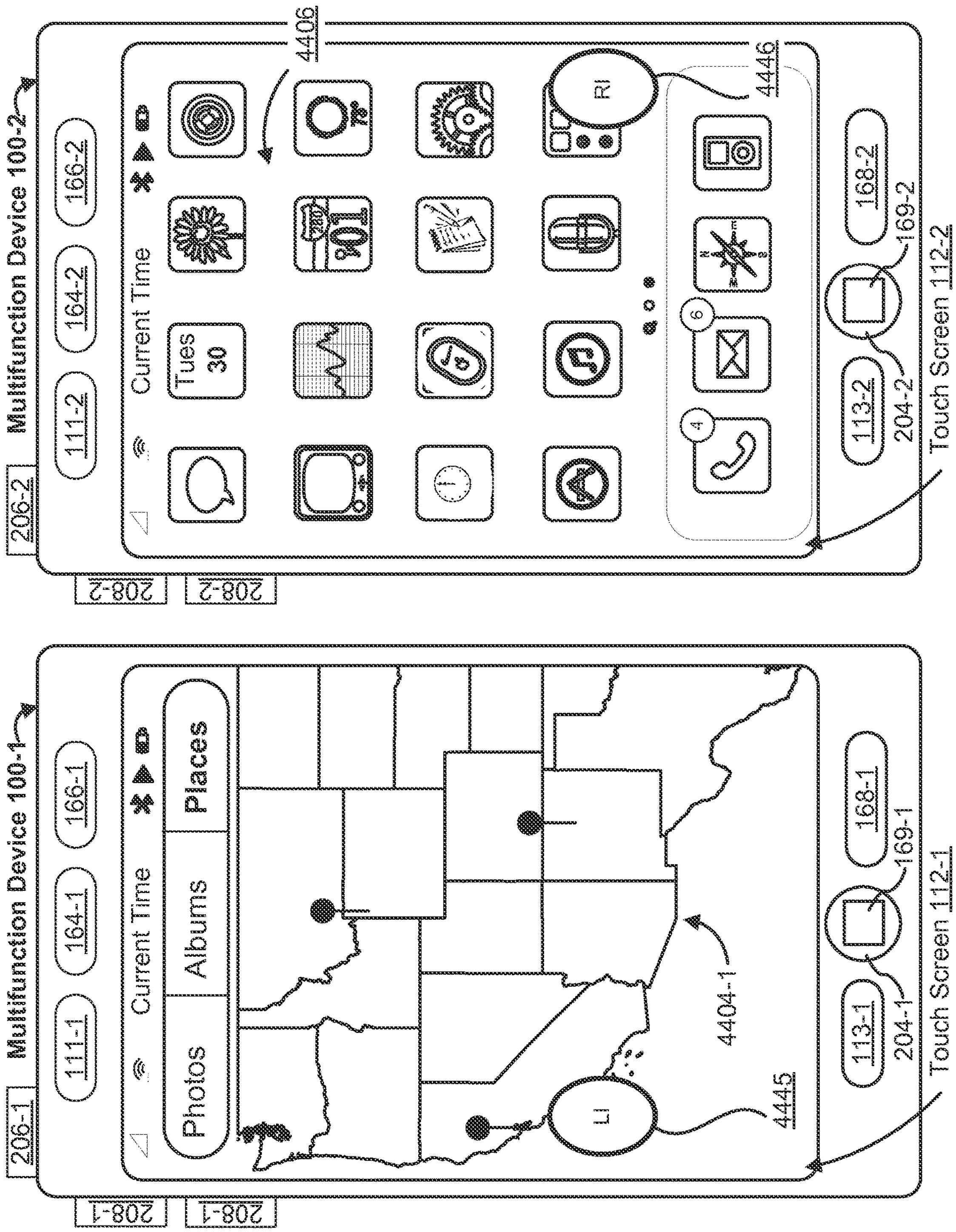

FIGS. 44Q-44EE illustrate two electronic devices (e.g., multifunction devices 100-1 and 100-2), each having a touch screen 112 with a spatial resolution that is high enough to detect fingerprint features formed by individual fingerprint ridges, allowing them to be used as fingerprint sensors. Multifunction devices 100-1 and 100-2 are also illustrated as having separate fingerprint sensors 169. In some embodiments, each of multifunction devices 100-1 and 100-2 independently have a touch screen 112 that can be used as a fingerprint sensor, a separate fingerprint sensor 169, or both. In FIGS. 44Q-44T, various embodiments are illustrated where second multifunction device 100-2, while configured as an auxiliary display for first multifunction device 100-1, displays a set of user interface elements associated with an application that is active on first multifunction device 100-1.

Figure 44R:
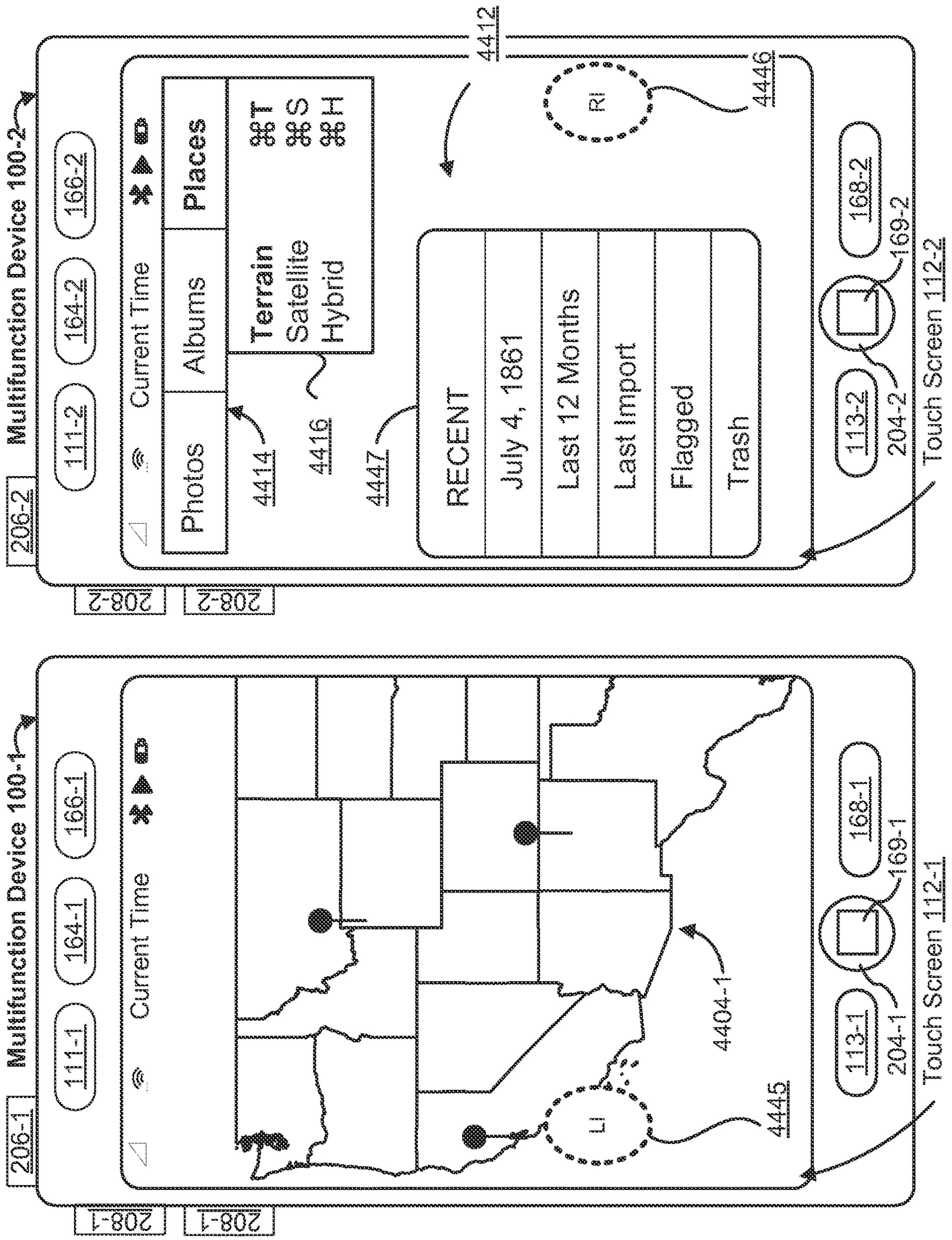

In FIG. 44Q, multifunction device 100-1 displays a first user interface that includes map 4404-1 of the United States, corresponding to an active photo display application. Multifunction device 100-2 displays a second user interface including application launch screen 4406. Upon detection of qualifying fingerprints 4445 and 4446 (e.g., fingerprints that meet the predefined auxiliary-display criteria), second multifunction device 100-2 is configured as an auxiliary display for first multifunction device 100-1. As illustrated in FIG. 44R, while configured as an auxiliary display, touch screen 112-2 of multifunction device 100-2 displays user interface elements 4414, 4416, and 4447 that are associated with the photo display application active on first multifunction device 100-1 (e.g., toolbars 4414 and 4447 and drop-down menu 4416).

Figure 44S:
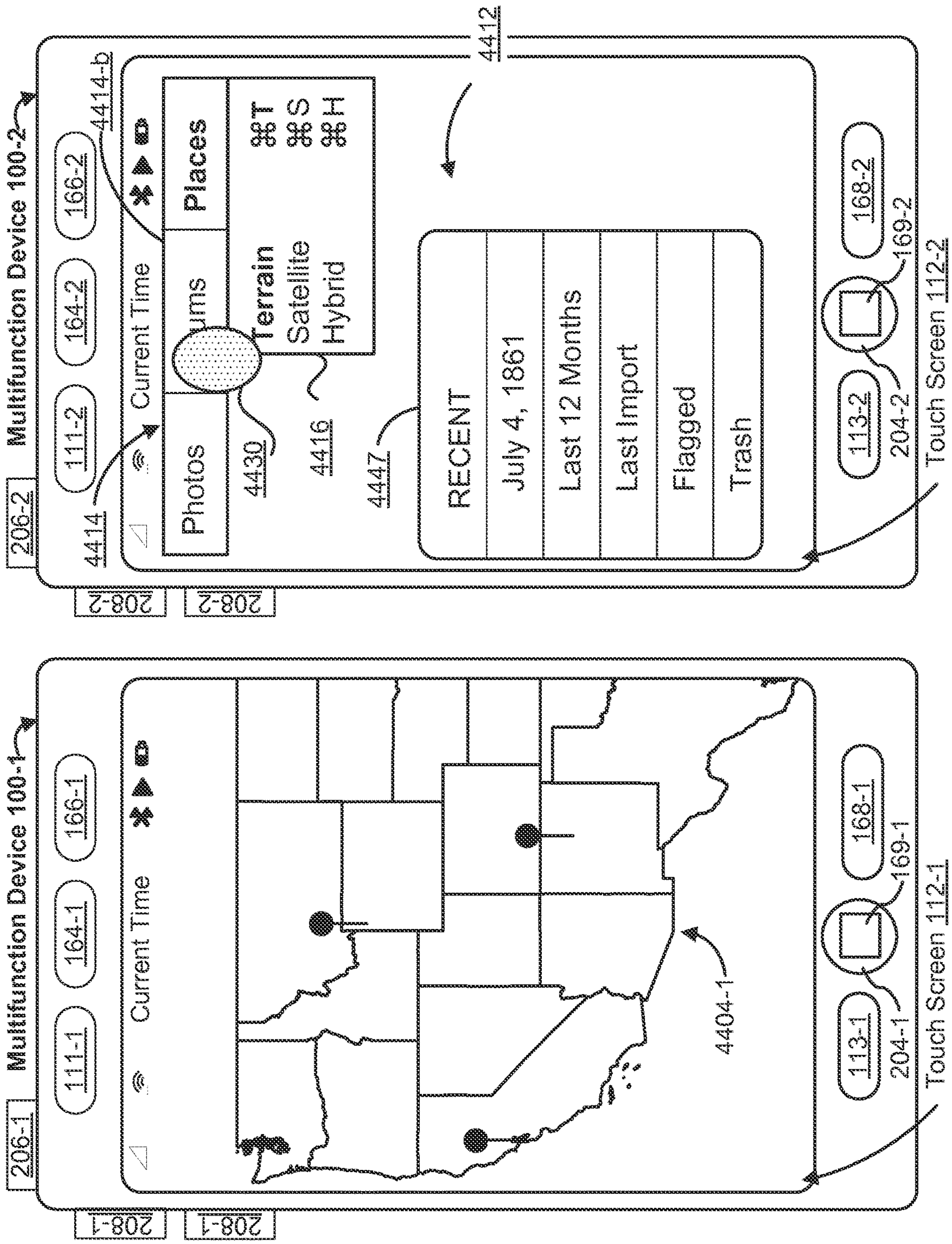
Figure 44T:
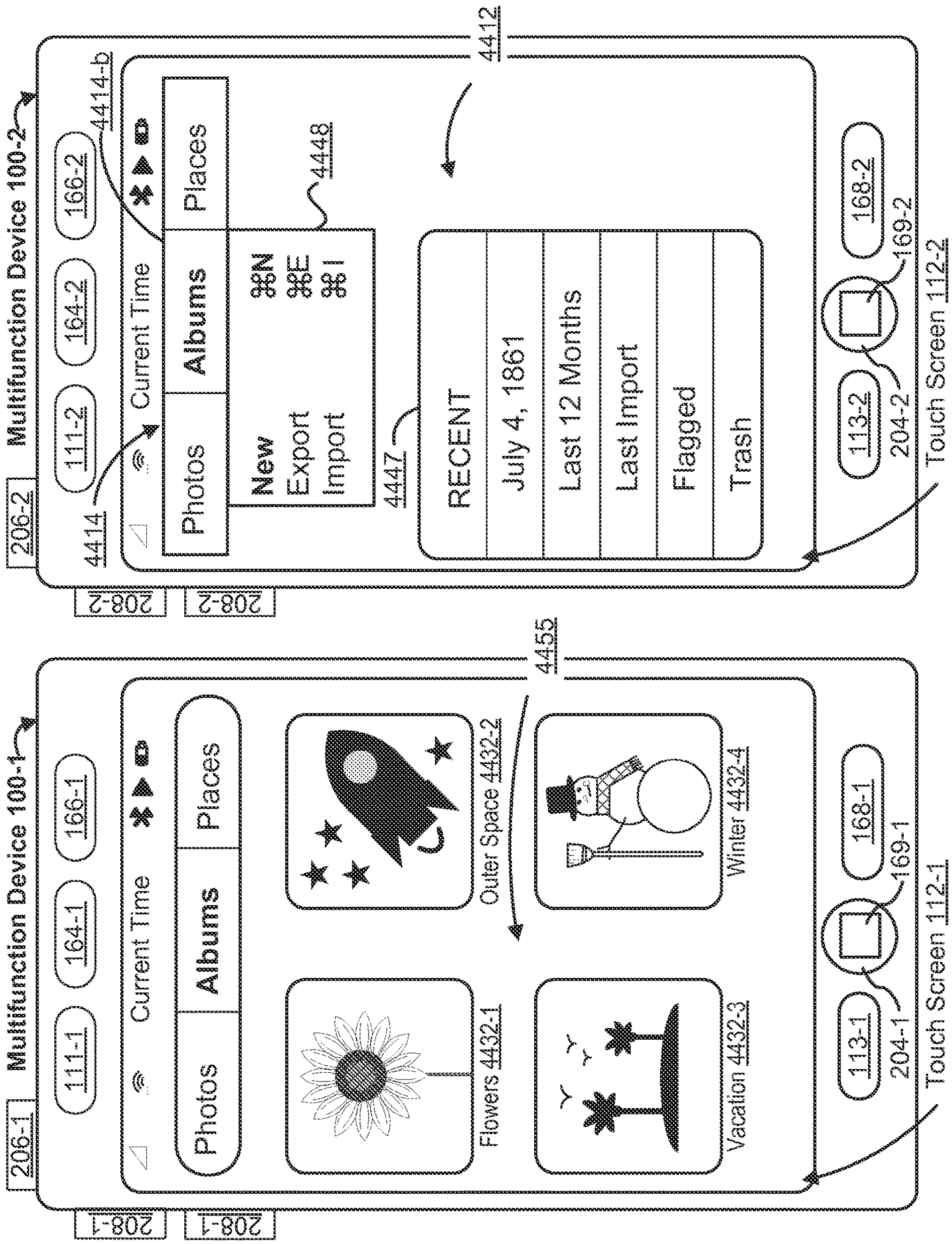

In some embodiments, as illustrated in FIGS. 44S-44T, the user interface elements displayed on the auxiliary display are controls for performing operations in the application active on the first display. In FIG. 44S, second multifunction device 100-2, configured as an auxiliary display for first multifunction device 100-1, detects contact 4430 at a position on touch screen 112-2 corresponding to a control for displaying photo albums (e.g., user interface menu element 4414-*b*) in the photo display application active on multifunction device 100-1. In response to detecting contact 4430 on second multifunction device 100-2, the user interface displayed on touch screen 112-1 of first multifunction device 100-1 is changed from displaying map 4404-1 of the United States to displaying launch icons 4432 for photo albums (e.g., icons representing photo albums “Flowers” 4432-1, “Outer Space” 4432-2, “Vacation” 4432-3, and “Winter” 4432-4), as illustrated in FIG. 44T (e.g., the mode of the photo display application is changed from displaying locations where pictures were taken to displaying photo albums compiled by a user). Additionally, in response to detecting contact 4430 on second multifunction device 100-2, touch screen 112-2 of multifunction device 100-2, configured to as an auxiliary display for multifunction device 100-1, displays drop-down menu 4448 corresponding to controls for performing functions relating to the photo albums represented by launch icons 4432 displayed on touch screen 112-1 of multifunction device 100-1.

Figure 44U:
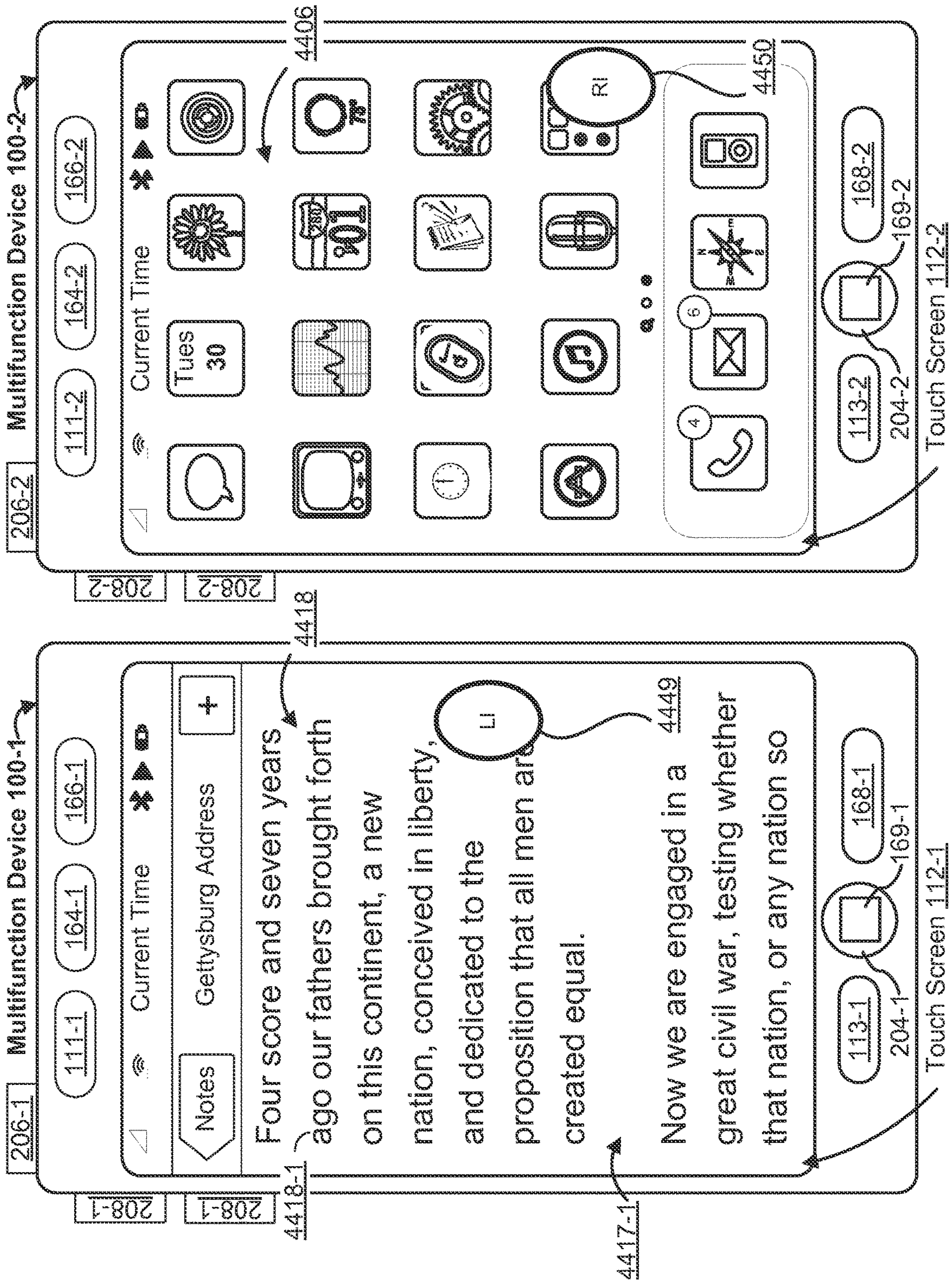
Figure 44V:
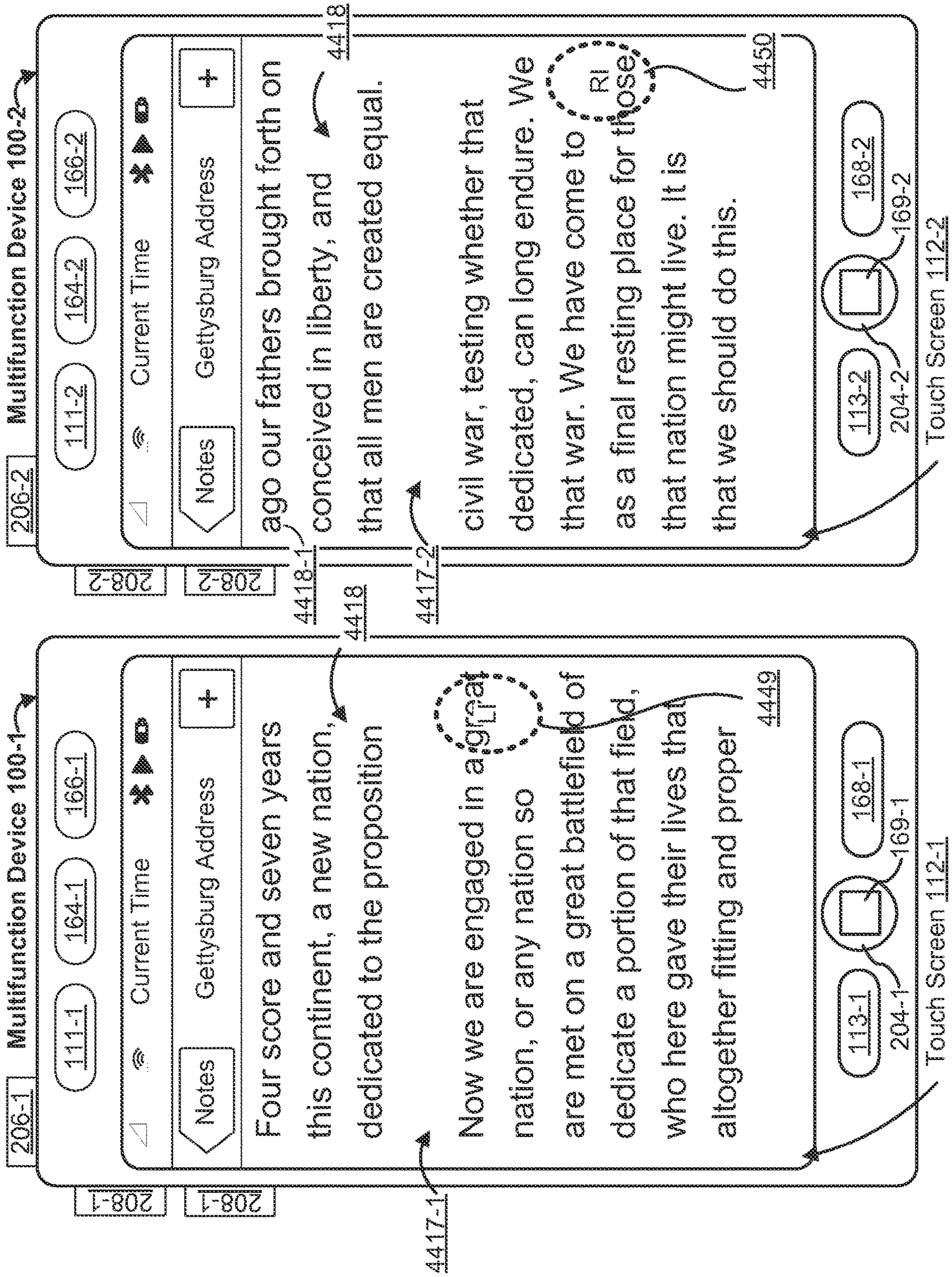

In some embodiments, as illustrated in FIGS. 44U-44V, the user interface elements displayed on the auxiliary display include a portion of a workspace that was expanded from the display of the first device. In FIG. 44U, multifunction device 100-1 displays a first user interface that includes workspace 4417-1 of an active word processing application. Multifunction device 100-2 displays a second user interface including application launch screen 4406. Upon detection of qualifying fingerprints 4449 and 4450 (e.g., fingerprints that meet the predefined auxiliary-display criteria), second multifunction device 100-2 is configured as an auxiliary display for first multifunction device 100-1. As illustrated in FIG. 44V, the first user interface is expanded with the auxiliary display to create a continuous workspace 4417 spanning touch screens 112 of multifunction devices 100-1 and 100-2. For example, when second multifunction device 100-2 is configured as an auxiliary display, the word “ago” (e.g., user interface object 4418-1), displayed on the second line of text 4418 on touch screen 112-1 of multifunction device 100-1 in FIG. 44U, moves onto line 1 of workspace 4417-2 (e.g., the portion of continuous workspace 4417 displayed on the auxiliary display) on touch screen 112-2 of second multifunction device 100-2 in FIG. 44V.

Figure 44W:
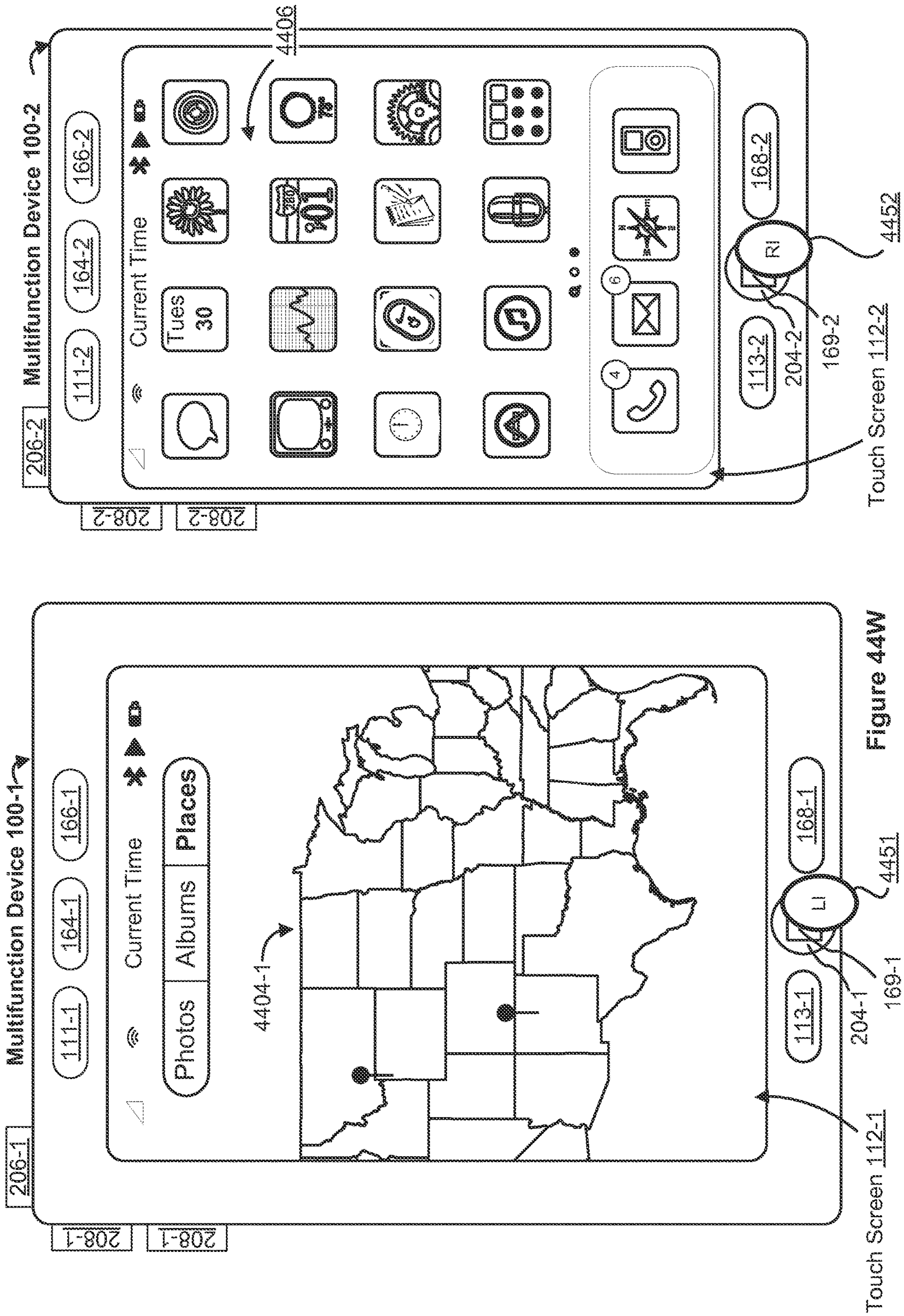
Figure 44X:
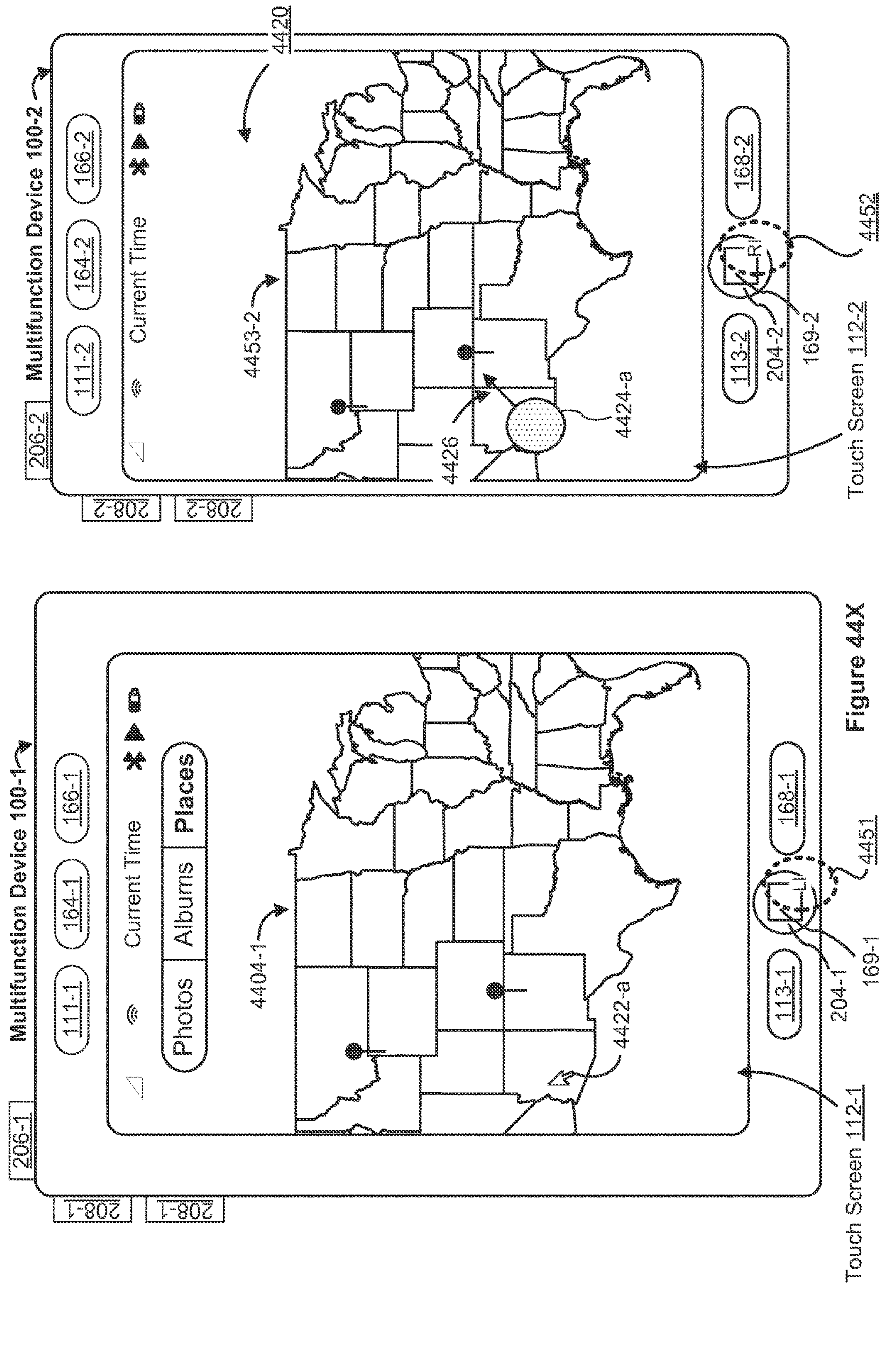
Figure 44Y:
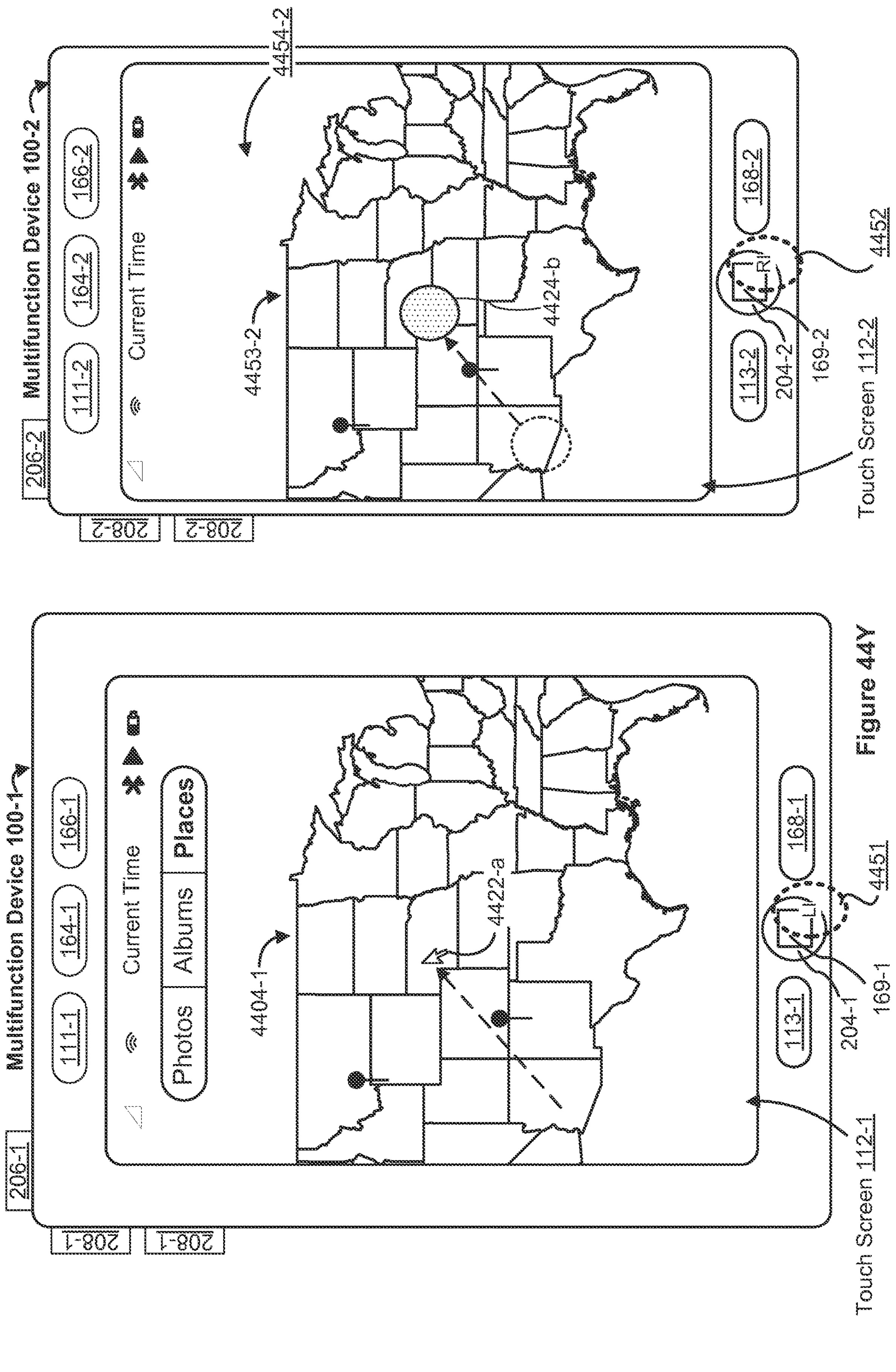

In some embodiments, as illustrated in FIGS. 44W-44Y, while the second electronic device is configured as an auxiliary display for the first electronic device, inputs corresponding to interactions with user interface elements are received by the second device and operations associated with an active application are performed on the first device. For example, in FIG. 44W, multifunction device 100-1 displays a first user interface that includes map 4404-1 of the United States, corresponding to an active photo display application. Multifunction device 100-2 displays a second user interface including application launch screen 4406. Upon detection of qualifying fingerprints 4451 and 4452 (e.g., fingerprints that meet the predefined auxiliary-display criteria), second multifunction device 100-2 is configured as an auxiliary display for first multifunction device 100-1. As illustrated in FIG. 44X, while configured as an auxiliary display, touch screen 112-2 of second multifunction device 100-2 displays user interface 4420, which includes the same view of the United States (e.g., as map 4453-2) as displayed on touch screen 112-1 of first multifunction device 100-1 (e.g., instead of extending the display of map 4404-1 on first multifunction device 100-1, second multifunction device 100-2 mirrors the display of first multifunction device 100-1). Second multifunction device 100-2 detects a gesture including movement 4426 of contact 4424, corresponding to focus selector 4422 displayed on touch screen 112-1 of first multifunction device 100-1, from position 4424-*a* in FIG. 44X to position 4424-*b* in FIG. 44Y. In response, first multifunction device 100-1 displays movement of focus selector 4422 from position 4422-*a* in FIG. 44X to position 4422-*b* in FIG. 44Y.

Figure 44Z:
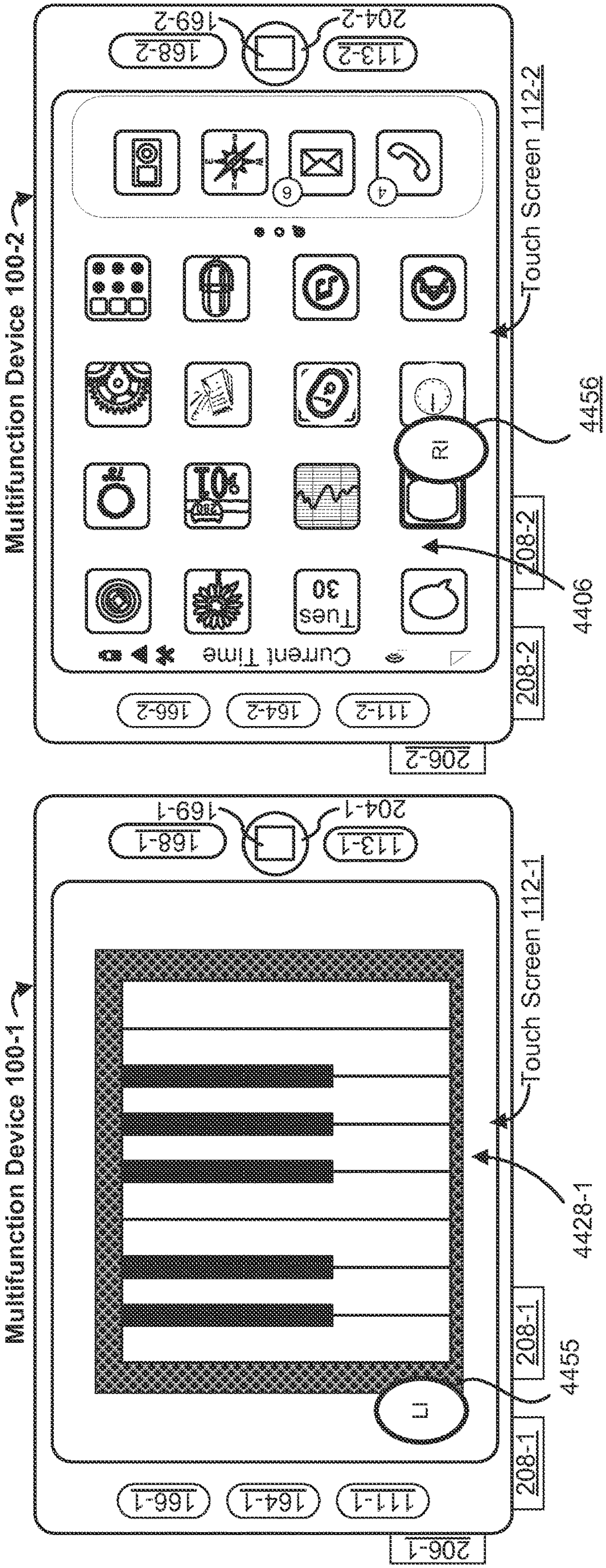
Figure 44A:
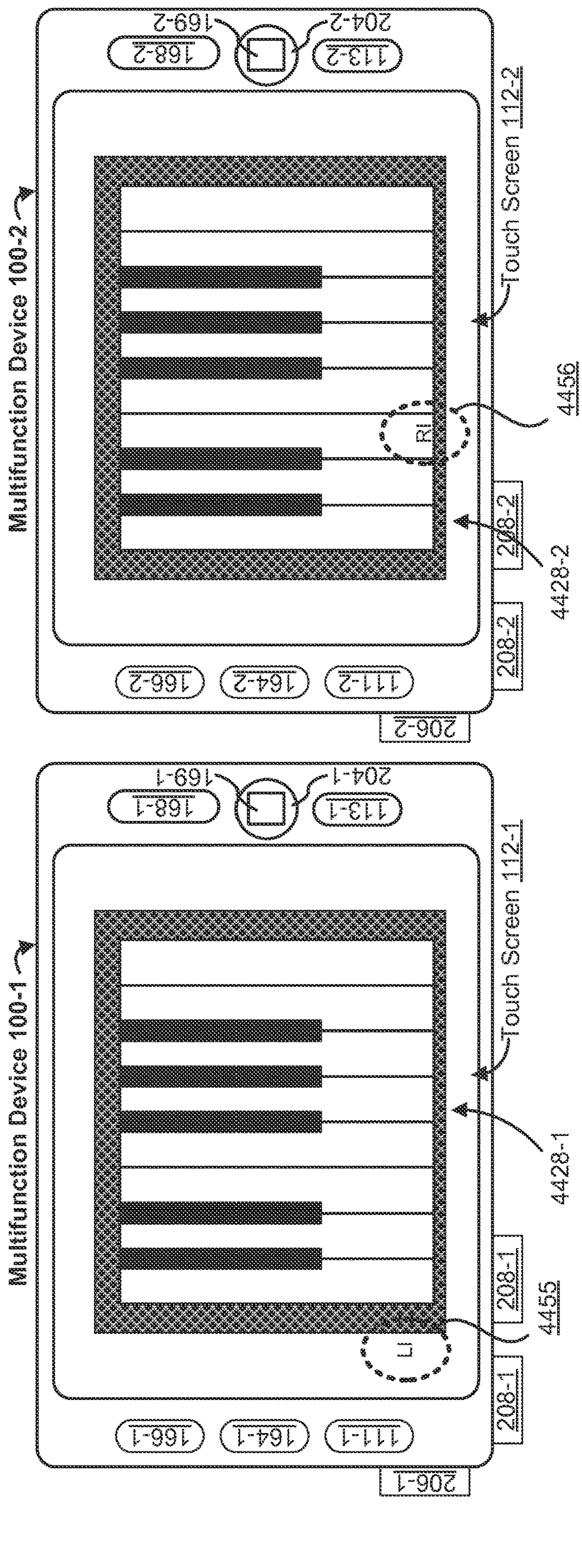
Figure 44B:
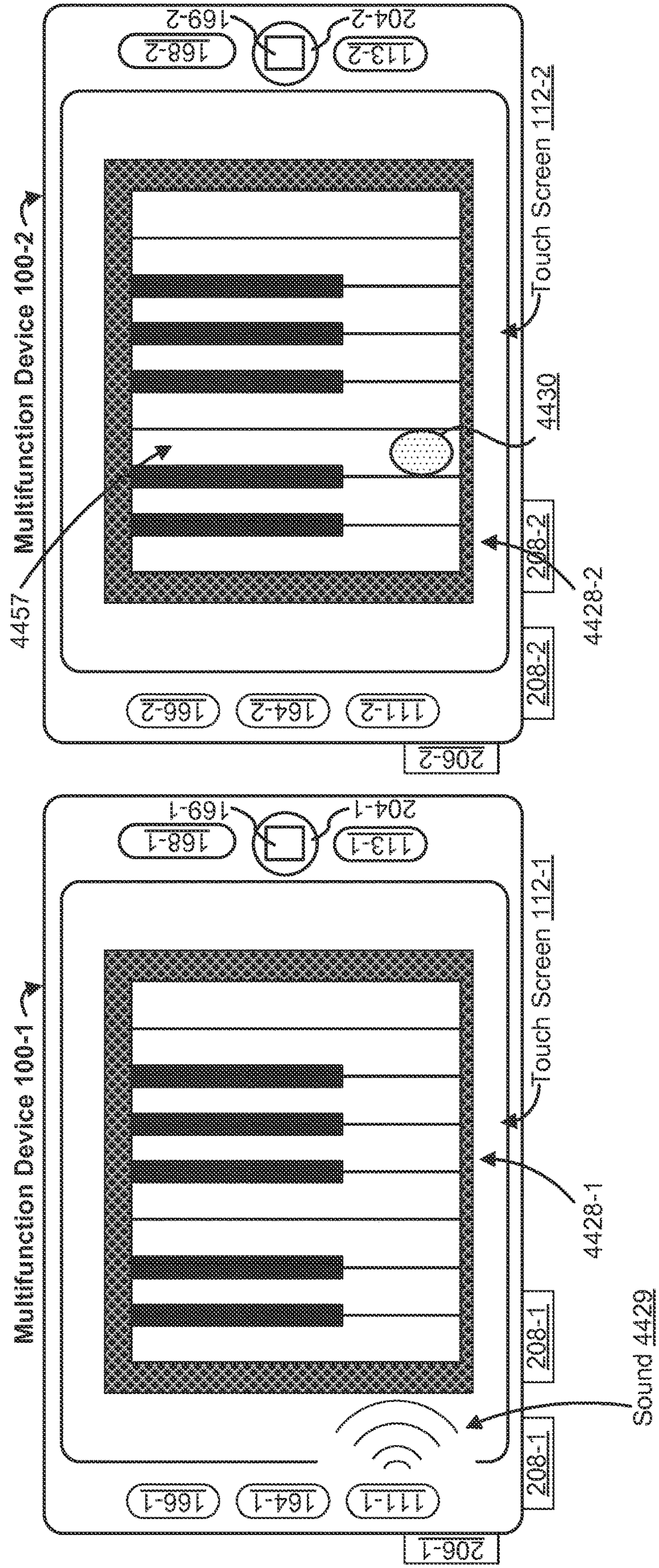
Figure 44C:
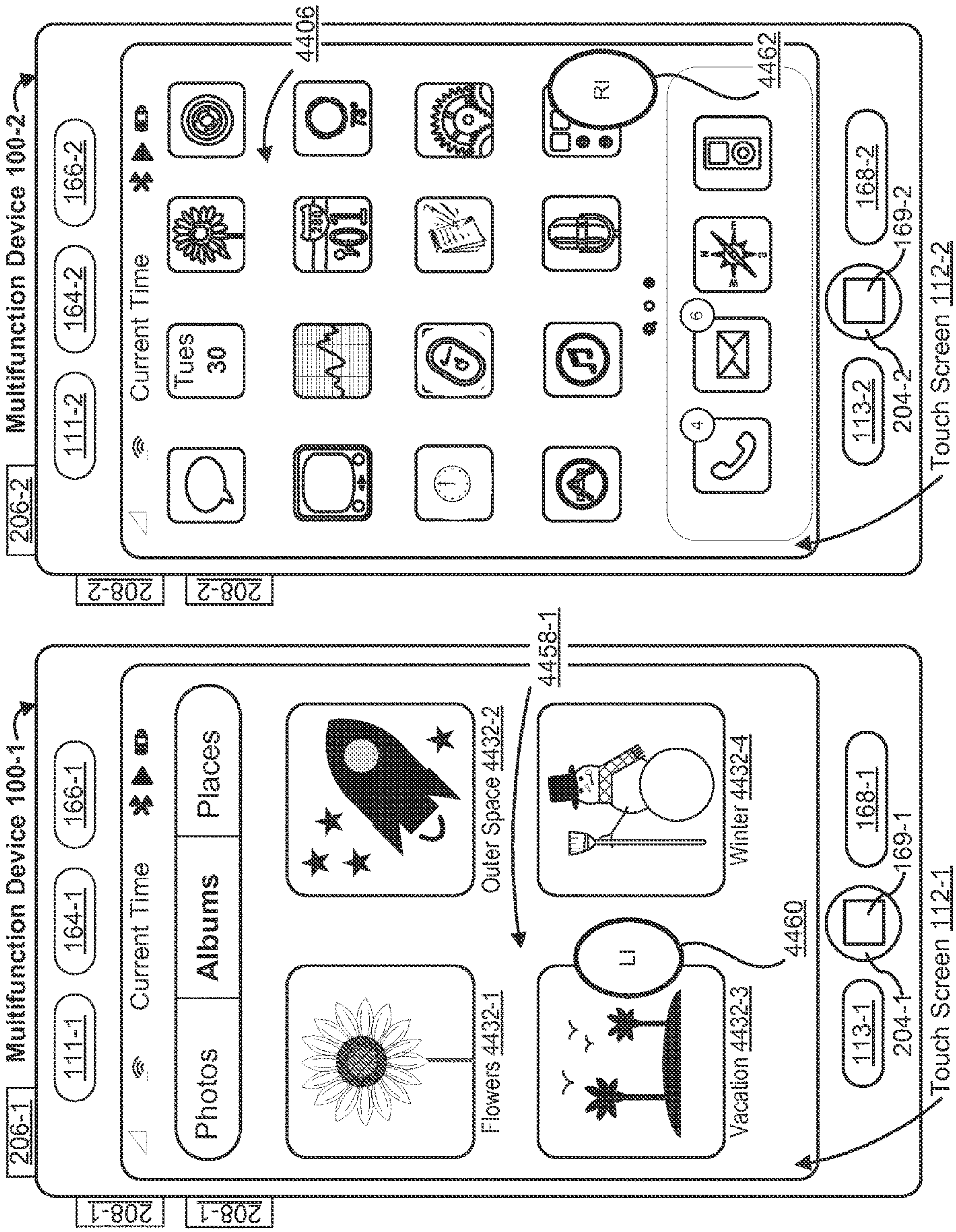
Figure 44D:
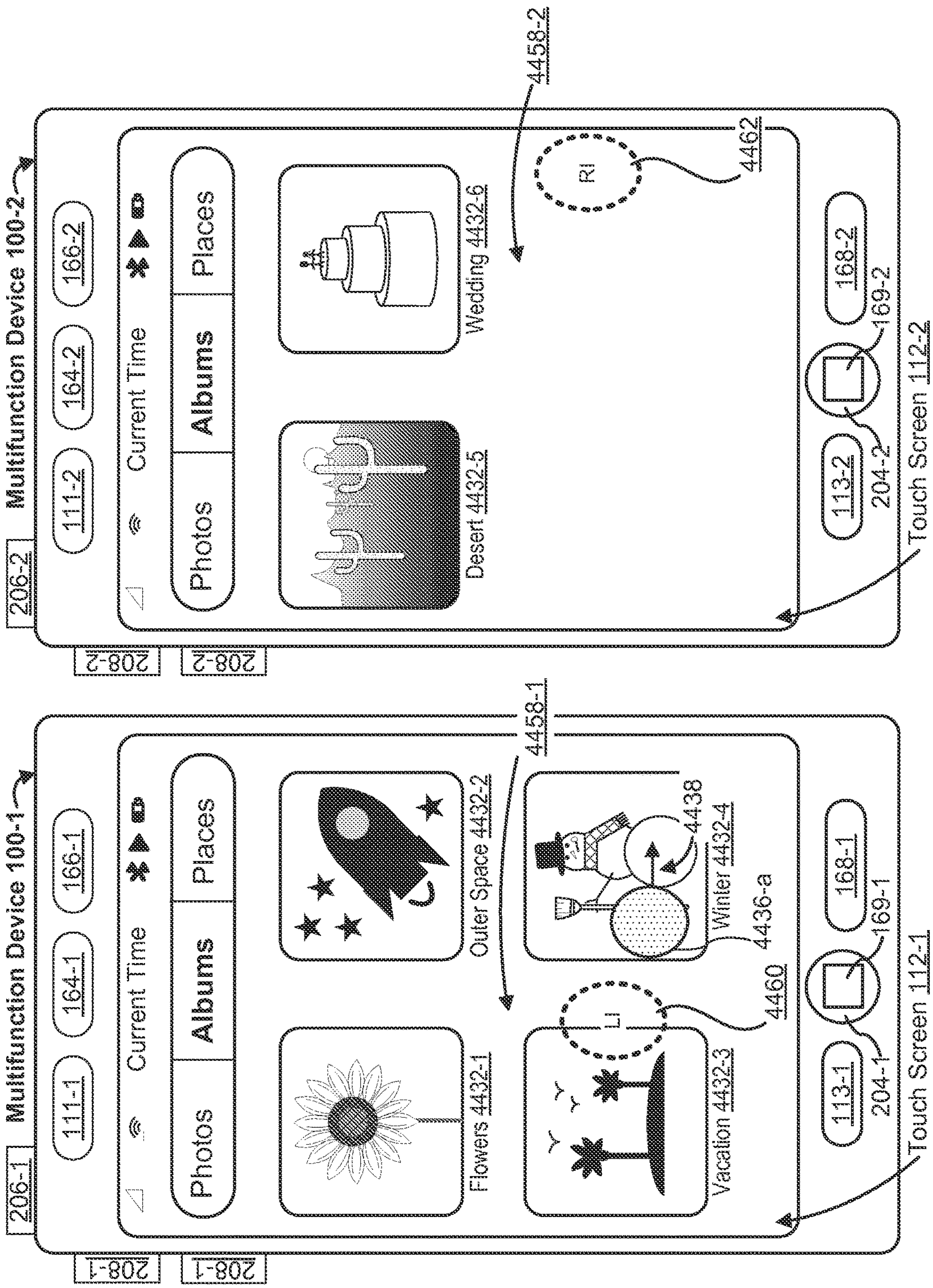
Figure 44E:
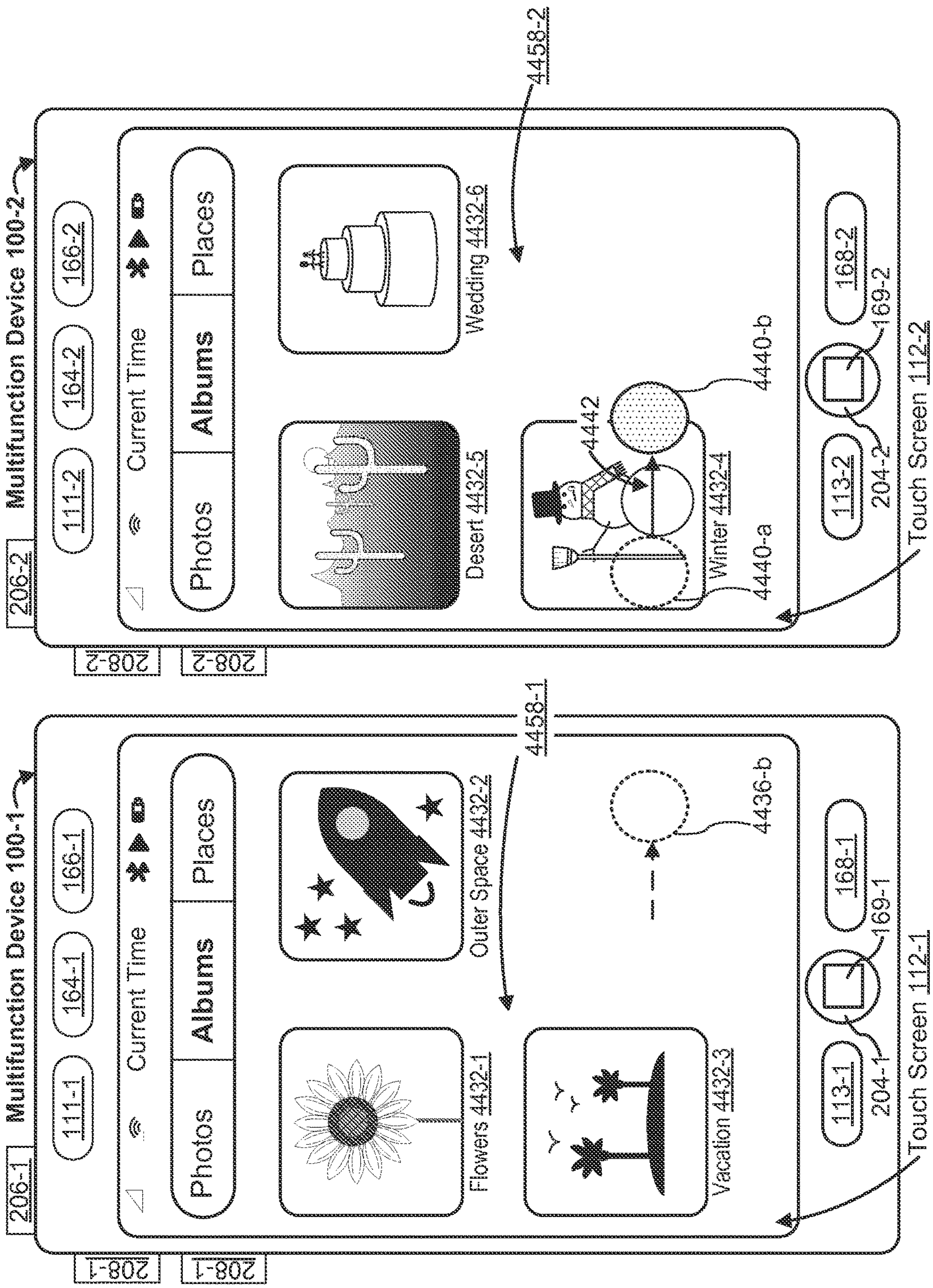
Figure 45A:
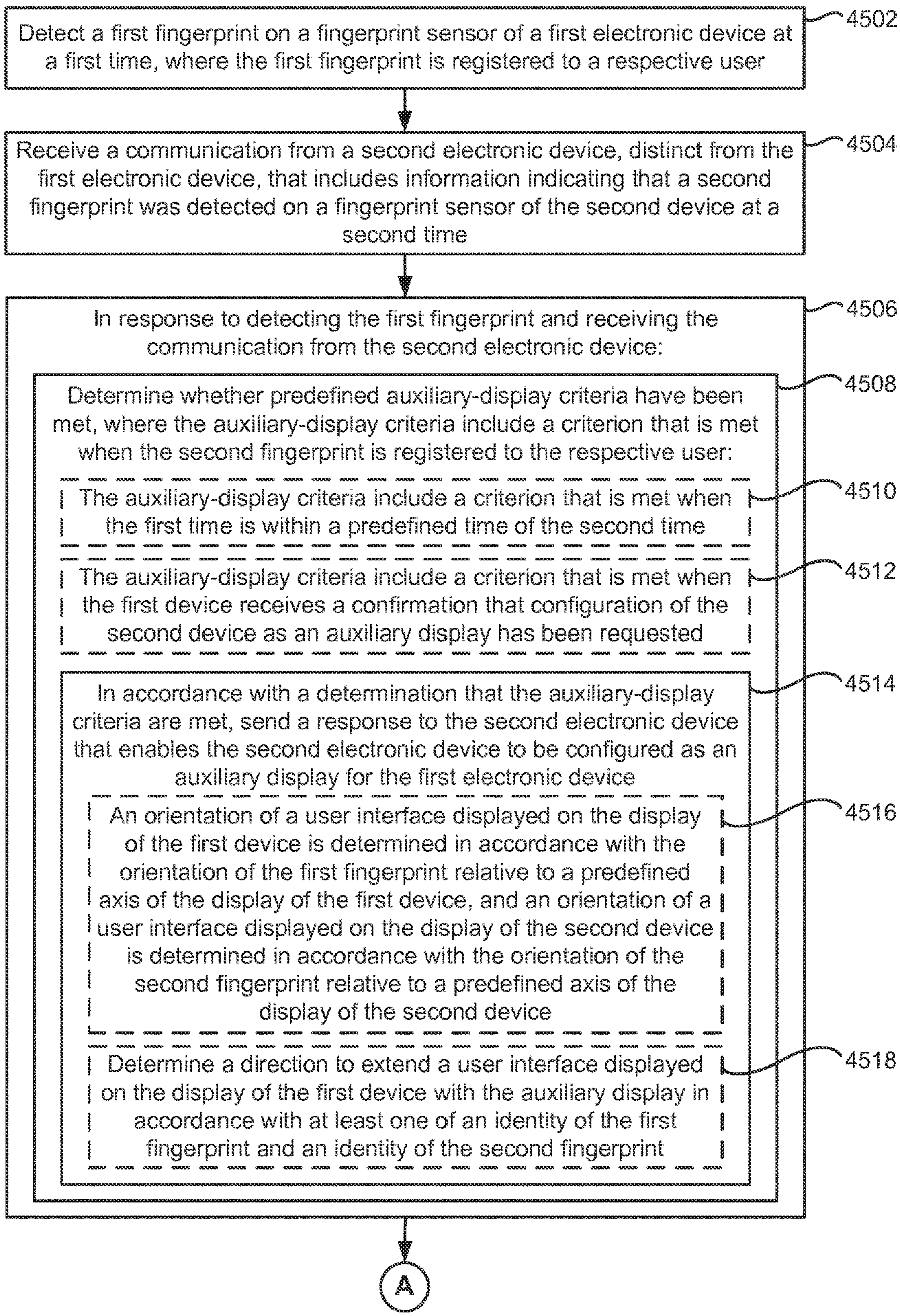
FIGS. 45A-45D are flow diagrams illustrating a method of configuring a second electronic device as an auxiliary display in accordance with some embodiments.
Figure 45B:
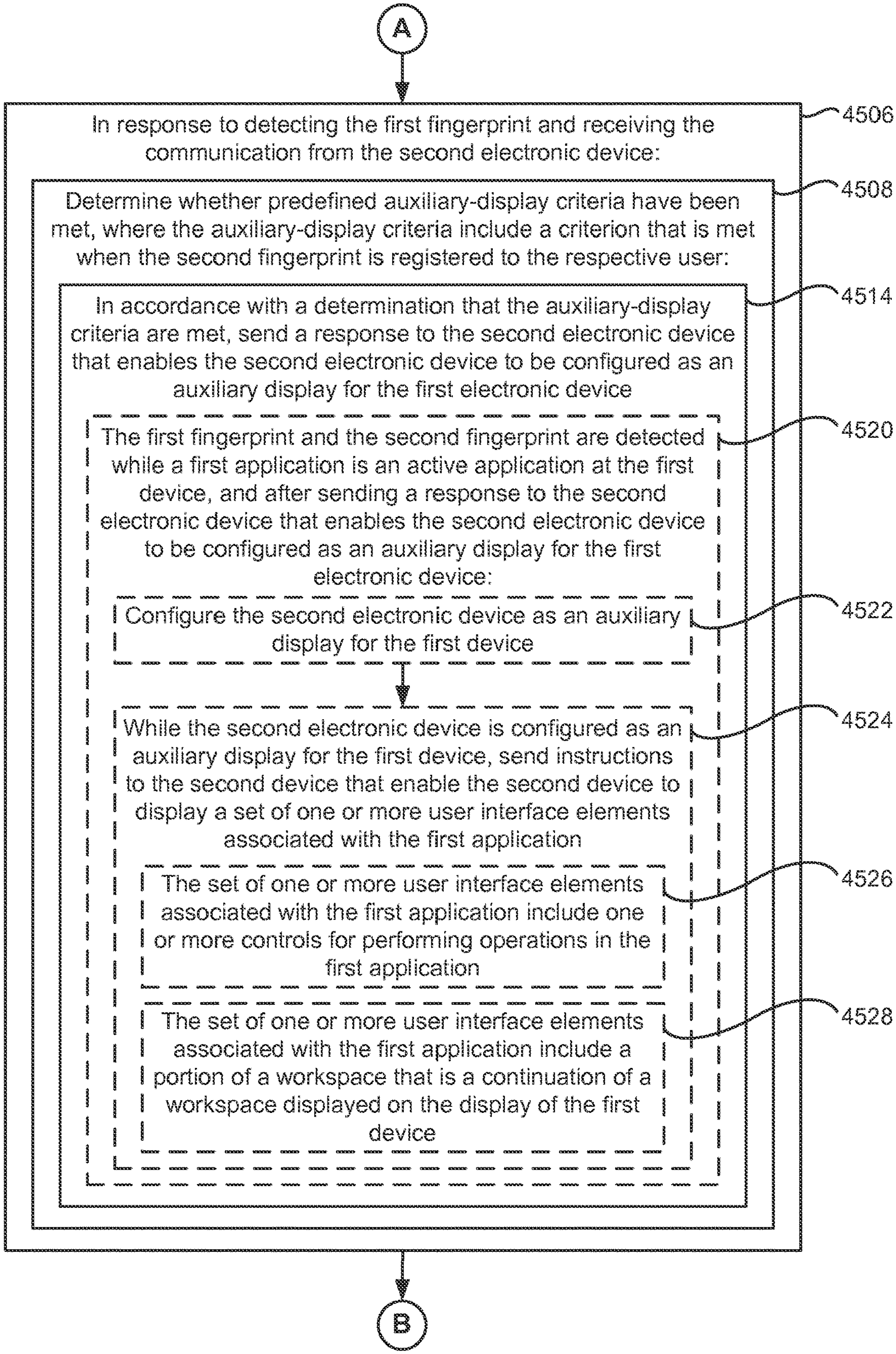
Figure 45C:
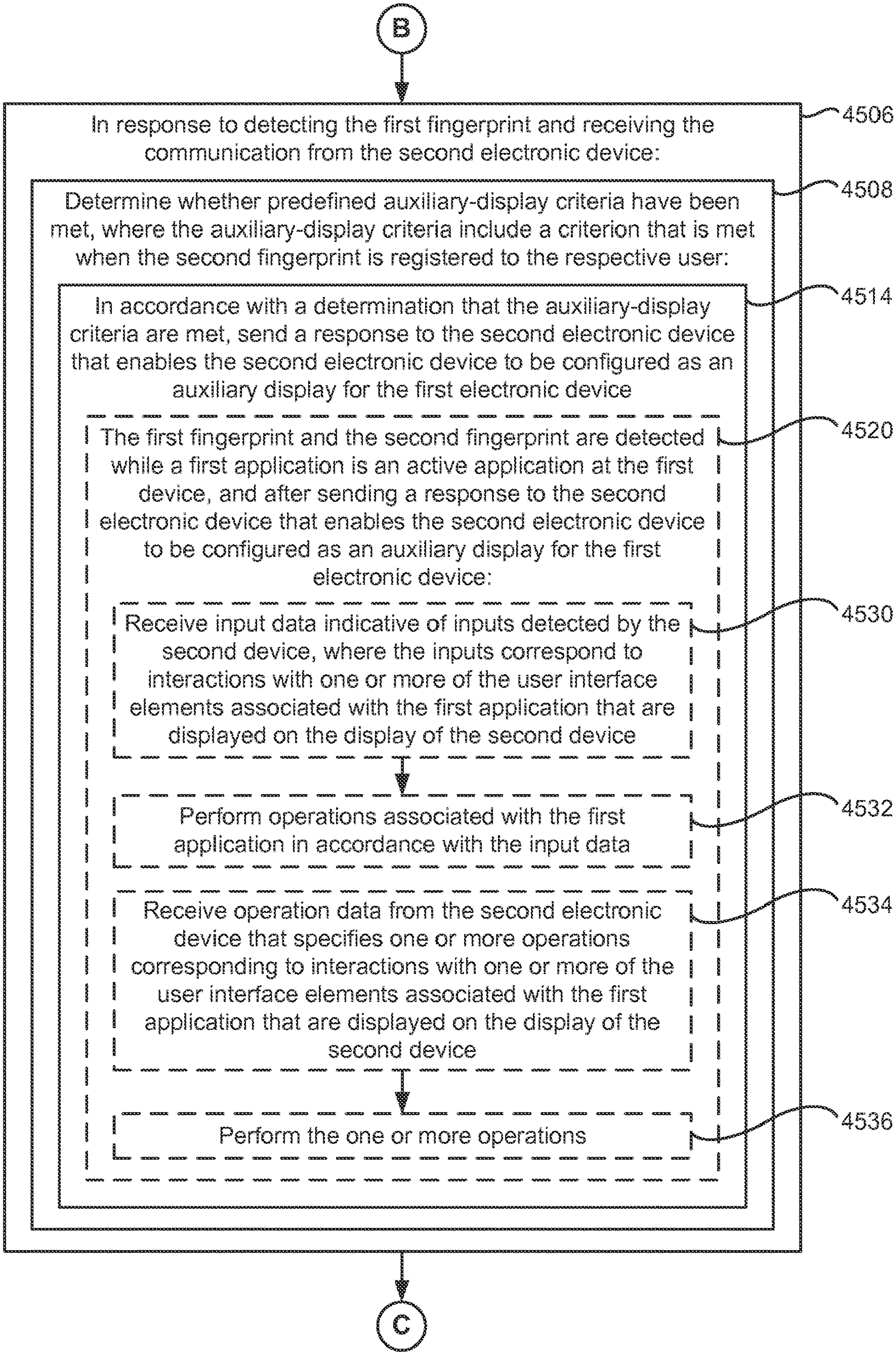
Figure 45D:
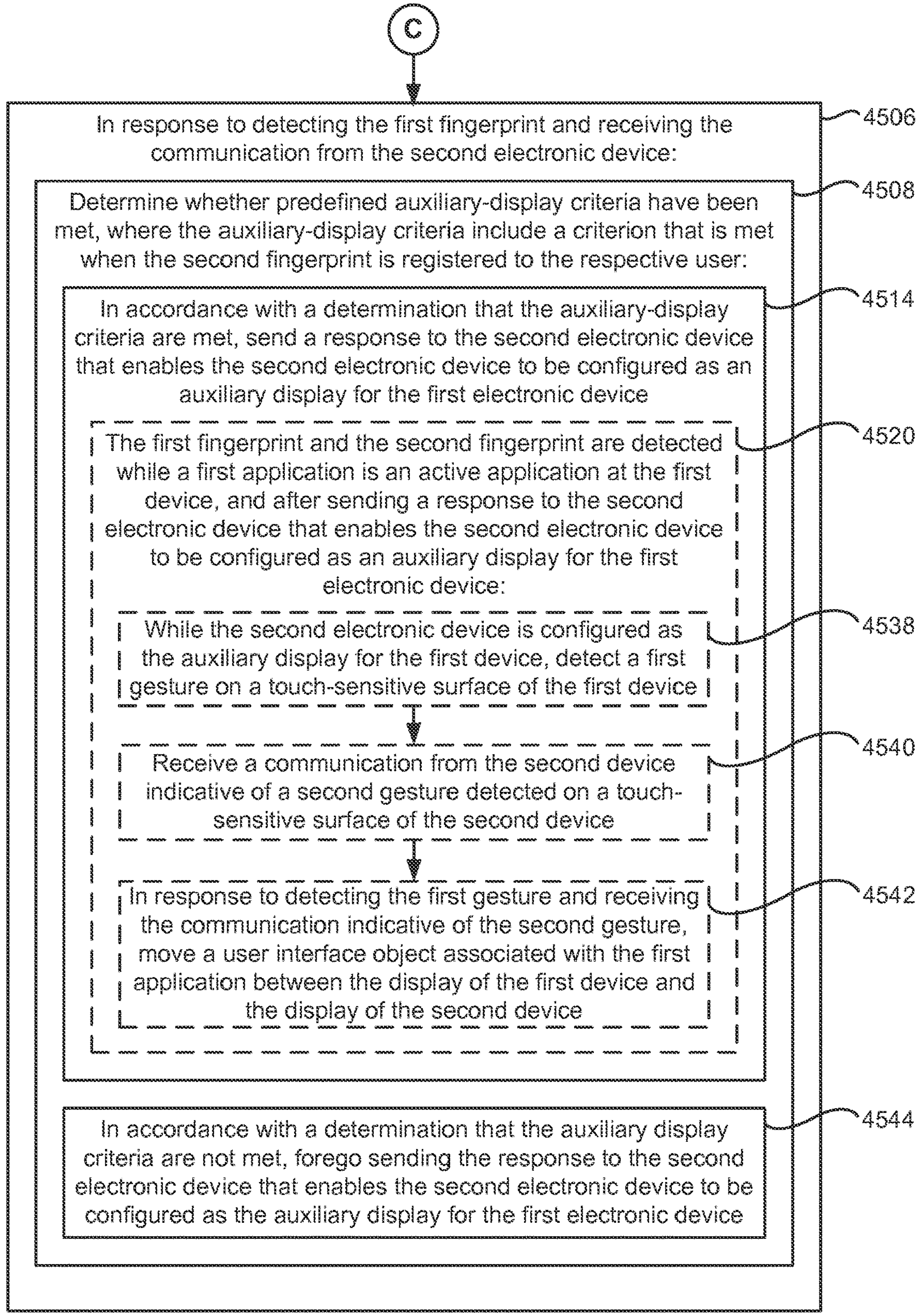

In some embodiments, as illustrated in FIGS. 44Z-44BB, while the second electronic device is configured as an auxiliary display for the first electronic device, operational data from the second device, specifying operations corresponding to interactions with user interface elements on the auxiliary display associated with an active application on the first device, is received and performed by the first device. For example, in FIG. 44Z, multifunction device 100-1 displays a first user interface that includes keyboard 4428-1, corresponding to an active piano application. Multifunction device 100-2 displays a second user interface including application launch screen 4406. Upon detection of qualifying fingerprints 4455 and 4456 (e.g., fingerprints that meet the predefined auxiliary-display criteria), second multifunction device 100-2 is configured as an auxiliary display for first multifunction device 100-1. As illustrated in FIG. 44AA, while configured as an auxiliary display, touch screen 112-2 of second multifunction device 100-2 displays an extension of keyboard 4428 (e.g., keyboard 4428-2, corresponding to a second octave of tones on the keyboard). In FIG. 44BB, second multifunction device 100-2 detects contact 4430 at a position on touch screen 112-2 corresponding to the display of piano key 4457 (e.g., the “E” key). Second multifunction device 100-2 processes contact 4430 to determine that an operation including generating sound at a pitch corresponding to “E” key 4457 should be performed. First multifunction device 100-1 receives a communication from second multifunction device 100-2 that includes operational data relating to generating sound at the pitch corresponding to "E" key 4457, and generates sound 4429 according to the operational data received from second multifunction device 100-2. In some embodiments, instead of sending the communication to First multifunction device 100-1, Second multifunction device 100-2 generates a sound at the pitch corresponding to "E" key 4457.

In some embodiments, as illustrated in FIGS. 44CC-44EE, while the second electronic device is configured as an auxiliary display for the first electronic device, corresponding gestures performed on touch-sensitive surfaces (e.g., touch screens 112) of each respective device causes a user interface object associated with an active application on the first device to move between the display of the first device and the display of the second device. For example, in FIG. 44CC, multifunction device 100-1 displays a first user interface that includes launch icons 4432 for photo albums (e.g., icons representing photo albums "Flowers" 4432-1, "Outer Space" 4432-2, "Vacation" 4432-3, and "Winter" 4432-4), corresponding to an active photo display application. Multifunction device 100-2 displays a second user interface including application launch screen 4406. Upon detection of qualifying fingerprints 4460 and 4462 (e.g., fingerprints that meet the predefined auxiliary-display criteria), second multifunction device 100-2 is configured as an auxiliary display for first multifunction device 100-1. As illustrated in FIG. 44DD, the first user interface is expanded with the auxiliary display to display launch icons 4432 for additional photo albums (e.g., icons representing photo albums "Desert" 4432-5 and "Wedding" 4432-6) on touch screen 112-2 of second multifunction device 100-2. First multifunction device 100-1 detects a first gesture including movement 4438 of contact 4436 on touch screen 112-1 from position **4436-*a* in FIG. 44DD, corresponding to the display of launch icon 4432-4, to position 4436-*b* in FIG. 44EE. Second multifunction device 100-2 detects a second gesture including movement 4442 of contact 4440 on touch screen 112-2 from position 4440-*a* to position 4440-*b* in FIG. 44EE. In response, the display of launch icon 4432-4 is moved from position 4436-*a* on touch screen 112-1 of first multifunction device 100-1 in FIG. 44DD to position 4440-*b* on touch screen 112-2 of second multifunction device 100-2 in FIG. 44**EE.

FIGS. 45A-45D are flow diagrams illustrating a method 4500 of configuring a second electronic device as an auxiliary display of a first electronic device in accordance with some embodiments. The method 4500 is performed at an electronic device (e.g., device 300, FIG. 3, or portable multifunction device 100, FIG. 1A) with a display and a touch-sensitive surface. In some embodiments, the display is a touch screen display and the touch-sensitive surface is on the display. In some embodiments, the display is separate from the touch-sensitive surface. Some operations in method 4500 are, optionally, combined and/or the order of some operations is, optionally, changed.

As described below, the method 4500 provides an intuitive way to configure a second electronic device as an auxiliary display of a first electronic device. The method reduces the cognitive burden on a user when configuring a second electronic device as an auxiliary display of a first electronic device, thereby creating a more efficient human-machine interface. For battery-operated electronic devices, enabling a user to configure a second electronic device as an auxiliary display of a first electronic device faster and more efficiently conserves power and increases the time between battery charges.

In some embodiments, a first electronic device with a fingerprint sensor and a display detects (4502) a first fingerprint on a fingerprint sensor of a first electronic device at a first time, where the first fingerprint is registered to a respective user. For example, FIGS. 44B, 44D-44K, 44M, 44O, 44Q, 44U, 44W, 44Z, and 44CC illustrate various embodiments where multifunction device 100-1 detects a first fingerprint (e.g., fingerprint 4402, 4405, 4409, 4413, 4417, 4423, 4427, 4431, 4435, 4439, 4443, 4445, 4449, 4451, 4455, or 4460) on fingerprint sensor 169-1 or touch screen 112-1 having a spatial resolution that is high enough to detect fingerprint features formed by individual fingerprint ridges, allowing it to be used as a fingerprint sensor.

The first electronic device receives (4504) a communication from a second electronic device, distinct from the first electronic device, that includes information indicating that a second fingerprint was detected on a fingerprint sensor of the second device at a second time. For example, FIGS. 44B, 44D-44K, 44M, 44O, 44Q, 44U, 44W, 44Z, and 44CC illustrate various embodiments where multifunction device 100-2 or 100-3 detects a second fingerprint (e.g., fingerprint 4403, 4407, 4411, 4415, 4419, 4425, 4429, 4433, 4437, 4441, 4444, 4446, 4450, 4452, 4456, or 4462) on fingerprint sensor 169-2 or 169-3, or on touch screen 112-2 or 112-3 and communicates information to multifunction device 100-1 that the second fingerprint was detected and, optionally, additional characterizing information about the contact (e.g., an identity of the fingerprint, a time the fingerprint was detected, or an orientation of the fingerprint).

In response (4506) to detecting the first fingerprint and receiving the communication from the second electronic device: the first electronic device determines (4508) whether predefined auxiliary-display criteria have been met, where the auxiliary-display criteria include a criterion that is met when the second fingerprint is registered to the respective user. For example, as illustrated in FIG. 44C, because fingerprints 4402 and 4403 are registered to the same user (e.g., user "1"), the auxiliary-display criterion is satisfied. In contrast, as illustrated in FIG. 44D, because fingerprints 4405 and 4407 are registered to different users (e.g., users "1" and "2," respectively), the auxiliary-display criterion is not satisfied.

In some embodiments, the auxiliary-display criteria include (4510) a criterion that is met when the first time is within a predefined time of the second time. For example, the second device is used as an auxiliary display when the first fingerprint and the second fingerprint are detected simultaneously or substantially simultaneously on the first and second devices (e.g., within 0.5, 1.0, 2, or 5 seconds of each other). For example, as illustrated in FIG. 44E, because second fingerprint 4411 was detected at a time 4410 (e.g., three and a half seconds after detection of first fingerprint 4409) within predetermined time 4408 (e.g., five seconds after detection of first fingerprint 4409), the auxiliary-display criterion is satisfied. In contrast, as illustrated in FIG. 44F, because second fingerprint 4415 occurred at a time 4459 (e.g., six and a half seconds after detection of first fingerprint 4413) not within predetermined time 4408 (e.g., five seconds after detection of first fingerprint 4413), the auxiliary-display criterion is not satisfied.

In some embodiments, the auxiliary-display criteria include (4512) a criterion that is met when the first device receives a confirmation that configuration of the second device as an auxiliary display has been requested. In some embodiments, as illustrated in FIGS. 44G-44H, configuration of the second device (e.g., multifunction device 100-2) as the auxiliary display includes selecting "approve connection," "approve," "connect," or a similar affirmative selection on one or both devices (e.g., the "CONNECT" prompt displayed in user interface objects 4412 and 4421 in FIGS. 44G and 44H, respectively) and/or entering a predefined pin or password on one or both of the devices (e.g., multifunction device 100-1 and/or multifunction device 100-2). In contrast, in some embodiments, as illustrated in the series of FIGS. 44A-44C, the second device (e.g., multifunction device 100-2) is configured as an auxiliary display for the first device without requesting any additional authentication performed prior to configuring the second device as an auxiliary device for the first device (e.g., the configuration happens automatically when the two fingerprints 4402 and 4403 are detected).

In accordance with a determination that the auxiliary-display criteria are met, the first electronic device sends (4514) a response to the second electronic device that enables the second electronic device to be configured as an auxiliary display for the first electronic device. For example, FIGS. 44C, 44E, 44J, 44L, 44N, 44P, 44R, 44V, 44X, 44AA, and 44DD illustrate various embodiments where, in response to meeting the auxiliary-display criteria, first multifunction device 100-1 sent a response that enabled second multifunction device 100-2 or 100-3 to become configured as an auxiliary display for first multifunction device 100-1.

In some embodiments, an orientation of a user interface displayed on the display of the first device is determined (4516) in accordance with the orientation of the first fingerprint relative to a predefined axis of the display of the first device, and an orientation of a user interface displayed on the display of the second device is determined in accordance with the orientation of the second fingerprint relative to a predefined axis of the display of the second device. For example, the user interface displayed on the first device and the user interface displayed on the second device are oriented so that they are each aligned with the fingerprint detected on the corresponding devices (e.g., the user interfaces are oriented so that an "up" of the user interface on the displays corresponds to the "up" of the corresponding fingerprint on the fingerprint sensors). Thus, in some embodiments, as illustrated in FIGS. 44I-44J, when a vertical axis of the fingerprint is substantially parallel to a predefined vertical axis of a respective device (e.g., where vertical axis of first contact 4427 is substantially parallel to the long axis of first multifunction device 100-1 in FIG. 44I), then the user interface is aligned so that the bottom of the user interface is along a bottom edge of the respective device, with respect to the predefined vertical axis (e.g., the user interface displaying map 4404-1 of the United States on touch screen 112-1 of first multifunction device 100-1 is displayed in a portrait orientation in FIG. 44J), whereas, when a vertical axis of the fingerprint is substantially perpendicular to the predefined vertical axis of a respective device (e.g., where vertical axis of second contact 4433 is substantially perpendicular to the long axis of second multifunction device 100-2 in FIG. 44I), then the user interface is aligned so that the bottom of the user interface is along a side edge of the respective device, with respect to the predefined vertical axis (e.g., the user interface displaying map 4404-2 of the United States on touch screen 112-2 of second multifunction device 100-2 is displayed in a landscape orientation in FIG. 44J).

In some embodiments, the first electronic device determines (4518) a direction to extend a user interface displayed on the display of the first device with the auxiliary display in accordance with at least one of an identity of the first fingerprint and an identity of the second fingerprint. For example, when a fingerprint of a right hand of a user is detected on the fingerprint sensor of the first device (e.g., fingerprint 4439 on first multifunction device 100-1 corresponds to the user's right index finger in FIG. 44M) and/or a fingerprint of a left hand of the user is detected on the fingerprint sensor of the second device (e.g., fingerprint 4441 on second multifunction device 100-3 corresponds to the user's left index finger in FIG. 44M), the user interface of the first device is extended to the left onto the display of the second device (e.g., the first user interface displayed on touch screen 112-1 of multifunction device 100-1 in FIG. 44M is extended onto multifunction device 100-3 in FIG. 44N, such that the west coast of the United States is displayed as map 4404-3 on touch screen 112-3 of second multifunction device 100-3 and the central United States is displayed as map 4404-1 on touch screen 112-1 of first multifunction device 100-1). Similarly, when a fingerprint of the left hand of the user is detected on the fingerprint sensor of the first device (e.g., fingerprint 4435 on first multifunction device 100-1 corresponds to the user's left index finger in FIG. 44K) and/or a fingerprint of the right hand of the user is detected on the fingerprint sensor of the second device (e.g., fingerprint 4437 on second multifunction device 100-2 corresponds to the user's right index finger in FIG. 44K), the user interface of the first device is extended to the right onto the display of the second device (e.g., the first user interface displayed on touch screen 112-1 of multifunction device 100-1 in FIG. 44K is extended onto multifunction device 100-2 in FIG. 44L, such that the eastern seaboard of the United States is displayed as map 4404-2 on touch screen 112-2 of second multifunction device 100-2 and the central United States is displayed as map 4401-1 on touch screen 112-1 of first multifunction device 100-1). Thus, in some embodiments, the device that detects fingerprints from the left hand of the user is assumed to be to the left of the device that detects fingerprints from the right hand of the user, so user interface objects that are supposed to be on the left side of the user interface are displayed on the device that detected fingerprints from the user's left hand while user interface objects that are supposed to be on the right side of the user interface are displayed on the device that detected fingerprints from the user's right hand.

In some embodiments, the order on the user's hands of the finger corresponding to the second fingerprint relative to the finger corresponding to the first fingerprint determines the direction in which the user interface is expanded with the auxiliary display. For example, when a second fingerprint (e.g., fingerprint 4444 detected on second multifunction device 100-2 in FIG. 44O) corresponding to a second finger (e.g., the user's right index (RI) finger) located to the user's left of a first finger (e.g., the user's right ring (RR) finger) corresponding to a first fingerprint (e.g., fingerprint 4443 detected on first multifunction device 100-1 in FIG. 44O), the user interface of the first device is extended to the left onto the display of the second device (e.g., the first user interface displayed on touch screen 112-1 of multifunction device 100-1 in FIG. 44O is extended onto multifunction device 100-2 in FIG. 44P, such that the west coast of the United States is displayed as map 4404-2 on touch screen 112-2 of second multifunction device 100-2 and the central United States is displayed as map 4404-1 on touch screen 112-1 of first multifunction device 100-1).

In some embodiments, where the first fingerprint and the second fingerprint are detected (4420) while a first application is an active application at the first device (e.g., where a photo display application is active as shown in FIGS. 44Q, 44W, and 44CC; where a word processing application is active as shown in FIG. 44U; and where a piano application is active as shown in FIG. 44Z, at first multifunction device 100-1), and after sending a response to the second electronic device that enables the second electronic device to be configured as an auxiliary display for the first electronic device: the first device configures (4522) the second electronic device as an auxiliary display for the first device (e.g., second multifunction device 100-2 is configured as an auxiliary display for first multi function device 100-1 in FIGS. 44R, 44V, 44X, 44AA, and 44DD).

While the second electronic device is configured as an auxiliary display for the first device, the first device sends (4524) instructions to the second device that enable the second device to display a set of one or more user interface elements associated with the first application (e.g., menu bars 4414 and 4447, and drop-down menu 4416 in FIG. 44R; text 4418 in FIG. 44V; map 4404-2 of the United States in FIG. 44X; piano keyboard 4428-2 in FIG. 44AA; and icons representing photo albums "Desert" 4432-5 and "Wedding" 4432-6 in FIG. 44DD).

In some embodiments, the set of one or more user interface elements associated with the first application include (4526) one or more controls for performing operations in the first application (e.g., the one or more user interface elements include: a menu, control element, or other user interface object associated with the first application). For example, using the display of the second device as an auxiliary display includes placing one or more of the controls for the user interface displayed on the display of the first device on the display of the second device (e.g., menu bars 4414 and 4447, and drop-down menu 4416 in FIG. 44R). Thus, additional menus, palettes or other controls can be displayed on the auxiliary display to reduce or eliminate cluttering the primary display (e.g., the user interface of the first application that is displayed on the display of the first device).

In some embodiments, the set of one or more user interface elements associated with the first application include (4528) a portion of a workspace that is a continuation of a workspace displayed on the display of the first device (e.g., the one or more user interface elements include: a document body, application canvas or other virtual workspace that is stretched over the displays of the first and second devices). For example, using the display of the second device as an auxiliary display includes spreading a workspace for the first application over the display of the first device and the display of the second device (e.g., workspace 4417-1 is expanded from touch screen 112-1 of first multifunction device 100-1 in FIG. 44U onto touch screen 112-2 of second multifunction device 100-2, as workspace 4417-2 of continuous workspace 4417 in FIG. 44V).

In some embodiments, while the second electronic device is configured as the auxiliary display for the first device, the first device receives (4530) input data indicative of inputs detected by the second device, where the inputs correspond to interactions with one or more of the user interface elements associated with the first application that are displayed on the display of the second device; and the first device performs (4532) operations associated with the first application in accordance with the input data. For example, the first device sends display information to the second device and receives input data (e.g., coordinates of touch points such as contact 4424 in FIG. 44X and/or a gesture including movement 4426 of contact 4424 from position **4424-*a* in FIG. 44X to position 4424-*b* in FIG. 44Y) indicative of the user's interaction with the user interface displayed on the display of the second device; and in response the first device performs an operation associated with an active program in accordance with the first application (e.g., first multifunction device 100-1 moves focus selector 4422 from position 4422-*a* in FIG. 44X to position 4422-*b* in FIG. 44Y in accordance with the gesture data provided by second multifunction device 100-2**). Thus, in some embodiments, the second device acts as an auxiliary touchpad or touch screen for the first device.

In some embodiments, while the second electronic device is configured as the auxiliary display for the first device, the first device receives (4534) operation data from the second electronic device that specifies one or more operations corresponding to interactions with one or more of the user interface elements associated with the first application that are displayed on the display of the second device; and performs (4536) the one or more operations. Thus, in some embodiments, some application processing is done at each of the devices (e.g., the first device and the second device each have copies of the same application), the two applications each produce responses to gestures appropriate to the portion of the user interface that is displayed, and the two applications share information. For example, for a musical keyboard (e.g., piano keyboard 4428 in FIG. 44BB) that is spread across the display of the first device and the display of the second device (e.g., as keyboards 4428-1 and 4428-2 displayed on multifunction devices 100-1 and 100-2, respectively, in FIGS. 44AA-44BB), instead of sending touch points to the first electronic device (e.g., coordinates of contact 4430 in FIG. 44BB), the second device (e.g., multifunction device 100-2 in FIG. 44BB) displays half of the keys of the musical keyboard (e.g., including "E" key 4457 in FIG. 44BB) and sends information to the first device indicating a note to play corresponding to a key that was activated by the user (e.g., second multifunction device 100-2 determines that contact 4430 should activate "E" key 4457 and sends information to first multifunction device 100-1 to play a sound having pitch "E"). As another example, for a split text keyboard, instead of sending touch points to the first electronic device, the second electronic device sends letters that correspond to the keys that were activated by the user. By performing some of the processing at the second device, the processing load on the first device is decreased, thereby improving the performance of the application.

In some embodiments, while the second electronic device is configured as the auxiliary display for the first device, the first device detects (4538) a first gesture on a touch-sensitive surface of the first device (e.g., the first gesture corresponds to a first location on a touch-sensitive display of the first device), and receives (4540) a communication from the second device indicative of a second gesture detected on a touch-sensitive surface of the second device (e.g., the second gesture corresponds to a second location on a touch-sensitive display of the second device). In response to detecting the first gesture and receiving the communication indicative of the second gesture, the first device moves (4542) a user interface object (e.g., a file, icon, menu, or control) associated with the first application between the display of the first device (e.g., a first location on the display of the first device) and the display of the second device (e.g., a second location on the display of the second device). For example, the first device detects a pinch gesture on the touch-sensitive surface of the first device at a first location that corresponds to a first user interface object and the second device detects a depinch gesture on the touch-sensitive surface of the second device at a second location, and in response to detecting the pinch and depinch gestures, the first user interface object is moved from the first location to the second location (e.g., the first device ceases to display the first user interface object and the second device starts to display the first user interface object). As another example, the first device (e.g., first multifunction device 100-1 in FIG. 44DD) detects a first portion of a drag gesture on the first touch-sensitive surface (e.g., a drag gesture including movement 4438 of contact 4436 from position 4436-*a* in FIG. 44DD to position 4436-*b* on touch screen 112-1 in FIG. 44EE) that starts at a first location (e.g., position 4436-*a* in FIG. 44DD) that corresponds to a first user interface object (e.g., icon 4432-4 representing photo album "Winter" in FIG. 44DD) and the second device (e.g., multifunction device 100-2) detects a second portion of the drag gesture on the second touch-sensitive surface (e.g., a drag gesture including movement 4442 of contact 4440 from position 4440-*a* to position 4440-*b* on touch screen 112-2 in FIG. 44EE) that ends (e.g., with liftoff of the contact) at a second location (e.g., position 4440-*b* in FIG. 44EE), and in response to the first and second portions of the drag gesture, the first user interface object is moved from the first location to the second location (e.g., the first device ceases to display icon 4432-4 representing photo album "Winter" and the second device starts to display icon 4432-4 representing photo album "Winter," as illustrated in FIG. 44EE).

In accordance with a determination that the auxiliary-display criteria are not met, the first device foregoes (4544) sending the response to the second electronic device that enables the second electronic device to be configured as the auxiliary display for the first electronic device. For example, in FIG. 44D, the auxiliary-display criteria are not met because first fingerprint 4405 and second fingerprint 4407 are not registered to the same user (e.g., fingerprint 4405 corresponds to user "1" and fingerprint 4407 corresponds to user "2"), and thus, second multifunction device 100-2 is not configured as an auxiliary display for first multifunction device 100-1. Similarly, in FIG. 44F, the auxiliary-display criteria are not met because second fingerprint 4415 was not detected within predetermined time 4408 after detection of first fingerprint 4413 (e.g., fingerprint 4415 was detected more than 5 seconds after fingerprint 4413 was detected), and thus, second multifunction device 100-2 is not configured as an auxiliary display for first multifunction device 100-1.

It should be understood that the particular order in which the operations in FIGS. 45A-45D have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., those methods described above) are also applicable in an analogous manner to method 4500 described above with respect to FIGS. 45A-45D. For example, the fingerprints, contacts, gestures, user interface objects, and focus selectors described above with reference to method 4500 optionally have one or more of the characteristics of the fingerprints, contacts, gestures, user interface objects, and focus selectors described herein with reference to other methods described herein (e.g., those methods described above). For brevity, these details are not repeated here.

Figure 46:
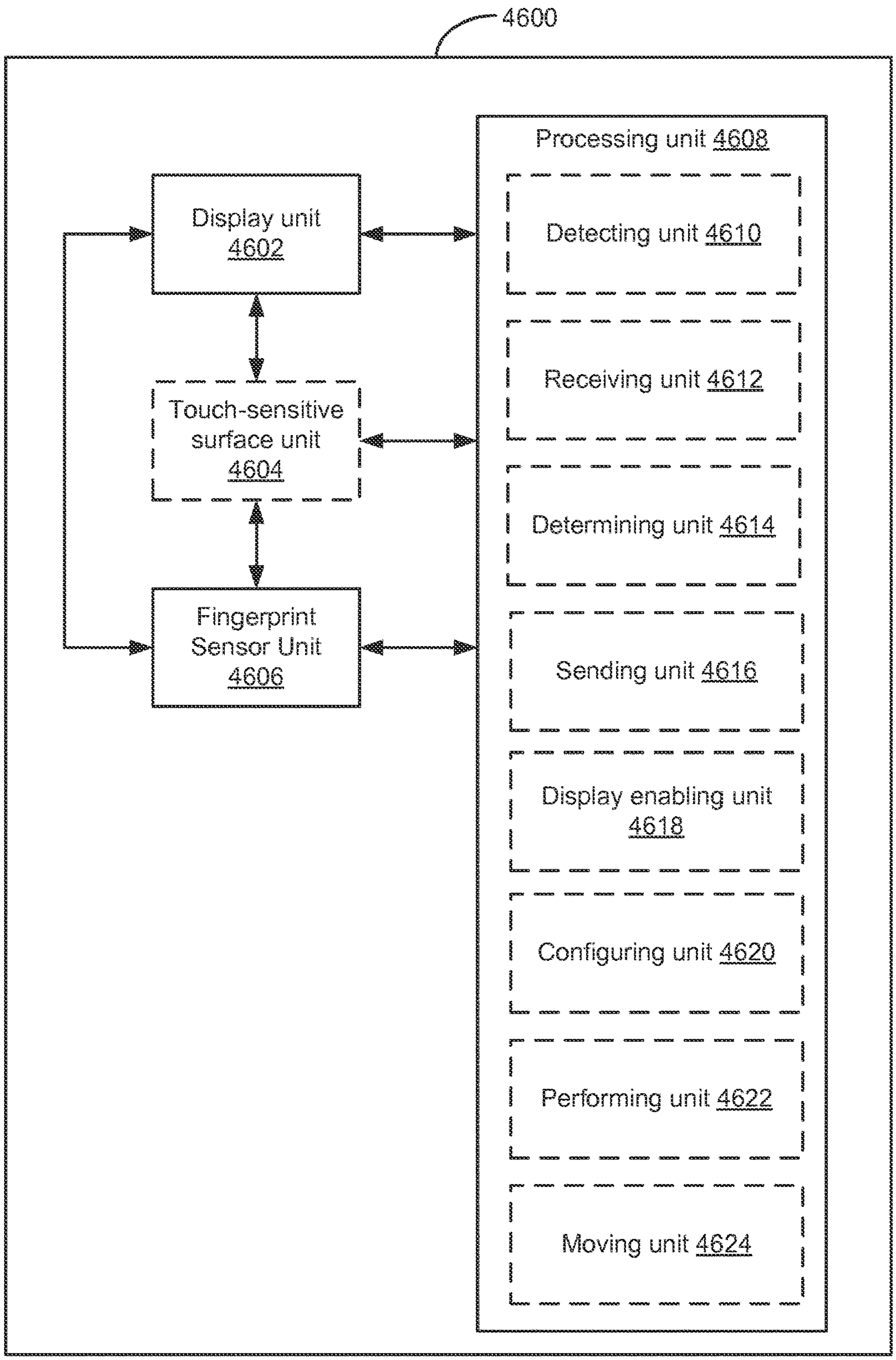
FIG. 46 is a functional block diagram of an electronic device in accordance with some embodiments.

In accordance with some embodiments, FIG. 46 shows a functional block diagram of an electronic device 4600 configured in accordance with the principles of the various described embodiments. The functional blocks of the device are, optionally, implemented by hardware, software, or a combination of hardware and software to carry out the principles of the various described embodiments. It is understood by persons of skill in the art that the functional blocks described in FIG. 46 are, optionally, combined or separated into sub-blocks to implement the principles of the various described embodiments. Therefore, the description herein optionally supports any possible combination or separation or further definition of the functional blocks described herein.

As shown in FIG. 46, an electronic device 4600 includes a display unit 4602 configured to display a graphic user interface, optionally, a touch-sensitive surface unit 4604, a fingerprint sensor unit 4606; and a processing unit 4608 coupled to the display unit 4602, touch-sensitive surface unit 4604, and the fingerprint sensor unit 4606. In some embodiments, the processing unit 4608 includes a detecting unit 4610, a receiving unit 4612, a determining unit 4614, a sending unit 4616, a display enabling unit 4618 for enabling display of information on display unit 4602, a configuring unit 4620, a performing unit 4622, and a moving unit 4624.

The processing unit 4608 is configured to detect a first fingerprint on the fingerprint sensor unit of the first electronic device 4600 at a first time (e.g., with the detecting unit 4610), where the first fingerprint is registered to a respective user. The processing unit 4608 is also configured to receive a communication from a second electronic device (e.g., with the receiving unit 4612), distinct from the first electronic device 4600, that includes information indicating that a second fingerprint was detected on a fingerprint sensor unit of the second device at a second time. In response to detecting the first fingerprint and receiving the communication from the second electronic device, the processing unit 4608 is configured to determine whether predefined auxiliary-display criteria have been met (e.g., with the determining unit 4614), where the auxiliary-display criteria include a criterion that is met when the second fingerprint is registered to the respective user. In accordance with a determination that the auxiliary-display criteria are met, the processing unit 4608 is configured to send a response to the second electronic device (e.g., with the sending unit 4616) that enables the second electronic device to be configured as an auxiliary display for the first electronic device 4600. In accordance with a determination that the auxiliary display criteria are not met, the processing unit 4608 is configured to forego sending the response to the second electronic device (e.g., with the sending unit 4616) that enables the second electronic device to be configured as the auxiliary display for the first electronic device 4600.

In some embodiments, the auxiliary-display criteria include a criterion that is met when the first time is within a predefined time of the second time.

In some embodiments, the auxiliary-display criteria include a criterion that is met when the first device receives a confirmation that configuration of the second device as an auxiliary display has been requested (e.g., with the receiving unit 4612).

In some embodiments, an orientation of a user interface displayed on the display unit 4602 of the first device 4600 is determined in accordance with the orientation of the first fingerprint relative to a predefined axis of the display unit 4602 of the first device 4600 (e.g., with the determining unit 4614), and an orientation of a user interface displayed on the display unit of the second device is determined in accordance with the orientation of the second fingerprint relative to a predefined axis of the display unit of the second device (e.g., with the determining unit).

In some embodiments, the processing unit 4608 is further configured to determine a direction to extend the user interface of the first device 4600 with the auxiliary display in accordance with at least one of an identity of the first fingerprint and an identity of the second fingerprint (e.g., with the determining unit 4614).

In some embodiments, the first fingerprint and the second fingerprint are detected while a first application is an active application at the first device 4600; and after sending a response to the second electronic device that enables the second electronic device to be configured as an auxiliary display for the first electronic device 4600 (e.g., with the sending unit 4616), the processing unit 4608 is further configured to configure the second electronic device as an auxiliary display for the first device 4600 (e.g., with the configuring unit 4620), and while the second electronic device is configured as an auxiliary display for the first device 4600, the processing unit 4608 is further configured to send instructions to the second device (e.g., with the sending unit 4616) that enable the second device to display a set of one or more user interface elements associated with the first application.

In some embodiments, where the set of one or more user interface elements associated with the first application include one or more controls for performing operations in the first application.

In some embodiments, where the set of one or more user interface elements associated with the first application include a portion of a workspace that is a continuation of a workspace displayed on the display unit 4602 of the first device 4600.

In some embodiments, while the second electronic device is configured as the auxiliary display for the first device 4600, the processing unit 4608 is further configured to receive input data indicative of inputs detected by the second device (e.g., with the receiving unit 4612), where the inputs correspond to interactions with one or more of the user interface elements associated with the first application that are displayed on the display unit 4602 of the second device, and the processing unit 4608 is further configured to perform operations associated with the first application in accordance with the input data (e.g., with the performing unit 4622).

In some embodiments, while the second electronic device is configured as the auxiliary display for the first device 4600, the processing unit 4608 is further configured to receive operation data from the second electronic device that specifies one or more operations corresponding to interactions with one or more of the user interface elements associated with the first application that are displayed on the display unit of the second device (e.g., with the receiving unit 4612), and the processing unit 4608 is further configured to perform the one or more operations (e.g., with the performing unit 4622).

In some embodiments, while the second electronic device is configured as the auxiliary display for the first device 4600, the processing unit 4608 is further configured to detect a first gesture on a touch-sensitive surface unit 4604 of the first device 4600 (e.g., with the detecting unit 4610). The processing unit 4608 is further configured receive a communication from the second device indicative of a second gesture detected on a touch-sensitive surface unit of the second device (e.g., with the receiving unit 4612), and in response to detecting the first gesture and receiving the communication indicative of the second gesture, the processing unit 4608 is further configured to move a user interface object associated with the first application between the display unit 4602 of the first device 4600 and the display unit of the second device (e.g., with the moving unit 4624).

The operations in the information processing methods described above are, optionally implemented by running one or more functional modules in information processing apparatus such as general purpose processors (e.g., as described above with respect to FIGS. 1A and 3) or application specific chips.

The operations described above with reference to FIGS. 45A-45D are, optionally, implemented by components depicted in FIGS. 1A-1B or FIG. 46. For example, detecting operations 4502 and 4538, receiving operations 4504, 4530, 4534, and 4540, determining operations 4508, 4516, and 4518, sending operations 4514 and 4524, forgoing operation 4544, configuring operation 4522, performing operations 4532 and 4536, and moving operation 4542 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub-event, such as selection of an object on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Changing Beamforming Parameters Based on Fingerprint Orientation

Many electronic devices enable the configuration of audio elements based on proximity sensor data. For example, based on information from a proximity sensor a mobile telephone device can switch between a receiver mode and a speaker mode. The device described below improves on existing methods by utilizing a detected change in orientation of a fingerprint to select a set of beamforming parameters from a plurality of beamforming parameters so as to more efficiently operate a set of one or more audio elements.

While a first fingerprint is detected in a first orientation on a fingerprint sensor, the device operates a set of one or more audio elements in accordance with a first set of beamforming parameters. Then, the device detects a subsequent fingerprint having a second orientation different from the first orientation on the fingerprint sensor. The subsequent fingerprint is selected from a set consisting of the first fingerprint with a changed orientation and a second fingerprint distinct from the first fingerprint. Finally, in response to detecting the subsequent fingerprint having the second orientation on the fingerprint sensor, the device operates the set of one or more audio elements in accordance with a second set of beamforming parameters different from the first set of beamforming parameters.

In some embodiments, the device is an electronic device with a separate display (e.g., display 450) and a separate touch-sensitive surface (e.g., touch-sensitive surface 451). In some embodiments, the device is portable multifunction device 100, the display is touch screen 112, and the touch-sensitive surface includes tactile output generators 167 on the display (FIG. 1A). The device described below with reference to FIGS. 47A-47L and 48A-48B includes one or more fingerprint sensors 169. In some embodiments, the one or more fingerprint sensors include one or more integrated fingerprint sensors 359-1 (FIG. 4B) that are integrated in to the touch-sensitive surface (e.g., separate touch-sensitive surface 451 or touch sensitive display system 112). In some embodiments, the one or more fingerprint sensors include separate fingerprint sensors 359-2 (FIG. 4B) that are separate from the touch-sensitive surface (e.g., separate touch-sensitive surface 451 or touch sensitive display system 112). Unless specified otherwise, a fingerprint sensor 169 described below is, optionally, either an integrated fingerprint sensor 359-1 or a separate fingerprint sensor 359-2, depending on the configuration of the hardware and software of the device that includes the fingerprint sensor 169. For convenience of explanation, the embodiments described with reference to FIGS. 47A-47L and 48A-48B will be discussed with reference to touch screen 112 and fingerprint sensor 169 (e.g., an integrated fingerprint sensor 359-1 or a separate fingerprint sensor 359-2); in such embodiments, the focus selector is, optionally: a respective contact, a representative point corresponding to a contact (e.g., a centroid of a respective contact or a point associated with a respective contact), or a centroid of two or more contacts detected on the touch screen 112, in place of a cursor. Analogous operations are, optionally, performed on a device with display 450, a separate touch-sensitive surface 451, and an integrated fingerprint sensor 359-1 or a separate fingerprint sensor 359-2 in response to detecting the inputs described in FIGS. 47A-47L on integrated fingerprint sensor 359-1 or separate fingerprint sensor 359-2, while displaying the user interfaces shown in FIGS. 47A-47L on display 450.

Figure 47A:
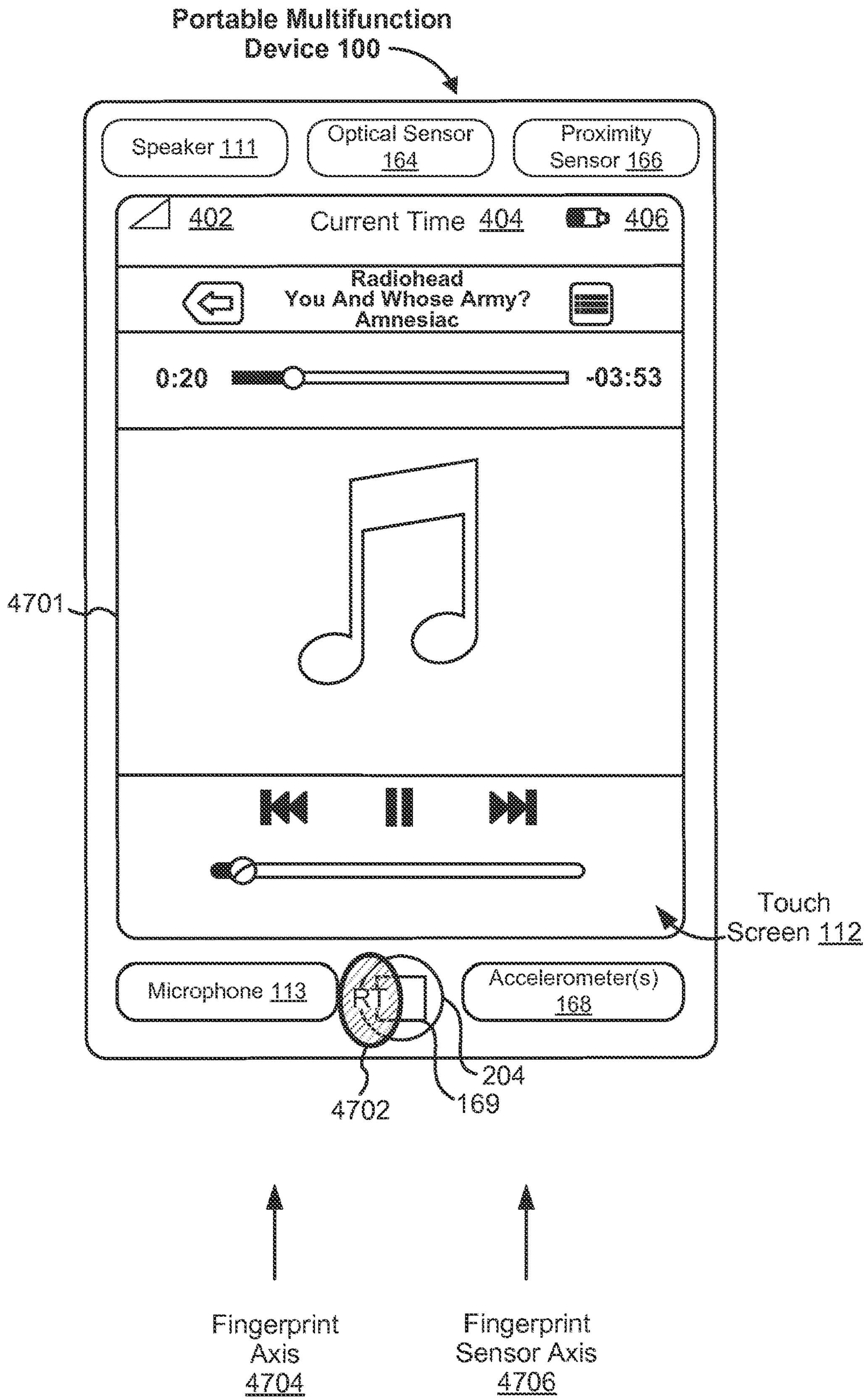
FIGS. 47A-47L illustrate exemplary user interfaces for changing beamforming parameters based on fingerprint orientation in accordance with some embodiments.
Figure 47B:
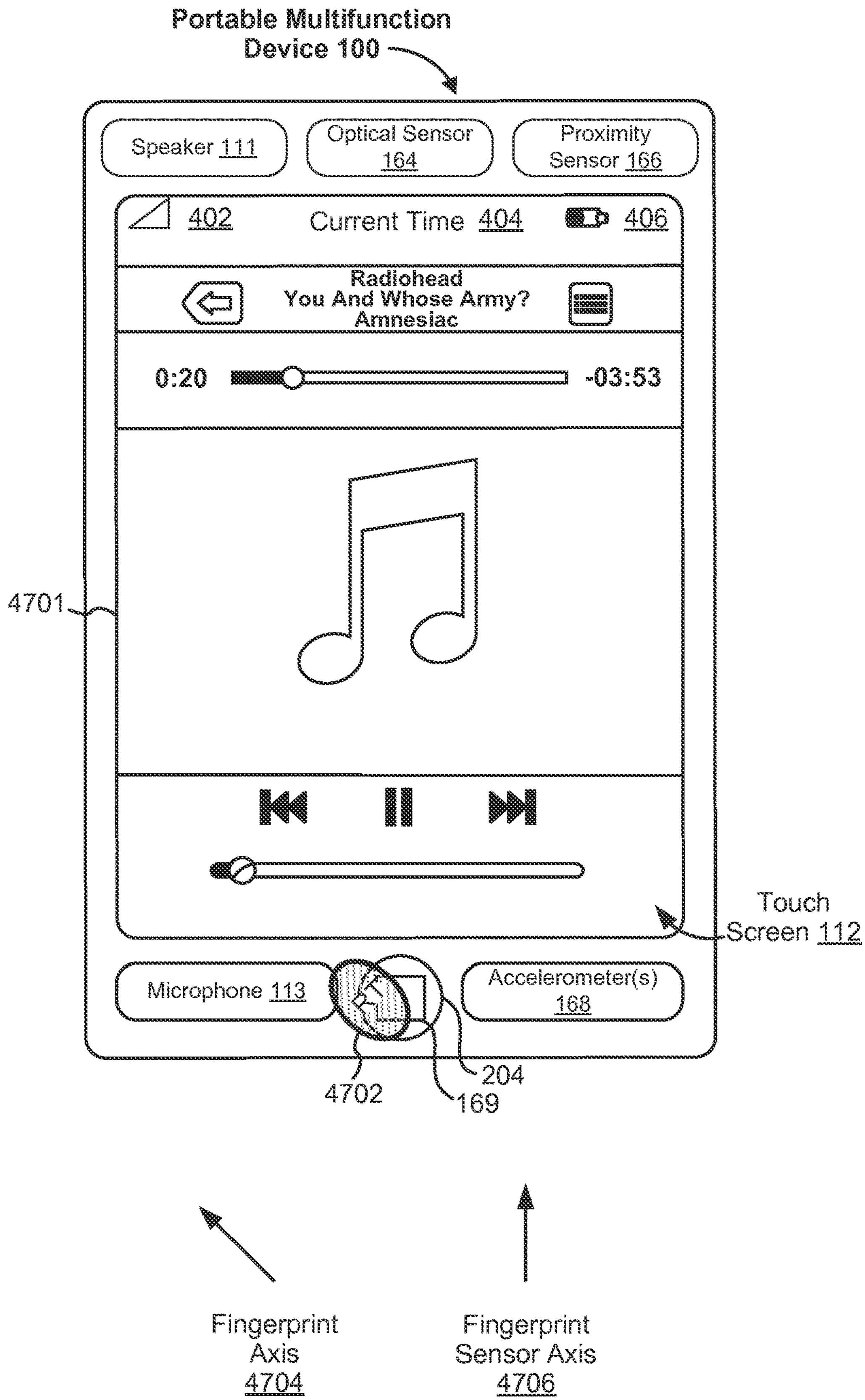
Figure 47C:
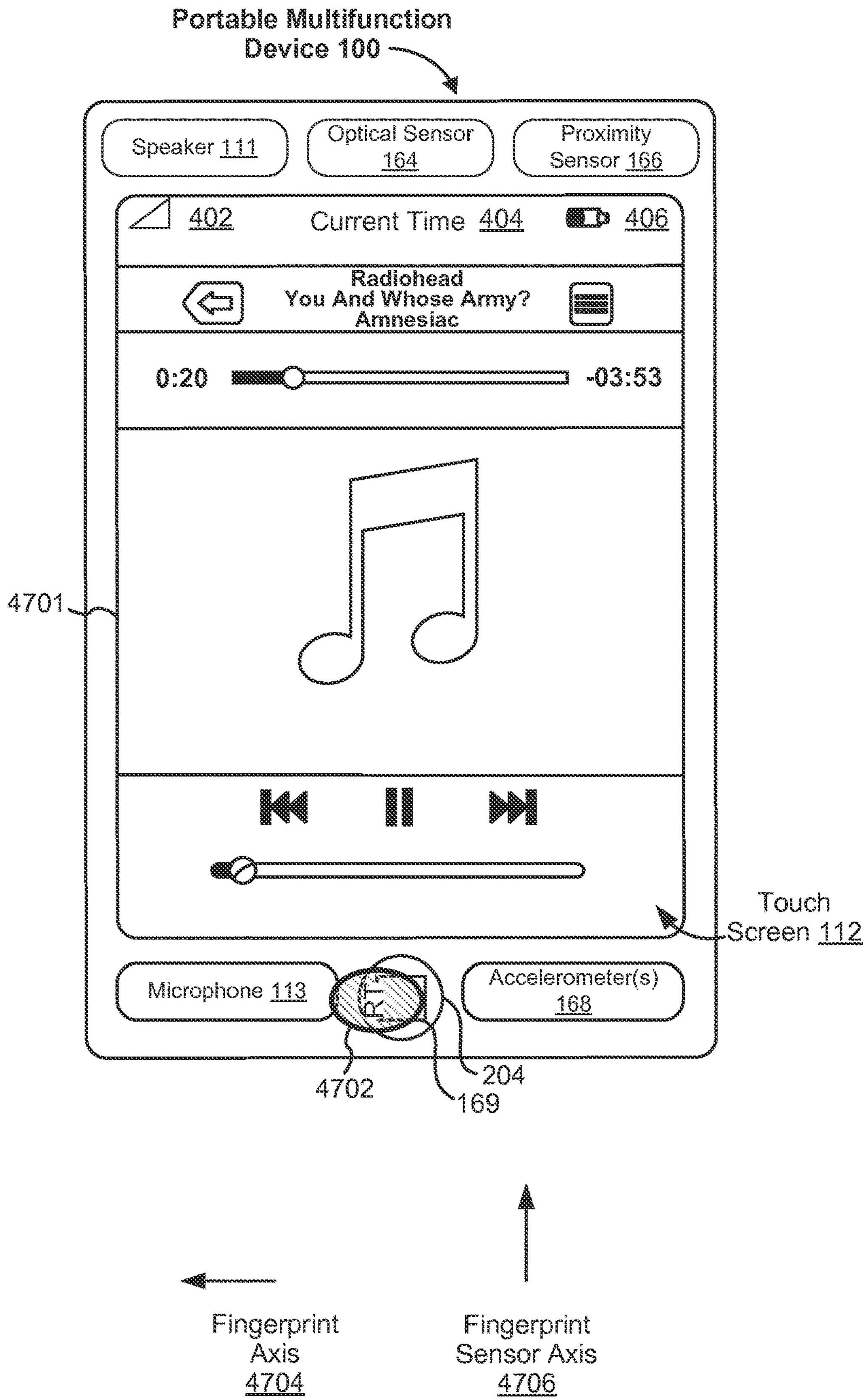
Figure 48A:
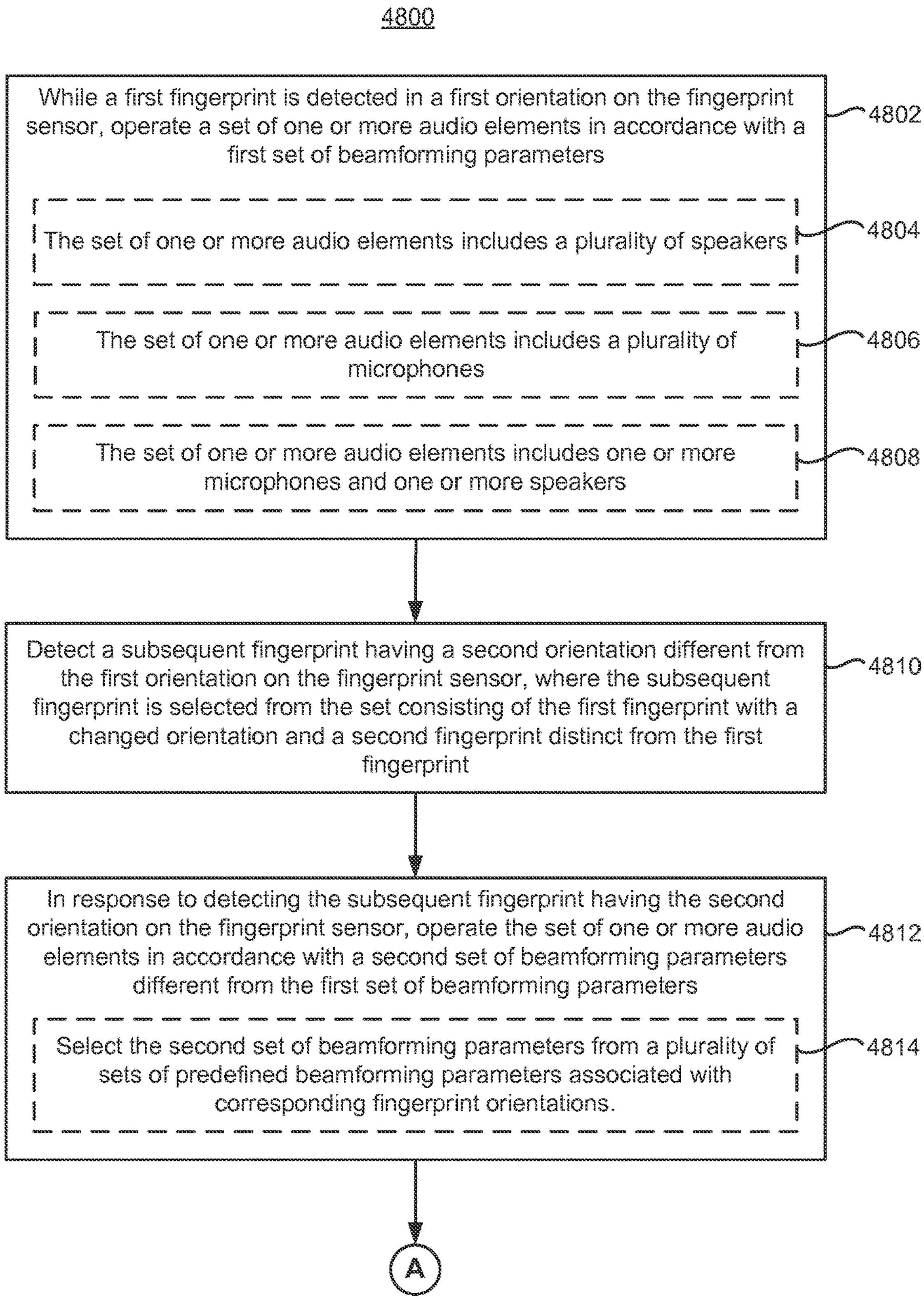
FIGS. 48A-48B are flow diagrams illustrating a method of changing beamforming parameters based on fingerprint orientation in accordance with some embodiments.
Figure 48B:
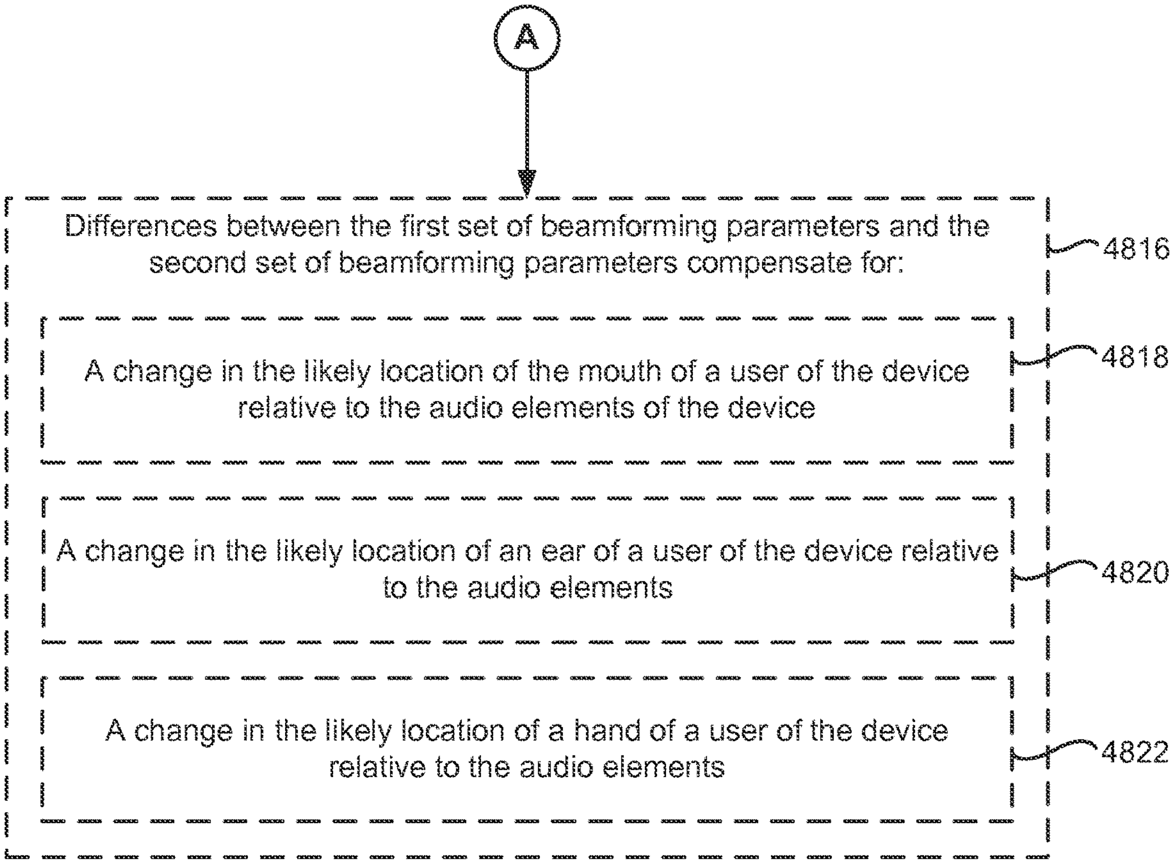

FIGS. 47A-47C illustrate a portable multifunction device 100 operating in an audio generation mode. While in audio generation mode, portable multifunction device 100 generates audio via speaker 111. A media player (e.g., Apple, Inc.'s iTunes application) is displayed on user interface 4701 of touch screen 112 in FIGS. 47A-47C. The media player illustrated in FIGS. 47A-47C is, for example, playing an audio file, or streaming audio. FIGS. 47A-47C further illustrate fingerprint axis 4704 which indicates the angle of a respective fingerprint and fingerprint sensor axis 4706 which indicates the angle of fingerprint sensor 169. FIGS. 47A-47C are alike in all respects save the orientation of the respective fingerprint; thus, only the differences between FIGS. 47A-47C will be discussed for the sake of brevity.

FIG. 47A illustrates a first fingerprint 4702 in a first orientation over fingerprint sensor 169, which is integrated into home button 204 of device 100 (e.g., integrated fingerprint sensor 359-1). Fingerprint 4702 is, for example, a user's right thumb. FIG. 47A illustrates the angle of fingerprint 4702 via fingerprint axis 4704 at 90 degrees and the angle of fingerprint sensor 169 via fingerprint sensor axis 4706 at 90 degrees. Thus, in FIG. 47A, the angle of first fingerprint 4702 relative to the axis of fingerprint sensor 169 is 0 degrees.

FIG. 47B illustrates first fingerprint 4702 in a second orientation over fingerprint sensor 169. FIG. 47B illustrates the angle of fingerprint 4702 via fingerprint axis 4704 at 135 degrees and the angle of fingerprint sensor 169 via fingerprint sensor axis 4706 at 90 degrees. Thus, in FIG. 47B, the angle of first fingerprint 4702 relative to the axis of fingerprint sensor 169 is 45 degrees.

FIG. 47C illustrates first fingerprint 4702 in a third orientation over fingerprint sensor 169. FIG. 47C illustrates the angle of fingerprint 4702 via fingerprint axis 4704 at 180 degrees and the angle of fingerprint sensor 169 via fingerprint sensor axis 4706 at 90 degrees. Thus, in FIG. 47C, the angle of first fingerprint 4702 relative to the axis of fingerprint sensor 169 is 90 degrees.

Figure 47D:
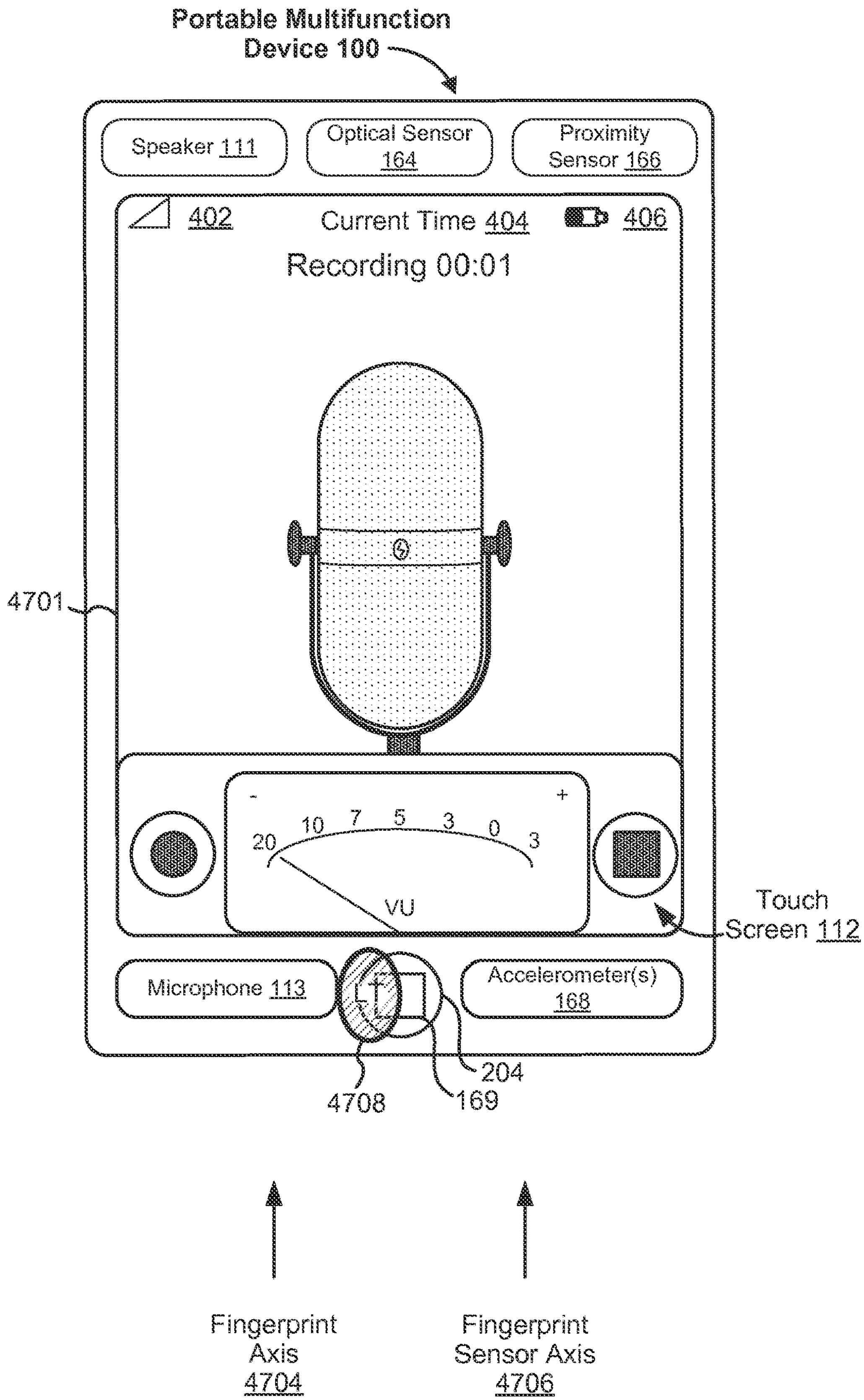
Figure 47E:
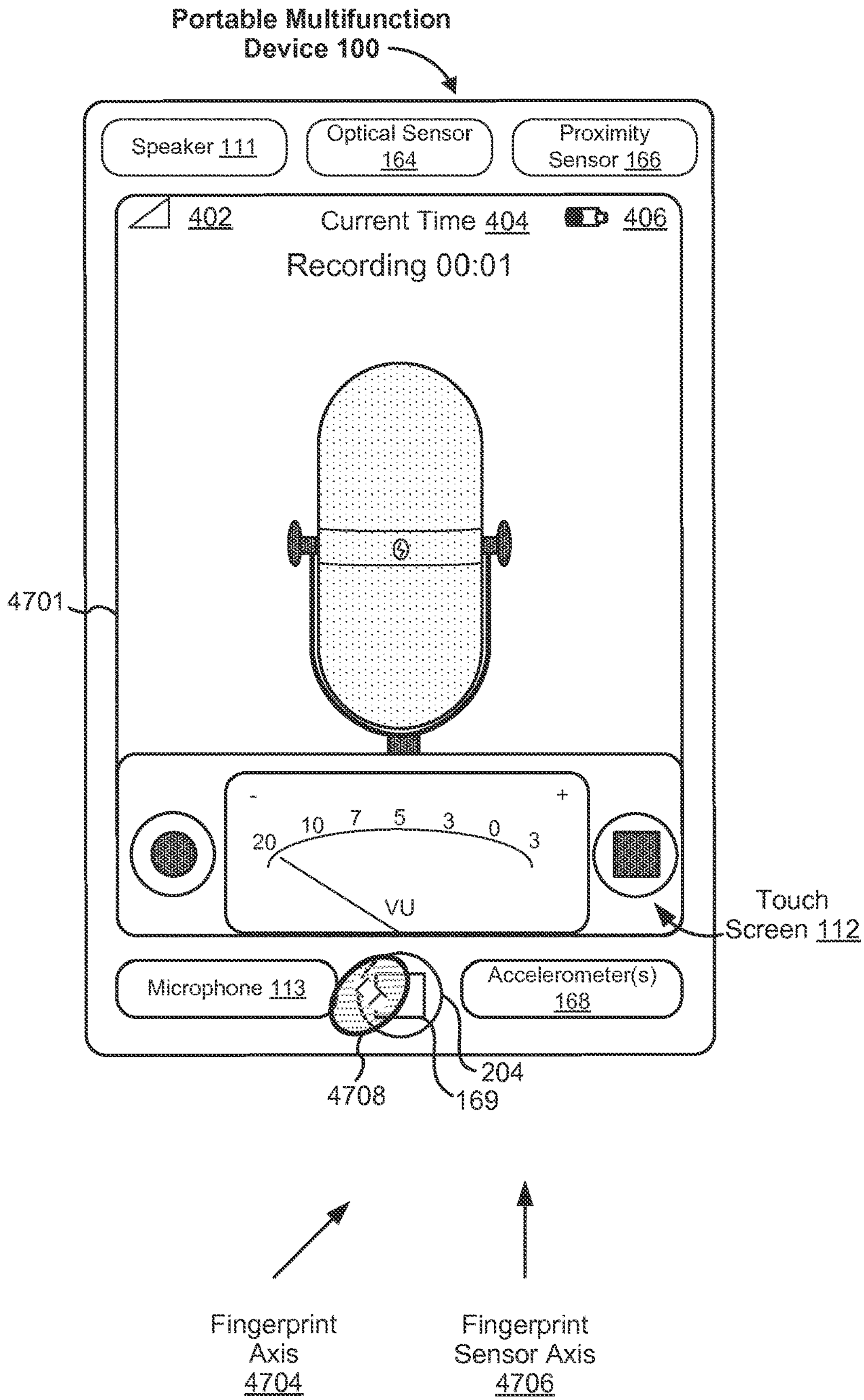
Figure 47F:
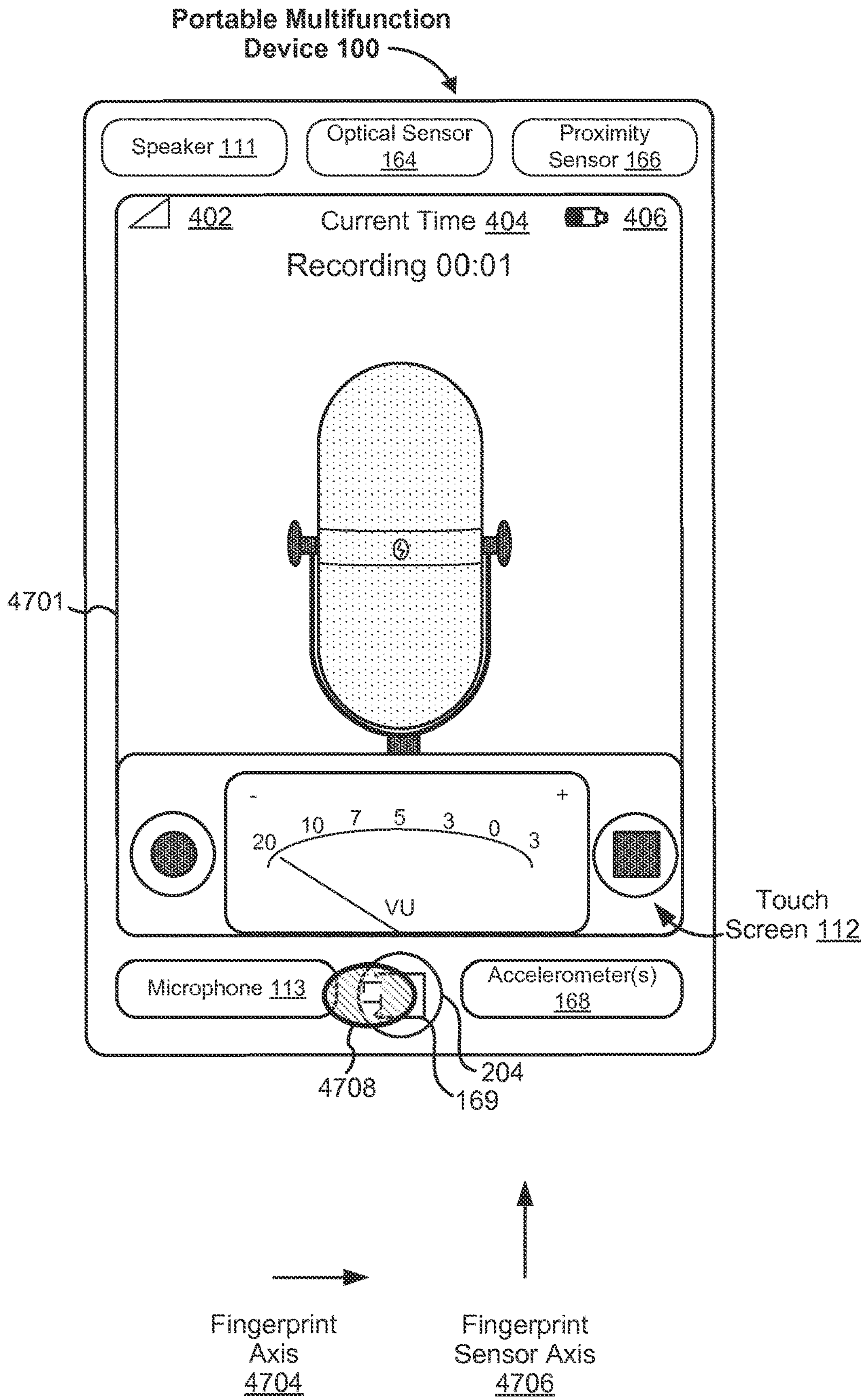

FIGS. 47D-47F illustrate a portable multifunction device 100 operating in an audio capture mode. While in audio capture mode, portable multifunction device 100 captures audio via microphone 113. FIGS. 47D-47F illustrate, for example, Apple, Inc.'s Voice Memos application which records (or captures) audio signals for subsequent playback or transmission. FIGS. 47D-47F are alike in all respects save the orientation of the respective fingerprint; thus, only the differences between FIGS. 47D-47F will be discussed for the sake of brevity.

FIG. 47D illustrates a first fingerprint 4708 in a first orientation over fingerprint sensor 169, which is integrated into home button 204 of device 100 (e.g., integrated fingerprint sensor 359-1). Fingerprint 4708 is, for example, a user's left thumb. FIG. 47D illustrates the angle of fingerprint 4708 via fingerprint axis 4704 at 90 degrees and the angle of fingerprint sensor 169 via fingerprint sensor axis 4706 at 90 degrees. Thus, in FIG. 47D, the angle of first fingerprint 4708 relative to the axis of fingerprint sensor 169 is 0 degrees.

FIG. 47E illustrates first fingerprint 4708 in a second orientation over fingerprint sensor 169. FIG. 47E illustrates the angle of fingerprint 4708 via fingerprint axis 4704 at 45 degrees and the angle of fingerprint sensor 169 via fingerprint sensor axis 4706 at 90 degrees. Thus, in FIG. 47E, the angle of first fingerprint 4708 relative to the axis of fingerprint sensor 169 is 45 degrees.

FIG. 47F illustrates first fingerprint 4708 in a third orientation over fingerprint sensor 169. FIG. 47F illustrates the angle of fingerprint 4708 via fingerprint axis 4704 at 0 degrees and the angle of fingerprint sensor 169 via fingerprint sensor axis 4706 at 90 degrees. Thus, in FIG. 47F, the angle of first fingerprint 4708 relative to the axis of fingerprint sensor 169 is 90 degrees.

Figure 47G:
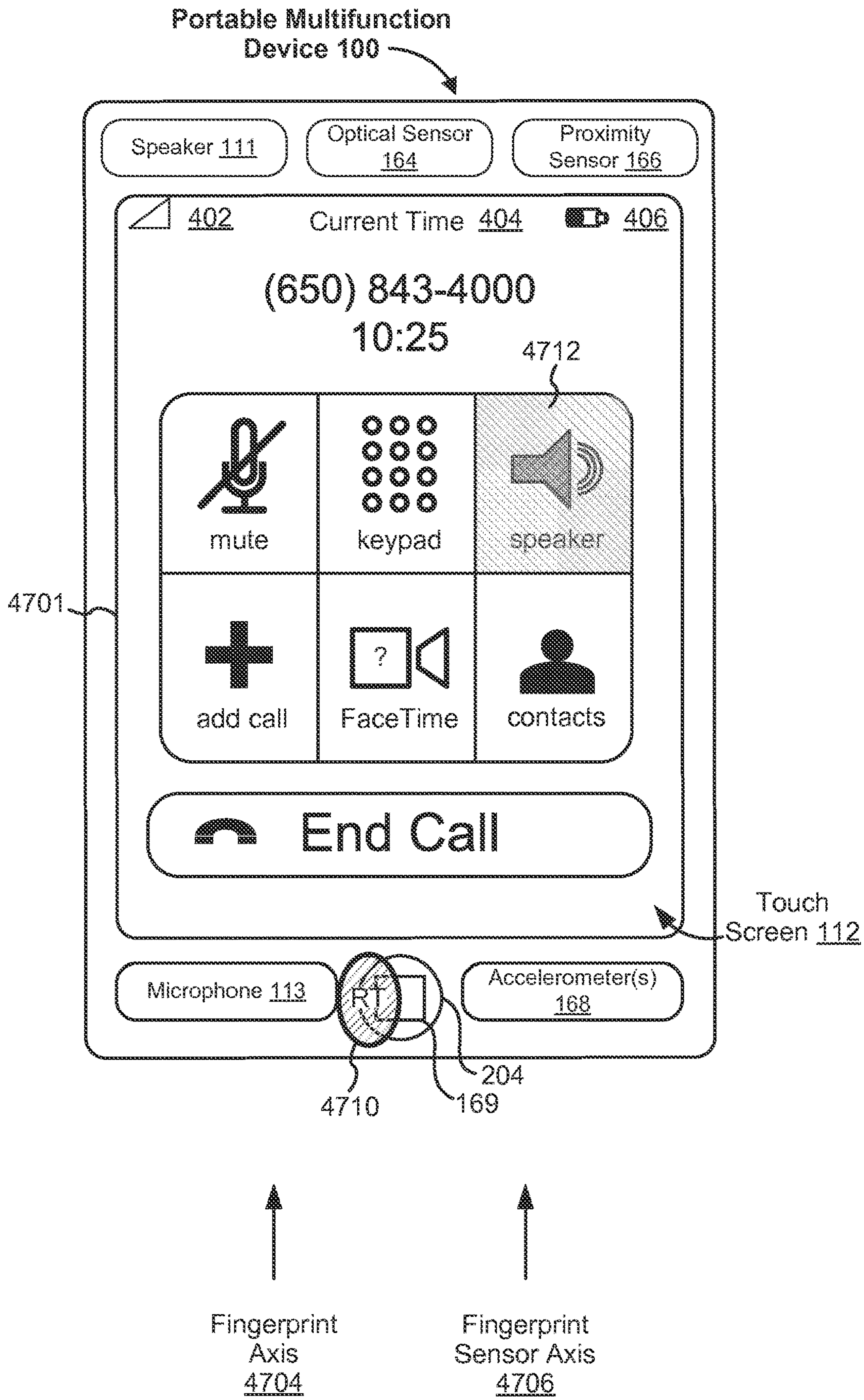
Figure 47H:
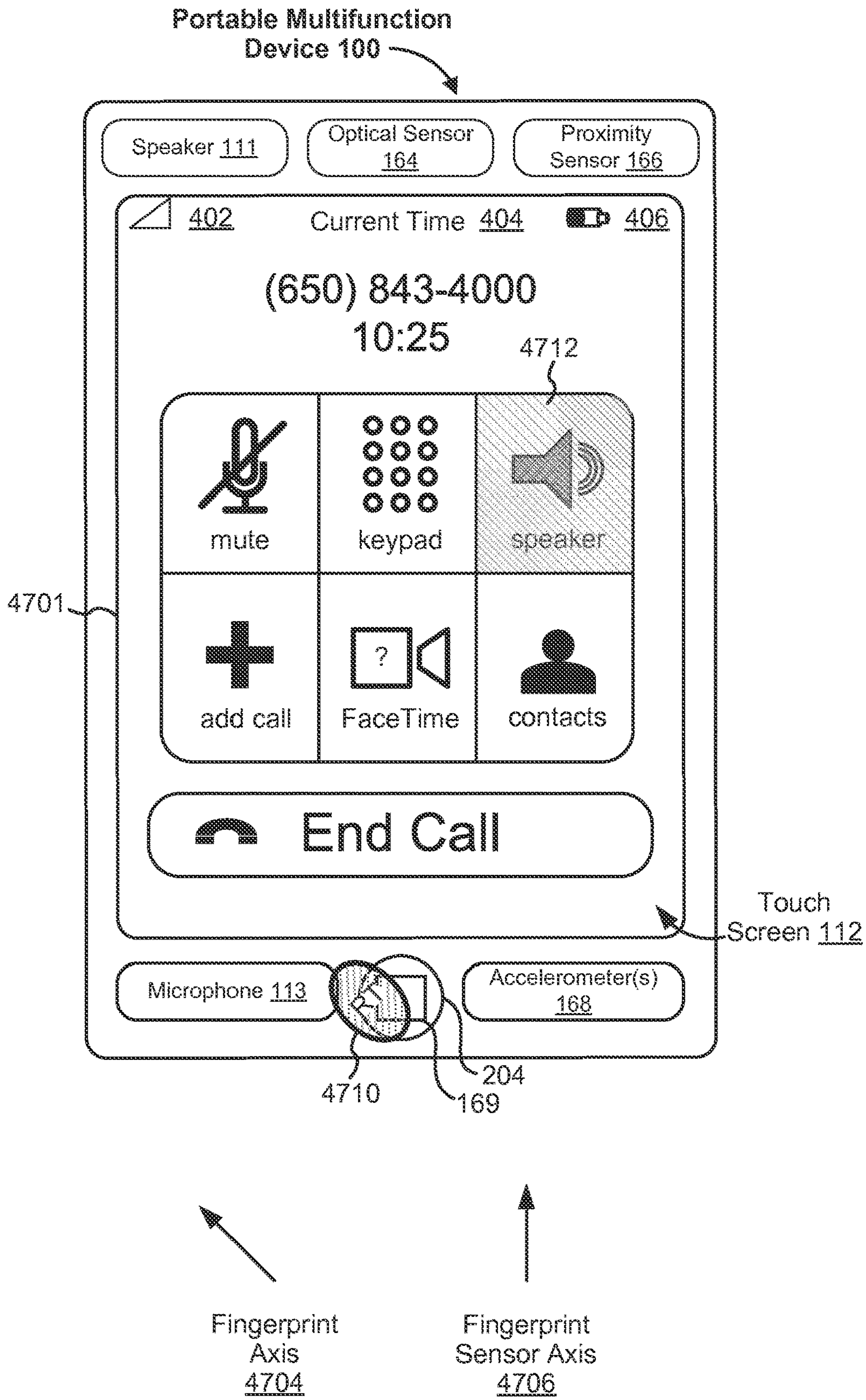
Figure 47I:
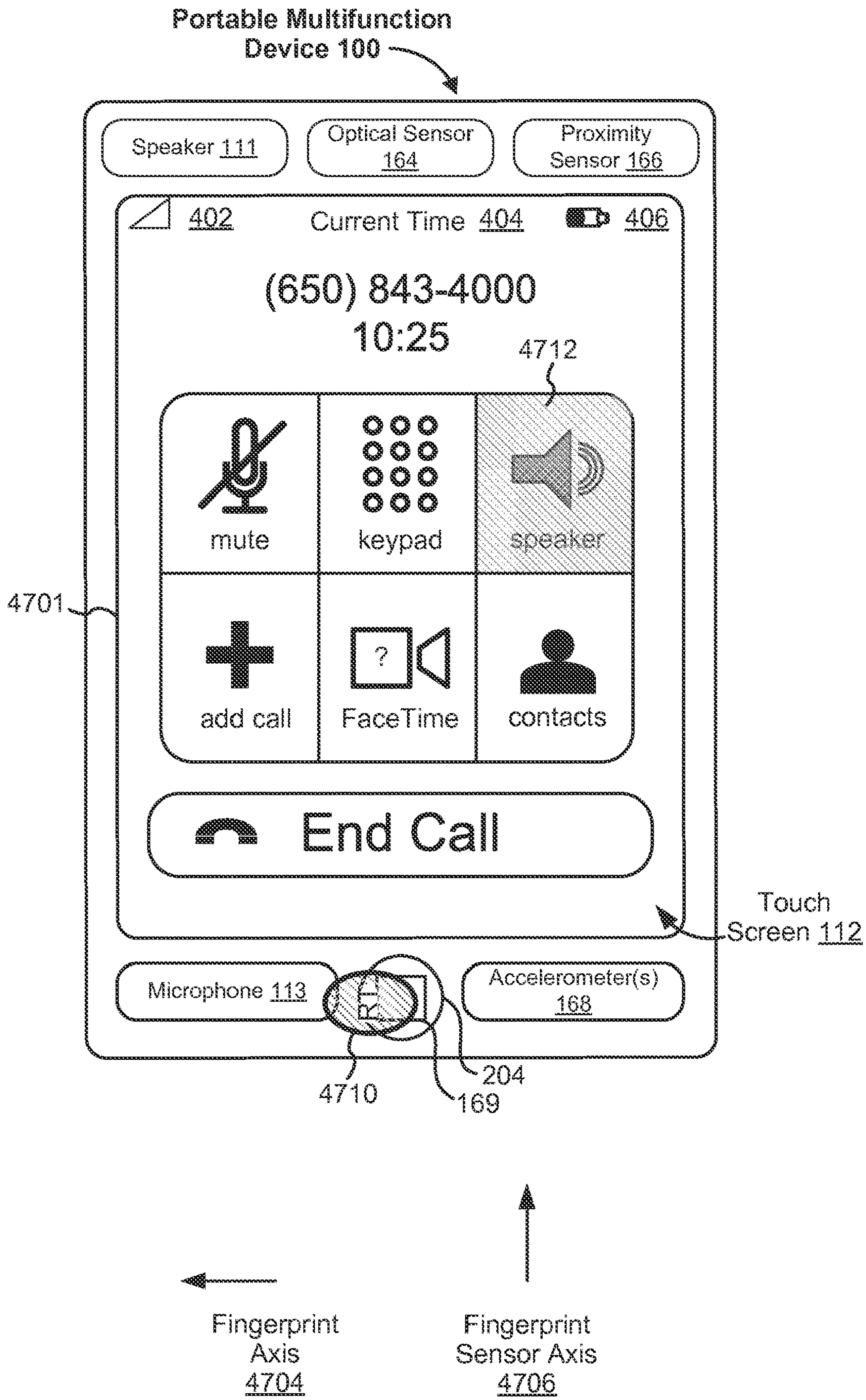

FIGS. 47G-47I illustrate a portable multifunction device 100 operating in a speaker phone mode. A plurality of buttons are displayed on user interface 4701 of touch screen 112 including a mute button, a display keypad button, an activate speaker button 4712, an add call button, an activate FaceTime button, a display contacts button and an end call button. In FIGS. 47G-47I, speaker button 4712 corresponding to speaker phone mode is activated. While in speaker phone mode, portable multifunction device 100 captures audio via microphone 113 and generates audio via speaker 111. FIGS. 47G-47I are alike in all respects save the orientation of the respective fingerprint; thus, only the differences between FIGS. 47G-47I will be discussed for the sake of brevity.

FIG. 47G illustrates a first fingerprint 4710 in a first orientation over fingerprint sensor 169, which is integrated into home button 204 of device 100. Fingerprint 4710 is, for example, a user's right thumb. FIG. 47G illustrates the angle of fingerprint 4710 via fingerprint axis 4704 at 90 degrees and the angle of fingerprint sensor 169 via fingerprint sensor axis 4706 at 90 degrees. Thus, in FIG. 47G, the angle of first fingerprint 4710 relative to the axis of fingerprint sensor 169 is 0 degrees.

FIG. 47H illustrates first fingerprint 4710 in a second orientation over fingerprint sensor 169. FIG. 47H illustrates the angle of fingerprint 4710 via fingerprint axis 4704 at 135 degrees and the angle of fingerprint sensor 169 via fingerprint sensor axis 4706 at 90 degrees. Thus, in FIG. 47H, the angle of first fingerprint 4710 relative to the axis of fingerprint sensor 169 is 45 degrees.

FIG. 47I illustrates first fingerprint 4710 in a third orientation over fingerprint sensor 169. FIG. 47I illustrates the angle of fingerprint 4710 via fingerprint axis 4704 at 180 degrees and the angle of fingerprint sensor 169 via fingerprint sensor axis 4706 at 90 degrees. Thus, in FIG. 47I, the angle of first fingerprint 4710 relative to the axis of fingerprint sensor 169 is 90 degrees.

Figure 47J:
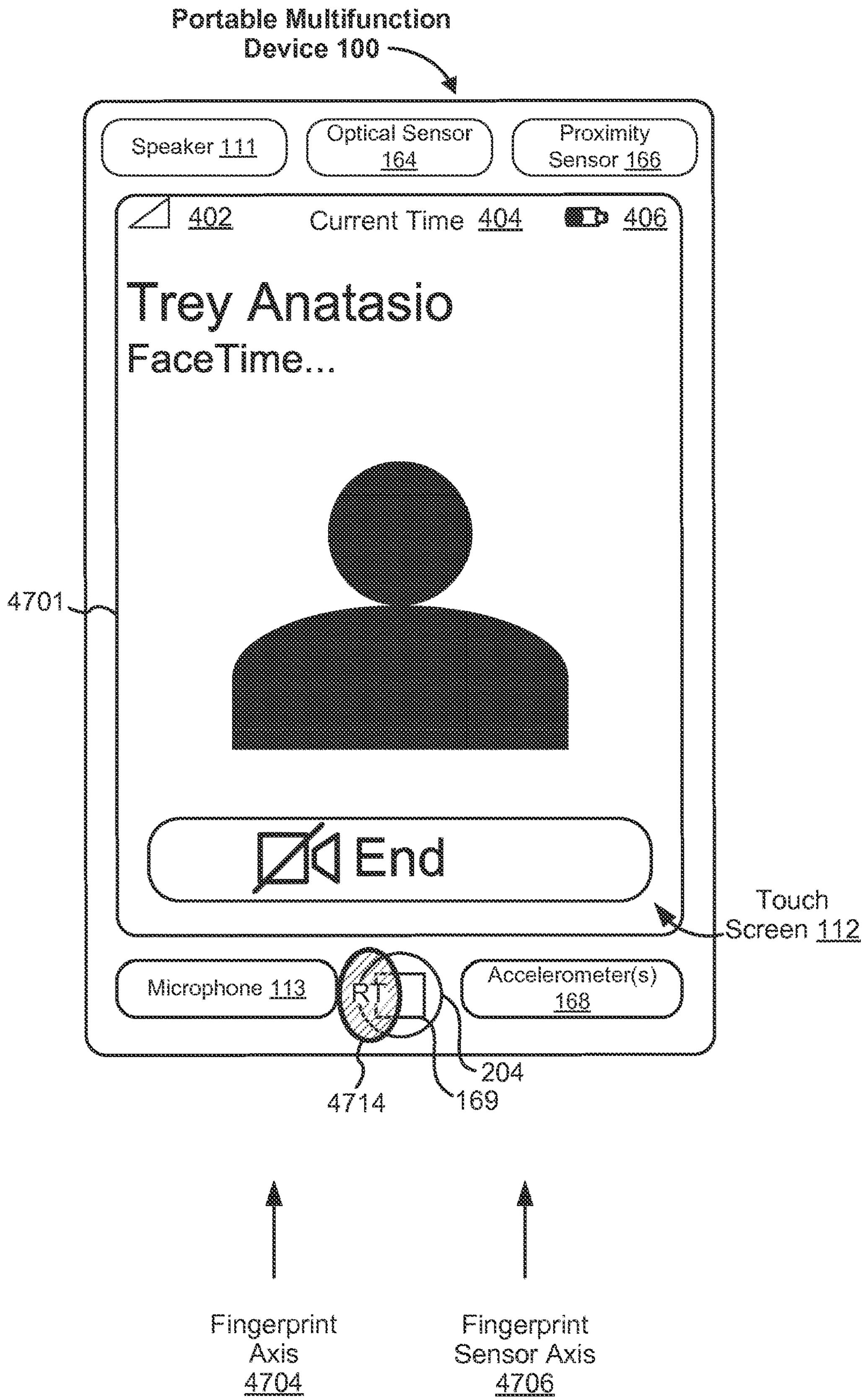
Figure 47K:
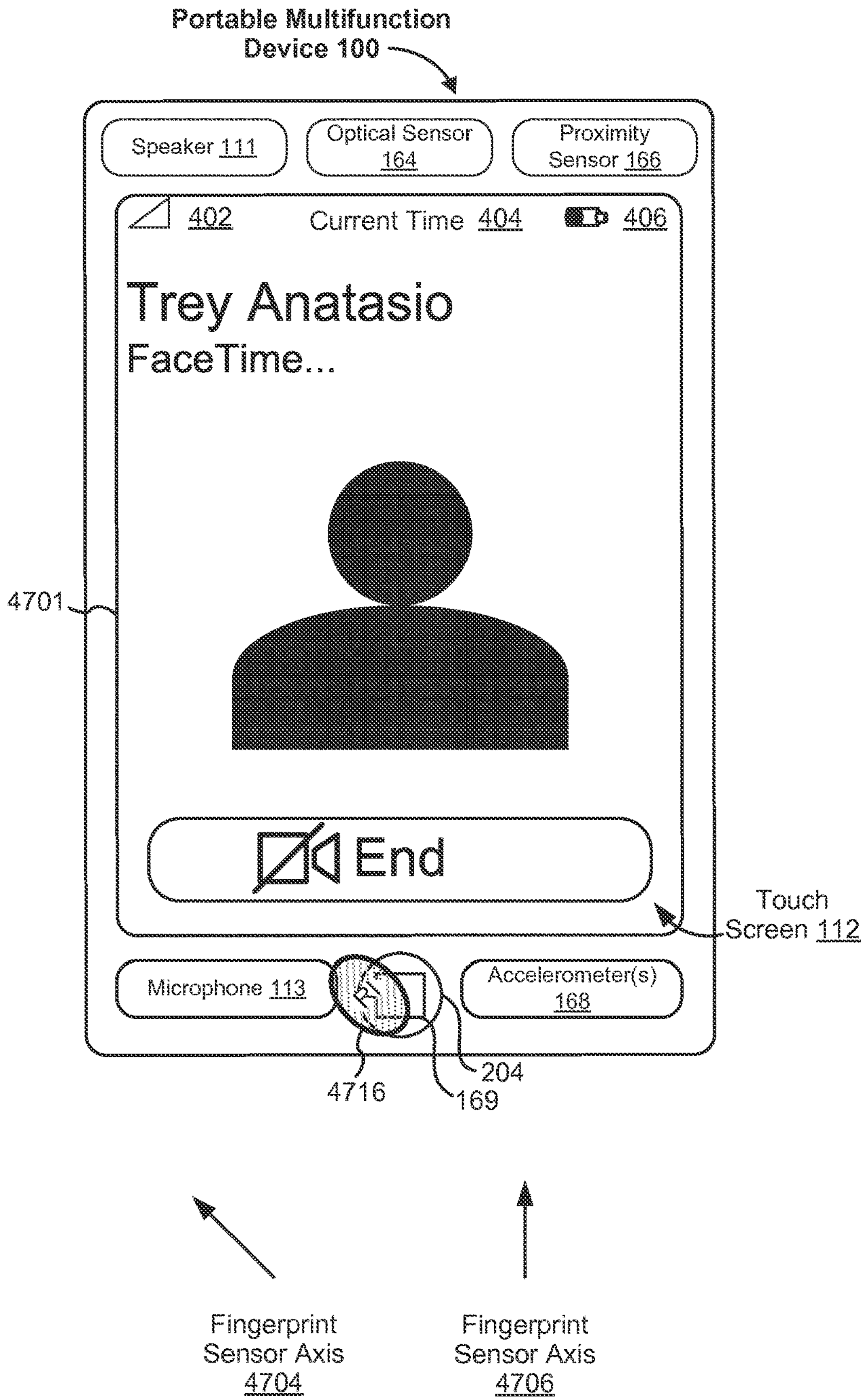
Figure 47L:
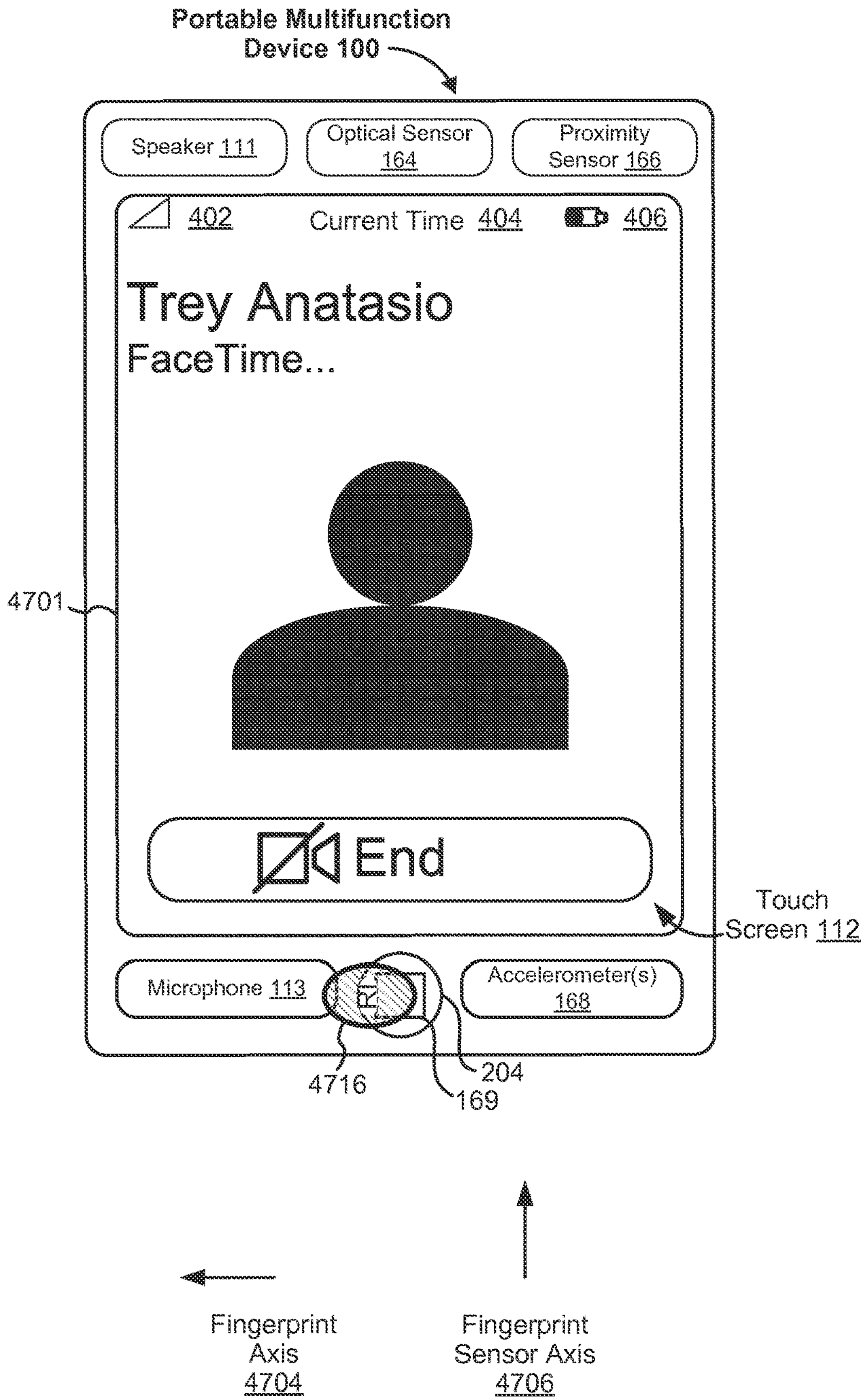

FIGS. 47J-47L illustrate a portable multifunction device 100 operating in a video conference or video chat mode (e.g., Apple, Inc.'s FaceTime application). FIGS. 47J-47L illustrate displaying a video chat participant on touch screen 112. Furthermore, a forward facing camera (not shown) enabled to capture video relative to the side of device 100 associated with touch screen 112 is configured to capture video of a user so as to transmit the video to the chat participant. While in video chat mode, portable multifunction device 100 captures audio via microphone 113, captures video via the forward facing camera (not shown) and generates audio via speaker 111. FIGS. 47J-47L are alike in all respects save the orientation of the respective fingerprint (s); thus, only the differences between FIGS. 47J-47L will be discussed for the sake of brevity.

FIG. 47J illustrates a first fingerprint 4714 in a first orientation over fingerprint sensor 169, which is integrated into home button 204 of device 100. Fingerprint 4714 is, for example, a user's right thumb. FIG. 47J illustrates the angle of fingerprint 4714 via fingerprint axis 4704 at 90 degrees and the angle of fingerprint sensor 169 via fingerprint sensor axis 4706 at 90 degrees. Thus, in FIG. 47J, the angle of first fingerprint 4714 relative to the axis of fingerprint sensor 169 is 0 degrees.

FIG. 47K illustrates a second fingerprint 4716 in a second orientation over fingerprint sensor 169. Fingerprint 4716 is, for example, a user's right index finger. FIG. 47K illustrates the angle of fingerprint 4716 via fingerprint axis 4704 at 135 degrees and the angle of fingerprint sensor 169 via fingerprint sensor axis 4706 at 90 degrees. Thus, in FIG. 47K, the angle of second fingerprint 4716 relative to the axis of fingerprint sensor 169 is 45 degrees.

FIG. 47L illustrates second fingerprint 4716 in a third orientation over fingerprint sensor 169. FIG. 47L illustrates the angle of fingerprint 4716 via fingerprint axis 4704 at 180 degrees and the angle of fingerprint sensor 169 via fingerprint sensor axis 4710 at 90 degrees. Thus, in FIG. 47L, the angle of second fingerprint 4716 relative to the axis of fingerprint sensor 169 is 90 degrees.

FIGS. 48A-48B are flow diagrams illustrating a method 4800 of changing beamforming parameters based on fingerprint orientation in accordance with some embodiments. The method 4800 is performed at an electronic device (e.g., device 300, FIG. 3, or portable multifunction device 100, FIG. 1A) with a display and a touch-sensitive surface. In some embodiments, the display is a touch screen display and the touch-sensitive surface is on the display. In some embodiments, the display is separate from the touch-sensitive surface. Some operations in method 4800 are, optionally, combined and/or the order of some operations is, optionally, changed.

As described below, the method 4800 provides an intuitive way to change beamforming parameters based on fingerprint orientation. The method reduces the cognitive burden on a user when changing beamforming parameters, thereby creating a more efficient human-machine interface. For battery-operated electronic devices, enabling a user to change beamforming parameters based on fingerprint orientation faster and more efficiently conserves power and increases the time between battery charges.

While a first fingerprint is detected in a first orientation on a fingerprint sensor, the device operates (4802) a set of one or more audio elements in accordance with a first set of beamforming parameters. FIG. 47A, for example, shows a first fingerprint 4702 in a first orientation (e.g., a 0 degree relative angle to fingerprint sensor axis 4706) on fingerprint sensor 169. FIG. 47A, for example, shows device 100 operating speaker 111 (e.g., one of a set of one or more audio elements of device 100) in accordance with a first set of beamforming parameters while first fingerprint 4702 is at a 0 degree angle relative to fingerprint sensor axis 4706.

In some embodiments, the set of one or more audio elements includes (4804) a plurality of speakers. For example, the change in beamforming parameters changes the times at which audio is generated by the speakers so as to produce constructive interference that amplifies the sound of the speakers at a predefined location, along a predefined path, or within a predefined region relative to the speakers. FIGS. 47A-47C, for example, show device 100 operating speaker 111 (e.g., one of a plurality of speakers) to generate sound corresponding to an audio file, or streaming audio, selected by a user via a media player (e.g., Apple, Inc.'s iTunes application) displayed on touch screen 112.

In some embodiments, the set of one or more audio elements includes (4806) a plurality of microphones. For example, the change in beamforming parameters changes the times at which sound received by the microphones is processed so as to produce constructive interference that amplifies the sound received by the microphones coming from a predefined location, along a predefined path, or within a predefined region relative to the microphones. FIGS. 47D-47F, for example, show device 100 operating microphone 113 (e.g., one of a plurality of microphones) to capture sound while in an audio recording mode (e.g., via Apple, Inc.'s Voice Memos application).

In some embodiments, the set of one or more audio elements includes (4808) one or more microphones and one or more speakers. FIGS. 47G-47I, for example, show device 100 operating speaker 111 (e.g., one of a plurality of speakers) and microphone 113 (e.g., one of a plurality of microphones) to generate and capture sound while in a speaker phone mode. FIGS. 47J-47L, for example, show device 100 operating speaker 111 (e.g., one of a plurality of speakers) to generate sound and microphone 113 (e.g., one of a plurality of microphones) to capture sound while in a video chat mode (e.g., via Apple, Inc.'s FaceTime application).

The device detects (4810) a subsequent fingerprint having a second orientation different from the first orientation on the fingerprint sensor, where the subsequent fingerprint is selected from the set consisting of the first fingerprint with a changed orientation and a second fingerprint distinct from the first fingerprint.

FIG. 47B, for example, shows device 100 detecting a subsequent fingerprint 4702 having a second orientation (e.g., a 45 degree angle relative to fingerprint sensor axis 4706) on fingerprint sensor 169 different from the first orientation in FIG. 47A (e.g., a 0 degree angle relative to fingerprint sensor axis 4706). Subsequent fingerprint 4702 in FIG. 47B is first fingerprint 4702 in FIG. 47A with a changed orientation (e.g., a 45 degree angle as opposed to a 0 degree angle relative to fingerprint sensor axis 4706). In this example, subsequent fingerprint 4702 is the user's right thumb. According to some embodiments, subsequent fingerprint 4702, however, corresponds to one of either two scenarios: (1) continuous contact of the user's right thumb with fingerprint sensor 169 between the first orientation in FIG. 47A and the second orientation in FIG. 47B, or (2) after detection of the user's right thumb in the first orientation in FIG. 47A, lift off of the user's right thumb and placement of the user's right thumb in the second orientation in FIG. 47B.

FIG. 47K, for example, shows device 100 detecting a subsequent fingerprint 4716 having a second orientation (e.g., a 45 degree angle relative to fingerprint sensor axis 4706) on fingerprint sensor 169 different from the first orientation in FIG. 47J (e.g., a 0 degree angle relative to fingerprint sensor axis 4706). Subsequent fingerprint 4716 in FIG. 47K is a second fingerprint distinct from first fingerprint 4714 in FIG. 47J. In this example, fingerprint 4714 detected on fingerprint sensor 169 in FIG. 47J is a user's right thumb, and fingerprint 4716 detected on fingerprint sensor 169 in FIG. 47K is a user's right index finger. Thus, in this example, after detection of the user's right thumb in FIG. 47J, the user's right thumb was lifted off of fingerprint sensor 169, and, subsequently, the user's right index finger is detected on fingerprint sensor 169 in FIG. 47K.

In response to detecting the subsequent fingerprint having the second orientation on the fingerprint sensor, the device operates (4812) the set of one or more audio elements in accordance with a second set of beamforming parameters different from the first set of beamforming parameters. In some embodiments, the change in the beamforming parameters changes constructive and destructive interference of audio received/generated by a plurality of audio elements (e.g., speakers or microphones) so as to extend the effective range of the audio elements. FIG. 47B, for example, shows a subsequent fingerprint 4702 in a second orientation (e.g., a 45 degree relative to fingerprint sensor axis 4706) on fingerprint sensor 169. FIG. 47B, for example, shows device 100 operating speaker 111 (e.g., one of a set of one or more audio elements of device 100) in accordance with a second set of beamforming parameters while subsequent fingerprint 4702 is at the 45 degree relative to fingerprint sensor axis 4706.

In some embodiments, in response to detecting the change in orientation of the fingerprint on the fingerprint sensor, the device selects (4814) the second set of beamforming parameters from a plurality of sets of predefined beamforming parameters associated with corresponding fingerprint orientations. For example, a first set of beamforming parameters is optimized for situations where the fingerprint is at 0 degrees on the fingerprint sensor (e.g., an axis of the fingerprint is aligned with a predefined axis of the fingerprint sensor), a second set of beamforming parameters is optimized for situations where the angle of the fingerprint is 90 degrees on the fingerprint sensor relative to the predefined axis of the fingerprint sensor, etc. In some embodiments, the beamforming parameters are stored at the device, and the beamforming parameters are retrieved from storage in response to detecting the change in orientation. In some embodiments, the beamforming parameters are generated by the device as needed. In some embodiments, the plurality of sets of predefined beamforming parameters correspond to fingerprint orientations at regularly spaced intervals, such as 15 degrees, 30 degrees or 45 degrees. For example, when an angle of the fingerprint is 45 degrees on the fingerprint sensor relative to the predefined axis of the fingerprint sensor, the device combines contributions from different sets of baseline beamforming parameters (e.g., a set of 30 degree beamforming parameters and a set of 60 degree beamforming parameters) in accordance with an angle of the fingerprint on the fingerprint sensor.

In some embodiments, differences between the first set of beamforming parameters and the second set of beamforming parameters compensate (4816) for a change in the likely location of the mouth of a user (4818) of the device relative to the audio elements of the device (e.g., the change in beamforming captures sound from the user more effectively). FIGS. 47D-47F, for example, show device 100 compensating for a change in the likely location of the mouth of a user of device 100 relative to microphone 113 while capturing sound in a sound recording mode by changing the beamforming parameters according to a change in orientation of the fingerprint on fingerprint sensor 169.

In some embodiments, differences between the first set of beamforming parameters and the second set of beamforming parameters compensate (4816) for a change in the likely location of an ear of a user (4820) of the device relative to the audio elements of the device (e.g., the change in beamforming delivers sound to the user more effectively). FIGS. 47A-47C, for example, show device 100 compensating for a change in the likely location of the ear of a user of device 100 relative to speaker 111 while generating sound in media playback mode by changing the beamforming parameters according to a change in orientation of the fingerprint on fingerprint sensor 169.

In some embodiments, differences between the first set of beamforming parameters and the second set of beamforming parameters compensate (4816) for a change in the likely location of a hand of a user (4822) of the device relative to the audio elements of the device (e.g., the change in beamforming captures sound from the user and/or delivers sound to the user more effectively if a hand is likely to be blocking at least a part of a path between the audio elements and the user's ears/mouth). FIGS. 47G-47I, for example, show device 100 compensating for a change in the likely location of the hand of a user of device 100 relative to speaker 111 and microphone 113 while generating and capturing sound in speaker phone mode by changing the beamforming parameters according to a change in orientation of the fingerprint on fingerprint sensor 169.

It should be understood that the particular order in which the operations in FIGS. 48A-48B have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., those methods described above) are also applicable in an analogous manner to method 4800 described above with respect to FIGS. 48A-48B. For example, the fingerprints described above with reference to method 4800 optionally have one or more of the characteristics of the fingerprints described herein with reference to other methods described herein (e.g., those methods described above). For brevity, these details are not repeated here.

Figure 49:
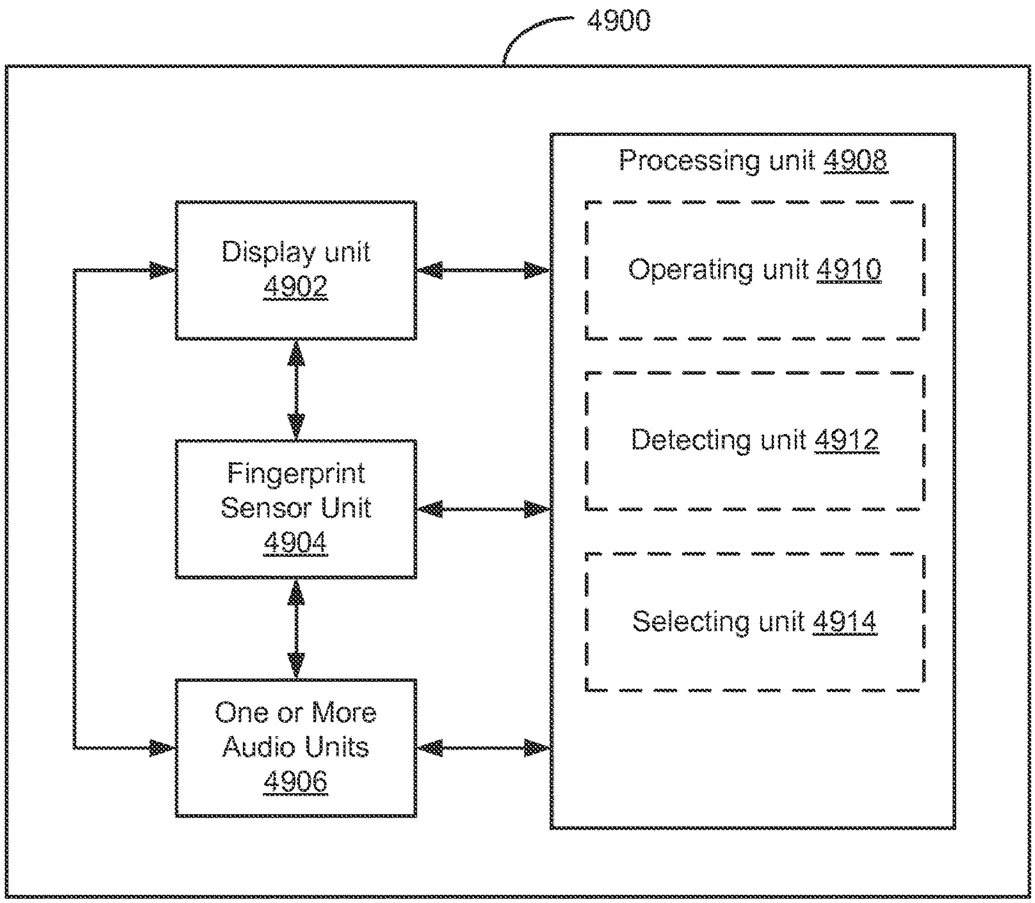
FIG. 49 is a functional block diagram of an electronic device in accordance with some embodiments.

In accordance with some embodiments, FIG. 49 shows a functional block diagram of an electronic device 4900 configured in accordance with the principles of the various described embodiments. The functional blocks of the device are, optionally, implemented by hardware, software, or a combination of hardware and software to carry out the principles of the various described embodiments. It is understood by persons of skill in the art that the functional blocks described in FIG. 49 are, optionally, combined or separated into sub-blocks to implement the principles of the various described embodiments. Therefore, the description herein optionally supports any possible combination or separation or further definition of the functional blocks described herein.

As shown in FIG. 49, an electronic device 4900 includes a display unit 4902 configured to display one or more user interface objects; a fingerprint sensor unit 4904; a set of one or more audio units 4906 configured to generate and/or capture audio signals; and a processing unit 4908 coupled to the display unit 4902, the fingerprint sensor unit 4904, and the set of one or more audio units 4906. In some embodiments, the processing unit 4908 includes an operating unit 4910, a detecting unit 4912 and a selecting unit 4914.

While a first fingerprint is detected (e.g., with the detecting unit 4912) in a first orientation on the fingerprint sensor unit 4904, the processing unit 4908 is configured to operate (e.g., with the operating unit 4910) the set of one or more audio units 4906 in accordance with a first set of beamforming parameters. The processing unit 4908 is further configured to: detect (e.g., with detecting unit 4912) a subsequent fingerprint having a second orientation different from the first orientation on the fingerprint sensor unit 4904, where the subsequent fingerprint is selected from a set consisting of the first fingerprint with a changed orientation and a second fingerprint distinct from the first fingerprint; and in response to detecting the subsequent fingerprint having the second orientation on the fingerprint sensor unit 4904, operate (e.g., with the operating unit 4910) the set of one or more audio units 4906 in accordance with a second set of beamforming parameters different from the first set of beamforming parameters.

In some embodiments, the set of one or more audio units 4906 includes a plurality of speakers. In some embodiments, the set of one or more audio units 4906 includes a plurality of microphones. In some embodiments, the set of one or more audio units 4906 includes one or more microphones and one or more speakers.

In some embodiments, the processing unit 4908 is further configured to select (e.g., with the selecting unit 4914) the second set of beamforming parameters from a plurality of sets of predefined beamforming parameters associated with corresponding fingerprint orientations to in response to detecting (e.g., with the detecting unit 4912) the subsequent fingerprint having the second orientation on the fingerprint sensor unit 4904.

In some embodiments, differences between the first set of beamforming parameters and the second set of beamforming parameters compensate for a change in the likely location of the mouth of a user of the device relative to the one or more audio units 4906. In some embodiments, differences between the first set of beamforming parameters and the second set of beamforming parameters compensate for a change in the likely location of an ear of a user of the device relative to the one or more audio units 4906. In some embodiments, differences between the first set of beamforming parameters and the second set of beamforming parameters compensate for a change in the likely location of a hand of a user of the device relative to the one or more audio units 4906.

The operations in the information processing methods described above are, optionally implemented by running one or more functional modules in information processing apparatus such as general purpose processors (e.g., as described above with respect to FIGS. 1A and 3) or application specific chips.

The operations described above with reference to FIGS. 48A-48B are, optionally, implemented by components depicted in FIGS. 1A-1B or FIG. 49. For example, operating operations 4802 and 4812, detecting operation 4810, and selecting operation 4814 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub-event, such as selection of an object on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

What is claimed is:

1. A method, comprising:

at an electronic device with a fingerprint sensor and a display:

while one or more functions of the device are restricted and a restricted user interface is displayed on the display, detecting a fingerprint on the fingerprint sensor;

in response to detecting the fingerprint on the fingerprint sensor, in accordance with a determination that the fingerprint corresponds to authorized fingerprint data, removing the restrictions from the one or more functions of the device and displaying, on the display, an indication that the one or more functions of the device are no longer restricted; and while the one or more functions of the device are not restricted:

displaying, on the display, a user interface for a respective application including displaying a first portion of the respective application and a second portion of the respective application different from the first portion;

while displaying the user interface for the respective application on the display, detecting movement of a fingerprint on the fingerprint sensor; and in response to detecting movement of the fingerprint on the fingerprint sensor:

in accordance with a determination that the movement of the fingerprint is in a first direction, navigating through content in the respective application in a direction determined in accordance with the first direction;

in accordance with a determination that the movement of the fingerprint is in a second direction that is opposite to the first direction, navigating through content in the respective application in a direction determined in accordance with the second direction; and in accordance with a determination that the movement of the fingerprint is in a third direction different from the first direction and the second direction:

ceasing to display the first portion of the respective application while maintaining display of the second portion of the respective application; and displaying a system user interface that is different from the user interface for the respective application on the display while maintaining display of the second portion of the respective application.

2. The method of claim 1, wherein the first direction is perpendicular to the third direction.

3. The method of claim 1, wherein the system user interface is a multitasking user interface that includes representations of concurrently open applications.

4. The method of claim 1, further comprising:

while displaying the system user interface in accordance with the determination that the movement of the fingerprint is in the third direction, detect movement of the fingerprint on the fingerprint sensor in the first direction; and in response to detecting movement of the fingerprint on the fingerprint sensor in the first direction, navigating through the system user interface.

5. The method of claim 1, further comprising:

while displaying the system user interface in accordance with the determination that the movement of the fingerprint is in the third direction, detecting movement of the fingerprint on the fingerprint sensor in a fourth direction; and in response to detecting movement of the fingerprint on the fingerprint sensor in the fourth direction, ceasing to display the system user interface.

6. The method of claim 1, wherein navigating through the user interface for the respective application includes navigating through the user interface for the respective application at a rate determined in accordance with a displacement of the fingerprint on the fingerprint sensor.

7. The method of claim 1, wherein displaying the system user interface includes:

displaying an animated transition of the system user interface appearing on the display, wherein the speed of the animated transition is based on a displacement of the fingerprint on the fingerprint sensor.

8. The method of claim 1, wherein the fingerprint sensor is separate from the display.

9. The method of claim 1, wherein:

the device includes a touch-sensitive surface; and the fingerprint sensor is separate from the touch-sensitive surface.

10. The method of claim 1, wherein:

the device includes a button; and the fingerprint sensor is integrated into the button.

11. The method of claim 10, further comprising:

while displaying the user interface for the respective application, detecting activation of the button; and in response to detecting activation of the button, replacing the user interface for the respective application with a predefined user interface associated with activating the button.

12. The method of claim 10, further comprising:

while displaying the system user interface, detecting activation of the button; and in response to detecting activation of the button, ceasing to display the system user interface.

13. The method of claim 10, further comprising:

while displaying the user interface for the respective application, detecting a double activation of the button; and in response to detecting double activation of the button, displaying the system user interface on the display.

14. The method of claim 1, wherein the system user interface is displayed proximate to an edge of the display that is closest to the fingerprint sensor.

15. The method of claim 1, wherein the system user interface is a multi-tasking user interface that includes representations of a plurality of most-recently used applications.

16. The method of claim 1, wherein the system user interface is a multi-tasking user interface that includes a plurality of representations, and wherein at least one of the plurality of representations corresponds to a calendar application, a photos viewer application, a camera application, or a clock application.

17. The method of claim 1, wherein the display is a touch-sensitive display separate from the fingerprint sensor.

18. A non-transitory computer readable storage medium storing one or more programs, the one or more programs comprising instructions, which when executed by an electronic device with a display and a fingerprint sensor, cause the device to:

while one or more functions of the device are restricted and a restricted user interface is displayed on the display, detecting a fingerprint on the fingerprint sensor;

in response to detecting the fingerprint on the fingerprint sensor, in accordance with a determination that the fingerprint corresponds to authorized fingerprint data, remove the restrictions from the one or more functions of the device and display, on the display, an indication that the one or more functions of the device are no longer restricted; and while the one or more functions of the device are not restricted:

display, on the display, a user interface for a respective application including displaying a first portion of the respective application and a second portion of the respective application different from the first portion;

while displaying the user interface for the respective application on the display, detect movement of a fingerprint on the fingerprint sensor; and in response to detecting movement of the fingerprint on the fingerprint sensor:

in accordance with a determination that the movement of the fingerprint is in a first direction, navigate through content in the respective application in a direction determined in accordance with the first direction;

in accordance with a determination that the movement of the fingerprint is in a second direction that is opposite to the first direction, navigate through content in the respective application in a direction determined in accordance with the second direction; and in accordance with a determination that the movement of the fingerprint is in a third direction different from the first direction and the second direction:

cease to display the first portion of the respective application while maintaining display of the second portion of the respective application; and display a system user interface that is different from the user interface for the respective application on the display while maintaining display of the second portion of the respective application.

19. The non-transitory computer readable storage medium of claim 18, wherein the first direction is perpendicular to the third direction.

20. The non-transitory computer readable storage medium of claim 18, wherein the system user interface is a multitasking user interface that includes representations of concurrently open applications.

21. The non-transitory computer readable storage medium of claim 18, wherein the one or more programs includes further instructions, which when executed by the electronic device, further cause the device to:

while displaying the system user interface in accordance with the determination that the movement of the fingerprint is in the third direction, detect movement of the fingerprint on the fingerprint sensor in the first direction; and in response to detecting movement of the fingerprint on the fingerprint sensor in the first direction, navigate through the system user interface.

22. The non-transitory computer readable storage medium of claim 18, wherein the one or more programs includes further instructions, which when executed by the electronic device, further cause the device to:

while displaying the system user interface in accordance with the determination that the movement of the fingerprint is in the third direction, detect movement of the fingerprint on the fingerprint sensor in a fourth direction; and in response to detecting movement of the fingerprint on the fingerprint sensor in the fourth direction, cease to display the system user interface.

23. The non-transitory computer readable storage medium of claim 18, wherein navigating through the user interface for the respective application includes navigating through the user interface for the respective application at a rate determined in accordance with a displacement of the fingerprint on the fingerprint sensor.

24. The non-transitory computer readable storage medium of claim 18, wherein displaying the system user interface includes displaying an animated transition of the system user interface appearing on the display, wherein the speed of the animated transition is based on a displacement of the fingerprint on the fingerprint sensor.

25. The non-transitory computer readable storage medium of claim 18, wherein the fingerprint sensor is separate from the display.

26. The non-transitory computer readable storage medium of claim 18, wherein:

the device includes a touch-sensitive surface; and the fingerprint sensor is separate from the touch-sensitive surface.

27. The non-transitory computer readable storage medium claim 18, wherein:

the device includes a button; and the fingerprint sensor is integrated into the button.

28. The non-transitory computer readable storage medium of claim 27, wherein the one or more programs includes further instructions, which when executed by the electronic device, further cause the device to:

while displaying the user interface for the respective application, detect activation of the button; and in response to detecting activation of the button, replace the user interface for the respective application with a predefined user interface associated with activating the button.

29. The non-transitory computer readable storage medium of claim 27 wherein the one or more programs includes further instructions, which when executed by the electronic device, further cause the device to:

while displaying the system user interface, detect activation of the button; and in response to detecting activation of the button, cease to display the system user interface.

30. The non-transitory computer readable storage medium of claim 27 wherein the one or more programs includes further instructions, which when executed by the electronic device, further cause the device to:

while displaying the user interface for the respective application, detect a double activation of the button; and in response to detecting double activation of the button, display the system user interface on the display.

31. The non-transitory computer readable storage medium of claim 18, wherein the system user interface is displayed proximate to an edge of the display that is closest to the fingerprint sensor.

32. The non-transitory computer readable storage medium of claim 18, wherein the system user interface is a multitasking user interface that includes representations of a plurality of most-recently used applications.

33. The non-transitory computer readable storage medium of claim 18, wherein the system user interface is a multitasking user interface that includes a plurality of representations, and wherein at least one of the plurality of representations corresponds to a calendar application, a photos viewer application, a camera application, or a clock application.

34. The non-transitory computer readable storage medium of claim 18, wherein the display is a touch-sensitive display separate from the fingerprint sensor.

35. An electronic device, comprising:

a display;

a fingerprint sensor;

one or more processors; and memory storing one or more programs configured to be executed by the one or more processors, the one or more programs including instructions for:

while one or more functions of the device are restricted and a restricted user interface is displayed on the display, detecting a fingerprint on the fingerprint sensor;

in response to detecting the fingerprint on the fingerprint sensor, in accordance with a determination that the fingerprint corresponds to authorized fingerprint data, removing the restrictions from the one or more functions of the device and displaying, on the display, an indication that the one or more functions of the device are no longer restricted; and while the one or more functions of the device are not restricted:

displaying, on the display, a user interface for a respective application including displaying a first portion of the respective application and a second portion of the respective application different from the first portion;

while displaying the user interface for the respective application on the display, detecting movement of a fingerprint on the fingerprint sensor; and in response to detecting movement of the fingerprint on the fingerprint sensor:

in accordance with a determination that the movement of the fingerprint is in a first direction, navigating through content in the respective application in a direction determined in accordance with the first direction;

in accordance with a determination that the movement of the fingerprint is in a second direction that is opposite to the first direction, navigating through content in the respective application in a direction determined in accordance with the second direction; and in accordance with a determination that the movement of the fingerprint is in a third direction different from the first direction and the second direction:

ceasing to display the first portion of the respective application while maintaining display of the second portion of the respective application; and displaying a system user interface that is different from the user interface for the respective application on the display while maintaining display of the second portion of the respective application.

36. The electronic device of claim 35, wherein the first direction is perpendicular to the third direction.

37. The electronic device of claim 35, wherein the system user interface is a multitasking user interface that includes representations of concurrently open applications.

38. The electronic device of claim 35, the one or more programs further including instructions for:

while displaying the system user interface in accordance with the determination that the movement of the fingerprint is in the third direction, detect movement of the fingerprint on the fingerprint sensor in the first direction; and in response to detecting movement of the fingerprint on the fingerprint sensor in the first direction, navigating through the system user interface.

39. The electronic device of claim 35, the one or more programs further including instructions for:

while displaying the system user interface in accordance with the determination that the movement of the fingerprint is in the third direction, detecting movement of the fingerprint on the fingerprint sensor in a fourth direction; and in response to detecting movement of the fingerprint on the fingerprint sensor in the fourth direction, ceasing to display the system user interface.

40. The electronic device of claim 35, wherein navigating through the user interface for the respective application includes navigating through the user interface for the respective application at a rate determined in accordance with a displacement of the fingerprint on the fingerprint sensor.

41. The electronic device of claim 35, wherein displaying the system user interface includes:

displaying an animated transition of the system user interface appearing on the display, wherein the speed of the animated transition is based on a displacement of the fingerprint on the fingerprint sensor.

42. The electronic device of claim 35, wherein the fingerprint sensor is separate from the display.

43. The electronic device of claim 35, wherein:

the device includes a touch-sensitive surface; and the fingerprint sensor is separate from the touch-sensitive surface.

44. The electronic device of claim 35, wherein:

the device includes a button; and the fingerprint sensor is integrated into the button.

45. The electronic device of claim 44, the one or more programs further including instructions for:

while displaying the user interface for the respective application, detecting activation of the button; and in response to detecting activation of the button, replacing the user interface for the respective application with a predefined user interface associated with activating the button.

46. The electronic device of claim 44, the one or more programs further including instructions for:

while displaying the system user interface, detecting activation of the button; and in response to detecting activation of the button, ceasing to display the system user interface.

47. The electronic device of claim 44, the one or more programs further including instructions for:

while displaying the user interface for the respective application, detecting a double activation of the button; and in response to detecting double activation of the button, displaying the system user interface on the display.

48. The electronic device of claim 35, wherein the system user interface is displayed proximate to an edge of the display that is closest to the fingerprint sensor.

49. The electronic device of claim 35, wherein the system user interface is a multi-tasking user interface that includes representations of a plurality of most-recently used applications.

50. The electronic device of claim 35, wherein the system user interface is a multi-tasking user interface that includes a plurality of representations, and wherein at least one of the plurality of representations corresponds to a calendar application, a photos viewer application, a camera application, or a clock application.

51. The electronic device of claim 35, wherein the display is a touch-sensitive display separate from the fingerprint sensor.

* * * * *

UNITED STATES PATENT AND TRADEMARK OFFICE

CERTIFICATE OF CORRECTION

PATENT NO. : 11,209,961 B2
APPLICATION NO. : 14/402087
DATED : December 28, 2021
INVENTOR(S) : Benjamin J. Pope et al.

It is certified that error appears in the above-identified patent and that said Letters Patent is hereby corrected as shown below:

In the Claims

In Column 194, Line 1, Claim 27, after “medium” insert -- of --.

Signed and Sealed this
Fifteenth Day of March, 2022

Drew Hirshfeld
*Performing the Functions and Duties of the*
*Under Secretary of Commerce for Intellectual Property and*
*Director of the United States Patent and Trademark Office*